US005742806A

United States Patent [19]

Reiner et al.

[11] Patent Number: 5,742,806

[45] Date of Patent: Apr. 21, 1998

[54] APPARATUS AND METHOD FOR DECOMPOSING DATABASE QUERIES FOR DATABASE MANAGEMENT SYSTEM INCLUDING MULTIPROCESSOR DIGITAL DATA PROCESSING SYSTEM

[75] Inventors: David Reiner; Jeffrey M. Miller, both of Lexington; David C. Wheat, Grafton, all of Mass.

[73] Assignee: Sun Microsystems, Inc., Mountain View, Calif.

[21] Appl. No.: 189,497

[22] Filed: Jan. 31, 1994

[51] Int. Cl.[6] .............................. G06F 15/00; G06F 17/30

[52] U.S. Cl. ................... 395/600; 395/200.2; 395/200.5; 395/200.06; 395/840; 395/477; 395/421.06; 395/182.09; 364/DIG. 1; 364/282.1; 364/281.4; 364/282.4

[58] Field of Search ............................... 395/600, 200.05, 395/200.06, 200.2, 840, 477, 421.06, 182.09; 364/DIG. 1

[56] References Cited

U.S. PATENT DOCUMENTS

| | | | |
|---|---|---|---|
| 4,860,201 | 8/1989 | Stolfio et al. | 364/200 |
| 4,870,568 | 9/1989 | Kahle et al. | 364/200 |
| 4,876,643 | 10/1989 | Mc Neill et al. | 364/200 |
| 4,991,087 | 2/1991 | Burkowski et al. | 395/600 |
| 5,060,143 | 10/1991 | Lee | 364/200 |
| 5,121,494 | 6/1992 | Dias et al. | 395/600 |
| 5,146,540 | 9/1992 | Natarajan | 395/11 |
| 5,210,870 | 5/1993 | Baum et al. | 395/600 |
| 5,379,420 | 1/1995 | Ullner | 395/600 |
| 5,423,037 | 6/1995 | Huasshod | 395/600 |
| 5,469,354 | 11/1995 | Hatakeyama et al. | 364/419.19 |
| 5,495,606 | 2/1996 | Borden et al. | 395/600 |

OTHER PUBLICATIONS

Chen, Arbee L.P., "OuterJoin Optimization in Multi Database Systems", Bell Communication Research, IEEE, 1990, pp. 211–218.

Goetz Graefe, "Volcano, an Extensible and Parallel Query Evaluation System", University of Colorado at Boulder, CU–CS–481–90, Jul. 1990, pp. 1–44.

*Primary Examiner*—Thomas G. Black
*Assistant Examiner*—Jean R. Homere

[57] ABSTRACT

An improved system for database query processing by means of "query decomposition" intercepts database queries prior to processing by a database management system ("DBMS"). The system decomposes at least selected queries to generate multiple subqueries for application, in parallel, to the DBMS, in lieu of the intercepted query. Responses by the DBMS to the subqueries are assembled by the system to generate a final response. The system also provides improved methods and apparatus for storage and retrieval of records from a database utilizing the DBMS's cluster storage and index retrieval facilities, in combination with a smaller-than-usual hash bucket size.

71 Claims, 23 Drawing Sheets

APPARATUS AND METHOD FOR DECOMPOSING DATABASE QUERIES FOR DATABASE MANAGEMENT SYSTEM INCLUDING MULTIPROCESSOR DIGITAL DATA PROCESSING SYSTEM

REFERENCE TO APPENDICES

The disclosure of this patent documemt contains material which is subject to copyright protection. The owner thereof has no objection to facsimile reproduction by anyone of the patent document or the patent disclosure as it appears in the U.S. Patent and Trademark Office patent file or records, but otherwise reserves all copyright whatsoever.

BACKGROUND OF THE INVENTION

This invention relates to digital data processing and, more particularly, to methods and apparatus for database management systems on multiprocessor digital data processing systems.

In addition to performing calculations, computers have traditionally been used to store and retrieve large amounts of data. Early computer systems were typically programmed for this on an ad hoc basis. For example, to track a company's employees, a program was typically written to handle all steps necessary to input, son and store employee data in a computer file and, as necessary, to retrieve and collate it to generate reports. Special-purpose software packages, referred to as database management systems (or "DBMS's"), were later developed to handle all but the highest-level of these tasks.

Among the most widely used database management systems are the so-called relational systems. From an operator's perspective, these store data in two-dimensional tables. For example, each row (or record) of an employee data table might include the following columns (or fields) of information: name of an employee, his or her identification number, address, and department number.

| | | | |
|---|---|---|---|
| . | . | . | . |
| . | . | . | . |
| . | . | . | . |
| Smith | 1056 | 5 Oak Avenue | 10 |
| James | 1058 | 3 State Street | 41 |
| Wright | 1059 | 15 Main Street | 25 |
| . | . | . | . |
| . | . | . | . |
| . | . | . | . |

One or more indexes on large tables are generally provided to facilitate the most common data accesses, e.g., look-ups based on employee name.

In relational systems, corresponding rows in two or more tables are identified by matching data values in one or more columns. For example, the department name corresponding to a given employee may be identified by matching his or her department number to row in a department data table that gives department numbers and department names. This is in contract to hierarchical, network, and other DBM's that use pointers instead of data values to indicate corresponding rows when tables are combined, of "joined."

Relational DBM's typically permit the operator to access information in the database via a query. This is a command that specifies which data fields (columns) are to be retrieved from a database table and which records (rows) those fields are to be selected from. For example, a query for the names of all employees in department 10 might be fashioned as follows:

SELECT name, department_number
FROM employee
WHERE department_number=10

There is no particular ordering of the resulting rows retrieved by the DBMS, unless the query specifies an ordering (e.g.,ORDER BY name).

A query may also involve multiple tables. For example, to retrieve department names instead of numbers, the above query might be refashioned as follows:

SELECT name, department_name
FROM employee, department
WHERE department_number=10
AND employee department_number=department_number A particular relational data table need not be stored in a single computer file but, rather, can be partitioned among many files. This makes such tables particularly suited for use on multiprocessor computer systems, i.e., computer systems having multiple processors and multiple disk drives (or other storage devices) of the type disclosed in U.S. Pat. No. 5,055,999. Unfortunately, prior art DBMS's have not proven capable of taking full advantage of the power of such multiprocessing systems and, particularly, their power to simultaneously process data (in parallel) from multiple partitions on multiple storage devices with multiple central processing units.

In view of the foregoing, an object of the invention is to provide improved methods and apparatus for database management and, particularly, improved methods and apparatus for data base management capable of operating on multiprocessor systems.

A further object of the invention is to provide improved systems for database management capable of effectively accessing a relational database contained in multiple tables and multiple partitions.

A still further object is to provide improved methods and apparatus for storing and retrieving data for access by a DBMS.

These and other objects are evident in the attached drawings and the description which follows.

SUMMARY OF THE INVENTION

The foregoing and other objects are attained by the invention which provides, in one aspect, improvements to digital data processors of the type having a database management system (DBMS) that accesses data records stored in a database table contained among plural independently accessible partitions (e.g., data partitions contained on separate disk drives), where that DBMS has a standard interface for processing queries to access those data records.

The improvement is characterized by a parallel interface that intercepts selected queries prior to substantive processing by the standard interface. The standard interface is often called the "server" interface; it is accessed by clients that are the source of queries. A decomposition element within the parallel interface generates multiple subqueries from the intercepted query. Those subqueries, each representing a request for access to data stored in a respective partition of the table, are applied in parallel to the standard interface in lieu of the intercepted query. Responses by the DBMS to the subqueries are reassembled to generate a final response representing the response the DBMS would have generated to the intercepted query signal itself. Such reassembly can include interleaving the data contained in the responses (e.g., to create a single sorted list) or applying an aggregate function (e.g., sum or average) to that data.

According to a further aspect of the invention, the decomposition element generates the subqueries to be substantially identical to the intercepted signal but including an "intersecting predicate" (i.e., additional query conditions) that evaluates true for all data records in respective partitions of said database table and false for all others. This can be, for example, a logically AND'ed condition that evaluates true for records in the respective partition. Continuing the first example above, assuming that the employee database is partitioned randomly across multiple partitions, a subquery for the first partition could be generated as follows (where rowid has three parts, the last of which indicates the partition number):

```
SELECT name, department_number
FROM employee
WHERE department_number = 10 AND
employee.rowid>=0.0.1 AND
employee.rowid<0.0.2
```

In another aspect, the invention contemplates a further improvement to a digital data processing system of the type described above, wherein the DBMS responds to selected queries for accessing data records joined from one or more of database tables, and wherein the DBMS includes an optimizer for determining an optimal strategy for applying such queries to the tables. The improvement of this aspect is characterized by an element for identifying, from output of the optimizer, a driving table whose partitions will be targeted by subqueries generated in responding to an intercepted query. The improvement is further characterized by generating the subqueries to include, in addition to the predicate list of the intercepted query, an intersecting predicate for all data records in respective partitions of the driving database table. Those skilled in the art will appreciate that tables referenced in the query other than the driving table need not be identically partitioned to the driving table, nor co-located with its partitions on storage devices. Tables may be accessed through either full-table scans or indexed scans, i.e., whether the DBMS searches all blocks of the relevant partition or only those indicated by a relevant index.

According to another aspect, the invention provides an improvement to a digital data processing system of the type described, wherein the DBMS's standard interface is invoked by a procedure or function call. The improvement is characterized by functionality for invoking the parallel interface in lieu of the client-side portion of the standard interface in response to such a procedure/function call. And, by responding to a query for generating plural subqueries in the form of further procedures/functions to the standard server interface. The parallel interface can form part of an object code library for linking with a computer program including procedures/function calls for invoking the DBMS.

In still another aspect, the invention contemplates an improvement to a digital data processing system as described above, wherein the standard interface normally responds to insert/select queries by placing requested data from the database table means in a further database table (i.e., as opposed to merely printing the requested data or otherwise outputting it in text form or merely returning the data to the requesting program). The improvement of this aspect is characterized by generating the plural subqueries so as to cause the DBMS to place the data requested from each respective partition in the designated database table.

In yet another aspect of the invention, a digital data processing system as described above can include functionality for executing multiple threads, or "lightweight processes," each for applying a respective subquery signal to the DBMS's interface element. Those threads can be executed in parallel on multiple central processing units, and can be serviced by multiple server processes within the DBMS that also execute in parallel.

Further aspects of the invention provide improvements to a digital data processing system of the type having a storage element (e.g., a disk drive or other random-access media) for storing and retrieving data records, as well as a DBMS having (i) a hashing element to effect storage of data records in "hash bucket" regions in the storage element, where each record is stored in a root hash bucket region corresponding to a hash function of a selected value of the data record or, alternatively, to effect storage of data records in an overflow hash bucket region associated with that root hash bucket region; and (2) an indexing element to index each stored data record for direct access in accord with a respective value of that data record.

The improvement is characterized by a scatter cluster retrieval element that responds to a request for accessing a data record previously stored via the hashing element, by invoking the indexing element to retrieve that record in accord with the index value thereof, where stored records have previously been indexed by the indexing element with respect to the same fields (columns) used by the hashing element. In a related aspect of the invention, the hashing element stores the data records in hash bucket regions that are sized so as to create at least one overflow hash bucket region per root bucket region, and such that overflow bucket regions for a given root bucket region are distributed roughly evenly across different storage partitions.

Another aspect of the invention provides a digital data processing system of the type described above, in which plural subcursor buffers are associated with each subquery signal for storing results generated by the DBMS's standard interface means in response to that subquery signal. To assemble all results of those subqueries, a root buffer stores a then-current result, while a fetching element simultaneously assembles a final result signal based upon those results currently stored in selected subcursor buffers. As results are taken from each of those buffers, they are emptied. For each such emptied buffer, a subquery is applied to the standard interface asynchronously with respect to demand for that buffer's contents in assembling the final result. In the case of queries involving aggregates, the root buffer stores then-current results in a temporary table to be queried later by an aggregate query generated by the decomposition element.

In still other aspects, the invention provides a method for digital data processing paralleling the operation of the digital data processing system described above; i.e., "transparent" to the DBMS client other than by improved performance.

BRIEF DESCRIPTION THE DRAWING

A better appreciation of the invention may be attained by reference to the drawings, in which FIG. 1 depicts a preferred multiprocessing system used to practice the invention.

Figure 26:
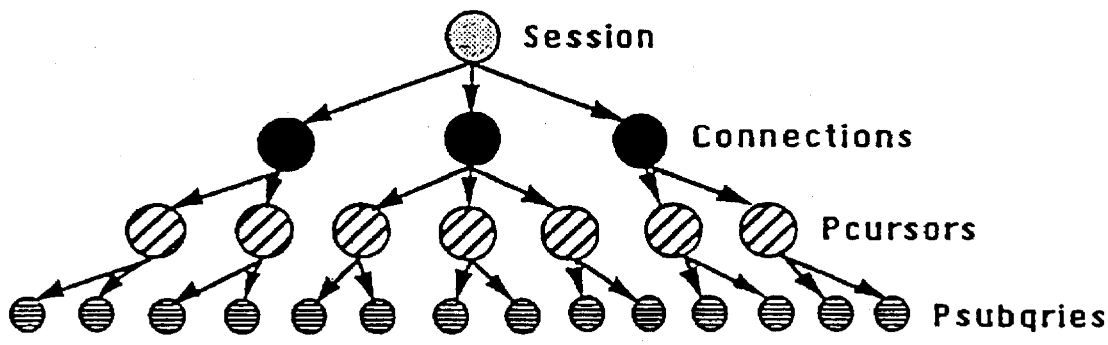
Figure 27:
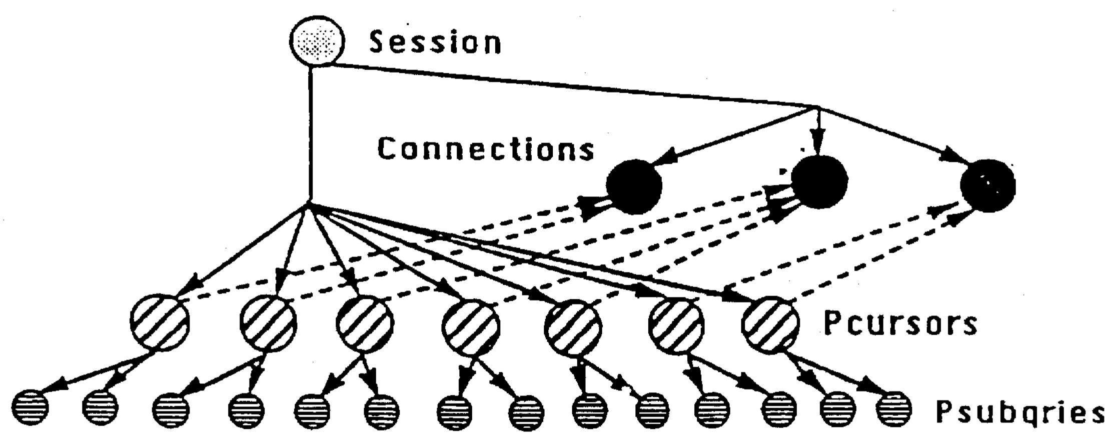

FIGS. 26 and 27 used in connection with the discussion of query decomposition control structures in Database Notes #41.

Figure 28:
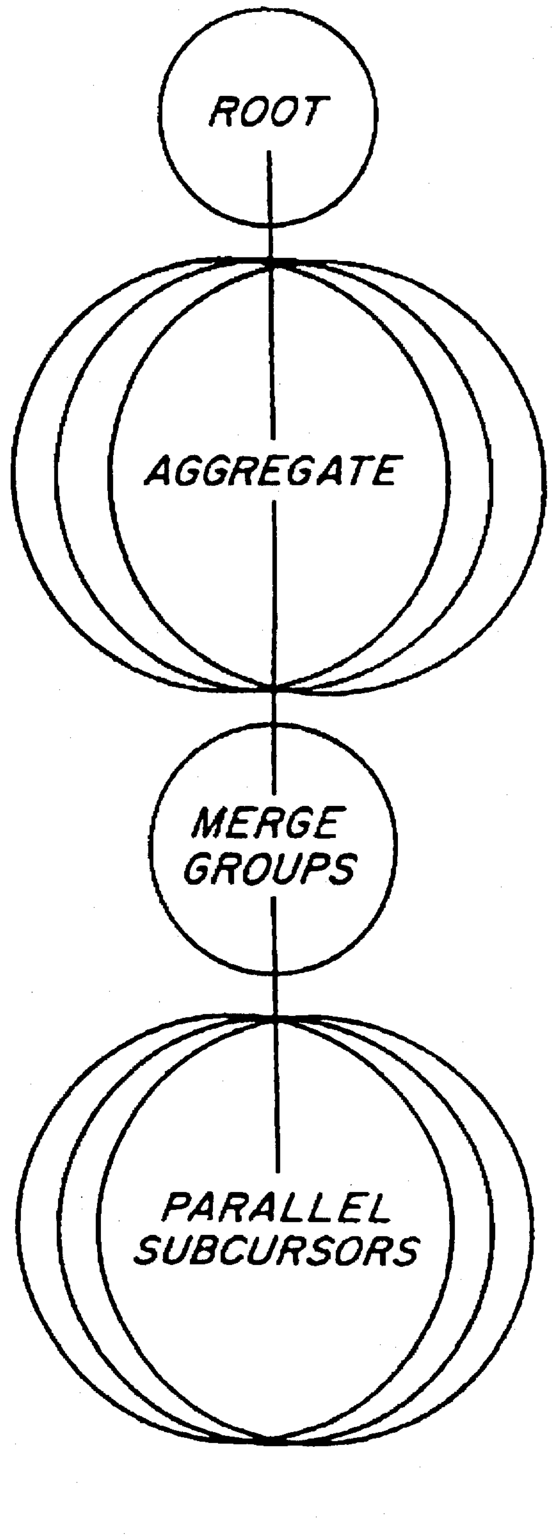
Figure 29:
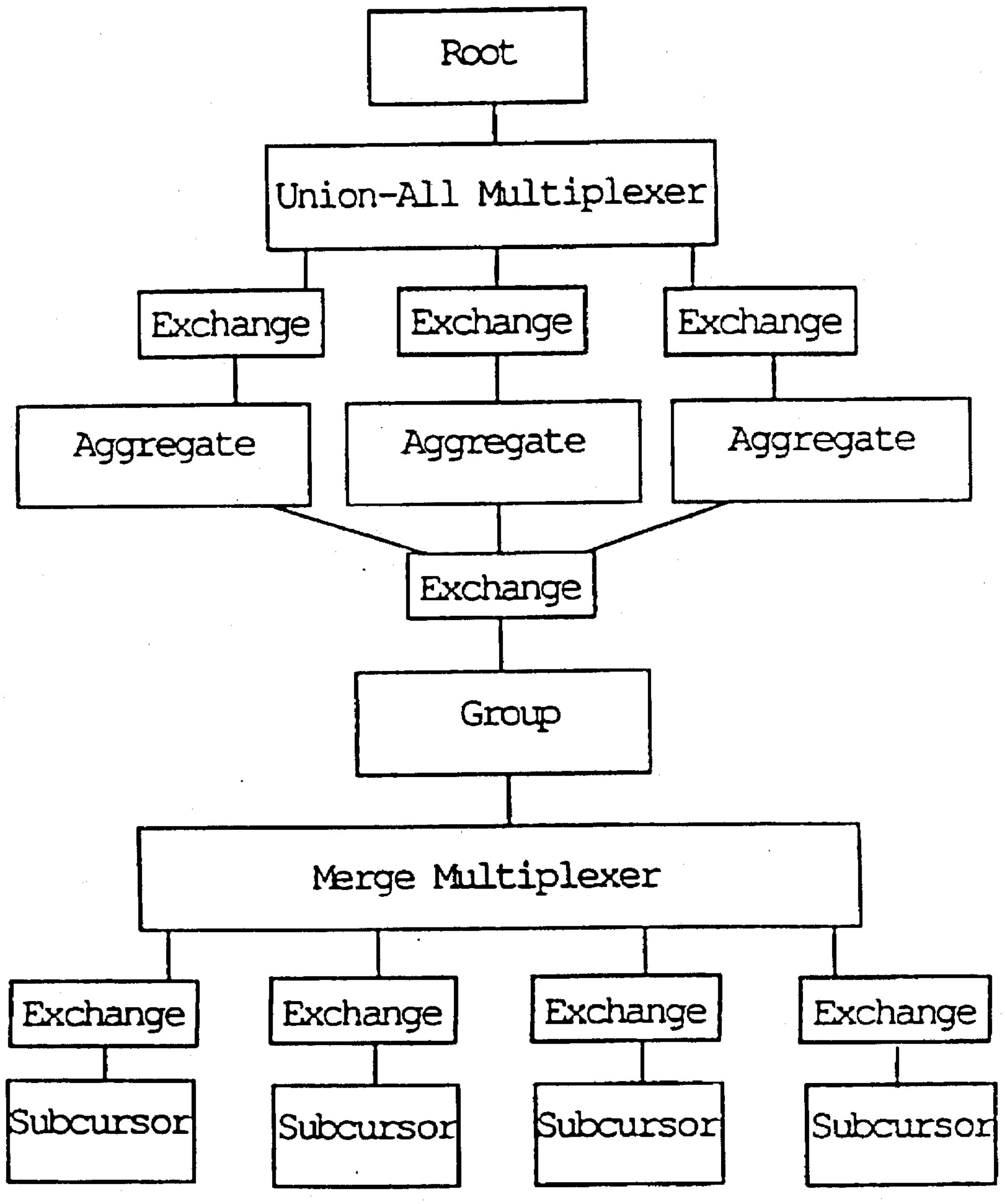
Figure 30:
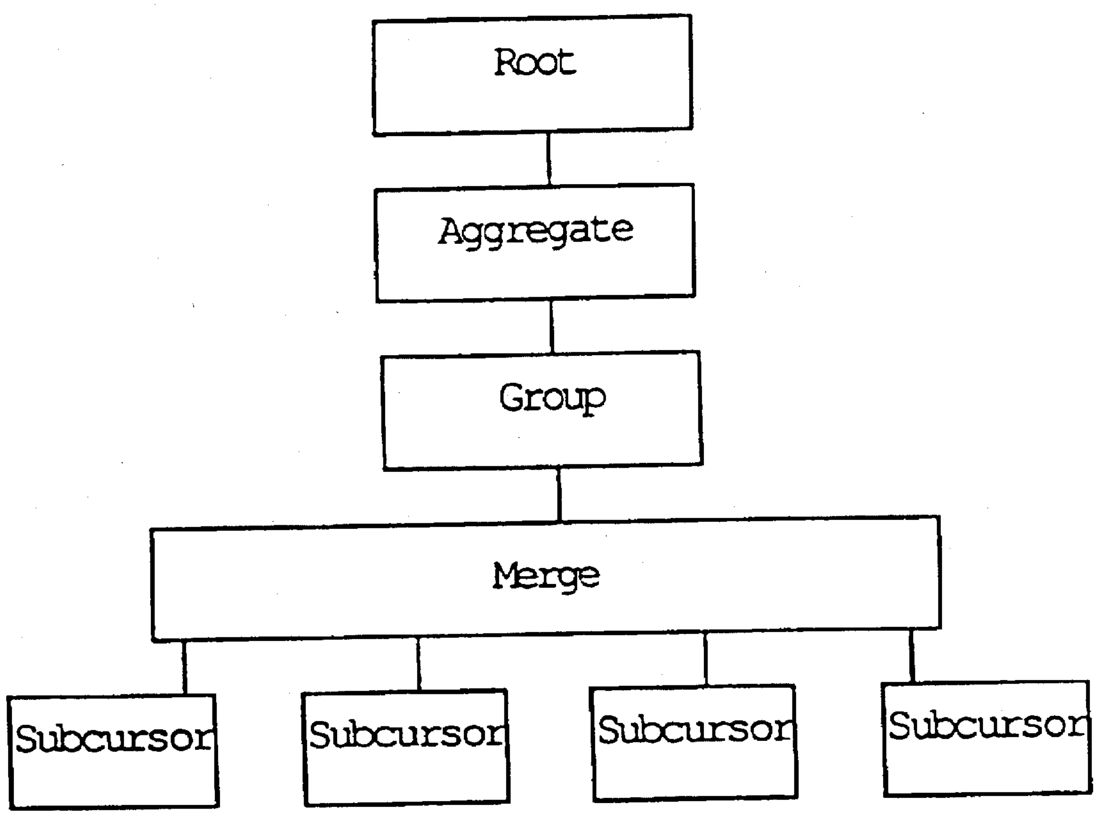

FIGS. 28 through 30 are used in connection with the discussion of upper tree parallelism in parallel cursors in Database Note #42.

DETAILED DESCRIPTION OF THE ILLUSTRATED EMBODIMENT

Figure 1:
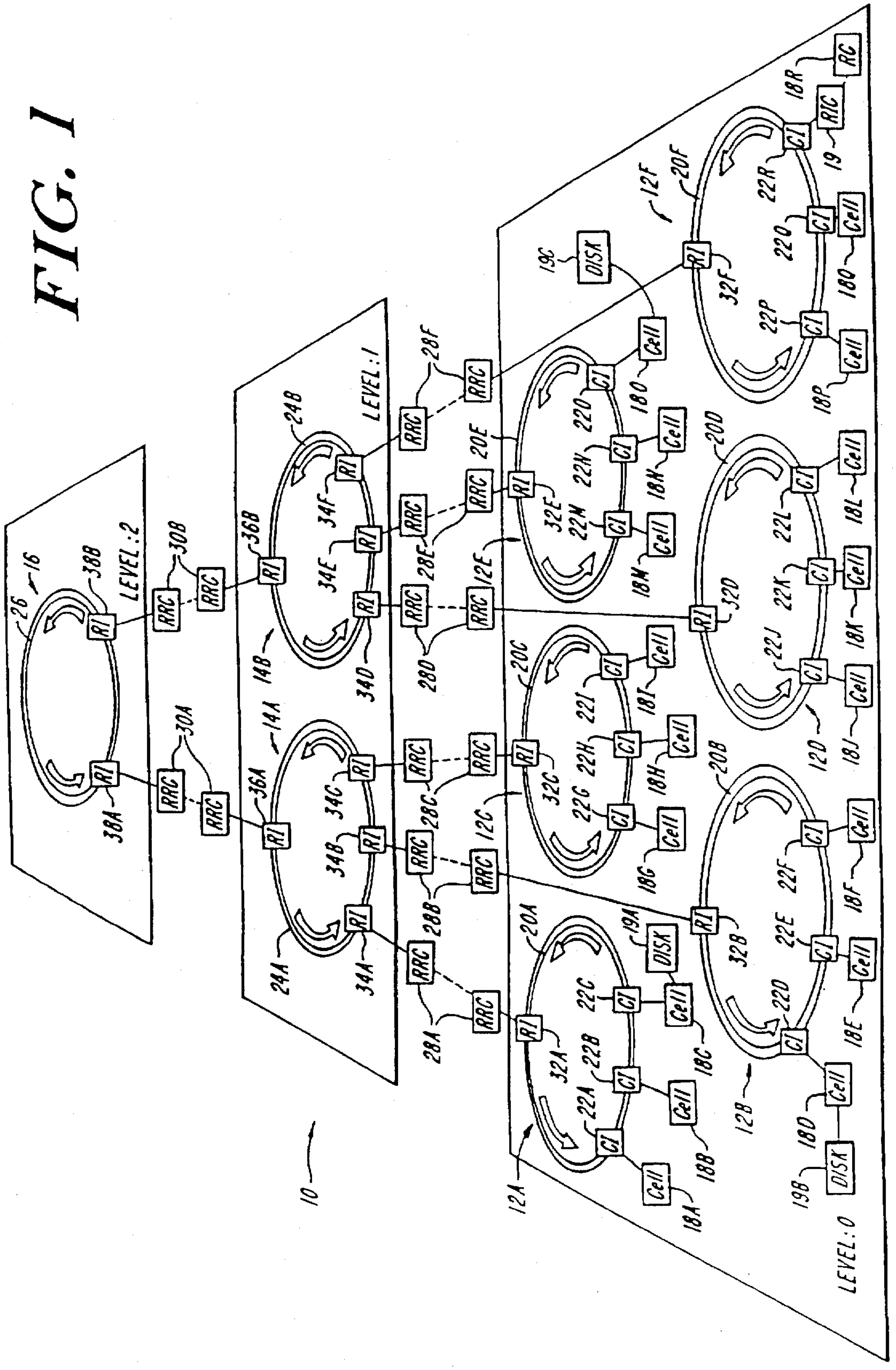

FIG. 1 depicts a preferred multiprocessing system used to practice the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B, . . . 12F, comprise a plurality of processing cells. For example, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

Certain cells of the processing system 10 are connected to secondary storage devices. In the illustrated system, for example, cell 18C is coupled with disk drive 19A, cell 18D is coupled with disk drive 19B, and cell 18O is coupled with disk drive 19C. The disk drives 19A–19C are of conventional design and can be selected from any of several commercially available devices. It will be appreciated that secondary storage devices other than disk drives, e.g., tape drives, can also be used to store information.

Figure 2:
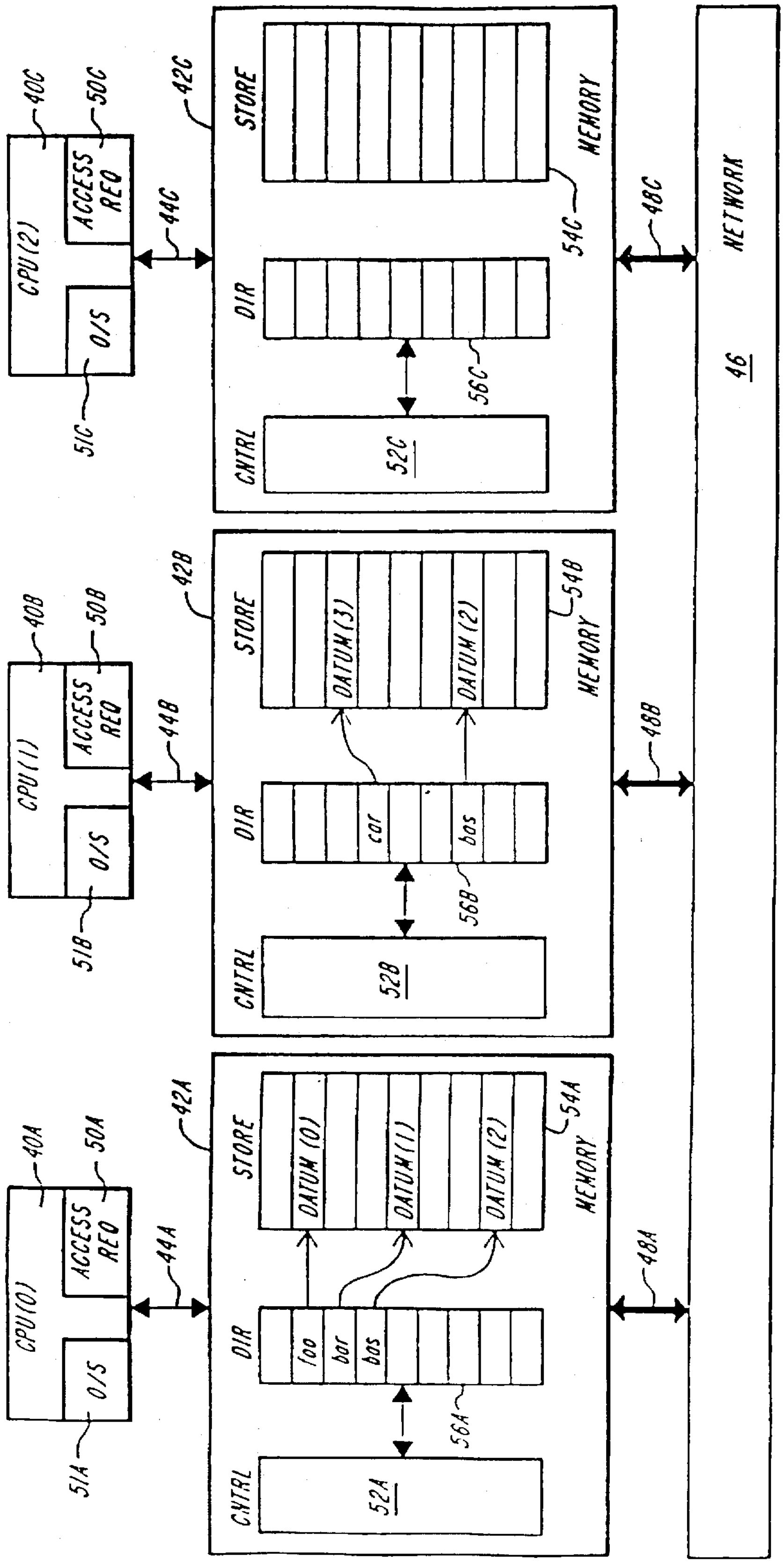
FIG. 2 illustrates in greater detail processing cells and their interconnection within the processing system of FIG. 1.

FIG. 2 illustrates in greater detail processing cells and their interconnection within the processing system of FIG. 1. In the drawing, plural central processing units 40A, 40B and 40C are coupled, respectively, to associated memory elements 42A, 42B and 42C. Communications between the processing and memory units of each pair are carried along buses 44A, 44B and 44C, as shown. Network 46, representing the aforementioned level segments and routing cells, transfers information packets (passed to the network 46 over buses 48A, 48B and 48C) between the illustrated processing cells 42A–42C.

In the illustrated embodiment, the central processing units 40A, 40B and 40C each include an access request element, labeled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The central processing units 40A, 40B, 40C operate under control of an operating system 51, portions 51A, 51B and 51C of which are resident on respective ones of the central processing units. The operating system 51 provides an interface between applications programs executing on the central processing units and the system 10 facilities, and includes a virtual memory management system for managing data accesses and allocations.

A preferred operating system for controlling central processing units 40A, 40B and 40C is a UNIX-like operating system and, more preferably, OSF/1, modified in accord with the teachings herein.

The memory elements 40A, 40B and 40C include cache control units 52A, 52B and 52C, respectively. Each of these cache control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units.

A further appreciation of the structure and operation of the illustrated digital data processing system 10 may be attained by reference to the following co-pending, commonly assigned applications, the teachings of which are incorporated herein by reference:

| Application No. | Title | Filing Date | Attorney Docket |
|---|---|---|---|
| 07/136,930 (now U.S. Pat. No. 5,055,999) | MULTIPROCESSOR DIGITAL DATA PROCESSING SYSTEM | 12/22/87 | KSD-001 |
| 07/696,291 (now U.S. Pat. No. 5,119,481) | MULTIPROCESSOR SYSTEM WITH SHIFT REGISTER BUS | 04/26/91 | KSD-002C2 |
| 07/370,341 | SHARED MEMORY | 06/22/89 | KSD-007 |

-continued

| Application No. | Title | Filing Date | Attorney Docket |
|---|---|---|---|
| (now U.S. Pat. No. 5,297,265) | MULTIPROCESSOR SYSTEM AND METHOD OF OPERATION THEREOF | | |
| 08/100,100 (now abandoned) | IMPROVED MEMORY SYSTEM FOR A MULTIPROCESSOR | 7/30/93 | KSD-007CN |
| 07/370,287 (now U.S. Pat. No. 5,251,308) | IMPROVED MULTIPROCESSOR SYSTEM | 06/22/89 | KSD-007CP |
| 07/521,798 (now U.S. Pat. No. 5,182,201) | DYNAMIC PACKET ROUTING NETWORK | 05/10/90 | KSD-011 |
| 07/763,507 (now abandoned) | PARALLEL PROCESSING APPARATUS AND METHOD FOR UTILIZING TILING | 09/20/91 | KSD-012 |
| 07/499,182 (now U.S. Pat. No. 5,335,363) | HIGH-SPEED PACKET SWITCHING APPARATUS AND METHOD | 03/26/90 | KSD-014 |
| 07/526,396 (now, U.S. Pat. No. 5,226,039) | PACKET ROUTING SWITCH | 05/18/90 | KSD-015 |
| 07/531,506 (now U.S. Pat. No. 5,341,483) | DYNAMIC HIERARCHICAL ASSOCIATIVE MEMORY | 05/31/90 | KSD-016 |
| 07/763,368 (now abandoned) | DIGITAL DATA PROCESSOR WITH IMPROVED PAGING | 09/20/91 | KSD-043 |
| 07/763,505 (now U.S. Pat. No. 5,313,647) | DIGITAL DATA PROCESSOR WITH IMPROVED CHECKPOINTING AND FORKING | 09/20/91 | KSD-044 |
| 07/763,132 (now abandoned) | IMPROVED DIGITAL DATA PROCESSOR WITH DISTRIBUTED MEMORY SYSTEM | 09/20/91 | KSD-045 |
| 07/763,677 (now abandoned) | FAULT CONTAINMENT SYSTEM FOR MULTIPROCESSOR WITH SHARED MEMORY | 09/23/91 | KSD-046 |

Query Decomposition

Figure 3A:
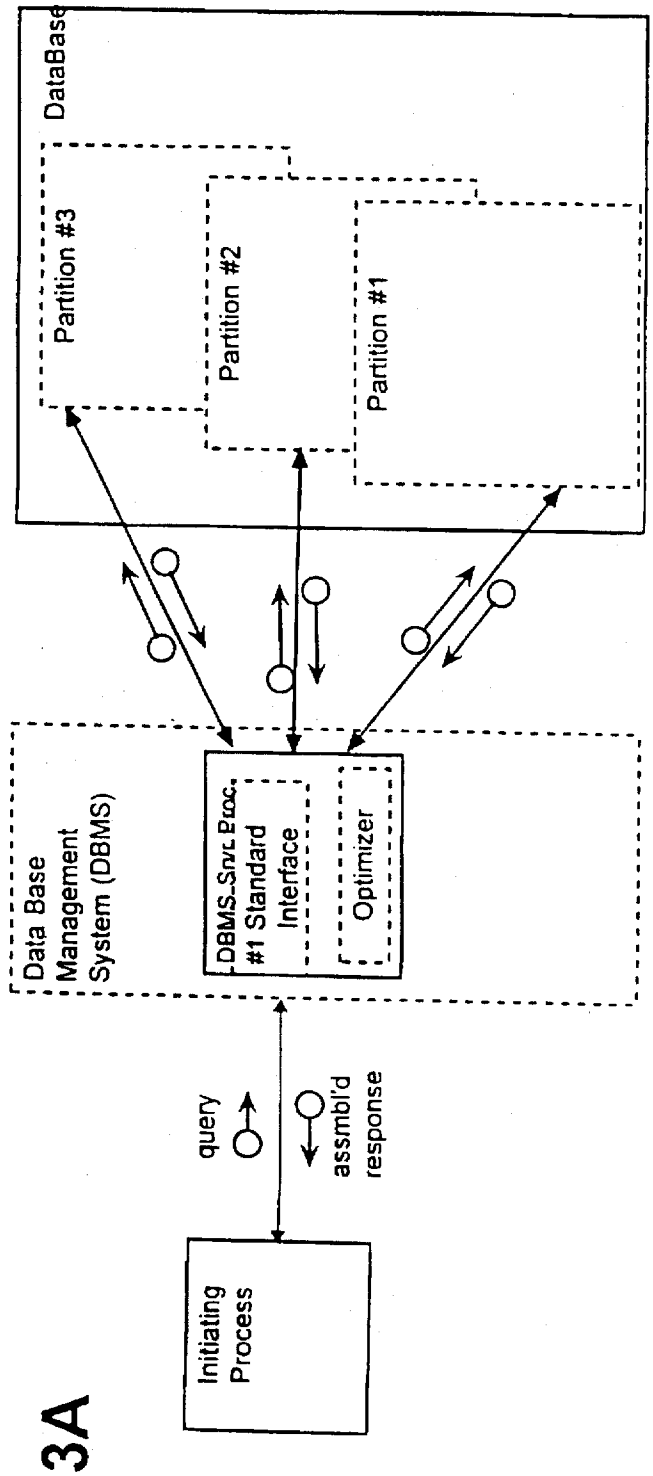
FIG. 3A depicts a standard arrangement of processes and software modules utilized in digital data processor 10 without query decomposition and data access according to the invention.

FIG. 3A depicts a standard arrangement of processes and software modules utilized in digital data processor 10 without query decomposition and data access according to the invention.

Figure 3B:
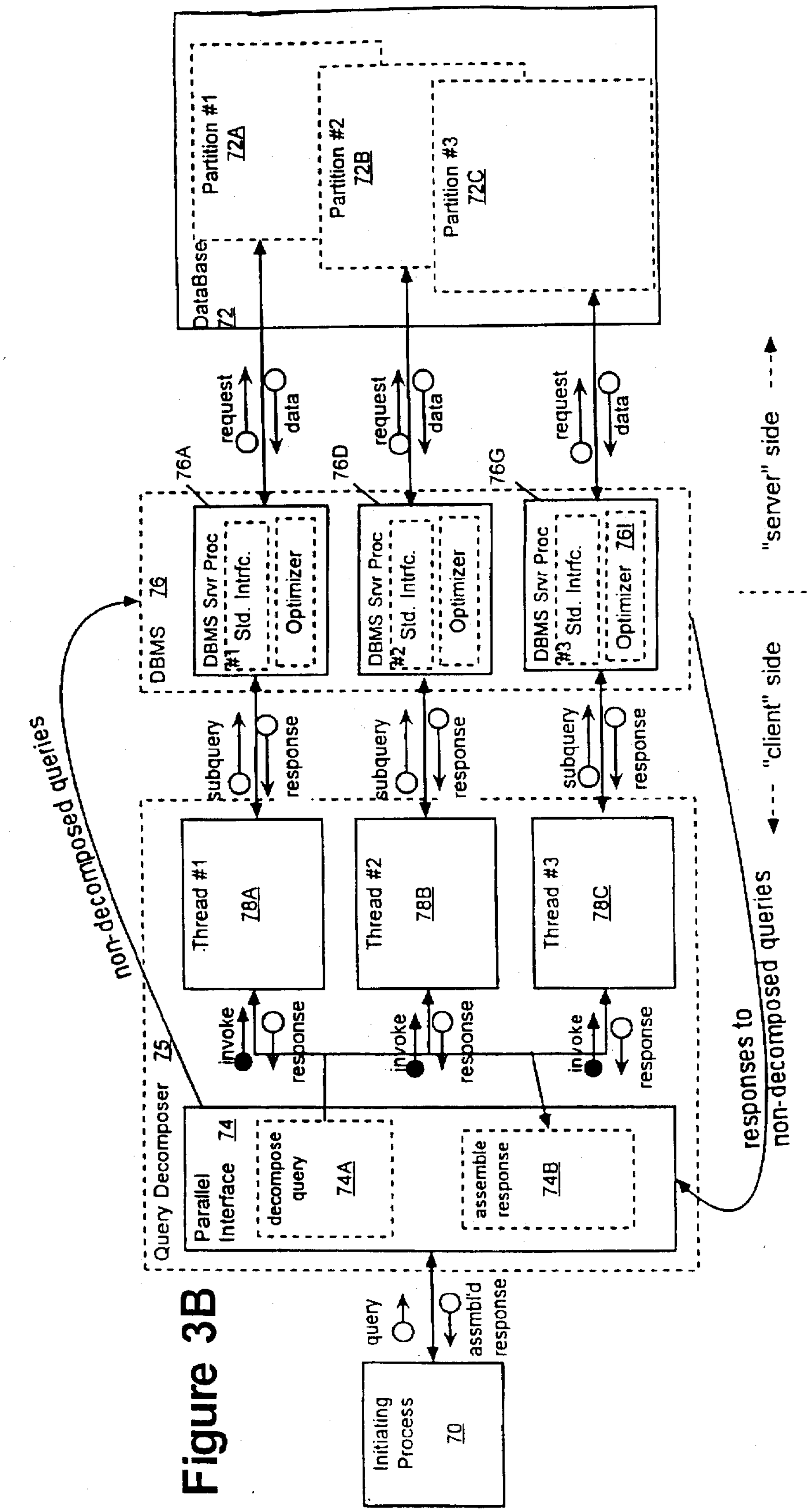
FIG. 3B depicts a preferred arrangement of threads, processes and software modules utilized in digital data processor 10 for query decomposition and data access according to the invention.

FIG. 3B depicts a preferred arrangement of processes and software modules utilized in digital data processor 10 for query decomposition and data access according to the invention. An initiating process 70 generates a query for accessing data stored in relational database 72 having data partitions 72A, 72B, 72C. The query is generated in a conventional format otherwise intended for a conventional DBMS 76. In a preferred embodiment, that conventional format is SQL and that conventional DBMS is the ORACLE 7™ Database Management System (hereinafter, "ORACLE" or "ORACLE Version 7") of Oracle Corporation. Those skilled in the art will appreciate that other DBMS's and query formats may be substituted for the preferred ones without deviating from the spirit of the invention. However, those skilled in the art will also appreciate that a DBMS (such as ORACLE Version 7) used in connection with the preferred embodiments of invention disclosed below must be capable of efficiently running queries that specify "intersecting predicates" against relevant database partitions, i.e., they must avoid searching partitions other than those specified in those predicates.

Rather than being routed directly to DBMS 76, the query is intercepted by the parallel user program interface "PUPI" or "parallel interface"). Element 74A (responsible for decomposing the query) routes queries not susceptible to decomposition to DBMS 76, but for a decomposable query it generates a set of subqueries, each of which is based on the initial query but which is directed to data in one or more respective of the partitions 72A, 72B, 72C of database 72. Then element 74A initiates and invokes threads 78A, 78B, 78C, which initiate execution of the subqueries. The subqueries corresponding to threads 78A, 78B, 78C are routed to the user program interface ("UPI" or "standard interface") of DBMS 76 (in lieu of the intercepted query), as shown in the drawing. Multiple subqueries are preferably applied to the UPI of DBMS 76 in parallel with one another, thus capitalizing on the database partitions and on the multiprocessing nature of the preferred digital data processing system 10. Each thread routes its subquery to a separate server process in DBMS 76.

The DBMS 76 responds in the conventional manner to each subquery by generating appropriate requests (e.g., a disk read) for access to the database 73 and, particularly, for access to respective partitions of that database (unless the data requested is already in memory). Data retrieved from the database 72 in response to each subquery is processed in the normal manner by DBMS 76 and is routed to processes 76A, 76D and 76G. Those responses, in turn, are routed to parallel interface assembly section 74B which assembles a response like that which would have been generated by the DBMS 76 had the intercepted response been applied directly to it. The assembled response produced by assembly section 74B is generally returned to the initiating process 70 more quickly than that which would have been generated by the DBMS 76 had the intercepted query been applied directly to it. This is a consequence of decomposition of the intercepted query and its parallel application to the UPI of DBMS 76. It is also a consequence of the architecture of the underlying multiprocessor, which permits multiple server processes to run simultaneously. Though it will be appreciated that, even when running on a uniprocessor, the concurrent execution of multiple subqueries could speed access where there is overlapping I/O and CPU processing.

As noted above, the decomposer 74A generates subqueries based on the conventional-format query intercepted from the initiating process. For simple, single-table queries, the decomposer 74A generates corresponding subqueries by duplicating the query and appending a predicate for matching records in the corresponding table partition. Thus, for example, a query in the form

```
SELECT name, department_number
FROM employee
WHBRE department_number = 10
```

would result in the first subquery of the form:

```
SELECT name, department_number
FROM employee
WHERE department_number = 10 AND
employee.rowid>=0.0.1 AND
employee.rowid<0.0.2
```

where rowid has three parts, the last of which indicates the partition number. Other subqueries would be of similar form, with changes to the partition numbers referenced in the rowid predicates.

For queries joining two or more tables, the decomposer 74A generates corresponding subqueries by duplicating the query and appending a predicate for matching records in the corresponding table partition of the driving table, which is selected by the decomposer 74A based on the access strategy chosen by the query optimizer portion 76B of the DBMS 76. Those skilled in the art will appreciate that information from the optimizer 76B, including possible tables to be chosen as the driving table, can be obtained from data files generated by the DBMS 76 in connection with the query, and accessed by use of the "EXPLAIN" command.

Figure 4:
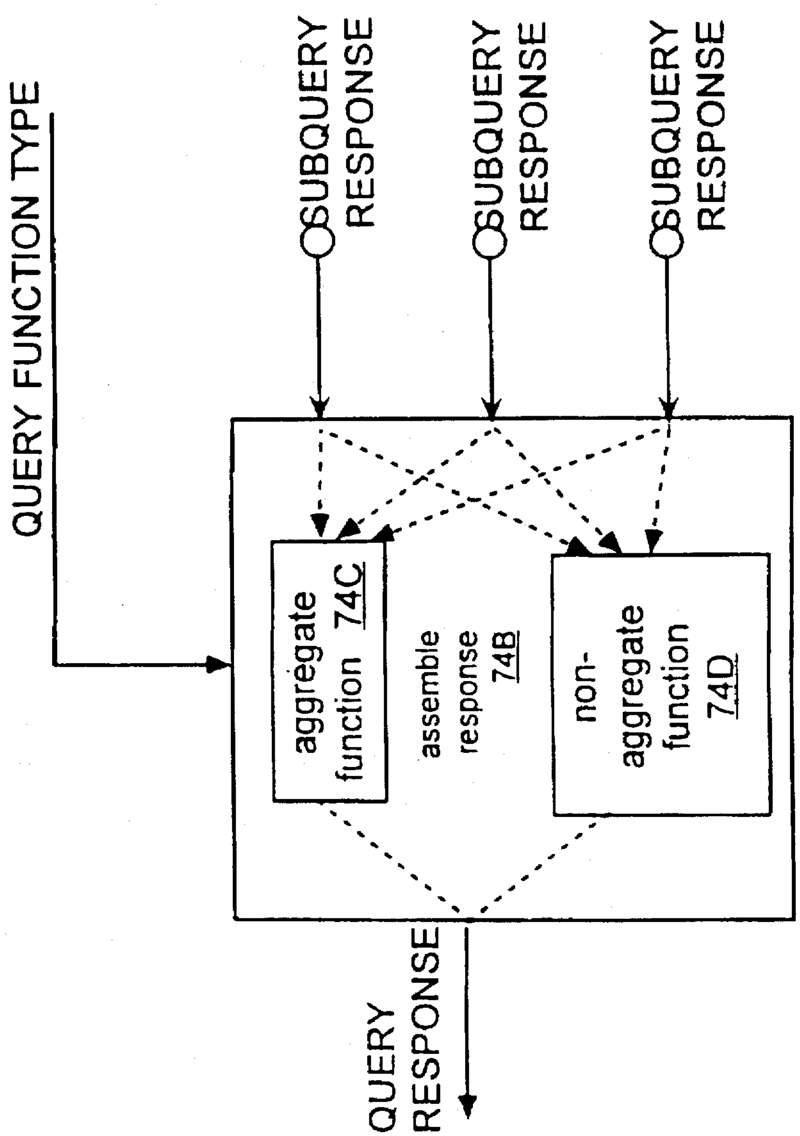
FIG. 4 shows the operation of assembler 74B on results generated by the DBMS 76 and threads 78A, 78B, 78C in response to the subquery signals.

FIG. 4 shows the operation of assembler 74B on results generated by the UPI of DBMS 76 and threads 78A, 78B, 78C in response to the subquery signals. More particularly, the drawing shows that for intercepted queries that call for aggregate data functions, element 74C performs a like or related data function of the results of the subqueries. Thus, for example, if the intercepted query seeks a minimum data value from the database table—and, likewise, the subqueries seek the same minimum value from their respective partitions—then element 74C generates a final result signal representing the minimum among those reported to the assembler 74B by the DBMS 76 and threads 78A, 78B, 78C.

Likewise, if the intercepted query seeks an average value from the database table—and, likewise, the subqueries seek a sum and a count from the respective partitions—then element 74C generates an average table value through a weighted average of the reported subquery results. Moreover, if the intercepted query seeks a standard deviation or variance from the database tables, the decomposer 74A generates subqueries requesting related functions of the data, e.g., the sum, count and sum of the squares of the data.

Such aggregate processing is preferably applied to, for example, intercepted queries requesting (i) a minimum or maximum of an item in the records (ii) an average of selected items, (iii) a standard deviation and variance of selected items, and (iv) a sum and a count of selected items.

As further shown in FIG. 4, for intercepted queries that call for non-aggregate data functions, element 74D generates a final result signal by interleaving the results of the subqueries. For example, if the intercepted query seeks a sorted list of data values from the database table—and, likewise, the subqueries seek sorted lists from their respective partitions—then element 74D generates a final result signal by interleaving (in the specified sort order) the items presented in the results reported to the assembler 74B by the DBMS 76 and threads 78A, 78B, 78C. Other non-aggregate queries involving, for example, (i) a distinct value of an entire result row, (ii) a nested selection of items, and/or (iii) a correlated selection of items are processed accordingly.

For queries that combine aggregate and non-aggregate functions, a combination of elements 74C and 74D are invoked.

For queries involving grouping operations, the decomposer 74A generates corresponding subqueries by duplicating the query, along with the grouping clause in its predicate list. For each group, data retrieved by the DBMS in response to those subqueries is placed in a temporary table. For that group, the assembly section 74B generates and passes to the DBMS a "group by" combining query to be applied to the temporary table. The results of those queries are returned to the initiating process 70 in lieu of the response that would have been generated by the DBMS 76 had the intercepted query been applied directly to it.

For queries involving grouping operations and including a "having" clause, the decomposer 74A and assembly section 74B operate in the manner describe above, except, that the "having" clause is not included in the subqueries. That clause is, however, incorporated into the combining queries that are executed on the temporary table.

Figure 5:
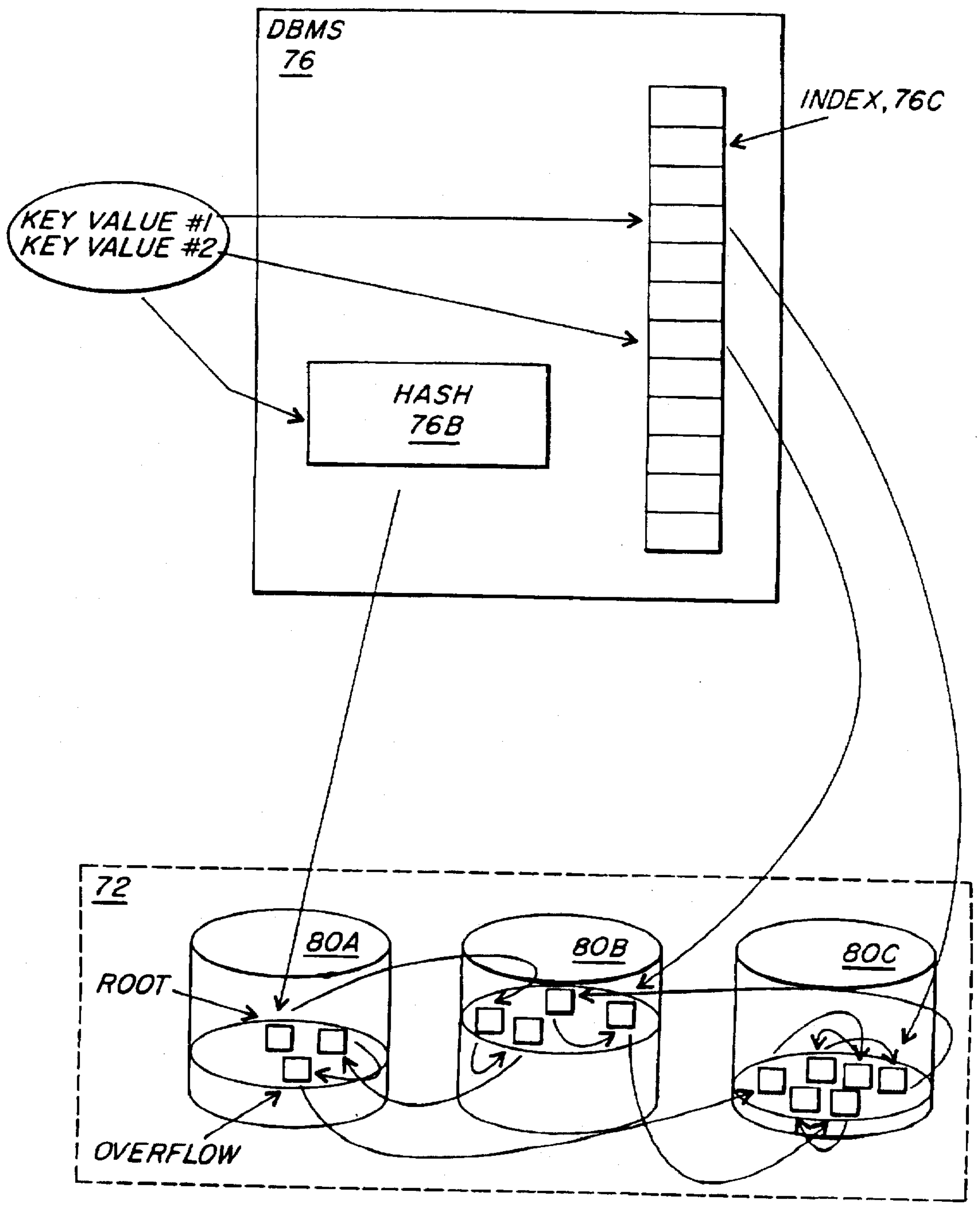
FIG. 5 depicts a preferred mechanism, referred to as "scatter clustering," for storing and retrieving data from database 72.

FIG. 5 depicts a preferred mechanism, referred to as "scatter clustering" or "small bucket hashing," for storing and retrieving data from database 72. The mechanism combines cluster-storage and index-access techniques to disperse and retrieve data records from storage media 80A, 80B, 80C (e.g., disk drives) upon which database 72 is contained. Data records are stored using the DBMS's 76 cluster-storing capabilities, based on a conventional hash function of its key value (as generated by element 76B), and using a smaller-than-normal bucket size chosen to insure that at least one overflow hash bucket will be created for each root bucket. More preferably, the bucket size is chosen to insure that hash buckets are spread over storage devices to maximize the potential for parallel access. Each stored record is simultaneously indexed for direct access in accord with the same key value(s) used by the hash function.

In operation, the DBMS 76 responds to requests to store data records by invoking the hashing element 76B to store those data records in accord with a hash on their key values. The DBMS 76 also populates index 76C by invoking DBMS's 76 corresponding indexing functionality. When accessing data records, the decomposer 74A generates subqueries specifying that requested data records are to be accessed via the index element **76*c*, not the hashing element 76*b***.

It will be appreciated that, to maximize the performance of the system depicted in FIG. 3B, the database 72 is organized to achieve the best mix of I/O parallelism and hit ratio. Generally, the greater the former (I/O parallelism), the more threads 78A, 78B, 78C can be used, in parallel, to initiate data retrievals. The greater the latter (hit ratio), the greater the number of relevant records each thread 78A, 78B, 78C gets with each retrieval.

Traditional indexed access schemes lend themselves to high degree of I/O parallelism, but low hit ratio. Parallelism is good because new records are allocated randomly in the physical disk structure. The hit ratio is low, however, because each disk access is likely to get little more of interest than the specific record sought (i.e., the data in neighbors of any given record are unlikely to have any relationship to the data in the given record).

Traditional hashing schemes are generally of low I/O parallelism, but have a high hit ratio. Parallelism is low because most of the data with a given key value is stuffed into just a few buckets: the root and a few necessary overflows. The hit ratio is high, however, because each disk access will get several records of related data (i.e., the neighbors of any given record are likely to be related to the data in the given record).

By combining the DBMS's 76 indexing and hashing mechanisms in the manner described above, the aforementioned scatter clustering technique achieves a good mix of I/O parallelism and hit ratio. It does this by storing the data records using the DBMS's 76 hash-based storage techniques with abnormally small bucket size, thereby distributing small bucket-size clusters of related information around the disk, and by retrieving the data using the DBMS's indexing mechanism.

Those skilled in the art will, of course, appreciate that the invention contemplates operating on database tables with any plurality of partitions. And, that the invention contemplates using any plurality of subqueries (and corresponding threads) to execute retrievals against those partitions. Moreover, it will be appreciated that the invention does not require that the number of partitions and subqueries be identical. Preferably, the number of subqueries (and threads) is an integral divisor, greater than one, of the number of partitions. Thus, for example, three subqueries can be beneficially run against six partitions.

The sections which follow discuss the design considerations of the illustrated preferred embodiment of the invention, to wit, a system hereinafter referred to as the "Query Decomposer" or "QD" for parallelizing decision support queries for use on a multiprocessor system of the type shown in FIG. 1 (and commercially available from the assignee hereof, Kendall Square Research Corporation) in connection with version 7 of the ORACLE™ database management system (which is commercially available from Oracle Corporation and can be adapted for operation with a number of computer systems, including the Kendall Square Research Corporation multiprocessors). Each of the sections which follow is identified by a "Database Note Number" (or DBN #). Those identifications are used to cross-reference the sections, typically, in lieu of their titles. The inventors are alternatively referred to as "we," "I," "KSR," and other like terms.

Notwithstanding the grammatical tense of the sections which follow, those skilled in the art will attain the requisite understanding of the invention and the disclosed system upon reading the sections which follow in connection with the other portions of this patent application. In this regard it will also be appreciated that when the text of the section refers to material "below" or "above," such reference is typically with respect to material contained within that section itself.

Those skilled in the art will attain from study of the sections that follow, not only an appreciation of the workings of an exemplary, preferred illustrated embodiment, but also of its application to other computer systems and DBMS's.

In this regard a still better appreciation of a preferred embodiment of the invention may be attained by reference to the software appendices filed herewith.

The sections which immediately follow overview the operation and use of a preferred query decomposition system according to the invention.

Chapter 9 ➤ KSR QD Product Overview

The KSR Query Decomposer (KSR QD) is a separate software component developed by Kendall Square Research. It interacts with the underlying implementation of ORACLE7 and leverages the parallelism of KSR/Series computers to greatly speed the execution of decision-support queries. KSR QD is designed for complex queries executed over large databases. A query that might otherwise be a bottleneck to your production can be executed in a reasonable timeframe using query decomposition. Decision-support data can be available in time to react much more quickly to changes in your environment.

Figure 6:
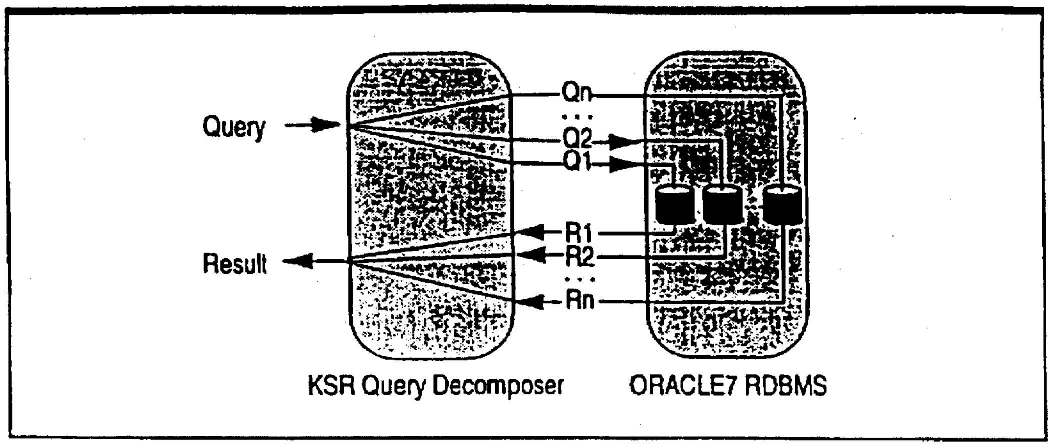
FIGS. 6 and 7 are used in connection with the discussion of the operation and use of a preferred query decomposition system according to the invention.

KSR QD works in conjunction with the underlying ORACLE7 RDBMS to automatically parallelize SQL queries. Fig. 6 ~~UM9-1~~ shows the basic steps of query decomposition:

(SEE FIG. 6 ~~UM 9-1~~)

Basic Steps in Processing Flow

1. You submit a query according to your normal operating procedures.
2. KSR QD intercepts it and generates subqueries against existing data partitions on disks.
3. Subqueries are executed in parallel.
4. KSR QD combines results.
5. You receive the results of your query.
6. You see no operational changes; all activity occurs transparently to you.

9.1 The KSR Query Decomposer Implementation

KSR QD is compatible with the ORACLE architecture (transparent to your applications), while at the same time leveraging ORACLE's existing optimization strategies.

Fig. UM9-2 is a conceptual view of the ORACLE program interface. The UPI (User Program Interface) is the common point of access to the ORACLE kernel for all applications.

(SEE FIG. ~~UM 9-2~~ 7)

The KSR QD implementation sits between the UPI external interface and the UPI program library, transforming a serial interface into a parallel one.

When a query is submitted to ORACLE, KSR QD intercepts it before it reaches the serial UPI library code and does the following:

- Analyzes whether query decomposition is likely to provide performance enhancement
- Decides on the optimal decomposition strategy by analyzing the ORACLE optimizer's execution plan

- Creates the necessary parallel structures to control the decomposition
- Uses multiple, coordinated connections to the database server
- Creates a temporary table for each query, if there is an aggregate function
- Manages the implementation via multiple calls to the UPI library
- Combines subquery results and passes them to the user Decisions made automatically by KSR QD include the following:

- The number of subqueries
- The choice of the table whose partitions "drive" the subqueries (the partitioning table)
- The minor query transformations to handle aggregate functions
- The method of combining subquery results

KSR QD Is Transparent

KSR QD will not notify you whether your query was decomposed, because everything is meant to happen transparently—unless you want it to be otherwise. If you want more details, you should issue an EXPLAIN PLAN command to see the actual execution plan for your query. If it is being decomposed, a row of the execution plan will be labeled KSR PARALLEL EXECUTION. For further information, see Section 11.4.

9.2 Kendall Square Query Decomposition Examples

End users do not need to be aware of KSR Query Decomposer activities. The database administrator, however, must set up a default environment that enhances the performance of queries normally issued in your application environment. The DBA's most important step is to distribute data in a way to take advantage of the parallelism provided by KSR QD.

First Step Is Data Partitioning

KSR QD parallelizes a query by dividing it into subqueries, each of which uses a `rowid` range predicate on the driving table to specify one or more files to which that query's reads will be restricted. The approach depends on partitioning tables across files on multiple disk drives, so the files can be read in parallel.

Using existing ORACLE data-striping techniques, the DBA partitions large database tables over multiple disks to maximize parallel reads from disk. There may be tens or even hundreds of partitions for a given table. This is described in Chapter 10.

Ordinarily, the DBA partitions tables across many drives to take advantage of the parallelism of KSR/Series computers with KSR QD; however, a simple example is easier to visualize:

Example 1

If the table EMP is partitioned across three files with ORACLE file identifiers 1, 2, and 3, the following query:

```
SELECT * FROM EMP
```

can be decomposed into three subqueries:

```
SELECT * FROM EMP WHERE ROWID >= '0.0.1' and ROWID < '0.0.2'
SELECT * FROM EMP WHERE ROWID >= '0.0.2' and ROWID < '0.0.3'
SELECT * FROM EMP WHERE ROWID >= '0.0.3' and ROWID < '0.0.4'
```

The only change in the subqueries is the addition of the rowid range predicates. The first subquery will read only the blocks of the EMP table which are in file 1; the second, file 2; the third, file 3. This is an example of decomposing a full-table scan. The overall query needs to read all blocks of the table, and you gain near-linear speedup by reading the separate files across which the table is partitioned in parallel. The total number of reads is not changed, but they occur in parallel.

Example 2

Query decomposition also can work with queries that use an index. Suppose you have the following query:

```
SELECT * FROM EMP WHERE DEPTNO = 5
```

and there is an index on DEPTNO. This can be decomposed similarly to the first example:

```
SELECT * FROM EMP WHERE DEPTNO = 5 AND ROWID >= '0.0.1' and ROWID < '0.0.2'
SELECT * FROM EMP WHERE DEPTNO = 5 AND ROWID >= '0.0.2' and ROWID < '0.0.3'
SELECT * FROM EMP WHERE DEPTNO = 5 AND ROWID >= '0.0.3' and ROWID < '0.0.4'
```

Again, the only change in the subqueries is the addition of rowid range predicates. The subqueries read the index blocks concurrently and process them in parallel. Index blocks are cached, so the index blocks should be read in from disk only once. When a subquery finds an index entry for DEPTNO 5, however, it will examine the rowid stored in that index entry to see whether it falls within the range for that subquery. Only if it does will that subquery read the data page containing the row with that DEPTNO value and rowid.

Distribution of Files

Both full-table-scan query decomposition and indexed-scan query decomposition rely on good distribution of target data across the files of a partitioned table for their effectiveness. For full-table scans, each file should ideally contain an equal proportion of the total blocks of the table, even when the table has been loaded only to a fraction of its capacity. In addition, for indexed scans, rows with duplicate key values or rows with adjacent values of a unique key, should be scattered among the partitioning files, rather than contained within one or a few files.

The design of your database is a strategically important first step in being able to take advantage of the parallelism provided by KSR QD. Chapter 10, "Database Administration for KSR QD" provides the specifics of how to configure a database. Note your applications do not need to be changed to work with KSR QD. In particular:

- Logical database design need not be changed.
- Physical database design is slightly different, in that large tables should be striped across disks by the DBA, with one table partition per disk drive.

9.3 Terms and Concepts

Driving Table In a query that joins multiple tables, the table which ORACLE uses to "drive" the joins. Rows from the driving table that satisfy non-join criteria are retrieved, and ORACLE uses values from these rows to determine which rows to retrieve from the other tables.

Execution Plan The sequence of steps the optimizer chooses to execute an SQL statement. The EXPLAIN PLAN command allows you to examine the execution plan.

ORACLE optimizer The component of ORACLE whose goal is to choose the most efficient way to execute an SQL statement

Parallel Subquery One of the several queries into which an ORACLE query is decomposed by KSR QD. These are executed in parallel and are identical, except each retrieves rows from a different partition (or set of partitions) of the partitioning table of the query.

Partitioned Table A table whose data resides in multiple files, deployed across multiple disks. A table must be partitioned to be used as a partitioning table by KSR QD.

Partitioning Table In a query that joins multiple tables, the table whose partitions KSR QD uses to decompose a query into multiple parallel subqueries. In the current release of KSR QD, this is always the driving table of the query, chosen by the ORACLE optimizer.

9.4 KSR QD Features

Query Constructs Supported Queries with the following constructs will be decomposed by KSR QD and executed as a set of parallel subqueries:

- Joins — equijoins, nonequijoins, outer joins, cartesian products

- Queries with an ORDER BY clause
- Queries with a GROUP BY clause
- Queries with a HAVING clause
- Queries with aggregates (all aggregates, including STDDEV and VARIANCE)
- Queries with nested aggregates (for example, `avg(count(*))`)
- Queries with SELECT DISTINCT (with or without ORDER BY)
- Queries containing subqueries (including correlated subqueries)
- Queries containing host variable references

- Queries with both ORDER BY and GROUP BY
- Queries with INSERT/SELECT clauses

- Queries referencing views
  - The query can contain only one view reference.
  - The view definition must not contain a GROUP BY clause, an aggregate function, or any construct not listed above.
  - The user must have SELECT privilege for the underlying tables of the view.
  - Since ROWID is not directly visible through most views, you must define your view to have explicit columns and name them as a concatenation of the underlying table and the word rowid. For example:

```
create view emp_dept_view
(empno, empname, deptno, deptname, salary, emprowid, deptrowid)
as
select empno, empname, emp.deptno, deptname, salary,
emp.rowid,dept.rowid
from emp, dept
where emp.deptno = dept.deptno;
```

If a query is submitted with constructs other than those listed above, the query will be executed serially as usual, without decomposition. KSR QD will not alert you as to whether decomposition has taken place. You will receive the results of your query without any interrupting messages. KSR QD always runs transparently to your operation.

ORACLE Products Supported

KSR QD supports the following products in a local client/server environment:

- Pro*C
- Pro*COBOL
- SQL*Plus

Other KSR QD Features

For a thorough discussion of KSR QD features, see Chapter 11, "The User Interface to KSR QD."

Chapter 10 ➤ Database Administration for KSR QD

KSR QD is a separate software component that interacts seamlessly with ORACLE for KSR. It is developed and distributed by Kendall Square for use on KSR/Series computers. KSR QD is not expected to impact general database administration procedures.

The DBA's involvement is necessary initially to do the following:

- Ensure the ORACLE installation includes KSR QD components and KSR QD files in the correct directories.
- Run the SQL scripts creating the tables and views necessary for KSR QD operation.
- Ensure the initial KSR QD setup is tailored to the needs of your application environment.

Later, the DBA may be involved intermittently with application developers to do the following:

- Help customize the KSR QD environment to optimize particular applications.
- Help in problem determination and system cleanup if errors occur.

To assist with the above functions, this chapter is structured into three sections:

- Section 10.1, "General KSR QD Start-up Information" — This section provides information for performing a post-installation assessment to make certain all KSR QD files are in place. It provides a procedure to establish the views and tables necessary for KSR QD operation.
- Section 10.2, "Database Configuration" — This section leads you through the process of configuring your database to take advantage of the performance enhancement provided by KSR QD. Helpful strategies also are provided.
- Section 10.3, "Problem Determination" — This section describes procedures that will be necessary if an error should occur.

10.1 General KSR QD Start-up Information

10.1.1 KSR QD Files

The following two sets of files are specific to the KSR QD implementation. They are placed in the identified directories by the ORACLE installation process.

KSR QD Versions of ORACLE Files

The following files are KSR QD versions of ORACLE files:

| | |
|---|---|
| `libora.qd.a` | This is a customized `libora.a` file containing all the KSR QD code. There are KSR QD modules and modified UPI modules in this copy of the library. It is located in `$ORACLE_HOME/lib`. |
| `sqlplus.qd` | This is SQL*Plus built with KSR QD linked in. It is located in `$ORACLE_HOME/bin`. |

Chapter 9, "KSR QD Product Overview" describes how KSR QD is related to the ORACLE UPI. The programs comprising the UPI normally are found in the `libora.a` library. The `libora.qd.a` file in your distribution is the modified ORACLE `libora.a` file containing KSR QD code. The `sqlplus.qd` executable you received was linked with this modified `libora.qd.a` file. Any new applications automatically will include KSR QD when they are built with `libora.qd.a`.

Files Needed for KSR QD

These are other files needed for KSR QD:

| | |
|---|---|
| `catksrqd.sql` | Script for creating `KSR_ALL_TABLE_FILES` view (see Section 10.1.2) |
| `ksr_disable_qd.sql` | Script to disable KSR QD for a given database |
| `ksr_enable_qd.sql` | Script to (re)enable KSR QD for a given database |
| `ksrxplan.sql` | Script for creating `KSR_PLAN_TABLE` (see Section 10.1.2) |
| `qdcleanup` | A utility to remove KSR QD intermediate tables (see Section 10.1.4) |

The `.sql` scripts are installed in `$ORACLE_HOME/rdbms/admin`. `qdcleanup` is located in `$ORACLE_HOME/bin`.

10.1.2 System Tables and Views

➤ `KSR_ALL_TABLE_FILES` — This view must exist in a database for query decomposition to be possible. It permits KSR QD to get a count and list of the files into which a given table is partitioned. It is owned by `SYS` and must have `SELECT` privilege granted to `public` (or, at the DBA's discretion, only to those users permitted to use KSR QD). It is created, with appropriate grants, by the SQL script `$ORACLE_HOME/rdbms/admin/catksrqd.sql`, which is run as part of database creation.

- KSR_PLAN_TABLE — This is the default plan table for the temporary execution plans generated by KSR QD when it calls EXPLAIN PLAN. This plan table has the same format as a standard ORACLE plan table, is owned by SYS, must have SELECT, INSERT, UPDATE, and DELETE privileges granted to public, and is created, with appropriate grants, by running `$ORACLE_HOME/rdbms/admin/ksrxplan.sql`.

Standard ORACLE includes a script called `utlxplan.sql`, which any user can employ to create a private plan table (named PLAN_TABLE by default). For a given user, KSR QD will use PLAN_TABLE if it exists; otherwise, it will use KSR_PLAN_TABLE. If KSR_PLAN_TABLE does not exist in a given database, only users with a private plan table explicitly named PLAN_TABLE can use KSR QD in that database.

- KSR_DISABLE_QD — This is a public synonym for the table DUAL, which is transparently created when the script `$ORACLE_HOME/rdbms/admin/ksr_disable_qd.sql` is run. It is transparently dropped when you subsequently run the script `/ORACLE_HOME/rdbms/admin/ksr_enable_qd.sql`. This table should not be manipulated directly.

10.1.3 Running the KSR QD Start-up Scripts

When a new ORACLE database is created or you want to enable KSR QD support for an existing ORACLE database, two SQL scripts must be executed to create the data dictionary views and tables needed by KSR QD. Follow these steps:

1. Start up ORACLE, if it is not already started:

```
sqldba lmode=y
connect internal
startup
```

2. Connect as user SYS and run `catksrqd.sql` to create the KSR_ALL_TABLE_FILES view:

```
connect SYS/password
@$ORACLE_HOME/rdbms/admin/catksrqd.sql
```

3. Connect as user SYSTEM and run `ksrxplan.sql` to create the KSR_PLAN_TABLE table:

```
connect SYSTEM/password
@$ORACLE_HOME/rdbms/admin/ksrxplan.sql
```

Once these scripts have been executed in a database, KSR QD is enabled for that database.

10.1.4 KSR QD Temporary Tables

KSR QD creates a temporary table when it decomposes a query containing aggregate functions. It uses this table to gather partial aggregate results from the parallel subqueries. A KSR QD temporary table has a name beginning with QDIT (for Query Decomposer Intermediate Table) with a unique 9-digit suffix. It is owned by the user executing the query and is created in that user's TEMPORARY tablespace (which defaults to SYSTEM).

A user must have the ability to create tables in his or her TEMPORARY tablespace to apply query decomposition to queries containing aggregate functions. The ALTER USER statement can be used to assign a TEMPORARY tablespace for a particular user. The user can be enabled to create tables in that tablespace by either granting the RESOURCE role to the user (which enables creating tables in any tablespace) or using the QUOTA clause of the ALTER USER statement to grant the user a storage quota in a specified tablespace. If a quota is used, it must be sufficient to permit creating a table with default storage attributes. The minimum necessary quota varies depending on the database configuration (e.g., in a database with DB_BLOCK_SIZE of 8192, the minimum quota required to create KSR QD intermediate tables is 40 KB).

If a user without the ability to create tables in the TEMPORARY tablespace attempts to execute a query for which KSR QD requires an intermediate table, the query will be executed without using query decomposition, and no warning will be issued.

10.1.5 ORACLE Initialization Parameters

There are no new ORACLE initialization parameters specific to KSR QD. Use of KSR QD, however, might cause you to reassess the settings of some of your ORACLE initialization parameters.

When a query is decomposed into subqueries, many system resources will be used more heavily than usual, because of the multiplication factor of the degree of parallelism involved. One user submitting a query for decomposition will impact the system as if many users were submitting queries. For example, you might consider increasing the value of PROCESSES.

10.2 Database Configuration

10.2.1 Configuring Tables for Effective Query Decomposition

Partitioning Data Across Multiple Disks

For KSR QD to be used effectively to speed up queries, the data to be queried must be partitioned across multiple disks. This is accomplished by the following steps:

1. Create an ORACLE tablespace consisting of multiple files, each on a different disk.

2. Create one or more tables in that tablespace. Each file of the tablespace constitutes a KSR QD "partition" for each table.

3. Load data into the partitioned tables. ORACLE extents are automatically allocated in a balanced manner across the tablespace as data is loaded.

Number of Table Partitions

A database may contain multiple partitioned tablespaces, each of which may have a different number of partitions. A table created in a partitioned tablespace potentially has the same number of partitions as the tablespace. However, when decomposing a query on a particular partitioning table, KSR QD will consider as partitions only those files which contain at least one extent of the table in question. For example, if a tablespace has 20 files, but a particular table in the tablespace has extents in only 10 of those files, KSR QD considers that table to have 10 partitions, not 20. This means KSR QD generates at most 10 parallel subqueries for a query with this table as its partitioning table.

10.2.2 Determining Appropriate Number of Partitions

Determining Effective Degree of Partitioning

The maximum effective degree of partitioning of a tablespace is limited by the number of disk drives, because KSR QD does not benefit significantly from using more than one partition on the same disk, for a given tablespace. *The number of processors does not impose a hard limit on the degree of partitioning*, because multiple KSR QD threads may run on a given processor in a time-sharing fashion. However, a gradual decline of added speedup per additional degree of partitioning will occur as the degree of partitioning exceeds the number of processors. It is recommended the degree of partitioning not exceed the number of processors for the initial run.

The degree of partitioning of a tablespace determines the maximum potential degree of parallelism KSR QD can use for queries whose driving table is in that tablespace. For a given table in the tablespace, the actual maximum degree of parallelism is equal to the number of files in the tablespace that contain at least one extent of the table.

Adjusting the Degree of Parallelism

KSR QD can be made to use a smaller degree of parallelism than the maximum by using the KSR_MAXPARTITIONS environment variable or query directive, as explained in Section 11.1, "KSR QD Environment Variables."

Partitioning a Single Large Table

If you are only concerned with queries driven on a single large table (at a given time), partition it across all available disks, particularly if the number of disks does not exceed the number of processors. See Section 10.2.7, "Scatter Clustering" for a mechanism improving performance under certain conditions.

Partitioning Multiple Large Tables

If you have several large tables to be partitioned, and these may be queried concurrently by separate queries, then ideally you should partition each of them over a separate, non-overlapping set of disks to avoid disk contention between the queries.

There is a trade-off between maximizing parallelism for queries on a given table (achieved by partitioning that table across the most possible disks) and minimizing disk contention among concurrent queries (achieved by minimizing overlapping of the sets of disks accessed by those queries).

If you have several large tables to be partitioned, and these often will be joined in the same query, choose one of the following two approaches:

- Partition each table across a separate, non-overlapping set of disks.
- If your joins usually will be on the same set of columns, create one partitioned tablespace for all the tables, then define a cluster on that set of columns, and define the tables to be in that cluster.

For queries containing joins, KSR QD divides its work according to the partitions of one table, the "driving" table of the join (see Section 11.4, "Kendall Square Extensions to EXPLAIN PLAN," to find out how to determine which is the partitioning table for a given query). A given KSR QD parallel subquery is responsible for fetching rows from a particular partition of the partitioning table, and for each of those rows, finding the matching rows from the other tables. If more than one of the tables being joined is partitioned across the same disks, one parallel subquery looking for matching rows from a non-partitioning table may contend for the same disk with another parallel subquery looking for rows matching its own partition of the partitioning table. Using a cluster solves this problem, because the rows of non-partitioning tables usually are in the same block (and thus the same partition) as the corresponding rows of the partitioning table to which they join.

10.2.3 Creating a Partitioned Tablespace

Soft Links

It is advisable to use soft links rather than hard-coded path names in the SQL statement used to create a partitioned tablespace. Using soft links makes it easy to move the actual files to different locations as needed. (This applies to all database files but is more likely to be an issue when many disks are involved.) This also means all the path names by which ORACLE knows the files can be in one directory, which greatly facilitates housekeeping. This approach also allows you to physically relocate database files without starting up ORACLE.

Example

For example, to create a 5-partition tablespace called QDTEST, with each file containing 4 MB, first create soft links for each partition table space from your KSR OS shell (file and directory names are examples):

```
cd $ORACLE_HOME/dbs
ln -s /db_disk1/qd01.dbf qd01.dbf
ln -s /db_disk2/qd02.dbf qd02.dbf
ln -s /db_disk3/qd03.dbf qd03.dbf
ln -s /db_disk4/qd04.dbf qd04.dbf
ln -s /db_disk5/qd05.dbf qd05.dbf
```

The soft-link names and actual names do not have to be the same, but it makes it easier to keep track of things. You can then use an SQL statement like the following to create the tablespace:

```
create tablespace qdtest
datafile '?/dbs/qd01.dbf' size 4m reuse,
     '?/dbs/qd02.dbf' size 4m reuse,
     '?/dbs/qd03.dbf' size 4m reuse,
     '?/dbs/qd04.dbf' size 4m reuse,
     '?/dbs/qd05.dbf' size 4m reuse;
```

If, for example, you later need to move the file `qd01.dbf` from `/db_disk1` to `/db_disk7`, simply do the following in the shell (while the database is shut down or the `qdtest` tablespace is off-line):

```
mv /db_disk1/qd01.dbf /db_disk7/qd01.dbf
rm $ORACLE_HOME/dbs/qd01.dbf
ln -s /db_disk7/qd01.dbf $ORACLE_HOME/dbs/qd01.dbf
```

For More Information

Consult the *ORACLE Database Administrator's Guide* for full information about creating tablespaces.

Guideline

A useful rule of thumb when creating tablespaces to be used for query decomposition is to define all files of your tablespace to be the same size. This will provide even data distribution across all the files.

10.2.4 Creating a Partitioned Table

To create a partitioned table, use the CREATE TABLE statement to create a table in a partitioned tablespace. For example, the following statement creates a table called EMP in the tablespace created in the previous example:

Example

```
create table emp
     (empno number(9) not null,
     lname char(20),
     fname char(20),
       .
       .
       .
     )
pctfree 5 pctused 90
storage (initial 256K next 256K pctincrease 0)
tablespace qdtest;
```

For More Information

Consult the *ORACLE Database Administrator's Guide* for full information about creating tables and the significance of the storage clause in particular.

Guidelines

Some useful rules of thumb when creating tables to be used by KSR QD include the following:

- In the storage clause of your CREATE TABLE statement, specify the same size for both initial and next extent, and specify PCTINCREASE 0 (so all extents will be the same size). ORACLE will round extent size up to a five-block boundary (i.e., to a multiple of five times your ORACLE blocksize), so for clarity it is best to specify an extent size that is a multiple of five blocks.
- Choose a file size that is a multiple of your extent size, plus one extra block (i.e., plus a number of bytes equal to your ORACLE blocksize). The extra block is required by ORACLE for overhead.

10.2.5 Creating Indexes for Partitioned Tables

It is strongly advisable to put any indexes for a partitioned table in a different tablespace than the one containing the table. KSR QD can effectively decompose queries using an index to retrieve rows from the driving table (although speedup will not tend to be as dramatic as for full-table scans), but the reading of the index itself is not decomposed (i.e., each parallel subquery reads the same index blocks). Placing the index in a separate tablespace avoids disk contention between index reads by one parallel subquery and table reads by another parallel subquery.

10.2.6 Minimizing Data Skew

KSR QD is most effective when target data is evenly distributed among all the files of a tablespace. This is so because KSR QD divides the work of a query so each parallel subquery covers the same number of table partitions as nearly as possible. For example, if a given table has 20 partitions (i.e., it has at least one extent in each of 20 files) and the user has specified a maximum degree of decomposition of 10 (using the KSR_MAXPARTITIONS directive, described in Section 11.2), each parallel subquery will be responsible for retrieving data from two partitions. If no maximum degree of decomposition has been specified, each parallel subquery will retrieve data from one partition. If each of the 20 partitions contains roughly the same amount of data, each parallel subquery has roughly the same amount of work to do. Therefore, when they are executed in parallel, all the parallel subqueries will complete at about the same time. The execution time for the overall query is always slightly greater than the execution time for the longest-running parallel subquery, making it very important to divide the workload evenly among the parallel subqueries.

Suppose, on the other hand, the data is skewed such that you have 11 extents in 10 files (1 file with 2 extents and the rest with 1 each). In this case one file contains twice as much data from the table as any other file, and the parallel subquery for the larger file will have twice as much work to do as the other parallel subqueries. When the others have all completed, the larger subquery still will have roughly half its work left to do. For half of the execution time of the overall query, there will be no parallelism. Realistically, unless you know the exact size of a table in advance, this problem cannot be entirely avoided. Selecting smaller extent sizes (i.e., 103 extents in 10 files) can minimize the effects of this problem.

If a given file contains no extents for a given table, that file is not considered a partition of that table by KSR QD. If, for example, a table in a 20-file tablespace has equal amounts of data in each of 10 files and has no extents in the remaining 10 files, a query on that table can be decomposed into 10 parallel subqueries. If the same data were instead distributed among all 20 files, a higher degree of parallelism, and thus a higher degree of speedup, would be possible.

Types of Data Skew

There is a distinction between the type of data skew which affects queries retrieved using a full-table scan and the type which affects queries using an index. When a full-table scan is used, the most important factor is balancing the number of data blocks containing rows of the driving table among files of the partitioned tablespace, because a full-table scan must read each of these blocks once. Of secondary importance is balancing the total number of rows of the table in each file, because there is a CPU cost involved in processing each row (which varies from row to row, depending on how many of the query's predicates the row satisfies). Reasonably good balanced distribution can be achieved simply by ensuring each file contains the same number of extents for the table in question, and all extents are the same size.

When an index is used, data blocks of the table are read only if they contain at least one row which satisfies the predicates applied to the index (e.g., if an index on DEPTNO is used, only those data blocks are read which contain at least one row with a DEPTNO value in the range specified in the query's WHERE clause). Therefore, for a given indexed query, the skew of distribution of data blocks containing rows falling within the specified ranges on the indexed columns is important. This type of skew is more difficult to avoid for two reasons: First, one must predict the most frequently queried value ranges to determine the ideal data distribution. Second, the order in which data is loaded affects the way it ends up distributed among extents and files, and this is difficult to control. There is no simple answer to this problem. Trade-offs must be made based on application analysis.

10.2.7 Scatter Clustering

Scatter clustering can be quite valuable. The goal of scatter clustering is to create a hashed cluster with a large number of overflow blocks, each of which contains records with the same key value.

For example, if an index has a fairly small number of distinct values relative to the number of rows in a table, and rows with a given index value can occur (be scattered) anywhere in the table without regard to their key value on that index. Then even after using the index, a much larger volume of data may have to be read from the table than the volume represented by rows with the desired key values, because only a small fraction of each block read consists of the desired rows. In the worst case, all blocks of the table must be read, so performance is worse than if the index is not used at all (because of the extra reads of the index and the higher proportion of random to sequential I/Os). KSR QD can ameliorate the problem by splitting up the load in parallel, but if the index does not provide speedup relative to full-table scan without query decomposition, it will not provide that speedup with query decomposition either.

If rows with matching key values could be clustered, using an index would reduce total I/O in a much wider variety of cases (again, with or without query decomposition). This essentially is what ORACLE clusters accomplish. To further aid query decomposition, instead of clustering rows with a given key value into one clump, they can be clustered in *n* clumps, where *n* is the degree of partitioning of the table. If these clumps can be read in parallel (i.e., if KSR QD can be applied), performance would improve by a factor approaching *n*. This can be accomplished with the following approach:

1. Create a hash cluster keyed on the desired columns, in a partitioned tablespace (i.e., the hash cluster is partitioned over multiple files on multiple disks).

2. Estimate the expected volume of data for each distinct key value, as you would for an ordinary hashed cluster. Instead of using that volume as the size to specify for a hash bucket when creating a hashed cluster, specify a much smaller bucket size (at the largest, $v/n$ where $v$ is the volume of data for each distinct key value and $n$ is the number of table partitions).

3. Assuming your ORACLE block size also is no larger than $v/n$ (i.e., $v$ is large enough to be at least `n*blocksize`), when you load the table, you will get an overflow chain for each key value having at least $n$ blocks (just the opposite of the usual goal in configuring a hashed cluster). By loading the table in random hash-key sequence, you end up with the blocks for each overflow chain well distributed among the files of the partitioned table.

4. Now, create an (ordinary) index on the same columns as the hash columns. Because it is an ordinary index, each index entry consists of a key value/`rowid` pair, which points directly to the block containing the row in question. It also can be used for range predicates as well as direct match predicates.

When presented with a query with an exact-match predicate on the hash-key columns, the ORACLE optimizer will choose hashed access rather than using the index on those same columns, because under normal circumstances, hashed access would unquestionably be faster. When KSR QD notices (in the execution plan) ORACLE has chosen hashed access and there is a regular index which has all the columns of the hash key as its leading columns, it generates an INDEX optimizer hint in the parallel subqueries, coercing the ORACLE optimizer to use the regular index rather than hashing. Since the parallel subqueries have `rowid` range predicates, this regular indexed query can be decomposed like any other. Because the data is clustered on the same column values with blocks for each cluster-key value well distributed among the files of the partitioned table, many fewer blocks need to be read than if this were not a hashed table.

As an example, consider the following query:

```
SELECT * FROM HASHED_TABLE WHERE HASHKEY_COLUMN = 5
```

This would be decomposed into parallel subqueries, for example:

```
SELECT /*+ INDEX(HASHED_TABLE REGULAR_INDEX) */ * FROM HASHED_TABLE
  WHERE HASHKEY_COLUMN = 5    AND ROWID >= '0.0.1'
                             ' AND ROWID <  '0.0.2'
```

where a partitioned table called HASHED_TABLE is hashed on the column HASHKEY_COLUMN, and there also is an index called REGULAR_INDEX on the same column.

The regular index optionally may contain additional trailing columns beyond those which match columns of the hash key. This means it can be used to further restrict the rows read, according to additional predicates in the query. This could be particularly useful to give added flexibility, because a hash key must be chosen by a DBA before a table is created. Once the hashed table is populated, it requires a complete reorganization to add additional hash-key columns. It is much easier, however, to add columns to an index (or replace it with a different index) without affecting the data itself. So, if additional, frequently used selection criteria are identified after a hash table exists, these columns can be added to the regular index.

If more than one regular index has leading columns matching the hash key (but with different trailing columns), KSR QD must choose one of these indexes arbitrarily for ORACLE to use. In this event, however, the user optionally may choose the index by placing the INDEX optimizer hint in the original query. KSR QD always leaves any hints from the original query in the parallel subqueries to provide the user this extra degree of customized control over optimization when needed.

10.3 Problem Determination

10.3.1 Reverting to ORACLE without KSR QD

If an error should occur, it may be necessary to determine whether the problem is due to KSR QD or ORACLE.

First, determine whether you are running KSR QD. If your SQL*Plus has KSR QD linked in, then when you run SQL*Plus, you will see an indication KSR QD is running (e.g., KSR QD version 1.0).

If you are running KSR QD, try the KSR_NOPARTITION environment variable or directive. This disables KSR QD as explained in Section 11.1.

If that does not clarify the source of the problem, it may be necessary to remove the KSR QD code. The unmodified versions of `libora.a` and `sqlplus` were included in your distribution and are in the `/$ORACLE_HOME/lib` and `/$ORACLE_HOME/bin` directories, respectively. Switch to these modules (instead of the KSR QD modules) and see whether the error persists.

10.3.2 KSR QD Cleanup Utility

Normally, KSR QD intermediate tables are dropped automatically upon completion of query execution, but in exceptional cases (e.g., if an application is cancelled during query execution), they may not be dropped. A utility called `qdcleanup` is provided for easily removing KSR QD temporary tables.

Syntax

```
qdcleanup [user[/password]]
```

Parameters user
The user whose temporary tables will be dropped. If user is not supplied on the command line, `qdcleanup` will prompt for it.

password
The password of the specified `user`. If *password* is not supplied on the command line, `qdcleanup` will prompt for it.

Usage Notes

`qdcleanup` will attempt to drop all KSR QD temporary tables owned by `user`. If none exist, it will print the following message:

```
There are no KSR QD temporary tables owned by user
```

Otherwise, it will print the following warning before deleting the tables:

```
Warning: KSR QD temporary tables owned by user will be dropped.
Make sure user user is not currently executing a query using QD.
Continue? (y/n)
```

If the user chooses to proceed while there is query decomposition in progress on behalf of that user, the temporary table used by the query being decomposed will be dropped, and the query will be aborted. Answering the `Continue?` prompt with `n` prevents this from happening.

As each temporary table is dropped, a message like the following is displayed:

```
Dropping table QDIT115418186...   Table dropped.
```

To run `qdcleanup`, ORACLE must be started and the database must be open.

Chapter 11 ➤ The User Interface to KSR QD

KSR QD is intended to enhance the performance of complex decision-support queries executing over large databases. It works in coordination with the ORACLE optimizer to automatically provide what it believes to be the optimal strategy for running your query, based on what it knows about your application and the structure of your data.

Transparent Performance Enhancement

Generally, KSR QD works on your behalf without you even being aware that it is there, except for the performance enhancements you see in the execution of your queries. Once your database has been partitioned to take advantage of the parallelism offered by KSR QD, the KSR QD environment rarely needs to be changed. You can run your applications unmodified and expect KSR QD to make the right decisions to optimize the execution of your queries.

You have knowledge of your database and application, however, which KSR QD can not be expected to deduce. To further optimize your queries, that information may be made available to KSR QD. This is the purpose of the KSR QD user interface.

Functions of the User Interface

The KSR QD user interface allows you to:

- Initially set up the default environment to allow you (most times) to concentrate on your application and be confidently oblivious to what KSR QD is doing.
- Interact with and control the operation of KSR QD in those instances where your knowledge can be leveraged into better performance decisions.
- Measure your performance gains to assess optimization strategies.

Multiple Levels of Control

This control is provided in a granularity allowing for individual customization:

| | |
|---|---|
| At the database level: | You can transparently accept the system defaults for each option. The DBA can change them. See Section 10.1. |
| At the local user level: | You can set an environment variable for your shell to override any system default for an individual session. See Section 11.1. |
| At the individual query level: | You can issue a directive within your query to override both the system default and the environment variable for an individual query. See Section 11.2. |

Control Options

You have this multi-level control over the following options:

| Option | Default | Description |
|---|---|---|
| Decompose the query | Yes | You can choose whether or not to use query decomposition. Not all queries benefit from decomposition, and there is an overhead associated with decomposition. See Section 11.3. |
| Employ array fetches | No | You can choose whether to employ array processing for your subqueries. You can set either a size or a threshold and a size. The optimal array size is determined through experimentation. Setting a threshold invokes array fetching only after a particular number of rows have been fetched. See Section 11.7. |
| Set the degree of parallelism | Number of partitions in partitioning table | You can set a minimum or maximum number of partitions. See Section 11.1. |
| Display timing data | No | You can have timing information displayed on your screen or entered into a file. See Section 11.6. |

11.1 KSR QD Environment Variables

Environment variables are used to control the various KSR QD options on a local (per-shell) session basis.

Unless specified otherwise, legal values are non-negative integers. As with all UNIX environment variables, these are case-sensitive, and the convention is to use all-upper-case names. Syntax depends on the shell you use:

Syntax

| | |
|---|---|
| `VARIABLE = value` | Bourne shell |
| `set VARIABLE = value` or<br>`setenv VARIABLE value` | C shell and its variants |

Parameters

*VARIABLE*
Specifies the KSR QD control variable being used as an environment variable. See Table 11-1 for a list of KSR QD control variables.

value
Specifies the value assigned to the corresponding KSR QD control variable. Variables can be unset by issuing the `unsetenv` command with a null value.

Table 11-1 KSR QD Control Variables

| Variable | Description |
|---|---|
| KSRQD_ARRAY_SIZE | If set to an unsigned integer, indicates the array size for array fetch by KSR QD parallel subqueries. KSR QD array fetch minimizes the number of client-server messages by fetching multiple rows per message in arrays. To enable KSR QD array fetch, KSRQD_ARRAY_SIZE must be set to a non-zero value.The default value is zero and means no array fetch. A value of one also means no array fetch, although the array fetch mechanism would be employed. |
| KSRQD_ARRAY _THRESHOLD | If set to an unsigned integer, indicates the array fetch threshold. A given parallel subquery starts using array fetch only after this many rows have been fetched. The default value is 0, meaning start right away (i.e., before the first row is fetched). If KSRQD_ARRAY_SIZE is zero, there will be no array fetching. |
| KSRQD_DISPLAY_TIME | If set to any value, causes KSR QD timing information to be computed and displayed. By default, this variable is not set. See Section 11.6 for more information. |
| KSRQD_DISPLAY_FILE | If set to a file specification and KSRQD_DISPLAY_TIME is also set, indicates the file where timing information is to be written. By default, this variable is not set, and all information is displayed on standard output. |
| KSRQD_MAXPARTITIONS | If set to a positive integer, determines the maximum degree of parallelism for queries (even if the partitioning table has more partitions than this value). The actual degree of parallelism for a query will be the minimum of this value (if set), and the number of partitions in the partitioning table of the query. The default value is the actual number of partitions. This parameter must be greater than zero. |
| KSRQD_MINPARTITIONS | If set to an unsigned integer, determines the minimum number of table partitions for which decomposition will be used. For example, if KSRQD_MINPARTITIONS = 3, a query against a 2-partition table will not be decomposed. The default value is two. |
| KSRQD_NOPARTITION | If set to any value, disables KSR QD within the user environment. It cannot be overridden by a KSRQD_MAXPARTITIONS query directive. Unsetting or removing this variable re-enables KSR QD within the local shell. By default, this parameter is not set. |

11.2 KSR QD Directives

Directives are used to control KSR QD on a per-query basis.

There are directives corresponding to the following environment variables:

- KSRQD_ARRAY_SIZE
- KSRQD_ARRAY_THRESHOLD
- KSRQD_MAXPARTITIONS
- KSRQD_MINPARTITIONS
- KSRQD_NOPARTITION

Directives follow the syntax rules of ORACLE optimizer hints, and they may be interspersed with ORACLE optimizer hints and other, non-directive comments.

In general, directives override or restrict settings of the environment variables of the same name. The only exception is the KSRQD_NOPARTITION directive (see Section 11.3.3, "Enabling/Disabling KSR QD per Query").

11.2.1 Syntax Rules for Directives

- Directives must appear within a directive comment.
- A directive comment is any comment which immediately follows the SELECT keyword (with or without intervening white space), and has a plus sign (+) immediately after the open-comment delimiter (/* or --).
- Each KSR QD directive consists of either a single keyword or a keyword followed by an equal sign (=) followed by an unsigned integer.
- A directive comment may contain zero or more KSR QD directives separated by blanks.
- For those directives which are followed by an equal sign and an integer, there can be no intervening tokens between the directive, the equal sign, and the integer.
- Any number of intervening tokens may appear between KSR QD directives and are treated as comments. This includes ORACLE optimizer hints.
- If a query contains a directive comment, that comment will be included in the parallel subqueries generated by KSR QD, either unmodified or with additional ORACLE optimizer hints generated by KSR QD to coerce specific optimizer behavior.
- KSR QD directives are case-insensitive. (In the examples below, directive names are in all-upper-case to better identify them with their environment-variable counterparts.)

- The same directive may not be specified twice in one query. Otherwise, all combinations are syntactically legal. If KSRQD_NOPARTITION is specified, however, the query will not be decomposed, and any other directives will be ignored. (This facilitates testing, because you can add and remove KSRQD_NOPARTITION for experimental purposes without having to make any other editing change to a query.)

11.2.2 Examples of Directive Comments

Example 1

```
select /*+ KSRQD_NOPARTITION */ avg(salary) from emp;
```

This query will not be decomposed due to the KSRQD_NOPARTITION directive.

Example 2

```
select --+ KSRQD_MAXPARTITIONS=10 KSRQD_ARRAYSIZE=100 full(emp)
 * from emp, dept where emp.dno = dept.dno;
```

KSR QD will use a maximum of 10-way parallelism, and it will use array fetching to fetch 100 rows at a time, per parallel subquery. The full(emp) ORACLE optimizer hint will be treated as a comment by KSR QD but passed along to the ORACLE optimizer in the parallel subqueries, forcing ORACLE to use a full-table scan on the emp table.

11.3 Enabling/Disabling KSR QD

KSR QD can be enabled/disabled at three levels:

- Per database (by DBAs only)
- Per user environment (via environment variables)
- Per query (via KSR QD directives)

Disabling KSR QD at a higher level prevents enabling it at a lower level (i.e. if KSR QD is disabled in a database, it cannot be enabled within user environments for queries on that database; if it is disabled in a user environment, it cannot be enabled for any query run in that environment). At each level, the default is for KSR QD to be enabled, unless it is disabled at a higher level.

Enabling/disabling KSR QD is largely transparent except insofar as it affects performance. The same queries will return the same results. Queries containing explicit KSR QD directives can be run in an environment where KSR QD is disabled; the KSR QD directives will simply be ignored, and the query will not be decomposed.

The following are some of the visible differences seen when KSR QD is enabled or disabled:

- Execution plans generated while KSR QD is enabled will show parallel execution as one of the steps for all queries which will be decomposed. Execution plans generated while KSR QD is disabled will not show parallel execution as one of the steps for any query.

- Queries with no ORDER BY or GROUP BY clause will tend to return their results in a different order when they are decomposed than when they are not decomposed. When such a query is decomposed and executed several times, it will tend to return results in a different order each time. The SQL language does not define the order in which rows are returned for queries with no ORDER BY or GROUP BY clause.

- The parallel connections do not see the same transaction-consistent copy of the database, so if another user commits an update just as you are making connections for a KSR QD query, it is possible some of those connections will see the update, while others will not. The window of opportunity for this to happen is brief (the time it takes to make 20 or so connections in parallel).

- Executing a decomposed query in a transaction having uncommitted updates can have undesirable side effects.

- Because the parallel connections do not see the same "transaction snapshot" of the database as the main connection, they will not see any updates which the calling program has made, but has not yet committed. Inserting an extra COMMIT after the last update prior to a decomposable query will solve this problem.

- When KSR QD is used on a query containing aggregate functions or a GROUP BY clause, there is an implicit commit when the cursor for the query is opened, and another implicit commit when it is closed (caused by KSR QD creating and dropping the temporary table used to collect aggregate results from the parallel subqueries). Users are advised not to use KSR QD on queries in transactions having uncommitted updates unless the implicit commits generated by KSR QD are perfectly acceptable.

11.3.1 Enabling/Disabling KSR QD per Database

KSR QD is enabled by default in a newly created database, provided the scripts described in Section 10.1 have been run. Any user with DBA privilege may disable query decomposition for that database by executing the following SQL script:

```
@$ORACLE_HOME/rdbms/admin/ksr_disable_qd
```

A DBA may re-enable KSR QD for that database as follows:

```
@$ORACLE_HOME/rdbms/admin/ksr_enable_qd
```

These settings are persistent across shut-downs and start-ups of the database. They are associated with the database rather than with an ORACLE instance, so with Parallel Server, they affect all instances for a given database. They take effect immediately for all programs executing their first query after the setting has been changed. Once a given program has executed its first query, it will continue to run in whichever mode (enabled or disabled) was in effect when that query was executed.

11.3.2 Enabling/Disabling KSR QD per User Environment

KSR QD is enabled by default in a user environment, unless the user accesses a database for which KSR QD is disabled. KSR QD may be disabled in a user environment by setting the environment variable KSRQD_NOPARTITION to any value. KSR QD may be re-enabled by unsetting that environment variable.

11.3.3 Enabling/Disabling KSR QD per Query

KSR QD is enabled by default for a query, unless it is disabled at the database or environment level. It may be disabled by specifying the KSRQD_NOPARTITION directive within the query. KSRQD_NOPARTITION overrides any other KSR QD directives specified in the same query (so a user may add it and remove it without making any other editing changes to the query).

When KSR QD is disabled for a query, the query will not be decomposed. When KSR QD is enabled, it may be decomposed at the discretion of KSR QD, based on whether analysis of the query indicates decomposition is likely to be effective. If a minimum number of partitions has been specified for either the environment or the query (using the KSRQD_MINPARTITIONS environment variable or KSR QD directive, both discussed above), then a query will not be decomposed if its driving table has fewer than the specified number of partitions, even if KSR QD is enabled.

11.4 Kendall Square Extensions to EXPLAIN PLAN

When query decomposition is enabled and EXPLAIN PLAN is invoked for an SQL query, if the query in question would be decomposed, EXPLAIN PLAN produces an execution plan that includes a row providing information about how KSR QD is used for this query. The other rows of the plan show the optimization strategy ORACLE has chosen for executing the parallel subqueries.

Not all fields of the plan table are used for every kind of ORACLE row source. The following are the fields used for the special KSR QD row of an execution plan for a decomposed query; fields not mentioned here are set to null.

| | |
|---|---|
| STATEMENT_ID | Set as specified in EXPLAIN PLAN statement, or to null. |
| TIMESTAMP | Set to current date/time. |
| OPERATION | Set to KSR PARALLEL EXECUTION |
| OPTIONS | Indicate the type of combining function used by KSR QD: UNION ALL, MERGE, or AGGREGATION. |
| OBJECT_OWNER | Indicate the owner of the partitioning table. |
| OBJECT_NAME | Indicate the name of the partitioning table. |
| SEARCH_COLUMNS | Indicate the degree of partitioning (i.e., the number of parallel subqueries). |
| ID | Indicate the unique ID of this row within this particular plan. Set to 1 for the special KSR QD row. |
| PARENT_ID | Indicate the ID of the logical parent of this row. Set to null for the special KSR QD row (PARENT_ID is always null for the row whose ID is 1). |

11.4.1 EXPLAIN PLAN Examples

The following are examples of EXPLAIN PLAN statements for queries using KSR QD and their resultant execution plans. For more information on ORACLE's EXPLAIN facility, see the *ORACLE7 Server Application Developer's Guide*.

Example 1

The first EXPLAIN PLAN statement is for a simple query (no ORDER BY or GROUP BY clauses, joins, or aggregates). The emp table has 20 partitions.

```
EXPLAIN PLAN
SET STATEMENT_ID = 'query1'
FOR SELECT * FROM EMP WHERE SALARY > 30000;
SELECT OPERATION, OPTIONS, OBJECT_NAME, ID, PARENT_ID, SEARCH_COLUMNS
FROM PLAN_TABLE WHERE STATEMENT_ID = 'query1'
ORDER BY ID;
```

The following output is produced:

```
OPERATION               OPTIONS   OBJECT_NAME  ID PARENT_ID SEARCH_COLUMNS
--------------------------------------------------------------------------
SELECT STATEMENT                               0
KSR PARALLEL EXECUTION  UNION ALL     EMP      1  0              20
TABLE ACCESS            FULL          EMP      2  1
```

Example 2

The second EXPLAIN PLAN statement is for a query requesting DISTINCT values. KSR QD uses a MERGE combining function in this case.

```
EXPLAIN PLAN
SET STATEMENT_ID = 'query2'
FOR SELECT DISTINCT LNAME FROM EMP;
SELECT OPERATION, OPTIONS, OBJECT_NAME, ID, PARENT_ID, SEARCH_COLUMNS
FROM PLAN_TABLE WHERE STATEMENT_ID = 'query2'
ORDER BY ID;
```

The following output is produced:

```
OPERATION                 OPTIONS  OBJECT_NAME   ID PARENT_ID SEARCH_COLUMNS
------------------------------------------------------------------------------
SELECT STATEMENT                                  0
KSR PARALLEL EXECUTION    MERGE        EMP        1    0             20
SORT                      UNIQUE                  2    1
TABLE ACCESS              FULL         EMP        3    2
```

Example 3

The third EXPLAIN PLAN statement is for a query joining two tables and has aggregation and grouping. KSR QD chooses emp as the partitioning table because it is the driving table in ORACLE's plan for the join. ORACLE uses a nested-loops join and uses the unique key pk_dept to retrieve dept in the parallel subqueries.

```
EXPLAIN PLAN
SET STATEMENT_ID = 'query3'
FOR SELECT DNAME, AVG(SALARY) FROM EMP, DEPT
WHERE EMP.DNO = DEPT.DNO
GROUP BY DNAME;
SELECT OPERATION, OPTIONS, OBJECT_NAME, ID, PARENT_ID, SEARCH_COLUMNS
FROM PLAN_TABLE WHERE STATEMENT_ID = 'query3'
ORDER BY ID;
```

The following output is produced:

```
OPERATION                 OPTIONS      OBJECT_NAME   ID PARENT_ID SEARCH_COLUMNS
----------------------------------------------------------------------------------
SELECT STATEMENT                                      0
KSR PARALLEL EXECUTION    AGGREGATION    EMP          1    0             20
SORT                      GROUP BY                    2    1
NESTED LOOPS                                          3    2
TABLE ACCESS               FULL          EMP          4    3
TABLE ACCESS               BY ROWID      DEPT         5    4
INDEX                     UNIQUE SCAN    PK_DEPT      6    5
```

11.5 Relationship of ORACLE Hints and KSR QD Directives

The KSR QD directives follow the general syntax of an ORACLE hint:

➤ They must appear in a comment immediately following a SELECT statement.

ORACLE hints are allowed in SELECT, DELETE, or UPDATE statements, but since DELETE and UPDATE statements are never decomposed, KSR QD directives only have meaning after a SELECT statement.

- The open comment delimiter (/* or --) must be immediately followed by a plus sign (+) with no intervening white space.
- Other comments, in addition to the reserved KSR QD directives, may appear within the same comment, and they will be ignored by KSR QD.

NOTE: ORACLE also permits non-hint comments to be interspersed with hints. From ORACLE's perspective, the KSR QD directives are comments, while from KSR QD's perspective, ORACLE hints are comments.

KSR QD directives and ORACLE hints are semantically independent. The presence of ORACLE hints in a query does not affect KSR QD's decision whether to decompose the query, except insofar as the hints yield an optimizer plan appropriate for decomposition. Conversely, the presence of a KSR QD directive in a query has no affect on ORACLE's optimization. Note, however, that the presence of any ORACLE hint other than NOCOST implies use of the cost-based optimizer, even in cases where statistics are not available for any table in the query. Without the hints, the heuristic optimizer will be used.

The KSR QD parser does not need to understand ORACLE hints, and it ignores them along with anything else within a comment that is not a KSR QD directive. When KSR QD passes the input query to the ORACLE EXPLAIN PLAN facility, the latter will take any hints into account in producing the execution plan. KSR QD does not need to know whether the plan was influenced by hints, only what the plan is. When a query is decomposed into parallel subqueries, any hints are replicated in the subqueries. This ensures ORACLE chooses the same strategy for executing the subqueries as when EXPLAINing the input query (KSR QD relies on the assumption this will be the case).

Driving Table

KSR QD always partitions on the driving table of a join, provided that table is retrieved in a manner facilitating partitioning (indexed and full-table scans permit partitioning). ORACLE hints provide a way to control the choice of driving table and the manner of retrieving that table, and thereby provide a way to control the choice of the partitioning table.

The ORACLE optimizer's default strategy for a query may not always be the most efficient strategy to use in conjunction with KSR QD. In this situation, ORACLE hints provide a means for users to second-guess the ORACLE optimizer, based on their ability to take KSR QD into account and coerce a different choice of driving table.

11.6 KSR QD Timing Utility

You can choose to receive timing information to help you evaluate the effectiveness of KSR QD processing your queries. The timing utility can be enabled at the session level with an environment variable. The timing utility is accessed through SQL*Plus or a KSR QD linked Pro*C program.

Environment Variable

KSRQD_ISPLAY_TIME controls display of KSR QD's timing information. If it is set, KSR QD measures and displays timing statistics for various steps in the execution of a query. Setting the environment variable KSRQD_DISPLAY_FILE to a filename causes the timing statistics to be placed in that file. If this is not set, the information is sent to standard output.

The timing utility provides information about five processing phases, as shown in Table 11-2.

Table 11-2 KSR QD Timing Information

| Processing Phase | Timing Statistic | Description |
|---|---|---|
| Preparing Query | Full Preparation time | Time to analyze and prepare a query (including parsing the query, performing semantic analysis, checking whether the query would benefit from decomposition, and generating data structures needed for later KSR QD processing) |
| Opening Query | Create Temp Table time | Time to create the temporary table used for processing aggregate functions. |
| | Query Open time | Time for the main thread to open the query (including creating threads, forking processes, and waiting for child threads to open parallel subqueries) |
| Executing Subqueries | Subquery | Identifies which subquery the following statistics refer to |
| | Rows | Number of rows retrieved |
| | Connect | Time for the subquery to connect to ORACLE |
| | Fetch | Time for the subquery to retrieve all its rows |
| | Close | Time to close the subquery, including closing the parallel cursor |
| Closing Query | Drop Temp Table time | Time to drop the temporary table used for processing aggregate functions |
| | Query Close time | Time for the main thread to close a query, including waiting for child threads to close parallel subqueries |
| Execution | Full Execution time | Total time for KSR QD to execute a query, including open and close times for the main thread, but not including preparation |

NOTE: The sum of times for all timing statistics in a given processing phase may not be the total time for that phase. Timing statistics are provided only for *significant* steps in the KSR QD process.

Example

The following example shows the times involved in decomposing a query with aggregate function into five subqueries:

Timing Utility Example (Part 1 of 2)

**Internal SQL*Plus timing options are enabled from the start.**

```
18% setenv KSRQD_DISPLAY_TIME ""
19% setenv KSRQD_DISPLAY_FILE qdstat.dat
20% sqlplus user/password

SQL*Plus: Version 3.1.1.4.2 - Developer's Release on Tue Jul 27 10:17:22 1993

Copyright (c) Oracle Corporation 1979, 1992. All rights reserved.

KSR Query Decomposer: Version 0.1.4.10

Connected to:
ORACLE RDBMS V7.0.13 - Developer's Release

SQL> set timing on

SQL> select /*+ KSRQD_MAXPARTITIONS=5 */ count(*) from sample_table;
5 ORACLE servers started.

COUNT(*)
----------
 922789

real: 32.0000
SQL> exit
Disconnected from ORACLE RDBMS V7.0.13 - Developer's Release

21% cat qdstat.dat

Query Decomposition started Tue Jul 27 10:21:14 1993

Preparing Query
Number of Subqueries: 5
Full Preparation time: 5.860122

Opening Query
Create Temp Table time: 1.079930
Query Open time: 4.960028
```

Timing Utility Example (Part 2 of 2)

```
Executing Subqueries
Subquery            Rows    Connect      Fetch        Close
4                    1      2.999250     19.460084    0.260256
1                    1      2.559894     21.619996    0.260256
3                    1      2.858944     20.079922    0.360002
2                    1      3.099778     20.039926    0.440000
5                    1      2.623164     19.496708    0.500002

Closing Query
Drop Temp Table time: 2.380004
Query Close time: 2.940004

Full Execution time: 29.019922
```

11.7 Array Processing

Array processing can improve performance by reducing the number of calls from an application to ORACLE. Array processing allows an application to fetch multiple rows with only a single call to the ORACLE kernel. This is an important performance technique you can use in your applications.

Choosing Array Size

The performance benefits of array processing depend upon the size of the array. By increasing the array size, you can further reduce the number of calls to ORACLE. Increasing the array size beyond a certain point, however, will yield negligible performance gains at the expense of memory consumption.

Example

For example, suppose your application fetches 10,000 rows. Without array processing, the application must call ORACLE 10,000 times, once for each row. However, with array processing and an array size of 100, the application must call ORACLE only 100 times, once for every 100 rows. In this case, increasing the array size to 100 reduces the number of calls by 9,900.

Increasing the array size above 100 does not significantly improve performance. An array size of 1,000 reduces the number of calls to 10. This performance gain is relatively small compared to the gain from increasing the array size from 1 to 100. Increasing the array size to 1,000 also increases the amount of memory needed to hold the array.

11.7.1 Use of Array Processing at the Query Level

Many ORACLE application tools can take advantage of array processing. These tools include:

- ORACLE Precompilers
- ORACLE Call Interface (OCI)
- SQL*Plus

SQL* Plus, for example, uses array processing automatically to return many rows from the database at once. It allows you to control the number of rows returned at a time through the SQL*Plus variable ARRAYSIZE (see *"SQL*Plus User's Guide and Reference"*). You can improve the performance of your queries by setting ARRAYSIZE appropriately. The trade-off is SQL*Plus needs a larger buffer to store the rows of your query if it is fetching them using a bigger array size.

Setting ARRAYSIZE in an application like SQL*Plus when KSR QD is enabled is not sufficient to ensure array fetches will be used across the client-server interface. It only ensures array fetches will be used between SQL*Plus and KSR QD. The KSRQD_ARRAY_SIZE environmental variable or directive must be used to cause the parallel subqueries to use array fetches when communicating with the server.

11.7.2 Use of Array Processing at the Subquery Level

Array processing can be used at the query level, the subquery level (by KSR QD), or both. Both query and subquery array processing give you an analogous way to improve your query performance, but they operate independently.

When you choose the array-fetch feature of KSR QD, you are applying array processing to each subquery. You can set the array size explicitly or you can let KSR QD help you determine the appropriate array size through a threshold mechanism. The threshold enables you to use array fetch even though you do not know how many rows will be fetched by your query. If you set the threshold, array fetching will not begin until the threshold has been reached. It will then set the array size to the value of the threshold. For those cases where the number of rows fetched is so small that array fetching will be inappropriate, it is not enabled.

The performance gains from array fetching can be considerable because of the multiplicative effect of the number of subqueries. However, the trade-off between performance and memory utilization needs to be watched even more closely. With each subquery accessing additional buffers for row storage, be careful memory does not become a performance bottleneck.

11.8 KSR QD Usage Notes

1. Do not execute queries using KSR QD if you are in the midst of a transaction with uncommitted updates. See Section 11.3, "Enabling/Disabling KSR QD" for further details.

2. Users of KSR QD require the ability to create tables in their TEMPORARY tablespace to use KSR QD on queries using an intermediate table (all queries containing aggregate functions).

NOTE: The only way to tell whether a query is decomposed is to use EXPLAIN PLAN to see the execution plan for the query. If KSR QD is used, the execution plan will include a KSR PARALLEL EXECUTION line.

5. KSR QD requires the driving table of a query have at least KSRQD_MINPARTITIONS partitions and be retrieved by either indexed scan or full-table scan (not hash access), to decompose a query.

6. There is a performance overhead for KSR QD. The following are approximate overhead figures to help decide whether it is a good idea to use KSR QD on a given application or query:

- Ten seconds or more for queries which are decomposed (increases with number of parallel subqueries). This cost is incurred only for queries which are decomposed.

- Sub-second to a few seconds to determine whether a query can be decomposed. This cost is incurred for all queries when KSR QD is enabled.

NOTE: For a given query you know will not be decomposed, you can reduce this to a minimum by using the KSRQD_NOPARTITION directive in the query— this avoids the cost of calling EXPLAIN or executing any dictionary queries to decide whether to decompose the query.

- Sub-second (generally very small) cost to check whether KSR QD is enabled. This cost is payed for all queries (whether or not KSR QD is enabled) when running a client application (e.g., SQL*Plus) with KSR QD linked in.

7. KSR QD intermediate tables may not get dropped in some cases, if errors occur during query execution.

Usually when this happens, they have no rows in them, but occasionally they do contain a few rows. A KSR QD intermediate table is created when a user executes a query containing aggregate functions, using KSR QD. It is owned by that user, and has a unique name starting with QDIT (for example, QDIT169538333). KSR QD is supposed to drop the intermediate table at the end of a query, or if any error occurs during query execution, but in some cases (particularly if the application executing the query crashes), this does not occur. The presence of these tables is relatively benign, but eventually they may exhaust a user's storage quotas, so it is best to drop them. They may be dropped using the DROP TABLE statement or running the qdcleanup program (see Section 10.3.2).

8. INSERT statements of the following form are decomposed by KSR QD and executed in parallel:

```
INSERT INTO TABLE X SELECT...
```

INSERT statements of the following form are not decomposed because the SELECT statement is syntactically treated as a subquery, which KSR QD does not decompose:

```
INSERT INTO TABLE X (SELECT...)
```

Parallelizing Decision Support Queries in Version 1 of ORACLE for KSR (Database Note #21)

1. Introduction

Described below is a "front-end" to the ORACLE database management system that can parallelize a reasonable class of decision support queries without requiring major changes to the DBMS itself.

To achieve this goal, we propose herein a new query decomposition approach, in which parallel subqueries are submitted to the DBMS, matching the physical data declustering already permitted through table "striping" in ORACLE. We believe that query decomposition is applicable to a very significant class of decision support queries, has excellent potential for performance gain for this class, and will be achievable with reasonable engineering effort at KSR. Furthermore, this is an approach that can eventually benefit all users of ORACLE on parallel and shared-memory multiprocessor machines.

Section 2 (of this database note) describes our query decomposition approach in more detail, including a simple example. Section 3 discusses the critical problems that need to be solved to implement this approach. Section 4 analyzes the applicability of query decomposition with respect to a number of sample queries.

2. Query Decomposition Approach

ORACLE permits the DBA to specify table "striping" in the CREATE TABLESPACE command. A large table may be broken up into a number of files, spread across multiple disks. This is mainly viewed as an OLTP-oriented technique, aimed at optimizing random access to tables. Depending on how the file extents are populated, there may be some degree of data skew in terms of tuple distributions. However, striping is effectively a physical partitioning that we believe is adequate to support query decomposition.

Query decomposition is done by making a number of copies of the original query, and then appending additional predicates to each subquery to make it match one of the existing partitions of one of the tables in the query. These subqueries are then executed in parallel. Finally, a combining query (or function) over the subquery results produces the result of the original query. Most commonly, this is the union over the subquery results.

We use the notation "Q/t/i" to represent the ith subquery resulting from decomposing query Q to match an m-file physical partition of table t, where $i=1, \ldots, n$. Table t is called the partitioning table. We impose the reasonable constraint that $n \leqq m$, so that we don't produce more subqueries than there are underlying data partitions.

To give a simple example, assume that table emp is distributed over files with FILEIDs in the sorted list [2, 5, 91, 112, 113, 115], and that we want three subqueries to be formed from query Q, with emp as the partitioning table. In this case, m=6 and n=3. Assume further that an index exists on emp. location, and recall that in general, the FILEID component of a ROWID in table t can be calculated as SUBSTR(t.ROWID,15,4). Let Q be SELECT*FROM emp WHERE emp.location="Boston". Then we will produce three subqueries:

```
Q/emp/1: SELECT * FROM emp WHERE emp.location="Boston"
    AND SUBSTR(emp.ROWID,15,4)≧2 AND SUBSTR(emp.ROWID,15,4)<91
Q/emp/2: SELECT * FROM emp WHERE emp.location="Boston"
    AND SUBSTR(emp.ROWID,15,4)≧91 AND SUBSTR(emp.ROWID,15,4)<113
Q/emp/3: SELECT * FROM emp WHERE emp.location="Boston"
    AND SUBSTR(emp.ROWID,15,4)≧113
```

The predicates on SUBSTR(emp.ROWID,15,4) can be evaluated using ROWID values from the index on emp.location. Each subquery therefore retrieves its results from a separate partition of the emp table. The union over the three subquery results yields the result of the original query Q. (Note that the predicates on, e.g., Q/emp/1, are equivalent to "AND emp.ROWID>='0.0.2' AND emp.ROWID<'0.0.91'," the form used elsewhere.)

In this query decomposition approach, the degree of parallelism is limited by the number of physical partitions of the partitioning table, but not by the inherent parallelism in the query, as is the case for inter-operator parallelism. In the future it should be possible to leverage our initial work by basing query decomposition on hash-partitioned data, or by decomposing queries according to other criteria than matching data partitions.

3. Critical Problems To Be Solved

Critical problems to solve in implementing this approach are:

(1) Decomposing queries into effectively parallelizable subqueries that match one or more partitions, (2) Submitting subqueries to the DBMS and executing them in parallel, (3) Avoiding excessive query optimization overhead for the multiple subqueries, (4) Producing correctly-optimized access plans for the multiple subqueries, (5) Restricting subqueries to reading only the relevant physical partitions of the partitioning table, and (6) Assembling the results of subqueries.

Our initial cuts at solutions to these problems are presented below. Included are the modest requirements on the ORACLE DBMS that we believe are needed to support external query decomposition and subquery execution.

3.1 Decomposing queries into subqueries

We plan to build a query decomposer module that will read user-specified "comments" on SQL queries and produce the appropriate subqueries. These directives disguised as comments will specify the partitioning table and (possibly) the maximum number of subqueries to be produced. The rules and hints in section 4.4 should help the application programmer to make these choices. The directive language should be consistent with ORACLE's version 7.0 language for passing directives to the query optimizer.

It may also be possible for us to automate the choice of partitioning table. This avoids having to depend on the application programmer to correctly determine which queries can be effectively parallelized and how to do it. However, it requires the decomposer to analyze the entire query and predict optimization strategies.

A few classes of queries will require more than just appending partition-matching predicates to produce effectively-parallelizable subqueries. For example, queries involving the aggregate function AVG will require additional expressions in the target list of each subquery in order to later assemble subquery results correctly. As discussed in section 4, several classes of queries are not effectively parallelizable.

4. Characterization of Decomposable Queries

It is important to understand which queries are decomposable, since this defines the limits of applicability of the proposed decomposition approach. We begin with some useful notation. Then we treat abstract queries Q1–Q12, and more concrete queries Q13–Q16. Finally, we summarize the rules for choosing the partitioning table and join order, and characterize the class of decomposable queries.

This is an initial cut, where we have considered a representative but not exhaustive set of queries.

We assume the use of the ORACLE 7.0 query optimizer, but may not have captured its exact behavior. Many of the same results could be achieved with the 6.0 optimizer.

A reader wishing to skip the details on first reading should jump ahead to section 4.4.

4.1 Notation

As before, Q/t/i represents the ith subquery resulting from decomposing query Q to match an m-file physical partition of table t, where i=l, . . . , n.

To make it simpler to describe the decomposed subqueries in sections 6.2 and 6.3, we introduce the in_interval predicate: in_interval(t.FILEID,i) is true for tuples in the ith group of files for table t. The predicate translates into the appropriate conditions on FILEIDs (i.e., on SUBSTR (t.ROWID,15,4)), as was shown in the example in section 2.

In the discussion, index(t.x) means there exists an index on the x attribute of table t.

A nested loops join, with a as the outer table and b as the inner will be written NLJ(a,b). A merge join of a and b will be written MJ(a,b).

4.2 Abstract queries

Queries Q1 through Q12 are against tables a, b, and c. By starting with simple, abstract queries and adding increasingly complex conditions, we hope to better characterize the applicability of the query decomposition approach. Given our decision-support orientation, we have considered just read-only queries, and not data manipulation statements that do updates, deletions, or modifications.

We assume that all tables are partitioned across multiple disks, so that any table can be the partitioning table for a given query. Some of the case-by-case analyses below depend on the existence of indexes to support join predicates; in a reasonably-designed database, such indexes are usually present. Parallelizing subqueries effectively is taken to mean achieving a significant speedup through parallel execution. We assume that a combining query or function is used on the results of subquery execution.

Simple selection

Q1: SELECT*FROM a

Q1/a/i: SELECT*FROM a WHERE in_interval (a.FILEID,i)

Under ORACLE 6.0 or 7.0, this will result in a full table scan for each subquery, with no performance speedup at all. However, once ORACLE is able to use the extent directory as a FILEID "filter" for this class of query, then the subqueries can be effectively parallelized.

Selection with a predicate

Q2: SELECT*FROM a WHERE a.x=v1

Q2/a/i: SELECT*FROM a WHERE a.x=v1 AND in_interval(a.FILEID,i)

Assume index(a.x). According to ORACLE, the index will be used to apply the predicate on a.x and the predicates on FILEID. This effectively parallelizes the subqueries. If there is no index, then the query can be treated as was Q1, with the a.x predicate being checked against all rows scanned by each subquery.

Simple join

Q3: SELECT*FROM a,b WHERE a.z=b.z

Q3/a/i: SELECT*FROM a,b WHERE a.z=b.z AND in_interval(a.FILEID,i)

Assume only index(b.z). Then the optimizer will generate NLJ(a,b). The tuples in each partition of a are joined with b, using the index on b, effectively parallelizing the subqueries.

If index(a.z) instead, use b as the partitioning table and reverse the roles of the two tables. In other words, generate: Q3/b/i: SELECT*FROM a,b WHERE a.z=b.z AND in_interval(b.FILEID,i)

If index(a.z) and index(b.z), then one of a and b will be chosen by the optimizer as the outer table, and should also be used as the partitioning table. By default, the optimizer will pick the smaller table as the outer one. However, if the smaller table has very few partitions, it is preferable to direct the optimizer to choose the larger table as the outer one, and to use it as the partitioning table as well. In either case, the subqueries can be effectively parallelized.

Finally, in the rare case where no index exists to support the join, then ORACLE will generate MJ(a,b), and will sort both a and b before performing the join. While the query can still be decomposed into subqueries, say Q3/a/i, the problem is that each subquery will sort the entire b table. The likely result is relatively little performance speedup. Note that a parallel hash join operator would help in this case, if it were available.

Strictly speaking, one can do a nested loops join even if there is no index on the inner table. This is appropriate if the inner table is small and can be quickly searched in main memory. The ORACLE 6.0 optimizer can be forced to choose this strategy if desired.

Join with a single-table predicate

Q4: SELECT*FROM a,b WHERE a.x=v1 AND a.z=b.z

Q4/a/i: SELECT*FROM a,b WHERE a.x=v1 AND a.z=b.z AND in_interval(a.FILEID,i)

If index(a.x) and index(b.z), then NLJ(a,b) will be generated. The index on a.x will be used to apply the predicate and to get FILEIDs; this is straightforward and effective. NLJ(a,b) will also be generated if index(a.x) and index(a.z) and index(b.z), with the two indexes on a being intersected before a tuples are retrieved.

If index(a.x) and index(a.z), then b should be used as the partitioning table, since NLJ(b,a) will probably be generated, with the two indexes on a being intersected before inner tuples are fetched. In other words, generate: Q4/b/i: SELECT*FROM a,b WHERE a.x=v1 AND a.z=b.z AND in_interval(b.FILEID,i)

If not index(a.x), Q4 reduces to the Q3 case. In other words, there is no problem unless not index(a.x) and not index(a.z) and not index(b.z). In that case, MJ(a,b) will be generated, and the subqueries cannot be effectively parallelized.

Join with predicates on both tables

Q5: SELECT*FROM a,b WHERE a.x=v1 AND b.y=v2 AND a.z=b.z

Q5/a/i: SELECT*FROM a,b WHERE a.x=v1 AND b.y=v2 AND a.z=b.z AND in_interval (a.FILEID,i)

Q5/b/i: SELECT*FROM a,b WHERE a.x=v1 AND b.y=v2 AND a.z=b.z AND in_interval (b.FILEID,i)

If index(a.x) and index(b.y) and index(a.z) and index(b.z), then nested loop joins are possible with either a or b as the outer table. The choice will be made based on the selectivity of the two single-table predicates D the more selective predicate will be applied to the outer table. If NLJ(a,b) is generated, then Q5/a/i is appropriate; if it is NLJ(b,a), then Q5/b/i is the preferred decomposition into subqueries. Either way, the subqueries can be effectively parallelized.

If only one of the indexes supporting single-table predicates is present, say index(a.x), then Q5 reduces to the Q4 case. If neither is present, then Q5 reduces to the Q3 case.

Three-table join with predicates on two tables

Q6: SELECT*FROM a,b,c WHERE a.x=v1 AND b.y=v2 AND a.z=b.z AND b.w=c.w

We will not do an exhaustive, case-by-case analysis here. The heuristics to use for this query, and for more complicated p-way joins, are the following (generalized from Q3–Q5):

(1) If all tables are indexed (on either a join or a non-join attribute), the application programmer should choose as partitioning table the one with the most selective index on a non-join attribute. This will be the outer table in an initial nested loop join, with FILEIDs taken from its non-join attribute index.

(2) If all tables but one are indexed, choose that one as the partitioning table. This will be the outermost table in an initial nested loop join, with FILEIDs taken from its extent directory.

(3) If two or more tables do not have indexes, the largest of the non-indexed tables should be chosen as the partitioning table. The others should be the last tables to be joined, to minimize sorting costs for the merge join(s) required.

In summary, the preferred join order of tables is: first, the largest unindexed table, if one exists; followed by all indexed tables, in order of decreasing predicate selectivity (including both join predicates and single-table predicates); followed by all remaining unindexed tables, if any. This supports access plans that consist of one or more nested loops joins, followed by zero or more merge joins.

Join with an ORDER BY clause

Q7: SELECT*FROM a,b WHERE a.z=b.z ORDER BY a.x

Q7/a/i: SELECT*FROM a,b WHERE a.z=b.z AND in_interval(a.FILEID,i) ORDER BY a.x

Assume the existence of at least one useful index, so that an effective decomposition exists without the ORDER BY clause. It is up to the combining query or function to handle the final step of merging sorted subquery results. This can be generalized: any multi-way join that can be effectively parallelized can still be effectively parallelized when a simple ORDER BY clause is added. Expressions in the ORDER BY clause may cause a problem, however.

Simple aggregate retrieval

Q8: SELECT MAX(a.x) FROM a

Q8/a/i: SELECT MAX(a.x) FROM a AND in_interval (a.FILEID,i)

The subqueries themselves can be effectively parallelized, but the union of the subquery results clearly does not produce the correct result for the query. What is needed is a combining query or function over the union of the subquery results that selects (in this case) the maximum value.

Distinct value selection

Q9: SELECT DISTINCT a.x FROM a WHERE a.y=v1

Q9/a/i: SELECT DISTINCT a.x FROM a WHERE a.y=v1 AND in_interval(a.FILEID,i)

The subqueries can be effectively parallelized. Since ORACLE currently does a sort on a.x for each subquery in order to weed out duplicates, the subquery results are assumed to be sorted on this field. Combining the subquery results then requires just one more level of duplicate elimination. The keyword DISTINCT can also appear inside of an aggregate function (e.g., AVG (DISTINCT a.y)). This construct cannot be effectively parallelized; it is impossible to combine subquery results in a meaningful way.

Aggregate retrieval with a GROUP BY clause

Q10: SELECT MIN(a.x) FROM a GROUP BY a.y

Q10/a/i: SELECT MIN(a.x) FROM a WHERE in_interval(a.FILEID,i) GROUP BY a.y

This is similar to query Q8. It is possible to generate parallel subqueries, and execute them effectively. Combining the results requires merging the result groupings produced by the subqueries.

HAVING clause with an aggregate

Q11: SELECT a.x, MIN(a.y), AVG(a.z) FROM a GROUP BY a.x HAVING MIN(a.y)<v3

Q11/a/i: SELECT a.x, MIN(a.y), AVG(a.z) FROM BY a.x HAVING MIN(a.y)<v3

This subquery formulation will not lead to the correct result for the original query. The problem is that the HAVING MIN(a.y)<v3 is only applied to a tuples for which in_interval(a.FILEID,i) is true (i.e., tuples in the subquery's partition). In fact, the HAVING clause should be applied to all a tuples instead.

If the form above is too abstract, think of: SELECT emp.deptno, MIN(emp.sal), AVG(emp.sal) FROM emp GROUP BY emp.deptno HAVING MiN(emp.sal)<40000

Correlated subquery

Q12: SELECT a.x, a.y, a.z FROM a aa WHERE a.x=v1 AND a.y>(SELECT AVG(a.y) FROM a WHERE a.z=aa.z)

Q12/a/i: SELECT a.x, a.y, a.z FROM a aa WHERE a.x=v1 AND in_interval(a.FILEID,i) AND a.y>(SELECT AVG(a.y) FROM a WHERE a.z=aa.z)

This seems to be effectively parallelizable. The correlated subquery will be evaluated once for each tuple in table a satisfying the single-table predicate, but that happens in parallel, matching the partitioning of the table.

If the form above is too abstract, think of: SELECT emp.location, emp.sal, emp.dept FROM emp empxx WHERE emp.location="Boston" AND emp.sal>(SELECT AVG(emp.sal FROM emp WHERE emp.dept=empxx.dept)

4.3 Concrete queries These are divided by type of database design.

Datacube-design query

Q13: SELECT SUM(sales.volume), product.name FROM sales, product WHERE product_code≧6 AND product_code<12 AND sales.region="Boston" AND sales.quarter="Q2" AND sales.year=1990 AND product.product_code=sales.product_code GROUP BY sales.product_code This query is effectively parallelizable, given a sophisticated combining function.

Hierarchical-design query

Q14: SELECT emp.last_name, emp.first_name FROM emp WHERE (dept.dept_name="MFG" OR dept.dept_name="QC") AND emp.deptno=dept.deptno AND EXISTS (SELECT training.type WHERE training.type="Quality Control" AND training.date>"010188" AND training.emp_name=emp.emp_name) This matches the form of Q12, and is effectively parallelizable.

Event-design queries

Q15: SELECT claim.amt, claim.classification, vehicle.vno FROM claim, vehicle WHERE claim.amt>10000 AND vehicle.state='MA' AND (claim.classification="Suspicious" OR claim.classification IS NULL) AND claim.vno=vehicle.vno Assuming reasonable indexes (say, at least index (vehicle.vno)), this is effectively parallelizable. It matches the form of Q5 with a few extra predicates.

Q16: SELECT*FROM policy, vehicle, more_vehicle_info, claim, estimate WHERE vehicle.coverage_date>"010190" AND estimate.claim#=claim.claim#AND claim.veh#=vehicle.veh#AND more_vehicle_info.veh#=vehicle.veh#AND policy.pol#=vehicle.pol#

This is effectively parallelizable, with vehicle as the partitioning table (since indexes are assumed to exist on all relevant join fields). If claim and estimate tables are clustered, then one less join needs to be done.

4.4 Heuristic rules

The following heuristic rules characterize the choice of partitioning table (also referred to as "driving table" elsewhere) and join order, and the set of decomposable queries (assuming that the underlying tables are all partitioned). We expect these rules to be refined over time. A first implementation may use the first table in the optimizer's EXPLAIN plan as the partitioning table.

Choice of partitioning table (1) If all tables are indexed (on either a join or a non-join attribute), choose as partitioning table the one with the most selective index on a non-join attribute. This will be the outer table in an initial nested loop join, with FILEIDs taken from its non-join attribute index.

(2) If all tables but one are indexed, choose that one as the partitioning table. This will be the outermost table in an initial nested loop join, with FILEIDs taken from its extent directory.

(3) If two or more tables do not have indexes, the largest of the non-indexed tables should be chosen as the partitioning table. The others should be the last tables to be joined, to minimize sorting costs for the merge join(s) required.

Choice of join order (4) The preferred join order of tables is: first, the largest unindexed table, if one exists; followed by all indexed tables, in order of decreasing predicate selectivity (including both join predicates and single-table predicates); followed by all remaining unindexed tables, if any. This supports access plans that consist of one or more nested loops joins, followed by zero or more merge joins.

Decomposable queries (5) Queries containing any of the aggregate functions AVG, SUM, COUNT, STDDEV, and VARIANCE, modified by the keyword DISTINCT, cannot be effectively parallelized, because subquery results cannot be correctly combined to produce the result of the original query.

(6) If an otherwise effectively parallelizable query contains AVG in a target list expression, the query is still effectively parallelizable, assuming a sophisticated combining function or query. However, additional expressions (i.e., COUNT and SUM) in the target list of each subquery need to be generated so that subquery results can be assembled correctly.

(7) Similarly, otherwise effectively parallelizable queries containing the aggregate functions STDDEV or VARIANCE can be effectively parallelized through target list modification and a sophisticated combining query.

(8) If an otherwise effectively parallelizable query contains a GROUP BY clause (i.e., a single field reference to a field in the target list), the query is still effectively parallelizable.

(9) If an otherwise effectively parallelizable query contains a HAVING clause, then the query is still effectively parallelizable by moving the having clause to the combining query.

(10) If an otherwise effectively parallelizable query contains a simple ORDER BY clause (i.e., a position reference to the target list, or a single field reference to a field in the target list), the query is still effectively parallelizable.

(11) If an otherwise effectively parallelizable query contains a SELECT DISTINCT, it can be effectively parallelized. In contrast to rule (6), DISTINCT is applied here to an expression in the target list.

(12) Non-flattenable nested subqueries can be effectively parallelized, if they do not contain any other problematic constructs.

(13) Clustered tables (such as emp kept clustered with dept) do not block effective parallelizability.

Query Decomposition in ORACLE for KSR
Preliminary Design (Database Note #26)

1 Introduction

The process of decomposition requires the following questions to be answered:

a) Is decomposition enabled?

b) Can this query be correctly decomposed?

c) Will decomposition be effective for this query?

d) Which table should be used for partitioning?

e) What is the degree of partitioning (i.e., number of subqueries)?

Decomposition will be done when the answers to (a), (b), and (c) are yes. The user will always retain the ability to disable decomposition if desired. We intend to automate the answers to all of these questions.

An application programmer can override any of the automatic decomposition decisions by using directives in the SELECT statement, in the form of embedded comments. The exact form of these directives are not described in this database note, but will adhere to the style used in ORACLE. For purposes of this database note, we will make some rational guesses about what they might look like.

Query decomposition can be used with Pro*COBOL, Pro*C, SQL*Plus, OCI, SQL*Report, and possibly SQL*ReportWriter when it gets rewritten to use UPI in ORACLE version 7.0. (It might also work with the precompilers for other languages, but we will make no special effort to insure that.) We would like to support QD for PL/SQL, but have not yet determined how much additional work would be needed, if any.

The parallel execution of queries via QD can be selectively enabled and disabled without changing any application code. A parallel application can be written and initially tested in serial mode. After it is working correctly, parallelization can be turned on with some kind of switch.

We have a strong desire to preserve the existing application programming model and avoid embedding the notion of parallel programming in the application. An ORACLE application processes queries by iteratively performing fetches on a cursor, which steps through a virtual table of result rows. This result table does not necessarily exist as a complete entity at any point in time. It is frequently constructed on the fly, so that the result rows effectively "pass through it" on their way to the application. The application has the illusion of fetching directly from this virtual table.

In general, we will use combining functions to assemble subquery results into the final result. The possibility of storing all subquery results in intermediate tables, and then using a separate combining query to read these tables, was also considered. It was rejected as an overall approach, but might be used in some situations where aggregation has reduced the cardinalities of the intermediate tables.

Under our chosen approach, the results of parallel subqueries need not be stored in actual tables. Instead, we will try to maintain the concept of virtual result tables at the subquery level. When the application fetches from a cursor, we would like some or all of the subqueries to fetch from their corresponding cursors, as needed, with the results combined to return the appropriate row to the application. In this way, the results from all the subqueries would exist only in virtual tables, and not require any significant memory or I/O.

2 Design Overview

One of our design goals is to modularize query decomposition to allow that code to be maintained separately from the rest of the ORACLE code. This follows Oracle's policies on port-specific modifications and will simplify the appropriate sharing of maintenance between KSR and Oracle.

The UPI (User Program Interface) is the common point of access to the ORACLE kernel for all applications. A parallel UPI library (PUPI, pronounced "puppy") will be developed that intercepts each call to UPI (for performing operations like connect, parse, fetch, etc.) and generates multiple calls to UPI, which generally will be executed in parallel (see FIG. 26-1).

This is only a conceptual view; in some cases, it will actually work a little differently. For example, during a CONNECT, we don't know how many additional connections to make because we don't yet know how many subqueries there will be. Therefore, the additional connections must be deferred until later.

Most of our work will be implementing the PUPI, although a few enabling hooks might need to be added to other areas of the code. In principle, KSR ORACLE should be runable without the PUPI.

PUPI will pass the original query on to UPI to have it parsed and verify that the syntax is correct. After that, the query will be scanned to parse the parallel directives, if may. By default, we will decompose any queries where it is correct and effective to do so, as long as decomposition has been enabled. The user can override the decision to decompose or the choice of partitioning table. Once the partitioning table has been determined, the PUPI will look up the table name in ORACLE's catalog to find out the number of files comprising it and the list of file_id's. The number of files determines the number of subqueries and, therefore, the number of additional connections to ORACLE that are needed.

Multiple subqueries will be generated as copies of the original query with an additional predicate appended to them, specifying which data partition to use. Each partition corresponds to exactly one physical file.

In order to correctly combine some subquery results, we may need to augment or otherwise transform the subquery select lists. For example, when the query contains an AVG function, we will also need to have each subquery return the number of rows used in calculating its average. Each AVG function in a query might use a different row count, since ORACLE does not include NULL values when calculating averages. Therefore, for each "AVG(XXX)" in the original query, we need to replace "AVG(XXX)" with "SUM(XXX)" and append "COUNT(XXX)" to the select list in each subquery. SUM is quicker to compute than AVG and will reduce the accumulation of roundoff errors when computing the overall average.

Before the subqueries are parsed or executed, additional connections must be made to the same database, which is not necessarily the default database. (Initially, we might require that the default database be used, and later extend query decomposition to any database.) The additional connections will only exist during the execution of the subqueries. Each subsequent query must establish its own subquery connections, based on the partitioning of that query.

After parsing the subqueries, allocate and open a cursor for each of them. The concept of a parallel cursor is introduced here (see FIG. 26-2). It will maintain the relationship between the cursor for the original query (the root cursor) and the cursors for the corresponding subqueries (subcursors). This will allow ORACLE to do parallel fetches from multiple cursors on behalf of an application.

Rows will be fetched asynchronously from the subcursors and returned to the application as needed. The rows returned from the subcursors may need to be combined or ordered in some way before the root cursor's fetch can be satisfied. See the Parallel Cursors section below for more details.

When the root cursor is closed, close all the subcursors associated with it and disconnect the corresponding sessions. This could also be done for each subcursor when it reaches end of file, to free up some resources sooner. If a COMMIT or ROLLBACK is done by the application, we must do one for each of the connections we have.

4 Design Details 4.1 Determining the Number of Subqueries

It is reasonable but, perhaps, not optimal to have more than one file per subquery. Maximum parallelism (and performance) is achieved when all files are being processed at the same time. However, it makes no sense to have more subqueries than files. Since we cannot partition the work into units smaller than a file, the extra subqueries would have nothing to do. In the first implemenation, the number of subqueries will be exactly the number of files.

Since we need to query the database to find out the file_id's, that will also tell us how many files there are and, therefore, how many subqueries to generate. There is no need for the application to tell us this, since we already know the correct answer. It requires no extra work to automate this, and it avoids checking for and dealing with incompatibilities between what the application tells us and what really exists.

This could be changed later when there is explicit support for parallel reads. Until then, assigning one subquery to each file is one way to get the same benefits indirectly. Reducing the number of subqueries will reduce some of the overhead of query decomposition. This will improve performance, as long as we can still read the same number of files in parallel.

4.2 Parallel UPI Library

The PUPI will consist of a set of functions that have the same external interface as their UPI counterparts, but will call the appropriate UPI functions multiple times. Not all the UPI functions will be duplicated in the PUPI, since not all of them can be or need to be parallelized. We need a way to easily switch between serial and parallel query processing. At different times, the same application may call either UPI or PUPI functions without (by our own requirements) changing any code. (See FIG. 26-3. The three functions shown in each library parse a query, execute it, and fetch the results. There are many more functions that need to be implemented.) The "Application" in this figure can be assumed to include SQLLIB and OCI, i.e., everything above the UPI level.

All references in the existing code to UPI functions will be effectively changed (probably via conditionally-compiled macros so the actual code doesn't have to be touched) to function variables which can be assigned the name of a specific function at runtime (e.g., either pupiosq or upiosq). The initialization routine pupiini (parallel upi initialize) will be called at appropriate times to set the function variables to the proper values. This needs to be done shortly after each application is started up, and each time thereafter that parallel processing is enabled or disabled.

Note: A slight modification to this scheme will be needed to handle the case of a parallel cursor and a non-parallel cursor being active at the same time. The macros could conditionally invoke the PUPI routines whenever a parallel cursor was referenced, or the PUPI routines could be called unconditionally, and optionally pass the calls directly to the UPI without modification.

4.3 Multiple Connections

The UPI maintains a hstdef(host definition) structure for every connection that exists. We will allocate a hstdef for each additional connection we need (one for each subquery). The proper hstdef for each connection must be referenced when performing any actions related to the subqueries.

The extra connections can't be made until after the original query has been parsed and the number of subqueries has been determined. At that time, we will also have access to the hstdef that was set up on the first connection, which may contain information we need in order to make additional connections to the same database. (We need to have access to the connect string (user, password, host, etc.), or its equivalent. Without that, we have no way of knowing where the original connection was made.) We may also need access to the transaction time stamp in order to insure read consistency, depending on how Oracle chooses to implement that feature.

4.4 Parsing/Generating Subqueries

If the parser detects errors in the query, no decomposition will be done, since the subqueries will have the same errors, if not more. Any error messages issued by ORACLE at that time will refer to the original query. Subsequent errors in parsing the subqueries will likely be due to bugs in our code that generated invalid SQL. In that case, we should display a message that is meaningful to the user, to the effect that query decomposition has failed. To support debugging and offer a clue to possible workarounds, we should also display the error reported by ORACLE, along with the offending subquery.

After the query has been successfully parsed, we need to scan it to search for "PARTITION=", embedded within a comment. The next token will be the partitioning table name. Look up this table in the view ALL_TABLES to get the tablespace_name for it. Then look up the tablespace_name in the view ALL_DATA_FILES to get a list of file_id's. The number of file_id's is how many subqueries are needed. (ALL_DATA_FILES doesn't yet exist, but could be created as a duplicate of DBA_DATA_FILES, with the additional condition that the tablespace_name must exist in ALL_TABLES. Alternatively, a public synonym could be created for DBA_DATA_FILES, with public select access. It depends on how concerned users are about letting everyone see what database files exist on the system.)

All of the subqueries will initially be copies of the original query. Then, a predicate in the form of FILEID=n needs to be added to each one. The proper place for this depends on the form of the query (refer to the examples below). The rest of the WHERE clause, if any, needs to be enclosed in parentheses and preceded by "AND" to insure the desired precedence. Views containing joins may present additional problems and need to be studied further.

4.5 Combining Functions

Returning the proper results to the application is not simply a matter of putting the rows from the various subqueries in the right order. Sometimes, several subquery rows are needed to produce a single result row—a result row being what the application sees.

A set of combining functions will be developed to produce a single result row for the application from all of the subquery rows available for consideration. Only the most recent row from each subquery needs to be considered. The specific method used for merging or ordering the subquery results is completely dependent on the nature of the query. The existence of aggregate functions, ORDER BY, or GROUP BY clauses are the main factors to consider. Sometimes multiple combining functions need to be applied to the same query. For example, the query

SELECT MIN(SAL), MAX(SAL) FROM EMP GROUP BY STATE.

would require three combining functions to be applied.

As mentioned above, in order to effectively determine what combining functions are needed for each query, we will need to determine or request certain information about the form of the query.

Several questions need to be answered when deciding how to combine subquery results. The two main ones are:

a) Which subquery rows do we want to use?

b) How do we combine those rows?

Which rows depends on the form of the query and the specific data values in the subquery results. How to combine the rows depends only on the form of the query. We are considering using combining queries to handle complex situations (e.g., HAVING clauses or expressions in the select list).

4.5.1 Selecting Subquery Rows

In selecting or constructing a row to be returned to the application, we need to examine the most recent row fetched from one or more of the subqueries. If there are no aggregates in the query, then only one row from one subquery will be selected to satisfy each root cursor fetch. If there is an aggregate, then rows from several subqueries might be selected and combined into a single row.

No aggregate:

If there is no ORDER BY clause, then this is a simple union. Take one row at a time from each subcursor, in round-robin fashion.

If there is an ORDER BY clause, then the sorted results of each subquery need to be merged. For each root cursor fetch, take the row with the highest or lowest sort column values, depending on whether ASC or DESC was specified. We must take into account the collating sequence currently in effect when determining high and low values.

With an aggregate:

If there is no GROUP BY clause, then each subquery will have returned a single row containing the aggregate result for its partition. Combine all of these rows into a single row, using the appropriate aggregate function(s).

If there is a GROUP BY clause, then all the possible group values may not be present in every subquery result.

Query examples:

```
Before: SELECT ENAME FROM EMP;
After:  SELECT ENAME  FROM  EMP WHERE FILEID=1;
Before: SELECT ENAME, SAL FROM EMP WHERE SAL < 10000  OR  JOB='CLERK'
   ORDER BY SAL;
After:  SELECT ENAME, SAL FROM EMP WHERE FILEID=1 AND (SAL < 10000
        OR JOB='CLERE') ORDER BY SAL;
```

For example,

SELECT DEPTNO, AVG(SAL) FROM EMP GROUP BY DEPTNO; might produce the following partitioned results:

| DEPTNO | AVG (SAL) | DEPTNO | AVG (SAL) | DEPTNO | AVG (SAL) |
|---|---|---|---|---|---|
| 10 | 1500 | 10 | 2000 | | |
| 20 | 2250 | 20 | 3200 | 20 | 4000 |
| 30 | 1700 | 30 | 1100 | | |

In this case, the combining function cannot simply take one row from each subquery and combine them. It needs to select and combine rows where the group values match each other. For the first root cursor fetch, all the DEPTNO 10's will be combined; the next fetch will combine the 20's, etc. Since GROUP BY implies ascending ordering before the aggregate function was applied, we can select the lowest available group value and all of its duplicates.

4.5.2 How to Combine Subquery Rows

Once the rows to be returned to the application have been selected, we need to combine them into a single row. If only one row was selected, obviously no combining is necessary. The particular combining technique to be used is dependent only on the form of the query, not on any specific data values.

The need to combine multiple rows implies that the query has at least one aggregate. Combining can be viewed as collapsing several rows into one. All the eligible subquery rows are identical in the non-aggregate columns. These columns can simply be copied into the result row. The aggregate columns can be combined by calling the appropriate combining function, passing the column number and pointers to the relevant rows. Note that averages need some special handling—the corresponding COUNT column also needs to be identified and taken into account by the combining function.

Example:

Assume columns 1,2 are not aggregates and columns 3,4 are.

```
for column = 1, 2
  copy column_value(column, row_ptr) to result
for column = 3, 4
  copy combining_function(column, set_of_row_ptrs) to result
```

After processing and disposing of each subquery row, set the buffer state to empty and notify the appropriate fetch thread so it will initiate another asynchronous fetch.

Array fetches will need some special consideration. The combining functions may have to be called iteratively until the array is full.

4.6 Error Handling

A detailed description of all possible errors has not yet been created. When we do, we should try to classify errors into the following severity categories and decide how each of them will be handled in each of our several versions:

- The user requested decomposition and the query cannot be decomposed correctly.
- The user requested decomposition and the query can be correctly decomposed, but not effectively. It may even run slower.
- Infinite loop, ORACLE or application crash, or database damage.

Error handling might get a little tricky with multiple fetches going on at once. If any of the subcursor fetches encounters an error, bubble it up to the root cursor so the application knows about it. Maybe we need to terminate all the other subqueries, too. The P1 version might not be too robust in this area, and more issues will probably be uncovered during implementation. I haven't tried to predict them all at this time.

5. Limits of Parallelization

The potential degree of parallelization, using query decomposition, is limited by several factors:

- The number of physical files comprising the partitioning table
- Data skew or partition skew in the partitioning table, with respect to the query. I am defining data skew here to mean any distribution of data that causes result rows to be fetched from the subcursors in something other than round-robin fashion. For example, sorted output may appear in clumps so that several rows in succession from the same subcursor are returned to the root cursor. During such periods of time, little, if any, parallel fetching will occur. This phenomenon may appear and disappear many times during the course of a single query. Increasing the number of fetch buffers per subquery will help to minimize the effects of this type of data skew.
- Partition skew is defined as a distribution of data that results in unequal-sized partitions. During the latter part of query execution, and possibly even during the entire query, some partitions will have no more rows to fetch. This will reduce the degree of parallelism for the remainder of the query. The database partitions may actually be equal in size, but the effective partition size for any given query might be reduced by predicates in the query.
- The cost of the combining functions, relative to the cost of executing the subqueries
- The amount of processing done by the application for each row (single-threaded)
- ORACLE or OS limits on the number of processes, threads, connections, etc.
- Overhead of opening, closing, and maintaining extra connections and cursors.
- The number of partitions is limited by the maximum number of database files ORACLE supports, which is currently 256. To achieve a higher degree of parallelism (through query decomposition) we will need to increase the file limit, while reducing the maximum number of blocks per file by a corresponding factor.
- Bear in mind that query decomposition is designed to work in conjunction with other parallel processing techniques, such as parallel relational operators and pipelining. Thus, we are not depending solely on QD for parallelism in query processing.

Query Decomposition and ORACLE Clustering Techniques (Database Note #76)

This is an informal discussion which is a first attempt to pull together in one place the issues involved in using Query Decomposition in conjunction with ORACLE's clustering techniques and ORACLE's approaches to laying out extents and data blocks within files. A primary immediate goal is to identify assumptions about ORACLE's behavior which need to be verified, and questions which need to be answered by either of these means. A medium term goal is to develop application design guidelines for use in modeling and pilot projects. An ultimate goal is to develop end-user documentation providing DBAs with detailed guidelines for planning and configuring their databases and applications to make the best use of QD in conjunction with ORACLE's native techniques for optimizing data access.

Overview of Basic Query Decomposition Mechanism

Our Query Decomposition parallelizes a query by dividing it into subqueries, each of which use a rowid range predicate to specify one or more files to which that query's reads will be restricted. The approach depends on partitioning tables across files on multiple disk drives, so that the files can be read in parallel. So, for a trivial example, if the table EMP is partitioned across 3 files with ORACLE fileid's 1, 2, and 3, then the query SELECT*FROM EMP can be decomposed into three subqueries:

SELECT*FROM EMP WHERE ROWID>='0.0.1' and ROWID<'0.0.2'

SELECT*FROM EMP WHERE ROWID>='0.0.2' and ROWID<'0.0.3'

SELECT*FROM EMP WHERE ROWID>='0.0.3' and ROWID<'0.0.4'

The first query will only read blocks of the EMP table which are in file 1, the second will only read blocks from file 2, and the third from file 3. This is an example of decomposing a full table scan: the overall query needs to read all blocks of the table, and we gain near-linear speedup by reading the separate files across which the table is partitioned in parallel. The total number of reads has not been changed, but they happen in parallel. ORACLE has been modified to restrict reads during full table scans, based on rowid range predicates, as a necessary prerequisite to implementing this approach.

Query Decomposition can also work with queries that use an index. Suppose our query were SELECT*FROM EMP WHERE DEPTNO=5, and there is an index on DEPTNO. This can be decomposed similarly to the first example:

SELECT*FROM EMP WHERE DEPTNO=5 AND ROWID>='0.0.1' and ROWID<'0.0.2'

SELECT*FROM EMP WHERE DEPTNO=5 AND ROWID>='0.0.2' and ROWID<'0.0.3'

SELECT*FROM EMP WHERE DEPTNO=5 AND ROWID>='0.0.3' and ROWID<'0.0.4'

Each of these subqueries must redundantly read the same index blocks, to find index entries for DEPTNO 5, but hopefully the index blocks will be cached by the first subquery which gets to each one, so they are only read once. When a subquery finds an index entry for DEPTNO 5, however, it will examine the rowid stored in that index entry, to see whether it fall within the range for that subquery. Only if it does will that subquery read the data page containing the row with that DEPTNO value and rowid. Speedup is not as close to linear as with full table scans, because only the table reads are partitioned. Logically, the total reads are increased due to redundant reading of the index, but the redundant reading happens in parallel, and hopefully caching will eliminate most actual redundant I/O.

Using QD with indexed queries depends on ORACLE implementing the feature of restricting table reads during indexed scans to blocks which fall within the specified rowid range predicate. ORACLE has not yet implemented this feature, but KSR has devised an interim implementation in our port of ORACLE 7.0.9. (KSR still relies on ORACLE to implement a "real" solution, because our interim solution is unduly CPU-intensive, since it re-evaluates the rowid range predicate for every fetch, rather than once when a cursor is opened.)

Both full table scan QD and indexed scan QD rely for their effectiveness on good distribution of target data across the files of a partitioned table. For full table scans, this means that ideally each file should contain an equal proportion of the total blocks of the table, even when the table has only been loaded to a fraction of its capacity. For indexed scans, it also means that rows with duplicate key values, or rows with adjacent values of a unique key, should be well-scattered among the partitioning files, rather than contained within one or a few files.

Query Decomposition and Clustering

Query Decomposition as described above speeds up query execution by parallelizing the reads involved in a query, but not by reducing their total number. While this improves individual query response time, it does not improve system throughput (and may even reduce throughput, due to the added overhead of additional threads and processes, and of redundant index reads).

ORACLE's clusters and hashed clusters are approaches to speeding up query execution by greatly reducing the number of reads needed to accomplish certain queries. "Regular" (i.e. non-hashed) clusters reduce the reads needed for commonly-executed joins by clustering together the rows of several related tables based on common join column values, further reducing the number of blocks needed to read a related set of rows by storing each cluster key value only once for all rows of all tables sharing that key value. This kind of cluster still has an associated index on the cluster key, but the index entries simply point the to root block for the cluster key value, rather than having separate rowid entries for individual rows.

Hashed clusters reduce reads for queries which seek rows of an individual table that exactly match a given key value. Rows with key values that hash to the same hash key value are clustered together, and no index is needed to navigate directly to the root block for a given hash key value.

Both of these clustering approaches require that a DBA decide in advance which access paths are likely to be used frequently enough to require organizing the data in a way that optimizes them. A given table can only be clustered on one column or set of columns, and doing so reduces performance of updates which change the values of cluster key columns. Query Decomposition has more general applicability: as long as a DBA decides in advance to partition a given table across multiple disks, Query Decomposition can be used on that table for any query that uses either a full table scan or any regular index, rather than being restricted to queries with predicates on certain predetermined columns.

In general, Query Decomposition and clustering cannot be used in conjunction to optimize access to the same table in the same query. This is so because accessing a table through a cluster key, whether hashed or otherwise, does not use either a full table scan or a regular indexed scan. Instead, it uses the cluster index (for regular clusters) or hashing to find the root block for the cluster key value. Then, if all rows for the specified cluster key value are in that one block, that's all that has to be read, so there's no opportunity for parallel partitioning. Otherwise, all of the chained blocks for that cluster key value must be read in sequence, whether they are in the same or different files. Even in the case of a regular cluster where an index is used, the index entry for a particular key value just points to the first block of the overflow chain, so there's no opportunity to examine rowid's and decide whether they fall in a specified range, to decide whether to read a data block.

Thus, it would appear that there is no opportunity for the QD and clustering techniques to leverage each other to retrieve a particular table. (They can leverage each other to retrieve a join, in cases where the driving table of the join is partitioned an can be retrieved using QD, and where that table contains a foreign key that can be used to join to other tables that are clustered on that key.) However, KSR has devised a way of leveraging QD with hashed clustering, by using hashed clusters in a way rather different than that envisioned by ORACLE, in an approach we may designate "small bucket hashing".

Small Bucket Hashing (elsewhere called "Scatter Clustering")

If an index has a fairly small number of distinct values, relative to the number of rows in a table, and if rows with a given index value can be scattered anywhere in the table, without regard to their key value on that index, then even after using the index, a much larger volume of data may have to be read from the table than the volume represented by rows with the desired key values, because only a small fraction of each block read consists of the desired rows. In the worst cases, all blocks of the table must be read, so that performance is worse than if the index isn't used at all (because of the extra reads of the index, and because of the higher proportion of random to sequential I/O's). QD can ameliorate the problem by splitting up the load in parallel, but it remains the case that if the index doesn't provide speedup relative to full table scan without QD, then it won't provide speedup relative to full table scan with QD.

If rows with matching key values could be clustered together, then using an index would reduce the total I/O in a much wider variety of cases, again, with or without QD. This is essentially what ORACLE clusters accomplish. Now, if instead of clustering rows with a given key value into one clump, they could be clustered in N clumps, where N is the degree of partitioning of the table, and if these N clumps could be read in parallel (i.e. if QD could be applied), we'd be better off by a factor approaching N.

This can be accomplished by the following trick: create a hash cluster keyed on the desired columns, in a partitioned tablespace (i.e. the hash cluster is partitioned over multiple files, on multiple disks). Estimate the expected volume of data for each distinct key value, as you would for an ordinary hashed cluster. But instead of using that volume as the size to specify for a hash bucket when creating the hashed cluster, specify a much smaller bucket size (at the largest, V/N where V is the volume of data for each distinct key value, and N is the number of table partitions). Assuming that your ORACLE block size is also no larger than V/N (i.e. that V is large enough to be at least N*blocksize), when you load the table you get an overflow chain for each key value that has at least N blocks (just the opposite of the usual goal in configuring a hashed cluster). If you load the table cleverly (and we'll need some further experimentation to define cleverly in this context, but probably loading in random hash key sequence will work, if your order of extents round-robins through the files), you end up with the blocks for each overflow chain well-distributed among the files of the partitioned table.

Now, create an (ordinary) index on the SAME columns as the hash columns. Because it is an ordinary index, each index entry consists of a key value/rowid pair, which points directly to the block containing the row in question. Also because it is a regular index, it can be used for range predicates as well as direct match predicates.

When presented with a query that has an exact-match predicate on the hash key columns, the ORACLE optimizer will choose hashed access rather than using the index on those same columns, because under normal circumstances, hashed access would unquestionably be faster. However, when the Query Decomposer notices (in the EXPLAIN plan) that ORACLE has chosen hashed access, and that there is a regular index which has all of the columns of the hash key as its leading columns, it can generate an INDEX optimizer hint in the parallel subqueries, coercing the ORACLE optimizer to use the regular index rather than hashing. Since the parallel subqueries have rowid range predicates, this regular indexed query can be decomposed like any other. But because the data is clustered on the same column values, with blocks for each cluster key value well-distributed among the files of the partitioned table, many fewer blocks need to be read than if this were not a hashed table.

As an example, consider the query:

```
SELECT*FROM HASHED_TABLE WHERE HASHKEY_
  COLUMN=5
```

This would be decomposed into parallel subqueries of the form:

```
SELECT /*+ INDEX(HASHED_TABLE REGULAR_INDEX) */*
FROM HASHED_TABLE
  WHERE HASHKEY_COLUMN = 5 AND ROWID >= <low end
                                  of range>
                                  AND ROWID < <high end
                                  of range>
```

where a partitioned table called HASHED_TABLE is hashed on the column HASHKEY_COLUMN, and there is also an index called REGULAR_INDEX on that same column.

The regular index may optionally contain additional trailing columns, beyond those which match columns of the hash key. This means it can be used to further restrict the rows read, according to additional predicates in the query. This could be particularly useful to give added flexibility, because a hash key must be decided upon by a DBA before a table is created, and once the hashed table is populated, it would require a complete reorg to add additional hash key columns. It is much easier, however, to add columns to an index (or replace it with a different index) without affecting the data itself. So if additional frequently-used selection criteria are identified after a hash table already exists, these columns could be added to the regular index.

If more than one regular index has leading columns matching the hash key (but with different trailing columns), the Query Decomposer must choose one of these indexes arbitrarily, as the one it will tell ORACLE to use, because it is not equipped to perform the function of a full-fledged query optimizer, to analyze the predicates in the query and decide which index would be best to use. In this event, however, the user may optionally choose the index by placing the INDEX optimizer hint in the original query. The Query Decomposer always leaves any hints from the original query in the parallel subqueries, to provide the user this extra degree of customized control over optimization when needed in this or other situations.

Supporting Query Decomposition for Applications Running on Client Workstations
(Database Note #61)

1 Introduction

Our Query Decomposition (QD) approach exploits the shared-memory parallel architecture of the KSR1 to speed up the execution of large ORACLE queries. It is our aim to support this approach for as wide a range of queries, and within as wide a range of ORACLE applications and contexts, as is feasible.

ORACLE applications use a client-server architecture in which all database access is performed on behalf of an application program by a separate server or "shadow" process. While this architecture is used even when the client application and the server are running on the same machine, ORACLE's SQL*Net network software supports the seamless connection of remote clients and servers running on heterogeneous platforms. This permits the KSR1 to play the role of database server for a network of workstations, a configuration which is becoming increasingly prevalent, and may be preferred or even required by some potential KSR customers.

Clearly, it would be desirable for Query Decomposition to work for queries issued from applications running on client workstations, against a KSR1 database server. While this does not pose a problem for the internal design of the QD code, it will require significant changes to the architecture by which QD is integrated with ORACLE. Section 1 below explains why remote workstations cannot be supported by the current QD architecture; Sections 3 and 4 present alternate architectures to solve the problem; and Section 5 draws conclusions about which architecture is likely to be preferable, and how much effort will be required to implement it.

2 The Problem

If Query Decomposition were implemented as an integral part of ORACLE, the most natural approach would be to decompose a query inside the ORACLE kernel (which is in the server), and parallelize that portion of the kernel required to execute the parallel subqueries into which the original query is decomposed. Since KSR is implementing QD as a separate body of code which must be integrated with ORACLE as seemlessly as possible, but with the minimum necessary changes to ORACLE code, a rather different approach was chosen: QD is integrated with ORACLE within the ORACLE UPI (User Program Interface) layer. See DBN #26, Query Decomposition in ORACLE for KSR—Preliminary Design, for a detailed explanation of this design.

This is the common set of function calls underlying all of the ORACLE front-end tools and APIs. UPI calls accomplish their functions by sending messages to the ORACLE server, which are serviced by corresponding OPI (ORACLE Program Interface) routines. Because the UPI is a part of client programs rather than a part of the ORACLE server, no architectural changes were required to the ORACLE kernel to implement this approach. Though, some changes were required in the mechanics of indexed and full table scans, to facilitate parallel partitioning Our version of the UPI is called the PUPI (Parallel User Program Interface). This set of routines emulates the calling sequence and behavior of the UPI routines, but is also capable of decomposing a query into parallel subqueries, creating and managing the threads in which those parallel subqueries are executed, and combining the results to emulate the result of the original query. For each parallel subquery, a separate thread is created, and a connection is made from within that thread to a separate ORACLE server. When a PUPI routine is called for a task which does not require parallelism, behavior is the same as for an ordinary UPI routine, and the call is serviced by the server from the original user connection (which we may designate the primary server to distinguish it from the servers used for parallel subqueries). This architecture is shown in FIG. 61-1.

This architecture takes advantage of ORACLE's separation of client and server processes, even for local connections, to manage parallelism inside the client process, thereby requiring minimal change to the server. Unfortunately, this only works when the client is executing on the KSR1. To support a remote client, the architecture must be changed so that parallelism can be managed on the server side of the remote client/server boundary.

3 Moving QD Inside the ORACLE Kernel

The approach which first suggests itself is to move the QD code from the client-side UPI, into the server-side OPI library. Since there is more or less a one-to-one correspondence between UPI and OPI routines, it would appear conceptually straightforward for KSR to develop a POPI (Parallel ORACLE Program Interface) library, along similar lines to the PUPI library. Like PUPI routines, POPI routines would determine whether a particular call required parallel processing; if not, they would behave like ordinary OPI routines. If parallel processing were called for, the POPI routines would behave as a client with respect to additional servers to which they would connect from parallel threads, to process parallel subqueries. To accomplish this, the POPI routines would have to call UPI routines to request particular services from the servers for the parallel subqueries. This architecture is shown in FIG. 61-2.

This is not the same architecture cited at the beginning of Section 2. Rather than parallelizing the existing query execution code within the kernel, this approach introduces into the kernel new code which parallelizes client access to additional servers, each containing a complete, non-parallelized kernel. The QD logic itself would be identical to the current design.

An advantage of this solution is that it introduces no new processes or connections, other than those specifically needed for executing parallel subqueries. When a client program makes sends a message to the server which does not require parallel processing, that call is simply passed on into the kernel, without requiring an additional message. Essentially, the ORACLE server is playing a dual role, both as a standard ORACLE server, and as a QD server.

The chief disadvantage of this approach is the very fact that it places QD inside the ORACLE kernel. From the standpoint of detailed design and implementation, changes of this nature to the ORACLE kernel present much room for unpredictable difficulties and side effects. Prior experience indicates that it can be very difficult to emulate client behavior inside a server, since the two sides of a client/server interface, if not specifically implemented to allow for this, may contain variables with corresponding names and purposes, but which are used in subtly different ways. Furthermore, the current implementation of QD assumes its residence in the client; ORACLE functions are called which have similar but different counterparts on the server side.

A potential security issue would also be raised by moving QD inside the kernel. Because QD code would have access to ORACLE's SGA (Shared Global Area), it could potentially bypass ORACLE's security enforcement. This can also be viewed as an advantage. Moving at least portions of QD inside the kernel has been previously proposed as a possible solution to security-related problems involved in decomposing queries over views. See DBN #55, Decomposing Queries Over Views—Issues and Options, for a full discussion of this complex issue. A separate QD server, as proposed in Section 4 of the current document, might also provide an avenue for solving view security problems 4 Separate QD Server A less obvious, but perhaps preferable approach, is to implement a separate QD server. From the perspective of the remote client application, this would behave exactly like an ORACLE server, servicing requests emanating from UPI calls in the client program. From the perspective of ORACLE, it would appear exactly like a local client application program containing the PUPI library (as in FIG. 61-1

); it would contain PUPI routines which would pass messages, via UPI calls across a local connection, to a primary ORACLE server to perform non-parallel operations, and it would manage threads which connect locally to additional ORACLE servers, to execute parallel subqueries. The QD server would incorporate routines from the outermost, message handling layers of the ORACLE kernel (in particular, modules of the SQL*Net and Two Task Common, or TTC, layers), but its dispatcher would call PUPI routines, rather than OPI or POPI routines, to service requests. This architecture is shown in FIG. 61-3 below.

A key advantage of this approach is that, while it incorporates some peripheral kernel routines, it does not constitute modification of the ORACLE kernel itself. As in the current architecture, QD code is completely segregated from the kernal. There are likely to be fewer dangers of side effects, and much less danger of unintentional security violations (the latter danger is not entirely eliminated, because emulating an ORACLE server from the client's perspective may still require access to the ORACLE SGA, but in a better-isolated and more easily-controlled context).

Another seeming advantage is that the PUPI as currently implemented could be grafted unchanged into the QD server, rather than having to re-integrate QD with the OPI layer inside the ORACLE kernel. From a design standpoint, this is clearly a good thing, because it means that the actual interface between QD and ORACLE is the same for remote clients as for local clients; the extra mechanics of message relaying for the remote case are a clean add-on. From a development cost standpoint, however, this is likely to be more of a tradeoff than a straight savings, because while there is a general one-to-one correspondence in name and function between UPI and OPI routines, they do not take identical parameters or operate in an identical context. Some degree of message translation may be necessary to relay incoming messages, intended to be processed by OPI calls, to UPI or PUPI calls which will pass them along to an ORACLE server. Furthermore, while the majority of UPI calls do not require PUPI counterparts in the current implementation, because they are not directly related to retrieving query results (e.g. calls for managing transactions, for connecting to ORACLE, or for modifying data), a QD server would need to be able to relay all of these calls to an ORACLE server. More detailed study of the ORACLE code will be required to determine the amount of effort involved, and whether it outweighs the advantages of leaving QD in the PUPI layer. It could turn out that this approach is not as different from the approach of relocating QD inside the OPI layer as it would superficially appear to be.

One disadvantage of this approach is that, by introducing a new server process to the overall ORACLE architecture, it adds complexity and introduces new unknowns. It may turn out to be fairly difficult to extract the appropriate SQL*Net, TTC, and other needed routines from their normal kernel contexts, to accomplish the goal of emulating the front-end of an ORACLE server. This approach also raises potential issues of packaging and code integration, since it introduces a new, KSR-specific executable to be shipped as part of ORACLE for KSR, and since it integrates in a single executable KSR-written code and code intended only as part of the ORACLE kernel.

Another disadvantage of this approach is that requests for database operations which do not require parallelization must make an extra message hop to get from the client application to the ORACLE server which will service them. Since the QD code decides whether a given UPI call requires parallelization, if the QD code is in the QD server rather than in the application program, then the application program can't "know" whether to send a given request to the QD server or the ORACLE server, so it must always choose one or the other. We can provide mechanisms to let the DBA or application user decide globally or per application whether to enable QD for remote queries, so that applications with little or no need for QD can avoid the extra overhead of the intermediate QD server. Alternatively, a hybrid approach could place inside the application program those portions of QD logic which determine whether to decompose a query, while managing the parallelism in a QD server. This approach, however, would require substantially more effort to implement, since it would involve a re-partitioning of QD functionality among processes.

A possible compromise approach would be to develop a means whereby those UPI calls that do not have PUPI counterparts are routed directly from the client application to the ORACLE server, while those which may require parallelism are routed to the QD server, which decides whether to parallelize or whether to "fall through" to ordinary UPI behavior. This would limit the extra hop overhead to calls which potentially require QD attention.

5 Conclusion

At the current preliminary stage of analysis, the QD server approach appears preferable to the approach of locating QD in the ORACLE server, but not dramatically so. The QD server approach avoids modifying the ORACLE kernel, but this is somewhat offset by the added architectural complexity and possible complications in packaging and code integration. Maintaining the same QD/ORACLE interface for remote and local clients is certainly preferable conceptually, but may be offset by difficulties in relocating some kernel routines in a separate server, and in relaying messages to UPI routines which were intended for OPI routines. The QD server approach introduces extra performance overhead for non-parallelized ORACLE calls; this can be limited at the cost of slight extra administrative complexity, and might be reduced further by optional hybrid approaches, at the cost of greater development effort.

A reasonably conservative initial estimate of development cost would be one person-month to implement the basic QD server functionality, with an additional two to three weeks to resolve peripheral issues of administration, configuration, and packaging. The initial phase of development would involve a detailed examination of the relevant ORACLE code, which would facilitate making a final decision between the alternate approaches, and producing a more reliable development cost estimate and task breakdown.

While support for physically remote QD clients depends on porting ORACLE's SQL*Net software to the KSR1, SQL*Net is not a prerequisite for developing and debugging a QD server, because the distinction between a local and remote connection is transparent at the levels of ORACLE which are relevant for this project. Detailed analysis of the relevant code could begin at any time, and implementation could begin as soon as the initial port of the basic components of ORACLE 7.0.9 has been completed.

Automating Query Decomposition-Framework for Rules (Database Note #32)

Introduction

This paper provides a conceptual framework for automating the process of query decomposition proposed in Database Notes #21 and #26. This framework can be viewed as a general structure within which to answer the question "What do we know, and when do we know it?", during the stages of transformation from an original input query to a decomposed query ready for parallel execution. In more down-to-earth terms, this paper provides a breakdown of the categories of rules involved in query decomposition, their input information and goals, and the categories of generated queries associated with them.

Top Level: The OAT Model

A good top level framework for query decomposition is provided by the OAT model, whose name is an acronym for three forms through which a collection of information passes during a transformation: the original form (O-form), the analyzed form (A-form), and the transformed form (T-form).

The process of query decomposition consists of producing, for a given input query, the collection of parallel subqueries, combining queries, combining function control structures, and other control structures needed to retrieve data in parallel and combine it to emulate the result table of the original query. This can be viewed conceptually as a transformation of the original query (which we will designate as the 0-form of the query) to that collection of objects which comprise the decomposed query (which we will designate the T-form of the query). To automate this process, we must specify a collection of rules whose starting point is the O-form of a query, and whose ultimate goal is the T-form. This highest-level goal path is shown in FIG. 32-1.

An SQL query submitted to the system does not contain within itself all of the information needed to decompose it. Strategic information such as index usage, table cardinalities, predicate selectivity, and join order and method must be obtained from the query optimizer to make decisions about decomposition strategy, such as choice of a partitioning table. Semantic information about tables, columns, clauses and expressions in the query must be gathered from the data dictionary to determine the details of combining functions and queries (for example, what kind of comparisons to perform for a merge sort, depending on the datatypes of the ORDER BY columns). This collected information must be analyzed to organize it into a structured form that defines everything we need to know about the query, in order to produce its T-form.

We will designate all of the analyzed, organized information about the query as the A-form of the query. The A-form includes the original query definition and any needed cross-references between that definition and the other collected information, so that no information is lost in the transition from O-form to A-form.

We can now consider all of the rules involved in decomposing a query to fall into two classes: those whose starting point is the O-form and whose goal is the A-form (which we will call gathering/analyzing rules), and those whose starting point is the A-form and whose goal is the T-form (which we will call transformation rules), as shown in FIG. 32-2.

It may appear rather arbitrary to designate the A-form as a discrete goal which must be reached before proceeding to the T-form, since separate pieces of information could conceivably be collected and analyzed as needed during the course of query transformation. However, the A-form provides a valuable "fire wall" between the gathering/analyzing rules and the transformation rules. It prevents radical differences in the gathering/analyzing approach from having any effect on the transformation approach (for example, the difference between parsing the input query and then querying the data dictionary to bind semantic information to the parsed query, or obtaining a parse tree with already-bound semantic information from the query optimizer, and translating that to our standardized A-form). It also permits us to expand our repertoire of parallelization techniques relatively independently of the gathering/analyzing rules.

Categories of Generated Queries

Much of the query decomposition process, both in the gathering/analyzing and transformation phases, is accomplished through the generation and execution of queries. (For this discussion, the term query is used in the broad sense to include DDL commands such as CREATE and DROP, para-DML commands such as EXPLAIN, and logical equivalents to these and other DML commands which do not necessarily involve explicit generation or processing of SQL. Query generation is used to mean applying rules to define a query and prepare it for execution. Query execution is used to mean retrieving information through the query.) Queries can be broken down into five categories: probing queries, set-up queries, clean-up queries, parallel subqueries, and combining functions and queries.

Probing Queries

These are generated and executed during the gathering/analyzing phase of query decomposition, and are the mechanism used for gathering information from the query optimizer and the data dictionary. This suggests that gathering/analyzing rules can be divided into two classes: gathering rules which govern the generation and execution of probing queries, and analyzing rules which analyze and restructure the gathered information to produce the A-form of the query.

Probing queries also fall into two groups: those which gather information on query optimizer strategy and associated cardinality and selectivity estimates; and those which gather semantic information about objects referenced in the query from the data dictionary. (This may be an oversimplification in some cases. For example, queries about file partitioning have more to do with retrieval strategy than semantics, but formally they may have more in common with data dictionary queries than with optimizer queries, if the file partition information is accessed through a data dictionary view.)

Optimizer strategy information can be obtained by invoking EXPLAIN to produce an access plan for the query, and then generating and executing appropriate queries against the plan table to obtain information about join order, join methods (nested loop vs. merge), and index usage. (If a later release of EXPLAIN also provides cardinality and selectivity estimates, these will be gathered as well.)

Semantic information can be obtained by asking queries against data dictionary views, and by using DESCRIBE SELECT to generate a SQLDA structure describing the output columns (select list items) of the original input query, or of transformations of that query. In some instances alternate strategies for obtaining information are possible (although we might choose to constrain the strategy space at design time). For example, to determine the datatype of an ORDER BY column which doesn't appear in the select list of the original query, we can either query an appropriate data dictionary view, or we can generate a transformed query in which the column does appear in the select list, and invoke DESCRIBE SELECT for that query. This entire category of queries could be replaced by a call to the query optimizer to return a parse tree for the original query, to which the necessary semantic information has been attached; such an optimizer call could itself be considered a probing query. (The information to be returned by semantic probing queries, and the manner of its organization after analysis, are discussed in detail in DBN #37.)

Additional data dictionary queries, beyond those which gather basic semantic information, may be needed in some cases to establish cross-references between the semantically-augmented parse tree and the query optimizer plan. These could be needed, for example, to determine which index name in the optimizer plan corresponds to which table name in the query definition, or to match table synonyms used in the query definition to actual table names.

Probing query execution precedes generation of the remaining classes of queries discussed below, which happens during the transformation phase of query decomposition.

Set-up Queries

Set-up queries are generated during the transformation phase of query decomposition, and, as the name implies, they are executed during an initial set-up phase of query execution. They fall into two general groups: DDL set-up queries to create temporary tables or indexes; and DML set-up queries, which could be used in multi-stage execution strategies to populate temporary tables with intermediate results. Potentially, a DML set-up query could itself be decomposed and executed in parallel.

Temporary tables may be created at set-up time, and populated during main query execution, to gather rows from parallel subqueries for final aggregation or testing of a HAVING clause by a combining query.

Creating temporary indexes, and populating intermediate sorted tables during set-up, are also steps of alternative approaches to merge joins which avoid redundant sorting of the non-driving table in the join by each parallel subquery, either by pre-sorting or by pre-indexing the non-driving table. If pre-sorting is used, only those rows which satisfy single-table predicates are inserted in a temporary table, which is indexed on the join columns, and the temporary table replaces the original table in the FROM clauses of the parallel subqueries. If pre-indexing is used, the entire table must be indexed on the join columns. Either way, the resulting table can now be used as the inner table in a nested loops join.

Any set-up queries which are generated as part of the transformation of a given query must be executed to completion before proceeding with execution of the remaining query types discussed below. However, the generation of set-up queries is not a prerequisite to the generation of the remaining query types, and could conceptually be performed in parallel with it.

Clean-up Queries

For each set-up query which creates a temporary table or index, a corresponding clean-up query is required to dispose of that temporary object. Clean-up queries are generated at the same time set-up queries are generated, and are executed when the overall parallel cursor is closed.

Parallel Subqueries

All of the parallel subqueries for a given decomposed query are identical except for a predicate in the WHERE clause which directs them to restrict their search space to a specified table partition. (There may be exceptions to this generalization, for example in the case of queries containing UNION, INTERSECT, or MINUS set operators.) Parallel subqueries are generated by a series of transformations from the A-form of a query. These transformations fall into five types:

1) Appending a partitioning predicate to the WHERE clause. Of the four types, this is the only one which must always be performed.
2) Select list transformations, which add columns to the select list, or replace columns with other columns. (These are specified in detail in DBN #39.)
3) Removing the HAVING clause, if any. (A HAVING clause cannot be correctly applied to partial group results, and therefore must be applied by a combining function or query, after groups have been merged. Note that Q11 of DBN #21 is thus decomposable.)

4) Replacing tables in the FROM clause with pre-sorted temporary tables, if pre-sorting is used to convert merge joins to nested loops joins.
5) Adding optimizer directive comments. Since a cost-based optimizer might not be guaranteed to chose the same strategy for a parallel subquery as it chose for the original query, and since the decomposition strategy might depend on that optimizer strategy, confirming directives might be needed to coerce the optimizer to stick to the original plan. Alternately, there may be cases where we want to generate new strategy directives to cause the optimizer to use a different strategy than the one revealed in the original EXPLAIN plan.

Output rows from parallel subqueries provide the input rows to the combining functions and queries discussed below. Conceptually, the combining functions or queries dynamically merge the output streams of the parallel subqueries, so that the parallel subqueries do not have to be executed to completion before executing the combining functions or queries.

Combining Functions and Queries

A combination of combining functions and queries is used to merge the output streams of parallel subqueries, producing a single output stream identical except possibly for ordering to that which would have been produced by directly executing the O-form of the query. In the simplest case, a single combining function is used to produce the logical "union all" of the separate parallel streams. More complex cases can involve multiple functions or queries working together to perform merging of sorted streams, merging of groups, aggregation, and expression evalution (e.g. testing of HAVING clauses), as well as the set operations UNION, INTERSECT, and MINUS. The means by which multiple combining functions and queries can coordinate their efforts are discussed in detail in DBN #36.

Combining functions are generic and predefined (e.g. one predefined grouping function, one predefined merging function, etc.), but their roles in executing a particular decomposed query are governed by control structures which are generated during the transformation phase of query decomposition. The interconnection of these structures governs the way in which the different combining functions and queries coordinate their work.

When a combining query is called for, a control structure will be generated as for a combining function, but in addition, the query itself must be generated. This is done by starting from the A-form of the query, and applying transformations analogous to, but different from, those used to generate parallel subqueries. These can include the following:

1) Replace the FROM clause with the name of the temporary table to which the combining query will be applied (a combining query could theoretically join data from multiple tables, but this is unlikely to be necessary).
2) Remove the GROUP BY clause if the combining query will be applied to a temporary table which contains only one group at a time.
3) Replace arguments of aggregate functions with the names of the temporary table columns which contain the corresponding partial aggregate results. In the case of AVG, replace the entire expression with "SUM(<partial sums>)/SUM(<partial counts>)".

Parallel Cursor Control Structures

In addition to set-up and clean-up queries, parallel subqueries, and combining functions and queries, a goal of the transformation phase of query decomposition is the generation of control structures to glue together and coordinate the overall parallel cursor, and to keep track of housekeeping details such as memory buffers and DBMS connections. In broader conceptual terms, this means that the several types of queries produced by transformation rules are not separate and independent goals, but rather coordinated pieces which together constitute the embodiment of a parallel execution strategy, which is the T-form of a query.

Summary of Generated Queries

Of the five classes of generated queries discussed above, probing queries differ from the other four in that they are created during the gathering/analyzing phase of query decomposition, rather than during the transformation phase. They also differ in that while their generation is a goal of some of the gathering rules, they are used as a tool by other gathering rules, and the output of their execution serves as input to the analyzing rules, and so, indirectly, to the transformation phase of query decomposition. The remaining categories of queries (set-up queries, clean-up queries, parallel subqueries, and combining functions and queries) can all be considered end products of query decomposition, and collectively (together with parallel cursor control structures) they constitute the T-form of a query.

FIG. 32-3 summarizes the query decomposition process. Solid arrows in the diagram represent the application of rules, and point towards the goals of those rules. Arrows with dashed lines indicate query execution, and point from the query being executed to the query which depends on the output of that execution. Note that while there is a sequence of execution dependencies between the four types of queries belonging to the T-form, the rules which generate them can conceptually be applied in parallel.

Prototyping Rules in Prolog

The goal-oriented language Prolog provides an ideal tool for the definition, prototyping, and "proof-of-concept" testing of the rules of query decomposition. Rules can be specified clearly, concisely, and non-procedurally in Prolog, which can greatly facilitate testing of complex combinations of rules. Prolog also supports syntax for concise specification of grammar, which would facilitate developing a basic SQL parser to drive the rule testing. Once the set of rules has been verified in Prolog, it can be hard-coded in C for optimal efficiency of the actual implementation. As rules change or new rules are added to the system in subsequent releases, the Prolog prototype will provide a flexible tool for testing them together with the existing rules before adding them to the C implementation. The present document provides a framework within which to define and test specific rules in the Prolog prototype.

Parallel Cursor Building Blocks
(Database Note #36)

When we decompose an SQL query into separate queries which can be executed in parallel, we create, in addition to the separate (sub)cursors for the parallel queries, a master cursor structure (in the PUPI layer) called the parallel cursor (or pcursor for short), which drives the execution of the subcursors, and combines their results to return to the caller the result rows of the original query. In a first release, we may restrict the classes of queries which can be decomposed and parallelized, and consequently pcursors may tend to be relatively simple and limited in variety. But as we support increasingly complex queries which require more complex combining functions, both the complexity and range of variety of the pcursor will increase.

We can prepare for a smooth evolution to increasingly complex functionality, without sacrificing ease or efficiency of initial implementation, by adopting a building block architecture similar to that used by some query engines (and in fact, the PUPI really IS a query engine, except that its ultimate row sources are cursors over some other query engine, rather than base tables). Rather than building separate special combining functions for each of our general cases, we can factor out the basic functions which are common to all currently-planned and many future combining functions, and define building blocks specialized to perform each. A fairly small set of these building blocks can be combined to form arbitrarily complex pcursors. Implementation details of subfunctions can be hidden within building blocks, while the overall arrangement of building blocks in a particular pcursor will provide a clear diagram of its strategy (analogous to an Oracle EXPLAIN table, for instance). As the system evolves, some new functions will call for invention of new building block types, while others can be implemented simply by new combinations of existing building blocks.

Pnodes: General Characteristics

We may call the building blocks which make up a pcursor "pnodes" (referred to as "building blocks" or "bb's" elsewhere). These can be arranged into a doubly-linked tree called a pnode tree. Each pnode has one pointer to its parent, and zero or more pointers to its children, depending on its node type (some node types have a variable number of pointers to children). Other attributes of all pnodes include:

- Node ID: Uniquely identifies this pnode within a particular pnode tree
- Node type: Identifies what kind of pnode this is
- Pointer to executor: Each node type has its own executor function
- State: The current state of this pnode A variant portion will contain attributes particular to each node type, sometimes including additional state attributes. Each node type also has a specialized executor function, but all executor functions take the same two parameters: a request code indicating the type of operation to perform, and an array of pointers to buffers which is used to locate data.

In general, pnodes are specialized row sources.

Pnode Tree Execution

Pnode trees are parent-driven. A parent "pulls" rows from its children, which passively respond to parent requests. A parent pulls a child by calling the child's executor function, passing it a request code to distinguish the specific nature of the request. Since all executor functions are of the same type, and since the generic portion of the pnode contains a pointer to its function, a parent can call a child's function without knowing the child's node type, or what specific function to call.

A very small set of request codes can be overloaded to have appropriate meanings to particular node types in particular states. Request codes might include:

- NEXT: Return the next row (We might want both synchronous and async versions of NEXT)
- RESET: Reset to beginning of stream, return first row
- PEEK: Return next row, but don't change currency
- RESET_CACHE: Reset to beginning of cached group of rows, return first
- NEW_CACHE: Start a new cached group of rows, return first
- CLEANUP: Perform any necessary cleanup, e.g. close cursors A second (perhaps overlapping) series of reply codes is returned to the parent by the child, as the return value of its executor function. These might include:

READY: Requested row is ready

WILCO: Have begun requested (async) fetch, but row is not ready yet

EOD: End of data

EOG: End of group

ERROR: An error has occurred

A third (again perhaps overlapping) series of state codes will be maintained by a pnode's execution function as values of its state field, to let the pnode remember its context from one pull to the next. State codes might include:

UNINITIALIZED: Haven't been pulled yet since pcursor was opened

EMPTY: No data is ready or pending

PENDING: Waiting on an incompleted operation to fetch data

READY: Data is ready to return to parent

EOD: Have reached end of input stream

EOG: Have reached end of group (The state codes stored in pnodes tend to reflect their current state in their role as a child, since their local context is lost between one pull from their parent and the next. Local state variables in the executor functions of particular pnode types would serve to recall a parent's state after pulling a child, since context has not been lost in that case.)

The Buffer Translation Table

As mentioned earlier, when a parent pnode calls its child's executor function, it passes it, along with the request code, a table of pointers to buffers. This provides a coordinated means of managing buffers and locating atomic data items, among all the pnodes of a particular pcursor. When the particular pnode tree is created during query decomposition, decisions are made about which particular numbered buffer pointers within the buffer translation table will be used for which specialized purposes (for example, a particular buffer table entry might be reserved as the next-ready-row buffer for a particular subcursor pnode). In this way, individual pointers don't have to be passed around, and any data manipulation or expression evaluation logic built into particular pnodes can reference data by buffer number and offset within buffer, minimizing the need for data movement.

Associated with each pointer in the buffer translation table is a flag indicating whether the buffer has an associated semaphore, and if the flag is set, then a hook to the semaphore itself. Those buffers which are to be shared across thread boundaries will obviously require semaphores.

Pnode Types

Here is a first pass at defining a set of pnode types which could be used to parallelize most or all of the queries we have been considering:

Root

A root pnode serves as the root of a pnode tree, and has one child. It specializes in projecting result rows into a caller's buffer. When the caller requests an ORACLE array fetch (fetch a specified number of rows into arrays of target variables in a single call), the root pnode would "drive" the array fetch, pulling its child an appropriate number of times to gather the requested rows. A root pnode might not be needed in some trees, if there are cases where other pnode types can easily enough place results directly in the caller's buffer.

Union-All

A union-all pnode returns, in arbitrary sequence, the result rows of all of its children. It has a variable number of children (but fixed in any given instance), which would tend to be equivalent parallelized subcursors (although in future it could be used to union rows from heterogeneous sources). Conceptually, a union-all pnode pulls its children asynchronously (i.e. without waiting if a row is not READY) in round-robin fashion, and returns the first READY row encountered. Its additional state attributes keep track of where it left off in the round-robin, and which children have reached EOD; when the last child returns EOD, the union-all pnode returns EOD. In practice, the sequence of pulling children need not be strictly round-robin, and the union-all pnode may only actually "pull" a given child once, to get it started on asynchronous fetch-ahead, after which it simply checks a semaphore to see if a row is READY from that child. In the event that no child has a READY row, the union-all pnode should be able to wait on the semaphores of all of its children until one clears, to avoid a round-robin busy wait.

Merge

A merge pnode merges the results rows of its children, which are all assumed to be sorted in the same collating sequence, into a continuous run of that sequence. Like the union-all pnode, it pulls all of its children asynchronously, but it must wait for all children to be simultaneously READY or EOD, before returning a row. It then returns that row from among its children which is lowest in collating sequence, and re-pulls that child whose row was returned. (Note: A merge pnode might want to use the PEEK request code when first pulling its children, if it doesn't actually remove a row from a child's buffer until it decides which row is next in collating sequence. Alternatively, it could move rows to its own buffers to free up child buffers for additional fetch-ahead.)

Group

A group pnode expects a stream of rows from its single child sorted by group columns. It returns rows to its parent until it encounters a row whose group column values do not match those of the preceding row, at which point it returns EOG. The offending row becomes the first row of the next group, and is returned the next time the group pnode is pulled.

Aggregate

An aggregate pnode performs aggregate functions AVG, MAX, MIN, SUM, and COUNT. (These are the standard SQL aggregate functions. ORACLE also supports STDDEV and VARIANCE, which require a somewhat more complicated approach, and will probably be supported through combining queries rather than combining functions in our first release.) It first initializes aggregate values, then accumulates data from rows from its single child until EOG or EOD is returned, and finally (in the case of AVG) performs the finish-up computation necessary. Having clauses could also be evaluated by the aggregate pnode, at the finish-up step. SELECT DISTINCT could also be handled by the aggregate pnode, by setting it up with a child group pnode which groups by all columns.

(Note: to implement DISTINCT, grouped aggregates, e.g. "select count(distinct job_title) from emp group by rept_dno", we can introduce a "subgroup" pnode which is actually not a distinct node type, but simply a group pnode which returns EOSG, "end of subgroup", instead of EOG. In the present example, the subgroup node would group by job_title, while a group node beneath it would group by rept_dno. Each time the aggregate pnode received EOSG, it would increment its counter of distinct job titles, and when it received EOG, it would return a group result to its parent.)

Subcursor

A subcursor pnode fetches rows from a parallelized subcursor and returns them to its parent. It can asynchronously fetch ahead and buffer a tunable number of rows.

The subcursor pnode functionality could potentially be decomposed to more than one specialized pnode types, but need not be. It is unique among pnode types described thus far in having two executor functions which share the same pnode data structure. The "master" executor is called by the subcursor pnode's parent. The primary job of the master executor is to spawn a parallel thread to run the parallel executor, when the subcursor pnode is first pulled in an UNINITIALIZED state. The parallel executor in turn starts an ORACLE session (or grabs one from the available sessions pool) and opens an ORACLE cursor for the parallelized subcursor. Subsequently, the master and parallel executors can coordinate their work by means of semaphores, with the master checking to see whether a next row is ready whenever one is requested by the subcursor pnode's parent. (To avoid a "busy wait" it may actually be preferable for the parent of the subcursor node to wait on semaphore of all of its children until one is ready. In this case, the role of the subcursor's master executor would be to perform whatever manipulation of buffer pointers and resetting of semaphores is necessary to return a row to the parent, to keep the details of the subcursor's buffer and semaphore management transparent to the parent, and to factor out these functions from the different possible parent types. The master's role is somewhat analogous to that of client-side DBMS software in a client-server DBMS. Conceptually, these tasks could be performed by the parent, so that the master executor is not strictly required.)

Pnode Trees for Various Types of Queries

The pnode types discussed thus far would comprise a fairly powerful "starter set" capable of effectively parallelizing a wide range of queries. As such, they would probably comprise a good goal for a first full-featured release. Before looking at some potential "advanced" pnode types, let's look at the types of trees that can be built using the starter set of pnodes, to handle various classes of queries. Query numbers in this section refer to the examples in KSR Database Note #21, *Parallelizing Decision Support Queries in Version 1 of ORACLE for KSR*. To simplify the diagrams, a degree of parallelism of 4 is assumed in all examples.

Basic Union-All of Parallel Subcursors

The simplest pnode tree type shown in FIG. 36-1 can be used for all fully-parallelizable queries that don't involve ordering, aggregates, grouping, or duplicate elimination. These include parallelizable instances of examples Q1 through Q6, and Q12 (although better but more complex approaches are possible for Q6 and Q12).

Each time the root requests a row, the union-all pnode returns the first available row from any of its children, until all children have returned EOD.

Basic Merge for Order-by

The pnode tree type shown in FIG. 36-2 can be used for queries which could otherwise have been handled by a basic union-all tree, but for the addition of an order-by clause (e.g. Q7).

The subcursor nodes in this tree type are all assumed to return their rows in the desired order (this will tend to mean that the child subcursor's query has an ORDER BY clause specifying that order, but the actual means by which the child orders its rows is of no concern to the merge pnode). Each time the root requests a row, the merge pnode returns the first row in collating sequence, chosen from among the current rows of all children that have not yet returned EOD. In general the merge pnode can't return a row while any child is in a WILCO state, since that child might return the next row in sequence. However, the merge pnode could remember the sort column values of the most recently returned row, and if any READY child has a row with matching values, that row can be returned without waiting for non-READY children.

Basic Aggregation

The pnode tree type shown in FIG. 36-3 can be used for basic, i.e. non-grouped aggregation (e.g. Q8).

For aggregate functions SUM, MAX, and MIN, the aggregate pnode simply computes the function over the appropriate columns of its input rows; the fact that the input rows themselves are already partial aggregate results is transparent and irrelevant to the aggregate pnode. For COUNT, the aggregate pnode actually computes the SUM of the appropriate columns (i.e. the SUM of the partial counts yields the total count). Any AVG function in the original query will have been tranformed to SUM and COUNT of the corresponding column in the queries for parallelized subcursors; the aggregate pnode can simply sum up the partial SUM and COUNT values, and when its child returns EOD, it can divide the cumulative SUM by the cumulative COUNT to yield the AVG value.

The aggregate pnode returns a single row of final aggregate values when its child union-all pnode returns EOD, which happens when all of the latter's children have returned EOD.

(Note: the FIG. 36-3 tree type can also be used for STDDEV and VARIANCE by discussed in a later section of this paper.)

Grouped Aggregation

The pnode tree type shown in FIG. 36-4 can be used for both grouped aggregation (e.g. Q10) and SELECT DISTINCT (e.g. Q9).

For grouped aggregation, the merge pnode merges its input rows into order on group columns; the group pnode passes the rows through to the aggregate pnode, but returns EOG when it sees a row whose group columns don't match the previous row. This is the signal for the aggregate pnode to return a row with aggregate results (and the associated group columns) to its parent. The aggregate pnode functions identically for grouped and basic aggregation; it is willing to recognize either EOG or EOD as the signal to finish its computations and return a row, so it needn't be "aware" of which type of tree it is participating in.

Duplicate elimination can be treated as simply a degenerate case of grouped aggregation, in which all columns are group columns, and there are no aggregate columns. The job of the aggregate pnode here is simply to return one row to its parent, for each group of identical rows received from its child group pnode.

(NB: In general, while it is reasonably safe to assume that a parallelized subcursor will return grouped or uniquified rows in order by group columns, a clever optimizer might sometimes choose descending rather than ascending order by those columns if an appropriate index is available, since any order which keeps like values contiguous serves the purpose. The group pnode can ignore the distinction, since it can compare group columns for equality, but the merge pnode must know whether it is merging an ascending or descending sequence. Ideally, this would be determined from ORACLE's optimizer plan and flagged in the pnode when the tree is generated during query decomposition, but if necessary, the merge pnode could peek ahead past the first rows of one or more of its children until it finds group column values which don't match those of the first row of the same child, and thus deduce whether the sequence is ascending or descending.)

Structurally, adding a HAVING clause does not change the approach to grouped aggregation. The aggregate pnode "simply" evaluates the having clause as a final step of finishing its computations after receiving EOG from its child; if a row fails to satisfy the HAVING clause, the aggregate pnode starts aggregating a new group, without returning the previous group's result row to its parent. (However, evaluation of HAVING clauses requires more powerful and generalized expression evaluation capabilities than previous examples. For a first release, we would use a combining query against an intermediate table to implement HAVING clauses, as discussed in a later section of this paper.)

(NB: This tree type could also be used for distinct aggregates, and for STDDEV and VARIANCE. However, in these cases the merge pnode would not be merging intermediate group results. Instead, the subcursors would order by the desired group columns, the merge pnode would merge the rows into a continuous stream in that order, and the group pnode would do the entire job of grouping rows "from scratch". This is necessary because in these cases all rows of a group must be considered in computing the function; it is not possible to merge intermediate group results. For a first release, these cases would use a combining query version of the aggregate pnode.)

(NB: In a more unified design, grouping could be handled as a special case of the MERGE building block. This way the same aggregate building block is used for grouped or non-grouped aggregations.)

"Advanced" Pnode Types and Trees Using Them

The additional pnode types introduced here (and perhaps others as well) could be introduced in a second release to broaden the universe of effectively parallelizable queries. As described here, these would carry the pcursor further in the direction of general query engine functionality.

Cache

A cache pnode is similar in function to a group pnode, but each group is rereadable. This pnode caches each row pulled from its child, and also returns the row to its parent, until it encounters a row not in the current group, at which point it returns EOG just like a group pnode. Nowever, the parent may now request RESET_CACHE, which will cause the cache pnode to start returning rows from the current cached group, in the same order they were initially returned. Alternately, the parent may request NEW_CACHE, which causes the cache pnode to start caching a new group, and return its first row to the parent. (We might not really need a separate NEW_CACHE request code, since NEXT could imply that meaning in this context.)

Merge-Join

Database Note #21 discusses cases of multi-way joins (Q6) in which more than one table lacks an index on join columns. There it is proposed that the largest non-indexed table be chosen as the partitioning table, and that the remaining non-indexed tables be put last in the join order, but it is pointed out that when this query is parallelized, each subcursor will redundantly sort both sides of each merge join step. One way to eliminate this redundant sorting would be to introduce a merge-join pnode.

A merge-join pnode has two children, each of which are assumed to return rows grouped (which implies ordered) on join columns. Furthermore, if (as in the general case), the join columns are not known to comprise a unique key on the left child, then the right child is assumed to support rereading of its groups (i.e. it is a cache pnode). Having pulled an initial row from each child, the merge-join pnode continues pulling from whichever child's most recent join key values are earlier in collating sequence, until it finds a match. It now returns the current left-hand row joined to the current right-hand row, and to each right-hand row until it encounters EOG on the right. Then it pulls the next left-hand row; if it is still in the same group, it resets the cache on the right a joins each record in the cache to the new left-hand row. This continues until EOG on the left, at which point a fresh row is pulled from each child and we're back at the beginning of the algorithm, to continue until EOD is returned from one or the other child.

Assume a multi-way join of the form "select * from TI(1), . . . TI(n), TN(1), . . . TN(p) where . . . ", where TI(1) . . . TI(n) are tables indexed on join columns, while TN(1) . . . TN(p) are tables not indexed on join columns, and where TN(1) is the largest non-indexed table. First we can decompose this into two queries, Q(1)joining TI(1) . . . TI(p) and TN(1); and Q(2)joining TN(2) . . . TN(n). Q(1) has the property that all but one of the joined tables has an index on join columns, so it is effectively parallelizable with TN(1) as the partitioning table. Q(2) is a join where no tables have indexes on join columns, and so is not effectively parallelizable by any means proposed thus far. Add to each of these two queries an ORDER BY clause requesting ordering by any columns appearing in join predicates from the original query, which join tables retrieved by Q(1) and tables retrieved by Q(2).

Now, the pnode tree which would be used to parallelize Q(1) if it stood alone, can be used as the left branch of a merge-join pnode (with a group pnode in between to let the merge-join pnode know when a new set of join column values is encountered). Since Q(2) is not effectively parallelizable, it can be handled by a single subcursor pnode, hung off a cache pnode which lets the merge-join pnode reread groups with matching sets of join column values. This gives us the tree type shown in FIG. 36-5:

Unfortunately, since Q(2) does not contain the join predicates between the tables it retrieves and the tables retrieved by Q(1), it cannot use them to restrict which rows are sorted. This could be remedied by a further refinement: retain those join predicates as part of Q(2), with the references to columns of TI(1) . . . TI(n), TN(1) transformed to query parameters. Now, each time the merge-join pnode requests a new cache group from its right-hand child, the subcursor pnode in that branch will re-open its subcursor with the new parameter values. This will require enhancing the subcursor pnode to know how to find parameter values and use them to re-open a cursor. (Note that with the parameterized subcursor enhancement, the cache node would not be required when querying a DBMS that supports scrollable cursors, i.e. cursors whose results can be re-read as cheaply or more cheaply than we can do our own caching. Also note that the evaluation of Q(2) will eventually be done in parallel once parallel sorts and merge joins are available.)

Sort

A sort pnode would be useful for that relatively rare class of queries which contains both grouped aggregation, and an ORDER BY clause requesting ordering on aggregate columns, for example:

```
select avg(sal), dno from emp
group by dno
order by avg(sal) desc
```

Since we can only merge pre-sorted parallel input streams once, and we "use up" that capability to do the grouping, we need to completely sort the output aggregate rows as a last step, giving us a tree like FIG. 36-6:

When the parent of the sort pnode requests a row, the sort pnode pulls rows from its child until EOD is encountered, then sorts them and returns the first row in sorting sequence. When pulled again, it returns sorted rows until none are left, and then returns EOD.

"Mini-Sort"

Figure 7:
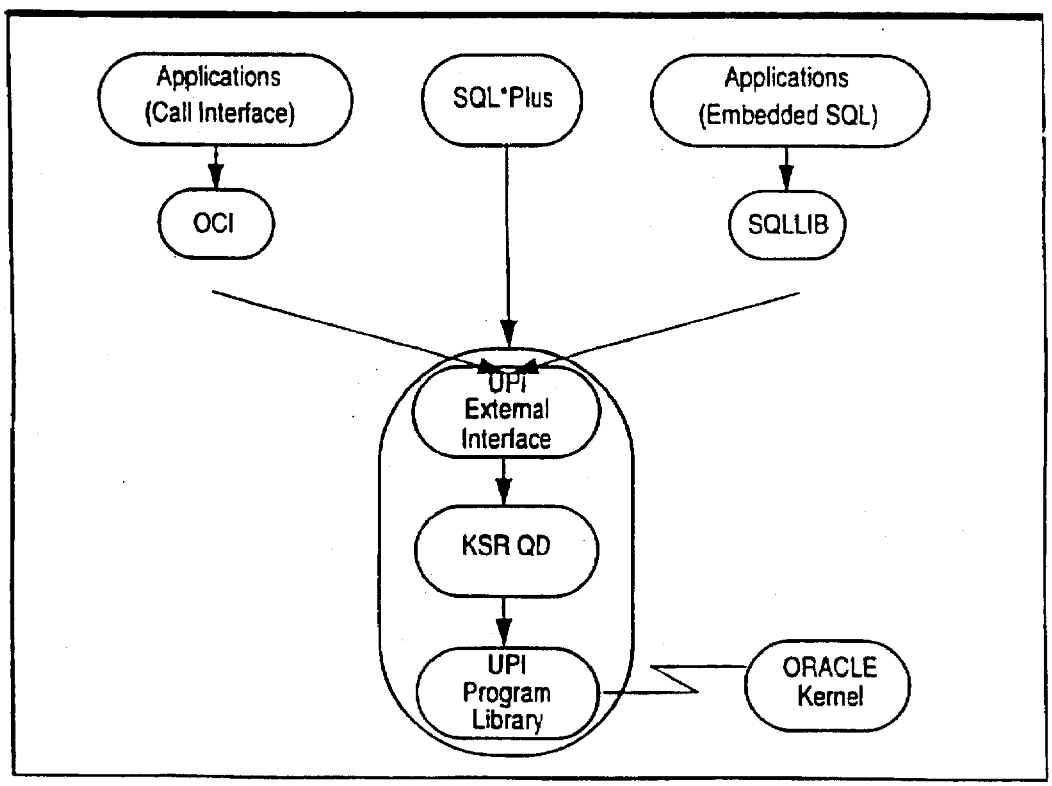
Figure 8:
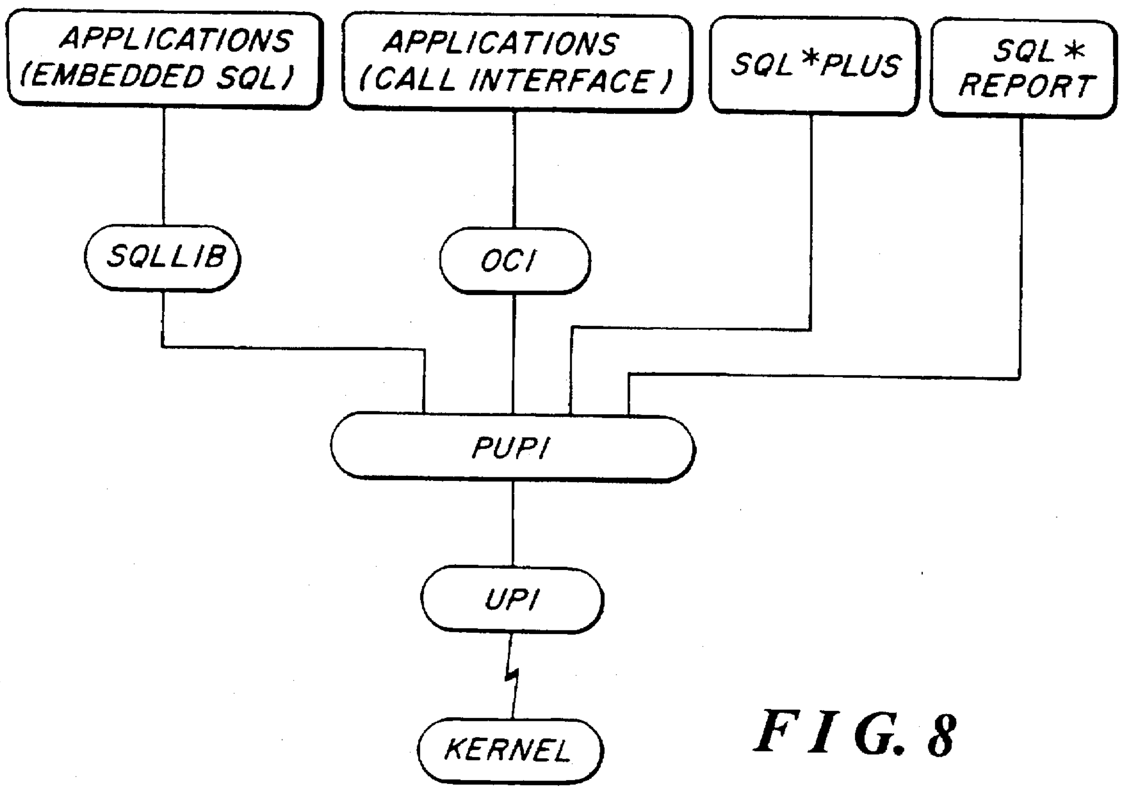
FIGS. 8 through 10 are used in connection with the discussion of design provided in Database Note #26.
Figure 9:
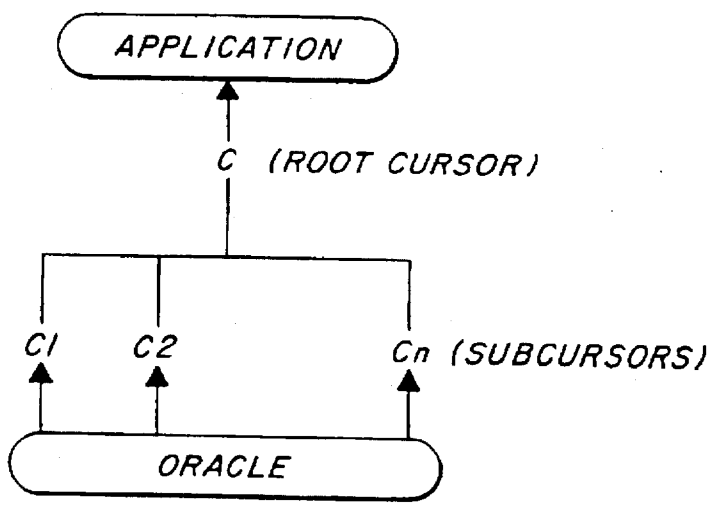
Figure 10:
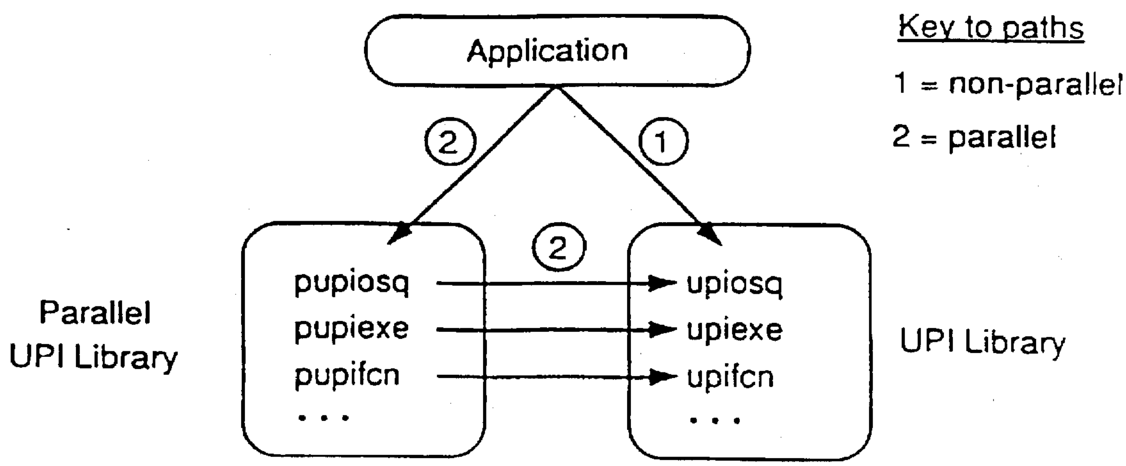
Figure 11:
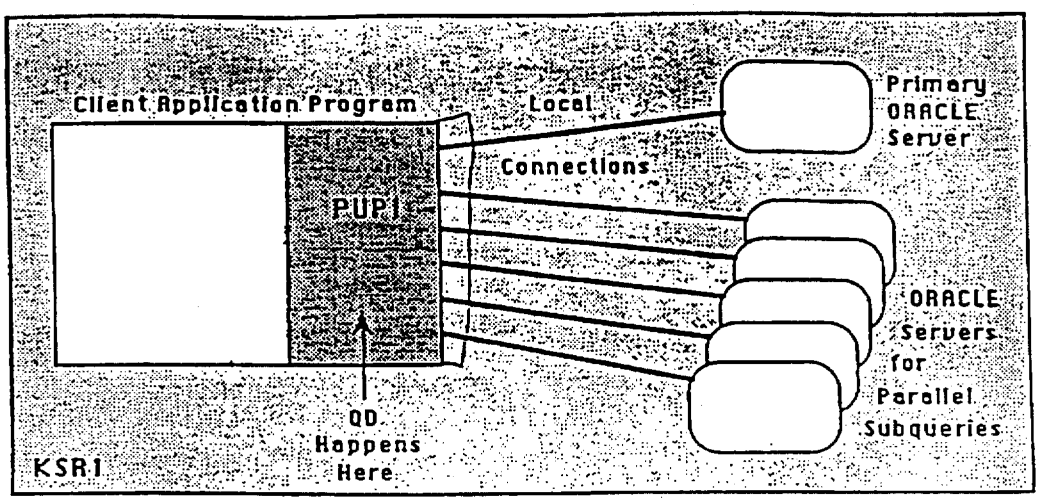
FIGS. 11 through 13 are used in connection with the discussion of query decomposition for applications running on client workstations in Database Note #61.
Figure 12:
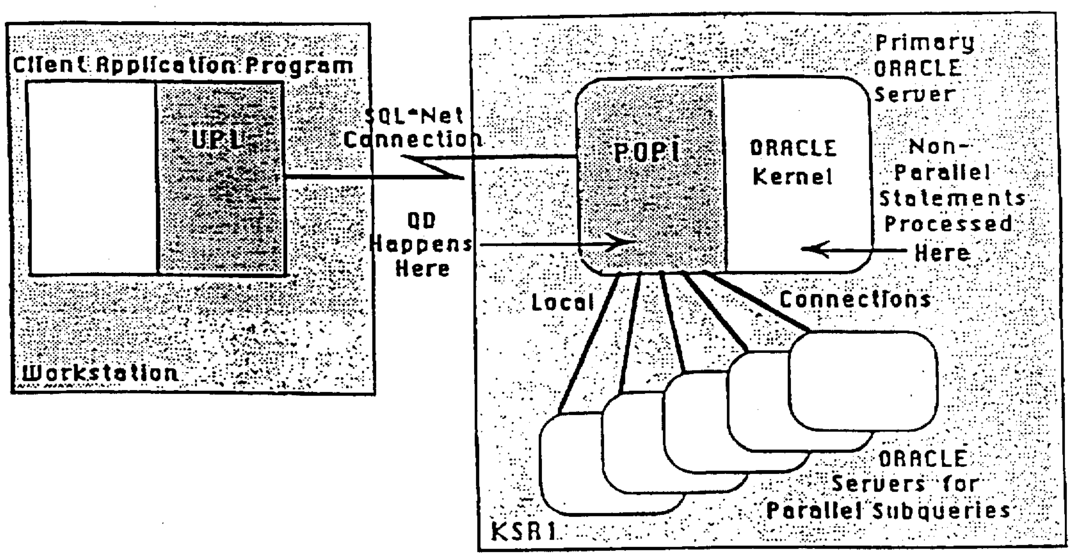
Figure 13:
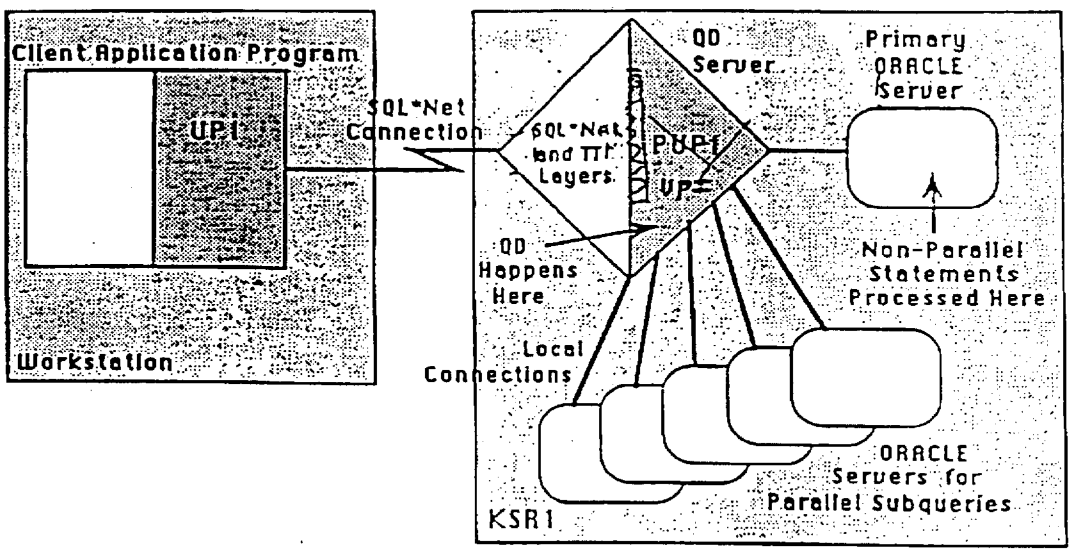
Figure 14:
FIGS. 14 through 16 are used in connection with the discussion of the framework of rules for automating query decomposition in Database Note #32.
Figure 15:
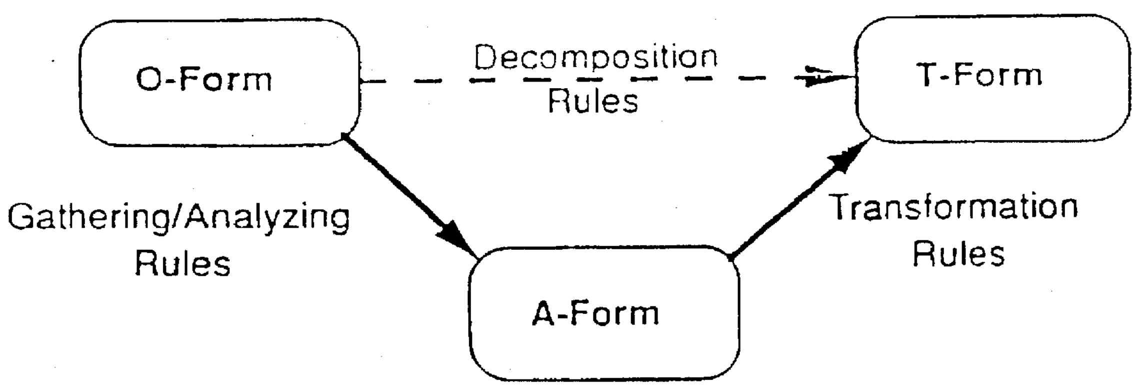
Figure 16:
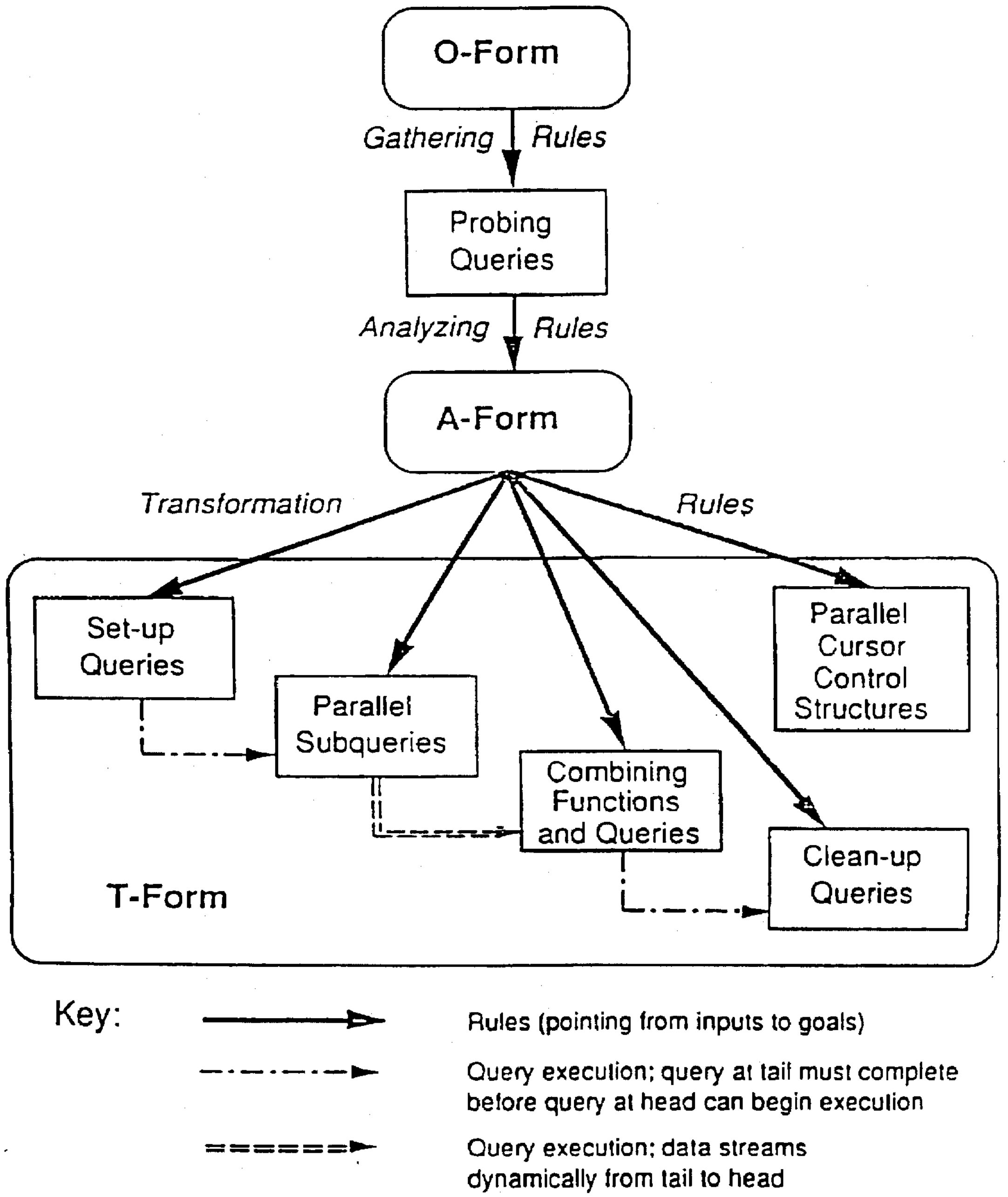

One last example will give a taste of the additional refinements which the pnode tree architecture will permit, sometimes, as in this case, without requiring any new pnode types. Consider a query such as:

```
select dno, subdno, avg(salary) from emp
group by dno, subdno
order by 1, 3
```

which computes the average salary for each subdepartment, and returns them sorted overall by department number, but within each department sorted by average salary. If at decomposition time we are smart enough to notice that the input stream to our final sort is already ordered by a leading subset of our sort columns, we can group on that leading subset, and perform a "mini-sort" of each group, potentially significantly cutting our sort costs (it would take cost-based optimization to determine the best choice case by case, but a reasonable heuristic would be to use mini-sort whenever possible instead of full sort). The only change on the execution-time side is that the sort pnode must recognize EOG as an alternate signal that it's time to sort the rows it has been collecting. The pnode tree would look like FIG. 36-7:

Combining Functions vs. Combining Queries

Database Note #21 distinguishes two classes of approaches to combining the output streams of the parallelized subcursors resulting from query decomposition. In a combining functions approach, functions which we implement as part of the PUPI library manipulate the output streams from the parallelized subcursors, to emulate the result stream which would be produced by handing the caller's original query straight to ORACLE. The pnode architecture as presented thus far is a proposed instance of a combining functions approach. An advantage of such an approach is that it permits rows to stream from function to functions, with caching required only when an algorithm demands it. A disadvantage is that as complexity of cases handled increases, the combining functions require more and more of the attributes of a query engine, to do their jobs. In particular, they begin to require the ability to mimic the generalized expression evaluation capabilities of the DBMS.

In a combining queries approach, the output rows from parallelized subcursors are inserted into one or more temporary intermediate tables (We believe one is always sufficient for cases we have discussed). A combining query is formed, which can be handed to ORACLE to execute against the intermediate table(s), producing an output stream which mimics that which the original query would have produced if handed direct to ORACLE. An advantage of this approach is that it might be much easier to implement, particularly for more complex cases, because it lets ORACLE do most of the combining work, avoiding the tendency to re-invent a query engine inside the PUPI library. A disadvantage is that it incurrs the considerable extra overhead of creating, populating, and dropping one or more temporary intermediate tables. (This would be much less a problem with a DBMS that supported private, transient, preferably-in memory tables, or better yet, a mechanism for directly streaming the output of one cursor as a virtual input table of another cursor.)

In general, the tradeoff here is between development cost, which is higher for combining functions especially in cases requiring generalized expression evaluation; and performance, which is slower for combining queries especially in cases where intermediate results would tend to be large. Thus, a case such as grouped aggregation with a having clause would be a good candidate for combining queries, at least in a first implementation, since it requires fully generalized expression evaluation (a having clause may test the value of arbitrary expressions over group or aggregate columns), and intermediate results will be relatively small (only one row per distinct set of group column values per subcursor). Straightforward cases where union-all suffices as a combining function would be obvious candidates for a combining functions approach. For intermediate cases, the tradeoff may not be so obvious.

It may be desirable to implement some cases entirely by means of combining functions, and others entirely by means of combining queries. However, it is preferrable to combine the two approaches by encapsulating combining query behavior inside pnodes. This would permit mixing and matching of combining function and combining query approaches, and would minimize and localize the changes needed to substitute more efficient combining function implementations of particular functions for first-release combining query versions of them, in later releases.

The general architecture of a combining query pnode would be as follows: externally, its general appearance and behavior would be like any other pnode: it would have one parent and zero or more children; it would recognize the standard request codes and return the standard reply codes; it would pull rows from its children as needed and return rows to its parent when requested. Internally, it would have an associated combining cursor (not unique for a pnode, since the subcursor pnode already knows how to manage a cursor) and one or more associated tables (which it might create when pulled while UNINITIALIZED, and drop when called upon to CLEANUP). When pulled to return a row, it would pull rows from its children and insert them in the appropriate intermediate table until all children returned EOD (or perhaps EOG in some cases), and would then open its combining cursor over the intermediate table(s), and fetch and return rows from that cursor.

Figure 17:
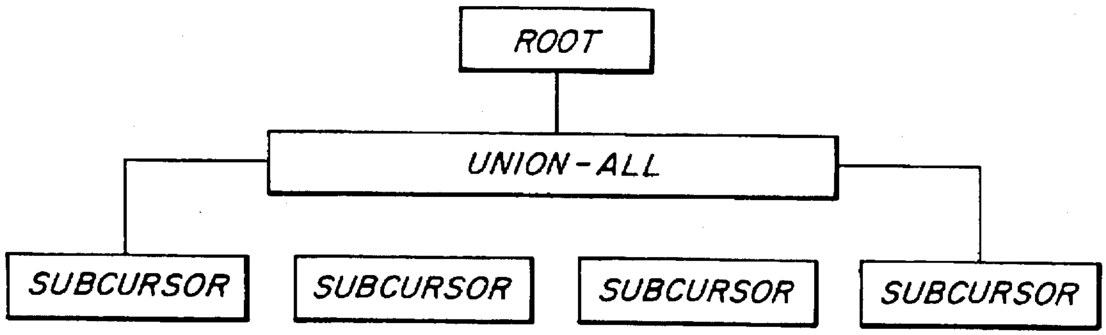
FIGS. 17 through 23 are used in connection with the discussion of parallel cursor building blocks in Database Note #36.
Figure 20:
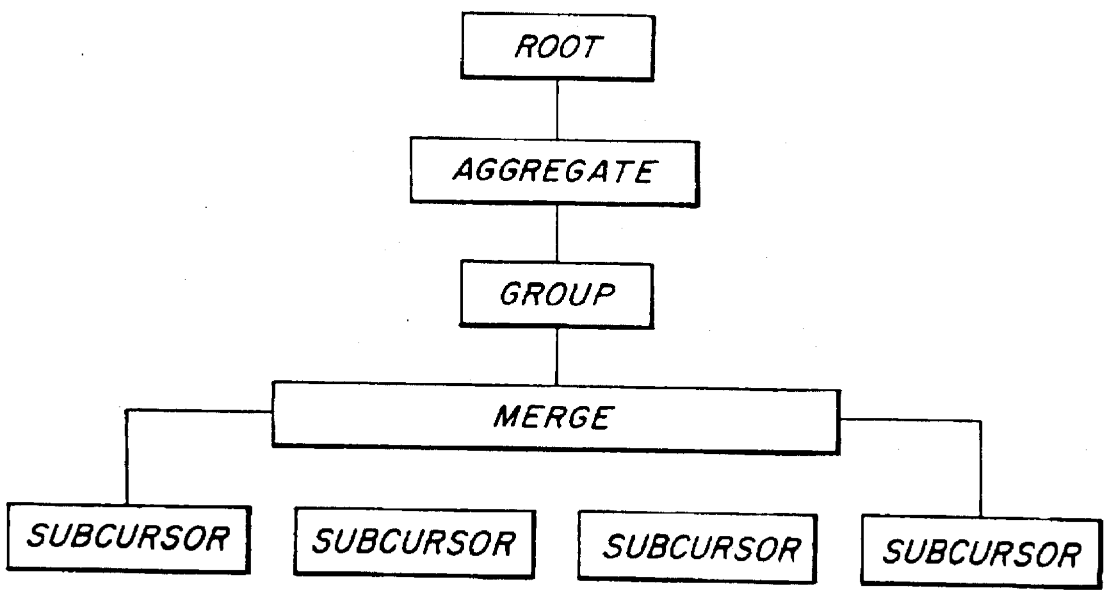
Figure 18:
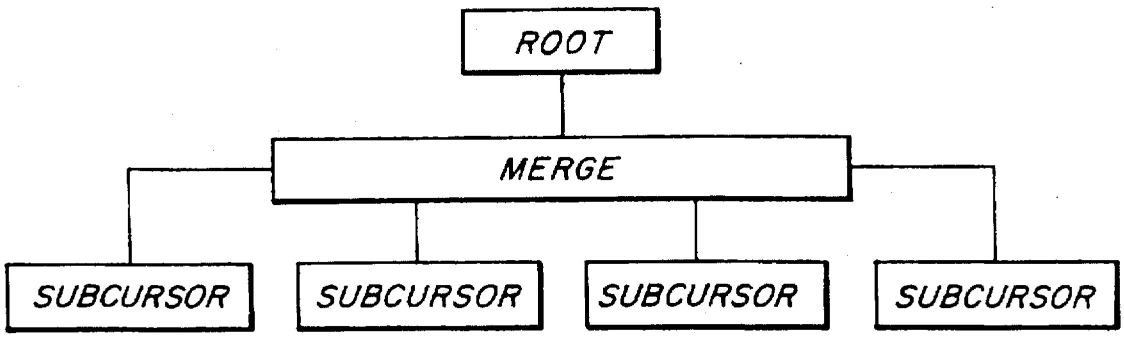
Figure 19:
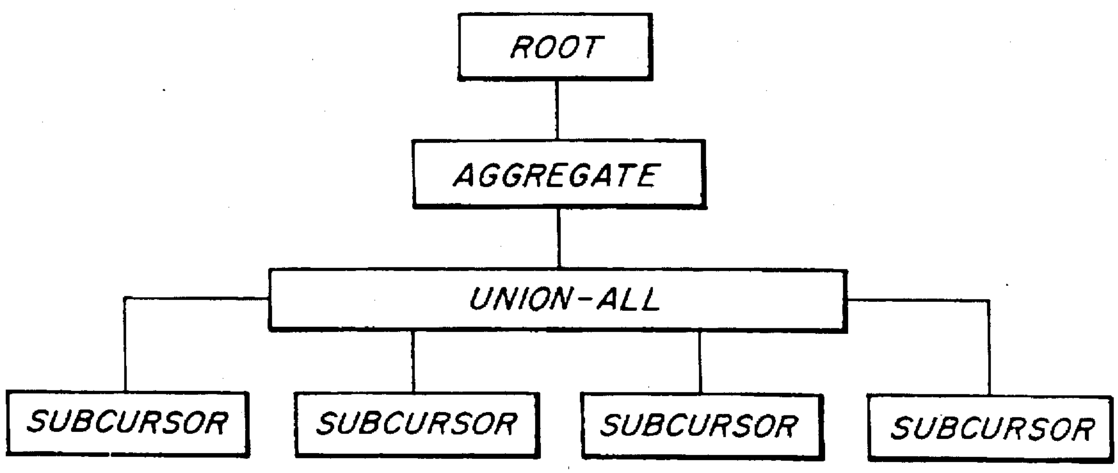
Figure 21:
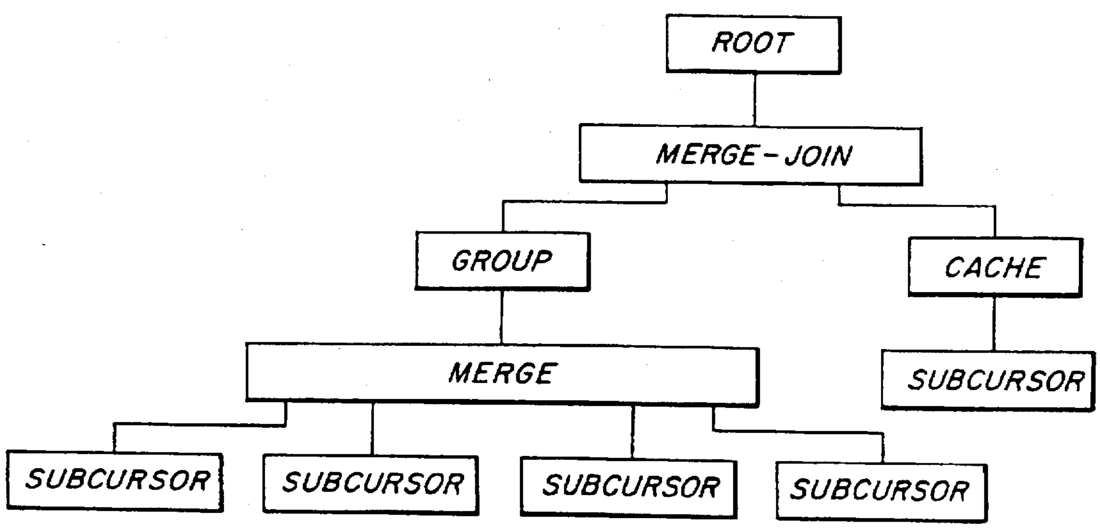
Figure 22:
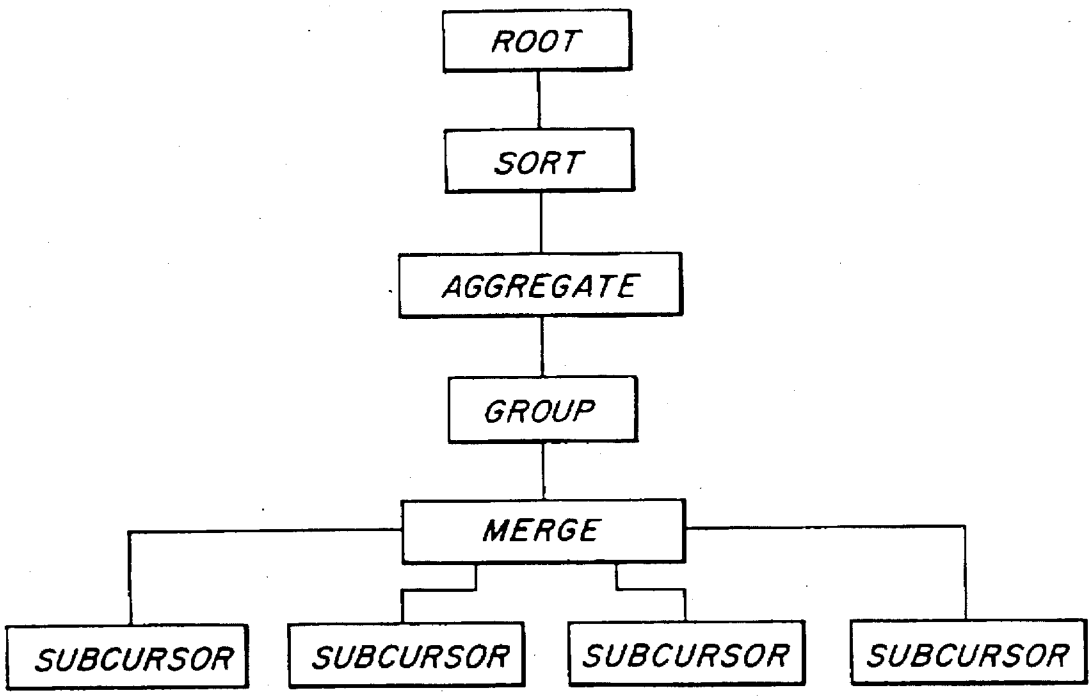
Figure 23:
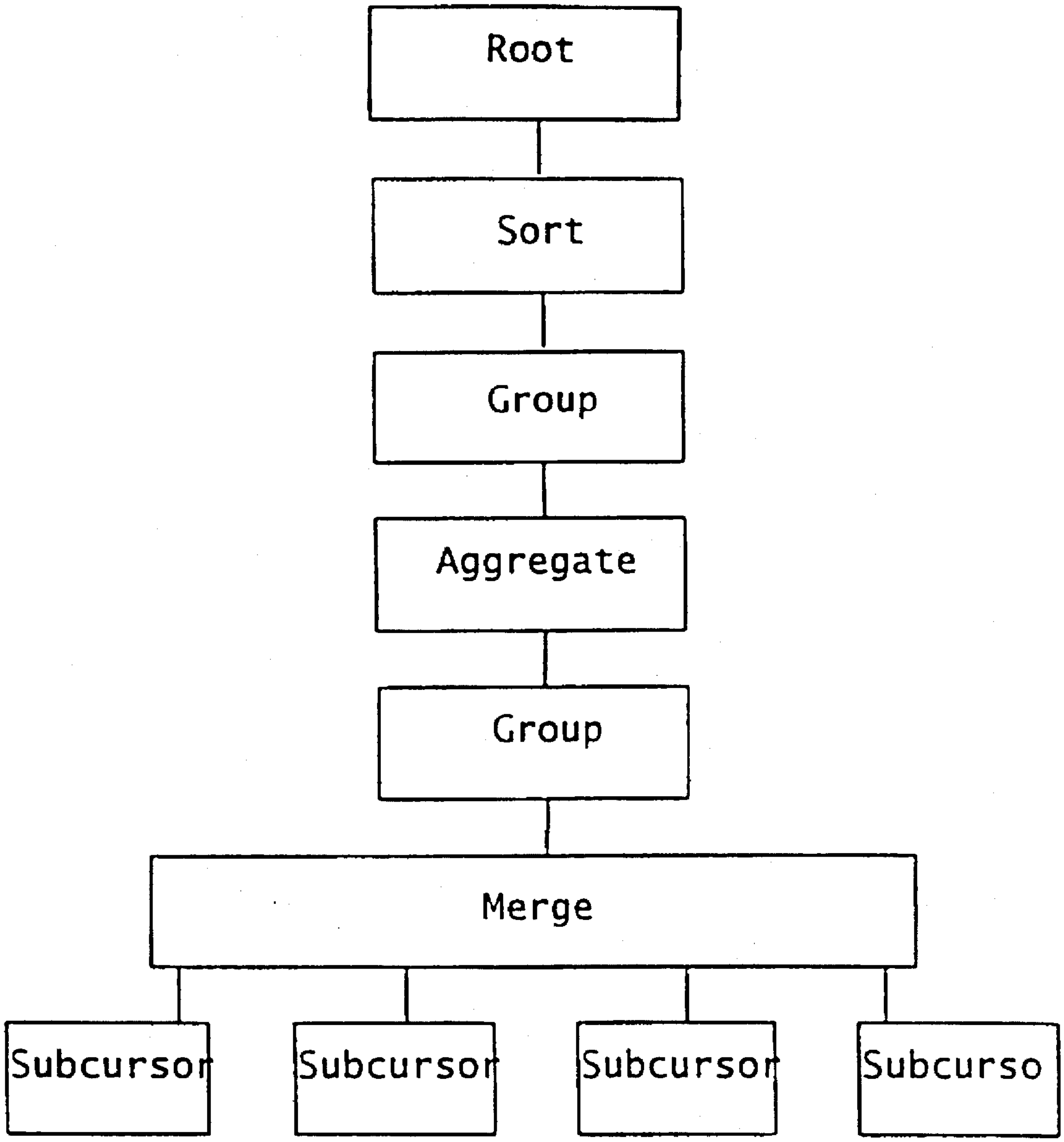

The simplest approach to using a combining query within a pnode tree would be to have an appropriate combining query pnode "masquerade" in place of a combining function pnode in one of the tree types we have already discussed. As the most general instance, a combining query pnode could masquerade as the root pnode in the basic union-all tree (FIG. 17). This tree structure could handle a wide variety of cases, depending on the nature of the combining query (but there would be no point in using a combining query for cases that the basic union-all tree could have handled without one). For example, the combining query could contain an ORDER BY clause, to perform as full sort as an alternate to using a merge pnode to implement sorted queries. Or it could contain GROUP BY and HAVING clauses, and appropriate aggregate functions over columns of the intermediate table (s), as an alternative to the grouped-aggregation tree shown in FIG. 20.

This "simple" approach has the disadvantage that all rows retrieved from all parallel subcursors must be inserted in the intermediate table, which can therefore grow arbitrarilly large. We can do much better by implementing combining functions versions of the merge and group pnodes, and implementing a combining query pnode to masquerade as an aggregate node. We could then build trees like FIG. 20 if we build a combining query pnode to masquerade as the aggregate node. For each group of rows from its child, it could populate an intermediate table and execute a combining query to perform aggregation and test the HAVING clause; it could then empty the intermediate table and repeat for subsequent groups. This requires us to implement only the relatively simple expression evaluation needed to compare sort and group column values, while letting a combining query handle the potentially complex expressions involved in aggregate functions and the HAVING clause. And it limits the cardinality of the intermediate table, at any one time, to at most the degree of partitioning of the overall query.

As a next incremental improvement, we might implement the "real" aggregate pnode, but without the ability to evaluate a HAVING clause. We could then build the FIG. 20 tree with a combining query pnode masquerading as the root pnode. This time, the combining query pnode would only have to insert into an intermediate table one row per group, rather than one row per group per subcursor (i.e. inserts would be cut by the degree of partition of the pcursor); and the combining query could use a simple WHERE clause in place of the HAVING clause, to decide which rows from the intermediate table should be returned.

"Set-Up" Functions and Pnode Architecture

In some cases we may wish to perform "set-up" functions such as creating secondary indexes, or having ORACLE pre-sort rows into temporary tables, to facilitate better-optimized queries. This could be of particular advantage in cases where sorts would otherwise need to be performed redundantly in parallelized subcursors. This kind of approach is not incompatible with pnode architecture, and could perhaps be handled as an adjunct function of the root pnode, to be performed once when the root is pulled in an UNINITIALIZED state. It is necessary to create secondary keys or temp tables before opening any parallelized subcursors, because the latter may reference temp tables, and ORACLE may take advantage of secondary indexes in optimizing the subcursors.

We can distinguish two general types of pnode combining architectures, parallel and sequential, for those pnode types which have more than one child. In the latter, a given child must complete its entire task before the next child is pulled; this approach would be used to handle set-up functions, and possible in some cases "non-masquerading" combining queries.

One possible problem must be considered: the query decomposition process is driven by examining the query execution plan returned by ORACLE's EXPLAIN call. Only after we examine this plan for a particular query will we decide which, if any, set-up functions to perform. But once the set-up functions are performed, we can assume (in all interesting cases) that ORACLE would now return a different EXPLAIN plan; indeed, that's what we're counting on. However, if we don't actually execute the setup functions until we first pull the pnode tree, then they haven't yet been executed while we're creating the tree, so we can't examine ORACLE's revised EXPLAIN plan, and must guess at its contents. Presumably we have a pretty good guess, or we wouldn't have chosen the set-up function strategy, but careful consideration may reveal some cases where we can't be sure. In that event, we might need to move the set-up functions to query decomposition time, rather than pnode-tree-execution time.

Overhead of Pnode Architecture for Trivial Cases

Assuming that we bypass the PUPI layer entirely at query execution time for those queries which we don't decompose, the overhead of using the pnode approach for simple decomposable cases should be insignificant. Pnode architecture differs from other possible approaches to combining functions in being more object oriented, and more geared towards factoring out common subfunctions. But any combining functions approach would require some kind of data structures to define the plan for the particular query and maintain state information during execution, some mechanism for coordinating activity across thread boundaries, and some number of levels of subroutine calls. It is only in the last area that pnode architecture might be seen to have slight additional overhead, due to separating functions that might potentially have been combined. But even this should be neutralized by the mechanism of a parent pulling its child by executing the child's function indirectly, which avoids the slight overhead of a dispatcher to functions based on pnode type.

More complex combining functions involving full (as opposed to merge) sorting (for ordering aggregate results) or caching (for merge joins) would ideally be built over a buffer paging layer to allow the size of intermediate results to exceed available memory. The need for paging management is inherent in the sort and cache functions, however they are incorporated into an overall design, rather than being inherent in the pnode architecture. These cases could be handled by combining queries in earlier releases.

Parse Tree Requirements for Query Decomposition (Database Note #37)

In order to decompose a query into parallel subqueries, and then execute those subqueries and combine their results to emulate the results of the original query, we need in each case to do one or more of the following:

1) Transform the input query to generate parallel subqueries.
2) Transform the input query to generate a combining query.
3) Identify and generate defining structures for any expressions which we will evaluate ourselves, whether they are implicit (e.g. comparisons on ORDER BY or GROUP BY columns) or explicit (e.g. HAVING clause) in the original query.

The general case of each of these tasks requires full parsing of the input query.

It should be noted that the SQLDA structure returned by DESCRIBE SELECT does not provide adequate information for the needs of the three decomposition tasks listed above:

1) SQLDA describes only the SELECT list items themselves, not underlying columns or other clauses of a query.
2) If a SELECT list item has an alias, then that alias, rather than the expression defining the item, appears as the name of the item in the SQLDA. Therefore, we can't rely on names in SQLDA for identifying aggregate functions, for example.
3) Apparently (according to my experiments) SQLDA does not return the precision or scale of numeric expressions which are not direct column references.

The output of EXPLAIN also does not provide the kind of information needed for query transformation; in particular, it gives no detailed information at all about expressions in the SELECT list, ORDER BY, GROUP BY, WHERE, or HAVING clauses.

This database note presents a general description of a set of data structures which could be used to form a parse tree to represent those attributes of a parsed query in which we are interested. If we have to parse queries ourselves, our parser would produce such a tree.

General Characteristics

The parse tree should ideally constitute a complete self-contained definition of a query, such that an SQL query specification can be generated from it. This implies that it should contain whatever names and aliases would be needed to specify tables and columns in an SQL query specification. It should embody the complete definition of a query and all of its clauses, but in a form suitable for easy and flexible traversal, manipulation, and transformation.

QDEF: Query Definition

The QDEF is the top level structure of the parse tree for a particular query (where query is used in the broad sense to include possible UNION, INTERSECT, or MINUS set operators connecting multiple SELECT blocks).

Attributes:

Number of ORDER BY columns (0 if there's no ORDER BY clause)

Pointer to ORDER BY clause (array of ORDCOLs).

Pointer to tree of set operators (SETOPs) and queries (QRYs). This will point directly to a single QRY if there are no set operators.

ORDCOL: ORDER BY Column

An ORDER BY clause is represented by an array of ORDCOLs, with one element for each ORDER BY column. Each ORDCOL has the following attributes:

Direction (ASC or DESC).

Poiner to ORDER BY column expression (value EXPR).

SETOP: Set Operator

A SETOP represents a UNION, INTERSECT, or MINUS set operator.

Attributes:

Operator type (UNION, UNION ALL, INTERSECT, or MINUS).

Pointers to two operands (QRYs or other SETOPs).

QRY: Query

A QRY represents an individual query (i.e. a SELECT block).

Attributes:

Number of SELECT list columns.

Pointer to SELECT list (array of SELITEMs).

Number of tables in FROM clause (array of TABs).

Pointer to FROM clause (array of TABS).

Pointer to WHERE clause (Boolean EXPR).

Number of GROUP BY columns (0 if there's no GROUP BY clause).

Pointer to GROUP BY clause (array of pointers to value EXPRs).

Pointer to HAVING clause (Boolean EXPR).

(? Pointers to CONNECT BY and START WITH clauses?)

SELITEM: Select List Item

Attributes:

Name (the name which DESCRIBE would return for this SELECT list item; this will be the item's alias if an alias was specified in the query, otherwise it will be the actual expression text for the item).

Pointer to expression for this SELECT list item (value EXPR).

TAB: Table Reference in FROM Clause

Attributes:

Name (the actual name of the table).

Alias (alias specified for table in query definition).

(Note: the alias is particularly needed for queries with self-joins or correlated subqueries against the same table, where we need to distinguish between multiple instances of the same table.)

EXPR: Expression Element

An EXPR is used to represent each of the elements in the expressions which specify the SELECT list columns, ORDER BY and GROUP BY columns, and WHERE and HAVING clauses. These elements include fields (i.e. base table or view table columns); literals; host parameters; and expression operators, which include both value expression operators (e.g. +, ||, substr) and Boolean operators (e.g. =, <, AND, OR, NOT). EXPRs are arranged in trees to represent arbitrarily complex expressions. An overall EXPR tree represents a value expression or a Boolean expression depending on whether its root EXPR represents a value operator or a Boolean operator.

Attributes:

Operator (code indicating type of expression element: field, literal, host parameters, or particular value or Boolean operator).

Pointer to next EXPR (so all EXPRs can be linked together in a list for easy traversal).

Datatype (ORACLE datatype code).

Length.

Precision (for numeric types only).

Scale (for numeric types only).

Variant portion for fields only:

Name.

Pointer to table in FROM clause (TAB). (Alternately, table number, used as index into FROM clause array. Note that table name is not sufficient, since query may contain separate instances of same table with different aliases. Table alias might serve here, but link back to FROM clause will tend to be more convenient.)

Variant portion for operators only: pointers to operands (EXPRs).

Variant portion for literals: value of literal.

Variant portion for host parameters: some appropriate means of finding the parameter value after the cursor for this query is opened.

(Note: Datatype, length, precision, and scale do not apply to Boolean operators. For value operators, these attributes describe the value resulting from applying that operator to its particular operands. Also note that while we won't always need to know the type attributes of every intermediate expression within an EXPR tree, we will sometimes need to know the type attributes of operands, as well as type attributes of results, so that in general we need to know type attributes of all EXPRs to which type attributes apply.)

Common Subexpression Sharing

Figure 24:
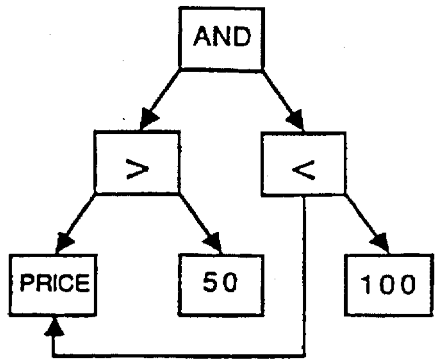
FIGS. 24 and 25 are used in connection with the discussion of parse tree requirements for query decomposition in Database Note #37.

While not strictly necessary, it would be useful to represent any common expression by a single EXPR subtree, and share that subtree by pointing to it from each place it is referenced. For example, the expression "PRICE>50 AND PRICE<100" can be represented as shown in FIG. 24 with a single instance of the EXPR for PRICE pointed to by both the > and < operators. Doing this when generating the parse tree can save us a lot of trouble each time we need to determine if two expressions reference the same subexpression, while we are using the tree. For example, during query decomposition we will need to determine whether each expression in the ORDER BY clause is also contained in the SELECT list. With common subexpression sharing, we can simply traverse the SELECT list and see whether we find a matching pointer; without sharing, we might have to traverse the entire expression tree of each SELECT list item to determine whether it is identical to the expression tree of an ORDER BY column.

EXAMPLE

Figure 25:
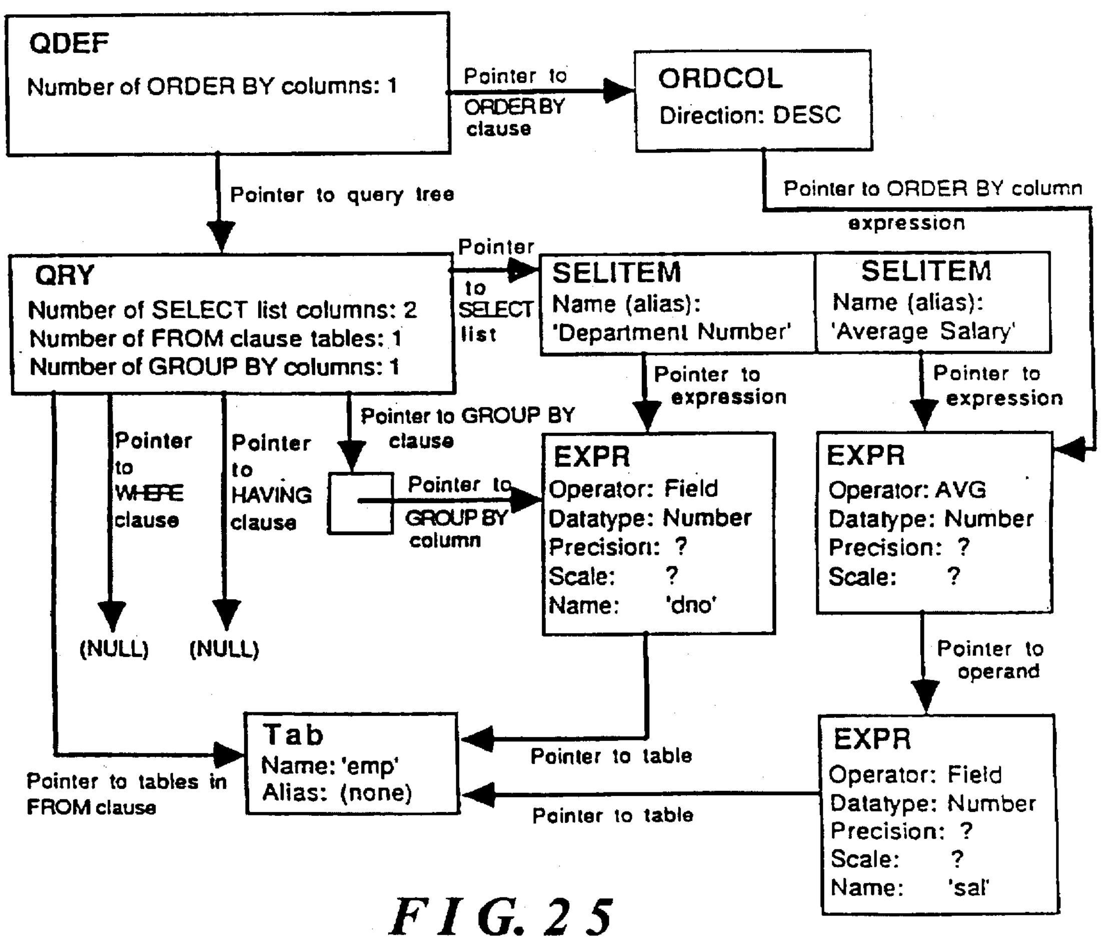

FIG. 25 is a schematic diagram of an example parse tree, for the query:

```
SELECT DNO "Department Number", AVG(SAL) "Average Salary"
FROM EMP
GROUP BY DNO
ORDER BY 2 DESC
```

A fairly simple example was chosen for the sake of readability, but note that in this example, the FROM, ORDER BY, and GROUP BY clauses each contain only one element, so it may not be obvious from the diagram that the structures representing those clauses are (in this case single element) arrays. In particular, note that the QRY structure's pointer to GROUP BY clause does not point directly to the EXPR representing the (first) GROUP BY column, but rather to a (single element) array of pointers to GROUP BY elements. The SELECT list in this example contains two items, so the QRY's pointer to SELECT list points to an array of two SELITEMs.

Select List Transformations (Database Note #39)

This section aims at providing a more complete list than we have previously discussed of cases in which we need to transform the select list of a query when generating parallel subqueries.

1) AVG

Each select list item consisting of an AVG function in the original query is transformed into two select list items, a SUM function and an COUNT function each with the same argument as the original AVG function, in the parallel subqueries. For example:

SELECT AVG(SALARY) FROM EMP becomes

```
SELECT SUM(SALARY), COUNT(SALARY) FROM EMP
WHERE {partitioning predicate}
```

If the results rows from all such parallel subqueries are inserted in an intermediate table TEMP, with columns SUMSAL and COUNTSAL containing the intermediate results for SUM(SALARY) and COUNT(SALARY) respectively, then the final weighted average can be computed with a combining query against the intermediate table, of the form:

SELECT SUM(SUMSAL)/SUM(COUNTSAL) FROM TEMP

2) ORDER BY column not in select list

ORACLE SQL permits ordering by a column not present in the select list, for example:

```
SELECT LNAME, FNAME FROM EMP
ORDER BY SALARY
```

To make such a column available for merging of several sorted streams, whether through a combining function or a combining query, the column must be added to the select list, so that the above query yields parallel subqueries of the form:

```
SELECT LNAME, FNAME, SALARY FROM EMP
WHERE {partitioning predicate}
ORDER BY SALARY
```

3) GROUP BY column not in select list

SQL permits grouping by a column not present in the select list, for example:

```
SELECT AVG(SALARY) FROM EMP
GROUP BY DNO
```

We wish to parallelize such a query by computing intermediate aggregate results for the groups retrieved by each parallel subquery, and then merging the streams to compute weighted aggregates for each group. Since we can't merge the groups if the grouping columns are not retained, they must be added to the select list of the parallel subqueries if not already there, so that the above query yields parallel subqueries of the form:

```
SELECT SUM(SALARY), COUNT(SALARY), DNO FROM EMP
WHERE {partitioning predicate}
GROUP BY DNO
```

4) HAVING contains aggregates not in select list

One could, for example, get a list of departments with high average salaries with the query:

```
SELECT DNO FROM EMP
GROUP BY DNO
HAVING AVG(SALARY)>30000
```

Whether we implement HAVING clause evaluation ourselves or use a combining query, we cannot apply a HAVING clause until we have merged our parallel streams and computed the final weighted aggregates for a group. By that point, in the example above there would be no column to which to apply the HAVING predicate, without select list transformation. Any aggregate mentioned in the HAVING clause and not already present in the select list must be added to the select list, and if necessary transformed according to rule 1 above, so that the above query yields parallel subqueries of the form:

```
SELECT DNO, SUM(SALARY), COUNT(SALARY) FROM EMP
WHERE {partitioning predicate}
GROUP BY DNO
```

Also note that the HAVING clause itself is omitted from the parallel subqueries, as it cannot be applied until the combining step.

5) ORDER BY an expression

Up to this point, we've looked at examples where combining the results of our parallel subqueries would be logically impossible without performing the specified select list transformations. There are other cases where transformations which are not strictly required can simplify our requirements for expression evaluation. For instance, merging streams sorted on a select list column requires the ability to compare two values according to SQL's collation rules. Merging stream sorted on an expression not appearing in the select list requires the additional ability to evaluate that expression. We can eliminate the latter requirement by adding the expression to the select list of the parallel subquery. For example:

```
SELECT PRICE, QUANTITY FROM LINE_ITEMS
ORDER BY PRICE * QUANTITY
```

could be transformed to:

```
SELECT PRICE, QUANTITY, PRICE * QUANTITY FROM
LINE_ITEMS
WHERE {partitioning predicate}
ORDER BY 3
```

Note that this case is really the same as case 2 above, in that the ORDER BY clause refers to an expression not present as a select list item, except that in this case the expression happens to involve operands which ARE present in the result list, so that the transformation is logically optional.

Also note that a wide variety of expressions which yield values may legally appear in an ORDER BY clause. For example, this is a legal query:

```
SELECT * FROM EMP
ORDER BY SUBSTR(LNAME, 2, 2)
```

So this class of transformation can potentially eliminate the need to re-invent a wide class of expression evaluation.

6) GROUP BY an expression

This is similar to case 5, except that if a given column is referenced in the GROUP BY clause within an expression, then if it appears at all in the select list, it must appear within that expression (or within an aggregate function). To give a nonsense example (since a meaningful one is hard to imagine), the following query is legal:

```
SELECT DNO + 2, AVG(SALARY) FROM EMP
GROUP BY DNO + 2
```

as is this one:

```
SELECT AVG(SALARY) FROM EMP
GROUP BY DNO + 2
```

but this one is not:

```
SELECT DNO, AVG(SALARY) FROM EMP
GROUP BY DNO + 2
```

The middle example above would have to be transformed to parallel subqueries of the form:

```
SELECT DNO + 2, AVG(SALARY) FROM EMP
WHERE {partitioning predicate}
GROUP BY DNO + 2
```

7) Transformations to "SELECT *"

ORACLE SQL does not permit a select list containing an unqualified "*" to contain any other separately-specified columns. However, ORACLE SQL supports the syntax <table-name>.* as shorthand for all columns of a particular table, within a select list. It is permitted for this to be one of several separate column specifiers. In general, for a query joining several tables, "SELECT *" is equivalent to "SELECT <table1>.*, <table2>.*, . . . <tableN>.*".

Therefore, whenever it is necessary to transform a "SELECT *" select list by adding one or more additional columns, "SELECT *" must be transformed to "SELECT <table1>.* etc.". As a specific example:

```
SELECT * FROM EMP, DEPT
WHERE EMP.DNO = DEPT.DNO
ORDER BY SALARY + BUDGET
```

could be transformed to:

```
SELECT SALARY + BUDGET, EMP.*, DEPT.* FROM EMP, DEPT
WHERE EMP.DNO = DEPT.DNO AND {partitioning predicate}
ORDER BY 1
```

8) STDEV and VARIANCE

Each select list item consisting of a STDDEV (standard deviation) or VARIANCE function in the original query is transformed into three select list items: a SUM function, a COUNT function, each with the same argument as the original STDDEV or VARIANCE function; and a nested set of functions of the form SUM (POWER (<expression>, 2)), where <expression> is the argument of the original STDDEV or VARIANCE function. For example,

SELECT STDDEV(SALARY) FROM EMP becomes

```
SELECT SUM(SALARY), COUNT(SALARY),
SUM(POWER(SALARY), 2) FROM
EMP WHERE {partitioning predicate}
```

If the result rows form all such parallel subqueries are inserted in an intermediate table TEMP, with columns SUMSAL, COUNTSAL, and SUMSQRSAL containing the intermediate results for SUM(SALARY), COUNT (SALARY), and SUM(POWER(SALARY),2), respectively, then the final weighted standard deviation can be computed with a combining query against the intermediate table, of the form:

```
SELECT DECODE(SUM(COUNTSAL), 1, 0,
SQRT((1/(SUM(COUNTSAL) - 1))*
  (SUM(SUMSQRSAL) - POWER(SUM(SUMSAL), 2)/
  SUM(COUNTSAL))))
  FROM TEMP
```

The use of the DECODE expression within this combining expression is necessary to avoid a possible zero denominator in the case where "SUM(COUNTSAL)-1" evaluates to zero.

For a query referencing VARIANCE, such as:

SELECT VARIANCE(SALARY) FROM EMP the parallel subqueries would be the same as for STDDEV, as shown above, and the combining query would be of the form:

```
SELECT DECODE(SUM(COUNTSAL), 1, 0,
((1/(SUM(COUNTSAL) - 1))*
```

-continued

```
(SUM(SUMSQRSAL) - POWER(SUM(SUMSAL),2)/
SUM(COUNTSAL))))
FROM TEMP
```

(Note that the only difference in the combining expression for STDDEV and VARIANCE is the nesting of the entire expression within a SQRT function in the case of STDDEV.)

9) INSERT/SELECT

Queries which are INSERT/SELECT statements (i.e., which insert into a specified table the result rows of a query specified within the same statement) can be decomposed, and fall into two classes. Neither class requires special transformations to the select list itself, but both classes generate queries of distinctive form.

The first class consists of INSERT/SELECT statements in which the query portion does not contain grouping or aggregation. In queries of this class, each parallel subquery is generated as an INSERT/SELECT statement, which inserts rows directly into the table specified in the original query. For example:

```
INSERT INTO MANAGERS SELECT * FROM EMP WHERE
JOB_TITLE = MANAGER
```

becomes

```
INSERT INTO MANAGERS SELECT * FROM EMP WHERE
JOB_TITLE = MANAGER AND {partitioning predicate}
```

The other class consists of INSERT/SELECT statements in which the query portion contains grouping or aggregation. In queries of this class, the parallel subqueries do not contain the INSERT INTO . . . portion of the original statement, and look just like parallel subqueries generated for the query portion of the original statement, if the original statement were not an INSERT/SELECT statement. Instead, the combining query is generated as an INSERT/SELECT statement, which fetches final query results from the intermediate table, and inserts them in the table specified in the original query. For example:

INSERT INTO AVG_SALS SELECT AVG(SALARY) FROM EMP GROUP BY DNO generates parallel subqueries of the form:

```
SELECT SUM(SALARY), COUNT(SALARY), DNO FROM EMP
  WHERE {partitioning predicate}
  GROUP BY DNO
```

and generates a combining query of the form:

```
INSERT INTO AVG_SALS SELECT SUM(SUMSAL)/
SUM(COUNTSAL) FROM TEMP GROUP BY GROUPCOL
```

(where GROUPCOL is the column of TEMP containing DNO values fetched from the parallel subqueries)

Query Decomposition Control Structures (Database Note #41)

Introduction

This section raises a number of questions about query decomposition and parallel query execution, and suggests alternative approaches in some areas.

PUPI Control Structures

The PUPI potentially requires control structures at four levels: session, user connection, parallel cursor (pcursor), and parallel subquery (psubqry). A user session can potentially open multiple concurrent ORACLE connections, each of which may have multiple concurrent open cursors, each of which, if decomposed, will have multiple parallel subqueries. Within a connection, a cursor is uniquely identified by cursor number, but if we choose to support multiple concurrent user connections, then the hstdef for its connection is required in addition to the cursor number to uniquely identify a cursor.

This section proposes four levels of control structures connected in a tree, as shown schematically in FIG. 26.

An alternative approach would be to group pcursors directly under the session level, but with pointers back to their respective connection structures, as shown in FIG. 27.

This would reduce a little more gracefully to the single-connection case, since it would require fewer levels of indirection to find a pcursor. We have chosen the four-level approach (for the time being) because it provides a simpler framework within which to specify more detailed data structures. If we choose to support only a single user connection, the session and connection levels proposed here can be collapsed into a single level.

Session level control structures provide for top-level PUPI housekeeping, and coordinate PUPI activities for a user session, which may include multiple connections with ORACLE.

Connection level control structures coordinate all PUPI activities for a particular user connection with ORACLE.

Pcursor level control structures contain definitional, state, and context information about a parallel cursor and its combining functions and queries, and coordinate the parallel subqueries of that pcursor.

Psubqry level control structures contain definitional, state, and context information for an individual parallel subquery. It is proposed that psubqry-specific information be clustered together in memory, connected to a master control structure (the subquery pnode) for each psubqry. Alternately, psubqry level information might be clustered by type of information, collected in arrays attached to the pcursor level control structures, indexed by psubqry number (e.g. an array of hstdefs for the parallel connections, arrays of bind and select descriptors for the parallel subcursors, etc.). This paper proposes the former approach for two reasons: first, to allow greater flexibility in adapting the system to handle heterogeneous parallel subqueries, which might not each have the same kinds of control information; and second, to minimize memory subpage contention, on the assumption that the control information for a given psubqry will be accessed much more often by that psubqry's thread than by any other parallel thread.

Session Level Control Structures

PCOM—PUPI Common Area

This is the master control structure for the entire PUPI. It is created and initialized by pupiini( ). All other PUPI structures can be accessed via pointer paths from this structure, so that a pointer to this structure is the only global variable required in the PUPI. (ISSUE: We're not sure yet whether we have any particular reasons to want to avoid global variables, but my previous experiences with multi-threaded programming have led me to consider it prudent to avoid globals if they aren't necessary.)

PCOM contains:

Pointers to UPI functions, which pupiini( ) sets to point to either PUPI or UPI functions, depending on whether query decomposition is enabled or disabled. (NOTE: Function calls will be slightly faster if each individual function pointer is a global variable, so we might want to separate them from PCOM if we don't have any particular reasons to avoid globals.)

Number of active user connections to ORACLE (mainly of interest to distinguish between one and many).

Pointer to first CONNECTION structure. CONNECTION structures form a linked list. PUPI calls which specify a cursor number will also specify a connection, by hstdef, so we must first search the linked list of connections, and then search the list of pcursors for the specified connection. (It is assumed that the number of concurrent user sessions will tend to be quite small, so that searching a linked list to find a session should not be a problem.)

Error state information (details to be determined). It is assumed that connection-specific error and other status information is communicated to the user application via the hstdef for that connection, and we will probably need to emulate some of that behavior. The error state information in PCOM relates to PUPI-specific errors, or instances in which we need to translate errors returned by psubqries into something more meaningful to the user. Since we process user calls one at a time, it is assumed that this information can be maintained in PCOM, rather than separately for each connection.

Pointers to memory heaps (optional). We could make direct system calls whenever we need to dynamically allocate a structure or buffer. However, this makes it inconvenient to free a complex network of structures all at once (e.g. to get rid of all decomposition-time structures when we're done decomposing a query, or to get rid of a pcursor and all of its associated structures when we close it). One (expensive to implement) solution to this problem would be to develop our own heap management layer. When we create a heap, we would allocate its initial extent from the system; we could then allocate and free individual structures at will; and when we delete the heap, we simply make one system call to free the initial extent, and an additional system call for any expansion extents, and all of the heap's contents are freed without any need to traverse a structure network to find them. We could maintain, for example, one decompose heap which gets recreated and deleted each time we decompose a query; and a separate execution heap for each pcursor.

Connection Level Control Structures

CONNECTION

This is the master control structure for a particular user connection. While it could be created for a given connection when the connection is established, its creation could alternatively be deferred until the first time we decompose a query for that connection. It contains:

Pointer to ORACLE hstdef for this original user connection; this is the hstdef which will be "cloned" for parallel connections. (ORACLE's UPI holds the caller responsible for allocating a hstdef for each connection. It is assumed that we can point directly to that hstdef, and do not need to copy it.)

Number of pcursors currently open for this connection. (NOTE: We're not sure we actually have a use for this.) (NOTE 2: By a "currently open" cursor, we mean a cursor which has been decomposed and not yet closed and discarded. Decomposition happens in pupiosq( ), which is called during execution of an OPEN CURSOR statement for a static SQL cursor, but during execution of PREPARE for a dynamic SQL cursor.)

Pointer to pcursors for this connection. There may be occasions when we need to visit all pcursors (e.g. to close all of them), but more typically we must randomly access a particular pcursor by cursor number, whenever the PUPI receives a request aimed at a particular cursor number (e.g. upifch). (In fact, we must do this even for non-parallel cursors, since there's no way to tell from the number itself whether it belongs to a parallel or non-parallel cursor.) If the number of concurrently opened pcursors stays small, a linked list would be adequate for both types of access. Otherwise, we might want a faster random access organization (e.g. a hash table), perhaps in addition to a linked list. (NOTE: We probably have to assign the same cursor number to a pcursor which ORACLE returns when we parse its input query; otherwise, we might collide with cursor numbers of non-parallelized cursors in the same application. This means we probably can't use cursor numbers directly as array indices for fast random access.) (NOTE 2: If we adopt the alternate approach in which pcursors for all connections are gathered in one list, attached to PCOM, then we would probably want to hash together the hstdefand the cursor number for quick pcursor lookup.)

Pointer to unused parallel connections pool (if and when we implement connections pooling).

Parallel Cursor Level Control Structures

PCURSOR—Parallel Cursor Structure

PCURSOR is the master control structure for a particular decomposed cursor which is currently open. It is created when the cursor is decomposed, and is discarded when the cursor is closed. (Since decomposition of a particular query happens entirely within a single PUPI call, pupiosq( ), transient data structures needed only during decomposition can be discarded once decomposition is completed.)

PCURSOR contains:

Root cursor number. This is the number returned by ORACLE when the input query is parsed, and is the number user calls will use to identify this cursor (together with the hstdef for the connection to which the cursor belongs). It must be distinct from other cursor numbers of this user connection, whether they belong to parallel or non-parallel cursors.

Pointer to next PCURSOR for this session (to connect it in linked list starting from pointer to first PCURSOR, in PCOM).

Pointer to buffer translation table (BTT). This is an array of pointers to buffers used by this pcursor; data can be referenced by index into this array, and offset within buffer. (Each psubqry has its own buffer translation table for its fetch-ahead buffers; the pcursor BTT has one entry for each psubqry BTT. This avoids subpage contention from psubqries accessing their BTTs in parallel. This is only necessary if pointers in a psubqry BTT need to be modified during query execution; otherwise, each psubqry could simply be assigned a range of buffer numbers within the BTT of the pcursor.)

Pointer back to CONNECTION to which this pcursor belongs. (This is provided for convenience, so that routines operating on the pcursor can easily find the hstdef or other connection-specific information when they need it, without having to search for it in the list attached to PCOM, or having it passed as a separate parameter.)

Bind descriptor for the root cursor. This describes any host parameters referenced in the original input query which has been decomposed. It is modified each time the pcursor is re-opened. (ORACLE permits re-opening a cursor to bind new host parameter values, without an intervening close. This causes the same user-visible behavior as if there were an intervening close, but the query does not have to be re-parsed and re-optimized.) Since host variables described in the bind descriptor are not modified by query execution, and since they are referenced identically in all parallel subqueries of the same pcursor (unless we choose to specify fileid through a host parameter), the root cursor's bind descriptor can be shared by parallel subqueries.

Select descriptor for the root cursor. This describes target host variables into which select-list items are placed to satisfy a fetch request. It is potentially modified prior to each fetch, to specify different target locations and/or different data conversions. (ISSUE: Several descriptor formats are used by various UPI routines, so we will need to determine the most appropriate format to store with the pcursor, and the most appropriate point(s) to "tap into" the various UPI routines which can be called to describe target variables. Also, we may want to keep a separate, "vanilla" descriptor which describes the way select-list items look when they are returned from parallel subqueries, i.e. the source types for conversion to requested output types. Since psubqries fetch ahead asynchronously, in general one of them will already have fetched the next row to be returned to the user, before the user specifies the data conversions required for that row.)

Pointer to combining tree (control structures for combining functions and queries).

(?) Number of psubqries, i.e. degree of partitioning of this query. (We're not sure we actually need this for anything once the query has been decomposed.)

(?) Pointer to psubqries. (NOTE: We doubt we need this here, because the multiplexing pnode types, UNION-ALL and MERGE, contain arrays of pointers to psubqries. But if there's any need to navigate easily from PCURSOR to psubqries, without traversing the pnode tree, a pointer in the PCURSOR could point directly to the same array which is embedded within the multiplexing pnode of that PCURSOR's pnode tree.)

(?) Pointer to control structures for setup queries to be executed when this pcursor is opened (e.g. to create temporary indexes or indexed temporary tables so merge joins can be replaced by nested loop joins). It is not yet clear how much of the setup work would happen at decomposition time as opposed to execution time, so detailed specification of setup control structures is deferred.

(?) Pointer to the original input query definition (the actual SQL text). We may want this here because ORACLE supports re-prepare and re-open of a cursor without an intervening close. If pupiosq( ) is called with a cursor number for which we already have a pcursor, we know that the user wants to re-prepare the pcursor, which means in general that we must discard everything and start from scratch. But if we can tell by comparing the new SQL text to a saved copy of the original query that it hasn't actually changed, we can treat re-prepare as a no-op, and simply wait for a subsequent call to bind new host parameters to the pcursor.

Combining Tree

The combining tree (or pnode tree) is a tree of control structures which coordinate psubqry execution and combine the result streams of individual psubqries to produce the result stream of the pcursor. Pnode architecture is discussed in DBN #36.

The following pnode types will be supported in the first release:

Root

The root pnode is responsible for loop control for ORACLE array fetches, and possibly for instances where final data conversions are needed when projecting results into user buffers. (The root may be omitted from some combining trees.)

Aggregate

The aggregate pnode is responsible for computing aggregate functions, and for evaluating HAVING clauses. There will actually be two types of aggregate pnode, a combining function version and a combining query version, but the distinction will be externally transparent.

The combining query version of the aggregate pnode will contain the following information for controlling its combining query and associated temp table:

- DDL query for creating temp table on initialization. (Conceptually, this could be an actual SQL 'CREATE TABLE' statement, to be executed dynamically, but perhaps it can be an equivalent definition to be executed at a lower level.) (NOTE: The temp table could be created at decomposition time, i.e. at pcursor open time, but it is conceivable that it would never be needed, e.g. if the overall query has no result rows, or if the user program never actually fetches from the cursor after it is opened.)
- DDL query for dropping temp table when pcursor is closed.
- Query definition for an INSERT statement to insert rows into the temp table as they are fetched from the aggregate pnode's child. (NOTE: as with temp table creation, the INSERT statement could actually be prepared at decomposition time, in which case its definition would not be needed here.)
- Cursor number for the INSERT statement.
- Bind descriptor for the INSERT statement.
- Query definition for the combining query. (NOTE: as with temp table creation, the combining query could actually be prepared and opened at decomposition time, in which case its definition would not be needed here.)
- Cursor number for combining query.
- Bind and select descriptors for combining query. The select descriptor might actually be the same as for the root cursor, in which case the combining query could place results directly in the user's buffers. The bind descriptor, however, would tend in general to differ from that of the root cursor, since any WHERE clause in the original query, together with any host variables it contains, can be removed from the combining query (since rows which don't satisfy it never get that far).

Group

The group pnode is responsible for detecting group boundaries in a stream of rows already sorted on GROUP BY columns.

Multiplexing Pnodes—Union-All and Merge

The union-all and merge pnodes are each able to coordinate the retrieval of rows from an arbitrary number of psubqries. They differ in that the union-all pnode returns rows in arbitrary order, as they become available from different psubqries, while the merge pnode merges the already-sorted output streams of its child psubqries into a single stream sorted on the same columns (these may be ORDER BY or GROUP BY columns, depending on the query).

A multiplexing pnode contains an array whose dimension is the degree of partitioning of the parallel cursor, with each array element containing the following elements:

Pointer to psubqry pnode.

Pcursor BTT entry number of this psubqry's BTT for fetch-ahead buffers.

Number of buffers in psubqry's BTT.

Buffer number of next ready row in psubqry's BTT. (This is just for the multiplexer to keep track of where it is in the round-robin through this psubqry's buffers. A separate bitmap, discussed below, indicates whether each buffer actually contains a row.)

Psubqry

The psubqry structure is a pnode in its role as leaf node of a combining tree, but its details are best addressed in its role as master control structure for a parallel subquery, which is discussed in the next section.

Parallel Subquery Level Control Structures

PSUBQRY—Parallel Subquery Structure

PSUBQRY contains:

Hstdef for this parallel thread's connection to ORACLE.

Cursor number for this parallel subquery.

Pointer to bind descriptor for this parallel subquery. (This can probably point to the pcursor bind descriptor, since all psubqries of the same pcursor have identical parameter references, and since psubqries do not modify the parameters described by the bind descriptor.)

Select descriptor for this parallel subquery. (NOTE: While psubqries place their output values in different locations, which may change from fetch to fetch, their output columns otherwise share the same description. We can economize on memory by separating out the sharable portions of the descriptor information, which could be collected in the "vanilla" descriptor discussed above, attached to the pcursor, and could be pointed to by each of the psubqries. We may want to keep separate copies of the location portion of the descriptor for each fetch-ahead buffer of each psubqry, to avoid having to reset each output column location between fetches. This decision depends on the tradeoff between memory and CPU use.)

Buffer translation table (BTT) array of pointers to fetch-ahead buffers for this parallel subquery. (NOTE: This design, by giving each psubqry a separate BTT, would make it difficult to dynamically adjust the number of fetch-ahead buffers for different psubqries in reaction to data asymmetry. If our fetch-ahead design does not call for modifying fetch-ahead buffer pointers during execution, then the separate BTT and the number of buffers in the BTT can be replaced by a pair of buffer numbers indicating a range of buffers in the pcursor's BTT reserved for use by this psubqry as fetch-ahead buffers.)

The number of buffers in the BTT (i.e. its dimension).

Pointer to broadcast command area. The parent multiplexing pnode will place a command in this area, to be read by all of its child psubqries, which will be one of fetch-ahead re-open, or close (these are discussed below).

Pointer to a bitmap indicating which buffers are currently full. This is used as a private communication area between the psubqry and its parent.

A psubqry is able to perform the following tasks:

1) Initial open, which includes connecting to ORACLE (or finding an unused connection in the connections pool, if and when this is implemented) and preparing and opening a cursor.

2) Re-open, to bind new host parameter values to the cursor (ORACLE supports successive opens without an intervening close.) This implies resetting all bits in the full/empty bitmap to empty, and restarting the round-robin with the first buffer.

3) Close, which includes closing a cursor, disconnecting from ORACLE (or putting the session in the free connections pool), and terminating the parallel thread.

4) Fetch-ahead.

The first of these tasks, initial open, is performed automatically when the parallel thread for a pcursor is started. The broadcast command will initially be fetch-ahead. The psubqry will continue to fetch ahead as long as it has free buffers, but will check the broadcast command between fetches. If the broadcast command changes to re-open, the psubqry will re-open its cursor and then resume fetching. If the broadcast command changes to close, the psubqry will close itself.

In rough terms, the handoff of data rows from the psubqry to its parent works as follows: All bits in the full/empty bitmap are initialized to empty. The psubqry places rows in buffers in round-robin sequence, setting the flag for each buffer to full after it fills that buffer, until it reaches a buffer whose bit is already set to full. The parent removes rows from buffers in the same round-robin sequence, but does not attempt to remove a row from a buffer until that buffer's full/empty bit is set to full. After removing a row from a buffer, the parent resets that buffer's bit to empty. (Details of how to avoid busy waits when the psubqry "laps" the parent, or vice-versa, remain to be determined.) Note that the parent needs a persistent next-ready-row placeholder, which we have defined as an element in the parent's array of psubqry information, because the parent can return to its caller between fetches. The psubqry itself, on the other hand, never returns until it closes itself, so its round robin placeholder can be a local automatic variable.

Algorithm for Decomposing a Query.

1) Call EXPLAIN (generate plan, don't read it yet)

a) Any errors? If so, return them (Assume query was illegal. Actually, error may be that query referenced a view not owned by the user, which could be fixed by expanding view and trying again, but for now we don't handle that case. Fortunately, EXPLAIN will give back parse errors, if any, and will only complain about views if query was otherwise legal.)

2) Parse the query. (There should be no errors here, if EXPLAIN was happy. But if there are any, return them.)

3) Is query legal to decompose? (PHASE 1)

Any FOR UPDATE, NOWAIT, CONNECT BY, START WITH sequence references (i.e. stuff we can identify just from syntax)? If so, return error.

4) Do semantic analysis of query: resolve synonyms, identify views, associate columns with tables, get datatype, length, precision, and scale of columns. (In general there should be no errors here. But if any system tables were referenced without authid, they won't be found. That's an ok error, because these would all tend to be join views which we can't handle anyway.)

5) Is query legal to decompose? (PHASE 2) Any views?

6) Analyze EXPLAIN information. Determine join order, types of joins, whether each table was retrieved by index (possibly index only). (Possible error at this stage: self-join where one or more instance of a table was retrieved by index only might lead to ambiguous join plan. That's an ok error if the index-only table would have been the driving table, because there's no point partitioning on an index-only table: indexes aren't partitioned.)

7) Can query be effectively decomposed?

(If user specified PARTITION, skip this step. If user specified PARTITION=table, and table is not driving table of join, go ahead anyway (?)-or do we want to rework the FROM clause to get ORACLE to use user's choice as driving table?)

a) Identify driving table in join (table with join_pos 1). (Note: there may be cases where we want to second-guess the optimizer but for now, let's assume optimizer picked correct driving table.)

b) If it is retrieved index-only, no point in partitioning on it, so no point decomposing.

c) Else, retrieve its number of partitions. If only 1, no point decomposing.

d) (Any other reasons why decomposition would be considered ineffective?)

8) Choose degree of partition

Degree of partition=min (driving table partitions, effective number of parallel processes), where effective number of parallel processes=number of available processors times effective number of processes per processor.

NOTE on checking for queries which cannot be decomposed correctly and/or effectively: some causes of this (e.g. distinct aggregates) could be noted early in parsing, and we could abort at that point. I have chosen instead to complete parsing and then check for correctness, because we will gradually expand the set of cases we can handle, and I don't want to scatter special case code all over the place which will become redundant. I wanted to make sure that all legal ORACLE syntax could at least make it through the parser ok. If users really want to avoid the slight extra overhead of our completing the parse before checking, they can use the NOPARTITION directive on queries they know won't be decomposed anyway. We don't yet, but can add code to check for this directive up front, prior to performing a full parse.

Supporting QD for Queries with both GROUP-BY and ORDER-BY Clauses

I. The Problem

SQL queries are permitted to have both a GROUP-BY clause and an ORDER-BY clause, as in the following example:

```
SELECT DNO, COUNT(*) FROM EMP
GROUP BY DNO
ORDER BY 2
```

This means that each result row consists of a DNO value and a count of the number of rows with that DNO value, and the result rows are ordered by that count. This requires an additional sort of the result rows, beyond the sort that was implicitly done on the GROUP-BY columns in order to do the grouping.

QD is currently able to merge-sort already-sorted input streams from parallel subqueries (to support the ORDER-BY clause without GROUP-BY), and is able to delimit groups in its merged stream and perform aggregates on those groups (to support GROUP-BY without ORDER-BY). But ORDER-BY on top of GROUP-BY requires sorting an entire stream of rows (namely, the result rows of the GROUP-BY query as they would be ordered without the ORDER-BY clause) into a completely different order (as opposed to merging pre-sorted streams). This is a capability that QD does not currently support.

QD support for queries containing both ORDER-BY and GROUP-BY clauses has been listed on the "deferred beyond P1" features list for over a year. However, presence of both of these clauses in 3 of the 8 benchmark queries from a U.K. bank has raised the question of whether this feature should be implemented for the initial alpha release of QD (i.e. immediately).

DBN #36, "Parallel Cursor Building Blocks", sketches the design solution to this problem: an additional type of QD building block called a "SORT" building block would be incorporated into the pcursor combining tree above the AGGREGATE building block and below the ROOT:

```
                     ROOT
                      |
                     SORT
                      |
                   AGGREGATE
                      |
                  MERGE/GROUP
                      |
     ----------------------------------
     |            |           |           |
SUBCURSOR SUBCURSOR SUBCURSOR SUBCURSOR
```

(DBN #36 showed the MERGE and GROUP as separate building blocks, but their functionality was collapsed into a single building block in the actual implementation.)

The SORT building block would be responsible for sorting its input stream of rows into the order specified by the query's ORDER-BY clause. Since the number of groups can be arbitrarily large, the SORT bb would need to be able to temporarily store an arbitrary number of rows, which requires either a full-blown sort utility, or (as proposed here) use of a temporary ORACLE table, with a combining query used to retrieve rows from that table in the desired order.

II. Complications

The example queries from the U.K. bank, based (presumably) on an IBM dialect of SQL, specify ORDER-BY columns by column number (as in the above example). This means the sort columns are always columns of the result rows of GROUP-BY, without any additional computations or transformations. Sorting in such case would be "simply" a matter of defining an intermediate table with the same format as the result rows of GROUP-BY, inserting those rows in that table, and retrieving them with a combining query that has the same ORDER-BY clause as the original query.

ORACLE, however, supports ordering by arbitrary expressions, and by columns not mentioned in the SELECT LIST of the query, and this applies to queries with both ORDER-BY and GROUP-BY clauses. For example, the following query is legal in ORACLE SQL:

```
SELECT DNO, COUNT(*) FROM EMP
GROUP BY DNO
ORDER BY AVG(SALARY)
```

The result of this query is ordered by the average salaries of departments, but the average salaries are not visible in the result rows. The following is also legal:

```
SELECT DNO
GROUP BY DNO
ORDER BY MAX(SALARY) - MIN(SALARY)
```

This query orders department numbers according to their salary range; the ORDER-BY column is an expression on aggregates neither of which are visible in the query result.

Supporting all of the legal ORACLE combinations of ORDER-BY and GROUP-BY clauses requires much more in the way of query transformations than supporting the standard SQL capabilities called for in the Bank's queries. However, supporting the minimal capabilities needed for the Bank's queries, while gracefully declining to decompose the ORACLE-extended cases, might require a significant amount of query-analysis logic which would be throw away code, assuming that we ultimately support all the cases supported by ORACLE. It would also introduce a more subtle and complex restriction to be explained to users, than the simple rule that queries with both ORDER-BY and GROUP-BY clauses can't be decomposed.

In the general interests of ongoing QD development, it would be best to introduce full support for combined ORDER-BY/GROUP-BY queries as one integrated new feature-set, rather than introducing the support piecemeal. It will have to be decided whether the Bank's benchmark presents sufficiently urgent priorities to consider a short term minimal solution that may cost more in the long run.

III. Design

A. SORT Building Block

The QD SORT building block is structurally similar to the AGGREGATE building block: it has QD-generated SQL statements to create a temporary sort table, insert rows in that table, select rows in sorted order from that table, and drop the table when it is finished with it. It also has select and bind descriptors for the combining query, and a descriptor of the input rows from its child building block. The significant differences from the AGGREGATE bb are:

1) The SORT bb doesn't need a DELETE statement, because it only fills the temporary table once, unlike the AGGREGATE bb, which fills its table once for each group.
2) The AGGREGATE bb uses a simple SELECT statement to combine results from its intermediate table, because for each group of rows inserted, it only needs to fetch a single aggregate row. The SORT bb needs to open a cursor for its combining query, and then needs to use a separate FETCH statement to fetch rows from that cursor.

B. Query Transformations

DBN #39, "Select List Transformations Used in Query Decomposition", details the transformations that are currently supported in generating parallel subqueries from an input query. Internal transformations used in generating intermediate table definitions and combining queries are discussed in the on-line document qd/notes/transforms. Support for combined GROUP-BY and ORDER-BY clauses requires the following additional transformations:

1) If an aggregate expression is mentioned in the ORDER-BY clause which is not mentioned in the SELECT list, it must be added to the SELECT list of the parallel subqueries. If the aggregate function is AVG, STDDEV, or VARIANCE, it must undergo the same transformations currently required for those functions (i.e. decomposing them into SUM, COUNT, and/or SUM(SQR) functions from which weighted aggregates can be computed). (This is similar to the currently-supported case of a HAVING clause mentioning an aggregate function not mentioned in the SELECT list).
2) The CREATE TABLE statement for creating the temporary sort table must define columns for all of the columns in the input query's SELECT list, as well as all GROUP-BY columns (which may have been omitted from the SELECT list), and any aggregate functions which are mentioned in the ORDER-BY clause (which may have been omitted from the SELECT list).
3) The CREATE TABLE statement for creating the intermediate table used by the AGGREGATE bb must include columns for any aggregate functions mentioned in the ORDER-BY clause which were not mentioned in the SELECT list. The combining query for the AGGREGATE bb must perform the final weighted aggregates for these expressions.

Query transformations are not actually performed by directly manipulating query text; a complex internal data structure called the Column Map is used to track the transformations, positions, and interdependencies of column expressions in the various SQL statements and intermediate result formats generated by QD; the SQL text for the parallel subqueries, combining queries, and other supporting statements is then generated from the Column Map and the internal parse tree. The Column Map structure will need new attributes to track expressions in the SQL statements used by the SORT bb (precise details to be determined).

IV. Performance Implications

A. Fixed overhead per query:

An additional intermediate table must be generated and dropped. This can add up to around 4 seconds extra startup overhead, and 4 seconds extra cleanup overhead, per query, for a total of up to 8 seconds extra overhead per query (based on measured overhead of the AGGREGATE building block).

B. Variable cost:

Each result row must be inserted into the temporary sort table, and result rows must then be retrieved from the temporary sort table. This cost will vary depending on the number of result rows, but may be worse than around 0.1 seconds per row (which is our measured insert rate for ORACLE). However, for a given query, the insert component of this cost should be only a small fraction (approximating 1/degree-of-partitioning) of the cost of inserting rows in the AGGREGATE bb's intermediate table.

Explaining Decomposed Queries

1. Basic plan: If query won't get decomposed (either illegal or ineffective, or because of directive), generate normal explain plan Else, generate plan where row with id 1 describes the decomposition, and subsequent rows are the ORACLE-generated explain plan for one of the parallel subqueries, but with their id incremented by one to make room for the qd row. 2. Contents of QD row:

Operation KSR PARALLEL EXECUTION Options UNION ALL, MERGE, or AGGREGATION ID 1 Object name: name of partitioning table object owner: owner of partitioning table Search columns(?): degree of partition (optional: put the parallel subquery in the "other" field) 3. Strategy:

a) Check whether SQL statement we've been passed begins "EXPLAIN" (I think we could live with the restriction that there can't be a leading comment). If so, skip the usual call to EXPLAIN, and go straight to calling our parser.

b) Our parser will parse the whole statement (the EXPLAIN statement, as well as the query to be explained), and attach the plan-table name and statement-id to the qdef structure. (If plan-table wasn't supplied, we just use "plan_table". If statement—id wasn't supplied, we must generate a unique one, just as we do when explaining the query for our own purposes, so that we can find rows of the generated plan in order to fix up their id's—then we will set the statement-id of those rows to null.)

c) Proceed with normal QD as far a qgen. If it turns out we can't decompose this query, return the appropriate warning or error, which will cause pupiosq to fall through to upiosq and explain the query in its usual manner.

d) Else (we do want to decompose the query), explain the generated parallel subquery: create an explain statement similarly to the way we do for the input query, but do it for the parallel subquery instead.

e) Generate the plan row with id 1 and other attributes describing decomposition, as listed above. Fetch from the plan table all rows with the appropriate statement-id, and increment their id by 1 (also, set their statement-id to null if we were using an auto-generated statement-di). Then insert our row with id 1 into the plan table.

f) Return success. (Note—don't commit. It's up to the caller of EXPLAIN to commit, as with any other dml statement.)

2. Issues a) The above strategy breaks our usual rule of "clearing" statements through explain before passing them to our parser. This means we'd have to be robust to syntax errors in the explain statement.

b) Explain can be used for statements other than SELECT. The above strategy would leave it up to our parser to figure out the statement isn't a select statement.

c) Alternate strategy: Up front, search for "SELECT" in query string. If not found, return immediately, causing fallthrough to upiosq. Else, call explain STARTING FROM there, but then, if EXPLAIN is happy, start parsing from beginning. That way, we solve the problem of how to get the select statement itself into explain, which we'll need to do to decompose it, and also we only have to be robust to syntax error in the explain statement itself, not in the select statement. (Of course, to do this right we must allow for the possibility of comments within the sql statement).

d) EXPLAIN won't currently let us use the psq as the base query to explain, because it won't accept queries containing host variable references, which the psq has. Substituting literals won't help, because then we can't be certain ORACLE will choose the same plan. Just as good an approximation can be achieved by using the original input query, which is what I've settled for, at least for now.

3. Dummy pcursor

Pro*C generates sqllib calls which in turn make three relevant upi calls for an EXPLAIN statement: upiosq, upiexn, and upicls. For a query which would be decomposed, we do all the actual work in upiosq. However, we have to put a dummy pcursor structure in the list of pcursors, so that when upiexn or upicls is called for this cursor number, we can spot that this is neither an actual opened, decomposed cursor, nor an ORACLE: cursor that we should allow to fall through. In upiexn, we will simply return success, pretending to have done the job we actually already did in upiosq. In upicls, we will deallocate the dummy cursor structure, and remove it from the list.

Rather than add an extra flags field to the pcursor just for this one rather kludgy purpose, I have simply defined an alternate checkstring, QDCK_DUMMY, in place of QDCK_PCUR. (This could also potentially be used to do double duty in other structures that require dummy versions.)

Note that this should all be ok, because the three calls all expand from a single SQL explain statement, so there's no way the user could legitimately have stuck other code in between, such that our moving the real work to upiosq would change the behavior. This should be tested with SQL*Plus, though, when integrated with that product.

Decomposing Queries Over Views-Issues and Options (Database Note #55)

1 Matrix of Problem Cases and Partial Solutions

We have examined a number of possible partial solutions to the general problem of decomposing queries over views. Some of these are self-contained solutions for certain classes of cases, but must be accompanied by other partial solutions to work for other classes of cases. Some more specific partial solutions would be obviated by other more general solutions.

To help sort out the interrelationships of the various problem cases and partial solutions, let us first list the basic parameters by which the problem classes vary, and assign numbers to them:

1) View refers to tables or views to which the user lacks direct access: yes/no

2) View owned by someone other than the current user: yes/no

3) View contains joins (and underlying ROWIDs are not in view query's SELECT list): yes/no 4) View contains the driving table of the join for the user's query: yes/no 5) View contains aggregation, grouping, distinct, or set operations: yes/no (We have seen that views may also vary according to whether a join predicate is used to enforce row-level data hiding, but this has been omitted here since it does not vary independently of the others, and since it only affects the user workaround of intermediate views, to which we have already raised several objections.)

These parameters of variation have each been phrased so that the positive ("yes") case is the potential problem case. A query with all five parameters negative presents no special problems for query decomposition.

Now let us list the partial solutions we have considered, and assign letters to them:

A) Relax restrictions on EXPLAINing queries over views

B) Make ROWIDs visible through views with joins

C1) Move query decomposition, but not execution, inside ORACLE kernel (or functional equivalent)

C2) Move query decomposition and parallel execution inside ORACLE kernel (or functional equivalent)

D1) Decompose queries through DBA-privileged connection, but execute them through user connection D2) Decompose and execute queries through DBA-privileged connection (or run application as DBA, which is functionally equivalent for purposes of this discussion)

E) Perform full view expansion during query decomposition (To simplify the following discussion, the user workaround of explicitly including ROWIDs of underlying tables as visible view columns is not included here; parameter 3 has been phrased in such a way as to obviate it. The user workaround of defining intermediate single table views has also been omitted here, since our previously-raised objections rule it out as a desirable approach.)

On the following page is a matrix of combinations of positive parameter values which present problems, and combinations of partial solutions which address those problems. Each column represents a particular combination of positive parameter values, a preferred combination of partial solutions, and a workable alternative combination of partial solutions (where applicable).

Let us first examine the cases in which one problem parameter is positive while the rest are negative, and then examine various combinations of positives. The only single-parameter cases which introduce problems are those in which parameters 1 or 2 alone are positive.

Case 1: View refers to tables or views to which the user lacks direct access (parameter 1 positive).

With all other parameters negative, we can assume that ROWIDs of the underlying table are visible through the view, so parallel subqueries executable by the user can be generated without recourse to full view expansion. However, we must retrieve the file IDs of a table to which the user lacks access, which requires either the ORACLE solution of permitting query decomposition to run as privileged code (i.e. inside the kernel—solution C1); the KSR solution of using a separate, DBA-privileged connection for query decomposition (solution D-1); or the user workaround of running the application as DBA. Since the parallel subqueries would be executable by the user, only the decomposition process (or portions thereof) would need to have special privileges; moving this inside the ORACLE kernel would be our peferred solution, since it is the only transparent solution from the user's perspective.

Case 2: View owned by someone other than the current user (parameter 2 positive).

With parameter 1 negative, the user could have executed the view's query directly, and there is no problem accessing dictionary information about underlying objects. ORACLE relaxing the restriction on EXPLAINing queries which refer to views not owned by the current user (solution A) would be a complete, self-contained solution for this class of queries. KSR expanding the view (solution E) would also be a workable solution in this case, but would probably require more performance overhead than the ORACLE solution.

Now let us examine various combinations of positive parameters. Let us begin with cases in which parameter 1 is positive, since this introduces the most difficult problems. This always requires that at least portions of the query decomposition process execute with greater privileges than those of the current user, but does not in itself require that the resulting parallel subqueries be executed with special privileges; therefore the preferred solution is to move the query decomposition process (or the necessary portions of it) inside the ORACLE kernel (solution C1), and the fallback workable solution is to use a DBA-privileged connection for query decomposition, while using the user's connection for query execution (solution D1). If parameter 2 (view owned by another user) is also positive (case 3), we would also need to relax the restriction on EXPLAINing queries referring to views not owned by the user (solution A), because we wish to avoid view expansion in the parallel subqueries, so that they can execute with the user's privileges. (It is possible that moving query decomposition inside the kernel would provide equivalent functionality to relaxing the EXPLAIN restriction as a byproduct, if we could examine kernel structures directly to determine optimizer strategy.) Without relaxing the EXPLAIN restriction, we would need to completely expand the view (solution E), and would need to both decompose and execute the query with special privileges, by one of the methods previously discussed (solutions C2 or D2). Again, of these methods, moving the entire query decomposition and parallel execution process inside the kernel is the only one which would be transparent to users and would not introduce potential security loopholes by requiring stored passwords.

A similar scenario results (case 4) if parameters 3 and 4 are positive along with parameter 1 (a view containing joins contains the driving table of the user's query; either of parameters 3 and 4 present no special problem if the other is negative). If ORACLE supports extended syntax to make ROWIDs visible through views with joins (solution B), then that plus decomposing queries with special privileges (solutions C1 or D1) would solve this class of cases. Otherwise, since the parallel subqueries would require full view expansion (solution E), both decomposition and execution would require special privileges (solutions C2 or D2). If all 4 of the first four parameters are positive (case 5), then the options are: relax EXPLAIN restriction, make ROWIDs visible for join views, and decompose with special privileges (solutions A, B, and C1 or D1); or perform full view substitution, and decompose and execute with special privileges (solutions E and C2 or D2).

If a positive parameter 1 is combined with positive parameters 4 and 5 (case 6: the driving table of the join is contained in a view which contains aggregation, grouping, distinct, or set operations; either of parameters 4 and 5 present no special problem if the other is negative), then in general full view expansion cannot be avoided. In some cases such queries are simply not amenable to query decomposition. In the remainder, special privileges are required both for decomposition and execution. Therefore, relaxing the EXPLAIN restriction is not essential (even if parameter 2 is positive—case 7), and making ROWIDs visible through views with joins is unnecessary, even if the view also contains a join (we need to expand it anyway).

When parameters 4 and 5 are positive, full view expansion will in general always be necessary, and some cases will simply be non-decomposable. With parameter 1 negative (case 8), no other special support is required; a positive parameter 3 is irrelevant since expansion is already necessary; and if parameter 2 is positive (case 9), relaxing the EXPLAIN restriction would be helpful but not essential.

When parameters 3 and 4 are positive with all others negative (case 10: view contains joins, and contains driving table of user's query), making ROWIDs visible through views with joins and view expansion are each complete solutions, with the former being preferable because it requires less performance overhead. When parameters 2, 3, and 4 are positive (case 11: same as case 10, but with a view not owned by the user), then either complete view expansion is needed, or the EXPLAIN restriction must be relaxed and ROWIDS made visible; in this case, view expansion may be the simpler solution.

2 Conclusion

If we wish to support query decomposition for all of those queries over views which are theoretically capable of benefiting from decomposition, then we have seen from the matrix above that to cover the worst cases, both query decomposition and query execution must be performed with greater privileges than those of the user whose query we are decomposing (solutions C2 or D2); and KSR must support full view expansion (solution E). In this event, other possible solutions, while in some cases helpful, would be non-essential. The preferred approach to decomposing and executing with greater privileges would be one which is transparent to users and does not introduce any security loopholes: moving query decomposition and parallel execution inside the ORACLE kernel (solution C2), or a functionally-equivalent solution yet to be proposed.

Since security enforcement is one of the primary practical functions of views in SQL, we must assume that cases involving underlying objects not owned by or directly accessable by the user represent an important class of cases to many of our potential customers. Cases of views containing complex constructs such as aggregates and grouping may be less critical. If we aim to support decomposition for the former but not the latter (i.e. support cases 1–5, 10, and 11, but not 6–9), then the ideal solution is to decompose queries with special privileges, but execute with the user's privileges (solutions C1 or D1), thereby avoiding the need for full view expansion and avoiding any risk of mistakenly being too permissive in the role of surrogate security-enforcers. (As with solutions C2 and D2, solutions C1 and D1 are equivalent in terms of the queries they enable to be decomposed, but C1 is preferable to D1 because it is transparent to users and safer from a security standpoint, because D1 requires a stored decryptable password.) This also requires ORACLE making ROWIDs visible through views with joins (solution B), since otherwise complete expansion and privileged execution is necessary in general.

The preceding discussion leads to the conclusion that relaxing ORACLE's restriction on EXPLAINing queries over views not owned by the current user (solution A) is only strictly necessary if we aim to support cases where the user does not own the view, but not cases where the user lacks access to the view's underlying objects. Relaxing the EXPLAIN restriction may be deemed desirable for its own sake, since it would make EXPLAIN a more useful tool in more cases, in particular to DBAs. It would also be helpful to query decomposition in many cases where it is not essential, and would provide more options in devising a phased approach to supporting various classes of view queries across multiple releases of query decomposition. Nevertheless, it is a lower-priority ORACLE change, from our point of view, than making ROWIDs visible through views with joins, or facilitating the execution of query decomposition code with special privileges.

SUMMARY & CLAIMS

The foregoing describes a digital data processing apparatus and method meeting the aforementioned objects. Particularly, it describes an improved digital data processing system that intercepts selected queries prior to processing by a database management system, that decomposes those queries to generate multiple subqueries for application, in parallel, to the DBMS, in lieu of the intercepted query, and that assembles responses by the DBMS to generate a final response. The foregoing also describes methods and apparatus for storage and retrieval of records from a database utilizing the DBMS's cluster storage and index retrieval facilities, in combination with a smaller-than-usual hash bucket size, to improve parallel access to the database.

Those skilled in the art will appreciate that the embodiments described above are exemplary only, and that other apparatuses and methods—including modifications, additions and deletions—fall within the scope and spirit of the invention. Thus, for example, it will be appreciated that the techniques described above may be utilized on different computing systems and in connection with database management systems different than those described above. It will also be appreciated that differing data structures than those described in the detailed description may be used. And, by way of further example, that equivalent, but varied, procedures may be used to decompose queries and reassemble results without changing the spirit of the invention.

1-26-/2"
MAIL ROOM
JAN 31 1994
PAT. & TRADEMARK OFC.

Appendix to

UNITED STATES PATENT APPLICATION for

IMPROVED METHOD AND APPARATUS FOR DATA ACCESS IN MULTIPROCESSOR DIGITAL DATA PROCESSING SYSTEMS

---

Query Decomposer Source Code Listings

© Kendall Square Research Corporation

```
/*****************************************************************************
 * qdbbext.h - Define QD Building Blocks, and their execution routines
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   ------------------------------------------------
 * %04   11/04/92  JM       Support array fetching by subcursors
 * %03   10/15/92  EYT      Add rowid_posit to QDBB_SUBCUR
 * %02   10/09/92  EYT      Add data value lengths array to QDBB_AGGR
 * %01   11/27/91  DW       Expanded all request codes, etc., to 16 bits
 * %00   11/04/91  JM       Initial Version
 *****************************************************************************
 */

#ifndef QDBBEXT
#define QDBBEXT

#ifndef QDSTD
#include <qdstd.h>
#endif /* QDSTD */

/*****************************************************************************
 * Request, reply, and state codes
 *
 * These are designed as OR'able values (so that, for example, READY and EOD
 * can be OR'ed together to indicate that a row is ready, and it is the last
 * row).  This is actually a single series of codes, but with some values
 * having multiple names if they are used in multiple roles of request,
 * reply, or state.
 *****************************************************************************
 */
#   define QDBB_REQ_NULL      0x0000   /* Not yet defined as a request code */
#   define QDBB_REQ_NEXT      0x0001   /* Request return of new row */
#   define QDBB_REQ_CLOSE     0x0002   /* Revert to EMPTY state (close */
                                     /*  cursors, disconnect, terminate */
                                     /*  pthreads, drop temp tables, etc.) */
#   define QDBB_REQ_CLEANUP   QDBB_REQ_CLOSE /* deprecated */
#   define QDBB_REQ_OPEN      0x0040 /* Initialize or reinitialize depending */
                                     /*  on current state (if state is EMPTY, */
                                     /*  initialize from scratch, e.g CONNECT,*/
                                     /*  start threads, etc.; else reopen  */
                                     /*  cursors, etc. */
#   define QDBB_REQ_RESET     QDBB_REQ_OPEN /* deprecated */
#   define QDBB_REQ_DISPLAY   0x0080   /* Display yourself (for debugging) */
#   define QDBB_REQ_PREFETCH  0x0400  /* Please perform your next fetch, but */
                                      /*  don't return anything yet (used    */
                                      /*  from exchange to subcursor when    */
                                      /*  subcursor returned EOA, and now    */
                                      /*  exchange has no empty buffers)     */
#   define QDBB_REQ_COMMIT    0x0800  /* Passed from mplex to exchange, and  */
                                      /* from exchange to subcur, to tell    */
                                      /* subcur to COMMIT its inserts, now   */
                                      /* that all subcurs are ready to       */
                                      /* COMMIT - used in pseudo-2-phase-    */
                                      /* commit protocol for INSERT/SELECT.  */
#   define QDBB_REQ_ROLLBACK 0x1000   /* Passed from mplex to exchange, and  */
                                      /* from exchange to subcur, to tell    */
                                      /* subcur to ROLLBACK its inserts,     */
                                      /* because another subcur has          */
                                      /* returned an error.                  */

#   define QDBB_REPLY_NULL    QDBB_REQ_NULL /* Neutral reply - no error has */
                                       /*  occured, but not action */
                                       /*  need be taken (e.g. when */
                                       /*  requested to close, return */
                                       /*  this after closing */
                                       /*  successfully */
#   define QDBB_REPLY_READY   QDBB_REQ_NEXT /* Ready with next row */
```

```
#   define QDBB_REPLY_PENDING 0x0004  /* Acknowledge request, will comply */
                                      /*  eventually */
#   define QDBB_REPLY_EOG     0x0008  /* End of group */
#   define QDBB_REPLY_EOD     0x0010  /* End of data */
#   define QDBB_REPLY_ERROR   0x0020  /* An error has occurred */
#   define QDBB_REPLY_EOA     0x0200  /* End of array (subcursor has */
                                      /*  returned last row in current array */
                                      /*  full) */

#   define QDBB_STATE_EMPTY   QDBB_REQ_NULL
#   define QDBB_STATE_READY   QDBB_REQ_NEXT /* Ready with next row */
#   define QDBB_STATE_PENDING QDBB_REPLY_PENDING
#   define QDBB_STATE_CONNECTED 0x0080  /* Logically OR this with other */
                                        /*  states of EXCHANGE and/or */
                                        /*  subcursor to indicate that */
                                        /*  a connection has already been */
                                        /*  made */
#   define QDBB_STATE_THREAD_CREATED 0x0100 /* A producer thread has been */
                                            /* created for an EXCHANGE node. */
#   define QDBB_STATE_WAITING 0x0002     /* Waiting on barrier */
#   define QDBB_STATE_ERROR   QDBB_REPLY_ERROR /* Error has been encountered */
#   define QDBB_STATE_EOG     QDBB_REPLY_EOG  /* EOG has been encountered */
#   define QDBB_STATE_EOD     QDBB_REPLY_EOD  /* EOD has been encountered */
#   define QDBB_STATE_EOA     QDBB_REPLY_EOA  /* EOA has been encountered */

typedef word QDBB_REPLY;   /* Reply code returned by bb functions */
typedef word QDBB_REQ;     /* Request code passed to bb functions */

/* Execution functions for various building blocks */

extern QDBB_REPLY qdbb_root(
#ifdef __STDQ__
    union QDBB_UNION *, QDBB_REQ, TEXT **
#endif /* __STDQ__ */
); /* qdbb_root */

extern QDBB_REPLY qdbb_aggr(
#ifdef __STDQ__
    union QDBB_UNION *, QDBB_REQ, TEXT **
#endif /* STDC__ */
); /* qdbb_aggr */

extern QDBB_REPLY qdbb_mplex(
#ifdef __STDQ__
    union QDBB_UNION *, QDBB_REQ, TEXT **
#endif /* STDC__ */
); /* qdbb_mplex */

extern QDBB_REPLY qdbb_exchange(
#ifdef __STDQ__
    union QDBB_UNION *, QDBB_REQ, TEXT **
#endif /* STDC__ */
); /* qdbb_exchange */

extern QDBB_REPLY qdbb_subcur(
#ifdef __STDQ__
    union QDBB_UNION *, QDBB_REQ, TEXT **
#endif /* STDC__ */
); /* qdbb_subcur */

extern QDBB_REPLY qdbb_subcur_qry(
#ifdef __STDQ__
    union QDBB_UNION *, QDBB_REQ, TEXT **
#endif /* __STDQ__ */
); /* qdbb_subcur_qry */

extern QDSTATUS qdbb_project(
#ifdef __STDQ__
    text *, word, word, text *, word, word
#endif /* _STDC__ */
); /* qdbb_project */
```

1

```
extern QDSTATUS qdbb_freepcur(
#ifdef __STDC__
    struct QDPCURSOR *, struct QDCHX *
#endif /* __STDC__ */
); /* qdbb_freepcur */

/***************************************************************************
 * QDBB_HDR - Common header for all building blocks
 ***************************************************************************
*/
typedef struct QDBB_HDR
{
    ub4 check;          /* Check string indicating which bb type */
#   define QDCK_AGGR QDCHECK4('A','G','G','R')
#   define QDCK_ROOT QDCHECK4('R','O','O','T')
#   define QDCK_UALL QDCHECK4('U','A','L','L')
#   define QDCK_MERG QDCHECK4('M','E','R','G')
#   define QDCK_EXCH QDCHECK4('E','X','C','H')
#   define QDCK_GRUP QDCHECK4('G','R','U','P')
#   define QDCK_SUBC QDCHECK4('S','U','B','C')

    ub2 state;          /* Current state of this building block */
                        /* (one of the QDBB_STATE codes defined above) */
    ub2 flags;          /* Options flags */

    /* The following flags control whether a particular exchange node
     * acts as a master thread in controlling a barrier, for OPEN or
     * CLOSE requests. They also control whether the slave threads in
     * an exchange node need to wait for a barrier.
     */
#   define QDBB_MASTER_INIT_OPEN   0x0001
#   define QDBB_MASTER_WAIT_OPEN   0x0002
#   define QDBB_SLAVE_WAIT_OPEN    0x0004
#   define QDBB_MASTER_INIT_CLOSE  0x0008
#   define QDBB_MASTER_WAIT_CLOSE  0x0010
#   define QDBB_SLAVE_WAIT_CLOSE   0x0020

    /* The following flag is used in conjunction with doing single-threaded
     * connections before starting threads.  If set in an exchange, it means
     * that that exchange's copy of uga variables has already been restored,
     * since opening the connection.
     */
#   define QDBB_ALREADY_RESTORED_UGA 0x0040

    /* The following flag is set in appropriate building blocks for queries
     * in which the PSQs are actually insert statements which insert
     * intermediate results directly to the intermediate table.  In this
     * type of query, the CQ is opened just once by the AGGR, and fetched
     * repeatedly to return rows to the caller of QD.
     */
#   define QDBB_PSQ_INSERT_TO_IT 0x0080

    /* The following flag is set in appropriate building blocks for
     * queries which are INSERT...SELECT statements without grouping or
     * aggregation, so that the PSQs are INSERT...SELECT statements.
     */
#   define QDBB_PSQ_INSERT_SELECT 0x0100

    /* The following flag is set in appropriate building blocks for
     * queries which are INSERT...SELECT statements with grouping or
     * aggregation, so that the combining query is an INSERT...SELECT
     * statement.
     */
#   define QDBB_CQ_INSERT_SELECT 0x0200

    QDBB_REPLY (*pfunc)(); /* Pointer to execution function */
} QDBB_HDR;

/***************************************************************************
 * QDBB_ROOT - Root bb
 ***************************************************************************
*/
typedef struct QDBB_ROOT
{
    struct QDBB_HDR hdr;    /* Common header portion */

    union QDBB_UNION *pchild; /* Pointer to child */

    struct SQLDA *pin_desc;   /* Descriptor of incoming rows */
    struct SQLDA *pout_desc;  /* Descriptor of caller's data buffers */

    ub2 in_bufnum;            /* Buffer number in btt in which rows are */
                              /*  returned from child */
    ub2 **plenptrs;           /* Array of pointers to (output)lengths of    */
                              /*  column values, indexed by column */
                              /*  number    */
} QDBB_ROOT;

/***************************************************************************
 * QDBB_AGGR - Aggregate bb
 ***************************************************************************
*/
typedef struct QDBB_AGGR
{
    struct QDBB_HDR hdr;    /* Common header portion */

    union QDBB_UNION *pchild; /* Pointer to child */

/* Text of various SQL statements, stored as variable length strings for
 * ease of use in dynamic SQL.
*/
    QD_VARCHAR *pcts_text;  /* Text for DDL statement to create */
                            /*  intermediate table */
    QD_VARCHAR *pdts_text;  /* Text for DDL statement to drop */
                            /*  intermediate table */
    QD_VARCHAR *pis_text;   /* Text for SQL statement to insert a row */
                            /*  into intermediate table */
    QD_VARCHAR *pds_text;   /* Text for SQL statement to delete contents */
                            /*  of intermediate table */
    QD_VARCHAR *pcq_text;   /* Text for combining query */

/* Cursor numbers for the delete and insert statements, and the combining
 * query, are needed if we use upi-level calls, rather than Pro*C, for our
 * DML statements.
*/
    b4 ds_cn;               /* Delete statement cursor number */
    b4 is_cn;               /* Insert statement cursor number */
    b4 cq_cn;               /* Combining query cursor number */

    /* Select and bind descriptors for the combining query */
    struct SQLDA *pcq_select_desc;
    struct SQLDA *pcq_bind_desc;

    /* Bind descriptor for insert statement */
    struct SQLDA *pis_bind_desc;

    /* Pointer to parallel subquery select descriptor, which describes
     * incoming buffers
    */
    struct SQLDA *pin_desc;  /* Descriptor of input buffer (this will   */
                             /*  tend to be a select descriptor of the  */
                             /*  parallel subqueries)                   */
    struct SQLDA *pout_desc; /* Descriptor of output buffer (this will  */
                             /*  tend to be a select descriptor of the  */
                             /*  input query)                           */

    ub2 in_bufnum;           /* Buffer number in btt in which rows are */
                             /*  returned from child */
    ub2 out_bufnum;          /* Buffer number in btt in which rows are */
                             /*  returned to parent */

    ub2 nit_cols;            /* Number of columns in intermediate table */
    ub2 ncq_cols;            /* Number of combining query select list    */
                             /*  items                                   */
```

```
    ub2 ncq_groupcol_refs;   /* Number of references to group-by columns */
                             /*  in combining query - these require      */
                             /*  columns in CQ bind descriptor           */

    ub2 *pin_colnums;        /* Pointer to array of column numbers from  */
                             /*  input buffer  to be inserted into       */
                             /*  intermediate table.  Index into this    */
                             /*  array corresponds to IT column number;  */
                             /*  contents of array slot corresponds to   */
                             /*  input buffer column number.             */

    ub2 *pout_colnums;       /* Pointer to array of column numbers from  */
                             /*  CQ or input buffer to be returned in    */
                             /*  output buffer.  Index into this array   */
                             /*  corresponds to output buffer column     */
                             /*  number; contents of array slot          */
                             /*  corresponds to CQ column number, or to  */
                             /*  input buffer column number if high bit  */
                             /*  is set.                                 */
#   define QDBB_GROUPCOL_FLAG 0x8000
                             /* Set this bit for elements of pout_colnums */
                             /*  which (because they are group-by columns */
                             /*  which are invariant per group) go       */
                             /*  directly from input buffer to output    */
                             /*  buffer without passing through CQ.      */
    ub2 **plenptrs;          /* Array of pointers to (output)lengths of  */
                             /*  column values, indexed by column */
                             /*  number    */                    /*%02*/

} QDBB_AGGR;

/****************************************************************************
 * QDBB_GROUP - Group bb
 ****************************************************************************
*/
typedef struct QDBB_GROUP
{
    struct QDBB_HDR hdr;     /* Common header portion */

    union QDBB_UNION *pchild; /* Pointer to child */

    ub2 io_bufnum;             /* Buffer number (in btt) in which rows are */
                               /* returned by child, and returned to parent */
    ub2 prev_bufnum;           /* Buffer number (in btt) of buffer */
                               /*  containing a previous row, for  */
                               /*  comparision with current row to determine */
                               /*  group membership */
} QDBB_GROUP;

/****************************************************************************
 * QDBB_MPLEX_CHILD - Child element of multiplexer bb
 ****************************************************************************
*/
typedef struct QDBB_MPLEX_CHILD
{
    ub2 bufnum;                     /* Buffer number of buffer where this child */
                                    /* returns rows to multiplexer - use this   */
                                    /* to index into pbtt.                      */
    sb2 succ;                       /* Child number of child which is this      */
                                    /* child's sort order successor             */
#   define QDBB_CHILD_NOSUCC -1 /* End of list, no successor                 */
    ub1 flags;                      /* State flags                              */
#   define QDBB_CHILD_EOD 0x0001  /* This child has already returned EOD      */
#   define QDBB_CHILD_EQ_SUCC 0x0002 /* This child equals its 'successor' in */
                                    /* all merge columns, so it's ok to      */
                                    /* return successor after returning this */
                                    /* child, without waiting for a          */
                                    /* replacement of this child             */
#   define QDBB_CHILD_READY 0x0004 /* Child has a row ready                   */
    union QDBB_UNION *pchild;    /* Pointer to child bb                       */
} QDBB_MPLEX_CHILD;
```

```
/****************************************************************************
 * QDBB_MPLEX_ORDCOL - Define an ordering column for multiplexer bb
 ****************************************************************************
*/
typedef struct QDBB_MPLEX_ORDCOL
{
    ub2 colnum;              /* Column number, starting from 0, in select */
                             /*  list of parallel subquery */
    ub2 flags;               /* Option flags */
#   define QDBB_ORDCOL_DESC 0x0001  /* Sort in descending order */
} QDBB_MPLEX_ORDCOL;

/****************************************************************************
 * QDBB_MPLEX - Multiplexer bb
 ****************************************************************************
*/
typedef struct QDBB_MPLEX
{
    struct QDBB_HDR hdr;     /* Common header portion */

    ub1 flags;               /* Option flags */
#   define QDBB_MPLEX_GROUP 0x0001
                             /* Perform grouping function: return reply */
                             /* (READY | EOG) along with last row of group */
#   define QDBB_MPLEX_DISTINCT 0x0002
                             /* Return only one row for each set of rows with */
                             /*  matching grouping columns (used both for */
                             /*  SELECT DISTINCT and for GROUP BY when there */
                             /*  is no aggregation or having clause */
    ub1 filler;              /* Reserved for future use */
    ub2 out_bufnum;          /* Buffer number in btt in which to return rows */
                             /*  to parent */
    ub2 curchild;            /* Current child in round-robin sequence */
    ub2 nchildren;           /* Number of children */
    ub2 nready;              /* Number of children ready with rows */
    ub2 nеod;                /* How many children are out of rows */
    sb2 firchild;            /* Child which is first in merge order */
    ub2 nordcols;            /* Number of columns for merge ordering */
    struct QDBB_MPLEX_ORDCOL *pordcols; /* Pointer to array of structures */
                                   /* telling which columns to merge on, and */
                                   /* whether each column is ASC or DESC */
    struct SQLDA *pdesc;     /* Pointer to PSQ select descriptor */
    QDBB_MPLEX_CHILD children[1]; /* Variable length array of children */
} QDBB_MPLEX;

/****************************************************************************
 * QDBB_EXCHANGE - Exchange bb
 ****************************************************************************
*/

#define NEXTBUF(buf) ((buf==pexchange->nbuffers-1) ? 0 : buf+1)
#define PREVBUF(buf) ((buf==0) ? pexchange->nbuffers-1 : buf-1)

typedef struct QDBB_EXCHANGE
{
    struct QDBB_HDR hdr;     /* Common header portion */

    union QDBB_UNION *pchild; /* Pointer to child */

    word child_num;          /* Number of this child relative to siblings */

    struct QDPCURSOR *ppcursor; /* Pointer to parallel cursor structure */

    ub2 out_bufnum;          /* Buffer number, within master btt, for */
                             /*  returning rows to parent */

/*  OBSOLETE ??
    QD_BTT_MAP btt_map; */   /* Bitmap whose bit number correspond to     */
                             /*  btt entries; set bits mean corresponding */
                             /*  slot contains a full buffer; clear bits  */
                             /*  mean empty buffers */
```

```
    ub1 nbuffers;           /* Number of entries in this bb's fetch ahead  */
                            /*  buffer array */
#ifdef KSR
    pthread_cond_t fetch_cond;  /* condition variable to coordinate access */
                                /*  to btt by producer and consumer         */
    pthread_mutex_t fetch_mutex;  /* mutex to protect producer/consumer    */
                                  /* wait/signal critical section code     */
#endif
    ub1 consumer_buffer;    /* Current buffer in btt read by consumer      */
    ub1 producer_buffer;    /* Current buffer in btt written by producer   */

    /* Fetch ahead buffer pool: array pointers to buffers. */
    text *btt[1];           /* Actually variable-length array */
} QDBB_EXCHANGE;


/*************************************************************************
 * QDBB_SUBCUR - Subcursor bb
 *************************************************************************
*/
typedef struct QDBB_SUBCUR
{
    struct QDBB_HDR hdr;    /* Common header portion */

    struct hstdef *phstdef; /* Pointer to hstdef for this subcursor's */
                            /*  connection to ORACLE */
    struct QDCNX *pcnx;     /* Pointer to connection for root query */
    word low_parfid;        /* Low end of partitioning fileid range */
    word high_parfid;       /* High end of partitioning fileid range */
    b4 psq_cn;              /* Cursor number of parallel subquery */
    QD_VARCHAR *ppsq_text;  /* Text of parallel subquery */
    struct SQLDA *ppsq_select_desc; /* PSQ select list descriptor */
    struct SQLDA *ppsq_bind_desc;   /* PSQ bind variable descriptor */
    ub1 *pafbuf;            /* Pointer to array fetch buffer */
    word *pafpattern;       /* Pointer to pattern for array fetch buffer */
                            /* This is set up in qdcp_prep, and consists */
                            /*  of an array of offsets of value arrays, */
                            /*  immediately followed by an array of offsets */
                            /*  of indicator arrays.  Add these offsets to */
                            /*  the address pointed to by pafbuf to */
                            /*  compute to V and I array values for the */
                            /*  self-describing array-fetch buffer */
#ifdef QDDEBUG
    word counter;           /* For simulating fetches */
#endif /* QDDEBUG */

    word child_num;         /* Child number */
    /*********************************************************************
     * TEMPORARY WHEN USING DYNAMIC SQL FOR RETRIEVAL:
     *
     * These fields hold the cursor number and connection number
     * returned by ORACLE.  These must
     * be distinct for each subcursor.  The Pro*C preprocessor expands a
     * static sqlcun, which means that modules using Pro*C cursors are
     * not reentrant.  It is necessary to modify qdbb_subcur_qry.c, after
     * preprocessing, by changing all references to sqlcun and sqlusi
     * to refer to psubcur->sqlcun and psubcur->sqlusi.
     *********************************************************************
    */
#ifdef QD_USE_V6_PREPROCESSOR
    int sqlcun[1];
    int sqlusi[2];
#endif

    ub4 oercnt;                         /* Count of rows fetched or inserted */
                                        /* (CURRENTLY only used for          */
                                        /*  INSERT/SELECT statement)         */
    ub4 filler1;                        /* Reserved for future use. */

    ub2 rowid_posit;                    /* Rowid variable position in */
                                        /* bind descriptor */

    ub2 array_size;                     /* Array size for array fetch */

    ub2 cur_array_size;                 /* Number of rows returned by most */
                                        /*  recent arrayfetch */
    ub2 array_threshold;                /* Number of rows to fetch before */
                                        /*  beginning arrayfetch */
    ub2 arraypos;                       /* Current position in array */
    ub4 nprevrows;                      /* Number of rows previously fetched */
                                        /*  by this subcursor */
    ub4 arraybuf_size;                  /* Size of array fetch buffer */
} QDBB_SUBCUR;

/*************************************************************************
 * QDBB_UNION - Union of all building block types
 *************************************************************************
*/
typedef union QDBB_UNION
{
    ub4 check;
    QDBB_HDR hdr;
    QDBB_AGGR aggr;
    QDBB_GROUP group;
    QDBB_ROOT root;
    QDBB_EXCHANGE exchange;
    QDBB_SUBCUR subcur;
    QDBB_MPLEX mplex;
} QDBB_UNION;

#endif /* QDBBEXT */
```

```
/****************************************************************************
 * qdcoext - External definitions for QD connection subsystem
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE       AUTHOR   DESCRIPTION
 * ---   --------   ------   ------------------------------------------------
 * %00   10/24/91   DW       Initial Version
 ****************************************************************************
*/
#ifndef QDCOEXT
#define QDCOEXT

#ifndef QDSTD
#include <qdstd.h>
#endif /* QDSTD */

/* qdco_pconnect - establish parallel connections for processing subqueries */
extern QDSTATUS qdco_pconnect(
#ifdef __STDC__
word                 /* thread id */
#endif /* __STDC__
); /* qdcp_fidqry */

#endif /* QDCOEXT */
```

```
/****************************************************************************  * qd
cpext.h - External definitions for QD query decomposition subsystem
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE      AUTHOR   DESCRIPTION
 * ---   --------  ------   ------------------------------------------------
 * %00   10/11/91  JH       Initial Version
 ****************************************************************************
*/

#ifndef QDCPEXT
#define QDCPEXT

#ifndef QDSTD
#include <qdstd.h>
#endif /* QDSTD */

/* qdcp_desc_psq_qry - describe select list of parallel subquery */
extern QDSTATUS qdcp_desc_psq_qry(
#ifdef __STDC__
struct QDSP_QRY *
#endif /* __STDC__ */
); /* qdcp_desc_psq_qry */

/* qdcp_desc_psq - describe psq select and bind */
extern QDSTATUS qdcp_desc_psq(
#ifdef __STDC__
struct QDSP_QRY *,
text *
#endif /* __STDC__ */
); /* qdcp_desc_psq */

/* qdcp_fidqry - query the KSR dd view ALL_TABLE_FILES to get number */
/* of files for a table, and an array of their file id's */
extern QDSTATUS qdcp_fidqry(
#ifdef __STDC__
text *, /* table name */
ub2,    /* table name length */
text *, /* table owner name */
ub2,    /* table owner name length */
ub2 *,  /* return number of file id's (number of table partitions) */
int **  /* return array of file id's */
#endif /* __STDC__ */
); /* qdcp_fidqry */

/* qdcp_ordcolqry - resolve order-by column id to column name, type, etc. */
extern QDSTATUS qdcp_ordcolqry(
#ifdef __STDC__
struct QDSP_QDEF *, /* query definition (root of parse tree) */
struct QDSP_EXPR *  /* expression structure for column */
#endif /* __STDC__ */
); /* qdcp_ordcolqry */

/* qdcp_prep - prepare decomposed query (top-level decompose routine) */
extern QDSTATUS qdcp_prep(
#ifdef __STDC__
text *, /* pointer to text of query to decompose */
word cnumber /* cursor number */
#endif /* __STDC__ */
); /* qdcp_prep */

/* qdcp_seltran - perform select list transformations */
extern QDSTATUS qdcp_seltran(
#ifdef __STDC__
struct QDSP_QDEF *,
struct QDSP_QRY *
#endif /* __STDC__ */
); /* qdcp_seltran */

/* qdcp_qgen - generate SQL text for parallel subquery or
 * combining query
 */
extern QDSTATUS qdcp_qgen(
#ifdef __STDC__
ub4,
struct QDSP_QDEF *,
struct QDSP_QRY *,
text **
#endif /* __STDC__ */
); /* qdcp_qgen */

/* qdcp_growbuf - replace query text buffer with larger one
 * (this routine is defined in qdcp_qgen.c)
 */
extern text *qdcp_growbuf(
#ifdef __STDC__
text *
#endif /* __STDC__ */
); /* qdcp_growbuf */

/* qdcp_desc_qry - produce select or bind descriptor for a query */
extern struct SQLDA *qdcp_desc_qry(
#ifdef __STDC__
word,
struct QD_VARCHAR *,
ub4
#endif /* __STDC__ */
); /* qdcp_desc_qry */

/* qdcp_disabled_qry - check whether QD is disabled for current database */
extern QDSTATUS qdcp_disabled_qry(
); /* qdcp_disabled_qry */

/* qdcp_ttsqry - SELECT TEMPORARY_TABLESPACE FROM USER_USERS */
extern QDSTATUS qdcp_ttsqry(
#ifdef __STDC__
struct QDCMX *
#endif /* __STDC__ */
); /* qdcp_ttsqry */


/* Date format string used to normalize DATE columns for easy collation
 * (used as second operand of ORACLE SQL 'TO_CHAR' function)
 */
#define QDCP_DATE_FORMAT_STRING "YYYYMMDDSSSSS"
#define QDCP_DATE_FORMAT_LEN 13

/* Command options for qdcp_qgen, indicating what kind of query to
 *  generate (intended to be potentially OR'd together)
 */
#define QDCP_GEN_PSQ  1  /* Generate parallel subquery */
#define QDCP_GEN_CQ   2  /* Generate combining query */
#define QDCP_GEN_SUBQ 4  /* Generate subquery */
#define QDCP_GEN_PSQ_HAVING 8 /* Generate HAVING clause for PSQ */

/* Prefix to use in generating bind variable placeholders in CQ */
/* (Not currently used) */
#define QDCP_CQ_BINDVAR_PREFIX "V"

/* Prefix to use in generating Intermediate Table column names */
#define QDCP_IT_COL_PREFIX "COL_"

/* Prefix to use in gererating Intermediate Table name */
#define QDCP_IT_NAME_PREFIX "QDIT"

/* Length of buffer for generating unique Intermediate Table Name */
/* (4 for prefix + 9 for unique part + 1 for zero terminator) */
#define QDCP_IT_NAME_LEN 4+9+1

/* Prefix to use in generating host variable name for group columns,
```

```
 * for use in combining query.
 */
#define QDCP_GROUPCOL_HOSTVAR_PREFIX "GROUPCOL_"

/* Prefix to use in generating bind variable name for variables to receive
 * PSQ column values (this are used to reference these columns in CQ
 * HAVING clause)
 */
#define QDCP_PSQ_HOSTVAR_PREFIX "PSQCOL_"
#define QDCP_PSQ_HOSTVAR_PREFIX_LEN 7

/* Maximum length of a bind variable name used to refer to a PSQ output
 * column within the combining query.
 * This assumes that the 'PSQCOL_' prefix is followed by a three-digit number,
 * which will allow up to 1000 bind variables per query.
 */
#define QDCP_PSQ_MAX_HOSTVAR_NAME (QDCP_PSQ_HOSTVAR_PREFIX_LEN + 3)

/* Descriptor types, for desc_type parameter of qdcp_desc_qry */
#define QDCP_DESC_SELECT 1 /* Select descriptor */
#define QDCP_DESC_BIND   2 /* Bind descriptor */

/* Array element for column map, which provides mapping between columns
 * of original input query, parallel subquery, combining query, and
 * intermediate table.
 */

typedef struct QDCP_COLMAP
{
    struct QDSP_EXPR *pexpr; /* Pointer to expression for this column */
                     /* This points to the expression from the IQ, except */
                     /*  for substitution aggregates (e.g. SUM and COUNT in */
                     /*  place of AVG), in which case it points to the */
                     /*  substitution aggregate function */

    ub2 it_colnum;   /* Column number in Intermediate Table (starting from */
                     /* 0).  Ignore if QDCP_COL_IT flag is not set for this */
                     /* column. */
    ub2 psq_colnum;  /* Column number in select list of Parallel SubQuery, */
                     /*  after logical expansion of any * references */
                     /* Ignore if QDCP_COL_PSQ flag is not set for this */
                     /*  column. */
                     /* (For * references themselves, this is the number of */
                     /* the first column after logical expansion) */
    ub2 iq_colnum;   /* Column number in original Input Query select list, */
                     /*  without expansion of * references */
                     /* Ignore if QDCP_COL_IQ flag is not set for this */
                     /*  column. */
    ub2 cq_colnum;   /* Combining query column number */
                     /* (Usually the same as iq_colnum, but outer nested */
                     /*  aggregates appear in IQ select list and NOT in */
                     /*  CQ select list, while order by columns missing from */
                     /*  IQ select list must appear in CQ select list if */
                     /*  there is also a group-by clause) */

    ub2 sumcol;      /* Index within colmap of substitution aggregate SUM */
                     /*  column for AVG, STDDEV, or VARIANCE */
    ub2 countcol;    /* Index within colmap of substitution aggregate COUNT */
                     /*  column for AVG, STDDEV, or VARIANCE */
    ub2 sumsqrcol;   /* Index within colmap of substitution aggregate */
                     /*  SUM(POWER(...)) column for STDDEV or VARIANCE */

    ub1 flags;       /* Flags */
#   define QDCP_COL_IT 0x01  /* Column corresponds to an Intermediate Table */
                             /*  column */
#   define QDCP_COL_CQ 0x02  /* Column corresponds to a Combining Query */
                             /*  select list item */
#   define QDCP_COL_PSQ 0x04 /* Column corresponds to a Parallel SubQuery */
                             /*  select list item */
#   define QDCP_COL_IQ 0x08  /* Column corresponds to an original Input */
                             /*  Query select list item */
#   define QDCP_COL_EOA 0x10 /* Column corresponds to an expression over */
                             /*  aggregates in the OIQ select list, which */
                             /*  has been omitted from PSQ select list, */
                             /*  but must be expanded in CQ select list, */
                             /*  over aggregates of output columns of IT. */
#   define QDCP_COL_STAR 0x20 /* This entry represents an unexpanded '*' */
                             /*  reference in the IQ select list. Use */
                             /*  iq_colnum to refer back to IQ select list */
                             /*  for details. */
#   define QDCP_COL_IQ_IN_STAR 0x40
                             /* This entry is a specific reference to a */
                             /*  column which was not explicitly specified */
                             /*  in the IQ select list, but was contained */
                             /*  within a star reference.  This is used */
                             /*  so we don't have to expand the entire */
                             /*  star reference, but only factor out */
                             /*  those columns in which we have a special */
                             /*  interest (namely, group-by columns) */

} QDCP_COLMAP;

#endif /* QDCPEXT */
```

8

```
/*****************************************************************************
 * qderrs.h - Query Decomposition error codes
 * (Use negative numbers for errors, positive for warnings)
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV  DATE      AUTHOR  DESCRIPTION
 * ---  --------  ------  ---------------------------------------------------
 * %01  11/08/93  AS      Add error 5728
 * %00  09/18/91  JH      Initial Version
 *****************************************************************************
*/

#ifndef QDERRS
#define QDERRS

#define QD_OK 0
/* Operation succeeded */

/*****************************************************************************
 * Errors (codes < 0, in reserved range 5000 - 5899)
 * NOTE: All codes are returned as positive numbers at pupi level, although
 * SQL turns them back to negative.  Therefore, our codes, whether positive
 * or negative, should have unique absolute values and be within the above
 * reserved range.  Use 5700 - 5899 for positive warning codes.
 *****************************************************************************
*/

#define QD_MALLOC_FAILED -5000
/* Attempt to allocate memory failed. */

#define QD_MALLOC_BAD_SIZE -5001
/* Attempted to allocate less than 1 byte of memory. */

#define QD_BAD_CHECKSTRING -5002
/* Incorrect checkstring encountered in internal data structure. */

#define QD_REQUIRED_ARG_MISSING -5003
/* A required argument to a function is missing (i.e. NULL pointer passed). */


#define QD_CP_NO_PAR_TAB -5050
/* No partitioning table has been identified for query to be decomposed. */

#define QD_CP_ORDCOL_NOT_FOUND -5051
/* Order-by column specified by position not found in data dictionary. */

#define QD_CP_UNRECOGNIZED_DATATYPE -5052
/* Descriptor contains an unrecognized ORACLE datatype code. */

#define QD_CP_INSUF_PRIV_TO_CREATE_TABLE -5053
/* User has insufficient privilege to create intermediate table */


#define QD_SP_TABLE_NOT_FOUND -5100
/* Table or view specified in query not found in ALL_OBJECTS DD view. */

#define QD_SP_COLUMNS_NOT_FOUND -5101
/* No columns can be found in ALL_TAB_COLUMNS for table in FROM clause. */

#define QD_SP_OBJECT_NOT_TABLE -5102
/* Object specified as table or view is not table or view. */


#define QD_XP_INDEX_NOT_FOUND -5200
/* Index specified in EXPLAIN plan not found in ALL_INDEXES DD view. */

#define QD_XP_QUERY_TOO_LONG -5201
/* Query is too long to explain (won't fit in available buffer). */

#define QD_XP_TOO_MANY_JOINS -5202
/* Explain plan contains too many joins for available buffers. */

#define QD_XP_UNEXPECTED_PLAN_ENTRY -5203
/* Can't interpret EXPLAIN plan; unexpected entry encountered. */

#define QD_XP_AMBIGUOUS_PLAN -5204
/* EXPLAIN plan is ambiguous, probably due to self-join in query. */


#define QD_BB_UNSUPPORTED_CONVERSION -5300
/* Requested data conversion is not supported. */


/*****************************************************************************
 * Warnings (codes > 0, in range 5700 to 5899)
 *****************************************************************************
*/

#define QD_SP_TABCOL_NOT_FOUND 5701
/* Table column not found in data dictionary */

/*****************************************************************************
 * Warnings giving specific reasons why a query cannot be correctly or
 * effectively decomposed
 *****************************************************************************
*/
#define QD_CP_DISABLED 5708
/* Query decomposition is disabled for current database */

#define QD_CP_INCORRECT_NOT_SELECT 5709
/* Cannot decompose: not a SELECT statement. */

#define QD_CP_INCORRECT_NOPARTITION 5710
/* Cannot decompose: user specified NOPARTITION directive. */

#define QD_CP_INCORRECT_UPDATE 5711
/* Cannot decompose: query contains FOR UPDATE OF clause. */

#define QD_CP_INCORRECT_SETOP 5712
/* Cannot decompose: query contains UNION, INTERSECT, or MINUS. */

#define QD_CP_INCORRECT_ORDER_AND_GROUP 5713
/* Cannot decompose: query contains both GROUP BY and ORDER BY clauses. */

#define QD_CP_INCORRECT_CONNECT_BY 5714
/* Cannot decompose: query contains CONNECT BY clause. */

#define QD_CP_INCORRECT_NEXTVAL 5715
/* Cannot decompose: query refers to NEXTVAL of a sequence. */

#define QD_CP_INCORRECT_HOSTVAR 5716
/* Cannot decompose: query contains a host variable reference. */

#define QD_CP_INCORRECT_ROWNUM 5717
/* Cannot decompose: query refers to ROWNUM pseudo-column. */

#define QD_CP_INCORRECT_VIEW 5718
/* Cannot decompose: query contains a view reference. */

#define QD_CP_INCORRECT_NESTED_AGGR 5719
/* Cannot decompose: query contains nested aggregate function. */

#define QD_CP_INCORRECT_DISTINCT_AGGR 5720
/* Cannot decompose: query contains distinct aggregate function. */

#define QD_CP_INEFFECTIVE_INDEX_ONLY 5721
/* Ineffective to decompose: index-only retrieval for driving table. */

#define QD_CP_INEFFECTIVE_NOT_PARTITIONED 5722
/* Ineffective to decompose: driving table is not partitioned. */
```

1

```
#define QD_CP_INEFFECTIVE_HASH 5723
/* Ineffective to decompose: driving table is retrieved by hash key. */

#define QD_CP_INEFFECTIVE_CLUSTER 5724
/* Ineffective to decompose: driving table is retrieved by cluster. */

#define QD_CP_INCORRECT_ROWID_AGGR 5725
/* Cannot decompose: query contains aggregate of ROWID. */\

#define QD_CP_INCORRECT_MULTI_VIEWS 5726
/* Cannot decompose: query contains multiple view references. */

#define QD_CP_INCORRECT_INSERT_SELECT_DISTINCT 5727
/* Cannot decompose: query is INSERT...SELECT DISTINCT statement. */

#define QD_CP_NON_MATCHING_AGGR_REFERENCE 5728
/* Cannot decompose: non-matching subquery aggr references an outermost column. */

#endif /* QDERRS */
```

```
/******************************************************************************
 * qdpuext.h - Definitions for QD parallel user program interface (PUPI)
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ******************************************************************************
 * REV  DATE      AUTHOR   DESCRIPTION
 * ---  --------  ------   ---------------------------------------------------
 * %02  10/05/92  EYT      Add QD_SQLGBC for use in DESCRIBE BIND call
 * %01  04/29/92  JM       Declarations for qdpu_save_uga, qdpu_restore_uga,
 *                         dump_uga
 * %00  12/02/91  JM       Initial Version
 ******************************************************************************
 */

#ifndef QDPUEXT
#define QDPUEXT

#ifndef QDSTD
#include <qdstd.h>
#endif /* QDSTD */

/* QD_SQLGBC should be kept equal to sqlgbc structure in sqllib.h */
typedef struct QD_SQLGBC {
    ub4   *size;
    b4    *found;
    text  **vmp;       /* value buffer */
    ub2   *vmaxl;      /* buffer length */
    ub2   *vncul;      /* value length */
    text  **inp;       /* indicator var buffer */
    ub2   *inmxl;      /* indicator buffer length */
    ub2   *incul;      /* indicator var length */
    ub2   *bvtyp;      /* bind var type */
} QD_SQLGBC;

/* qdpu_getpucr - get parallel cursor for specified cursor number */
extern struct QDPCURSOR *qdpu_getpcur(
#ifdef __STDC__
    struct hstdef *,
    word
#endif /* __STDC__ */
); /* qdpu_getpcur */

/* qdpu_sqlecc - set sqllib current cursor number */
extern void qdpu_sqlecc(
#ifdef __STDC__
    word
#endif /* __STDC__ */
); /* qdpu_sqlecc */

/* qdpu_dspoer - display contents of ORACLE oerdef structure */
extern void qdpu_dspoer(
#ifdef __STDC__
    text *, struct oerdef *
#endif /* __STDC__ */
); /* qdpu_dspoer */

/* qdpu_save_sqllib - save sqllib context */
extern void qdpu_save_sqllib();

/* qdpu_restore_sqllib - restore sqllib context */
extern void qdpu_restore_sqllib();

/* qdpu_save_uga - save sqllib context (thread-specific version) */
extern void qdpu_save_uga(int thread);

/* qdpu_restore_uga - restore sqllib context (thread-specific version) */
extern void qdpu_restore_uga(int thread);

/* dump_uga - display global variables in the uga */
extern void dump_uga();


/* Global flag to enable/disable query decomposition by pupiosq.
 * When FALSE, pupiosq will simply behave like upiosq.
 */
__private extern bool KSR_qd_enabled;

extern bool QD_ora_describe; /* If true, let ORACLE describe select lists */
                             /*  itself, to ensure correct column widths,  */
                             /*  etc. for sqlplus                           */

#endif /* QDPUEXT */
```

```
/*************************************************************************
 * qdrtext.h - External definitions for QD "Runtime Library" routines
 * (These are firewall routines used instead of direct calls to C runtime
 *  library routines, e.g. qdrtmalloc instead of malloc.)
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE       AUTHOR   DESCRIPTION
 * ---   --------   ------   -----------------------------------------------
 * %02   08/19/93   EYT      qdrt_free and qdrt_pfree accept pointer to pointer
 * %01   12/02/91   DM       Added pmalloc and pfree.
 * %00   09/18/91   JM       Initial Version
 *************************************************************************
 */

#ifndef QDRTEXT
#define QDRTEXT

#ifndef QDSTD
#include <qdstd.h>
#endif /* QDSTD */

/* qdrt_malloc: allocate memory dynamically, initialize with zero's */
extern ptr_t qdrt_malloc(
#ifdef __STDC__
    ub4 size
#endif /* __STDC__ */
); /* qdrt_malloc */

/* qdrtfree: free memory allocated by qdrt_malloc */
extern qdrt_free(
#ifdef __STDC__
    ptr_t *pptr
#endif /* __STDC__ */
); /* qdrt_free */

/* qdrt_pmalloc: allocate memory dynamically for use by parallel threads,
                 initialize with zero's */
extern ptr_t qdrt_pmalloc(
#ifdef __STDC__
    word child_num,
    ub4  size
#endif /* __STDC__ */
); /* qdrt_pmalloc */

/* qdrt_pfree: free memory allocated by qdrt_pmalloc */
extern qdrt_pfree(
#ifdef __STDC__
    word  child_num,
    ptr_t *pptr
#endif /* __STDC__ */
); /* qdrt_pfree */

/* qdrtmktemp: make pseudo-unique temporary name */
extern text *qdrt_mktemp(
#ifdef __STDC__
    text *
#endif /* __STDC__ */
); /* qdrt_mktemp */

#endif /* QDRTEXT */
```

```
/*****************************************************************************
 * qdspext.h - External definitions for QD SQL Parser
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR   DESCRIPTION
 * ---   --------   ------   -------------------------------------------------
 * %03   11/04/92   JM       Support array fetching by subcursors
 * %02   10/15/92   EYT      Add rowid_posit to QDSP_QRY.
 * %01   09/25/92   EYT      Add nhostvars to QDEF and nbinds to QRY
 * %00   09/18/91   JM       Initial Version
 *****************************************************************************
*/

#ifndef QDSPEXT
#define QDSPEXT

#ifndef QDSTD
#include <qdstd.h>
#endif /* QDSTD */

/* External function prototypes for QD SQL Parser */

extern struct QDSP_EXPR *qdsp_createxpr(
#ifdef __STDC__
int, ub4, ub4, ub4, ub4, ub4, ub4, ub4, ub4, struct QDSP_EXPR *,
struct QDSP_EXPR *, struct QDSP_EXPR *
#endif /* __STDC__ */
); /* qdsp_createxpr */

extern QDSTATUS qdsp_parse(
#ifdef __STDC__
    text *,
    struct QDSP_QDEF **,
    b4
#endif /* __STDC__ */
); /* qdsp_parse */

extern text *qdsp_find_select(
#ifdef __STDC__
    text *,
    text **
#endif /* __STDC__ */
);

extern QDSTATUS qdsp_sem(
#ifdef __STDC__
    struct QDSP_QDEF *
#endif /* __STDC__ */
); /* qdsp_sem */

extern QDSTATUS qdsp_colqry(
#ifdef __STDC__
    struct QDSP_EXPR *,
    struct QDSP_TAB *,
    ub4,
    text *
#endif /* __STDC__ */
); /* qdsp_colqry */

extern QDSTATUS qdsp_tabqry(
#ifdef __STDC__
    struct QDSP_QDEF *,
    struct QDSP_TAB *,
    ub4
#endif /* __STDC__ */
); /* qdsp_tabqry */

extern QDSTATUS qdsp_freetree(
#ifdef __STDC__
    union QDSP_UNION *
#endif /* __STDC__ */
); /* qdsp_freetree */

extern ub4 qdsp_addstr( /* add new string to qdef's strings area */
#ifdef __STDC__
    struct QDSP_QDEF *,
    text *,
    ub4
#endif /* __STDC__ */
); /* qdsp_addstr */


/* Modes for calling qdsp_parse */
#define QDSP_QUICK_PARSE 1  /* Just check for SELECT, NOPARTITION */
#define QDSP_FULL_PARSE  2  /* Perform full parse */

/* Clause type codes, used in parser to distinguish clauses which can appear */
/* in alternate orders.                                                      */

#define QDSP_GROUP_BY    1
#define QDSP_HAVING      2
#define QDSP_CONNECT_BY  3
#define QDSP_START_WITH  4

/*****************************************************************************
 * QDSP_COM  SQL Parser common area
 *****************************************************************************
*/
typedef struct QDSP_COM
{
    ub4 check;          /* Check string */
#   define QDCK_PARS QDCHECK4('P','A','R','S')

    text *pqtext;               /* Pointer to query text                     */
    ub4   oqtext;               /* Current offset in query text              */
    ub2   cselect;              /* Offset of SELECT keyword within query text */
                                /* This will be set to a non-zero value only */
                                /* for INSERT...SELECT statements, so non-zero */
                                /* value indicates this is such a statement. */

    struct QDSP_QDEF *pqdef; /* Pointer to query definition current being   */
                             /* created by parser                           */
    /* Define a macro for pointer to current QDEF, in case we want to move  */
    /*  it later.                                                           */
#   define QD_PQDEF (QDpcom->cnx.pspcom->pqdef)

    /* Expression List Stack */
    /* Expressions are gathered in lists which can be traversed, among other */
    /* reasons, to do common-subexpression-elimination.  Since at parse      */
    /* time column references can't always be distinguished across subquery */
    /* levels, a separate list must be maintained for each subquery level.  */
    /* The xlstack (Expression List Stack) and its associated counter       */
    /* xlsc are used to keep track of the expression lists for nested       */
    /* levels of subqueries.                                                */

#   define QDSP_MAX_EXPR_LISTS 32 /* Maximum number of separate expression  */
                                  /* lists to maintain at once per query,   */
                                  /* = maximum nested subquery levels       */
    ub2 xlsc;                     /* Expression list stack counter          */
    struct QDSP_EXPR *xlstack[QDSP_MAX_EXPR_LISTS]; /* Expression list stack */

/* Pointer to current expression list */
#   define QDSP_PXLIST (QDpcom->cnx.pspcom->xlstack[QDpcom->cnx.pspcom->xlsc])

/* Push new list on stack */
#   define QDSP_PUSHLIST() (if (QDpcom->cnx.pspcom->xlsc++ >=\
    QDSP_MAX_EXPR_LISTS) YYERROR;)

/* Pop previous list from stack */
#   define QDSP_POPLIST() (if (QDpcom->cnx.pspcom->xlsc-- < 0) YYERROR;)
```

1

13

```
} QDSP_COM;

/*****************************************************************************
 * Parse tree structures  (See DBN #37 for discussion)
 *****************************************************************************
*/

typedef struct QDSP_QDEF /* Query Definition structure */
{
    ub4 check;           /* Check string */
#   define QDCK_QDEF QDCHECK4('Q','D','E','F')

    text *pstrings;      /* Pointer to strings area, which contains all strings */
                         /*  for identifiers and literals ref'd in the query   */
    ub2 lstrings;        /* Length of strings area                              */
    ub2 onextstr;        /* Offset in strings area to place next string         */
#   define QDSP_DFLT_LSTRINGS 32     /* Default size of strings area            */

    ub2 flags;           /* Options flags                                        */
#   define QDSP_QDEF_NOWAIT         0x01 /* NOWAIT option was specified          */
#   define QDSP_QDEF_PARTITION      0x02 /* PARTITION directive was specified    */
#   define QDSP_QDEF_NOPARTITION    0x04 /* NOPARTITION directive was spec'd     */
#   define QDSP_QDEF_INSERT_SELECT  0x08 /* Query is INSERT...SELECT stmt        */
#   define QDSP_EXPLAIN_QD          0x10 /* We are parsing in order to EXPLAIN   */
                                         /*  the query, not to execute it.       */
#   define QDSP_QDEF_MAXPARTITIONS 0x20 /* A maximum number of partitions        */
                                        /* has been specified by directive       */
#   define QDSP_QDEF_MINPARTITIONS 0x40 /* A minimum number of partitions        */
                                        /* has been specified by directive       */
#   define QDSP_QDEF_ARRAY_SIZE   0x100 /* An array size has been specified      */
                                        /*  by directive                         */
#   define QDSP_QDEF_ARRAY_THRESHOLD 0x200 /* An array theshold has been         */
                                           /* specified by directive             */

    /* If PARTITION directive is specified, it may be accompanied by a          */
    /* table name, optionally qualified by schema name, to indicate the         */
    /* table on which to partition when decomposing the query                   */

    ub2 opar_tab_name; /* Offset of partitioning table name in strings area     */
    ub2 lpar_tab_name; /* Length of partitioning table name                      */
    ub2 opar_tab_schema; /* Offset of partitioning table schema in strings      */
    ub2 lpar_tab_schema; /* Length of partitioning table schema name            */

    /* If MAXPARTITIONS directive was specified, then max_partitions             */
    /*  indicates the maximum number of parallel subqueries into which to        */
    /*  decompose this query.                                                    */
    ub2 max_partitions;

    /* If MINPARTITIONS directive was specified, then min_partitions             */
    /*  indicates the minimum driving table partitions for which a query         */
    /*  is considered effectively decomposible                                   */
    ub2 min_partitions;

    ub2 nordcols;        /* Number of ORDER BY columns, 0 if no ORDER BY clause */
    struct QDSP_ORDCOL *pordcols; /* Pointer to array of ORDER BY columns        */

    ub2 nupdcols;        /* Number of columns specified in FOR UPDATE OF clause */
    struct QDSP_EXPR **ppupdcols; /* Pointer to array of pointers to             */
                                  /*  updateable columns                         */

    union QDSP_UNION *ptree;/* Pointer to tree of set operators and queries;    */
                         /*  Points directly to single QRY if there are no      */
                         /*  set operators.                                     */
    struct QDSP_QRY *pfirqry; /* Pointer to first in linked list of query      */
                         /* structures, for easier traversal                    */

    /* The next two fields are used when parsing an EXPLAIN statement           */
    struct QDSP_TAB *pplan_table; /* Plan table specified in EXPLAIN stmt        */
    struct QDSP_EXPR *pstmt_id;   /* Literal expression specified for            */
                                  /*  statement id in EXPLAIN stmt               */

    /* Offset and length of directive comment within query definition           */
    ub2 odirective;  /* Offset of directive comment (just after the '+')        */
    ub2 ldirective;  /* Length of directive comment (excluding delimiters)      */

    text *phints;    /* Pointer to generated optimizer hints, if any            */
    ub2 nhostvars;   /* Number of host variables */

    ub2 array_size;  /* Size of array for array fetching, 0 means no array      */
                     /*  fetching.                                               */
    ub2 array_threshold; /* Number of rows returned by a given subcursor,       */
                     /* after which array fetching should start. 0 means        */
                     /* start immediately.                                       */
} QDSP_QDEF;


typedef struct QDSP_ORDCOL /* ORDER BY column */
{
    /* ORDCOL has no checkstring */
    ub4 direction;    /* Collation direction, ASC or DESC                        */
                      /* Might as well use a 4-byte checkstring, since space     */
                      /* is needed for alignment.                                */
#   define QDCK_ASC  QDCHECK4('A','S','C',' ')
#   define QDCK_DESC QDCHECK4('D','E','S','C')

    sb2 colmap_index;  /* Index into column map used for select list            */
                       /*  transformations, of this order-by expression         */
                       /* (Ignore if < 0) */

    struct QDSP_EXPR *pexpr; /* Pointer to ORDER BY column expression           */
} QDSP_ORDCOL;


typedef struct QDSP_GRPCOL /* GROUP BY column */
{
    /* GRPCOL has no checkstring */
    sb2 colmap_index;  /* Index into column map used for select list            */
                       /*  transformations, of this group-by expression.        */
                       /* (Ignore if < 0) */

    ub2 filler; /* reserved for future use */
    struct QDSP_EXPR *pexpr; /* Pointer to GROUP BY column expression           */
} QDSP_GRPCOL;


typedef struct QDSP_SETOP /* Set operator: UNION, INTERSECT, or MINUS           */
{
    ub4 check;           /* Check string */
#   define QDCK_SETOP_UNION QDCHECK4('U','N','I','O')
#   define QDCK_SETOP_INTER QDCHECK4('I','N','T','E')
#   define QDCK_SETOP_MINUS QDCHECK4('M','I','N','U')

    ub1 flags;                  /* Option flags                                  */
#   define QDSP_SETOP_ALL 0x01  /* ALL                                           */

    union QDSP_UNION *prand1; /* Pointer to first operand set operation         */
                              /*  or query                                       */
    union QDSP_UNION *prand2; /* Pointer to second operand set operation        */
                              /*  or query                                       */
} QDSP_SETOP;


typedef struct QDSP_QRY /* Query, i.e. individual select block */
{
    ub4 check;           /* Check string */
#   define QDCK_QRY QDCHECK4('Q','R','Y',' ')

    struct QDSP_QRY *pnext;        /* Pointer to next qry in linked list         */
    struct QDSP_QRY *pparent;      /* Pointer to parent query (for subqry's)     */
    struct QDSP_SELITEM *pselist;  /* Pointer to SELECT list (array of           */
                                   /*  SELITEMs)                                 */
    struct QDSP_EXPR **ptarglist;  /* Pointer to SELECT target list (for         */
                                   /*  SELECT INTO)                              */
    struct QDSP_TAB *ptabs;        /* Pointer to tables in FROM clause           */
    struct QDSP_EXPR *pwhere;      /* Pointer to WHERE clause                    */
    struct QDSP_GRPCOL *pgroupby;  /* Pointer to GROUP BY clause                 */
```

2

```
                                   /* (Array of pointers to QDSP_GRPCOLs)      */
struct QDSP_EXPR *phaving;      /* Pointer to HAVING clause              */
struct QDSP_EXPR *pconnectby;   /* Pointer to CONNECT BY clause          */
struct QDSP_EXPR *pstartwith;   /* Pointer to START WITH clause          */
struct QDSP_EXPR *pfirexpr;     /* Pointer to linked list of all exprs   */
word *pparfids;                 /* Pointer to array of partitioning file */
                                /*  id's                                 */
struct QDCP_COLMAP *pcolmap;    /* Mapping between columns of parallel   */
                                /* subquery, combining query, intermediate */
                                /* table, and original input query, set up */
                                /* by qdcp_seltran                       */
ub1 flags;          /* Options flags                                     */
# define QDSP_QRY_DISTINCT 0x01  /* SELECT DISTINCT                     */
# define QDSP_QRY_GEN_CQ   0x02  /* Generate a combining query for this */
                                 /*  query                              */
# define QDSP_QRY_EXPAND_STAR 0x04 /* Expand unqualified '*' to list of */
                                 /* '<table>.*' in parallel subqueries  */
# define QDSP_QRY_VIEW       0x08  /* Query contains view reference(s)  */
# define QDSP_QRY_COLLAPSE_STAR 0x10 /* Collapse list of '<table>.*' to */
                                 /*  just '*'                           */
# define QDSP_QRY_NESTED_AGGR 0x20 /* Query contains a nested aggregate */
                                 /*  function                           */
# define QDSP_QRY_SUBQ       0x40  /* This query is a subquery          */
# define QDSP_QRY_GROUP_AND_ORDER 0x80 /* Query has GROUP-BY and ORDER-BY */
# define QDSP_QRY_PSQ_INSERT_TO_IT \
      (QDSP_QRY_NESTED_AGGR | QDSP_QRY_GROUP_AND_ORDER)
                                 /* Query calls for combining strategy in */
                                 /* which parallel subquery inserts rows  */
                                 /* directly into intermediate table      */

ub1 ntabs;          /* Number of tables in FROM clause                   */
ub1 partab;         /* Number (in FROM clause) of partitioning table     */
ub1 ngroupcols;     /* Number of GROUP BY columns (0 if no GROUP BY      */
                    /*  clause)                                          */
ub2 nselitems;      /* Number of SELECT list items                       */
ub2 ntargets;       /* Number of targets for SELECT INTO                 */
ub2 nparfids;       /* Number of partitioning file id's                  */
ub2 ncolmap_entries; /* Number of column map entries */
ub2 npsq_cols;      /* Number of parallel subquery select list columns   */
ub2 ncq_cols;       /* Number of combining query select list columns     */
ub2 nit_cols;       /* Number of intermediate table columns              */
ub2 niq_cols;       /* Number of input query columns                     */
ub2 oitname;        /* Offset of name of intermediate table              */
ub2 litname;        /* Length of intermediate table name                 */

ub2 ncq_groupcol_refs; /* Number of references to group-by columns       */
                       /* in the combining query: these require columns  */
                       /* in the CQ bind descriptor.                     */

/* Pointers to generated queries. These are stored as QD_VARCHAR, which */
/* emulates ORACLE's VARCHAR pseudotype, so they can be passed as host  */
/* variables to SQL without being copied.                               */
QD_VARCHAR *ppsq_text;    /* Parallel subquery text                     */
QD_VARCHAR *pcq_text;     /* Combining query text                       */
QD_VARCHAR *pcts_text;    /* Create table statement (for IT) text       */
QD_VARCHAR *pdts_text;    /* Drop table statement (for IT) text         */
QD_VARCHAR *pis_text;     /* Insert statement text                      */
QD_VARCHAR *pds_text;     /* Delete statement text                      */

/* Select and bind descriptors for PSQ. These are created during        */
/* qdcp_qgen, since the select descriptor is needed there for           */
/* generating the CTS, but it is saved here so it can be attached to the */
/* subcursor building blocks when the combining query is generated.     */
struct SQLDA *ppsq_select_desc;
struct SQLDA *ppsq_bind_desc;

ub2 nbinds;               /* Number of user-defined bind variables */
ub2 rowid_posit;          /* Position of rowid variables in bind */
                          /* descriptor */

/* If query contains view reference, and the actual partitioning table
 * is inside the view definition, then the following variables provide
 * the name and owner of that table, for looking up its file id's:
   */
  ub2 opartabname;          /* Offset of partitioning table name in    */
                            /*  strings area                           */
  ub2 lpartabname;          /* Length of partitioning table name       */
  ub2 opartabowner;         /* Offset of partitioning table owner name */
  ub2 lpartabowner;         /* Length of partitioning table owner name */
} QDSP_QRY;

typedef struct QDSP_SELITEM /* Select list item */
{
    /* SELITEM has no checkstring */
    /* The next two fields describe the name of an item as it would be    */
    /* returned by DESCRIBE; this will be the item's alias if an alias was */
    /* specified in the query, otherwise it will be the actual expression */
    /* text for the item. (9/24/91 Currently, only attach name here when  */
    /* it's an alias.)                                                    */
    ub2 oname;          /* Offset of name in QDEF's strings area          */
    ub2 lname;          /* Length of name                                 */
    ub2 oschema;        /* Offset of schema name, in case select list item is */
                        /* of the form "<schema>.<table>.*"               */
    ub2 lschema;        /* Length of schema name                          */

    sb2 colmap_index;   /* Index into column map used for select list     */
                        /*  transformations, of this select list item.    */
                        /* (Ignore if < 0) */
    ub1 tabnum;         /* Number of table in FROM clause to which this   */
                        /* item corresponds (only relevant for <table>.*  */
                        /* items; used as index into ptabs array)         */

    struct QDSP_EXPR *pexpr; /* Pointer to expression for this item       */
} QDSP_SELITEM;

typedef struct QDSP_TAB /* Table reference in FROM clause                 */
{
    /* TAB has no checkstring */

    /* Fields filled in at parse time: */
    /* Name is the name of the table as specified in the query, and may be a */
    /* synonym; alias is any alias specified for the table in the query   */
    /* (lalias 0 means no alias)  */

    ub2 oname;          /* Offset of name in QDEF's strings area          */
    ub2 lname;          /* Length of name                                 */
    ub2 oalias;         /* Offset of alias in QDEF's strings area         */
    ub2 lalias;         /* Length of alias                                */
    ub2 oschema;        /* Offset of schema name in QDEF's strings area   */
    ub2 lschema;        /* Length of schema name                          */

    /* Fields filled in during semantic analysis: */
    /* Real name is the underlying table name, which will differ from name */
    /* if name is an synonym.  Real schema may differ from schema, because */
    /* a synonym may be owned by a different user than the table to which it */
    /* refers.                                                            */

    ub2 oreal_name;     /* Offset in strings area of underlying table name */
                        /*  (same as oname unless oname points to synonym) */
    ub2 lreal_name;     /* Length of real name                            */
    ub2 oreal_schema;   /* Offset in strings area of schema name of under- */
                        /*  lying table (same as oschema unless synonym was */
                        /*  owned by different user than underlying table) */
    ub2 lreal_schema;   /* Length of real schema name                     */
    ub2 flags;          /* Options flags                                  */
#   define QDSP_TAB_VIEW 0x0001 /* Table is a view, not a base table      */

    /* The following flags are filled in after EXPLAIN analysis */
#   define QDSP_TAB_INDX 0x0002 /* Index scan is used on this table */
#   define QDSP_TAB_NESTL 0x0004 /* This table is joined to preceding table */
                                /* using nested loops join */
#   define QDSP_TAB_MERGE 0x0008 /* This table is joined to preceding table */
                                /* using merge join */
#   define QDSP_TAB_OUTER 0x0010 /* This is outer (i.e. non-preserved) table */
```

15

```
                              /*  in an outer join */
#   define QDSP_TAB_NOTAC 0x0020 /* No table access needed (index only) */
#   define QDSP_TAB_HASH  0x0040 /* This table is retrieved by hash key */
#   define QDSP_TAB_VISITED 0x0080/* This table has already been visited */
                              /*  during EXPLAIN analysis */

    /* The following flag is filled in during transformation (qdsp_seltran): */
#   define QDSP_TAB_STAR  0x0100 /* <table>.* is selected for this table     */

    /* Fields filled in based on EXPLAIN information: */

    ub1 join_pos;         /* Position in join order (starting from 1 for first  */
                          /*  table retrieved, i.e. driving table)              */
    ub2 ncols;            /* Number of columns */
} QDSP_TAB;

typedef struct QDSP_EXPR /* Expression element */
{
    ub4 check;            /* Check string */
#   define QDCK_EXPR QDCHECK4('E','X','P','R')

    struct QDSP_EXPR *pnext; /* Pointer to next expression (for linking in   */
                             /*  list for easy traversal)                     */
    sb2 colmap_index;     /* Index into column map used for select list       */
                          /*  transformations, of this expression (0 if       */
                          /*  this expression doesn't appear directly in      */
                          /*  column map).                                    */
                          /* (Ignore if < 0) */

    ub1 opcode;           /* Type of expression element                       */

#define QDSP_OP_COL    1   /* Column of table or view                          */
#define QDSP_OP_LIT    2   /* Literal                                          */
#define QDSP_OP_HOSTVAR 3  /* Host variable                                    */
#define QDSP_OP_SUBQRY 4   /* Subquery reference (within a predicate)          */
#define QDSP_OP_LINK   5   /* Link operands in tree, for expr's with > 2       */
                           /* operands                                         */
#define QDSP_OP_OUTER 6    /* ORACLE extension: Outer join column reference    */
#define QDSP_OP_PRIOR 7    /* Prior expression in CONNECT BY clause            */

#define QDSP_OP_AND   11   /* Boolean AND                                      */
#define QDSP_OP_OR    12   /* Boolean OR                                       */
#define QDSP_OP_NOT   13   /* Boolean NOT                                      */

#define QDSP_OP_EQ    21   /* =                                                */
#define QDSP_OP_NE    22   /* <> (ORACLE also supports != and ^=)              */
#define QDSP_OP_LT    23   /* <                                                */
#define QDSP_OP_LE    24   /* <=                                               */
#define QDSP_OP_GT    25   /* >                                                */
#define QDSP_OP_GE    26   /* >=                                               */
#define QDSP_OP_IN    27   /* The SQL IN operator                              */
#define QDSP_OP_BETWEEN 28 /* The SQL BETWEEN operator                         */
#define QDSP_OP_ISNULL 29 /* The SQL IS NULL operator                          */
#define QDSP_OP_EXISTS 30 /* The SQL EXISTS operator                           */
#define QDSP_OP_LIKE   31 /* The SQL LIKE operator                             */

#define QDSP_OP_PLUS   41 /* +                                                 */
#define QDSP_OP_MINUS  42 /* -                                                 */
#define QDSP_OP_NEG    43 /* Unary -                                           */
#define QDSP_OP_TIMES  44 /* *                                                 */
#define QDSP_OP_DIV    45 /* /                                                 */
#define QDSP_OP_CONCAT 46 /* || - ORACLE extension                             */

#define QDSP_OP_AVG    51 /* AVG set function                                  */
#define QDSP_OP_MAX    52 /* MAX set function                                  */
#define QDSP_OP_MIN    53 /* MIN set function                                  */
#define QDSP_OP_SUM    54 /* SUM set function                                  */
#define QDSP_OP_COUNT  55 /* COUNT set function                                */
#define QDSP_OP_STDDEV 56 /* ORACLE extension: STDDEV                          */
#define QDSP_OP_VARIANCE 57 /* ORACLE extension: VARIANCE                      */
```

```
#define QDSP_OP_USER   61 /* USER system field                                    */

/* ORACLE extensions: pseudo-columns and system fields */
#define QDSP_OP_CURRVAL 62 /* ORACLE extension: CURRVAL pseudo-column             */
#define QDSP_OP_NEXTVAL 63 /* ORACLE extension: NEXTVAL pseudo-column             */
#define QDSP_OP_ROWID   64 /* ORACLE extension: ROWID pseudo-column               */
#define QDSP_OP_ROWNUM  65 /* ORACLE extension: ROWNUM pseudo-column              */
#define QDSP_OP_LEVEL   66 /* ORACLE extension: LEVEL pseudo-column               */
#define QDSP_OP_SYSDATE 67 /* ORACLE extension: SYSDATE system field              */
#define QDSP_OP_UID     68 /* ORACLE extension: UID system field                  */
#define QDSP_OP_NULL    69 /* ORACLE extension: NULL, as a system field           */

/* ORACLE extensions: numeric functions */
#define QDSP_OP_ABS      71 /* ORACLE extension: ABS function                     */
#define QDSP_OP_CEIL     72 /* ORACLE extension: CEIL function                    */
#define QDSP_OP_FLOOR    73 /* ORACLE extension: FLOOR function                   */
#define QDSP_OP_MOD      74 /* ORACLE extension: MOD function                     */
#define QDSP_OP_POWER    75 /* ORACLE extension: POWER function                   */
#define QDSP_OP_ROUND    76 /* ORACLE extension: ROUND function                   */
#define QDSP_OP_SIGN     77 /* ORACLE extension: SIGN function                    */
#define QDSP_OP_SQRT     78 /* ORACLE extension: SQRT function                    */
#define QDSP_OP_TRUNC    79 /* ORACLE extension: TRUNC function                   */

/* ORACLE extensions: character functions */
#define QDSP_OP_CHR      81 /* ORACLE extension: CHR function                     */
#define QDSP_OP_INITCAP  82 /* ORACLE extension: INITCAP function                 */
#define QDSP_OP_LOWER    83 /* ORACLE extension: LOWER function                   */
#define QDSP_OP_LPAD     84 /* ORACLE extension: LPAD function                    */
#define QDSP_OP_LTRIM    85 /* ORACLE extension: LTRIM function                   */
#define QDSP_OP_REPLACE  86 /* ORACLE extension: REPLACE function                 */
#define QDSP_OP_RPAD     87 /* ORACLE extension: RPAD function                    */
#define QDSP_OP_RTRIM    88 /* ORACLE extension: RTRIM function                   */
#define QDSP_OP_SOUNDEX  89 /* ORACLE extension: SOUNDEX function                 */
#define QDSP_OP_SUBSTR   90 /* ORACLE extension: SUBSTR function                  */
#define QDSP_OP_TRANSLATE 91 /* ORACLE extension: TRANSLATE function              */
#define QDSP_OP_UPPER    92 /* ORACLE extension: UPPER function                   */

/* ORACLE extensions: character functions returning numeric value */
#define QDSP_OP_ASCII    93 /* ORACLE extension: ASCII function                   */
#define QDSP_OP_INSTR    94 /* ORACLE extension: INSTR function                   */
#define QDSP_OP_LENGTH   95 /* ORACLE extension: LENGTH function                  */
#define QDSP_OP_NLSSORT  96 /* ORACLE extension: NLSSORT function                 */

/* ORACLE extensions: conversion functions */
#define QDSP_OP_CHARTOROWID 101 /* ORACLE extension: CHARTOROWID function         */
#define QDSP_OP_CONVERT     102 /* ORACLE extension: CONVERT function             */
#define QDSP_OP_HEXTORAW    103 /* ORACLE extension: HEXTORAW function            */
#define QDSP_OP_RAWTOHEX    104 /* ORACLE extension: RAWTOHEX function            */
#define QDSP_OP_ROWIDTOCHAR 105 /* ORACLE extension: ROWIDTOCHAR function         */
#define QDSP_OP_TO_CHAR     106 /* ORACLE extension: TO_CHAR function             */
#define QDSP_OP_TO_DATE     107 /* ORACLE extension: TO_DATE function             */
#define QDSP_OP_TO_NUMBER   108 /* ORACLE extension: TO_NUMBER function           */

/* ORACLE extensions: new conversion functions in ORACLE7 */
#define QDSP_OP_TO_MULTI_BYTE 109 /* ORACLE extension: TO_MULTI_BYTE func         */
#define QDSP_OP_TO_SINGLE_BYTE 110  /* ORACLE extension: TO_SINGLE_BYTE func */

/* ORACLE extensions: date functions */
#define QDSP_OP_ADD_MONTHS  111 /* ORACLE extension: ADD_MONTHS function          */
#define QDSP_OP_LAST_DAY    112 /* ORACLE extension: LAST_DAY function            */
#define QDSP_OP_MONTHS_BETWEEN 113 /* ORACLE extension: MONTHS_BETWEEN func       */
#define QDSP_OP_NEW_TIME    114 /* ORACLE extension: NEW_TIME function            */
#define QDSP_OP_NEXT_DAY    115 /* ORACLE extension: NEW_DAY function             */

/* ORACLE extensions: other functions */
#define QDSP_OP_DECODE      121 /* ORACLE extension: DECODE function              */
#define QDSP_OP_DUMP        122 /* ORACLE extension: DUMP function                */
#define QDSP_OP_GREATEST    123 /* ORACLE extension: GREATEST function            */
#define QDSP_OP_LEAST       124 /* ORACLE extension: LEAST function               */
#define QDSP_OP_NVL         125 /* ORACLE extension: NVL function                 */
#define QDSP_OP_USERENV     126 /* ORACLE extension: USERENV function             */
#define QDSP_OP_VSIZE       127 /* ORACLE extension: VSIZE function               */
```

4

```
/* ORACLE extensions: new numeric functions in ORACLE7 */
#define QDSP_OP_COS         131 /* ORACLE extension: COS function            */
#define QDSP_OP_COSH        132 /* ORACLE extension: hyperbolic COS function */
#define QDSP_OP_EXP         133 /* ORACLE extension: EXP function            */
#define QDSP_OP_LN          134 /* ORACLE extension: LN function             */
#define QDSP_OP_LOG         135 /* ORACLE extension: LOG function            */
#define QDSP_OP_SIN         136 /* ORACLE extension: SIN function            */
#define QDSP_OP_SINH        137 /* ORACLE extension: hyperbolic SIN function */
#define QDSP_OP_TAN         138 /* ORACLE extension: TAN function            */
#define QDSP_OP_TANH        139 /* ORACLE extension: hyperbolic TAN function */

/* ORACLE extensions: new character functions in ORACLE7 */
#define QDSP_OP_NLS_INITCAP 141 /* ORACLE extension: NLS_INITCAP function    */
#define QDSP_OP_NLS_LOWER   142 /* ORACLE extension: NLS_LOWER function      */
#define QDSP_OP_NLS_UPPER   143 /* ORACLE extension: NLS_UPPER function      */
#define QDSP_OP_SUBSTRB     144 /* ORACLE extension: SUBSTRB function        */
#define QDSP_OP_INSTRB      145 /* ORACLE extension: INSTRB function         */
#define QDSP_OP_LENGTHB     146 /* ORACLE extension: LENGTHB function        */
/**** More to come ??********/

#define QD_NUM_SQL_OPS 146  /* Always define this to equal max operator code */


    ub1 datatype;        /* Oracle datatype code                           */
    ub2 length;          /* Length                                         */
    ub2 precision;       /* Precision (relevant for numeric types only)    */
    sb2 scale;           /* Scale (relevant for numeric types only)        */
    union                /* Variant portion */
    {
        struct           /* Variant portion for table columns (aka fields) */
        {
            ub2 oname; /* Offset of name in QDEF's strings area             */
            ub2 lname; /* Length of name                                    */
            ub2 oqual; /* Offset of qualifier name in QDEF's strings area   */
            ub2 lqual; /* Length of qualifier name                          */
            ub2 oschema; /* Offset of schema name (if included in qualifier) */
            ub2 lschema; /* Length of schema name                           */
            ub2 colid;  /* Column id (ordinal position of this column in    */
                        /*  table definition */
            ub1 tabnum; /* Number of table in FROM clause to which this     */
                        /* column belongs (use as index into ptabs array)   */
        } col;
        struct           /* Variant portion for operators                  */
        {
            /* All operators have at least one operand.  If there's only  */
            /* one, prand2 will be null.  If there are more than two, prand2 */
            /* points to a tree of additional operands, connected using   */
            /* LINK pseudo-operators.  Each LINK's prand1 points to an     */
            /* additional operand, and prand2 points to the next LINK, until */
            /* the last LINK is reached, at which point prand2 points to  */
            /* the last operand.  (Actually, in some cases prand1 rather  */
            /* than prand2 may point to a LINK.  In any event, LINK is never */
            /* a leaf, and left-to-right traversal of leaves will always   */
            /* yield operands in correct order.)                           */

            struct QDSP_EXPR *prand1; /* Pointer to first operand        */
            struct QDSP_EXPR *prand2; /* Pointer to second operand       */
            ub1 nrands;         /* Number of operands                    */
            ub1 flags;          /* Options flags                         */
#           define QDSP_EXPR_ANY 0x01  /* ANY, for quantified predicates   */
#           define QDSP_EXPR_ALL 0x02  /* ALL, for quantified predicates   */
#           define QDSP_EXPR_NOT 0x04  /* NOT, for various predicates      */
#           define QDSP_EXPR_DISTINCT 0x08 /* DISTINCT, for set functions  */
#           define QDSP_EXPR_OUTER_NESTED_AGGR 0x10
                                  /* Expression is an outer nested       */
                                  /*  aggregate                          */
#           define QDSP_EXPR_INNER_NESTED_AGGR 0x20
                                  /* Expression is an inner nested       */
                                  /*  aggregate                          */
#           define QDSP_OMIT_IN_PSQ_HAVING 0x40
                                  /* Omit this expression from the       */
                                  /* parallel subquery HAVING            */
                                  /* clause (because it references       */
                                  /* aggregates)                         */
        } op;
        struct          /* Variant portion for literals                   */
        {
            ub2 oval;  /* Offset of value in QDEF's strings area          */
            ub2 lval;  /* Length of value in QDEF's strings area          */
        } lit;
        struct          /* Variant portion for host parameters            */
        {
            ub2 oname; /* Offset of name in QDEF's strings area           */
            ub2 lname; /* Length of name                                  */
            ub2 oind;  /* Offset of indicator in QDEF's strings area      */
            ub2 lind;  /* Length of indicator                             */
        } hostvar;
        struct          /* Variant portion for subqry reference           */
        {
            struct QDSP_QRY *psubqry; /* Pointer to subquery              */
        } subqry;
        struct          /* Variant portion for sequence reference         */
                        /* (ORACLE extension only)                        */
        {
            ub2 oseqname; /* Offset of sequence name in QDEF's strings area */
            ub2 lseqname; /* Length of sequence name                      */
            ub2 oschema;  /* Offset of sequence schema name               */
            ub2 lschema;  /* Length of sequence schema name               */
        } seqref;
    } u; /* end of variant portion */
} QDSP_EXPR;


typedef union QDSP_UNION /* Union of various parse tree structures */
{
    ub4 check;          /* Just the checkstring, to identify structure type */
    struct QDSP_QDEF qdef; /* Query definition                             */
    struct QDSP_QRY qry;   /* Query block                                  */
    struct QDSP_SETOP setop; /* Set operator (UNION, INTERSECT, or MINUS)  */
    struct QDSP_EXPR expr; /* Expression element                           */
} QDSP_UNION;

/**************************************************************************
 * Flags for operator attributes
 * The read-only global table QDsqlops is an array, indexed by the
 * operator codes in the QDSP_OP sequence defined above, of operator
 * strings and bitmaps of attributes.  The strings are used when generating
 * SQL; the attributes are used both in generating SQL (e.g distinguising
 * an infix operator from a function-style operator) and in other contexts
 * where the "class" of an operator (e.g. is it an aggregate operator) needs
 * to be determined easily.
 *
 * In some cases, the operator "string" is only included in the table for ease
 * of recognition when editing the table, and what really gets expanded varies
 * case-by-case (e.g. for columns, host variables).  But usually the string is
 * the actual operator symbol (e.g. +, *, ||) or function name (e.g. AVG,
 * ROWID, AND).
 *
 * NB: Note that these equates don't have the QDSP prefix for the SQL parser
 * subsystem, as they are used fairly widely, and I'm not really sure this
 * file is the appropriate place to define them, but it will do for now. - JM
 **************************************************************************
 */

#define QD_MAX_SQL_OP_STRING 15  /* Maximum length of SQL operator string */

typedef struct QDSQLOP
{
    text string[QD_MAX_SQL_OP_STRING]; /* 0-terminated string for expanding */
                                       /*  an operator when gen'ing SQL     */
    ub1 attrs;                         /* Bitmap of operator attributes     */
} QDSQLOP;

extern QDSQLOP QDsqlops[]; /* Global read-only table of SQL operator */
```

```
                    /*  strings and attributes */

#define QD_SQLOP_INFIX 0x01   /* Operator goes between operands */
#define QD_SQLOP_PREFIX 0x02  /* Operator precedes operands */
#define QD_SQLOP_POSTFIX 0x04 /* Operator follows operands */
#define QD_SQLOP_FUNC  0x08   /* Function-style: operator precedes */
                              /*  parenthesized, comma-separated list of */
                              /*  operands */
#define QD_SQLOP_ATOM  0x10   /* Operator takes no arguments */
#define QD_SQLOP_AGGR  0x20   /* Operator is an aggregate function */
#define QD_SQLOP_BOOL  0x40   /* Operator is Boolean (yields truth value) */
#define QD_SQLOP_VAL   0x80   /* Operator yields an actual value */

/* Shorthand macros for testing operator attributes */
#define QD_SQLOP_IS_INFIX(op)  (QDsqlops[(op)].attrs & QD_SQLOP_INFIX)
#define QD_SQLOP_IS_PREFIX(op)  (QDsqlops[(op)].attrs & QD_SQLOP_PREFIX)
#define QD_SQLOP_IS_POSTFIX(op)  (QDsqlops[(op)].attrs & QD_SQLOP_POSTFIX)
#define QD_SQLOP_IS_FUNC(op)  (QDsqlops[(op)].attrs & QD_SQLOP_FUNC)
#define QD_SQLOP_IS_ATOM(op)  (QDsqlops[(op)].attrs & QD_SQLOP_ATOM)
#define QD_SQLOP_IS_AGGR(op)  (QDsqlops[(op)].attrs & QD_SQLOP_AGGR)
#define QD_SQLOP_IS_BOOL(op)  (QDsqlops[(op)].attrs & QD_SQLOP_BOOL)
#define QD_SQLOP_IS_VAL(op)  (QDsqlops[(op)].attrs & QD_SQLOP_VAL)
#define QD_SQLOP_IS_OP(op)  ((QDsqlops[(op)].attrs & (QD_SQLOP_INFIX |\
  QD_SQLOP_PREFIX | QD_SQLOP_POSTFIX | QD_SQLOP_FUNC)) ||\
 (op) == QDSP_OP_LINK || (op) == QDSP_OP_PRIOR)

#define QD_SQLOP_STRING(op)  (QDsqlops[(op)].string)

#endif /* QDSPEXT */
```

```
/*************************************************************************
 * qdstd.h - Top-level global definitions for Query Decomposition project
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE      AUTHOR   DESCRIPTION
 * ---   --------  ------   ---------------------------------------------
 * %33   11/04/93  HYT      Define QD_SLEEP_THRESHOLD
 * %32   06/16/93  HYT      Collect time statistics
 * %31   11/04/92  JM       Support use of array fetch within subcursors
 * %30   10/15/92  HYT      Add rowid position to QDPCURSOR and define
 *                          QD_LOW_ROWID_HOSTVAR and QD_HIGH_ROWID_HOSTVAR
 * %29   10/13/92  JM       Define QDpcom->min_partitions
 * %28   10/12/92  HYT      Define plan_table in QDCMX
 * %27   09/11/92  JM       Define plemptrs array in pcursor
 * %26   07/29/92  JM       Define OS_THREAD_FORK_BUG here
 * %25   07/23/92  JM       Define QD_MAX_PARTITIONS, max_partitions in QDcom
 * %24   07/01/92  JM       Define QDCMX_DBA_CHECKED flag
 * %23   06/26/92  JM       Add flags field to QDCMX
 * %22   04/29/92  JM       Add db_string to QDCOM
 * %21   03/01/92  DM       Added connect_mutex
 * %20   02/25/92  DM       Added TTRACE, redefined ARSPARMS & LAMPARMS
 * %19   02/24/92  DM       Defined QD_MAX_HOST_STRING
 * %18   12/12/91  JM       Define QDCK_DUMMY checkstring for dummy pcursor
 * %17   12/10/91  JM       Modified definition of QDBEGIN, QDEND
 *                          Defined QD_RETURN_STATUS
 * %16   12/04/91  JM       Add rowcount to QDPCURSOR
 * %15   12/02/91  JM       Define QD_EOD
 * %14   12/02/91  DM       Added request to PCURSOR
 * %13   11/27/91  DM       Incr QBUF_INITIAL_SIZE to 128 (subpage boundary)
 * %12   11/26/91  DM       Added ex_barrier to PCURSOR; removed ppeq.cnx
 * %11   11/22/91  DM       Included gendef.h
 * %10   11/22/91  DM       Added ARSPARMS and LAMPARMS structs for connections
 * %09   11/22/91  DM       Added QDDprintf macro
 * %08   11/20/91  JM       Define QDBEGIN(), QDEND macros
 * %07   11/19/91  JM       Add nmallocs, nfrees (to track memory mgmt)
 * %06   11/18/91  JM       Define QD_WIDEST_FLOAT
 * %05   11/15/91  JM       Rename root_query pinput_qry, change its type to
 *                          QD_VARCHAR
 * %04   11/06/91  JM       Minor changes to QDPCURSOR definition
 *                          Define QD_BTT_MAP
 * %03   11/05/91  JM       Add definition of QDPCURSOR (from qdstd.h.dw)
 * %02   10/30/91  JM       Add pqry_text_buf to QDCOM
 * %01   10/25/91  JM       Define QD_VARCHAR datatype
 * %00   09/18/91  JM       Initial Version
 *************************************************************************
 */

#ifndef QDSTD
#define QDSTD

/* OS_THREAD_FORK_BUG enables workaround code for the KSR OS bug which
 * prevents forking from within threads
 * #define OS_THREAD_FORK_BUG 1
 */


/* Get basic typedefs from ORACLE */
#ifndef ORASTD

/* The next four lines can go away when we integrate with the ported
 * Oracle include directories.
 */
#ifdef KSR
#undef KSR
#endif /* ifndef KSR */
#define KSR 1

#include <orastd.h>

#endif /* ORASTD */

#ifndef GENDEF        /* %11 */
#include <gendef.h>
#endif /* GENDEF */

#include <pthread.h>

/*************************************************************************
 * Define QDDEBUG to enable compilation of debugging code.  Undefine it
 * for production compilation. QDNODEBUG will locally disable it in     %09
 * any module and leave it globally enabled elsewhere.
 * A lock is needed so output from multiple threads isn't garbled.
 *************************************************************************
 */
# undefine QDDEBUG

/* QDDprintf will conditionally do a printf if debugging is enabled     %09 */
#if defined(QDDEBUG) && !defined(QDNODEBUG)
#define QDDprintf(x) (printf x)
#else
#define QDDprintf(x)
#endif /* QDDEBUG && !QDNODEBUG */

/*************************************************************************
 * Thread-specific trace in printf format. Need to invoke with double (( )).
 * Display thread# and cell# as prefix to each message.
 * A lock is needed so output from multiple threads isn't garbled.
 *************************************************************************
 */

#if defined(QDDEBUG) && !defined(QDNODEBUG)
# define TTRACE(x) if (QD_DISPLAY_TRACE) \
            { processor_name_t proc; \
              pthread_getproc(pthread_self(), &proc); \
              _gspwt(QDpcom); printf("<%d><%d>", child, proc); \
              printf x; _rsp(QDpcom); }
#else
# define TTRACE(x)
#endif /* QDDEBUG && !QDNODEBUG */

/*************************************************************************
 * Checkstrings
 * QDCHECK2 and QDCHECK4 can be used to define 2 and 4 bytes checkstrings,
 * respectively, which will look like recognizable strings in a memory dump,
 * but which can be efficiently assigned and compared as binary integers.
 *************************************************************************
 */
#define QDCHECK2(_char1, _char2) (((ub2)(_char1) << 8) | ((ub2)(_char2)))
#define QDCHECK4(_char1, _char2, _char3, _char4)\
        (((ub4)(_char1) << 24) | ((ub4)(_char2) << 16) | ((ub4)(_char3) << 8)\
         | ((ub4)(_char4)))

/*************************************************************************
 * Error Handling
 *************************************************************************
 */
typedef sb4 QDSTATUS;     /* Status codes, defined in qderrs.h */

/* Use QDFAIL to post status, QDFAILED to test for error */
#define QDFAIL(_status) QDpcom->status = (_status)

/* Use QDPFAIL to post errors detected in a parallel thread. */
/* This is not currently fool-proof. We could end up with pstatus from one */
/* thread and err_child from another thread. We might fix this later.      */
#define QDPFAIL(_status, _child) if (QDpcom->pstatus == 0) \
                    { \
                        QDpcom->pstatus = (_status);  \
                        QDpcom->err_child = (_child); \
                    }
```

19

```
#define QDFAILED     (QDpcom->status < 0 || QDpcom->pstatus < 0)
#define QD_STATUS     (QDpcom->status)

/* QD_RETURN_STATUS: Absolute value of QD_STATUS, for use as return value
 * of pupi routines. %17
 */
#define QD_RETURN_STATUS \
 (QDpcom->status > 0 ? QDpcom->status : -QDpcom->status)
#define QD_PSTATUS     (QDpcom->pstatus)
#define QDRESET ( QDpcom->status = 0;  \
                  QDpcom->pstatus = 0; \
                  QDpcom->err_child = 0; )

/* QDBEGIN and QDEND are a pair of macros which can be placed as the first
 * and last executable statements of a routine, respectively.  They
 * effectively maintain a stack of names of called routines, but leave
 * the name of a routine detecting an error on top of the stack, so that
 * the name of the detecting routine can be displayed along with the
 * error code, from any desired level.  When debugging is enabled,
 * and the QD_TRACE flag is set (see flags in QDCOM below), these macros
 * will also print a trace of routine entry and return to standard
 * output.        %08
 * QDBEGIN takes the name of the containing routine as parameter.
 */
#ifdef QDDEBUG
#define QDBEGIN(_name) char *_psave_caller; extern bool QD_display_trace; \
char *_pname; \
{ _psave_caller = QDpcom->pdetector; \
 if (!QDFAILED) QDpcom->pdetector = (_name); \
  _pname = (_name); QDpcom->call_level++; \
 if (QD_DISPLAY_TRACE) { int _i; \
 for (_i = 1; _i < QDpcom->call_level; _i++) printf("  "); \
 printf("Begin %s\n", (_name)); } }
#else
#define QDBEGIN(_name) char *_psave_caller; extern bool QD_display_trace; \
{ _psave_caller = QDpcom->pdetector; QDpcom->call_level++; \
 QDpcom->pdetector = (_name); }
#endif /* QDDEBUG */

#ifdef QDDEBUG
#define QDEND { if (QD_DISPLAY_TRACE) { int _i; \
 for (_i = 1; _i < QDpcom->call_level; _i++) printf("  "); \
 printf("End %s", _pname); \
 if (QD_STATUS) printf("  QD_STATUS: %d\n", QD_STATUS); else printf("\n"); } \
 if (!QDFAILED) QDpcom->pdetector = _psave_caller; QDpcom->call_level--; }
#else
#define QDEND { if (!QDFAILED) QDpcom->pdetector = _psave_caller; \
 QDpcom->call_level--; }
#endif /* QDDEBUG */

#ifdef QDDEBUG
#define QDcp(a,b) {if (QD_display_cp) (printf("(pid %d) ", getpid()); \
                                      printf("%s checkpoint %d\n", a, b); })
#else
#define QDcp(a,b)
#endif /* QDDEBUG */

/*****************************************************************************
 * Collect Time statistics
 *****************************************************************************
 */
#define QDTIMESTART(a) {if (QD_display_time) \
                          gettimeofday(&(qdtime[(a)].start), NULL);}
#define QDTIMEFINISH(a) {if (QD_display_time) qdtst_finish (&(qdtime[(a)]));}
#define QDTIMEPRINT(a,b) {if (QD_display_time) \
                 {fprintf(QD_display_file, "%s time: %ld.%06.6ld\n", b, \
                         qdtime[(a)].elapsed.tv_sec, \
                         qdtime[(a)].elapsed.tv_usec); }}

/*****************************************************************************
 * Names of environment variables and KSR-specific database objects
 *****************************************************************************
 */
```

```
#define KSR_ARRAY_SIZE "KSR_ARRAY_SIZE"
#define KSR_ARRAY_THRESHOLD "KSR_ARRAY_THRESHOLD"
#define KSR_MAXPARTITIONS "KSR_MAXPARTITIONS"
#define KSR_MINPARTITIONS "KSR_MINPARTITIONS"
#define KSR_NOPARTITION "KSR_NOPARTITION"
#define KSR_DISABLE_QD "KSR_DISABLE_QD"

/*****************************************************************************
 * Various maxima and minima
 *
 * Where maximum string lengths are based on ORACLE values, 2 bytes have been
 * added to allow for 0 termination while keeping the length even.  Thus,
 * these values can be used safely for buffer sizes, without extra padding.
 *****************************************************************************
 */
#define QD_MAX_ORA_IDENT 32  /* Maximum identifier length in ORACLE SQL    */
#define QD_MAX_USER QD_MAX_ORA_IDENT
                            /* Maximum length of USER name string          */
#define QD_MAX_PWD  QD_MAX_ORA_IDENT
                            /* Maximum length of PASSWORD string           */
#define QD_MAX_TABNAME QD_MAX_ORA_IDENT
                            /* Maximum length of table name                */
#define QD_MAX_COLNAME QD_MAX_ORA_IDENT
                            /* Maximum length of column name               */
#define QD_MAX_ORA_LONG 1024 /* Maximum length of ORACLE LONG datatype     */
                            /*  (arbitrary for now - 11/8/91)              */
#define QD_MIN_FA_BUFS 2    /* Minimum fetch ahead buffers per subcursor   */
#define QD_ROWID_STRING_LENGTH 18 /* Length of string representing a rowid */
#define QD_MAX_HOST_STRING 256    /* Length of a host string          %19  */
#define QD_MAX_PARTITIONS 1024  /* Maximum degree of parallelism for       */
                                /*  decomposing a query */
#define QD_MIN_TTS_QUOTA 5      /* Minimum blocks user must have left on   */
                                /*  quota in temp tablespace to create     */
                                /*  intermediate table                     */

#define QD_SLEEP_THRESHOLD  1000  /* Number of times the master thread */
                                  /* should loop before usleep */

/*****************************************************************************
 * QD_EOD - Code to return for End-of-Data at pupi level    %15
 *****************************************************************************
 */
#define QD_EOD 1403

/*****************************************************************************
 * QD_BTT_MAP - Bitmap indicating full/empty status of bits in an
 *   exchange building block's btt.                                    %04
 *****************************************************************************
 */
typedef ub4 QD_BTT_MAP;

/*****************************************************************************
 * QD_WIDEST_FLOAT       %06
 *  Widest available native floating point type
 *****************************************************************************
 */
/* JM 2/27/92: 16-byte floats don't currently work as host parameters */
#ifdef ORACLE_SUPPORTS_16_BYTE_FLOATS
/* #ifdef __STDC__ */
typedef long double QD_WIDEST_FLOAT;
#else
typedef double QD_WIDEST_FLOAT;
#endif /* __STDC__ */

/*****************************************************************************
 * Host variable names for ends of rowid range in partitioning predicate
 * Note: Keep variable names all capital letters so that the name can be
 *       compared with the variable names returned by DESCRIBE BIND
 *****************************************************************************
 */
#define QD_LOW_ROWID_HOSTVAR "KSR_LOW_ROWID"
#define QD_HIGH_ROWID_HOSTVAR "KSR_HIGH_ROWID"
```

2

```
/************************************************************************
 * QD_VARCHAR Emulate the ORACLE SQL VARCHAR pseudotype               %01
 ************************************************************************
*/
typedef struct QD_VARCHAR
{
    unsigned short len;   /* Length of string */
    unsigned char arr[1]; /* Actually of arbitrary length */
} QD_VARCHAR;

/************************************************************************
 * QD_STATIC Declare "static" variables or routines
 * Some QD sources are massaged by sed scripts which replace "static"
 * with "__private static" - this is intended to fix up the output of the
 * SQL preprocessor.  QD_STATIC should be used for cases where this
 * substitution is not desired.
 ************************************************************************
*/
#define QD_STATIC static

/* Parallel cursor structure    %03 %04 */
typedef struct QDPCURSOR
{
#   define QDCK_PCUR QDCHECK4('P','C','U','R')
    /* Use the checkstring QDCK_DUMMY for dummy pcursor for EXPLAIN stmt    */
#   define QDCK_DUMMY QDCHECK4('D','U','M','M')  /* %18*/
    ub4 check;               /* Checkstring "CON" */
    word   root_cnumber;     /* root cursor number                         */
    struct QDPCURSOR *pnext; /* Pointer to next pcursor in this connection */
    struct QDSETUP *setup;   /* Pointer to setup queries                   */
    struct QD_VARCHAR *pinput_qry; /* Pointer to text of original query    */
#if 0                                                             /* %12 */
    struct QDPSUBQRY *ppsq;  /* Pointer to array of pointers to subqueries */
                             /* See psq below.                             */
    struct QDCNX *cnx;       /* Pointer to root cursor's connection        */
                             /* The need for this is still unclear.        */
#endif
    struct SQLDA *pbind_desc; /* Pointer to root cursor BIND descriptor    */
    struct SQLDA *pselect_desc; /* Pointer to root cursor SELECT descriptor */
    union QDBB_UNION *pctree; /* Pointer to combining tree                 */
    b2     num_btt_entries;  /* Number of entries in btt                   */
    text **pbtt;             /* Buffer translation table                   */
                             /* translation tables. The array size is set  */
                             /* at runtime, and equal to the number of     */
                             /* subqueries.                                */
    word   rowcount;         /* Track number of rows fetched       %16     */
    ub4    flags;            /* Flags                                      */
                             /* QD_PCUR_ORA_DESCRIBE is set if we let      */
                             /* ORACLE parse the query, so that we can let */
                             /* ORACLE describe it, rather than describing */
                             /* it ourselves                               */
#   define QD_PCUR_ORA_DESCRIBE 0x01
                             /* QD_PCUR_CLOSE_ON_EOD is set if we should   */
                             /* automatically close the cursor when EOD    */
                             /* is encountered, without waiting for a call */
                             /* to upicls or upicco.                       */
#   define QD_PCUR_CLOSE_ON_EOD 0x02

/* --------------- hypothetical subpage boundary, if needed --------------- */

#ifdef KSR
    pthread_barrier_t ex_barrier;  /* barrier used for synchronizing   %12 */
                                   /* parallel threads in the exchange node */
    pthread_mutex_t connect_mutex; /* mutex to single-thread connects      */
                                   /* This a temp hack to avoid conflicts  */
#endif /* KSR */
    word   num_psqs;         /* Number of subqueries                       */
    word   request;          /* Request to be broadcast to all threads %14 */

    ub2 **plenptrs;          /* Array of pointers to (output)lengths of    */
                             /*  column values, indexed by column number   */
    word   rowid_posit;      /* Position in bind descriptor of the */
                             /* rowid variables              %30 */
} QDPCURSOR;

/************************************************************************
 * QDCO_AHSPARMS - Structure to save upiahs parameters              %10
 ************************************************************************
*/
typedef struct QDCO_AHSPARMS
{
    text   h[QD_MAX_HOST_STRING];    /* host string                        */
    size_t hl;                       /* length of host string              */
} QDCO_AHSPARMS;

/************************************************************************
 * QDCO_LAMPARMS - Structure to save upilam parameters              %10
 ************************************************************************
*/
typedef struct QDCO_LAMPARMS
{
    text   u[M_IDEN];          /* user name                               */
    size_t ul;                 /* length of user name                     */
    text   p[M_IDEN];          /* password                                */
    size_t pl;                 /* length of password                      */
    ub4    i;                  /* logon flags                             */
    word   r;                  /* revision level of access module         */
} QDCO_LAMPARMS;

/************************************************************************
 * QDCNX - Structure to manage an ORACLE connection
 ************************************************************************
*/
typedef struct QDCNX
{
    ub4 check;          /* Checkstring "CNX " */
#   define QDCK_CNX QDCHECK('C','N','X',' ')

    ub4 cnx_seqno;      /* Connection sequence number - incremented each  */
                        /*  time caller re-connects (lets QD modules that */
                        /*  make sqllib calls know when to reset sqlctx   */
                        /*  to 0).  This is needed to make QD work in     */
                        /*  SQL*Plus when a user re-connects as someone   */
                        /*  else.  Each QD module that makes sqllib calls */
                        /*  for the main connection should invoke the     */
                        /*  macro QD_CHECK_CNX_SEQNO, defined below,      */
                        /*  before the first sql statement.  The module   */
                        /*  should define cnx_seqno locally as __private  */
                        /*  static ub4, initialized to 0.                 */
#   define QD_CHECK_CNX_SEQNO \
    { if (QDpcom->cnx.cnx_seqno > cnx_seqno) \
      { sqlctx = 0; cnx_seqno = QDpcom->cnx.cnx_seqno; } }

    struct QDCNX *pnext;     /* Pointer to next connection in linked list */
    struct QDSP_COM *pspcom; /* Pointer to SQL parser common area         */

    text user[QD_MAX_USER];  /* USER name for this connection             */
    text pwd[QD_MAX_PWD];    /* Password for this connection              */

    struct QDPCURSOR *ppcursor;  /* Pointer to 1st parallel cursor        */
                                 /* in this connection                    */
    struct QDCO_AHSPARMS ahsparms; /* Parameters to pass to upiahs to %10 */
                                   /* create parallel connections         */
    struct QDCO_LAMPARMS lamparms; /* Parameters to pass to upilam to     */
                                   /* create parallel connections         */
    ub4 flags;          /* Options flags for this connection %23          */
#   define QDCNX_DBA 0x0001  /* Connected user has DBA privilege, so DBA_  */
                             /*  views can be used in place of ALL_ views. */
                             /* (This matters, because a DBA-privileged    */
```

3

21

```
                               /* user has access to some tables which won't */
                               /* show up in ALL_ views.)                     */
#   define QDCNX_DBA_CHECKED 0x0002 /* We've already checked whether user   */
                                    /*  has dba privilege                   */
#   define QDCNX_CANT_CREATE_TABLE 0x0004
                               /* User has insufficient privilege to create */
                               /*  intermediate tables                        */

    bool checked_for_disabled; /* Have we already checked whether QD is    */
                               /* disabled for current database?          */
    text plan_table[2*QD_MAX_TABNAME + 2];
                               /* Explain plan table.  Allow room for */
                               /* '.' and null terminator             */
    text temporary_tablespace[QD_MAX_ORA_IDENT + 2];
                               /* Tablespace in which to create temporary   */
                               /* tables, determined by "SELECT             */
                               /* TEMPORARY_TABLESPACE FROM USER_USERS"     */
} QDCNX;

/****************************************************************************
 * QDcom - Query Decomposition common area
 ****************************************************************************
*/

typedef struct QDCOM
{
    ub4 check;             /* Checkstring "COM " */
#   define QDCK_COM QDCHECK4('C','O','M',' ')

    struct QDCNX cnx;      /* Embedded structure for first (possibly only)    */
                           /*  ORACLE connection                              */
    QDSTATUS status;       /* Current status code */
    text     *pdetector; /* Name of routine detecting an error */

    /* The next 2 fields are only set if a non-trivial error occurs in   */
    /* a parallel thread. Only the first such error will be recorded.    */
    QDSTATUS pstatus;      /* Current status code for parallel threads     */
    word      err_child; /* Child num of thread reporting above error     */

    /* "Control Panel" - Settings to control mode of operation */
    ub4 flags;             /* Options flags */
#   define QD_DEBUG 0x00000001L /* Enable debugging output */
#   define QD_TRACE 0x00000002L /* Enable call trace output */
#   define QD_TURN_TRACE_ON (QDpcom->flags |= QD_TRACE)
#   define QD_TURN_TRACE_OFF (QDpcom->flags &= (~QD_TRACE))
#   define QD_DISPLAY_TRACE (QDpcom->flags & QD_TRACE) /* Boolean test */
#   define QD_TURN_DEBUG_ON (QDpcom->flags |= QD_DEBUG)
#   define QD_TURN_DEBUG_OFF (QDpcom->flags &= (~QD_DEBUG))
#   define QD_DISPLAY_DEBUG (QDpcom->flags & QD_DEBUG) /* Boolean test */

    text *pqry_text_buf; /* Pointer to buffer for generating queries %02 */
    ub4 qbuf_current_size; /* Size of currently-allocated query text buffer */
#   define QD_QBUF_SAFETY_MARGIN 128  /* Generate large buffer if we get     */
                                      /* within this many bytes of the end  */
#   define QD_QBUF_INITIAL_SIZE (128 + QD_QBUF_SAFETY_MARGIN)          /* %13 */
                                      /* Initial size for query text buffer */
#   define QD_QBUF_GROWTH_FACTOR 2    /* Multiply previous size by this      */
                                      /* amount to get size of new buffer   */
#   define QD_QBUF_CURRENT_SIZE (QDpcom->qbuf_current_size)
#   define QD_PQBUF (QDpcom->pqry_text_buf)        /* %02 */

    ub2 num_fa_bufs;       /* Number of fetch ahead buffers to allocated      */
                           /*  for each parallel subcursor (initialize to     */
                           /*  QD_MIN_FA_BUFS)                                */

    /* The next two fields are for tracking memory management */
    ub2 nmallocs;          /* Number of calls to qdrt_malloc */
    ub2 nfrees;            /* Number of calls to qdrt_free */

    ub2 call_level;        /* Level of current routine call (incremented by   */
                           /*  QDBEGIN macro, decremented by QDEND)           */
    ub2 npmallocs;         /* Number of calls to qdrt_pmalloc */
    ub2 npfrees;           /* Number of calls to qdrt_pfree */

    /* db_string - String used to identify database in CONNECT statement.   */
    /* This is set to "P:x" in qdinit, where x is the value of the          */
    /* ORACLE_SID environment variable, or 'A' if that variable is not set. */
#   define QD_MAX_DB_STRING 31
    text db_string[QD_MAX_DB_STRING + 1];

    ub2 max_partitions; /* If non-zero, indicates maximum degree of          */
                        /*  parallelism for decomposing a query */
    ub2 min_partitions; /* Indicates the minimum number of table partitions */
                        /*  for which decomposition is considered effective */
#   define QD_MIN_PARTITIONS_DFLT 2 /* Default minimum partitions             */
    ub2 array_size;     /* Default dimension of arrays used internally by   */
                        /*  subcursors for arrayfetch - 0 means no array    */
                        /*  fetch. Set with env var KSR_ARRAY_SIZE.          */
#   define QD_MAX_ARRAY_SIZE 2048 /* Maximum permitted value for array_size */
    ub2 array_threshold; /* Default threshold number of rows returned,      */
                        /* after which a subcursor should start using array */
                        /* fetching.  If 0, start immediately.               */
#   define QD_MAX_ARRAY_THRESHOLD 4096 /* Maximum array_threshold value      */
    ub2 oertyp;         /* SQL statement type to place in                   */
                        /*  hst->hstoer.oertyp when pupi routines return.   */
                        /*  Types are defined in rdbms/public/octdef.h      */
    ub2 filler[4];      /* reserved for future use */
} QDCOM;
extern struct QDCOM *QDpcom;  /* Defined in qdinit.c */

/****************************************************************************
 * QDtime - Query Decomposition timing information area
 ****************************************************************************
*/
typedef struct QDtime
{
    struct timeval start;
    struct timeval elapsed;
} QDTIME;

extern QDSTATUS qd_init();      /* Allocates common area */
extern QDSTATUS qd_init_cnx(); /* (Re)initialize for a new ORACLE connection */
extern QDSTATUS qd_connect(    /* Connect to Oracle */
#ifdef __STDC__
text *, text *
#endif /* __STDC__ */
); /* qd_connect */

#endif /* ifndef QDSTD */
```

```
/******************************************************************************
 * qdstext.h - External definitions for QD test routines (not part of product)
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ******************************************************************************
 * REV   DATE      AUTHOR   DESCRIPTION
 * ---   --------  ------   ---------------------------------------------------
 * %01   07/22/93  EYT      Get timing statistics for QD
 * %00   10/28/91  JM       Initial Version
 ******************************************************************************
*/

#ifndef QDTSTEXT
#define QDTSTEXT

#ifndef QDSTD
#include <qdstd.h>
#endif /* QDSTD */

/* qdtst_getqry - get query text for query id from test_queries table */
extern QDSTATUS qdtst_getqry(
#ifdef __STDC__
    b4, text *
#endif /* __STDC__ */
); /* qdtst_getqry */

/* qdtst_dspmsg - display posted error code and detecting routine */
extern QDSTATUS qdtst_dspmsg(
#ifdef __STDC__
text *, QDSTATUS *
#endif /* __STDC__ */
); /* qdtst_dspmsg */

/* qdtst_dump_tree - dump parse tree to standard output */
extern b4 qdtst_dump_tree(
#ifdef __STDC__
struct QDSP_UNION *, text *
#endif /* __STDC__ */
); /* qdtst_dump_tree */

/* qdtst_dump_colmap - dump column map to standard output */
extern b4 qdtst_dump_colmap(
#ifdef __STDC__
struct QDCP_COLMAP *, b4
#endif /* __STDC__ */
); /* qdtst_dump_colmap */

/* qdtst_getenv - get environment variables which control testing */
extern void qdtst_getenv(
#ifdef __STDC__
bool, text *
#endif /* __STDC__ */
);

/* qdtst_exeqry - execute query single-threaded as control for perf test */
extern QDSTATUS qdtst_exeqry(
#ifdef __STDC__
text *, b4
#endif /* __STDC__ */
);

/* qdtst_finish - compute elapsed execution time given the starting */
/*                time */
extern void qdtst_finish(
#ifdef __STDC__
struct QDTIME *
#endif /* __STDC__ */
);
```

```
/* Command codes for qdtst_exeqry */
#define QDTST_OPEN  1  /* Open cursor */
#define QDTST_FETCH 2  /* Fetch a row from cursor */
#define QDTST_CLOSE 3  /* Close cursor */

/* Macro to permit easy typing of temporary checkpoint printouts */
#define x(_n) printf("\nCheckpoint %d\n", (_n));

/* Extern declarations for globals used to control test display,
 * defined in qdtst_getenv.c.
*/
extern bool QD_2_phase_commit;
extern char *QD_default_directive;
extern bool QD_display_tree1;
extern bool QD_display_tree2;
extern bool QD_display_tree3;
extern bool QD_display_colmap;
extern bool QD_display_prompt_for_semantic;
extern bool QD_display_peq;
extern bool QD_display_explain;
extern bool QD_display_prompt_if_ineffective;
extern bool QD_display_ctree;
extern bool QD_display_exec;
extern bool QD_display_exec2;
extern bool QD_display_exec3;
extern bool QD_display_time;
extern bool QD_display_mallocs;
extern bool QD_display_why_no_qd;
extern bool QD_no_early_fetch;
extern bool QD_no_early_fetch_verbose;
extern int  QD_pause;
extern bool QD_temp_table_freelists;
extern FILE *QD_display_file;
#endif /* QDTSTEXT */
```

```
/******************************************************************************* * qdx
pext.h - External definition for the 'Explain query' subsystem of QD
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ******************************************************************************
 * REV  DATE       AUTHOR   DESCRIPTION
 * ---  --------   ------   ---------------------------------------------------
 * %02  10/13/92   ETT      Take out plan_table parameter in qry and del
 * %01  10/07/92   ETT      Change QDXP_PLAN_TABLE_NAME to
 *                          'system.ksr_plan_table'
 * %00  10/02/91   JM       Initial Version
 ******************************************************************************
 */

#ifndef QDXPEXT
#define QDXPEXT

#ifndef QDSTD
#include <qdstd.h>
#endif /* QDSTD */

/* qdxp_genplan: generate EXPLAIN plan for an ORACLE query */
extern QDSTATUS qdxp_genplan(
#ifdef __STDC__
    text *,
    text *,
    text *
#endif /* __STDC__ */
); /* qdxp_genplan */

/* qdxp_qry: retrieve EXPLAIN plan for a query from plan table */
extern QDSTATUS qdxp_qry(
#ifdef __STDC__
    struct QDSP_QDEF *,
    text *
#endif /* __STDC__ */
); /* qdxp_qry */

/* qdxp_explain: satisfy user EXPLAIN request, by generating an EXPLAIN
 * plan for decomposed query and fixing it up to show effect of decomposition
 */
extern QDSTATUS qdxp_explain(
#ifdef __STDC__
    struct QDSP_QDEF *,
    text *
#endif /* __STDC__ */
); /* qdxp_qry */

/* qdxp_del: delete an EXPLAIN plan */
extern QDSTATUS qdxp_del(
#ifdef __STDC__
    text *
#endif /* __STDC__ */
); /* qdxp_del */

/******************************************************************************
 * Name of plan table to use
 ******************************************************************************
 */
#define QDXP_PLAN_TABLE_NAME 'system.ksr_plan_table'

/******************************************************************************
 * Length of auto-generated statement id for an explain plan
 ******************************************************************************
 */
#define QDXP_AUTO_GEN_STMT_ID_LEN 14

/******************************************************************************
 * To cause EXPLAIN statements, and the correspoding DELETE statements, to
 * be COMMITed, enable the following:
#define QDXP_COMMIT_EXPLAIN 1
 ******************************************************************************
 */

#endif /* QDXPEXT */
```

24

```
/*****************************************************************************
 * qd_init - Initialization routine for Query Decomposition system
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV  DATE      AUTHOR  DESCRIPTION
 * ---  --------  ------  ------------------------------------------------
 * %03  10/13/92  EYT     Initialize QDpcom->cnx.plan_table to "plan_table"
 * %02  04/29/92  JM      Check ORACLE_SID environment variable
 * %01  03/31/91  JM      Move definition of qd_enabled to here
 * %00  09/18/91  JM      Initial Version
 *****************************************************************************
 */

#include <qdstd.h>
#include <qdrtext.h>
#include <qderrs.h>

QDCOM *QDpcom = (QDCOM *)NULL;  /* Global pointer to common area */
__private bool KSR_qd_enabled; /* Global flag enabling/disabling QD */

QDSTATUS qd_init()
{
    QDCOM tempcom; /* So QDFAIL can work from within qdrtmalloc */
    reg1 QDCOM *pcom;
    reg2 char *penv;     /* Point to environment variable value */
    reg3 int len;
    extern char *getenv();

    /* Don't do anything if QDpcom is non-NULL, meaning we've already */
    /* been called.                                                    */
    if (QDpcom == NULL)
    {
        QDpcom = &tempcom;
        QD_STATUS = QD_OK;
        QDpcom->flags = 0;
        pcom = (QDCOM *)qdrt_malloc(sizeof(QDCOM));
        if (QDFAILED)
            return(QD_STATUS);
        QDpcom = pcom;
        pcom->check = QDCK_COM;

        /* Initialize number of fetch ahead buffers to allocated for */
        /* each parallel subcursor */
        pcom->num_fa_bufs = QD_MIN_FA_BUFS;

        /* Set db_string in QDCOM, to determine database in CONNECT
         * statements for parallel subqueries -
         * If the environment variable QD_CONNECT_STRING is set, use its
         * value; else, set to "P:x", where x is
         * the value of the ORACLE_SID environment variable, or 'A' if
         * that variable is not set.
         */
        penv = getenv("QD_CONNECT_STRING");
        if (penv)
        {
            len = min(QD_MAX_DB_STRING, strlen(penv));
            memcpy(QDpcom->db_string, penv, len);
            QDpcom->db_string[len] = 0;
        }
        else
        {
            penv = getenv("ORACLE_SID");
            if (penv)
            {
                memcpy(QDpcom->db_string, "P:", 2);
                len = min(QD_MAX_DB_STRING - 2, strlen(penv));
                memcpy(QDpcom->db_string + 2, penv, len);
                QDpcom->db_string[len + 2] = 0;
            }
            else
                strcpy(QDpcom->db_string, "P:A");
        }

        /* Initialize plan_table to 1st choice: "plan_table" */
        strcpy (QDpcom->cnx.plan_table, "plan_table");

        /* Display QD version */

        penv = getenv("KSR_QA_MODE");
        fprintf(penv ? stderr : stdout,
            "KSR Query Decomposer: Version 0.1.5.0\n");

#ifdef QDDEBUG
    /* Default to FALSE on all display-control environment variables,
     * if QDDISPLAY is not set.
     */
    qdtst_getenv(FALSE, (text *)NULL);
#endif /* QDDEBUG */

#ifdef OS_THREAD_FORK_BUG
        /* While the KSR OS has a bug preventing forking from within
         * threads, save uninitialized uga global variables (for sqllib),
         * to use later when making connections for threads
         */
        qdpu_save_uga(0);
#endif /* OS_THREAD_FORK_BUG */
    }
    return(QD_OK);
} /* qd_init */

/*****************************************************************************
 * qd_init_cnx - Perform (re)initialization needed when a new user-level
 * ORACLE connection is made.
 *
 * Reset default plan table name.
 * Reset flags indicating whether user has dba privilege, and whether this
 * has been checked yet.
 * Reset temporary tablespace name.
 *****************************************************************************
 */
QDSTATUS qd_init_cnx()
{
    /* Initialize plan_table to 1st choice: "plan_table" */
    strcpy (QDpcom->cnx.plan_table, "plan_table");

    QDpcom->cnx.flags = 0;
    QDpcom->cnx.temporary_tablespace[0] = 0;

    /* Increment sequence number for the connection, so QD routines using
     * SQL can tell they need to reinitialize sqlctx.
     */
    QDpcom->cnx.cnx_seqno++;
    return(QD_OK);
} /* qd_init_cnx */
```

1

25

```
/************************************************************************
 * qdrt_free.c - Free memory allocated by qdrtmalloc
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ************************************************************************
 * REV   DATE       AUTHOR   DESCRIPTION
 * ---   --------   ------   -------------------------------------------
 * %01   08/16/93   EYT      Accept pointer to pointer, check if
 *                           pointer is NULL and set to NULL after freeing
 * %00   09/18/91   JM       Initial Version
 ************************************************************************
*/

#include <qdstd.h>
#include <qdrtext.h>

#ifdef QDDEBUG
#include <memory.h>
bool QD_display_mallocs;
#endif /* QDDEBUG */

qdrt_free(pptr)
ptr_t *pptr;
{
    ptr_t ptr;

    QDBEGIN("qdrt_free");

    if (pptr)
    {
        ptr = *pptr;
#ifdef QDDEBUG
        if (QD_display_mallocs)
        {
            if (ptr == NULL || !memcmp( ((char *)ptr), "FREE", 4))
                printf(" Redundant free: %08lx (%4.4s)\n",
                        (char *)ptr, (char *)ptr);
            else
            {
                QDpcom->nfrees++;
                printf("            free: %08lx (%4.4s)\n",
                        (char *)ptr, (char *)ptr);
                memcpy( ((char *)ptr), "FREE", 4);
            }
        }
#endif /* QDDEBUG */

        if (ptr)
            free((char *)ptr);
        *pptr = NULL;
    }

    QDEND;
} /* qdrt_free */
```

1

```
/*****************************************************************************
 * qdrt_malloc.c - Allocate memory, initialized to zero
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   ---------------------------------------------------
 * %00   09/18/91  JM       Initial Version
 *****************************************************************************
*/
#include <memory.h>
#include <qdstd.h>
#include <qdrtext.h>
#include <qderrs.h>

#ifdef QDDEBUG
bool QD_display_mallocs;
#endif /* QDDEBUG */

ptr_t qdrt_malloc(size)
ub4 size;
{
    reg1 ptr_t pmem;

    QDBEGIN("qdrt_malloc");
    if (size < 1)
    {
        QDFAIL(QD_MALLOC_BAD_SIZE);
        pmem = (text *)NULL;
    }
    else
    {
        pmem = (ptr_t)malloc((unsigned)size);
        if (pmem == (text *)NULL)
            QDFAIL(QD_MALLOC_FAILED);
        else
        {
            memset(pmem, 0, size);
#ifdef QDDEBUG
            if (QD_display_mallocs)
            {
                QDpcom->nmallocs++;
                printf("            malloc: %08lx\n", pmem);
            }
#endif /* QDDEBUG */
        }
    }
    QDEND;
    return(pmem);
} /* qdrt_malloc */
```

```
/******************************************************************************
 * qdrt_mktemp.c - Make a unique temporary name (similar to mktemp)
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ******************************************************************************
 * REV   DATE       AUTHOR   DESCRIPTION
 * ---   --------   ------   --------------------------------------------------
 * %01   12/01/93   EYT      Use 5 digit pid and 4 digit timestamp
 * %00   10/02/91   JM       Initial Version
 ******************************************************************************
 */
#include <stdio.h>
#include <sys/time.h>
#include <memory.h>
#include <qdstd.h>
#include <qdrtext.h>
#include <qderrs.h>

/******************************************************************************
 * qdrt_mktemp - produces a relatively unique name using process id and
 * current time.  Similar to mktemp, but doesn't check whether a file with
 * this name exists (to save time, and because this is for general-purpose
 * names, not filenames).  Modifies template string by replacing 9 trailing
 * X's with 5 digits of process id and 4 (trailing) digits of current
 * elapsed second.  This should be safely unique within any given
 * 24 hour period.
 ******************************************************************************
 */
text *qdrt_mktemp(template)
reg1 text *template;
{
    struct timeval tm; /* Structure for retrieving time */
    text timestr[10];  /* Buffer to hold string version of time in secs */
    reg2 text *pbuf;   /* Pointer into buffer */

    QDBEGIN("qdrt_mktemp");
    gettimeofday(&tm, NULL);
    sprintf(timestr, "%9.9d", tm.tv_sec);
    pbuf = template + strlen(template) - 9;
    if (pbuf < template || memcmp(pbuf, "XXXXXXXXX", 9))
        return (text *)NULL; /* Improperly formatted template */
    sprintf(pbuf, "%5.5d", getpid());
    memcpy(pbuf + 5, timestr + 5, 4);
    QDEND;
    return template;
} /* qdrt_mktemp */
```

28

```
/*****************************************************************************
 * qdrt_pfree.c - Free memory allocated by qdrt_pmalloc
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR   DESCRIPTION
 * ---   --------   ------   ---------------------------------------------
 * %01   08/16/93   KYT      Accept pointer to pointer, check if
 *                           pointer is NULL and set to NULL after freeing
 * %00   09/18/91   JM       Initial Version
 *****************************************************************************
*/

#include <qdstd.h>
#include <qdrtext.h>

#ifdef QDDEBUG
#include <memory.h>
bool QD_display_mallocs;
#endif /* QDDEBUG */

qdrt_pfree(child_num, pptr)
word child_num;
ptr_t *pptr;
{
    ptr_t ptr;

    QDBEGIN("qdrt_pfree");

    if (pptr)
    {
        ptr = *pptr;
#ifdef QDDEBUG
        if (QD_display_mallocs)
        {
            if (ptr == NULL || !memcmp( ((char *)ptr), "FREE", 4))
                printf("Redundant pfree: %3d %08lx (%4.4s)\n",
                        child_num, (char *)ptr, (char *)ptr);
            else
            {
#ifdef ksr
                gsp(QDpcom->npfrees);   /* lock counter */
#endif /* ksr */
                QDpcom->npfrees++;      /* increment counter */
#ifdef ksr
                rsp(QDpcom->npfrees);   /* unlock counter */
#endif /* ksr */
                printf("                pfree: %3d %08lx (%4.4s)\n",
                        child_num, (char *)ptr, (char *)ptr);
                memcpy( ((char *)ptr), "FREE", 4);
            }
        }
#endif /* QDDEBUG */

        if (ptr)
            free((char *)ptr);
        *pptr = NULL;
    }

    QDEND;
} /* qdrt_pfree */
```

```
/*****************************************************************************
 * qdrt_pmalloc.c - Allocate memory for parallel threads, initialized to zero
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR   DESCRIPTION
 * ---   --------   ------   ---------------------------------------------------
 * %00   09/18/91   JM       Initial Version
 *****************************************************************************
*/
#include <memory.h>
#include <qdstd.h>
#include <qdrtext.h>
#include <qderrs.h>

#ifdef QDDEBUG
bool QD_display_mallocs;
#endif /* QDDEBUG */

ptr_t qdrt_pmalloc(child_num, size)
word child_num;
ub4 size;
{
    reg1 ptr_t pmem;

    QDBEGIN("qdrt_pmalloc");
    if (size < 1)
    {
        QDFAIL(QD_MALLOC_BAD_SIZE);
        pmem = (text *)NULL;
    }
    else
    {
        pmem = (ptr_t)malloc((unsigned)size);
        if (pmem == (text *)NULL)
            QDFAIL(QD_MALLOC_FAILED);
        else
        {
            memset(pmem, 0, size);
#ifdef QDDEBUG
            if (QD_display_mallocs)
            {
#ifdef ksr
                gsp(QDpcom->npmallocs);    /* lock counter */
#endif /* ksr */
                QDpcom->npmallocs++;       /* increment counter */
#ifdef ksr
                rsp(QDpcom->npmallocs);    /* unlock counter */
#endif /* ksr */
                printf("                pmalloc: %3d %08lx\n", child_num, pmem);
            }
#endif /* QDDEBUG */
        }
    }
    QDEND;
    return(pmem);
} /* qdrt_pmalloc */
```

```
/****************************************************************************
 * qdbb_exchange - Execution function for EXCHANGE qd building block
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE      AUTHOR   DESCRIPTION
 * ---   --------  ------   ----------------------------------------------
 * %03   01/25/93  JN       Removed obsolete conditional code for working
 *                           around various OS bugs, to make code clearer
 * %02   04/29/92  JN       Rename qdpu_save_sqllib to qdpu_save_uga;
 *                           rename qdpu_restore_sqllib to qdpu_restore_uga
 * %01   04/08/92  DW       Hack around an OS bug that screws up when a
 *                          multi-threaded program forks. On OPEN, call
 *                          exchange_producer in the same thread to fork a
 *                          server and then return. On NEXT, create another
 *                          thread to start the fetching.
 * %00   11/26/91  DW       Initial Version
 ****************************************************************************
*/

#include <stdio.h>
#include <strings.h>
#include <ctype.h>
#include <dtydef.h>
#include <qdstd.h>
#include <qdrtext.h>
#include <qdspext.h>
#include <qdcpext.h>
#include <qdxpext.h>
#include <qdbbext.h>
#include <qdpuext.h>
#include <qderrs.h>
#ifdef QDDEBUG
#include <qdtstext.h>
#include <sqlda.h>
#endif /* QDDEBUG */
#include <memory.h>
#include <stdlib.h>
#include <pthread.h>
#include <s.h>

/* #define SINGLE_THREAD_CONNECTS */

#define CBUF pexchange->consumer_buffer
#define PBUF pexchange->producer_buffer

/* Connection number used to run a unique executable for each server */
extern int KSR_cnx_number;

/* mutex for single-threading connects. Just a hack to avoid conflicts. */
__shared static pthread_mutex_t connect_mutex;

__private static word child;

#ifdef QDDEBUG_ARRAYFETCH
__private static word producer_counter;
static word consumer_counter[40];
#endif /* QDDEBUG_ARRAYFETCH */

static QDBB_REPLY qdbb_exchange_producer(/*_ QDBB_EXCHANGE *pexchange _*/);

QDBB_REPLY qdbb_exchange(pexchange, req, pbtt)
QDBB_EXCHANGE *pexchange;
word req;
text *pbtt[];  /* Buffer translation table */
{
    QDSTATUS retval;
    pthread_t thread_id;
    pthread_barrier_t *pex_barrier;

    QDBEGIN("qdbb_exchange");

    child = pexchange->child_num;
    pex_barrier = &pexchange->ppcursor->ex_barrier;

    switch(req)
    {
#ifdef QDDEBUG
      case QDBB_REQ_DISPLAY:

        printf("    EXCHANGE at %08lx\n", pexchange);
        printf("         hdr: %08x\n", pexchange->hdr);
        printf("      pchild: %08lx\n", pexchange->pchild);
        printf("   child_num: %d\n", pexchange->child_num);
        printf("    ppcursor: %08lx\n", pexchange->ppcursor);
        printf(" out_bufnum: %d\n", pexchange->out_bufnum);
        printf("    nbuffers: %d\n", pexchange->nbuffers);
        {
            int i;
            for (i = 0; i < pexchange->nbuffers; i++)
                printf("      btt[%d]: %08lx\n", i, pexchange->btt[i]);
        }
        printf(" fetch_cond: %08lx\n", pexchange->fetch_cond);
        printf("fetch_mutex: %08lx\n", pexchange->fetch_mutex);
        printf("       cbuf: %d\n", pexchange->consumer_buffer);
        printf("       pbuf: %d\n", pexchange->producer_buffer);
        printf("        btt: %08lx\n", pexchange->btt);
        retval = (*(pexchange->pchild->hdr.pfunc))
            (pexchange->pchild, QDBB_REQ_DISPLAY, pexchange->btt);
        break;
#endif /* QDDEBUG */

      case QDBB_REQ_OPEN:

        /* Start a thread to handle a subquery. Special exchange nodes    */
        /* are identified as being responsible for initializing the       */
        /* barriers used by all threads to synchronize opens and closes. */
        /* Each of them will act as the master thread by initializing a  */
        /* barrier, checking in to it, or checking out of it. There is   */
        /* a subtle distinction here. At this point, the code is single  */
        /* threaded. The current thread will sometimes be considered the */
        /* master thread. It will also create a child (or slave) thread. */
        /* Thus, some invocations of this procedure will be responsible  */
        /* for 2 threads - the master and one of the slaves.             */

        TTRACE(("exchange: OPEN\n"))

        if (pexchange->hdr.state == QDBB_STATE_EMPTY)
        {
#ifdef QDDEBUG_ARRAYFETCH
            consumer_counter[child] = 0;
#endif /* QDDEBUG_ARRAYFETCH */

            /* Initialize producer and consumer buffer pointers. */

            PBUF = 1;   /* will fill up this buffer next                */
            CBUF = 0;   /* read this buffer last, will read CBUF+1 next, */
                        /* after the producer has written it, of course  */

            TTRACE(("exchange: hdr.flags=%x\n", pexchange->hdr.flags))

            if (pexchange->hdr.flags & QDBB_MASTER_INIT_OPEN)

            /* This is the special exchange node assigned to initialing  */
            /* the barrier and signalling the threads to open. Usually,  */
            /* it will be the first exchange node.                       */

            {
                /* Barrier must be initialized with one more member than the */
                /* number of subqueries. This is because the master thread   */
                /* counts as a member, but doesn't execute subqueries.       */
                if ((retval = barrier_init(pex_barrier,
```

31

```
                                        pthread_barrierattr_default,
                                        pexchange->ppcursor->num_pegs+1)) != 0)
                    break;

                TTRACE(("exchange: master checkin\n"))
                if ((retval = barrier_checkin(pex_barrier, 0)) != 0)
                    break;
                TTRACE(("exchange: master checkin complete\n"))

                /* Use pcursor's request to broadcast a msg to all threads. */
                TTRACE(("exchange: send request OPEN\n"))
                pexchange->ppcursor->request = QDBB_REQ_OPEN;

#ifdef SINGLE_THREAD_CONNECTS

                /* Initialize mutex to single-thread connects. Temporary    */
                /* hack because the application seems to hang when several */
                /* forks/connects are done concurrently.                    */

                /* This isn't being used now because the connects are       */
                /* single-threaded by doing them serially before creating   */
                /* any more threads.  When we are allowed to create threads */
                /* before connections, this code might still be useful for */
                /* single-threading the connections.                        */

                pthread_mutex_init(&connect_mutex,
                                   pthread_mutexattr_default);

#endif

            }

            /* Create mutex and condition variables to handle the */
            /* fetch-ahead buffer coordination for this subquery. */

            if ((retval = mutex_init(&pexchange->fetch_mutex,
                                     pthread_mutexattr_default)) != 0)
                break;

            if ((retval = cond_init(&pexchange->fetch_cond,
                                    pthread_condattr_default)) != 0)
                break;


            pexchange->ppcursor->request = QDBB_REQ_OPEN;

           /* Create a new thread to act as a producer for this exchange.  */

            if (!(pexchange->hdr.state & QDBB_STATE_THREAD_CREATED))
            {
                TTRACE(("exchange: starting thread for child %d\n", child));

                /* If this is not the first thread, and the env var
                 * KSR_PAUSE was set, pause for specified number of
                 * microseconds before creating next child.
                 */
                if (QD_pause)
                {
                    if (child == 1)
                        printf(
                      "Pausing %d microseconds between thread creates.\n",
                               QD_pause);
                    else
                    {
                        if (QD_no_early_fetch_verbose)
                            printf(
"Exchange %d pausing %d microseconds before creating thread...\n",
                                   child, QD_pause);
                        usleep(QD_pause);
                    }
                }
                if ((retval = qd_thread_create(&thread_id,
                                               pthread_attr_default,
                                               qdbb_exchange_producer,
                                               (void *)pexchange)) != 0)
                    break;
                else
                {
                    pexchange->hdr.state |= (QDBB_STATE_PENDING |
                                             QDBB_STATE_THREAD_CREATED);
                    retval = QDBB_REPLY_PENDING;
                }
            }

            /* Assume the OPEN always works, for now. */
            pexchange->hdr.state |= QDBB_STATE_PENDING;
            retval = QDBB_REPLY_PENDING;

            if (pexchange->hdr.flags & QDBB_MASTER_WAIT_OPEN)

            /* This is the special exchange node assigned to waiting for */
            /* all the threads to finish their opens. Usually, it will   */
            /* be the last exchange node.                                */

            {
                TTRACE(("exchange: master checkout\n"))
                if ((retval = barrier_checkout(pex_barrier, 0)) != 0)
                    break;
#ifdef QDDEBUG
                fprintf(stderr, "KSR QD: %d parallel subqueries started.\n\n",
                        child);
#endif /* QDDEBUG */
                TTRACE(("exchange: master checkout complete\n"))

                /* If the env var KSR_NO_EARLY_FETCH is set, print a message
                 * indicating that we're ready to allow fetching.
                 */
                if (QD_no_early_fetch)
                    printf("Fetching now enabled.\n");

                /* Now let the threads start fetching (unless query */
                /*  is INSERT/SELECT with no aggregation */
                if (!(pexchange->hdr.flags & QDBB_PSQ_INSERT_SELECT)
                    || !QD_2_phase_commit)
                    pexchange->ppcursor->request = QDBB_REQ_NEXT;
            }
        }
        break;


    case QDBB_REQ_CLOSE:

        TTRACE(("exchange: CLOSE\n"))

        /* Pass request down to all threads. They will see it and respond */
        /* to it at the next convenient opportunity. We only need to do   */
        /* this for one child, typically the first one, because all       */
        /* threads will see the same copy of the request and act on it in */
        /* parallel. This will avoid repeated modification of the same    */
        /* variable by multiple threads on multiple cells.                */

        /* Like OPEN, there is one exchange node specially designated to  */
        /* coordinate closing of all the threads. One child signals them  */
        /* to close here, typically the first one. Another child,         */
        /* typically the last one, waits for all of them to close. All    */
        /* the other children don't need to do anything here because      */
        /* their threads will already be simultaneously closing           */
        /* themselves as a result of the frist child's request to do so.  */

        /* closes the rest of the exchange nodes, they will simply return */
        /* the status code resulting from the close that is already done. */

        /* -------------------------------------------------------------- */
        /* Alternatively, we could have used one condition variable for   */
        /* each thread (in the exchange node), and done the wait on each  */
        /* call from the parent. A timed wait could handle lost or dead   */
```

```
/* threads individually. That might become necessary if pthread  */
/* handling in the OS isn't very robust. The advantage would be  */
/* that the parent could immediately check the status code       */
/* returned from each exchange rather than checking all status   */
/* codes after the last exchange returns.                        */

if (pexchange->hdr.flags & QDBB_MASTER_INIT_CLOSE)
{
    pexchange->ppcursor->request = QDBB_REQ_CLOSE;

    /* This checkin isn't so important by itself, but it allows us */
    /* to use a checkout to wait for all the threads to finish.    */

    TTRACE(("exchange: master checkin\n"))
    if ((retval = barrier_checkin(pex_barrier, 0)) != 0)
        break;
    TTRACE(("exchange: master checkin complete\n"))
}

TTRACE(("exchange: hdr.flags=%x\n", pexchange->hdr.flags))

if (pexchange->hdr.flags & QDBB_MASTER_WAIT_CLOSE)
{
    /* Wait for all threads to close. */

    TTRACE(("exchange: master checkout\n"))
    if ((retval = barrier_checkout(pex_barrier, 0)) != 0)
        break;
    TTRACE(("exchange: master checkout complete\n"))

    if ((retval = barrier_destroy(pex_barrier)) != 0)
        break;
}

/* Destroy mutex and condition variables for this subquery. */

if ((retval = mutex_destroy(&pexchange->fetch_mutex)) != 0)
    break;

if ((retval = cond_destroy(&pexchange->fetch_cond)) != 0)
    break;


break;


case QDBB_REQ_NEXT:

TTRACE(("exchange: NEXT\n"))

/* If query is INSERT/SELECT without aggregation, then
 * request NEXT means mplex wants to find out whether this
 * thread is finished with its insert and ready to commit,
 * or threads have already been requested to COMMIT or ROLLBACK
 * and mplex wants to know whether they're done.
 * All we have to do on the parent side here is check the
 * state, returning ERROR if state is ERROR, or EOD if state
 * is EOD (meaning child is done with inserts), or READY if
 * state is READY (meaning child is done with requested COMMIT
 * or ROLLBACK, or else PENDING meaning not ready yet.
 */
if ((pexchange->hdr.flags & QDBB_FSQ_INSERT_SELECT)
    && QD_2_phase_commit)
{
    if (pexchange->hdr.state & QDBB_STATE_ERROR)
        retval = QDBB_REPLY_ERROR;
    else if (pexchange->hdr.state & QDBB_STATE_EOD)
        retval = QDBB_REPLY_EOD;
    else if (pexchange->hdr.state == QDBB_STATE_READY)
        retval = QDBB_REPLY_READY;
    else
        retval = QDBB_REPLY_PENDING;
    break;
```

```
}
#if 0 /* NO. Don't return EOD until we return all the buffers we already
       * got.  Producer may have gotten ahead of consumer, and already
       * set EOD while there are still buffers for the consumer to read.
       */
        if (pexchange->hdr.state & QDBB_STATE_EOD)
        {
#ifdef QDDEBUG_ARRAYFETCH
            printf("Exchange consumer1 %d: counter: %d\n", child,
                   consumer_counter[child]);
#endif /* QDDEBUG_ARRAYFETCH */

            TTRACE(("exchange: EOD\n"))
            retval = QDBB_REPLY_EOD;
            break;
        }
#endif /* 0 */

        /* Don't read a buffer until it has been filled.         */
        /* Look ahead to see if producer is still writing to it  */
        /* or has stopped because of some condition.             */

        TTRACE(("exchange: nbuffers=%d\n", pexchange->nbuffers))
        TTRACE(("exchange: cbuf=%d, pbuf=%d, NEXTBUF(CBUF)=%d\n",
                CBUF, PBUF, NEXTBUF(CBUF)))

        if (NEXTBUF(CBUF) == PBUF)
        {
            if (pexchange->hdr.state & QDBB_STATE_EOD)
            {
#ifdef QDDEBUG_ARRAYFETCH
            printf("Exchange consumer2 %d: counter: %d\n", child,
                   consumer_counter[child]);
#endif /* QDDEBUG_ARRAYFETCH */

                TTRACE(("exchange: EOD\n"))
                retval = QDBB_REPLY_EOD;
            }
            else
                if (pexchange->hdr.state & QDBB_STATE_ERROR)
                {
                    TTRACE(("exchange: ERROR\n"))
                    retval = QDBB_REPLY_ERROR;
                }
                else
                {
                    TTRACE(("exchange: PENDING\n"))
                    retval = QDBB_REPLY_PENDING;
                }
        }
        else
        {
            CBUF = NEXTBUF(CBUF);

            /* Look behind to see if producer was blocked by all the */
            /* fetch-ahead buffers being full. If so, unblock it.    */
            /* We need to do this in a critical section to insure    */
            /* that the signal doesn't occur before the wait. If it  */
            /* did, the producer would never wake up.                */

            TTRACE(("exchange: cbuf=%d, PREVBUF(CBUF)=%d, pbuf=%d\n",
                    CBUF, PREVBUF(CBUF), PBUF))
            if (PREVBUF(CBUF) == PBUF)
            {
                TTRACE(("exchange: producer was blocked\n"))
                TTRACE(("exchange: locking fetch mutex\n"))
                pthread_mutex_lock(&pexchange->fetch_mutex);
                TTRACE(("exchange: signalling fetch cond\n"))
                pthread_cond_signal(&pexchange->fetch_cond);
                pthread_mutex_unlock(&pexchange->fetch_mutex);
                TTRACE(("exchange: fetch mutex unlocked\n"))
            }
```

33

```
        /* Put the ready buffer number somewhere for mplex to see. */

        pbtt[pexchange->out_bufnum] = pexchange->btt[CBUF];
        TTRACE(("exchange: out_bufnum=%d, pbtt[out_bufnum]=%08lx\n",
                pexchange->out_bufnum, pbtt[pexchange->out_bufnum]))

#ifdef QDDEBUG
        /* If debugging, display address and contents of buffer. */
        if (QD_display_exec2)
        {
            int i;
            struct SQLDA desc;
            text outbuf[100];

            printf("Exchange %d pbtt[%d]: %08lx\n",
                    child, pexchange->out_bufnum,
                    pbtt[pexchange->out_bufnum]);
            memcpy(&desc, pexchange->pchild->subcur.ppsq_select_desc,
                    sizeof(desc));
            desc.V = (text **)(pbtt[pexchange->out_bufnum]);
            desc.I = (short **)(desc.V +
                                        desc.N);
            for (i = 0; i < desc.N; i++)
            {
                if (desc.I[i] != NULL &&
                    *(desc.I[i]) == -1)
                    printf("  <NULL>\n");
                else
                {
                    switch (desc.T[i])
                    {
                      case DTYCHR:
                        strncpy(outbuf, desc.V[i],
                                desc.L[i]);
                        outbuf[desc.L[i]] = 0;
                        printf("  %s\n", outbuf);
                        break;
                      case DTYINT:
                        printf("  %d\n", *((int *)
                                        (desc.V[i])));
                        break;
                      case DTYFLT:
                        printf("  %f\n", *((QD_WIDEST_FLOAT *)
                                        (desc.V[i])));
                        break;
                    } /* switch */
                }
            } /* for... */
        } /* if QD_display_exec2 */
#endif /* QDDEBUG */

#ifdef QDDEBUG_ARRAYFETCH
        consumer_counter[child]++;
#endif /* QDDEBUG_ARRAYFETCH */

        retval = QDBB_REPLY_READY;
      }
      break;

/*  Not sure what, if anything, needs to be done here.             */
/*
    case QDBB_REQ_CLEANUP:

      pexchange->ppcursor->request = QDBB_REQ_CLEANUP;
      break;
*/
  }

return_reply:
  QDEND;
  return retval;
```

```
} /* qdbb_exchange */
```

4

34

```
/*****************************************************************************
 * qdbb_exchange_producer - producer portion of EXCHANGE qd building block
 *
 * Copyright (c) 1991 Kendall Square Research Corporation as an unpublished
 * work. All rights reserved. The information contained herein is the
 * confidential property of Kendall Square Research Corporation. Use,
 * copying, transfer or disclosure is prohibited without express written
 * agreement with Kendall Square Research Corporation.
 *****************************************************************************
 * REV  DATE      AUTHOR  DESCRIPTION
 * ---  --------  ------  ----------------------------------------------------
 * %00  11/19/91  DW      Initial Version
 *****************************************************************************
 */
/* Communicate desired processor number to ORACLE, so bind can occur
 * between fork and exec
 */
__private word KSR_bind_cell;

static QDBB_REPLY qdbb_exchange_producer(pexchange)
QDBB_EXCHANGE *pexchange;
{
    QDSTATUS retval;
    pthread_barrier_t *pex_barrier;
    word child;
    word req;
    __private extern bool KSR_qd_enabled;
    extern bool QD_bind_threads;
    extern word QD_num_bind_cells;
    bool opened = FALSE;
    bool committed_or_rolled_back_already = FALSE;

    QDBEGIN("qdbb_exchange_producer");

#ifdef QDDEBUG_ARRAYFETCH
    producer_counter = 0;
#endif /* QDDEBUG_ARRAYFETCH */

    /* Make sure upi calls in this thread don't try to decompose themselves. */
    KSR_qd_enabled = FALSE;

    child = pexchange->child_num;
    pex_barrier = &pexchange->ppcursor->ex_barrier;

    /* Bind threads to cells */
    if (QD_bind_threads)
    {
        if (QD_num_bind_cells)
            KSR_bind_cell = (child % QD_num_bind_cells) + 2;
        else
            KSR_bind_cell = child + 1;
        pmm_init();
        retval = pmm_bindself(KSR_bind_cell);
        if (retval)
            printf("exchange_producer %d: bind to cell %d failed, errno %d\n",
                   child, KSR_bind_cell, errno);
        else printf("exchange_producer %d: bound to cell %d\n",
                   child, KSR_bind_cell);
        TTRACE(("exchange_producer: bindself status %d\n", retval))
        retval = pmm_mypset();
        TTRACE(("exchange_producer: pset for child %d: %d\n", child, retval))
    }
    else
        KSR_bind_cell = 0;

    while(TRUE)
    {
        if ((pexchange->hdr.state & QDBB_STATE_EOD) ||
            (pexchange->hdr.state & QDBB_STATE_ERROR))
        {
            TTRACE(("exchange_producer: hdr.state=%04x\n",
                pexchange->hdr.state))
            TTRACE(("exchange_producer: Encountered EOD or ERROR state.\n"))

            /* Set global request to CLOSE, if an error has been
             * encountered.
             */
            if (pexchange->hdr.state & QDBB_STATE_ERROR)
                pexchange->ppcursor->request = QDBB_REQ_CLOSE;
            pexchange->hdr.state &= ~QDBB_STATE_THREAD_CREATED;
            TTRACE(("exchange_producer: hdr.state=%04x\n",
                pexchange->hdr.state))
/*  This should be done by CLOSE - DW
            TTRACE(("            Terminating thread\n"));
            qd_thread_exit();
*/
        }

        /* If this thread is done, close it up without affecting other
         * threads. Otherwise obey request from above. Don't do this
         * if query is INSERT/SELECT without aggregation.
         */
        if ((pexchange->hdr.state & QDBB_STATE_EOD) &&
            (!(pexchange->hdr.flags & QDBB_PSQ_INSERT_SELECT)
             || !QD_2_phase_commit))
            req = QDBB_REQ_CLOSE;
        else
            req = pexchange->ppcursor->request;

        /* If this thread has already opened, go ahead and start fetching,
         * unless environment variable KSR_NO_EARLY_FETCH was set,
         * or unless query is INSERT/SELECT without aggregation.
         */
        if (!QD_no_early_fetch && req == QDBB_REQ_OPEN && opened
            && (!(pexchange->hdr.flags & QDBB_PSQ_INSERT_SELECT)
                || !QD_2_phase_commit))
            req = QDBB_REQ_NEXT;

/*      switch(pexchange->ppcursor->request); */
        switch(req)                       /* Local request takes precedence. */
        {
          case QDBB_REQ_OPEN:
            if (opened)
                break;
            TTRACE(("exchange_producer: OPEN\n"))

            TTRACE(("exchange_producer: hdr.flags=%x\n", pexchange->hdr.flags))

            if (pexchange->hdr.flags & QDBB_SLAVE_WAIT_OPEN)
            {
                TTRACE(("exchange_producer: slave checkin\n"))
                if ((retval = barrier_checkin(pex_barrier, child)) != 0)
                    break;
                TTRACE(("exchange_producer: slave checkin complete\n"))
            }
#ifdef SINGLE_THREAD_CONNECTS

            /* Since each thread does its own fork(), single-thread them   */
            /* to avoid the deadlock that occurs when they are all done    */
            /* at the same time.                                           */

            /* This isn't being used now because the connects are         */
            /* single-threaded by doing them serially before creating     */
            /* any more threads.  When we are allowed to create threads   */
            /* before connections, this code might still be useful for    */
            /* single-threading the connections.                          */

            TTRACE(("exchange_producer: try to get connect mutex\n"))
            pthread_mutex_lock(&connect_mutex);
            TTRACE(("exchange_producer: got connect mutex\n"))
#endif

            /* Call child (subcur) to do the OPEN.   */
```

5

35

```
        /* Return the error returned from child. */
        /* Set state appropriately.              */

        /* Set connection number to run the proper executable.        */
        /* This can be removed when we can run an unlimited number of */
        /* copies of the same executable.                             */

        KSR_cnx_number = pexchange->child_num;
        TTRACE(("exchange_producer: KSR_cnx_number=%d\n", KSR_cnx_number))

        TTRACE(("exchange_producer: calling subcur\n"))
        retval = (*(pexchange->pchild->hdr.pfunc))
                                        (pexchange->pchild,
                                         QDBB_REQ_OPEN,
                                         pexchange->btt);

#ifdef SINGLE_THREAD_CONNECTS

        /* Allow other threads to attempt fork/connect now.           */

        pthread_mutex_unlock(&connect_mutex);
        TTRACE(("exchange_producer: freed connect mutex\n"))
#endif

        if (retval)
            pexchange->hdr.state |= QDBB_STATE_ERROR;
        else
        {
            opened = TRUE;

            /* If query is INSERT/SELECT, just pull subcur once
             * more for NEXT to get it to do the insert (which should
             * return EOD), then set state to EOD, and we'll loop
             * waiting for COMMIT or ROLLBACK request.
             */
            if ((pexchange->hdr.flags & QDBB_PSQ_INSERT_SELECT)
                && QD_2_phase_commit)
            {
                retval = (*(pexchange->pchild->hdr.pfunc))
                                        (pexchange->pchild,
                                         QDBB_REQ_NEXT,
                                         pexchange->btt);
                if (retval != QDBB_REPLY_EOD)
                    pexchange->hdr.state |= QDBB_STATE_ERROR;
                else
                    pexchange->hdr.state |= QDBB_STATE_EOD;
            }
        }
        if (pexchange->hdr.flags & QDBB_SLAVE_WAIT_OPEN)
        {
            TTRACE(("exchange_producer: slave checkout\n"))
            if ((retval = barrier_checkout(pex_barrier, child)) != 0)
                break;
            TTRACE(("exchange_producer: slave checkout complete\n"))
        }

        break;

      case QDBB_REQ_COMMIT:
      case QDBB_REQ_ROLLBACK:
        /* Pass COMMIT or ROLLBACK request along to child.
         * This is part of pseudo-2-phase-commit protocol for
         * INSERT/SELECT.
         */
        if (!committed_or_rolled_back_already)
        {
            retval = (*(pexchange->pchild->hdr.pfunc))
                (pexchange->pchild, req, pexchange->btt);

            /*xxx We should probably have a better way of passing
             * actual errors up from here.
             */
            if (retval != QDBB_REPLY_READY)
                pexchange->hdr.state = QDBB_STATE_ERROR;
            else
                pexchange->hdr.state = QDBB_STATE_READY;

            committed_or_rolled_back_already = TRUE;
        }
        break;

      case QDBB_REQ_CLOSE:

        TTRACE(("exchange_producer: CLOSE\n"))

        TTRACE(("exchange_producer: hdr.flags=%x\n", pexchange->hdr.flags))
        if (pexchange->hdr.flags & QDBB_SLAVE_WAIT_CLOSE)
        {
            TTRACE(("exchange_producer: slave checkin\n"))
            if ((retval = barrier_checkin(pex_barrier, child)) != 0)
                break;
            TTRACE(("exchange_producer: slave checkin complete\n"))
        }

        /* Call child (subcur) to do the CLOSE (if the child has
         * already been called to OPEN).
         * Return the error returned from child.
         * Set state appropriately, probablt to EMPTY.
         */
        if (opened)
        {
            TTRACE(("exchange_producer: calling subcur\n"))
                retval = (*(pexchange->pchild->hdr.pfunc))
                                        (pexchange->pchild,
                                         QDBB_REQ_CLOSE,
                                         pexchange->btt);
        }
        if (pexchange->hdr.flags & QDBB_SLAVE_WAIT_CLOSE)
        {
            TTRACE(("exchange_producer: slave checkout\n"))
            retval = barrier_checkout(pex_barrier, child);  /* Don't care
                whether this succeeds. We're about to terminate anyway. */
            TTRACE(("exchange_producer: slave checkout complete\n"))
        }
        TTRACE(("Terminating thread\n"));
        if ((retval = qd_thread_exit()) != 0) /* should never return */
            return retval;                   /* last resort */

        break;

      case QDBB_REQ_NEXT:

        TTRACE(("exchange_producer: NEXT\n"))

        /* Print message if env var KSR_NO_EARLY_FETCH was set to
         * the value "verbose".
         */
        if (QD_no_early_fetch_verbose)
            printf("Parallel subquery %d now beginning fetching.\n",
                    child);

        TTRACE(("exchange_producer: cbuf=%d, pbuf=%d\n", CBUF, PBUF))
        if (PBUF == CBUF)
        {
            TTRACE(("exchange_producer: locking fetch mutex\n"))
            pthread_mutex_lock(&pexchange->fetch_mutex);
            if (PBUF == CBUF)
            {
                TTRACE(("exchange_producer: waiting on fetch cond\n"))
                pthread_cond_wait(&pexchange->fetch_cond,
                                  &pexchange->fetch_mutex);
                TTRACE(("exchange_producer: done waiting on fetch cond\n"))
            }
            pthread_mutex_unlock(&pexchange->fetch_mutex);
            TTRACE(("exchange_producer: fetch mutex unlocked\n"))
```

```
        }

        /* Fetch the next row */
        TTRACE(("exchange_producer: calling subcur\n"))
        retval = (*(pexchange->pchild->hdr.pfunc))
                                         (pexchange->pchild,
                                          QDBB_REQ_NEXT,
                                          &pexchange->btt[PBUF]);
        if (retval == QDBB_REPLY_EOD)
        {
#ifdef QDDEBUG_ARRAYFETCH
            printf("Exchange producer %d: counter: %d\n", child,
                   producer_counter);
#endif /* QDDEBUG_ARRAYFETCH */
            TTRACE(("exchange_producer: EOD\n"))
            pexchange->hdr.state |= QDBB_STATE_EOD;
            break;
        }

        if (retval == QDBB_REPLY_ERROR)
        {
            TTRACE(("exchange_producer: ERROR\n"))
            pexchange->hdr.state |= QDBB_STATE_ERROR;
            break;
        }
#ifdef QDDEBUG_ARRAYFETCH
        producer_counter++;
#endif /* QDDEBUG_ARRAYFETCH */

        /* Advance the producer's buffer */
        PBUF = NEXTBUF(PBUF);
        TTRACE(("exchange_producer: pbuf=%d\n", PBUF))
        break;


      default:
        printf("exchange_producer: Unknown request, %d\n",
               req);

        break;
      }
    }
}

/*****************************************************************************/
/*                    VARIOUS PTHREAD UTILITY FUNCTIONS                      */
/*****************************************************************************/

static QDBB_REPLY barrier_init(pbarrier, attr, members)
pthread_barrier_t *pbarrier;
pthread_barrierattr_t attr;
int members;
{
    if (pthread_barrier_init(pbarrier, attr, members) != 0)
    {
#ifdef PRINT_ERRORS
        printf("exchange: pthread_barrier_init failed, members=%d, error=%d\n",
               members, errno);
#endif
        return QDBB_REPLY_ERROR;
    }
}

static QDBB_REPLY barrier_destroy(pbarrier)
pthread_barrier_t *pbarrier;
{
    if (pthread_barrier_destroy(pbarrier) != 0)
    {
#ifdef PRINT_ERRORS
        printf("exchange: pthread_barrier_destroy failed, error=%d\n",
               errno);
#endif
        return QDBB_REPLY_ERROR;
    }
}

static QDBB_REPLY barrier_checkin(pbarrier, thread)
pthread_barrier_t *pbarrier;
word thread;
{
    if (pthread_barrier_checkin(pbarrier, thread) != 0)
    {
#ifdef PRINT_ERRORS
        printf("exchange: pthread_barrier_checkin failed,"
               " thread=%d, error=%d\n", thread, errno);
#endif
        return QDBB_REPLY_ERROR;
    }
}

static QDBB_REPLY barrier_checkout(pbarrier, thread)
pthread_barrier_t *pbarrier;
word thread;
{
    if (pthread_barrier_checkout(pbarrier, thread) != 0)
    {
#ifdef PRINT_ERRORS
        printf("exchange: pthread_barrier_checkout failed,"
               " thread=%d, error=%d\n", thread, errno);
#endif
        return QDBB_REPLY_ERROR;
    }
}

static QDBB_REPLY qd_thread_create(pthread_id, attr, proc, parm)
pthread_t *pthread_id;
pthread_attr_t attr;
void *(*proc)();
void *parm;
{
    if (pthread_create(pthread_id, attr, proc, parm) != 0)
    {
#ifdef PRINT_ERRORS
        printf("exchange: pthread_create failed, error=%d,parm=%d\n",
               errno, *(int *)parm);
#endif
        return QDBB_REPLY_ERROR;
    }
}

static QDBB_REPLY qd_thread_exit()
{
    word retval;
    pthread_exit(&retval);         /* should never return */
    return retval;                 /* last resort         */
}

static QDBB_REPLY mutex_init(pmutex, attr)
pthread_mutex_t *pmutex;
pthread_mutexattr_t attr;
{
    if (pthread_mutex_init(pmutex, attr) != 0)
    {
#ifdef PRINT_ERRORS
        printf("exchange: pthread_mutex_init failed, error=%d\n", errno);
#endif
        return QDBB_REPLY_ERROR;
    }
}
```

```
static QDBB_REPLY cond_init(pcond, attr)
pthread_cond_t *pcond;
pthread_condattr_t attr;
{
    if (pthread_cond_init(pcond, attr) != 0)
      {
#ifdef PRINT_ERRORS
        printf("exchange: pthread_cond_init failed, error=%d\n", errno);
#endif
        return QDBB_REPLY_ERROR;
      }
}

static QDBB_REPLY mutex_destroy(pmutex)
pthread_mutex_t *pmutex;
{
    if (pthread_mutex_destroy(pmutex) != 0)
      {
#ifdef PRINT_ERRORS
        printf("exchange: pthread_mutex_destroy failed, error=%d\n", errno);
#endif
        return QDBB_REPLY_ERROR;
      }
}

static QDBB_REPLY cond_destroy(pcond)
pthread_cond_t *pcond;
{
    if (pthread_cond_destroy(pcond) != 0)
      {
#ifdef PRINT_ERRORS
        printf("exchange: pthread_cond_destroy failed, error=%d\n", errno);
#endif
        return QDBB_REPLY_ERROR;
      }
}
```

8

38

```
/*****************************************************************************
 * pupibdd.c - QD Parallel UPI version of routines from upibdd.c
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   ------------------------------------------------
 * %06   10/12/93  NYT      In 7.0.12, decompose query w/ bind variables
 * %05   05/17/93  JMM      Upgrade to ORACLE 7.0.12
 * %04   10/15/92  NYT      Allow for any placement of rowid bind vars
 * %03   09/29/92  NYT      Use QD bind descriptor for DESCRIBE BIND
 * %02   09/29/92  NYT      Bugfix: clear ubd structure
 * %01   09/25/92  NYT      Decompose query with bind variables
 * %00   12/03/91  JM       Initial Version
 *****************************************************************************
*/
#define QDMODEBUG 1
#ifndef QDSTD
#include <qdstd.h>
#endif
#ifndef QDPUEXT
#include <qdpuext.h>
#endif


#ifndef S
#include <s.h>
#endif
#ifndef HSTDEF
#include    <hstdef.h>
#endif
#ifndef SQLDEF
#include    <sqldef.h>
#endif
#ifndef OPIDEF
#include    <opidef.h>
#endif
#ifndef GENDEF
#include    <gendef.h>
#endif
#ifndef TIDDEF
#include    <tiddef.h>
#endif
#ifndef RIDDEF
#include    <riddef.h>
#endif
#ifndef OERDEF
#include    <oerdef.h>
#endif
#ifndef UPIDEF
#include    <upidef.h>
#endif
#ifndef UACDEF
#include <uacdef.h>
#endif
#ifndef UCADEF
#include <ucadef.h>
#endif
#ifndef OACDEF
#include <oacdef.h>
#endif
#ifndef UPIDEF
#include    <upidef.h>
#endif
#ifndef DTYDEF
#include <dtydef.h>
#endif
#include <string.h>
#ifndef SPARAMS
#include   <sparams.h>
#endif
#ifndef ARIDEF
#include <aridef.h>
#endif
#ifndef BDL
#include <bdl.h>
#endif
#ifndef KPU
#include <kpu.h>
#endif
#ifndef KPUM
#include <kpum.h>
#endif
#ifndef XP6DEF
#include <kp6def.h>
#endif
#ifndef KPG
#include <kpg.h>
#endif
/* KSR: need sqlda for def of ppcur->select_desc */
#include <sqlda.h>


word      upibnl(hst, cnum, bindn)
hstdef      *hst;
word        cnum;
word       bindn;
{
   return(upibnn(hst, cnum, bindn, (ptr_t) 0, 0, SQLT_CHR,
                 NULLP(text), 0, 0));
}




word      upibnn(hst, cnumber, varnum, bfa, bfl, dtype, fmt, fmtl, fmtt)
hstdef   *hst;
word      cnumber;
word      varnum;
ptr_t     bfa;
size_t    bfl;
word      dtype;
text     *fmt;
size_t    fmtl;
word      fmtt;
{

  SETUPI(hst);

  /***************************************************************************
   * KSR-specific code begins here
   ***************************************************************************
   */                                                                 /*+%01*/
  if (KSR_qd_enabled)
  {
      reg1 QDPCURSOR *ppcur;

      QDBEGIN("pupibnn");
      ppcur = qdpu_getpcur(hst, cnumber);

      /* Has specified cursor been decomposed? */
      if (ppcur != NULL)
      {
          reg2 word pos;

          /* Don't decompose queries inside this call */
          KSR_qd_enabled = FALSE;
```

39

```
        /* Set position in bind arrays */
        if (varnum <= ppcur->rowid_posit)                         /*+%04*/
            pos = varnum - 1;
        else
            /* If variable position greater than the rowid bind */
            /* variables, skip 2 places */
            pos = varnum + 1;

        ppcur->pbind_desc->V[pos] = bfa;
        ppcur->pbind_desc->L[pos] = bfl;
        ppcur->pbind_desc->T[pos] = dtype;                        /*-%04*/

        KSR_qd_enabled = TRUE;
        QDEND;
        return(hst->hstoer.oerrcd = 0);
    } /* if (ppcur != NULL) */
    QDEND;
}
/****************************************************************************
 * KSR-specific code ends here
 ****************************************************************************
*/                                                                  /*-%01*/

if (HSTKPU(hst))
{
  kpucx *ctx;
  kpuuc *vptr;

  HSTASCON(hst);
  HSTASEXT(hst);
  if ((ctx=kpugc(hst,cnumber)) == (kpucx *)0)
    return(HSTSOER(hst,OER(1023)));

  if ((vptr = kpugbncx(ctx,varnum))  == (kpuuc *)0)
    return(HSTSOER(hst,OER(1036)));

  return(kpusvar(hst,ctx,vptr,UACOBBV,
                 bfa, bfl, dtype, NULLP(b2),
                 NULLP(ub2), NULLP(ub2), NULLP(ub4), (ub4) 0, fmt, fmtl));
}
else
  return(kp6bnn(hst,cnumber,varnum,bfa,bfl,dtype,fmt,fmtl,fmtt));
}


word    upibnv(hst, cnumber, vara, varl, bfa, bfl, dtype, fmt, fmtl, fmtt)
hstdef  *hst;
word    cnumber;
text    *vara;
size_t  varl;
ptr_t   bfa;
size_t  bfl;
word    dtype;
text    *fmt;
size_t  fmtl;
word    fmtt;
{
  SETUPI(hst);

  if (varl == (size_t)-1) varl = (size_t)strlen((char *)vara);
  if (HSTKPU(hst))
  {
    kpucx *ctx;
    kpuuc *vptr;

    HSTASCON(hst);
    HSTASEXT(hst);

    if ((ctx=kpugc(hst,cnumber)) == (kpucx *)0)
      return(HSTSOER(hst,OER(1023)));
    if ((vptr = kpugbccx(ctx,vara,(word)varl))  == (kpuuc *)0)
      return(HSTSOER(hst,OER(1036)));
    return(kpusvar(hst,ctx,vptr,UACOBBV, bfa,
                   bfl, dtype, NULLP(b2), NULLP(ub2), NULLP(ub2),
                   NULLP(ub4), (ub4) 0, fmt, fmtl));
  }
  else
    return(kp6bnv(hst,cnumber,vara,varl,bfa,bfl,dtype,fmt,fmtl,fmtt));
}


word    upibrn(hst, cn, vnum, bfa, bfl, dtype, indp, fmt, fmtl, fmtt)
     hstdef   *hst;
     word      cn;
     word      vnum;
     ptr_t     bfa;
     size_t    bfl;
     word      dtype;
     b2       *indp;
     text     *fmt;
     size_t    fmtl;
     word      fmtt;
{
  SETUPI(hst);

  if (HSTKPU(hst))
  {
    kpucx *ctx;
    kpuuc *vptr;

    HSTASCON(hst);
    HSTASEXT(hst);

    if ((ctx=kpugc(hst,cn)) == (kpucx *)0)
      return(HSTSOER(hst,OER(1023)));
    if ((vptr = kpugbncx(ctx,vnum))  == (kpuuc *)0)
      return(HSTSOER(hst,OER(1036)));
    return(kpusvar(hst,ctx,vptr, UACOBBR,
                   bfa, bfl, dtype, indp, NULLP(ub2),
                   NULLP(ub2), NULLP(ub4), (ub4) 0, fmt, fmtl));
  }
  else
   return(kp6brn(hst, cn, vnum, bfa, bfl, dtype, indp, fmt, fmtl, fmtt));
}


word    upibrv(hst, cn, vnam, vlen, bfa, bfl, dtype, indp, fmt, fmtl, fmtt)
hstdef  *hst;
word     cn;
text    *vnam;
size_t   vlen;
ptr_t    bfa;
size_t   bfl;
word     dtype;
b2      *indp;
text    *fmt;
size_t   fmtl;
word     fmtt;
{
```

```
SETUPI(hst);

if (vlen == (size_t)-1) vlen = (size_t)strlen((char *)vnam);
if (HSTKPU(hst))
{
  kpucx *ctx;
  kpuuc *vptr;

  HSTASCON(hst);
  HSTASEXT(hst);


  if ((ctx=kpugc(hst,cn)) == (kpucx *)0)
    return(HSTSOER(hst,OER(1023)));
  if ((vptr = kpugbccx(ctx,vnam,(word)vlen))  == (kpuuc *)0)
    return(HSTSOER(hst,OER(1036)));
  return(kpusvar(hst,ctx,vptr,UACOBBR, bfa, bfl,
                dtype, indp, NULLP(ub2), NULLP(ub2), NULLP(ub4),
                (ub4) 0, fmt, fmtl));
}
else
  return(kp6brv(hst,cn,vnam,vlen,bfa,bfl,dtype,indp, (ub2 *)0,
         (ub2 *)0, (ub4)0, (ub4 *)0, fmt,fmtl,fmtt));
}




word     upibrp(hst, cn, pos, bfa, bfl, dtype, indp, fmt, fmtl)
hstdef   *hst;
word       cn;
word       pos;
ptr_t     bfa;
size_t     bfl;
word       dtype;
b2        *indp;
text      *fmt;
size_t     fmtl;
{
  SETUPI(hst);

  /************************************************************************
   * KSR-specific code begins here
   ************************************************************************
  */                                                              /*+%06*/
  if (KSR_qd_enabled)
  {
     reg1 QDPCURSOR *ppcur;

     QDBEGIN("pupibrp");
     ppcur = qdpu_getpcur(hst, cn);

     /* Has specified cursor been decomposed? */
     if (ppcur != NULL)
     {
        reg2 word posit;

        /* Don't decompose queries inside this call */
        KSR_qd_enabled = FALSE;

        /* Set position in bind arrays */
        if (pos <= ppcur->rowid_posit)
           posit = pos - 1;
        else
           /* If variable position greater than the rowid bind */
           /* variables, skip 2 places */
           posit = pos + 1;

        ppcur->pbind_desc->V[posit] = bfa;
        ppcur->pbind_desc->L[posit] = bfl;
        ppcur->pbind_desc->T[posit] = dtype;

        KSR_qd_enabled = TRUE;
        QDEND;
        return(hst->hstoer.oerrcd = 0);
     } /* if (ppcur != NULL) */
     QDEND;
  }
  /************************************************************************
   * KSR-specific code ends here
   ************************************************************************
  */                                                              /*-%06*/

  if (HSTKPU(hst))
  {
    kpucx *ctx;
    kpuuc *vptr;


    HSTASCON(hst);
    HSTASEXT(hst);

    if ((ctx=kpugc(hst,cn)) == (kpucx *)0)
      return(HSTSOER(hst,OER(1023)));
    if (pos > ctx->kpucxnbnd) return(HSTSOER(hst,OER(1036)));


    for (vptr=ctx->kpucxbnd,--pos; pos; vptr = (kpuuc *)vptr->kpuucnxt,--pos);
    if (!vptr) return(HSTSOER(hst,OER(1036)));
    return(kpusvar(hst,ctx,vptr,UACOBBR, bfa, bfl,
                  dtype, indp, NULLP(ub2), NULLP(ub2), NULLP(ub4),
                  (ub4) 0, fmt, fmtl));
  }
  else
    return(kp6brp(hst,cn,pos,bfa,bfl,dtype,indp,(ub2 *)0, (ub2 *)0,
           (ub4 )0, (ub4 *)0,fmt,fmtl));
}



word     upibap(hst, cn, pos, bfa, bfl, dtype, indp, aln, rcp, mal ,
                cal, fmt, fmtl)
hstdef   *hst;
word       cn;
word       pos;
ptr_t     bfa;
size_t     bfl;
word       dtype;
b2        *indp;
ub2       *aln;
ub2       *rcp;
ub4        mal;
ub4       *cal;
text      *fmt;
size_t     fmtl;
{
  SETUPI(hst);

  /************************************************************************
   * KSR-specific code begins here
   ************************************************************************
  */                                                              /*+%06*/
  if (KSR_qd_enabled)
  {
     reg1 QDPCURSOR *ppcur;

     QDBEGIN("pupibap");
     ppcur = qdpu_getpcur(hst, cn);

     /* Has specified cursor been decomposed? */
     if (ppcur != NULL)
```

41

```
    {
        reg2 word posit;

        /* Don't decompose queries inside this call */
        KSR_qd_enabled = FALSE;

        /* Set position in bind arrays */
        if (pos <= ppcur->rowid_posit)
            posit = pos - 1;
        else
            /* If variable position greater than the rowid bind */
            /* variables, skip 2 places */
            posit = pos + 1;

        ppcur->pbind_desc->V[posit] = bfa;
        ppcur->pbind_desc->L[posit] = bfl;
        ppcur->pbind_desc->T[posit] = dtype;
        ppcur->pbind_desc->I[posit] = indp;

        KSR_qd_enabled = TRUE;
        QDEND;
        return(hst->hstoer.oerrcd = 0);
    } /* if (ppcur != NULL) */
    QDEND;
  }
/***************************************************************************
 * KSR-specific code ends here
 ***************************************************************************
 */                                                                  /*-806*/

  if (HSTKPU(hst))
  {
    kpucx *ctx;
    kpuuc *vptr;


    HSTASCON(hst);
    HSTASEXT(hst);

    if ((ctx=kpugc(hst,cn)) == (kpucx *)0)
      return(HSTSOER(hst,OER(1023)));
    if (pos > ctx->kpucxnbnd) return(HSTSOER(hst,OER(1036)));


    for (vptr=ctx->kpucxbnd,--pos; pos; vptr = (kpuuc *)vptr->kpuucnxt,--pos);
    if (!vptr) return(HSTSOER(hst,OER(1036)));
    return(kpusvar(hst,ctx,vptr,UACOBBR, bfa, bfl,
                  dtype, indp, aln, rcp, cal,
                  mal, fmt, fmtl));
  }
  else
    return(kp6brp(hst,cn,pos,bfa,bfl,dtype,indp, aln, rcp,
                  mal, cal, fmt, fmtl));
}



word     upibra(hst, cn, vnam, vlen, bfa, bfl, dtype, indp, aln, rcp, mal ,
                cal, fmt, fmtl,fmtt)
hstdef   *hst;
word      cn;
text     *vnam;
size_t    vlen;
ptr_t     bfa;
size_t    bfl;
word      dtype;
b2       *indp;
ub2      *aln;
ub2      *rcp;
ub4       mal;
ub4      *cal;
text     *fmt;
size_t    fmtl;
word      fmtt;
{

  SETUPI(hst);

  if (HSTKPU(hst))
  {
    kpucx *ctx;
    kpuuc *vptr;


    HSTASCON(hst);
    HSTASEXT(hst);

    if ((ctx=kpugc(hst,cn)) == (kpucx *)0)
      return(HSTSOER(hst,OER(1023)));
    if ((vptr = kpugbccx(ctx,vnam,(word)vlen))  == (kpuuc *)0)
      return(HSTSOER(hst,OER(1036)));
    return(kpusvar(hst,ctx,vptr,UACOBBR, bfa, bfl,
                  dtype, indp, aln, rcp, cal,
                  mal, fmt, fmtl));
  }
  else
    return(kp6brv(hst,cn,vnam,vlen,bfa,bfl,dtype,indp, aln, rcp,
                  mal, cal, fmt, fmtl, fmtt));
}



word     upibri(hst, cn, pos, bfa, bfl, dtype, indp, fmt, fmtl)
hstdef   *hst;
word      cn;
word      pos;
ptr_t     bfa;
size_t    bfl;
word      dtype;
b2       *indp;
text     *fmt;
size_t    fmtl;
{

  SETUPI(hst);

  if (HSTKPU(hst))
  {
    kpucx *ctx;
    kpuuc *vptr;


    HSTASCON(hst);
    HSTASEXT(hst);

    if ((ctx=kpugc(hst,cn)) == (kpucx *)0)
      return(HSTSOER(hst,OER(1023)));
    if (pos > ctx->kpucxnbnd) return(HSTSOER(hst,OER(1036)));


    for (vptr=ctx->kpucxbnd,--pos; pos && vptr;
         vptr = (kpuuc *)vptr->kpuucnxt,--pos);
    if (!vptr) return(HSTSOER(hst,OER(1036)));
    return(kpusvar(hst,ctx,vptr,UACOBBR, bfa, bfl,
                  dtype, NULLP(b2), (ub2 *)indp, NULLP(ub2), NULLP(ub4),
                  (ub4) 0, fmt, fmtl));
  }
  else
    return(kp6bri(hst,cn,pos,bfa,bfl,dtype,indp,fmt,fmtl));
}
```

4

42

```
word    upibnc(hst, cursor, nbinds, callp, callc)
        hstdef  *hst;
        word      cursor;
        word      nbinds;
        word    (*callp)(/*_ ubddef *ubd, ptr_t callc _*/);
 reg1   ptr_t     callc;
{

  HSTUPI(hst);
  if (!nbinds) return(HSTSOER(hst,OER(0)));

  /****************************************************************************
   * KSR-specific code begins here
   ****************************************************************************
                                                                    /*+%01*/
  */
  if (KSR_qd_enabled)
  {
      reg6 QDPCURSOR *ppcur;
      reg7 word n;
      reg8 word err;
      ubddef  ubd;                                  /* apiacp interface def */

      QDBEGIN("pupibnc");
      ppcur = qdpu_getpcur(hst, cursor);

      /* Has specified cursor been decomposed? */
      if (ppcur != NULL)
      {
          reg9 word pos;
          /* Don't decompose queries inside this call */
          KSR_qd_enabled = FALSE;

          qdpu_save_sqllib();

          /* For each column, create and fix-up a ubddef, then
           * copy attributes from it to appropriate elements of
           * ppcur->pbind_desc.
          */
          for (n = 0; n < (ppcur->pbind_desc->F-2); n++)
          {
              DISCARD (*callp)(&ubd, callc);

              /* Set position in bind arrays */                 /*+%04*/
              if (n < ppcur->rowid_posit)
                  pos = n;
              else
                  /* If variable position greater than the rowid bind */
                  /* variables, skip 2 places */
                  pos = n+2;

              ppcur->pbind_desc->V[pos] = ubd.ubdbufp;
              ppcur->pbind_desc->L[pos] = ubd.ubdbufl;
              ppcur->pbind_desc->T[pos] = ubd.ubdbuft;
              ppcur->pbind_desc->I[pos] = ubd.ubdindp;              /*-%04*/
          }
          KSR_qd_enabled = TRUE;
          qdpu_restore_sqllib();
          QDEND;
          return(hst->hstoer.oerrcd = 0);
      } /* if (ppcur != NULL) */
      QDEND;
  }
  /****************************************************************************
   * KSR-specific code ends here
   ****************************************************************************
  */                                                                /*-%01*/

  if (HSTXPU(hst))
  {
   ubddef  ubd;
   word    err;
   kpucx *ctx;
   kpuuc *vptr;

   HSTASCON(hst);
   HSTASEXT(hst);

   CLRSTRUCT(ubd);

   if ((ctx = kpugc(hst,cursor)) == (kpucx *)0)
     return(HSTSOER(hst,OER(1023)));


   for(vptr = ctx->kpucxbnd;(nbinds)&&(vptr);
       --nbinds,vptr= (kpuuc *)vptr->kpuucnxt)
   {
     DISCARD (*callp)(&ubd, callc);

     if (err = kpusvar(hst,ctx,vptr,UACOBBR,
                       ubd.ubdbufp,
                       (size_t)ubd.ubdbufl,
                       (word)ubd.ubdbuft,
                       ubd.ubdindp,
                       ubd.ubdrlp,
                       ubd.ubdrcp,
                       NULLP(ub4),
                       (ub4) 0,
                       ubd.ubdfmtp,
                       (size_t)ubd.ubdfmtl))
       return(HSTSOER(hst,err));
   }
  return(HSTSOER(hst,0));
  }
  else
    return(kp6bnc(hst,cursor,nbinds,callp,callc));
}



STATICF word upifb3(/*_ ubddef *ubd, ptr_t callc _*/);

word     upiab3(hst, cursor, size, ap)

    struct hstdef  *hst;
    word      cursor;
    ub4       size;
    uaddef   *ap;

{ return(upibnc(hst, cursor, (word)size, upifb3, (ptr_t)&ap));
  }



STATICF word upifb3(ubd, callc)

reg0 ubddef *ubd;
     ptr_t   callc;

{
  reg2 uaddef **desc = (uaddef **)callc;
  reg1 uaddef *ap = *desc;
  (*desc)++;

               ubd->ubdbufp = ap->uadbufp;
               ubd->ubdbufl = (word)ap->uadbufl;
               ubd->ubdbuft = (ub1)ap->uaddtype;
               ubd->ubdindp = ap->uadindp;
               ubd->ubdfmtp = ap->uadbfmtp;
               ubd->ubdfmtl = (word)ap->uadbfmtl;
```

5

43

```
                ubd->ubdrlp   = ap->uadfclp;
                ubd->ubdmal   = (ub4)0;
                ubd->ubdcal   = (ub4 *)0;
  return(0);
}

STATICF word upifb1(/*_ ubddef *ubd, ptr_t callc _*/);

word    upiab1(hst, cursor, size, ap)

    struct hstdef  *hst;
    word     cursor;
    ub4      size;
    uaddef   *ap;

{ return(upibnc(hst, cursor, (word)size, upifb1, (ptr_t)&ap));
  }



STATICF word upifb1(ubd, callc)
reg0 ubddef *ubd;
     ptr_t   callc;

{
  reg2 uaddef **desc = (uaddef **)callc;
  reg1 uaddef *ap = *desc;
  (*desc)++;

                ubd->ubdbufp = ap->uadbufp;
                ubd->ubdbufl = (word)ap->uadbufl;
                ubd->ubdbuft = (ub1)ap->uaddtype;
                ubd->ubdindp = ap->uadindp;
                ubd->ubdfmtp = ap->uadbfmtp;
                ubd->ubdfmtl = (word)ap->uadbfmtl;
                ubd->ubdrlp   = (ub2 *)0;
                ubd->ubdmal   = (ub4)0;
                ubd->ubdcal   = (ub4 *)0;
  return(0);
}



struct df2def {
  ptr_t     *bufp;
  ub4       *bufl;
  ub2       *buft;
  b2       **indp;
  text     **fmtp;
  ub2       *fmtl;
  ub2      **fclp;
  ub2      **fcrcp;
  };
typedef struct df2def df2def;

STATICF word upifb2(/*_ ubddef *ubd, ptr_t callc _*/);

word upiab2(hst, cursor, size, bufp, buffmtp, bufl, buffmtl, type, indp)
    struct hstdef *hst;
    word  cursor;
    ub4   size;
    text *buffmtp[];
    ub2   buffmtl[];
    ptr_t bufp[];
    ub4   bufl[];
    ub2   type[];
    b2   *indp[];

{ df2def  de;

  de.bufp = bufp;
  de.bufl = bufl;
  de.buft = type;
  de.indp = indp;
  de.fmtp = buffmtp;
  de.fmtl = buffmtl;
  de.fclp    = (ub2 **)0;
  de.fcrcp   = (ub2 **)0;

  return(upibnc(hst, cursor, (word)size, upifb2, (ptr_t)&de));
  }



STATICF word upifb2(ubd, callc)

reg0 ubddef *ubd;
     ptr_t callc;
{
  reg1 df2def *de = (df2def *)callc;

                  ubd->ubdbufp = *(de->bufp)++;
                  ubd->ubdbufl = (word)*(de->bufl)++;
                  ubd->ubdbuft = (ub1)*(de->buft)++;
  if (de->indp)  ubd->ubdindp = *(de->indp)++;
  if (de->fmtp)  ubd->ubdfmtp = *(de->fmtp)++;
  if (de->fmtl)  ubd->ubdfmtl = (word)*(de->fmtl)++;
  return(0);
}



word upigbv(hst, c, n, varp, varl, varrl, indp, indl, indrl, bvtype)
hstdef *hst;
word      c;
word      n;
text   *varp, *indp;
size_t  varl, indl;
ub2    *varrl, *indrl;
ub1    *bvtype;
{
  SETUPI(hst);

  /***************************************************************************
   * KSR-specific code begins here
   ***************************************************************************
   */                                                                 /*+803*/
  if (KSR_qd_enabled)
  {
      reg6 QDPCURSOR *ppcur;
      reg8 word err;

      QDBEGIN("pupigbv");
      ppcur = qdpu_getpcur(hst, c);

      /* Has specified cursor been decomposed? */
      if (ppcur != NULL && ppcur->pbind_desc != NULL)
      {
          reg9 word pos;
          reg10 short len;

          /* If position beyond end of list, */
          /* return OER(1006) (no more variables in bind list */
          /* Don't count rowid values */
          if (n > ppcur->pbind_desc->F-2)
              return(hst->hstoer.oerrcd = OER(1006));
```

44

Dec 13 1993 11:01:17 pupibdd.c Page 13

```
        /* Don't decompose queries inside this call */
        KSR_qd_enabled = FALSE;

        qdpu_save_sqllib();

        /* Set position in bind arrays */                            /*+%04*/
        if (n <= ppcur->rowid_posit)
            pos = n - 1;
        else
            /* If variable position greater than the rowid bind */
            /* variables, skip 2 places */                           /*-%04*/
            pos = n + 1;

        /* Set bind variable name and name length */
        len = ppcur->pbind_desc->C[pos];
        if (varp && varp != (text *)-1)
        {
            memset ((ptr_t)varp, ' ', (size_t)varl);
            memcpy ((ptr_t)varp, ppcur->pbind_desc->S[pos],
                    (varl<len) ? varl : len);
        }
        if (varrl && varrl != (text *)-1)
            *varrl = len;

        /* Set indicator variable name and name length */
        if (ppcur->pbind_desc->Z != NULL)
            len = ppcur->pbind_desc->Z[pos];
        else
            len = 0;
        if (indp && indp != (text *)-1)
        {
            memset ((ptr_t)indp, ' ', (size_t)indl);
            if (ppcur->pbind_desc ->X != NULL)
                if (ppcur->pbind_desc->X[pos] != NULL)
                    memcpy ((ptr_t)indp, ppcur->pbind_desc->X[pos],
                            (indl<len) ? indl : len);
        }
        if (indrl && indrl != (text *)-1)
            *indrl = len;

        /* Set bind variable type */
        if (bvtype && bvtype != (text *)-1)
            *bvtype = ppcur->pbind_desc->T[pos];

        KSR_qd_enabled = TRUE;
        qdpu_restore_sqllib();
        QDEND;
        return(hst->hstoer.oerrcd = 0);
      } /* if (ppcur != NULL) */
      QDEND;
}
/****************************************************************************
 * KSR-specific code ends here
 ****************************************************************************
*/                                                                   /*-%03*/

if (HSTKPU(hst))
{
  kpucx *ctx;
  kpuuc *vptr;

  HSTASCON(hst);
  HSTASEXT(hst);

  if ((ctx = kpugc(hst,c)) == (kpucx *)0) return(HSTSOER(hst,OER(1023)));
  if (n > ctx->kpucxnbnd)
      return(HSTSOER(hst,OER(1006)));
  if (n <= 0)
      return(HSTSOER(hst,OER(1006)));

  vptr = ctx->kpucxbnd;

  while (vptr)
```

Dec 13 1993 11:01:17 pupibdd.c Page 14

```
    {
      if (!bit(vptr->kpuuctyp, KPUUCDUP))
        if (n==1) break;
        else
        {
          vptr = (kpuuc *)vptr->kpuucnxt;
          --n;
        }
      else vptr = (kpuuc *)vptr->kpuucnxt;
    }

    if (!vptr)
        return(HSTSOER(hst,OER(1006)));



    if (indp && (indp != (text *)-1) && (bit(vptr->kpuuctyp,KPUUCIND)))
      return(kp6gbv(hst,c,n,varp,varl,varrl,indp,indl,indrl,bvtype));

    if (varp && (varp != (text *)-1))
    {
      DISCARD memset((ptr_t)varp,' ',(size_t)varl);
      DISCARD memcpy((ptr_t)varp,(ptr_t)(vptr->kpuucnam),
                     (size_t)(varl>vptr->kpuuclen ? vptr->kpuuclen : varl));
      if (varrl) *varrl = (ub2) (varl>vptr->kpuuclen ? vptr->kpuuclen : varl);
    }

    if (indp && (indp != (text *)-1))
      DISCARD memset((ptr_t)indp,' ',(size_t)indl);
    if (indrl) *indrl = (ub2)0;

    return(HSTSOER(hst,0));
  }
  else
    return(kp6gbv(hst,c,n,varp,varl,varrl,indp,indl,indrl,bvtype));
}




word upigbi(hst, c, size, found, ap)
hstdef     *hst;
word       c;
ub4        size;
b4        *found;
reg uaddef *ap;
{
          ub2     nbindv;
  reg     word    err = 0;
  reg     word    i;
          ub1     bvtype;

  SETUPI(hst);
  if (HSTKPU(hst))
  {
    kpucx *ctx;

    HSTASCON(hst);
    HSTASEXT(hst);

    if ((ctx = kpugc(hst,c)) == (kpucx *)0) return(HSTSOER(hst,OER(1023)));
    nbindv = (ub2)ctx->kpucxnbnd;
  }
  else
    err = upihmi(hst, c, NULLP(ub2), NULLP(ub2), &nbindv);
  if (nbindv > size) {
    *found = -((b4) nbindv); nbindv = (ub2)size; }
  else *found = ((b4) nbindv);
  for (i=1; (!err) && (i <= nbindv); i++, ap++)
  {
    err = upigbv(
```

45

```
        hst, c, i,
        ap->uadvnp, (size_t)ap->uadvnmxl, &ap->uadvncul,
        ap->uadinp, (size_t)ap->uadinmxl, &ap->uadincul,
        &bvtype);
    ap->uaddtype = bvtype;
  }
  return(err);
}


word upigb2(hst, c, size, found, vnp, vnmxl, vncul, inp, inmxl, incul, bvtyp)
    hstdef *hst;
    word       c;
    ub4     size;
    b4     *found;
reg text   *vnp[];
reg ub2    vnmxl[];
reg ub2    vncul[];
reg text   *inp[];
reg ub2    inmxl[];
reg ub2    incul[];
reg ub2    bvtyp[];
{
          ub2    nbindv;
  reg     word   err=0;
  reg     word   i;
          ub1    bvtyp1;

  SETUPI(hst);
  if (HSTKPU(hst))
  {
    kpucx *ctx;

    HSTASCON(hst);
    HSTASEXT(hst);

    if ((ctx = kpugc(hst,c)) == (kpucx *)0) return(HSTSOER(hst,OER(1023)));
    nbindv = (ub2) ctx->kpucxnbnd;
  }
  else
    err = upihmi(hst, c, NULLP(ub2), NULLP(ub2), &nbindv);
  if (nbindv > size) {
    *found = -((b4) nbindv); nbindv = (ub2)size; }
  else *found = ((b4) nbindv);
  for (i=1; (err == 0) && (i <= nbindv); i++)
  {
    if (inp)
      err = upigbv(hst, c, i,
        *vnp++, (size_t)*vnmxl++, vncul++,
        *inp++, (size_t)*inmxl++, incul++, &bvtyp1);
    else
      err = upigbv(hst, c, i,
               *vnp++, (size_t)*vnmxl++, vncul++,
               NULLP(text), (size_t) 0, NULLP(ub2), &bvtyp1);
    if (bvtyp) *bvtyp++ = bvtyp1;
  }
  return(err);
}



word     upidfn(hst, cnumber, posit, bfa, bfl, dtype,
                indp, fmt, fmtl, rl, rc, fmtt)
hstdef  *hst;
word     cnumber;
word     posit;
ptr_t    bfa;
size_t   bfl;
word     dtype;
b2      *indp;
```

```
text    *fmt;
size_t   fmtl;
ub2     *rl;
ub2     *rc;
word     fmtt;
{
  word     err;

  SETUPI(hst);

  /***********************************************************************
   * KSR-specific code begins here
   ***********************************************************************
  */
  if (KSR_qd_enabled)
  {
      regl QDPCURSOR *ppcur;

      QDBEGIN("pupidfn");
      ppcur = qdpu_getpcur(hst, cnumber);

      /* Has specified cursor been decomposed? */
      if (ppcur != NULL)
      {
          /* Don't decompose queries inside this call */
          KSR_qd_enabled = FALSE;

          /* NOTE: We need some mechanism here to know which column is
           * being bound, since this routine is called for an individual
           * column.
           */

          ppcur->pselect_desc->V[0] = bfa;
          ppcur->pselect_desc->L[0] = bfl;
          ppcur->pselect_desc->T[0] = dtype;
          ppcur->pselect_desc->I[0] = indp;
          ppcur->plenptrs[0] = rl;

          KSR_qd_enabled = TRUE;
          QDEND;
          return(hst->hstoer.oerrcd = 0);
      } /* if (ppcur != NULL) */
      QDEND;
  }
  /***********************************************************************
   * KSR-specific code ends here
   ***********************************************************************
  */

  if (HSTKPU(hst))
  {
    kpucx *ctx;
    kpuuc *vptr;


    HSTASCON(hst);
    HSTASEXT(hst);

    if ((ctx=kpugc(hst,cnumber)) == (kpucx *)0) return(HSTSOER(hst,OER(1023)));
    if ((vptr=kpugdcx(ctx,posit)) == (kpuuc *)0)
      return(HSTSOER(hst,OER(1019)));

    err = kpusvar(hst,ctx,vptr,UACODFN, bfa, bfl, dtype,
                  indp, rl, rc, NULLP(ub4),
                  (ub4) 0, fmt, fmtl);
    return(HSTSOER(hst,err));
  }
  else
    return(kp6dfn(hst, cnumber, posit, bfa, bfl, dtype,
                  indp, fmt, fmtl, rl, rc, fmtt));
}
```

46

Dec 13 1993 11:01:17 pupibdd.c Page 17

```
word    upidfc(hst, cursor, ncols, callp, callc)
        hstdef  *hst;
        word     cursor;
        word     ncols;
        word    (*callp)(/*_ ubddef *ubd, ptr_t callc _*/);
 reg1   ptr_t    callc;
{

  SETUPI(hst);
  if (!ncols) return(hst->hstoer.oerrcd = 0);

  /*************************************************************************
   * KSR-specific code begins here
   *************************************************************************
  */
  if (KSR_qd_enabled)
  {
      reg6 QDPCURSOR *ppcur;
      reg7 word n;
      reg8 word err;
      ubddef  ubd;                                     /* apiacp interface def */

      QDBEGIN("pupidfc");
      ppcur = qdpu_getpcur(hst, cursor);

      /* Has specified cursor been decomposed? */
      if (ppcur != NULL)
      {
          /* Don't decompose queries inside this call */
          KSR_qd_enabled = FALSE;

          qdpu_save_sqllib();

          memset(&ubd, 0, sizeof(ubddef));                            /*%02*/

          /* For each column, create and fix-up a ubddef, then
           * copy attributes from it to appropriate elements of
           * ppcur->pselect_desc.
          */
          for (n = 0; n < ncols; n++)
          {
              DISCARD (*callp)(&ubd, callc);
#if 0
              if (err = upiacp(UACODFN,
                               ubd.ubdbufp,
                               (size_t)ubd.ubdbufl,
                               (word)ubd.ubdbuft,
                               ubd.ubdindp,
                               ubd.ubdrlp,
                               ubd.ubdrcp,
                               ubd.ubdfmtp,
                               (size_t)ubd.ubdfmtl,
                               o, &uacc, (size_t *)&un))
                  goto ex;
#endif
              ppcur->pselect_desc->V[n] = ubd.ubdbufp;
              ppcur->pselect_desc->L[n] = ubd.ubdbufl;
              ppcur->pselect_desc->T[n] = ubd.ubdbuft;
              ppcur->pselect_desc->I[n] = ubd.ubdindp;
              ppcur->plenptrs[n] = ubd.ubdrlp;
          }
          KSR_qd_enabled = TRUE;
          qdpu_restore_sqllib();
          QDEND;
          return(hst->hstoer.oerrcd = 0);
      } /* if (ppcur != NULL) */
      QDEND;
  }
  /*************************************************************************
   * KSR-specific code ends here
   *************************************************************************
```

Dec 13 1993 11:01:17 pupibdd.c Page 18

```
  */

  if (HSTKPU(hst))
  {
    ubddef ubd;
    word n;
    kpucx *ctx;
    kpuuc *vptr = (kpuuc *)0;
    kpuuc *pvnxt = (kpuuc *)0;
    word   err=0;


    HSTASCON(hst);
    HSTASEXT(hst);

    if ((ctx=kpugc(hst,cursor)) == (kpucx *)0) return(HSTSOER(hst,OER(1023)));

    CLRSTRUCT(ubd);
    for (n = 1; n<=ncols;++n)
    {
      if (!vptr)
        vptr = kpugdcx(ctx,n);
      else
      {
        pvnxt = (kpuuc *)vptr->kpuucnxt;
        if ((pvnxt) && (pvnxt->kpuucvnm == n))
          vptr = pvnxt;
        else
        {
          pvnxt = (kpuuc *)kpumgs(KPUMUC);
          pvnxt->kpuucnxt = vptr->kpuucnxt;
          vptr->kpuucnxt = pvnxt;
          vptr = pvnxt;
          vptr->kpuucvnm = (ub2)n;
          vptr->kpuuctyp = KPUUCDFN;
          vptr->kpuuccwd = KPUUCCVL;
        }
      }
      DISCARD (*callp)(&ubd, callc);
      if (err = kpusvar(hst,ctx,vptr,UACODFN,
                        ubd.ubdbufp,
                        (size_t)ubd.ubdbufl,
                        (word)ubd.ubdbuft,
                        ubd.ubdindp,
                        ubd.ubdrlp,
                        ubd.ubdrcp,
                        NULLP(ub4),
                        (ub4) 0,
                        ubd.ubdfmtp,
                        (size_t)ubd.ubdfmtl))
        return(err);
    }

    if (ctx->kpucxndfn < ncols) ctx->kpucxndfn = ncols;
    return(0);
  }
  else
    return(kp6dfc(hst,cursor.ncols,callp,callc));
}



word     upiadl(hst, cursor, size, desc)

  struct hstdef *hst;
  word     cursor;
  ub4      size;
  uaddef  *desc;

{ return(upidfc(hst, cursor, (word)size, upifdl, (ptr_t)&desc));
  }
```

9

```
word upifd1(ubd, callc)

reg0 ubddef *ubd;
     ptr_t   callc;

{
  reg2 uaddef **desc = (uaddef **)callc;
  reg1 uaddef *ap = *desc;
  (*desc)++;

                ubd->ubdbufp = ap->uadbufp;
                ubd->ubdbufl = (word)ap->uadbufl;
                ubd->ubdbuft = (ub1)ap->uaddtype;
                ubd->ubdindp = ap->uadindp;
                ubd->ubdrcp  = ap->uadfcrcp;
                ubd->ubdrlp  = ap->uadfclp;
                ubd->ubdfmtp = ap->uadbfmtp;
                ubd->ubdfmtl = (word)ap->uadbfmtl;
  return(0);
  }



STATICF word upifd2(/*_ ubddef *ubd, ptr_t callc _*/);

word upiad2(hst, cursor, size,
            bufp, buffmtp, bufl, buffmtl, type, indp, clp, crcp)

   struct hstdef *hst;
   word   cursor;
   word   size;

reg5 ptr_t     bufp[];
reg1 text *buffmtp[];
reg6 ub4       bufl[];
reg2 ub2    buffmtl[];
reg7 ub2       type[];
reg8 b2       *indp[];
reg3 ub2      *clp[];
reg4 ub2      *crcp[];

{ df2def  de;

  de.bufp = bufp;
  de.bufl = bufl;
  de.buft = type;
  de.indp = indp;
  de.fclp = clp;
  de.fcrcp= crcp;
  de.fmtp = buffmtp;
  de.fmtl = buffmtl;

  return(upidfc(hst, cursor, size, upifd2, (ptr_t)&de));
  }



STATICF word upifd2(ubd, callc)

reg0 ubddef *ubd;
     ptr_t callc;
{
  reg1 df2def *de = (df2def *)callc;
```

```
                 ubd->ubdbufp = *(de->bufp)++;
                 ubd->ubdbufl = (word)*(de->bufl)++;
                 ubd->ubdbuft = (ub1)*(de->buft)++;
  if (de->indp)  ubd->ubdindp = *(de->indp)++;
  if (de->fclp)  ubd->ubdrlp  = *(de->fclp)++;
  if (de->fcrcp) ubd->ubdrcp  = *(de->fcrcp)++;
  if (de->fmtp)  ubd->ubdfmtp = *(de->fmtp)++;
  if (de->fmtl)  ubd->ubdfmtl = (word)*(de->fmtl)++;
  return(0);
  }



ub2 upigdl(type, length)
reg0  word  type;
reg1  ub2   length;
{
#define STRSIZ 75
#define LABSIZ 255

  switch (type)
  {
  case DTYRID: return((ub2)RIDCHARL);
  case DTYIDT:
  case DTYDAT: return((ub2)STRSIZ);
  case DTYIJU:
  case DTYNUM: return((ub2)MAXOUTN);
  case DTYBIN: return((ub2)min(UB1MAXVAL, 2*length));
  case DTYOSL: return((ub2)LABSIZ);
  }
  return(length);
}



word   upidec(hst, cursor, callp, callc)
hstdef  *hst;
word     cursor ;
void    (*callp)(/*_ word item, udedef *ude, ptr_t callc _*/);
ptr_t    callc;
{
#define ITEMS 32
  dsadef        dsa;
  udsdef        uds[ITEMS];
  ub2           tit;
  ub2           nit=0;
  text          nmb[ITEMS*M_IDEN];
  ub2           nml;
  size_t        nmls;
  udedef        ude;
  word          err;
  reg word      posit;
  reg text     *namep;
  reg udsdef   *u;
  text         *savepos;
  size_t        chrlft;
  boolean       oldv7;
  struct lihnd  hnd;
  li_langid     lid;

  lid = lihcurrlangid((dvoid *)&hnd);

  SETUPI(hst);
  oldv7 = (boolean) (hst->hstpro < HSTPV7);
  dsa.dsacid   = (eword)cursor;
  dsa.dsapos   = 1;
  dsa.dsarnit  = &tit;
  dsa.dsauds   = uds;
  dsa.dsanude  = ITEMS;
```

45

Dec 13 1993 11:01:17 pupibdd.c Page 21

```
dsa.dsarnuds = &nit;
dsa.dsarmb   = nmb;
dsa.dsarml   = sizeof(nmb);
dsa.dsarnml  = &nml;

 if (HSTKPU(hst))
 {

   reg kpucx *ctx;

   HSTASCON(hst);
   HSTASEXT(hst);


   if ((ctx = kpugc(hst,cursor)) == (kpucx *)0)
     return(HSTSOER(hst,OER(1023)));

   if (bit(ctx->kpucxflg,KPUCXPRS) ||
       !bit(ctx->kpucxlfl,KPULFDDS) && bit(ctx->kpucxflg,KPUCXBND))

     if (err=kpuexe(hst,cursor,ctx)) return(err);
   bis(ctx->kpucxlfl,KPULFDDS);
 }

for (tit = ITEMS; dsa.dsapos <= tit;)
{
  if (err = upirtr(hst, ODSCRARR, (pisdef *)&dsa))
    return(err);
  for (posit = dsa.dsapos, namep = nmb, u = uds, chrlft = (size_t)nml;
       nit; --nit, ++u, ++posit)
  {
    ude.udebufl = (u->udsoac.oacmxl > (ub4)(UB2MAXVAL-1) ?
                    (ub2)(UB2MAXVAL-1) : (ub2)(u->udsoac.oacmxl));
    ude.udedisl = (ub2)upigdl((word)u->udsoac.oacdty,
                              ude.udebufl);
    ude.udebuft = u->udsoac.oacdty;
    ude.udenull = u->udsnul;
    ude.udepre  = u->udsoac.oacdty == DTYNUM ? (ub2)u->udsoac.oacpre :
                                               (ub2)0;
    ude.udescl  = u->udsoac.oacdty == DTYNUM ? (b2)B1VAL(u->udsoac.oacscl) :
                                               (b2)0;
    if (hst->hstpro < HSTPV7)
    {
      ude.udecoll = (ub2)u->udscnl;
      ude.udecoln = (text *)namep;
      namep += u->udscnl;
    }
    else
    {
      savepos = namep;
      namep = kpgdcd(namep, &chrlft, lid, &nmls);
      ude.udecoln = savepos;
      ude.udecoll = (ub2)nmls;
    }
    (*callp)(posit, &ude, callc);
  }
  dsa.dsapos = (eword)posit;
}
return(0);
}



word     upidsc(hst, cnumber, posit, pmxl, pvll,
                perc, podt, pcoln, pcoll,pmxdisl, ppre, pscl, pnul)
         hstdef    *hst;
         word       cnumber;
         word       posit;
         ub2       *pmxl;
         ub2       *pvll;
```

Dec 13 1993 11:01:17 pupibdd.c Page 22

```
         b2        *perc;
         ub1       *podt;
         text      *pcoln;
         ub2       *pcoll;
         ub2       *pmxdisl;
         ub1       *ppre;
         b1        *pscl;
         ub1       *pnul;
{
    word err;
reg1 kpucx *ctx;

   SETUPI(hst);

  /**************************************************************************
   * KSR-specific code begins here
   **************************************************************************
   */
  if (KSR_qd_enabled)
  {
      reg6 QDPCURSOR *ppcur;
      reg8 word err;

      QDBEGIN("pupidsc");
      ppcur = qdpu_getpcur(hst, cnumber);

      /* Has specified cursor been decomposed? */
      if (ppcur != NULL)
      {
          reg9 word pos;

          /* If we are going to let ORACLE describe this column, call
           * upidsc() again with QD disabled; then fix up corresponding
           * column info in QD's select descriptor, which may be used
           * in qdbb_aggr to describe the output variables for the
           * combining query.
           * JM 5/12/93: I wrote the above comment some time ago, but
           * I don't see any evidence of code for "fixing up corresponding
           * column info in QD's select descriptor". Apparently this
           * wasn't necessary? Also, I don't know why I left the empty
           * "if (!err)" block below.
           */
          if (ppcur->flags & QD_PCUR_ORA_DESCRIBE)
          {
              KSR_qd_enabled = FALSE;

              err =  upidsc(hst, cnumber, posit, pmxl, pvll,
                            perc, podt, pcoln, pcoll,pmxdisl, ppre, pscl, pnul);
              if (!err)
              {
              }
              KSR_qd_enabled = TRUE;
              QDEND;
              return(hst->hstoer.oerrcd = err);
          } /* if (ppcur->flags & QD_PCUR_ORA_DESCRIBE) */

          /* If position beyond end of list, */
          /* return OER(1007) (no more variables in select list */
          if (posit > ppcur->pselect_desc->F)
              return(hst->hstoer.oerrcd = OER(1007));

          /* Don't decompose queries inside this call */
          KSR_qd_enabled = FALSE;

          qdpu_save_sqllib();

          /* Position offset by 1 */
          pos = posit - 1;

          if (perc == (b2 *)-1)
              perc = NULLP(b2);
          if (perc != NULL)
              *perc = 0;
```

49

Dec 13 1993 11:01:17 pupibdd.c Page 23

```
        if (podt == (ub1 *)-1)
            podt = NULLP(ub1);
        if (pmxl == (ub2 *)-1)
            pmxl = NULLP(ub2);
        if (ppre == (ub1 *)-1)
            ppre = NULLP(ub1);
        if (pscl == (b1 *)-1)
            pscl = NULLP(b1);
        if (pnul == (ub1 *)-1)
            pnul = NULLP(ub1);

        if (pcoln == (text *)-1)
        {
            pcoln = NULLP(text);
            pcoll = NULLP(ub2);
        }

        if (pcoll == (ub2 *)-1)
            pcoll = NULLP(ub2);

        /* retrieve information from QD select descriptor */
        qdbb_desc_col (ppcur->pselect_desc, pos, podt, pmxl, pcoln,
                       pcoll, ppre, pscl, pnul);

        if (pmxdisl == (ub2 *)-1)
            pmxdisl = NULLP(ub2);
        if (pmxdisl != NULL)
            *pmxdisl = *pmxl;

        KSR_qd_enabled = TRUE;
        qdpu_restore_sqllib();
        QDEND;
        return(hst->hstoer.oerrcd = 0);
      } /* if (ppcur != NULL) */
      QDEND;
  }
  /***************************************************************************
   * KSR-specific code ends here
   ***************************************************************************
  */

   if (HSTKPU(hst))
   {


     HSTASCON(hst);
     HSTASEXT(hst);

     if ((ctx = kpugc(hst,cnumber)) == (kpucx *)0)
       return(HSTSOER(hst,OER(1023)));
     if (pvll || perc)
     {

       if (bit(ctx->kpucxflg,KPUCXPRS) ||
          (bit(ctx->kpucxlfl,KPULFDDS) && bit(ctx->kpucxflg,KPUCXBND))

         if (err=kpuexe(hst,cnumber,ctx)) return(err);
       bis(ctx->kpucxlfl,KPULFDDS);
       return(kp6dsc(hst, cnumber, posit, pmxl, pvll, perc, podt,
                     pcoln, pcoll, pmxdisl, ppre, pscl, pnul));
     }
     return(kpudsc(hst, ctx, cnumber, posit, pmxl,podt,pcoln, pcoll,
                   pmxdisl, ppre, pscl, pnul));
   }
   return (kp6dsc(hst, cnumber, posit, pmxl, pvll, perc, podt,
                  pcoln, pcoll, pmxdisl, ppre, pscl, pnul));
}

static CONST_DATA text upi_describe[] =
"begin sys.dbms_describe.describe_procedure(:object_name,:res1,:res2,\
:overload,:position,:level,:argument,:datatype,:default,:in_out,:length,\
```

Dec 13 1993 11:01:17 pupibdd.c Page 24

```
:precision,:scale,:radix,:spare); end;";


word      upidpr(hst, object_name, object_length, reserved1, reserved1_length,
                 reserved2, reserved2_length, overload, position, level,
                 argument_name, argument_length, datatype, default_supplied,
                 in_out, length, precision, scale, radix, spare, total_elements)
hstdef   *hst;
text     *object_name;
size_t    object_length;
ptr_t     reserved1;
size_t    reserved1_length;
ptr_t     reserved2;
size_t    reserved2_length;
ub2      *overload;
ub2      *position;
ub2      *level;
text    **argument_name;
ub2      *argument_length;
ub2      *datatype;
ub1      *default_supplied;
ub1      *in_out;
ub4      *length;
sb2      *precision;
sb2      *scale;
ub1      *radix;
ub4      *spare;
ub4      *total_elements;
{
  ub4       array_size = *total_elements;
  word      cursor;
  word      err;
  size_t    errbfl;
  ub2       tmperr;

  SETUPI(hst);
  if (err = upiopn(hst, &cursor, -1)) return(err);
  *total_elements = 0;


  if ((err = upiosq(hst, cursor, upi_describe, sizeof(upi_describe)-1)) ||
      (err = upibrp(hst, cursor, 1, (ptr_t)object_name, object_length,
                    DTYCHR, (b2 *)0, (text *)0, (size_t)0)) ||
      (err = upibrp(hst, cursor, 2, (ptr_t)reserved1, reserved1_length,
                    DTYCHR, (b2 *)0, (text *)0, (size_t)0)) ||
      (err = upibrp(hst, cursor, 3, (ptr_t)reserved2, reserved2_length,
                    DTYCHR, (b2 *)0, (text *)0, (size_t)0)) ||
      (err = upibap(hst, cursor, 4, (ptr_t)overload, sizeof(overload[0]),
                    DTYINT, (b2 *)0, (ub2 *)0, (ub2 *)0, array_size,
                    (ub4 *)total_elements, (text *)0, (size_t)0)) ||
      (err = upibap(hst, cursor, 5, (ptr_t)position, sizeof(position[0]),
                    DTYINT, (b2 *)0, (ub2 *)0, (ub2 *)0, array_size,
                    (ub4 *)total_elements, (text *)0, (size_t)0)) ||
      (err = upibap(hst, cursor, 6, (ptr_t)level, sizeof(level[0]),
                    DTYINT, (b2 *)0, (ub2 *)0, (ub2 *)0, array_size,
                    (ub4 *)total_elements, (text *)0, (size_t)0)) ||
      (err = upibap(hst, cursor, 7, (ptr_t)argument_name, M_IDEN, DTYCHR,
                    (b2 *)0, argument_length, (ub2 *)0, array_size,
                    (ub4 *)total_elements, (text *)0, (size_t)0)) ||
      (err = upibap(hst, cursor, 8, (ptr_t)datatype, sizeof(datatype[0]),
                    DTYINT, (b2 *)0, (ub2 *)0, (ub2 *)0, array_size,
                    (ub4 *)total_elements, (text *)0, (size_t)0)) ||
      (err = upibap(hst, cursor, 9, (ptr_t)default_supplied,
                    sizeof(default_supplied[0]), DTYINT, (b2 *)0,
                    (ub2 *)0, (ub2 *)0, array_size,
                    (ub4 *)total_elements, (text *)0, (size_t)0)) ||
      (err = upibap(hst, cursor, 10, (ptr_t)in_out, sizeof(in_out[0]),
                    DTYINT, (b2 *)0, (ub2 *)0, (ub2 *)0, array_size,
                    (ub4 *)total_elements, (text *)0, (size_t)0)) ||
      (err = upibap(hst, cursor, 11, (ptr_t)length, sizeof(length[0]),
                    DTYINT, (b2 *)0, (ub2 *)0, (ub2 *)0, array_size,
                    (ub4 *)total_elements, (text *)0, (size_t)0)) ||
      (err = upibap(hst, cursor, 12, (ptr_t)precision, sizeof(precision[0]),
```

Dec 13 1993 11:01:17 pupibdd.c Page 25

```
                    DTYINT, (b2 *)0, (ub2 *)0, (ub2 *)0, array_size,
                    (ub4 *)total_elements, (text *)0, (size_t)0)) ||
       (err = upibap(hst, cursor, 13, (ptr_t)scale, sizeof(scale[0]),
                    DTYINT, (b2 *)0, (ub2 *)0, (ub2 *)0, array_size,
                    (ub4 *)total_elements, (text *)0, (size_t)0)) ||
       (err = upibap(hst, cursor, 14, (ptr_t)radix, sizeof(radix[0]),
                    DTYINT, (b2 *)0, (ub2 *)0, (ub2 *)0, array_size,
                    (ub4 *)total_elements, (text *)0, (size_t)0)) ||
       (err = upibap(hst, cursor, 15, (ptr_t)spare, sizeof(spare[0]),
                    DTYINT, (b2 *)0, (ub2 *)0, (ub2 *)0, array_size,
                    (ub4 *)total_elements, (text *)0, (size_t)0)) ||
       (err = upiexe(hst, cursor)))
  {
    tmperr = hst->hstoer.oerrcd;
    errbfl = hst->hstebfl;

    if (!(err = upicls(hst, cursor)))
    {
      err                  =
      hst->hstoer.oerrcd = tmperr;
      hst->hstebfl        = errbfl;
    }
    return(err);
  }

  if (err = upicls(hst, cursor)) return(err);
  return(0);
}



word upigiv(hst, c, n, varp, varl, varrl, indp, indl, indrl)
     hstdef *hst;
     word    c;
     word    n;
     text    *varp, *indp;
     size_t  varl, indl;
     ub2     *varrl, *indrl;
{
   givdef g;

   SETUPI(hst);

   if (HSTKPU(hst))
   {
     kpucx *ctx;
     word err;

     HSTASCON(hst);
     HSTASEXT(hst);

     if ((ctx=kpugc(hst,c)) == (kpucx *)0)
       return(HSTSOER(hst,OER(1023)));
     if (bit(ctx->kpucxflg,KPUCXPRS))
       if (err=kpuexe(hst,c,ctx)) return(err);
   }

   g.givcid = (eword)c; g.givpos = (eword)n;
   g.givvrn = varp; g.givvrml = (eword)varl; g.givvrcl = varrl;
   g.gividn = indp; g.gividml = (eword)indl; g.gividcl = indrl;

   if (varp && varp != (text *)-1)
     DISCARD memset((ptr_t)varp, ' ', (size_t)varl);
   if (indp && indp != (text *)-1)
     DISCARD memset((ptr_t)indp, ' ', (size_t)indl);
   return(upirtr(hst, OGETIV, (pisdef *)&g));
}
```

Dec 13 1993 11:01:17 pupibdd.c Page 26

```
word upigil(hst, c, size, found, ap)
    hstdef        *hst;
    word       c;
    ub4        size;
    b4        *found;
reg uaddef    *ap;
{
          ub2    nintov;
   reg    word   err;
   reg    word   i;

   err = upihmi(hst, c, (ub2 *)0, &nintov, (ub2 *)0);
   if (nintov > size) {
     nintov = (ub2)size; *found = -((b4) nintov); }
   else *found = ((b4) nintov);
   for (i=1; (err == 0) && (i <= nintov); i++, ap++)
   {
     err = upigiv(hst, c, i,
        ap->uadvnp, (size_t)ap->uadvnmxl, &ap->uadvncul,
        ap->uadinp, (size_t)ap->uadinmxl, &ap->uadincul);
   }
   return(err);
}


word upigi2(hst, c, size, found, vnp, vnmxl, vncul, inp, inmxl, incul)
     hstdef        *hst;
    word  c;
    ub4   size;
    b4    *found;
reg text *vnp[];
reg ub2   vnmxl[];
reg ub2   vncul[];
reg text  *inp[];
reg ub2   inmxl[];
reg ub2   incul[];
{
          ub2    nintov;
   reg    word   err;
   reg    word   i;

   err = upihmi(hst, c, NULLP(ub2), &nintov, NULLP(ub2));
   if (nintov > size) {
     nintov = (ub2)size; *found = -((b4) nintov); }
   else *found = ((b4) nintov);
   for (i=1; (err == 0) && (i <= nintov); i++)
   {
     err = upigiv(hst, c, i,
         ((vnp) ? *vnp++ : (text *)0),
         (size_t)((vnmxl) ? *vnmxl++ : 0),
         ((vncul) ? vncul++ : (ub2 *)0),
         ((inp) ? *inp++ : (text *)0),
         (size_t) ((inmxl) ? *inmxl++ : 0),
         ((incul) ?  incul++ : (ub2 *)0));
   }
   return(err);
}
```

```
/*****************************************************************************
 * pupicto.c - QD Parallel UPI version of routines from upicto.c
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   ---------------------------------------------
 * %03   08/16/93  EYT      Call to qdrt_free sets pointer=NULL
 * %02   05/17/93  JM       Upgrade to ORACLE 7.0.12
 * %01   09/04/92  EYT      Initial Version
 *****************************************************************************
 */
#define QDNODEBUG 1
#ifndef QDSTD
#include <qdstd.h>
#endif
#ifndef QDPUEXT
#include <qdpuext.h>
#endif
#ifndef QDBBEXT
#include <qdbbext.h>
#endif


#ifndef S
#include <s.h>
#endif
#ifndef RIDDEF
#include    <riddef.h>
#endif
#ifndef OERDEF
#include    <oerdef.h>
#endif
#ifndef HSTDEF
#include    <hstdef.h>
#endif
#ifndef UPIDEF
#include    <upidef.h>
#endif
#ifndef OPIDEF
#include    <opidef.h>
#endif
#ifndef IFCDEF
#include <ifcdef.h>
#endif
#ifndef TTCDEF
#include <ttcdef.h>
#endif


word     upifat(hst)
hstdef  *hst;
{
  SETUPI(hst);
  return(bit(hst->hstoer.oerflg, OERFATAL));
}
```

```
word         upigrd(hst, op, ol)
hstdef      *hst;
reg8 text   *op;
reg7 word    ol;
{
  reg0 riddef  *ridp;
  reg1 text    *ep = &op[ol];
  reg2 uword    l;
  reg3 text    *p = &op[RIDCHARL];
  reg4 ub4      tmp;
  reg5 uword    digit;
  reg6 uword    i;

  SETUPI(hst);
  ridp = &hst->hstoer.oerrid;
  while (ep > p) *--ep = ' ';
  for (i = 0;; ++i)
  {
    switch (i)
    {
    case (0): {
                tmp = ridgfno(*ridp);
                l   = 4;
                break;
              }
    case (1): {
                tmp = ridgsno(*ridp);
                l   = 4;
                break;
              }
    case (2): {
                tmp = ridgbno(*ridp);
                l   = 8;
                break;
              }
    }
    do
    {
      digit = (uword)(((int)tmp) & 0xf);
      if (--p <= ep) *p = (text)((digit+((digit >= 10) ? ('A'-10) : '0')));
      tmp >>= 4;
    }
    while (--l);

    if (i < 2) *--p = '.';
    else return(RIDCHARL);
  }
}



word          upibrk(hst)
reg0 hstdef  *hst;
{
  SETUPI(hst);
  return((word)TTCBREAK(hst));
}



word     upicco(hst, cnumber)
hstdef  *hst;
word     cnumber;
{
  /*****************************************************************************
   * KSR-specific code begins here
   *****************************************************************************
   */
  if (KSR_qd_enabled)
```

1

52

Oct 18 1993 17:07:04 pupicto.c Page 3

```
{
    regi bool fallthrough;
    QDPCURSOR *ppcur;

    QDBEGIN("pupicco");
    ppcur = qdpu_getpcur(hst, cnumber);

    /* Has specified cursor been decomposed? */
    if (ppcur != NULL)
    {
        /* Is this a dummy pcursor for an EXPLAIN statement? If so,
         * we have already executed the EXPLAIN statement in pupiosq,
         * so just return success.
         */
        if (ppcur->check == QDCK_DUMMY)
        {
            qdbb_freepcur(&ppcur, &(QDpcom->cnx));
            QDEND;
            return (hst->hstoer.oerrcd = 0);
        }

        /* Don't decompose queries inside this call */
        KSR_qd_enabled = FALSE;

        qdpu_save_sqllib();

        (*(ppcur->pctree->hdr.pfunc))
            (ppcur->pctree, QDBB_REQ_CLOSE,
             ppcur->pbtt);

        /* Before freeing the pcursor, check whether we let ORACLE
         * parse this query, in order to describe it; in that case,
         * we want to fall through to let ORACLE close it.
         */
        fallthrough = ((ppcur->flags & QD_PCUR_ORA_DESCRIBE) != 0);

        qdbb_freepcur(&ppcur, &(QDpcom->cnx));
        KSR_qd_enabled = TRUE;
        qdpu_restore_sqllib();

        /* Set host error buffer length to zero if error is being
         * returned, so when calling program calls upigml to get error
         * message, upigml will get a fresh message (otherwise, there
         * may be confusion between the message buffer, upiheb, filled
         * by a parallel subquery, and the message length, hst->hstebfl,
         * set previously by the main thread).
         */
        if (QD_RETURN_STATUS)
            hst->hstebfl = 0;

        QDEND;

        /* If we have allowed ORACLE to parse the query, in order to
         * describe the select list, then now let ORACLE do the cancel
         * as well.
         */
        if (!fallthrough)
            return(hst->hstoer.oerrcd = QD_RETURN_STATUS);
    } /* if (ppcur != NULL) */
    QDEND;
}
/****************************************************************************
 * KSR-specific code ends here
 ****************************************************************************
 */

return(upirtr(hst, (word)OCANCEL, (pisdef *)&cnumber));
}
```

Oct 18 1993 17:07:04 pupicto.c Page 4

```
word     upisfe(hst, cnumber, option1, option2)
hstdef  *hst;
word     cnumber;
word     option1;
word     option2;
{
  sfedef   s;
  s.sfoc   = (eword)cnumber;
  s.sferec = (eword)option1;
  s.sferid = (eword)option2;

  return(upirtr(hst, OSFE, (pisdef *)&s));
}
```

2

53

Sep 20 1993 13:39:51 pupicur.c Page 1

```
/*****************************************************************************
 * pupicur.c - QD Parallel UPI version of routines from upicur.c
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   ------------------------------------------------
 * %02   08/16/93  EYT      Call to qdrt_free sets pointer=NULL
 * %01   05/17/93  JM       Upgrade to ORACLE 7.0.12
 * %00   12/03/91  JM       Initial Version
 *****************************************************************************
*/
#define QDNODEBUG 1
#ifndef QDSTD
#include <qdstd.h>
#endif
#ifndef QDPUEXT
#include <qdpuext.h>
#endif
#ifndef QDBBEXT
#include <qdbbext.h>
#endif




#ifndef S
#include <s.h>
#endif
#ifndef TIDDEF
#include   <tiddef.h>
#endif
#ifndef RIDDEF
#include   <riddef.h>
#endif
#ifndef OERDEF
#include   <oerdef.h>
#endif
#ifndef HSTDEF
#include <hstdef.h>
#endif
#ifndef OPIDEF
#include   <opidef.h>
#endif
#ifndef UPIDEF
#include   <upidef.h>
#endif
#ifndef KPU
#include <kpu.h>
#endif
#ifndef KPUM
#include <kpum.h>
#endif




word     upiopn(hst, cnumber, size)
hstdef   *hst;
word     *cnumber;
sword    size;
{
  opedef   ope;
```

Sep 20 1993 13:39:51 pupicur.c Page 2

```
  word     retval;
  word     err;

  SETUPI(hst);
  ope.opec = (eword *) cnumber;
  if (size == -1)
  {
    if (hst->hstpro >= HSTPV6) ope.opesiz = (uword)0;
    else ope.opesiz = (uword)size;
  }
  else ope.opesiz = (uword)size;

  if (retval = upirtr(hst, OOPEN, (pisdef *)&ope)) return(retval);
  if (HSTKPU(hst))
  {
    HSTASEXT(hst);
    if (err = kpuic(hst,*cnumber)) return(err);
  }
  return(retval);
}




word     upicls(hst, cnumber)
hstdef   *hst;
word     cnumber;
{
  word retval;
  word err;
  SETUPI(hst);

  /**************************************************************************
   * KSR-specific code begins here
   **************************************************************************
   */
  if (KSR_qd_enabled)
  {
      regl bool fallthrough;
      QDPCURSOR *ppcur;

      QDBEGIN("pupicls");
      ppcur = qdpu_getpcur(hst, cnumber);

      /* Has specified cursor been decomposed? */
      if (ppcur != NULL)
      {
          /* Is this a dummy pcursor for an EXPLAIN statement? If so,
           * we have already executed the EXPLAIN statement in pupiosq,
           * so just return success.
           */
          if (ppcur->check == QDCK_DUMMY)
          {
              qdbb_freepcur(&ppcur, &(QDpcom->cnx));
              QDEND;
              return (hst->hstoer.oerrcd = 0);
          }

          /* Don't decompose queries inside this call */
          KSR_qd_enabled = FALSE;

          qdpu_save_sqllib();

          (*(ppcur->pctree->hdr.pfunc))
              (ppcur->pctree, QDBB_REQ_CLOSE,
               ppcur->pbtt);

          /* Before freeing the pcursor, check whether we let ORACLE
```

1

54

Sep 20 1993 15:39:51 puplcur.c Page 3

```
         * parse this query, in order to describe it; in that case,
         * we want to fall through to let ORACLE close it.
         */
        fallthrough = ((ppcur->flags & QD_PCUR_ORA_DESCRIBE) != 0);

        qdbb_freepcur(&ppcur, &(QDpcom->cnx));
        KSR_qd_enabled = TRUE;
        qdpu_restore_sqllib();

        /* Set host error buffer length to zero if error is being
         * returned, so when calling program calls upigml to get error
         * message, upigml will get a fresh message (otherwise, there
         * may be confusion between the message buffer, upiheb, filled
         * by a parallel subquery, and the message length, hst->hstebfl,
         * set previously by the main thread).
         */
        if (QD_RETURN_STATUS)
            hst->hstebfl = 0;

        QDEND;

        /* If we have allowed ORACLE to parse the query, in order to
         * describe the select list, then now let ORACLE do the cancel
         * as well.
         */
        if (!fallthrough)
            return(hst->hstoer.oerrcd = QD_RETURN_STATUS);
    } /* if (ppcur != NULL) */
    QDEND;
  }
  /************************************************************************
   * KSR-specific code ends here
   ************************************************************************
  */

  retval= upirtr(hst, OCLOSE, (pisdef *)&cnumber);
  if (HSTKPU(hst))
  {
    HSTASEXT(hst);
    if (err = kpudc(hst,cnumber))
      return(err);
  }
  return(retval);
}
```

55

```
/***************************************************************************
 * puplexf.c - QD Parallel UPI version of routines from upiexf.c
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***************************************************************************
 * REV  DATE      AUTHOR  DESCRIPTION
 * ---  --------  ------  ----------------------------------------------------
 * %02  10/20/93  EYT     For bind variables in sqlplus, allow err=1008 since
 *                        cursor never gets executed
 * %01  10/06/92  EYT     For array fetches, offset indicator by iteration
 * %00  12/03/91  JM      Initial Version
 ***************************************************************************
*/
#define QDNODEBUG 1
#ifndef QDSTD
#include <qdstd.h>
#endif
#ifndef QDPUEXT
#include <qdpuext.h>
#endif
#ifndef QDBBEXT
#include <qdbbext.h>
#endif
/* KSR: Need octdef.h and memory.h */
#ifndef OCTDEF
#include <octdef.h>
#endif
#include <memory.h>



#include <s.h>
#ifndef HSTDEF
#include <hstdef.h>
#endif
#ifndef OPIDEF
#include   <opidef.h>
#endif
#ifndef UPIDEF
#include   <upidef.h>
#endif
#ifndef OACDEF
#include <oacdef.h>
#endif
#ifndef UACDEF
#include <uacdef.h>
#endif
#ifndef SQLDEF
#include   <sqldef.h>
#endif
#ifndef KPU
#include <kpu.h>
#endif
#ifndef KPUTX
#include <kputx.h>
#endif
#ifndef TTC
#include <ttc.h>
#endif
#ifndef UCADEF
#include <ucadef.h>
#endif
#ifndef K2M
#include <k2m.h>
#endif
#ifndef K2U
#include <k2u.h>
#endif
/* KSR: need sqlda for def of ppcur->select_desc */
```

```
#include <sqlda.h>


#define UPIUCAPNUL ((word (*)(/*_ struct hstdef *, ub1 * _*/))0)
#define UPIUCACNUL ((ub1 *)0)


STATICF
word     upiex0(/*_ hstdef *hst, word cnumber, word iters, word roff,
                    ub4 *snap_in, ub4 *snap_out _*/);

/* KSR: Thread-private global for communicated number of rows affected
 * by an operation, from upi layer to QD layer
 */
__private ub4 KSR_qd_oercnt;

word     upiexe(hst, cnumber)
hstdef  *hst;
word     cnumber;
{
  /***************************************************************************
   * KSR-specific code begins here
   ***************************************************************************
   */
  if (KSR_qd_enabled)
  {
      reg1 QDPCURSOR *ppcur;

      QDBEGIN("pupiexe");
      ppcur = qdpu_getpcur(hst, cnumber);

      /* Has specified cursor been decomposed? */
      if (ppcur != NULL)
      {
          /* Is this a dummy pcursor for an EXPLAIN statement? If so,
           * we have already executed the EXPLAIN statement in pupiosq,
           * so just return success.
           */
          if (ppcur->check == QDCK_DUMMY)
          {
              /* Let caller know this was an EXPLAIN statement
               * (sqlplus cares.)
               */
              hst->hstoer.oertyp = OCTXPL;
              QDEND;
              return (hst->hstoer.oerrcd = 0);
          }

          /* Don't decompose queries inside this call */
          KSR_qd_enabled = FALSE;

          qdpu_save_sqllib();

          /* NOTE: Actually, for opening a cursor for a query,
           * probably any iters value but 1 is illegal.  For now,
           * just ignore niters.
           */
          (*(ppcur->pctree->hdr.pfunc))
              (ppcur->pctree, QDBB_REQ_OPEN,
               ppcur->pbtt);
          KSR_qd_enabled = TRUE;
          qdpu_restore_sqllib();

          /* Set oertyp from value set by qdcp_prep in QDcom */
          hst->hstoer.oertyp = QDpcom->oertyp;

          /* If this was a SELECT/INSERT statement with no aggregation
           * or grouping, set the count of rows inserted.
           */
          if (QDpcom->oertyp == OCTINS &&
              (ppcur->pctree->hdr.flags & QDBB_PSQ_INSERT_SELECT))
              hst->hstoer.oercnt = KSR_qd_oercnt;
```

Dec 13 1993 11:01:19 puplexf.c Page 3

```
        /* Set host error buffer length to zero if error is being
         * returned, so when calling program calls upigml to get error
         * message, upigml will get a fresh message (otherwise, there
         * may be confusion between the message buffer, upiheb, filled
         * by a parallel subquery, and the message length, hst->hstebfl,
         * set previously by the main thread).
         */
        if (QD_RETURN_STATUS)
            hst->hstebfl = 0;

        QDEND;
        return (hst->hstoer.oerrcd = QD_RETURN_STATUS);
    } /* if (ppcur != NULL) */
    QDEND;
  }
  /**************************************************************************
   * KSR-specific code ends here
   **************************************************************************
   */
#ifdef KSR
  {
    word retval;
    retval = upiex0(hst, cnumber, (word)1, (word)0, (ub4 *)0, (ub4 *)0);
    KSR_qd_oercnt = hst->hstoer.oercnt;
    return retval;
  }
#else /* KSR */
  return upiex0(hst, cnumber, (word)1, (word)0, (ub4 *)0, (ub4 *)0);
#endif /* KSR */
}


word     upiexn(hst, cnumber, iters, roff)
hstdef  *hst;
word     cnumber;
word     iters;
word     roff;
{
  /**************************************************************************
   * KSR-specific code begins here
   **************************************************************************
   */
  if (KSR_qd_enabled)
  {
    reg1 QDPCURSOR *ppcur;

    QDBEGIN("pupiexn");
    QDDprintf(("pupiexn cnumber: %d\n", cnumber));
    ppcur = qdpu_getpcur(hst, cnumber);

    /* Has specified cursor been decomposed? */
    if (ppcur != NULL)
    {
      /* Is this a dummy pcursor for an EXPLAIN statement? If so,
       * we have already executed the EXPLAIN statement in pupiosq,
       * so just return success.
       */
      if (ppcur->check == QDCK_DUMMY)
      {
        /* Let caller know this was an EXPLAIN statement
         * (sqlplus cares.)
         */
        hst->hstoer.oertyp = OCTXPL;
        QDEND;
        return (hst->hstoer.oerrcd = 0);
      }

      /* Don't decompose queries inside this call */
      KSR_qd_enabled = FALSE;

      qdpu_save_sqllib();
```

Dec 13 1993 11:01:19 puplexf.c Page 4

```
        /* NOTE: Actually, for opening a cursor for a query,
         * probably any iters value but 1 is illegal.  For now,
         * just ignore niters.
         */
        (*(ppcur->pctree->hdr.pfunc))
            (ppcur->pctree, QDBB_REQ_OPEN,
             ppcur->pbtt);
        KSR_qd_enabled = TRUE;
        qdpu_restore_sqllib();

        /* Set oertyp from value set by qdcp_prep in QDcom */
        hst->hstoer.oertyp = QDpcom->oertyp;

        /* If this was a SELECT/INSERT statement with no aggregation
         * or grouping, set the count of rows inserted.
         */
        if (QDpcom->oertyp == OCTINS &&
            (ppcur->pctree->hdr.flags & QDBB_PSQ_INSERT_SELECT))
            hst->hstoer.oercnt = KSR_qd_oercnt;

        /* Set host error buffer length to zero if error is being
         * returned, so when calling program calls upigml to get error
         * message, upigml will get a fresh message (otherwise, there
         * may be confusion between the message buffer, upiheb, filled
         * by a parallel subquery, and the message length, hst->hstebfl,
         * set previously by the main thread).
         */
        if (QD_RETURN_STATUS)
            hst->hstebfl = 0;

        QDEND;
        return (hst->hstoer.oerrcd = QD_RETURN_STATUS);
    } /* if (ppcur != NULL) */
    QDEND;
  }
  /**************************************************************************
   * KSR-specific code ends here
   **************************************************************************
   */
#ifdef KSR
  {
    word retval;
    retval = upiex0(hst, cnumber, iters, roff, (ub4 *)0, (ub4 *)0);
    KSR_qd_oercnt = hst->hstoer.oercnt;
    return retval;
  }
#else /* KSR */
  return upiex0(hst, cnumber, iters, roff, (ub4 *)0, (ub4 *)0);
#endif /* KSR */

}


word     upiexs(hst, cnumber, snap_in, snap_out)
hstdef  *hst;
word     cnumber;
ub4     *snap_in;
ub4     *snap_out;
{
  return upiex0(hst, cnumber, (word)1, (word)0, snap_in, snap_out);
}

STATICF
word     upiex0(hst, cnumber, iters, roff, snap_in, snap_out)
hstdef  *hst;
word     cnumber;
word     iters;
word     roff;
ub4     *snap_in;
ub4     *snap_out;
{
```

57

Dec 13 1993 11:01:19 puplexf.c Page 5

```
SETUPI(hst);
if (HSTKPU(hst))
{
  kpucx *ctx;
  word err;

  HSTASCON(hst);
  HSTASEXT(hst);

  if ((ctx = kpugc(hst,cnumber)) == (kpucx *)0)
    return(HSTSOER(hst,OER(1023)));
  if (ctx->kpucxflg == 0 && !snap_in && !snap_out)
  {
    struct
    {
      ucadef    dumuca;
      ub1       dumxtr1[L_UPICSV-sizeof(ttsdef)];
      uacdef    dumuac;
      ub1       dumxtr2[L_UPIUAC-sizeof(uacdef)];
    }  dum;
    kputx ttctx;
    exedef exec;


    ttctx.kputxuca = &(dum.dumuca);
    ttctx.kputxctx = ctx;

    CLRSTRUCT(exec);
    exec.execid = (eword)cnumber;
    ttctx.kputxnit = exec.exenit = (eword)iters;
    ttctx.kputxitn = exec.exerof = (eword)roff;
    bis(ctx->kpucxflg,KPUCXEXE);
    err = upirtrc(hst,OEXEC, (pisdef *) &exec,&(dum.dumuca),
                  &(dum.dumuac),ttckpu,(ub1 *)&ttctx,
                  (ptr_t)ctx,UCAFFUPI);
    bic(ctx->kpucxflg, KPUCXEXE);
    return(err);
  }

  bis(ctx->kpucxflg,KPUCXEXE);
  ctx->kpucxitn = roff;
  ctx->kpucxnit = iters;
  if (snap_in)
  {
    bis(ctx->kpucxlfl, KPULFSNA);
    ctx->kpucxisnap[0] = snap_in[0];
    ctx->kpucxisnap[1] = snap_in[1];
  }
  else if (snap_out)
  {
    bis(ctx->kpucxlfl, KPULFSNA);
    ctx->kpucxisnap[0] =
    ctx->kpucxisnap[1] = (ub4)0;
  }

  err = kpuexe(hst,cnumber,ctx);

  if (snap_out)
  {
    snap_out[0] = ctx->kpucxosnap[0];
    snap_out[0] = ctx->kpucxosnap[1];
  }
  bic(ctx->kpucxflg, KPUCXEXE);
  bic(ctx->kpucxlfl, KPULFSNA);
  return(err);
}
else
{
  exedef   e;
  e.execid = (eword)cnumber;
  e.exenit = (eword)iters;
  e.exerof = (eword)roff;
  if ((snap_in || snap_out) && hst->hstpro >= HSTPV7)
```

Dec 13 1993 11:01:19 puplexf.c Page 6

```
    {
      k2mar mar;
      kscn  scn;
      eword err;
#define x(y) if (err=(eword)y) goto out; else
      if (snap_in)
      {
        K2Uscn(&scn, snap_in[0], snap_in[1]);
        k2mexi(&e, (kscn *)0, &scn, &mar);
      }
      else
      {
        k2mexi(&e, (kscn *)0, (kscn *)0, &mar);
      }
      x(upirtr(hst, OEXECSCN, (pisdef *)&mar.k2marrpc));
      x(k2uexo(&mar, &scn));
      if (snap_out) K2Mscn(&scn, ub4, snap_out[0], snap_out[1]);
#undef x
    out:
      return err;
    }
    return(upirtr(hst, OEXEC, (pisdef *)&e));
  }
}




word      upifch(hst, cnumber)
hstdef   *hst;
word      cnumber;
{
  /*************************************************************************
   * KSR-specific code begins here
   *************************************************************************
   */
  if (KSR_qd_enabled)
  {
      reg1 QDPCURSOR *ppcur;
      reg2 word retval;

      QDBEGIN("pupifch");
      ppcur = qdpu_getpcur(hst, cnumber);

      /* Has specified cursor been decomposed? */
      if (ppcur != NULL)
      {
          /* Don't decompose queries inside this call */
          KSR_qd_enabled = FALSE;

          qdpu_save_sqllib();

          retval = (*(ppcur->pctree->hdr.pfunc))
                        (ppcur->pctree, QDBB_REQ_NEXT,
                         ppcur->pbtt);
          if (retval == QDBB_REPLY_EOD)
              /* Set EOD code - actually there may be an alternate code */
              hst->hstoer.oerrcd = QD_EOD;
          else
              hst->hstoer.oerrcd = QD_RETURN_STATUS;
          KSR_qd_enabled = TRUE;
          qdpu_restore_sqllib();

          /* Set oertyp from value set by qdcp_prep in QDcom */
          hst->hstoer.oertyp = QDpcom->oertyp;

          /* Set host error buffer length to zero if error is being
           * returned, so when calling program calls upigml to get error
           * message, upigml will get a fresh message (otherwise, there
           * may be confusion between the message buffer, upiheb, filled
           * by a parallel subquery, and the message length, hst->hstebfl,
```

58

Dec 13 1993 11:01:19 puplexf.c Page 7

```
        * set previously by the main thread).
        */
        if (hst->hstoer.oerrcd)
            hst->hstebfl = 0;

        QDEND;
        return(hst->hstoer.oerrcd);
      } /* if (ppcur != NULL) */
      QDEND;
  }
  /*****************************************************************************
   * KSR-specific code ends here
   *****************************************************************************
  */

  return(upifcn(hst, cnumber, (word)1));
}



word     upifcn(hst, cnumber, nrows)
hstdef   *hst;
word     cnumber;
word     nrows;
{
  fchdef   f;

  SETUPI(hst);

  /*****************************************************************************
   * KSR-specific code begins here
   *****************************************************************************
  */
/* word ret; */
  if (KSR_qd_enabled)
  {
      reg1 QDPCURSOR *ppcur;
      reg2 word retval;
      reg3 word i;
      reg4 word j;
      oerdef save_oerdef;

      QDBEGIN("pupifcn");
      ppcur = qdpu_getpcur(hst, cnumber);

      /* Has specified cursor been decomposed? */
      if (ppcur != NULL)
      {
          /* Don't decompose queries inside this call */
          KSR_qd_enabled = FALSE;
          qdpu_save_sqllib();
          QDDprintf(("Found ppcur\n"));
          for (i = 0; i < nrows; i++)
          {
              /* array fetches, add offset: iteration * field buflen */
              /* to data buffer, indicator and length buffer pointers */
              for (j = 0; j < ppcur->pselect_desc->N; j++)
              {
                  ppcur->pselect_desc->V[j] =
                      (char *)(ppcur->pselect_desc->V[j] +
                               i * ppcur->pselect_desc->L[j]);
                  ppcur->pselect_desc->I[j] =
                      (short *)(ppcur->pselect_desc->I[j] + i);        /*%01*/
                  if (ppcur->plenptrs[j] != NULL)
                      ppcur->plenptrs[j] =
                          (ub2 *)(ppcur->plenptrs[j] + i);
              }

              retval = (*(ppcur->pctree->hdr.pfunc))
                  (ppcur->pctree, QDBB_REQ_NEXT,
                   ppcur->pbtt);
```

Dec 13 1993 11:01:19 puplexf.c Page 8

```
              /* restore data buffer, indicator and length buffer */
              /* pointers to original positions */
              for (j = 0; j < ppcur->pselect_desc->N; j++)
              {
                  ppcur->pselect_desc->V[j] =
                      (char *)(ppcur->pselect_desc->V[j] -
                               i * ppcur->pselect_desc->L[j]);
                  ppcur->pselect_desc->I[j] =
                      (short *)(ppcur->pselect_desc->I[j] - i);        /*%01*/
                  if (ppcur->plenptrs[j] != NULL)
                      ppcur->plenptrs[j] =
                          (ub2 *)(ppcur->plenptrs[j] - i);
              }

              /* Increment rowcount if fetch was successful */
              if (retval == QDBB_REPLY_READY)
                  hst->hstoer.oercnt = ++ppcur->rowcount;

              if (retval == QDBB_REPLY_EOD)
                  /* Set EOD code - actually there may be an alternate code */
                  hst->hstoer.oerrcd = QD_EOD;
              else
                  hst->hstoer.oerrcd = QD_RETURN_STATUS;
              if (hst->hstoer.oerrcd)
                  break;
          } /* for ... */

          hst->hstoer.oercid = cnumber;

          /* Record cumulative rowcount in hstoer */
          hst->hstoer.oercnt = ppcur->rowcount;

          /* Set oertyp from value set by qdcp_prep in QDcom */
          hst->hstoer.oertyp = QDpcom->oertyp;

          /* Don't yet know what to return in oerepo, but have observed
           * real upi returning 12 for successful fetches.
          */
          hst->hstoer.oerepo = 12;

          qdpu_dspoer("pupifcn", &(hst->hstoer));

          KSR_qd_enabled = TRUE;
          qdpu_restore_sqllib();

          /* Set oertyp from value set by qdcp_prep in QDcom */
          hst->hstoer.oertyp = QDpcom->oertyp;

          /* Set host error buffer length to zero if error is being
           * returned, so when calling program calls upigml to get error
           * message, upigml will get a fresh message (otherwise, there
           * may be confusion between the message buffer, upiheb, filled
           * by a parallel subquery, and the message length, hst->hstebfl,
           * set previously by the main thread).
          */
          if (hst->hstoer.oerrcd)
          {
              hst->hstebfl = 0;

              if ( hst->hstoer.oerrcd == 1403 &&
                  (ppcur->flags & QD_PCUR_CLOSE_ON_EOD))
              {
                  /* If we have encountered EOD and cursor is flagged to
                   * close automatically upon EOD, do so by calling upicco.
                   * After calling upicco in order to automatically
                   * close cursor upon EOD, we should restore the
                   * hst->hstoer contents to their previous values,
                   * because that's what the calling program
                   * expects to see.
                   * JM 7/9/93: Close on error as well, because after an
                   * error happens, sqlplus will reuse the same cursor
                   * number, and pick up this cursor by mistake if we
```

4

59

```
                 * don't close it now.
                 */
                memcpy(&save_oerdef, &(hst->hstoer), sizeof(oerdef));
                upicco(hst,cnumber);

                /* Ignore error 1008: Not all bind variables bound */
                /* Get error when cursor state = PARSE.  Since main */
                /* cursor never got executed, cursor state stays at */
                /* PARSE state */
                if (!hst->hstoer.oerrcd ||
                    hst->hstoer.oerrcd == OER(1008))
                    memcpy(&(hst->hstoer), &save_oerdef, sizeof(oerdef));
            }
        }
        QDEND;
        return (hst->hstoer.oerrcd);
    } /* if (ppcur != NULL) */
    QDEND;
}
/****************************************************************************
 * KSR-specific code ends here
 ****************************************************************************
 */

f.fchcid = (eword)cnumber;
f.fchnro = (eword)nrows;

if (HSTKPU(hst))
{
  kpucx *ctx;
  struct
  {
    ucadef    dumuca;
    ub1       dumxtr1[L_UPICSV-sizeof(ttsdef)];
    uacdef    dumuac;
    ub1       duxutr2[L_UPIUAC-sizeof(uacdef)];
  }    dum;


  HSTASCON(hst);
  HSTASEXT(hst);

  if ((ctx = kpugc(hst,cnumber)) == (kpucx *)0)
    return(HSTSOER(hst,OER(1023)));
  if (!ctx->kpucxndfn) return(upirtr(hst, OFETCH, (pisdef *)&f));
  if (ctx->kpucxflg)
  {

    bis(ctx->kpucxflg,KPUCXFCH);
    ctx->kpucxnit = nrows;
    ctx->kpucxitn = 0;

    return(kpuexe(hst,cnumber,ctx));
  }
  else
    return(upirtrc(hst,OFETCH,(pisdef *) &f,&(dum.dumuca),&(dum.dumuac),
                   UPIUCAPNUL, UPIUCACNUL,
                   (ptr_t)ctx,UCAFFUPI));

}
else
  return(upirtr(hst, OFETCH, (pisdef *)&f));
}




word     upilgt(hst, cnumber, posit, bfa, bfl, dty, aln, off)
hstdef  *hst;
word     cnumber;
word     posit;
```

```
ptr_t    bfa;
size_t   bfl;
ub1      dty;
ub4     *aln;
sb4      off;
{
  uacdef   u;
  oacdef   o;
  word     err;
  size_t   sz;
  ub2 alnl;
  SETUPI(hst);

  if (hst->hstpro < HSTPV7)
  {

    lngdef l;

    CLRSTRUCT(l);
    l.lngcid = (eword)cnumber;
    l.lngpos = (eword)posit;
    l.lngoff = (eword)off;
    l.lngoac = &o;
    l.lngacp = (ptr_t)&u;

    if (err = upiacp(UACODFN, bfa, bfl, SQLT_LNG, NULLP(b2), &alnl,
                     NULLP(ub2),(ub4 *)0, (ub4)0,
                     NULLP(text), 0, &o, &u, (size_t *)&sz))
      return(HSTSOER(hst,err));

    l.lngacl = (eword)sz;
    err = upirtr(hst, OLNGF6, (pisdef *)&l);
  }
  else
  {

    alldef   l;

    CLRSTRUCT(l);

    if (dty == DTYUB2) off = off/sizeof(ub2);
    else if (dty == DTYSB4) off = off/sizeof(sb4);

    l.allopt = UOPF_FCH;
    l.allcsr = (eword)cnumber;
    l.allnit = (ub4) posit;
    l.allitn = (ub4) off;
    l.alldfo = &o;
    l.alldfn = 1;
    l.alldfu = (ub1 *)&u;

    if (err = upiacp(UACODFN, bfa, bfl, (word)dty, NULLP(b2), &alnl,
                     NULLP(ub2), NULLP(ub4), (ub4) 0, NULLP(text), 0, &o, &u,
                     &sz))
      return(HSTSOER(hst,err));
    l.alldfl = (eword)sz;

    err = upirtr(hst, OLONGF, (pisdef *)&l);
  }
  if (aln && (aln != (ub4 *)-1)) *aln = (ub4)alnl;
  return(err);
}




word     upilng(hst, cnumber, posit, bfa, bfl, off)
hstdef  *hst;
word     cnumber;
word     posit;
ptr_t    bfa;
```

Dec 13 1993 11:01:19 puplexf.c Page 11

```
size_t   bfl;
uword    off;
{
  return(upilgt(hst,cnumber,posit,bfa,bfl,(ub1)DTYCHR,(ub4 *)0,(sb4)off));
}


word upiefn(hst,cn,nrows,can,exact)
hstdef *hst;
word     cn;
ub4      nrows;
word     can;
word     exact;
{
  word err;
  kpucx *ctx;
  exedef exec;

  SETUPI(hst);

  /**********************************************************************
   * KSR-specific code begins here
   **********************************************************************
   */
  if (KSR_qd_enabled)
  {
      regl QDPCURSOR *ppcur;
      oerdef save_oerdef;

      QDBEGIN("pupiefn");
      ppcur = qdpu_getpcur(hst, cn);

      /* Has specified cursor been decomposed? */
      if (ppcur != NULL)
      {
          /* Flag this pcursor as one that should be closed automatically on
           * EOD.  Why?  Because as far as I know (on 5/20/93), upiefn is only
           * called from SQL*Plus, and as of 7.0.12, SQL*Plus no longer makes
           * any upi call to close a cursor when it's returned all its rows.
           * If all the rows of this cursor are returned during this call
           * to upiefn, we will close the cursor here.  Otherwise, we will
           * encounter EOD in some later call to upifcn, and the flag we set
           * here will tell us to close the cursor there.
           */
          ppcur->flags |= QD_PCUR_CLOSE_ON_EOD;

          /* Make separate upi calls to open the cursor, fetch n rows,
           * and (if requested) cancel the cursor.  Leave QD enabled,
           * so each of these calls will "trap" into QD code.
           * (Use the same sequence of calls used below for talking to
           * a V6 database.)
           */
          if (exact)
              err = HSTSOER(hst,OER(2028));
          else if (!(err=upiexe(hst,cn)))
              if (!(err=upifcn(hst,cn,(word)nrows))  || err == 1403 )
                  /* Cancel if requested to, or if EOD encountered;
                   * otherwise, the cursor (and psq's) never get closed.
                   * JM 7/9/93: Close on error as well, because after an
                   * error happens, sqlplus will reuse the same cursor
                   * number, and pick up this cursor by mistake if we
                   * don't close it now.
                   */
                  if (can  ||
                      ( err == 1403 &&
                       (ppcur->flags & QD_PCUR_CLOSE_ON_EOD)))
                  {
                      /* If we are calling upicco in order to automatically
                       * close cursor upon EOD, we should then restore the
                       * function return code and hst->hstoer contents to
                       * their values as returned by upifcn, because that's
                       * what the calling program expects to see.
```

Dec 13 1993 11:01:19 puplexf.c Page 12

```
                       */
                      memcpy(&save_oerdef, &(hst->hstoer), sizeof(oerdef));
                      err = upicco(hst,cn);

                      /* Ignore error 1008: Not all bind variables bound */
                      /* Get error when cursor state = PARSE.  Since main */
                      /* cursor never got executed, cursor state stays at */
                      /* PARSE state */
                      if ((!err || err == OER(1008))
                          && save_oerdef.oerrcd == 1403)
                      {
                          err = 1403;
                          memcpy(&(hst->hstoer), &save_oerdef, sizeof(oerdef));
                      }
                  }
          QDEND;
          return (HSTSOER(hst,err));
      } /* if (ppcur != NULL) */
      QDEND;
  }
  /**********************************************************************
   * KSR-specific code ends here
   **********************************************************************
   */

  if (!HSTKPU(hst))
  {
    if (hst->hstpro >= HSTPV7)
    {



      CLRSTRUCT(exec);
      exec.exerof = (eword)(exact ?
                             (UOPF_EXE | UOPF_FCH | UOPF_FEX | UOPF_CAN) :
                             (can ? (UOPF_FCH | UOPF_EXE | UOPF_CAN) :
                              (UOPF_FCH | UOPF_EXE)));
      exec.exenit = (eword)nrows;
      exec.execid = (eword)cn;
      return(upirtr(hst, OEXFEN, (pisdef *)&exec));
    }
    else
    {

      if (exact) return(HSTSOER(hst,OER(2028)));
      if (err=upiexe(hst,cn)) return(err);
      if (err=upifcn(hst,cn,(word)nrows)) return(err);
      if (can) return(upicco(hst,cn));
      return((word)0);
    }
  }

  HSTASCON(hst);
  HSTASEXT(hst);


  if ((ctx = kpugc(hst,cn)) == (kpucx *)0) return(HSTSOER(hst,OER(1023)));

  if (!ctx->kpucxflg)
  {
    struct
    {
      ucadef    dumuca;
      ub1       dumxtr1[L_UPICSV-sizeof(ttsdef)];
      uacdef    dumuac;
      ub1       dumxtr2[L_UPIUAC-sizeof(uacdef)];
    }  dum;
    kputx ttctx;
    word err;

    CLRSTRUCT(exec);
    exec.exerof = (eword)(exact ? (UOPF_EXE | UOPF_FCH | UOPF_FEX | UOPF_CAN) :
                  (can ? (UOPF_FCH | UOPF_EXE | UOPF_CAN) :
```

```
                        (UOPF_FCH | UOPF_EXE)));
    exec.exenit = (eword)nrows;
    exec.execid = (eword)cn;

    ttctx.kputxuca = &(dum.dumuca);
    ttctx.kputxctx = ctx;
    ttctx.kputxnit = 1;
    ttctx.kputxitn = 0;
    bis(ctx->kpucxflg,KPUCXEXE);
    bis(ctx->kpucxflg,KPUCXFCH);
    err = upirtrc(hst,OEXFEN, (pisdef *) &exec,&(dum.dumuca),
                  &(dum.dumuac),ttckpu,(ub1 *)&ttctx,
                  (ptr_t)ctx,UCAFFUPI);
    bic(ctx->kpucxflg,KPUCXEXE);
    bic(ctx->kpucxflg,KPUCXFCH);
    return(err);
  }
  ctx->kpucxnit = nrows;
  ctx->kpucxitn = 0;
  bis(ctx->kpucxflg,KPUCXEXE);
  bis(ctx->kpucxflg,KPUCXFCH);
  if (can) bis(ctx->kpucxflg,KPUCXCAN);
  if (exact)
  {
    bis(ctx->kpucxflg, KPUCXFEX);
    bis(ctx->kpucxflg, KPUCXCAN);
  }

  err = kpuexe(hst,cn,ctx);


  bic(ctx->kpucxflg,KPUCXEXE);
  bic(ctx->kpucxflg,KPUCXFCH);
  bic(ctx->kpucxflg,KPUCXCAN);
  bic(ctx->kpucxflg,KPUCXFEX);
  return(err);
}
```

62

```
/* upilog.c */


/*
ORACLE, Copyright (c) 1982, 1983, 1986, 1990 ORACLE Corporation
ORACLE Utilities, Copyright (c) 1981, 1982, 1983, 1986, 1990, 1991 ORACLE Corp

Restricted Rights
This program is an unpublished work under the Copyright Act of the
United States and is subject to the terms and conditions stated in
your  license  agreement  with  ORACORP  including  retrictions on
use, duplication, and disclosure.

Certain uncopyrighted ideas and concepts are also contained herein.
These are trade secrets of ORACORP and cannot be  used  except  in
accordance with the written permission of ORACLE Corporation.
*/

#ifdef RCSID
static char *RCSid =
   "$Header: /dbmaster/cvsroot/qdsource/pupi/pupilog.c,v 1.7 1993/07/09 15:54:18 jmi
ller Exp $ upilog.c ";
#endif



#ifndef S
#include <s.h>
#endif
#ifndef SP
#include <sp.h>
#endif
#ifndef OERDEF
#include <oerdef.h>
#endif
#ifndef HSTDEF
#include <hstdef.h>
#endif
#ifndef UPIDEF
#include <upidef.h>
#endif
#ifndef GENDEF
#include <gendef.h>
#endif
#ifndef IFCDEF
#include <ifcdef.h>
#endif
#ifndef OPIDEF
#include <opidef.h>
#endif
#ifndef RIDDEF
#include <riddef.h>
#endif
#ifndef SI
#include <si.h>
#endif
#ifndef TIDDEF
#include <tiddef.h>
#endif
#ifndef KPU
#include <kpu.h>
#endif
#ifndef L
#include <l.h>
#endif
#ifndef SLK
#include <slk.h>
#endif
#ifndef ORA_STRING
#define ORA_STRING
#include <string.h>
```

```
#endif
#ifndef QDSTD
#include <qdstd.h>
#endif
#ifdef KSR
#include <ctype.h>
#endif


#define NRETRY 3


STATICF word upilgn(/*_ hstdef *hst, text *u, size_t ul, text *p, size_t pl,
                        ub4 i, word r, word migrate _*/);



word      upilon(hst, usr, usrl, psw, pswl, flag)
hstdef  *hst;
text     *usr;
size_t   usrl;
text     *psw;
size_t   pswl;
word      flag;
{
  if (flag == -1) flag =0;
  return(upilgn(hst, usr, usrl, psw, pswl, (ub4)flag, 0, FALSE));
}



word            upilam(hst, u, ul, p, pl, e, i, r, s)
reg hstdef     *hst;
reg text       *u;
reg size_t      ul;
reg text       *p;
reg size_t      pl;

struct oerdef  *e;
ub4             i;
word            r;

word           *s;
{
  return(upilgn(hst, u, ul, p, pl, i, r, FALSE));
}



word     upiscr(hst, ses, usr, usrl, psw, pswl, spwd, spwdl, flag)
reg0 hstdef     *hst;
     sesdef     *ses;
     text       *usr;
     size_t      usrl;
     text       *psw;
     size_t      pswl;
     text       *spwd;
     size_t      spwdl;
     word        flag;
{
  word    error;
  siddef  sid;

  SETUPI(hst);


  if (error = upilgn(hst, usr, usrl, psw, pswl, (ub4)flag, 0, TRUE))
    return(error);


  CLRSTRUCT(*ses);
```

63

Sep 20 1993 13:39:56 pupilog.c Page 3

```
  CLRSTRUCT(sid);
  sid.sididx  = &ses->sesidx;
  sid.sidser  = &ses->sesser;
  sid.sidpsw  = spwd;
  sid.sidpswl = (sword)spwdl;
  sid.sidopc  = OSESINI;


  if (error = upirtr(hst, OSESOPN, (pisdef *)&sid)) return(error);


  if (HSTKPU(hst))
    CPSTRUCT((hst->hsteun.hstext)->hxlses,*ses);

  return((word)0);
}



STATICF word    upilgn(hst, u, ul, p, pl, i, r, migrate)
reg hstdef     *hst;
reg text       *u;
reg size_t      ul;
reg text       *p;
reg size_t      pl;
ub4             i;
word            r;
word            migrate;
{
  union lonbtyp {
    londef       lon1b;
    lon2df       lon2b;
  } lonb;
#define lon  (&lonb.lon1b)
#define lon2 (&lonb.lon2b)

  reg word      error;
  reg word      retry;
  reg text     *h;
  reg size_t    hl;
  text          terminal[M_TERM];
  text          username[M_UNML];
  text          machine[M_HOST];
  text          ospid[M_PIDL];
  text          pgmname[M_PGNML];
  serc          se;
  struct lihnd hnd;
  li_langid     lid;


  SETUPI(hst);

  if ((u == (text *)(-1)) || !ul) u = (text *)0;
  else
  {
    if (ul == (size_t)-1) ul = strlen((char *)u);
    for (h = u; h < u+ul; ++h) if (*h == '@') break;
  }
  if (u && h < u+ul)
  {
    hl = u+ul-++h;
    ul = h-u-1;



    if (error = upiahs(hst, h, hl)) return(error);
    bis(hst->hstflg, HSTFICON);
  }
```

Sep 20 1993 13:39:56 pupilog.c Page 4

```
  if (!bit(hst->hstflg, HSTFCONN))
  {
    if (error = upiahs(hst, NULLP(text), 0))
      return(error);
    bis(hst->hstflg, HSTFICON);
  }


  if (migrate)
  {
    bic(i, UPILFINT);
  }
  else
  {
    bic(i, UPILFGLB);
    bic(i, UPILFMUL);
  }

  lon2->lonusr  = u;
  lon2->lonusrl = (word)ul;
  lon2->lonpsw  = p;
  lon2->lonpswl = (word)pl;
  lon2->lonaud  = 0;
  lon2->lonflg  = i;
  lon2->lonrev  = (eword)r;
  lon2->lonpadl = NULLP(eword);



  lon2->lontrm  = terminal;
  lon2->lontrml = (word)sigtu(&se, terminal, M_TERM);
  if (SERC_ERROR(se))
  {
    error = (word)SERC_OERC(se);
    goto bad;
  }



  lon2->lonsid  = username;
  lon2->lonsidl = (word)sigunmu(&se, username, M_UNML);
  if (SERC_ERROR(se))
  {
    error = (word)SERC_OERC(se);
    goto bad;
  }



  lon2->lonmnm  = machine;

  lon2->lonmnml = (word)slkmnm(&se, machine, M_HOST);
  if (SERC_ERROR(se))
  {
    error = (word)SERC_OERC(se);
    goto bad;
  }



  lon2->lonpid  = ospid;
  lon2->lonpidl = (word)sigpidu(&se, ospid, M_PIDL);
  if (SERC_ERROR(se))
  {
    error = (word)SERC_OERC(se);
    goto bad;
  }



  lon2->lonpnm  = pgmname;
  lon2->lonpnml = (word) sigpnmu(&se, pgmname, M_PGNML);
  if (SERC_ERROR(se))
```

64

```
{
  error = (word)SERC_OERC(se);
  goto bad;
}



if (lon2->lonatr = hst->hstatr)
{
  ub1 *atr;
  word i;
  for(i = 1, atr = lon2->lonatr; *atr; atr++, i++);
  lon2->lonatrl = i;

  if (lon2->lonbd = hst->hstbd)
    lon2->lonbdl = (eword)*lon2->lonbd;
  else
    lon2->lonbdl = 0;

  if (lon2->lonsrv = HSTGSRV(hst))
  {
    ub2 length;
    DISCARD slmb2(lon2->lonsrv, &length);
    lon2->lonsrvl = length;
  }
  else
    lon2->lonsrvl = 0;
  lon2->lonsrvr = NULLP(ub2);
}
else {
  lon2->lonatrl = 0;
  lon2->lonbd   = NULLP(ub4);
  lon2->lonbdl  = 0;
  lon2->lonsrv  = NULLP(text);
  lon2->lonsrvl = 0;
  lon2->lonsrvr = NULLP(ub2);
}

if (u == NULLP(text) || u == (text *)-1)
{
  lon->lonusr  = NULLP(text);
  lon->lonusrl = 0;
}
else if (ul == (size_t)-1) lon->lonusrl = (word)strlen((char *)u);


if (p == NULLP(text) || p == (text *)-1)
{
  lon->lonpsw  = NULLP(text);
  lon->lonpswl = 0;
}
else if (pl == (size_t)-1) lon->lonpswl = (word)strlen((char *)p);

for (retry = NRETRY; retry; retry--)
{
  error = upirtr(hst, O2LOGON, (pisdef *)lon2);
  if (error != OER(60)) break;
}


if (error == OER(1010) || error == OER(3115))
{

  if (lon2->lonsrv) genclr((ptr_t)lon2->lonsrv, (size_t)lon2->lonsrvl);
  if (lon2->lonbd)  genclr((ptr_t)lon2->lonbd,  (size_t)lon2->lonbdl );

  for (retry = NRETRY; retry; retry--)
  {
    error = upirtr(hst, OLOGON, (pisdef *)lon);
    if (error != OER(60)) break;
  }
}
```

```
  if (error) goto bad;


  bis(hst->hstflg, HSTFLOGON);


  if ( hst->hstpro >= HSTPV7 && (lid = lihcrenv((dvoid *)&hnd)) != LI_NULL )
  {
    word  cursor;
    text  stat[150];
    text  lnam[LIM_LIMAX];
    text  tnam[LIM_LIMAX];

    DISCARD lihlinfo(lid,LILAN,lnam,LIM_LIMAX -1);
    DISCARD lihlinfo(lid,LICTERRITORY,tnam,LIM_LIMAX -1);
    if ( !(error = upiopn(hst, &cursor, -1)) )
    {

      if (liwalpha((liwchar)'|',lid) ||
          liwalpha((liwchar)'@',lid))
      {
        DISCARD sprintf((char *)stat,
               "alter session set nls_language= \'%s\' nls_territory= \'%s\' \
nls_special_chars= \'|@\'",
                 lnam,tnam);
      }
      else
      {

        DISCARD sprintf((char *)stat,
               "alter session set nls_language= \'%s\' nls_territory= \'%s\'",
                lnam,tnam);
      }
      error = upipse(hst,cursor,stat,strlen((char *)stat));
    }

    DISCARD upicls(hst, cursor);

    if (error)
      if ( ul != 8 || lmemlcmp((dvoid *)"internal", (dvoid *)u, ul) )
        goto logout_exit;
      else
        error = 0;
  }

  if (error) goto logout_exit;

  if (bit(hst->hstflg,HSTFEXT) && (hst->hsteun.hstext))

    CLRSTRUCT((hst->hsteun.hstext)->hxises);

  /*************************************************************
   * KSR-specific code begins here:
   */
#ifdef KSR
  if (!error)
  {
    word i;
    __private extern bool KSR_qd_enabled;
    qd_init();

    /* Now check whether QD is enabled.  If this is the initial
     * user connection, then qd_init has just checked the environment,
     * and set KSR_qd_enabled appropriately.  If this is a connection
     * for a parallel subquery, then KSR_qd_enabled is FALSE, and we
     * don't want to do anything here.  If this is a re-connection as
     * a different user at the top level, KSR_qd_enabled retains its
     * previous setting, as determined from the environment when the
     * first top-level connection was made.
     */
    if (KSR_qd_enabled)
    {
```

Sep 20 1993 13:39:56 puplog.c Page 7

```
        QDBEGIN("pupilam");
        bis(hst->hstflg, HSTFLOGON);                    /* indicate logged on */

        /* Sometimes, e.g. from sqlplus, user name and password
         * are passed in as one string, separated by a slash.  If so,
         * fix up.
         */
        if (!p)
        {
            p = strchr(u, '/');
            if (p)
            {
                pl = ul;
                ul = p - u;
                p++;
                pl -= (ul + 1);
            }
        }
        for (i = 0; i < ul; i++)
            if (isalpha(u[i]))
                QDpcom->cnx.user[i] = toupper(u[i]);
            else
                QDpcom->cnx.user[i] = u[i];
        QDpcom->cnx.user[ul] = 0;
        if (p)
        {
            strncpy(QDpcom->cnx.pwd, p, pl);
            QDpcom->cnx.pwd[pl] = 0;
        }

        /* Perform (re)initialization for this connection */
        qd_init_cnx();

        QDEND;
    }
  }
/*  else printf("upilam: error: %d\n", error); */
#endif /* KSR */
  /************************************************************
   * KSR-specific code ends here.
   */

  hst->hstoer.oerrcd =
    (ub2)error;
  return(error);
 logout_exit:

  DISCARD upilof(hst);
  bic(hst->hstflg,HSTFLOGON);
 bad:
  if (bit(hst->hstflg, HSTFICON)) DISCARD upidhs(hst);
  return(hst->hstoer.oerrcd = (ub2)error);
}



word          upilof(hst)
reg0 hstdef  *hst;
{
  word   rcode;

  SETUPI(hst);
  rcode = upirtr(hst, OLOGOFF, (pisdef *)0);
  bic(hst->hstflg, HSTFLOGON);
  if (bit(hst->hstflg, HSTFICON))
    DISCARD upidhs(hst);
  return(rcode);
}
```

65

4

Sep 20 1993 13:39:58 pupipar.c Page 1

```
/****************************************************************************
 * pupipar.c - QD Parallel UPI version of routines from upipar.c
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE      AUTHOR  DESCRIPTION
 * ---   --------  ------  ------------------------------------------------
 * %03   08/20/93  EYT     Call to qdrt_free sets pointer=NULL
 * %02   09/29/92  EYT     use QD descriptor to get # of bind variables
 * %01   09/04/92  EYT     if QD, don't have Oracle parse
 *                         use QD descriptor to get # of columns
 * %00   12/03/91  JM      Initial Version
 ****************************************************************************
 */
#define QDNODEBUG 1
#ifndef QDSTD
#include <qdstd.h>
#endif
#ifndef QDPUEXT
#include <qdpuext.h>
#endif
#ifndef QDCPEXT
#include <qdcpext.h>
#endif
#ifndef QDBBEXT
#include <qdbbext.h>
#endif
#ifndef QDERRS
#include <qderrs.h>
#endif




#include <orastd.h>
#ifndef HSTDEF
#include <hstdef.h>
#endif
#ifndef OPIDEF
#include    <opidef.h>
#endif
#ifndef UPIDEF
#include    <upidef.h>
#endif
#ifndef KPU
#include <kpu.h>
#endif
#ifndef KPUSCN
#include <kpuscn.h>
#endif
#ifndef KPUL
#include <kpul.h>
#endif
#ifndef OCTDEF
#include <octdef.h>
#endif
/* KSR: need sqlda for def of ppcur->select_desc */
#include <sqlda.h>


word     upiosq(hst, cnumber, stringa, stringl)
hstdef   *hst;
word     cnumber;
```

Sep 20 1993 13:39:58 pupipar.c Page 2

```
CONST text    *stringa;
size_t   stringl;
{
  oxqdef   o;
  word err;
  eword sqltyp;

  /**************************************************************************
   * KSR-specific code begins here
   **************************************************************************
   */
KSRcp("upiosq",1)
  if (KSR_qd_enabled)
  {
      reg1 QDSTATUS retval;
      QDPCURSOR *ppcur;
      text *pqtext = stringa;

      QDBEGIN("pupiosq");
KSRcp("upiosq",2)
      KSR_qd_enabled = FALSE;
      qdpu_save_sqllib();

      QDDprintf(("Entering pupiosq, cnumber: %d\n", cnumber));

      /* We expect a zero-terminated string.  If it isn't already zero-
       * terminated, do so now. (This may become a problem if a string
       * is ever passed in without an extra byte.)
       */

      if (pqtext[stringl] != 0)
         pqtext[stringl] = 0;

      /* Do we already have a pcursor with this cursor number?  If so,
       * close and delete it, because if calling program is recycling
       * the cursor number, we assume that the previous pcursor with this
       * number should have been closed and deleted, but was not, due to
       * some error.
       */
      if (ppcur = qdpu_getpcur(hst, cnumber))
      {
          /* Is this a dummy pcursor for an EXPLAIN statement? If so,
           * we have already executed the EXPLAIN statement in pupiosq,
           * so just free it, don't close it.
           */
          if (ppcur->check != QDCK_DUMMY)
          {
              qdpu_save_sqllib();

              (*(ppcur->pctree->hdr.pfunc))
                  (ppcur->pctree, QDBB_REQ_CLOSE,
                   ppcur->pbtt);

              qdpu_restore_sqllib();
          }
          qdbb_freepcur(&ppcur, &(QDpcom->cnx));
      }

      /* Call qdcp_prep to decompose the query.  If there is an error,
       * it will be returned in retval, and also posted in QD_STATUS.
       * If there is a warning (typically, that query is not legally or
       * effectively decomposable), it will be returned in retval but
       * not posted in QD_STATUS.  For now (12/10/91), fall through in
       * either case and let Oracle parse the query normally, without
       * decomposition (because error may simply mean statement was not
       * a SELECT statement, or was not decomposable for some other
       * reason).
       */
      retval = qdcp_prep(stringa, cnumber);

      /* Re-enable QD, unless it's been disabled at the database level */
      if (retval != QD_CP_DISABLED)
         KSR_qd_enabled = TRUE;
```

1

Sep 20 1993 13:39:58 pupipar.c Page 3

```
    qdpu_restore_sqllib();
    QDEND;

    if (retval == 0 && QD_STATUS == 0)                          /*%01*/
        return(hst->hstoer.oerrcd = 0);                         /*%01*/

/* define QD_RETURN_PARSE_ERRORS 1 */
#ifdef QD_RETURN_PARSE_ERRORS
    else if (QD_STATUS != 0)
    {
        printf("pupipar: QD_STATUS %d\n", QD_STATUS);
        return(hst->hstoer.oerrcd = QD_RETURN_STATUS);
    }
#endif /* QD_RETURN_PARSE_ERRORS */
    /* Else fall through */
  }
  /**********************************************************************
   * KSR-specific code ends here
   **********************************************************************
   */

  SETUPI(hst);
  o.osqc    = (eword)cnumber;
  o.osqtxt  = (text *)stringa;
  o.osqtxtl = (word)stringl;

  if (o.osqtxt == NULLP(text) || o.osqtxt == (text *)-1)
  {
    o.osqtxt  = NULLP(text);
    o.osqtxtl = 0;
  }
  else if (o.osqtxtl == -1) o.osqtxtl = (word)strlen((char *)o.osqtxt);
  if (HSTKPU(hst))
  {
    kpucx *ccx;

    HSTASCON(hst);
    HSTASEXT(hst);

    if ((ccx = kpugc(hst,cnumber)) == (kpucx *)0)
      return(HSTSOER(hst,OER(1023)));
    if (err = kpulsc(hst,ccx,o.osqtxt,(sb4)o.osqtxtl, &sqltyp))
      return(err);
  }

  return(upirtr(hst, OSQL, (pisdef *)&o));
}



word    upipse(hst, cnumber, stringa, stringl)
hstdef  *hst;
word    cnumber;
CONST text    *stringa;
size_t  stringl;
{
  word err;
  osqdef   o;
  eword sqltyp;

  SETUPI(hst);
  o.osqc    = (eword)cnumber;
  o.osqtxt  = (text *)stringa;
  o.osqtxtl = (word)stringl;

  if (o.osqtxt == NULLP(text) || o.osqtxt == (text *)-1)
  {
    o.osqtxt  = NULLP(text);
    o.osqtxtl = 0;
```

Sep 20 1993 13:39:58 pupipar.c Page 4

```
  }
  else if (o.osqtxtl == -1) o.osqtxtl = (word)strlen((char *)o.osqtxt);

  if (HSTKPU(hst))
  {
    kpucx *ccx;

    HSTASCON(hst);
    HSTASEXT(hst);

    if ((ccx = kpugc(hst,cnumber)) == (kpucx *)0)
      return(HSTSOER(hst,OER(1023)));
    if (err = kpulsc(hst,ccx,o.osqtxt,(sb4)o.osqtxtl, &sqltyp))
      return(err);
  }

  return(upirtr(hst, OPARSEX, (pisdef *)&o));
}



word    upisyn(hst, cnumber, stringa, stringl, sdi)
hstdef  *hst;
word    cnumber;
CONST text    *stringa;
size_t  stringl;
word    sdi;

{
  osqdef   o;
  o.osqc    = (eword)cnumber;
  o.osqtxt  = (text *)stringa;
  o.osqtxtl = (word)stringl;

  if (o.osqtxt == NULLP(text) || o.osqtxt == (text *)-1)
  {
    o.osqtxt  = NULLP(text);
    o.osqtxtl = 0;
  }
  else if (o.osqtxtl == -1) o.osqtxtl = (word)strlen((char *)o.osqtxt);
  return(upirtr(hst, (word)(sdi ? OPARSDI : OPARSYN), (pisdef *)&o));
}



word    upihmi(hst, c, pselect, pinto, pvars)
hstdef  *hst;
word    c;
ub2     *pselect;
ub2     *pinto;
ub2     *pvars;
{
  hmidef   h;

  /**********************************************************************
   * KSR-specific code begins here
   **********************************************************************
   */
  if (KSR_qd_enabled)                                          /*+%01*/
  {
      /* If only request number of items in select list or bind list*/
      if ((pselect != NULL || pvars != NULL) && pinto == NULL)      /*%02*/
      {
        QDPCURSOR *ppcur;

        QDBEGIN("pupihmi");
        ppcur = qdpu_getpcur(hst, c);
```

Sep 20 1993 13:39:58 pupipar.c Page 5

```
        /* Has specified cursor been decomposed? */
        if (ppcur != NULL)
        {
            KSR_qd_enabled = FALSE;                              /*+%02*/
            if (pselect != NULL)
                *pselect = ppcur->pselect_desc->F;
            if (pvars != NULL)
                /* Don't include rowid values */
                *pvars = ppcur->pbind_desc->F - 2;               /*-%02*/
            KSR_qd_enabled = TRUE;
            QDEND;
            return(hst->hstoer.oerrcd = 0);
        } /* if (ppcur != NULL) */
    QDEND;
    }                                                            /*-%01*/
}
/***************************************************************************
 * KSR-specific code ends here
 ***************************************************************************
*/

SETUPI(hst);
if (HSTKPU(hst))
{
  kpucx *ctx;
  word err;

  HSTASCON(hst);
  HSTASEXT(hst);

  if ((ctx=kpugc(hst,c)) == (kpucx *)0)
    return(HSTSOER(hst,OER(1023)));
  if (bit(ctx->kpucxflg,KPUCXPRS))
    if (err=kpuexe(hst,c,ctx)) return(err);
}

h.hmic   = (eword)c;
h.hmisel = pselect;
h.hmiin2 = pinto;
h.hmivar = pvars;

return(upirtr(hst, OHOWMANY, (pisdef *)&h));
}



word upiosd(hst,c,str,strl,sqltyp,defflg)
hstdef *hst;
word    c;
reg1 CONST text   *str;
     sb4  strl;
     ub4   sqltyp;
reg6 word   defflg;
{
  reg2 sb4 actl = strl;
  reg0 kpucx *ccx;
  reg7 word retval;
       eword stmtyp;

  /***************************************************************************
   * KSR-specific code begins here
   ***************************************************************************
  */
KSRcp("upiosd",1)
  if (KSR_qd_enabled)
  {
      reg1 QDSTATUS retval;
      QDPCURSOR *ppcur;
      text *pqtext = str;

      QDBEGIN("pupiosd");
```

Sep 20 1993 13:39:58 pupipar.c Page 6

```
KSRcp("upiosd",2)
      KSR_qd_enabled = FALSE;
      qdpu_save_sqllib();

      QDDprintf(("Entering pupiosq, cnumber: %d\n", cnumber));

      /* We expect a zero-terminated string.  If it isn't already zero-
       * terminated, do so now.  (This may become a problem if a string
       * is ever passed in without an extra byte.)
       */
      if (pqtext[strl] != 0)
          pqtext[strl] = 0;

      /* Do we already have a pcursor with this cursor number?  If so,
       * close and delete it, because if calling program is recycling
       * the cursor number, we assume that the previous pcursor with this
       * number should have been closed and deleted, but was not, due to
       * some error.
       */
      if (ppcur = qdpu_getpcur(hst, c))
      {
          /* Is this a dummy pcursor for an EXPLAIN statement? If so,
           * we have already executed the EXPLAIN statement in pupiosq,
           * so just free it, don't close it.
           */
          if (ppcur->check != QDCK_DUMMY)
          {
              qdpu_save_sqllib();

              (*(ppcur->pctree->hdr.pfunc))
                  (ppcur->pctree, QDBB_REQ_CLOSE,
                   ppcur->pbtt);

              qdpu_restore_sqllib();
          }
          qdbb_freepcur(&ppcur, &(QDpcom->cnx));
      }

      /* Call qdcp_prep to decompose the query.  If there is an error,
       * it will be returned in retval, and also posted in QD_STATUS.
       * If there is a warning (typically, that query is not legally or
       * effectively decomposable), it will be returned in retval but
       * not posted in QD_STATUS.  For now (12/10/91), fall through in
       * either case and let Oracle parse the query normally, without
       * decomposition (because error may simply mean statement was not
       * a SELECT statement, or was not decomposable for some other
       * reason).
       */
      retval = qdcp_prep(str, c);

      /* Re-enable QD, unless it's been disabled at the database level */
      if (retval != QD_CP_DISABLED)
          KSR_qd_enabled = TRUE;
      qdpu_restore_sqllib();

      /* Set statement type in hstdef from value set by qdcp_prep in
       * QDcom
       */
      hst->hstoer.oertyp = QDpcom->oertyp;

      QDEND;

      /* If there's any error, or if we're going to let ORACLE  */
      /*  describe the select list, then fall through and let   */
      /*  ORACLE parse the query.  If we're going to let        */
      /*  describe the select list, flag the cursor accordingly */

      if (retval == 0 && QD_STATUS == 0)
      {
          /* We don't need to describe INSERT statements */
          if (QD_ora_describe && !(QDpcom->oertyp == OCTINS))
          {
              ppcur = qdpu_getpcur(hst, c);
```

Sep 20 1993 13:39:58 pupipar.c Page 7

```
            ppcur->flags |= QD_PCUR_ORA_DESCRIBE;

            /* And fall through to let ORACLE parse the query */
          }
        else
            return(hst->hstoer.oerrcd = 0);
      }
/* define QD_RETURN_PARSE_ERRORS 1 */
#ifdef QD_RETURN_PARSE_ERRORS
      else if (QD_STATUS != 0)
      {
          printf("pupipar: QD_STATUS %d\n", QD_STATUS);
          return(hst->hstoer.oerrcd = QD_RETURN_STATUS);
      }
#endif /* QD_RETURN_PARSE_ERRORS */
      /* Else fall through */
  }
  /***********************************************************************
   * KSR-specific code ends here
   ***********************************************************************
  */

  SETUPI(hst);

  if ((str == (text *)0)  || (str == (text *)-1))
  {
    str = (text *)0;
    strl = (sb4)0;
  }
  else if (actl == -1) strl = (sb4)strlen((char *)str);
  if (hst->hstpro < HSTPV7)
  {
    if (sqltyp > KPULLNTV) return(HSTSOER(hst,OER(1011)));
    else return(upiosq(hst,c,str,(size_t)strl));
  }
  else if (!kpugml() || !defflg)
  {
    al7def pis;

    CLRSTRUCT(pis);
    pis.al7csr = (eword)c;
    pis.al7opt = KPUCXPRS;
    pis.al7sqlp =  (text *)str;
    pis.al7sqll = (ub4)strl;
    pis.al7i4   = &sqltyp;
    pis.al7i41  = (eword)1;
    if (retval = upirtr(hst,OSQL7,(pisdef *) &pis)) return(retval);
    if (kpugml())
    {
      HSTASCON(hst);
      HSTASEXT(hst);
      if ((ccx = kpugc(hst,c)) == (kpucx *)0) return(HSTSOER(hst,OER(1023)));
      retval = kpulsc(hst,ccx,str,(sb4)strl, &stmtyp);
    }
    return(retval);
  }

  HSTASCON(hst);
  HSTASEXT(hst);


  if ((ccx = kpugc(hst,c)) == (kpucx *)0) return(HSTSOER(hst,OER(1023)));
  retval = kpulsc(hst,ccx,str,(sb4)strl, &stmtyp);

  bis(ccx->kpucxflg,KPUCXPRS);
  if (!retval && (stmtyp == KPU_SELECT)) hst->hstoer.oertyp = (ub1)OCTSEL;
  else hst->hstoer.oertyp = (ub1)0;
  ccx->kpucxstm = (text *)str;
  ccx->kpucxstl = (word)strl;
  ccx->kpucxsty = sqltyp;
  return(HSTSOER(hst,retval));
}
```

Sep 20 1993 13:39:58 pupipar.c Page 8

```
STATICF word upistc(hst, pls, bv, bl, bvnum, ind, indl, inum, callc)
hstdef *hst;
bool    pls;
text   *bv;
word    bl;
word    bvnum;
text   *ind;
word    indl;
word    inum;
ptr_t   callc;
{
  return((word)0);
}


eword upisty(hst,stmt,stmtl, stmtyp, lang)
hstdef *hst;
text *stmt;
size_t stmtl;
eword *stmtyp;
ub4   lang;
{
  eword ftkn;
  eword err;

  if (err = (eword)kpuscn(hst,stmt,(sb4)stmtl,upistc, (dvoid *)0, &ftkn))
    return(err);
  switch(ftkn)
  {
  case KPU_SELECT:
  case KPU_UPDATE:
  case KPU_DELETE:
  case KPU_INSERT:
  case KPU_CREATE:
  case KPU_ALTER: *stmtyp = UPIST_SQ;
                break;
  case KPU_BEGIN:
  case KPU_DEC: *stmtyp = UPIST_PL;
              break;
  default: *stmtyp = UPIST_UK;
           break;
  }
  return((eword)0);
}
```

Sep 20 1993 16:18:32 pupisup.c Page 1

```
/***************************************************************************
 * pupisup.c - QD Parallel UPI version of routines from upisup.c
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***************************************************************************
 * REV   DATE      AUTHOR   DESCRIPTION
 * ---   --------  ------   -----------------------------------------------
 * %01   08/16/93  EYT      Call to qdrt_free sets pointer=NULL
 * %00   10/01/92  EYT      Initial Version
 ***************************************************************************
*/
#define QDNODEBUG 1
#ifndef QDSTD
#include <qdstd.h>
#endif
#ifndef QDPUEXT
#include <qdpuext.h>
#endif
#ifndef QDBBEXT
#include <qdbbext.h>
#endif
#ifndef QDERRS
#include <qderrs.h>
#endif




#ifndef S
#include <s.h>
#endif
#ifndef HSTDEF
#include <hstdef.h>
#endif
#include <string.h>
#ifndef BDL
#include <bdl.h>
#endif
#ifndef DTYDEF
#include <dtydef.h>
#endif
#ifndef GENDEF
#include <gendef.h>
#endif
#ifndef IFCDEF
#include <ifcdef.h>
#endif
#ifndef KPU
#include <kpu.h>
#endif
#ifndef OACDEF
#include <oacdef.h>
#endif
#ifndef OERDEF
#include    <oerdef.h>
#endif
#ifndef OPIDEF
#include    <opidef.h>
#endif
#ifndef OSN
#include <osn.h>
#endif
#ifndef PICDEF
#include <picdef.h>
#endif
#ifndef SPARAMS
#include <sparams.h>
#endif
```

Sep 20 1993 16:18:32 pupisup.c Page 2

```
#ifndef TTC
#include    <ttc.h>
#endif
#ifndef TTCDEF
#include <ttcdef.h>
#endif
#ifndef TTCCDF
#include    <ttccdf.h>
#endif
#ifndef TTIDEF
#include    <ttidef.h>
#endif
#ifndef UACDEF
#include <uacdef.h>
#endif
#ifndef UCADEF
#include <ucadef.h>
#endif
#ifndef UPIDEF
#include    <upidef.h>
#endif
#ifndef KPUL
#include <kpul.h>
#endif
/* KSR: need sqlda for def of ppcur->pbind_desc */
#include <sqlda.h>



struct allsx {
  ucadef *allsxuca;
  ub4     allsxnbd;
  ub4     allsxnit;
  ub4     allsxitn;
  boolean allsxhin;
};
typedef struct allsx allsx;


struct alltw
{
  ucadef    alltwuca;
  ub1       alltwxtr[L_UPICSV-sizeof(ttsdef)];
  uacdef    alltwuac;


};
 typedef struct alltw alltw;


struct allin
{
  ub4       allinckw;
  size_t    allinsuo;
  word      allinspd;
  allsx     allinctx;
  alltw     allinttw;
};
typedef struct allin allin;

#define ALLINCW 0xABCD


#define ALLUCAPNUL ((word (*)(/*_ struct hstdef *, ub1 * _*/))0)
#define ALLUCACNUL ((ub1 *)0)


#define ALLIOOFF(n) ((n) * sizeof(uacdef))
```

1

Sep 20 1993 18:18:32 puplsup.c Page 3

```
STATICF word upispp(hst, ctx)
hstdef *hst;
ub1    *ctx;
{
  reg1 allsx  *bdxp = (allsx *)ctx;
  reg2 ucadef *uca = bdxp->allsxuca;
  reg0 rxhdef *rxh = &(uca->ucatti.ucarxh);


  if(uca->ucasta == 3)
  {

    if(bdxp->allsxnbd == 0) return(0);
    if (!bdxp->allsxhin) return(0);
    uca->ucasta = 11;
    rxh->rxhflg = RXHFEOR;
    bis(rxh->rxhflg, RXHFU2O);
    rxh->rxhcnt = (ub1) bdxp->allsxnbd;
    rxh->rxhitn = (ub2) bdxp->allsxitn;
    rxh->rxhnit = (ub2) (bdxp->allsxnit - bdxp->allsxitn);
    rxh->rxhacl = 0;
  }


  else if(uca->ucasta == 4)
  {
    uca->ucasta = 13;
    if(rxh->rxhacl == 0)
    {
      rxh->rxhitn = (ub2) bdxp->allsxitn;
      rxh->rxhnit = (ub2) bdxp->allsxnit;
    }
  }
  return(0);
}



#define UPIACSPNUL ((word (*)(/*_ ub4 col, ub4 iter, ub4 elt, ptr_t ctx, \
                                 ptr_t *bfa, b2 **indpp, ub2 **alnpp, \
                                 ub2 **rcpp _*/)) 0)
#define UPIACSCNUL ((ptr_t)(0))

STATICF word upirt2(hst, fcode, argv, callp, callc, bdw)
reg0 hstdef  *hst;
     word    fcode;
     pisdef *argv;
     word   (*callp)(/*_ hstdef *hst, ub1 *ctx _*/);
     ub1     *callc;
reg3 alltw  *bdw;
{
  reg1 ucadef *uca = &(bdw->alltwuca);
  reg2 uword   err;
  reg4 word    hadbuf;

  SETUPI(hst);
  hadbuf = TRUE;
  if (!hst->hstebuf)
  {
    hadbuf = FALSE;
    hst->hstebuf = (text *)upiheb;
    hst->hstebfs = min(504, sizeof(upiheb));
  }

#ifdef YXW
again:
#endif
  hst->hstoer.oerrcd = 0;
  hst->hstoer.oerose = 0;
  uca->ucahst          = hst;
  uca->ucasta          = 0;
  uca->ucauac          = &(bdw->alltwuac);
```

Sep 20 1993 18:18:32 puplsup.c Page 4

```
  uca->ucafcn          = (ub1)fcode;
  uca->ucapis          = argv;
  uca->ucacallp        = callp;
  uca->ucacallc        = callc;
  uca->ucaacprc        = UPIACSPNUL;
  uca->ucaacctx        = UPIACSCNUL;
  uca->ucacctx         = (ptr_t)0;
  uca->ucactyp         = 0;


  if (!bit(hst->hstflg, HSTFCONN))
  {
    if (bit(ttcpic[fcode].picopt, (SFF | NS)))
    {
      if (upiahs(hst, NULLP(text), 0))
        goto ret;
      bis(hst->hstflg, HSTFEXIT);
    }
#ifdef YKW
    else if (err = upilon(hst, "", 0, "", 0, 0))
    {
      hst->hstoer.oerrcd = err;
      goto ret;
    }
    else if (err == 0) goto again;
#endif
    else
    {
      err = OER(3114);
      goto badError;
    }
  }

  if (err = (uword) TTCWAIT(hst, FADDR(ttcdrv), (char *)uca,
                   (int *)&hst->hstoer.oerose, 0))   goto badError;

#ifdef YKW
  if (hst->hstoer.oerrcd == OER(1012))
    if (err = upilon(hst, "", 0, "", 0, 0))
    {
      hst->hstoer.oerrcd = err;
      goto ret;
    }
    else goto again;
#endif

  if (bit(hst->hstflg, HSTFEXIT)) goto dropConn;

  goto ret;

badError:
  if (bit(hst->hstflg, HSTFCONN))
  {
    if (err == TTCR_EOF)
    {
      bic(hst->hstflg, HSTFCONN);
      DISCARD TTCDISC(hst);
    }
    else if (err == TTCR_BRK)
      if (err = (uword) TTCRESET(hst)) goto badError;
      else
      {
        hst->hstoer.oerrcd = OER(1013);
        goto ret;
      }
  }
  hst->hstoer.oerrcd = (ub2)err;

dropConn:
  if (bit(hst->hstflg, HSTFCONN))
    DISCARD TTCDISC(hst);
  hst->hstflg = 0;
ret:
```

Sep 20 1993 16:18:32 pupisup.c Page 5

```
  if (!hadbuf)
  {
    hst->hstebuf = NULLP(text);
    hst->hstebfs = 0;

  }
  return(hst->hstoer.oerrcd);
}


STATICF word upisxn(hst, cnumber, iters, roff, memptr, ttcallp)
reg2  hstdef  *hst;
      word     cnumber;
      ub4      iters;
      ub4      roff;
      ptr_t    memptr;
      word     (*ttcallp)(/*_ hstdef *hst, ub1 *ctx _*/);
{
  reg1 allin *allinfo = (allin *) memptr;
       exedef  e;
  reg0 exedef *eptr = &e;

  eptr->execid = (eword) cnumber;
  eptr->exenit = (eword) iters;
  eptr->exerof = (eword) roff;

  if(allinfo->allinckw != ALLINCW)
    return(hst->hstoer.oerrcd = OER(2037));


  return(upirt2(hst, OEXEC, (pisdef *)eptr, ttcallp,
               (ub1 *) &(allinfo->allinctx), &(allinfo->allinttw)));
}

word upial7(hst, c, opflags, stmt, stmtl, sqlt, iters, roff, dfncnt, dfndsc,
            bndcnt, bnddsc, dcallp, dcallc, bcallp, bcallc, memcall, iovec,
            memptr)
reg2  hstdef *hst;
      word    c;
reg9  ub2     opflags;
reg12 ub4     iters;
      ub4     roff;
reg10 text   *stmt;
reg11 size_t  stmtl;
      ub4     sqlt;
reg8  ub4     dfncnt;
      uaddef *dfndsc;
reg3  ub4     bndcnt;
      ua2def *bnddsc;
reg13 void (*dcallp)(/*_ word item, udedef *ude,
                        ptr_t dcallc _*/);
reg14 ptr_t  dcallc;
      void (*bcallp)(/*_ word item, ub1 flg, text *bnm, ub2 bnl,
                       text *inm, ub2 inl, ptr_t callc _*/);
      ptr_t  bcallc;
      ptr_t  (*memcall)(/*_ size_t nbytes _*/);
      ub1    *iovec;
reg5  ptr_t  *memptr;
{
  reg1 word    err;
       alldef  parms;
  reg0 alldef *allptr = &parms;
  reg6 word    speedp;
  reg7 allin  *allinfo;
  reg4 ucadef *ucaptr;
       word    curs_opn = FALSE;
       ua2def *tmpbdsc = bnddsc;
       uaddef *tmpddsc = dfndsc;


  ub4     ndfn;
  oacdef *doac;
```

Sep 20 1993 16:18:32 pupisup.c Page 6

```
  ub1    *duac;
  size_t  duacln;


  oacdef *boac;
  ub1    *buac = (ub1 *)0;
  size_t  buacln;
  ub4     nbnd;
  bdlbb  *bbatch;
  size_t  cpuacsz = 0;


  udsdef *uds;
  text   *dcolnm;
  ub2     dtnit = BDLMDITM;
  ub2     dcnit = 0;
  ub2     drnml;


  udbdef *udb;
  text   *bvnm;
  text   *binm;
  ub2     btnit = BDLMBITM;
  ub2     bcnit = 0;
  ub2     brbnl;
  ub2     brinl;

  oacdef *bdloac = (oacdef *)0;
  ub1    *bdluac = (ub1 *)0;

  SETUPI(hst);

  /* Check for legal combinations of options before executing
   * KSR-specific code.
   */
  if (bit(opflags,-UOPF_LGL))
  {
    *memptr = (ptr_t) 0;
    err =OER(2035);
    goto ex;
  }
  if(err = bdlvbo(opflags))
  {
    *memptr = (ptr_t) 0;
    goto ex;
  }

  /***********************************************************************
   * KSR-specific code begins here
   ***********************************************************************
   */
  if (KSR_qd_enabled)
  {
      QDPCURSOR *ppcur;
      QDSTATUS retval;

      /* Initialize ppcur to NULL, then if we've been called for more
       * than one function, we'll only have to search for the cursor
       * once.
       */
      ppcur = NULL;

      /* Called for parse?
       * (NB: Do we need to check other things, e.g. bndcnt or dfncnt,
       * before deciding if this is an appropriate call to decompose?)
       */
      if (bit(opflags, UOPF_PRS))
      {
          /* This code is adapted from the PUPI version of upiosq,
           * in pupipar.c .
           */

          QDBEGIN("pupial7:parse");
```

73

```
        KSR_qd_enabled = FALSE;
        qdpu_save_sqllib();

        QDDprintf(("Entering pupial7, c(ursor number): %d\n", c));

        /* We expect a zero-terminated string.  If it isn't already zero-
         * terminated, do so now. (This may become a problem if a string
         * is ever passed in without an extra byte.)
         */
        if (stmt[stmtl] != 0)
            stmt[stmtl] = 0;

        /* Do we already have a pcursor with this cursor number?  If so,
         * close and delete it, because if calling program is recycling
         * the cursor number, we assume that the previous pcursor with this
         * number should have been closed and deleted, but was not, due to
         * some error.
         */
        if (ppcur = qdpu_getpcur(hst, c))
        {
            /* Is this a dummy pcursor for an EXPLAIN statement? If so,
             * we have already executed the EXPLAIN statement in pupiosq,
             * so just free it, don't close it.
             */
            if (ppcur->check != QDCK_DUMMY)
            {
                qdpu_save_sqllib();

                (*(ppcur->pctree->hdr.pfunc))
                    (ppcur->pctree, QDBB_REQ_CLOSE,
                     ppcur->pbtt);

                qdpu_restore_sqllib();
            }
            qdbb_freepcur(&ppcur, &(QDpcom->cnx));
        }

        /* Call qdcp_prep to decompose the query.  If there is an error,
         * it will be returned in retval, and also posted in QD_STATUS.
         * If there is a warning (typically, that query is not legally or
         * effectively decomposable), it will be returned in retval but
         * not posted in QD_STATUS.  For now (12/10/91), fall through in
         * either case and let Oracle parse the query normally, without
         * decomposition (because error may simply mean statement was not
         * a SELECT statement, or was not decomposable for some other
         * reason).
         */
        retval = qdcp_prep(stmt, c);

        /* Re-enable QD, unless it's been disabled at the database level */
        if (retval != QD_CP_DISABLED)
            KSR_qd_enabled = TRUE;
        qdpu_restore_sqllib();
        QDEND;

        /* Don't return yet if we have another operation to
         * perform.
         */
        if (retval == 0 && QD_STATUS == 0
            && !(bit(opflags, UOPF_EXE) || bit(opflags, UOPF_BND)
                 || bit(opflags, UOPF_DBL)))
            return(hst->hstoer.oerrcd = 0);

        /* define QD_RETURN_PARSE_ERRORS 1 */
#ifdef QD_RETURN_PARSE_ERRORS
        else if (QD_STATUS != 0)
        {
            printf("pupial7 (parse): QD_STATUS %d\n", QD_STATUS);
            return(hst->hstoer.oerrcd = QD_RETURN_STATUS);
        }
#endif /* QD_RETURN_PARSE_ERRORS */
        /* Else fall through */
```

```
    } /* called for parse */

    /* Describe Bind List call */
    /* (JM 11/24/92: This code was added earlier by EYT. For now I'm
     * assuming that a given call to upial7 will EITHER execute the
     * code above for parse, OR the code below for bind, OR the code
     * above for fetch.  We need to determine whether the two functions
     * ever get bundled in a single call.)
     * (JM 04/14/93: I was wrong.  Parse, bind, and execute may be
     * combined in one call, when using ORACLE7 pcc.  Describe bind
     * list was used by programs preprocessed with ORACLE v6 preprocessor,
     * which use BIND, combined with PARSE and EXECUTE, when preprocessed
     * with ORACLE7 preprocessor.)
     */
    if (bit(opflags, UOPF_DBL))
    {
        word n;
        QD_SQLGBC *pbcallc;

        QDBEGIN("pupial7:descrbind");
        if (ppcur == NULL)
            ppcur = qdpu_getpcur(hst, c);

        pbcallc = bcallc;
        /* Has specified cursor been decomposed? */
        if (ppcur != NULL)
        {
            text **pvnp=pbcallc->vnp;          /* value buffer */
            ub2   *pvnmxl=pbcallc->vnmxl;      /* buffer length */
            ub2   *pvncul=pbcallc->vncul;      /* value length */
            text **pinp=pbcallc->inp;          /* indicator var buffer */
            ub2   *pinmxl=pbcallc->inmxl;      /* indicator buffer */
                                               /* length */
            ub2   *pincul=pbcallc->incul;      /* indicator var length */
            ub2   *pbvtyp=pbcallc->bvtyp;      /* bind var type */
            ub2   type;

            /* Set number of bind variables */
            *(pbcallc->found) = ppcur->pbind_desc->F - 2;

            for (n = 1; n <= (ppcur->pbind_desc->F - 2); n++)
            {
                /* Note: leave KSR_qd_enabled so upigbv uses QD bind
                   descriptor */
                if (pinp != NULL)
                    upigbv (hst, c, n,
                        *pvnp++, (int)*pvnmxl++, pvncul++,
                        *pinp++, (int)*pinmxl++, pincul++,
                        &type);
                else
                    upigbv (hst, c, n,
                        *pvnp++, (int)*pvnmxl++, pvncul++,
                        NULL, (int)0, NULL,
                        &type);

                /* Set bind var type */
                if (pbvtyp != NULL)
                    *pbvtyp++ = type;
            }
            QDEND;

            /* Return, unless we're combining EXECUTE in same call */
            if (!(bit(opflags, UOPF_EXE)))
                return(hst->hstoer.oerrcd = 0);
        } /* if (ppcur != NULL) */
        QDEND;
    } /* Describe bind list call */

    /* Called for BIND? */
    /* (This is adapted from code for upibnn in pupibdd.c) */

    if (bit(opflags, UOPF_BND))
    {
```

74

Sep 20 1993 16:18:32 pupisup.c Page 9

```
        word n;
        word pos;

        QDBEGIN("pupial7:bind");
        if (ppcur == NULL)
            ppcur = qdpu_getpcur(hst, c);

        /* Has specified cursor been decomposed? */
        if (ppcur != NULL)
        {
            for (n = 0; n < bndcnt; n++)
            {
                if (n < ppcur->rowid_posit)
                    pos = n;
                else
                    /* If variable position greater than the rowid bind */
                    /* variables, skip 2 places */
                    pos = n + 2;

                ppcur->pbind_desc->V[pos] = bnddsc[n].uadbufp;
                ppcur->pbind_desc->L[pos] = bnddsc[n].uadbufl;
                ppcur->pbind_desc->T[pos] = bnddsc[n].uaddtype;
                ppcur->pbind_desc->I[pos] = bnddsc[n].uadindp;
            }
            QDEND;

            /* Return, unless we're combining EXECUTE in same call */
            if (!(bit(opflags, UOPF_EXE)))
                return(hst->hstoer.oerrcd = 0);
        } /* if (ppcur != NULL) */
        QDEND;
    } /* BIND */

    /* Called for Execute? (used for opening cursor after parse */
    /* This code adapted from upiexn in pupiexf.c */
    if (bit(opflags, UOPF_EXE))
    {
        QDBEGIN("pupial7:exe");
        ppcur = qdpu_getpcur(hst, c);

        /* Has specified cursor been decomposed? */
        if (ppcur != NULL)
        {
            /* Is this a dummy pcursor for an EXPLAIN statement? If so,
             * we have already executed the EXPLAIN statement in pupiosq,
             * so just return success.
             */
            if (ppcur->check == QDCK_DUMMY)
            {
                QDEND;
                return (hst->hstoer.oerrcd = 0);
            }

            /* Don't decompose queries inside this call */
            KSR_qd_enabled = FALSE;

            qdpu_save_sqllib();

            /* NOTE: Actually, for opening a cursor for a query,
             * probably any iters value but 1 is illegal.  For now,
             * just ignore niters.
             */
            (*(ppcur->pctree->hdr.pfunc))
                (ppcur->pctree, QDBB_REQ_OPEN,
                 ppcur->pbtt);
            KSR_qd_enabled = TRUE;
            qdpu_restore_sqllib();

            /* Set host error buffer length to zero if error is being
             * returned, so when calling program calls upigml to get error
             * message, upigml will get a fresh message (otherwise, there
             * may be confusion between the message buffer, upiheb, filled
             * by a parallel subquery, and the message length, hst->hstebfl,
```

Sep 20 1993 16:18:32 pupisup.c Page 10

```
             * set previously by the main thread).
             */
            if (QD_RETURN_STATUS)
                hst->hstebfl = 0;

            QDEND;
            return (hst->hstoer.oerrcd = QD_RETURN_STATUS);
        } /* if (ppcur != NULL) */
        QDEND;
    }

    /* Called for define? */
    /* This code is adapted from code in upidfc, in pupibdd.c */
    if (bit(opflags, UOPF_DFN))
    {
        word n;
        word err;

        QDBEGIN("pupial7:define");
        if (ppcur == NULL)
            ppcur = qdpu_getpcur(hst, c);

        /* Has specified cursor been decomposed? */
        if (ppcur != NULL)
        {
            /* Don't decompose queries inside this call */
            KSR_qd_enabled = FALSE;

            qdpu_save_sqllib();

            /* Copy needed attributes from uaddef to ppcur->pselect_desc
             * for each column.
             */
            for (n = 0; n < dfncnt; n++, tmpddsc++)
            {
                ppcur->pselect_desc->V[n] = tmpddsc->uadbufp;
                ppcur->pselect_desc->L[n] = tmpddsc->uadbufl;
                ppcur->pselect_desc->T[n] = tmpddsc->uaddtype;
                ppcur->pselect_desc->I[n] = tmpddsc->uadindp;
                ppcur->plenptrs[n] = tmpddsc->uadfclp;
            }
            KSR_qd_enabled = TRUE;
            qdpu_restore_sqllib();
            QDEND;

            /* Don't return yet if we have another operation to
             * perform.
             */
            if (!(bit(opflags, UOPF_FCH)))
                return(hst->hstoer.oerrcd = 0);
        } /* if (ppcur != NULL) */
        QDEND;
    } /* Called for define */

    /* Called for fetch? */
    /* This code is adapted from code in upifcn, in pupiexf.c */
    if (bit(opflags, UOPF_FCH))
    {
        word i;
        word j;

        QDBEGIN("pupial7:fetch");
        if (ppcur == NULL)
            ppcur = qdpu_getpcur(hst, c);

        /* Has specified cursor been decomposed? */
        if (ppcur != NULL)
        {
            /* Don't decompose queries inside this call */
            KSR_qd_enabled = FALSE;
            qdpu_save_sqllib();
            QDDprintf(("Found ppcur\n"));
            for (i = 0; i < iters; i++)
```

Sep 20 1993 16:18:32 pupisup.c Page 11

```
    {
        /* array fetches, add offset: iteration * field buflen */
        /* to data buffer, indicator and length buffer pointers */
        for (j = 0; j < ppcur->pselect_desc->N; j++)
        {
            ppcur->pselect_desc->V[j] =
                (char *)(ppcur->pselect_desc->V[j] +
                         i * ppcur->pselect_desc->L[j]);
            ppcur->pselect_desc->I[j] =
                (short *)(ppcur->pselect_desc->I[j] + i);
            if (ppcur->plenptrs[j] != NULL)
                ppcur->plenptrs[j] =
                    (ub2 *)(ppcur->plenptrs[j] + i);
        }

        retval = (*(ppcur->pctree->hdr.pfunc))
            (ppcur->pctree, QDBB_REQ_NEXT,
             ppcur->pbtt);

        /* restore data buffer, indicator and length buffer */
        /* pointers to original positions */
        for (j = 0; j < ppcur->pselect_desc->N; j++)
        {
            ppcur->pselect_desc->V[j] =
                (char *)(ppcur->pselect_desc->V[j] -
                         i * ppcur->pselect_desc->L[j]);
            ppcur->pselect_desc->I[j] =
                (short *)(ppcur->pselect_desc->I[j] - i);
            if (ppcur->plenptrs[j] != NULL)
                ppcur->plenptrs[j] =
                    (ub2 *)(ppcur->plenptrs[j] - i);
        }

        /* Increment rowcount if fetch was successful */
        if (retval == QDBB_REPLY_READY)
            ++ppcur->rowcount;

        if (retval == QDBB_REPLY_EOD)
        /* Set EOD code - actually there may be an alternate code */
            hst->hstoer.oerrcd = QD_EOD;
        else
            hst->hstoer.oerrcd = QD_RETURN_STATUS;
        if (hst->hstoer.oerrcd)
            break;
    } /* for ... */

    hst->hstoer.oercid = c;

    /* Record cumulative rowcount in hstoer */
    hst->hstoer.oercnt = ppcur->rowcount;

    /* Set oertyp from value set by qdcp_prep in QDcom */
    hst->hstoer.oertyp = QDpcom->oertyp;

    /* Don't yet know what to return in oerepo, but have observed
     * real upi returning 12 for successful fetches.
     */
    hst->hstoer.oerepo = 12;

    qdpu_dspoer("pupifcn", &(hst->hstoer));

    KSR_qd_enabled = TRUE;
    qdpu_restore_sqllib();

    /* Set host error buffer length to zero if error is being
     * returned, so when calling program calls upigml to get error
     * message, upigml will get a fresh message (otherwise, there
     * may be confusion between the message buffer, upiheb, filled
     * by a parallel subquery, and the message length, hst->hstebfl,
     * set previously by the main thread).
     */
    if (hst->hstoer.oerrcd)
        hst->hstebfl = 0;
```

Sep 20 1993 16:18:32 pupisup.c Page 12

```
                QDEND;
                return (hst->hstoer.oerrcd);
            } /* if (ppcur != NULL) */
            QDEND;
        } /* fetch */

        /* Cancel after fetch? */
        if (bit(opflags, UOPF_CAN))
        {
            QDBEGIN("pupial7:cancel");
            ppcur = qdpu_getpcur(hst, c);

            /* Has specified cursor been decomposed? */
            if (ppcur != NULL)
            {
                /* Is this a dummy pcursor for an EXPLAIN statement? If so,
                 * we have already executed the EXPLAIN statement in pupiosq,
                 * so just return success.
                 */
                if (ppcur->check == QDCK_DUMMY)
                {
                    qdbb_freepcur(&ppcur, &(QDpcom->cnx));
                    QDEND;
                    return (hst->hstoer.oerrcd = 0);
                }

                /* Don't decompose queries inside this call */
                KSR_qd_enabled = FALSE;

                qdpu_save_sqllib();

                (*(ppcur->pctree->hdr.pfunc))
                    (ppcur->pctree, QDBB_REQ_CLOSE,
                     ppcur->pbtt);

                qdbb_freepcur(&ppcur, &(QDpcom->cnx));
                KSR_qd_enabled = TRUE;
                qdpu_restore_sqllib();

                /* Set host error buffer length to zero if error is being
                 * returned, so when calling program calls upigml to get error
                 * message, upigml will get a fresh message (otherwise, there
                 * may be confusion between the message buffer, upiheb, filled
                 * by a parallel subquery, and the message length, hst->hstebfl,
                 * set previously by the main thread).
                 */
                if (QD_RETURN_STATUS)
                    hst->hstebfl = 0;

                QDEND;
                return(hst->hstoer.oerrcd = QD_RETURN_STATUS);
            } /* if (ppcur != NULL) */
            QDEND;
        } /* cancel */
    } /* if (KSR_qd_enabled) */
/**************************************************************************
 * KSR-specific code ends here
 **************************************************************************
 */

if((*memptr != (ptr_t) 0) && bit(opflags, UOPF_EXE) &&
   !bit(opflags, UOPF_BND | UOPF_PRS | UOPF_DFN | UOPF_DSL | UOPF_DBL))
{
  allinfo = (allin *) *memptr;
  if(allinfo->allinckw != ALLINCW)
  {
    err = OER(2037);
    goto ex;
  }
  speedp = allinfo->allinspd;
}
```

Sep 20 1993 16:18:32 pupisup.c Page 13

```
else
{
  size_t membytes = 0;
  size_t bdlobytes = 0;
  size_t bdlubytes = 0;
  size_t doaco = 0;
  size_t boaco = 0;
  size_t buaco = 0;
  size_t udso = 0;
  size_t udbo = 0;
  size_t bbo = 0;

  *memptr = (ptr_t) 0;
  if(bit(opflags, UOPF_BND))
  {
    if(err = bdlsbp(FADDR(bdlfbc), (ptr_t) &tmpbdsc, iovec, bndcnt, iters,
                    FADDR(upiacp)))
      if(err == OER(2034))
        speedp = FALSE;
      else
        goto ex;
    else
      speedp = TRUE;
  }
  else
    speedp = FALSE;


  membytes = sizeof(allin)
    + (speedp ? max((size_t)bndcnt * sizeof(uacdef), L_UPIUAC) : L_UPIUAC)
      + (speedp && iovec ? (size_t)bndcnt : 0);
  if (bit(opflags, UOPF_DFN) && dfncnt)
  {
    size_t maxdfn = (size_t)BDLMDFN(L_UPIUAC);
    membytes = doaco = slalsu(membytes);

    bdlobytes = (size_t)min(dfncnt, maxdfn) * sizeof(oacdef);
    bdlubytes = L_UPIUAC;
    membytes += ((size_t)min(dfncnt, maxdfn) * sizeof(oacdef)) + L_UPIUAC;
  }
  if (bit(opflags, UOPF_BND) && bndcnt)
  {
    if (speedp)
    {
      buaco = membytes;
      membytes += L_UPIUAC;
    }
    membytes = boaco = slalsu(membytes);
    if (speedp)
    {
      membytes += (size_t)bndcnt * sizeof(oacdef);
      membytes  = bbo = slalsu(membytes);
      membytes += (size_t)BDLNBNDB(bndcnt) * sizeof(bdlbb);
    }
    else
    {
      size_t maxbnd = (size_t)BDLMBND(sizeof(uacdef));

      bdlobytes = max(bdlobytes,
                      (size_t)min(bndcnt, maxbnd) * sizeof(oacdef));
      bdlubytes = max(bdlubytes,
                      (size_t)min(bndcnt, maxbnd) * sizeof(uacdef));
      membytes += (size_t)min(bndcnt, maxbnd)
        * (sizeof(oacdef)+sizeof(uacdef));
    }
  }
  if (bit(opflags, UOPF_DSL) && dcallp)
  {
    membytes  = udso = slalsu(membytes);
    membytes += slalsu(BDLMDITM * sizeof(udsdef))
      + (BDLMDITM * M_IDEN * sizeof(text));
```

Sep 20 1993 16:18:32 pupisup.c Page 14

```
  }
  if (bit(opflags, UOPF_DBL) && bcallp)
  {
    membytes  = udbo = slalsu(membytes);
    membytes += slalsu(BDLMBITM * sizeof(udbdef))
      + (slalsu(BDLMBITM * M_IDEN * sizeof(text))
         * 2);
  }
  membytes  = slalsu(membytes);
  bdlobytes = slalsu(bdlobytes);

  if (! (*memptr = (*memcall)(membytes + bdlobytes + bdlubytes)))
  {
    err = OER(3100);
    goto ex;
  }
  allinfo = (allin *) *memptr;
  allinfo->allinckw = ALLINCW;
  allinfo->allinspd = speedp;
  allinfo->allinsuo = buaco;
  if (doaco)
  {
    doac = (oacdef *)((ub1 *)allinfo + doaco);
    duac = (ub1 *)doac + (min(dfncnt, BDLMDFN(L_UPIUAC)) * sizeof(oacdef));
  }
  if (boaco)
  {
    boac = (oacdef *)((ub1 *)allinfo + boaco);
    if (speedp)
      bbatch = (bdlbb *)((ub1 *)allinfo + bbo);
    else if (bndcnt < BDLMBND(sizeof(uacdef)))
      buac = (ub1 *)boac + (bndcnt * sizeof(oacdef));
    else
      buac = (ub1 *)boac + (BDLMBND(sizeof(uacdef)) * sizeof(oacdef));
  }
  if (udso)
  {
    uds    = (udsdef *)((ub1 *)allinfo + udso);
    dcolnm = (text *)((ub1 *)uds + slalsu(BDLMDITM * sizeof(udsdef)));
  }
  if (udbo)
  {
    udb  = (udbdef *)((ub1 *)allinfo + udbo);
    bvnm = (text *)((ub1 *)udb + slalsu(BDLMBITM * sizeof(udbdef)));
    binm = (text *)((ub1 *)bvnm+ slalsu(BDLMBITM * M_IDEN * sizeof(text)));
  }
  if (bdlobytes || bdlubytes)
  {
    bdloac = (oacdef *)((ub1 *)allinfo + membytes);
    bdluac = (ub1 *)allinfo + membytes + bdlobytes;
  }

  if(speedp)
  {


    ucaptr = &(allinfo->allinttw.alltwuca);
    ucaptr->ucauac = &(allinfo->allinttw.alltwuac);
    if(iovec)
    {
      boolean hasin;
      ucaptr->ucaiov = (ub1 *) ucaptr->ucauac + ALLIOOFF(bndcnt);
      bdlxio(iovec, ucaptr->ucaiov, bndcnt,
             (hst->hstpro > HSTPV6) ? TRUE : FALSE,
             &hasin);
      allinfo->allinctx.allsxhin = hasin;
    }
    else
    {
      ucaptr->ucaiov = NULLP(ub1);
      allinfo->allinctx.allsxhin = TRUE;
    }
    allinfo->allinctx.allsxnbd = bndcnt;
    allinfo->allinctx.allsxuca = ucaptr;
```

77

Sep 20 1993 16:18:32 pupisup.c Page 15

```
    }
  }

  if(speedp)
  {
    allinfo->allinctx.allsxitn = roff;
    allinfo->allinctx.allsxnit = bit(opflags, UOPF_FCH) ? 1 : iters;
    buac = (ub1 *)allinfo + allinfo->allinsuo;
  }

  CLRSTRUCT(*allptr);
  allptr->allopt = opflags;
  allptr->allcsr = (eword) c;
  allptr->allnit = iters;
  allptr->allitn = roff;

  ucaptr = &(allinfo->allinttw.alltwuca);

  if(bit(allptr->allopt, UOPF_PRS))
  {
    if(stmt == NULLP(text) || stmt == (text *)-1)
    {
      stmt = (text *)0;
      stmtl = 0;
    }
    else if(stmtl == 0 || stmtl == (size_t) -1)
      stmtl = strlen((char *)stmt);
    allptr->allsqlp = stmt;
    allptr->allsqll = (word) stmtl;
    allptr->allrsv2 = (ub4)sqlt;
    if (c && HSTKPU(hst))
    {
      kpucx *dctx;
      if (dctx=kpugc(hst,c)) DISCARD kpudcx(dctx,FALSE);
    }
  }

  if(bit(allptr->allopt, UOPF_DFN) && dfncnt == 0)
    bic(allptr->allopt, UOPF_DFN);
  else if(bit(allptr->allopt, UOPF_DFN))
  {

    if(err = bdladb(ODEFIN, dfncnt, FADDR(upifdl), (ptr_t) &tmpddsc, doac,
                    duac, (ub1) FALSE, &duacln, &ndfn, FADDR(upiacp),
                    L_MINUAC))
      goto ex;
    allptr->alldfu = duac;
    allptr->alldfl = (eword) duacln;
    allptr->alldfo = doac;
    allptr->alldfn = (eword) ndfn;

    if(ndfn < dfncnt)
    {
      tmpddsc = dfndsc + ndfn;
      if(err = bdlbmp(hst, allptr, &curs_opn, FADDR(upiopn),
                      FADDR(upiosq)))
        goto ex;

      if(err = bdlabo(hst, allptr->allcsr, ODEFIN, dfncnt - ndfn, ndfn + 1,
                      FADDR(upifdl), (ptr_t) &tmpddsc, FADDR(upirtr),
                      FADDR(upiacp), L_MINUAC, bdloac, bdluac))
        goto ex;
    }
  }

  if(bit(allptr->allopt, UOPF_BND) && bndcnt == 0)
```

Sep 20 1993 16:18:32 pupisup.c Page 16

```
    bic(allptr->allopt, UOPF_BND);
  else if(bit(allptr->allopt, UOPF_BND))
  {
    ub4 nbndbch = 0;

    tmpbdsc = bnddsc;

    if(speedp)
    {
      if(err = bdlbba(bndcnt, FADDR(bdlfbc), (ptr_t) &tmpbdsc, bbatch, boac,
                      (ub1 *) ucaptr->ucauac, &nbndbch, FADDR(upiacp),
                      L_MINUAC))
          goto ex;
      allptr->allbnu = NULLP(ub1);
      allptr->allbnl = 0;
      allptr->allbno = bbatch[0].bdlbboac;
      allptr->allbnn = (eword) bbatch[0].bdlbbnac;

      if(nbndbch > 1)
      {
        if(err = bdlbmp(hst, allptr, &curs_opn, FADDR(upiopn),
                        FADDR(upiosq)))
          goto ex;

        if(err = bdlbbo(hst, allptr->allcsr, bbatch, (ub4)1, nbndbch,
                        FADDR(upirtr)))
          goto ex;
      }
    }

    else
    {
      if(err = bdladb(OBINDRP, bndcnt, FADDR(bdlfbc), (ptr_t) &tmpbdsc, boac,
                      buac, (ub1) FALSE, &buacln, &nbnd, FADDR(upiacp),
                      L_MINUAC))
        goto ex;
      allptr->allbnu = buac;
      allptr->allbnl = (eword) buacln;
      allptr->allbno = boac;
      allptr->allbnn = (eword) nbnd;
      if(nbnd < bndcnt)
      {
        tmpbdsc = bnddsc + nbnd;
        if(err = bdlbmp(hst, allptr, &curs_opn, FADDR(upiopn),
                        FADDR(upiosq)))
          goto ex;
        if(err = bdlabo(hst, allptr->allcsr, OBINDRP, bndcnt - nbnd, nbnd + 1,
                        FADDR(bdlfbc), (ptr_t) &tmpbdsc, FADDR(upirtr),
                        FADDR(upiacp), L_MINUAC, bdloac, bdluac))
          goto ex;
      }
    }
  }

  if(bit(allptr->allopt, UOPF_DSL) && dcallp)
  {
    allptr->allrndi = &dtnit;
    allptr->alluds = uds;
    allptr->allnuds = BDLMDITM;
    allptr->allrnuds = &dcnit;
    allptr->alldnm = dcolnm;
    allptr->alldnml = (word)(BDLMDITM * M_IDEN * sizeof(text));
    allptr->allrdnl = &drnml;
  }

  if(bit(allptr->allopt, UOPF_DBL) && bcallp)
  {
```

Sep 20 1993 16:18:32 puplsup.c Page 17

```
    allptr->allrnbi = &btnit;
    allptr->alludb = udb;
    allptr->allnudb = BDLMBITM;
    allptr->allrnudb = &bcnit;
    allptr->allbnm = bvnm;
    allptr->allbnml = (word)(BDLMDITM * M_IDEN * sizeof(text));
    allptr->allrbnl = &brbnl;
    allptr->allinm = binm;
    allptr->allinl = (word)(BDLMDITM * M_IDEN * sizeof(text));
    allptr->allrinl = &brinl;
    allptr->allrsvl = 1;
  }




  if (bit(allptr->allopt,UOPF_FCH) && speedp)
  {
    cpuacsz = (size_t)(allinfo->allinctx.allsxnbd * sizeof(uacdef));
    if (cpuacsz > L_UPIUAC)
      cpuacsz = (size_t)L_UPIUAC;
    if (cpuacsz)
      DISCARD memcpy((ptr_t)buac,(ptr_t)ucaptr->ucauac,cpuacsz);
  }

  if((err = upirt2(hst, OALL, (pisdef *)allptr,
                   speedp && bit(allptr->allopt, UOPF_EXE) ?
                     upispp : ALLUCAPNUL,
                   speedp && bit(allptr->allopt, UOPF_EXE) ?
                     (ub1 *) &(allinfo->allinctx) : ALLUCACNUL,
                   &(allinfo->allinttw))) == OER(3115) || err == OER(1010))
  {

    hst->hstoer.oercnt = 0;
    if (bit(opflags, UOPF_FEX))
    {
      err = OER(2028);
      goto ex;
    }
    if(allptr->allcsr == 0)
      if(err = upiopn(hst, (word *)&(allptr->allcsr), (sword) -1))
        goto ex;
      else
        curs_opn = TRUE;
    if ((bit(allptr->allopt, UOPF_PRS) &&
         (err = upiosq(hst, allptr->allcsr, stmt,
                      (stmtl ? stmtl : (size_t) -1)))) ||
        (bit(allptr->allopt, UOPF_DSL) &&
         (err = bdlfdd(hst, allptr, dcallp, dcallc, upirtr))) ||
        (bit(allptr->allopt, UOPF_DBL) &&
         (err = bdlfbd(hst, allptr, bcallp, bcallc, FALSE, FADDR(upihmi),
                      FADDR(upigbv)))) ||
        (bit(allptr->allopt, UOPF_DFN) &&
         (err = upiadl(hst, allptr->allcsr, ndfn, dfndsc))) ||
        (bit(allptr->allopt, UOPF_BND) &&
         (err = (speedp ? bdlbbo(hst, allptr->allcsr, bbatch, (ub4)0,
                                 (ub4)1, FADDR(upirtr)) :
                 bdlabo(hst, allptr->allcsr, OBINDRP, nbnd, (ub4)1,
                        FADDR(bdlfbc), (ptr_t) &bnddsc, FADDR(upirtr),
                        FADDR(upiacp), L_MINUAC, bdloac, bdluac)))) ||
        (bit(allptr->allopt, UOPF_EXE) &&
         (err = upisxn(hst, allptr->allcsr,
                       (ub4) (bit(allptr->allopt, UOPF_FCH) ? 1 : iters),
                       (ub4) allptr->allitn, *memptr,
                       speedp ? upispp : ALLUCAPNUL))) ||
        (bit(allptr->allopt, UOPF_FCH) &&
         (err = upifcn(hst, allptr->allcsr, (word) iters))) ||
```

Sep 20 1993 16:18:32 puplsup.c Page 18

```
        (bit(allptr->allopt, UOPF_CAN) &&
         (err = upicco(hst, allptr->allcsr))))
      ;

  }
  else if(err == 0)
  {
    if(bit(allptr->allopt, UOPF_DSL))
    {

      if(allptr->allcsr == 0 && (*(allptr->allrnuds) < *(allptr->allrndi)))
      {
        err = OER(2036);
        goto ex;
      }


      if (hst->hstpro >= HSTPV7)
        bdldd7(1, *(allptr->allrnuds), allptr->alluds, allptr->alldnm, dcallp,
               dcallc, (size_t)drnml);
      else
        bdlddc(1, *(allptr->allrnuds), allptr->alluds, allptr->alldnm, dcallp,
               dcallc);
      if(err = bdlfdd(hst, allptr, dcallp, dcallc, FADDR(upirtr)))
        goto ex;
    }
    if(bit(allptr->allopt, UOPF_DBL))
    {
      ub2 curpos;
      if(allptr->allcsr == 0 && (*(allptr->allrnudb) < *(allptr->allrnbi)))
      {
        err = OER(2036);
        goto ex;
      }


      if (hst->hstpro >= HSTPV7)
        bdldb7(1, *(allptr->allrnudb), allptr->alludb, allptr->allbnm,
               allptr->allinm, bcallp, bcallc,(size_t)brbnl,
               (size_t)brinl);
      else
        bdldbc(1, *(allptr->allrnudb), allptr->alludb, allptr->allbnm,
               allptr->allinm, bcallp, bcallc);
      CLRSTRUCT(*allptr);
      allptr->allrnbi = &btnit;
      allptr->alludb = udb;
      allptr->allnudb = BDLMBITM;
      allptr->allrnudb = &bcnit;
      allptr->allbnm = bvnm;
      allptr->allbnml = (word)(BDLMDITM * M_IDEN * sizeof(text));
      allptr->allrbnl = &brbnl;
      allptr->allinm = binm;
      allptr->allinl = (word)(BDLMDITM * M_IDEN * sizeof(text));
      allptr->allrinl = &brinl;
      allptr->allopt  = UOPF_DBL;
      allptr->allcsr  = (eword) c;
      curpos = bcnit;
      while (curpos < btnit)
      {


        allptr->allrsvl = (ub4)curpos+1;
        if (err = upirt2(hst,OALL,(pisdef *)allptr,ALLUCAPNUL,ALLUCACNUL,
                         &(allinfo->allinttw))) goto ex;
        if (hst->hstpro >= HSTPV7)
          bdldb7((word) (curpos+1), *(allptr->allrnudb), allptr->alludb,
                 allptr->allbnm, allptr->allinm, bcallp, bcallc,
                 (size_t)brbnl,(size_t)brinl);
        else
          bdldbc((word) (curpos+1), *(allptr->allrnudb), allptr->alludb,
                 allptr->allbnm, allptr->allinm, bcallp, bcallc);
        curpos += (*(allptr->allrnudb));
      }
    }
```

79

```
  }
 ex:

  if (cpuacsz)
    DISCARD memcpy((ptr_t)ucaptr->ucauac,(ptr_t)buac,cpuacsz);


  if(curs_opn)
  {
    word cloerr = upicls(hst, allptr->allcsr);

    if(!err) err = cloerr;
  }
  hst->hstoer.oerrcd = (ub2) err;
  return(err);
}

word upiall(hst, c, opflags, stmt, stmtl, iters, roff, dfncnt, dfndsc,
            bndcnt, bnddsc, dcallp, dcallc, bcallp, bcallc, memcall, iovec,
            memptr)
reg2  hstdef *hst;
      word    c;
reg9  ub2     opflags;
reg12 ub4     iters;
      ub4     roff;
reg10 text   *stmt;
reg11 size_t  stmtl;
reg8  ub4     dfncnt;
      uaddef *dfndsc;
reg3  ub4     bndcnt;
      ua2def *bnddsc;
reg13 void (*dcallp)(/*_ word item, udedef *ude,
                        ptr_t dcallc _*/);
reg14 ptr_t  dcallc;
      void (*bcallp)(/*_ word item, ub1 flg, text *bnm, ub2 bnl,
                      text *inm, ub2 inl, ptr_t callc _*/);
      ptr_t  bcallc;
      ptr_t  (*memcall)(/*_ size_t nbytes _*/);
      ub1    *iovec;
reg5  ptr_t  *memptr;
{
  return(upial7(hst, c, opflags, stmt, stmtl,(ub4)KPULV060, iters, roff,
                dfncnt, dfndsc,bndcnt, bnddsc, dcallp, dcallc, bcallp, bcallc,
                memcall, iovec,memptr));
}
```

Aug 18 1992 11:52:19 qdpu_dspoer.c Page 1

```
/*****************************************************************************
 * qdpu_dspoer - Display contents of ORACLE oerdef structure
 *
 * Copyright (c) 1991 Kendall Square Research Corporation as an unpublished
 * work. All rights reserved. The information contained herein is the
 * confidential property of Kendall Square Research Corporation. Use,
 * copying, transfer or disclosure is prohibited without express written
 * agreement with Kendall Square Research Corporation.
 *****************************************************************************
 * REV  DATE      AUTHOR  DESCRIPTION
 * ---  --------  ------  ------------------------------------------------
 * %00  12/10/91  JM      Initial Version
 *****************************************************************************
 */
/* Uncomment the following line to disable display from this routine: */
#define QDNODEBUG 1

#ifndef QDSTD
#include <qdstd.h>
#endif
#ifndef OERDEF
#include <oerdef.h>
#endif

void qdpu_dspoer(pcaller, poer)
text *pcaller; /* Name of calling routine */
oerdef *poer;  /* Pointer to oerdef struct to display */
{
  QDDprintf(("\n%s: oercnt: %d  rcd: %d  ape: %d  aer: %d\n",
         pcaller,
         poer->oercnt, poer->oerrcd, poer->oerape, poer->oeraer));

  QDDprintf(("  cid: %d  epo: %d  typ: %d\n",
             poer->oercid, poer->oerepo, poer->oertyp));
  QDDprintf(("  oerfatal: %02x  oerflg: %02x  oeropt: %02x  oerpar: %02x\n",
             poer->oerfatal, poer->oerflg, poer->oeropt, poer->oerpar));
  QDDprintf(("  oerwflg: %02x  oerrid.ridtid.tidrba: %d\n",
             poer->oerwflg, poer->oerrid.ridtid.tidrba));
  QDDprintf(("  oerrid.ridtid.tidpid: %d  oerrid.ridtid.tidtbl: %d\n",
             poer->oerrid.ridtid.tidpid, poer->oerrid.ridtid.tidtbl));
  QDDprintf(("  oerrid.ridrba: %d  oerrid.ridsqn: %d\n",
             poer->oerrid.ridrba, poer->oerrid.ridsqn));
  QDDprintf(("  oerose: %d  oersnum: %d  oercseq: %d  oereof: %d\n\n",
             poer->oerose, poer->oersnum, poer->oercseq, poer->oereof));
}
```

Aug 18 1992 11:52:12 qdpu_getpcur.c Page 1

```
/*****************************************************************************
 * qdpu_getpcur - Get parallel cursor, for specified cursor number
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR   DESCRIPTION
 * ---   --------   ------   ------------------------------------------------
 * %00   12/02/91   JM       Initial Version
 *****************************************************************************
*/
#define QDNODEBUG 1c
#include <qdstd.h>
#include <qdpuext.h>
#include <orastd.h>
#include <hstdef.h>

/*****************************************************************************
 * qdpu_getpcur - Get parallel cursor, for specified cursor number
 * Return pointer to QDPCURSOR structure for pcursor with specified cursor
 * number, or return NULL if none exists (implying that this cursor has
 * not been decomposed)
 *****************************************************************************
*/

struct QDPCURSOR *qdpu_getpcur(phstdef, cn)
hstdef *phstdef;      /* Pointer to host def for connection */
word cn;              /* Cursor number */
{
    reg1 QDCNX *pcnx;       /* Pointer to connection structures */
    reg2 QDPCURSOR *ppcur; /* Pointer to pcursors */

    QDBEGIN("qdpu_getpcur");
    /* Loop through connections to find specified connection */
    for (pcnx = &(QDpcom->cnx); pcnx != NULL; pcnx = pcnx->pnext)
    {
        if ( TRUE /* test to match phstdef with cnx */ )
            break;
    }

    /* Loop through pcursors for this cnx to find one with matching number */
    for (ppcur = pcnx->ppcursor; ppcur != NULL; ppcur = ppcur->pnext)
    {
        QDDprintf(("qdpu_getpcur: seeking cursor %d,  examining cursor %d\n",
                cn, ppcur->root_cnumber));
        if (ppcur->root_cnumber == cn)
            break;
    }
    QDEND;
    return ppcur;
} /* qdpu_getpcur */
```

```
/*****************************************************************************
 * qdpu_sqllib - Routines called by PUPI routines, which manipulate
 *               ORACLE sqllib internal structures
 *
 * These routines are temporary while QD uses Pro*C internally, and are
 * needed to kludge around the fact that sqllib is not reentrant.
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   -------------------------------------------------
 * %00   12/02/91  JM       Initial Version
 *****************************************************************************
 */
#define QDNODEBUG 1
#include <qdstd.h>
#include <orastd.h>
#include <sqllib.h>
#include <memory.h>

/* set current sqllib cursor number */
void qdpu_sqlscc(cnumber)
word cnumber;
{
    QDDprintf(("cucocn before sqlscc: %d\n", sqlcue->cucocn));
    sqlscc(&cnumber);
    sqlcue->cucocn = cnumber;
    QDDprintf(("cucocn after sqlscc: %d\n", sqlcue->cucocn));
}

/* The variables below are used to save and restore the sqllib globals
 * with corresponding names (but without the qd_save_ prefix), which
 * are defined in oraclesrc/sqllib/include/sqllib.h.
 */
static word qd_save_sqlhin;
static hiddef *qd_save_sqlhid;
static cucdef **qd_save_sqlcuc;
static cucdef *qd_save_sqlcue;
static bool qd_save_sqlisi;
static text qd_save_sqloem[GEMBLEN];
static size_t qd_save_sqloel;
static struct sqlca *qd_save_sqlcap;
static struct oraca *qd_save_sqloap;
static text *qd_save_sqlsfi;
static size_t qd_save_sqlsfl;
static word qd_save_sqlsln;
static word qd_save_sqlnf;
static text *qd_save_sqlsbf;
static size_t qd_save_sqlsbl;
static size_t qd_save_sqlsbs;
static word *qd_save_sqluce;
static sqidef *qd_save_sqlsic;
static hiddef qd_save_sqldhs;
static struct hstdef qd_save_sqldhu;
static sqidef **qd_save_sqlsit;
static word qd_save_sqlsil;
static word qd_save_sqlsim;
static size_t qd_save_sqlcbu;
static size_t qd_save_sqlmbu;
static alcdef *qd_save_sqlahp;
static bool qd_save_sqldbg;
static bool qd_save_sqlchf;
static bool qd_save_sqlhpf;
static ub1 *qd_save_sqldbf;
static word qd_save_sqluev;
#ifdef SQLLIB14
static lmshd *qd_save_sqlfac;
static li_langid qd_save_sqllan;
static bool qd_save_sqlrer;
```

```
#endif /* SQLLIB14 */

/* New globals added to sqllib for ORACLE 7.0.9 */
static word qd_save_sqlcct;
static bool qd_save_sqlrls;
static sqlctx *qd_save_sqlctl;
static word qd_save_sqlmod;
#ifdef SQL15
static word qd_save_sqldbs;
#endif /* SQL15 */
static struct hstdef *qd_save_sqlduh;
static bool qd_save_sqlhdh;
static ua2def *qd_save_sqlbnd;
static uadef *qd_save_sqldfn;
static ualdef *qd_save_sqluah;
static sqlbuk **qd_save_sqlrtb;


/* save current sqllib context */
/* (There is no subtlety here.  Save all globals, whether or not we
 * specifically expect them to change.)
 */
void qdpu_save_sqllib()
{
    QDBEGIN("qdpu_save_sqllib");
    qd_save_sqlhin = sqlhin;
    qd_save_sqlhid = sqlhid;
    qd_save_sqlcuc = sqlcuc;
    qd_save_sqlcue = sqlcue;
    qd_save_sqlisi = sqlisi;
    qd_save_sqloel = sqloel;
    qd_save_sqlcap = sqlcap;
    qd_save_sqloap = sqloap;
    qd_save_sqluce = sqluce;
    memcpy(qd_save_sqloem, sqloem, GEMBLEN);


    qd_save_sqlsbf = sqlsbf;
    qd_save_sqlsbl = sqlsbl;
    qd_save_sqlsbs = sqlsbs;

    /* We need to initialize the sql statement buffer (sqlsbf) to NULL,
     * its size (sqlsbs) to 0, and the length of currently stored statement
     * (sqlsbl) to 0.
     */
    sqlsbf = (text *)NULL;
    sqlsbl = 0;
    sqlsbs = 0;

#ifdef SAVE_ALL_GLOBALS
    qd_save_sqlsfi = sqlsfi;
    qd_save_sqlsfl = sqlsfl;
    qd_save_sqlsln = sqlsln;
    qd_save_sqlnf = sqlnf;
    qd_save_sqlsic = sqlsic;
    qd_save_sqlsit = sqlsit;
    qd_save_sqlsil = sqlsil;
    qd_save_sqlsim = sqlsim;
    qd_save_sqlcbu = sqlcbu;
    qd_save_sqlmbu = sqlmbu;
    qd_save_sqlahp = sqlahp;
    qd_save_sqldbg = sqldbg;
    qd_save_sqlchf = sqlchf;
    qd_save_sqlhpf = sqlhpf;
    qd_save_sqldbf = sqldbf;
    qd_save_sqluev = sqluev;

    memcpy(&qd_save_sqldhs, &sqldhs, sizeof(sqldhs));
    memcpy(&qd_save_sqldhu, &sqldhu, sizeof(sqldhu));

#ifdef SQLLIB14
    qd_save_sqlfac = sqlfac;
    memcpy(&qd_save_sqllan, &sqllan, sizeof(sqllan));
```

82

Sep 20 1993 13:40:06 qdpu_sqllib.c Page 3

```
    qd_save_sqlrer = sqlrer;
#endif /* SQLLIB14 */
#endif /* SAVE_ALL_GLOBALS */

/* New globals added to sqllib for ORACLE 7.0.9 */
    qd_save_sqlcct = sqlcct;
    qd_save_sqlrls = sqlrls;
    qd_save_sqlctl = sqlctl;
    qd_save_sqlmod = sqlmod;
#ifdef SQL15
    qd_save_sqldbs = sqldbs;
#endif /* SQL15 */
    qd_save_sqlduh = sqlduh;
    qd_save_sqlhdh = sqlhdh;
    qd_save_sqlbnd = sqlbnd;
    qd_save_sqldfn = sqldfn;
    qd_save_sqluah = sqluah;
    qd_save_sqlrtb = sqlrtb;

    QDEND;
}

/* restore saved sqllib context */
void qdpu_restore_sqllib()
{
    QDBEGIN("qdpu_restore_sqllib");
    sqlhin = qd_save_sqlhin;
    sqlhid = qd_save_sqlhid;
    sqlcuc = qd_save_sqlcuc;
    sqlcue = qd_save_sqlcue;
    sqlisi = qd_save_sqlisi;
    sqloel = qd_save_sqloel;
    sqlcap = qd_save_sqlcap;
    sqloap = qd_save_sqloap;
    sqluce = qd_save_sqluce;
    memcpy(sqloem, qd_save_sqloem, GEMBLEN);

    /* If a new sql statement buffer (sqlsbf) got allocated during this
     * pupi call, free it before restoring old buffer.
     */
    if (sqlsbf)
        sqlfre(sqlsbf, sqlsbs);

    sqlsbf = qd_save_sqlsbf;
    sqlsbl = qd_save_sqlsbl;
    sqlsbs = qd_save_sqlsbs;

#ifdef SAVE_ALL_GLOBALS
    sqlsfi = qd_save_sqlsfi;
    sqlsfl = qd_save_sqlsfl;
    sqlsln = qd_save_sqlsln;
    sqlnf = qd_save_sqlnf;
    sqlsic = qd_save_sqlsic;
    sqlsit = qd_save_sqlsit;
    sqlsil = qd_save_sqlsil;
    sqlsim = qd_save_sqlsim;
    sqlcbu = qd_save_sqlcbu;
    sqlmbu = qd_save_sqlmbu;
    sqlahp = qd_save_sqlahp;
    sqldbg = qd_save_sqldbg;
    sqlchf = qd_save_sqlchf;
    sqlhpf = qd_save_sqlhpf;
    sqldbf = qd_save_sqldbf;
    sqluev = qd_save_sqluev;

    memcpy(&sqldhs, &qd_save_sqldhs, sizeof(sqldhs));
    memcpy(&sqldhu, &qd_save_sqldhu, sizeof(sqldhu));

#ifdef SQLLIB14
    sqlfac = qd_save_sqlfac;
    memcpy(&sqllan, &qd_save_sqllan, sizeof(sqllan));
    sqlrer = save_sqlrer;
#endif /* SQLLIB14 */
```

Sep 20 1993 13:40:06 qdpu_sqllib.c Page 4

```
#endif /* SAVE_ALL_GLOBALS */

/* New globals added to sqllib for ORACLE 7.0.9 */
    sqlcct = qd_save_sqlcct;
    sqlrls = qd_save_sqlrls;
    sqlctl = qd_save_sqlctl;
    sqlmod = qd_save_sqlmod;
#ifdef SQL15
    sqldbs = qd_save_sqldbs;
#endif /* SQL15 */
    sqlduh = qd_save_sqlduh;
    sqlhdh = qd_save_sqlhdh;
    sqlbnd = qd_save_sqlbnd;
    sqldfn = qd_save_sqldfn;
    sqluah = qd_save_sqluah;
    sqlrtb = qd_save_sqlrtb;

    QDEND;
}
```

Oct 6 1992 17:35:24 qd_connect.pc Page 1

```
/****************************************************************************
 * qd_connect - Connect to ORACLE
 *
 * This is a temporary approach (in real life, we'll use user's existing
 * connection).
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE      AUTHOR   DESCRIPTION
 * ---   --------  ------   ------------------------------------------------
 * $00   10/02/91  JM       Initial Version
 ****************************************************************************
*/

#include <qdstd.h>
#include <qderrs.h>

EXEC SQL BEGIN DECLARE SECTION;
        VARCHAR user[32];                 /* User name for connect */
        VARCHAR pwd[32];                  /* Password for connect */
        char connect_string[32];          /* Connect string */
EXEC SQL END DECLARE SECTION;

EXEC SQL INCLUDE SQLCA;

extern char *getenv();

QDSTATUS qd_connect(puser, ppwd)
reg1 text *puser;    /* 0-terminated user name string */
reg1 text *ppwd;     /* 0-terminated password string */
{
    char *penv;

    QDBEGIN("qd_connect");
    strcpy(user.arr, puser);
    user.len = strlen(user.arr);
    strcpy(pwd.arr, ppwd);
    pwd.len = strlen(pwd.arr);

    penv = getenv("QD_CONNECT_STRING");
    if (penv)
    {
        strcpy(connect_string, penv);
        EXEC SQL CONNECT :user IDENTIFIED BY :pwd
             USING :connect_string;
    }
    else
    {
        EXEC SQL CONNECT :user IDENTIFIED BY :pwd;
    }
    QDEND;

    if (sqlca.sqlcode < 0)
        QDFAIL(sqlca.sqlcode);
    return (QDSTATUS)sqlca.sqlcode; /* for now, anyway */
} /* qd_connect */
```

```
/*************************************************************************
 * qdbb_aggr - Execution function for AGGREGATE qd building block
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE       AUTHOR   DESCRIPTION
 * ---   --------   ------   ---------------------------------------------
 * %02   06/21/93   EYT      Collect create/drop temp table time statistics
 * %01   10/09/92   EYT      Set output lengths for aggregates
 * %00   11/06/91   JM       Initial Version
 *************************************************************************
*/

#include <stdio.h>
#include <strings.h>
#include <ctype.h>
#include <dtydef.h>
#include <qdstd.h>
#include <qdspext.h>
#include <qdcpext.h>
#include <qdxpext.h>
#include <qdbbext.h>
#include <qderrs.h>
#ifdef QDDEBUG
#include <qdtstext.h>
#endif /* QDDEBUG */
#include <memory.h>
#include <stdlib.h>

EXEC SQL INCLUDE SQLDA;

extern SQLDA *sqlald();
extern sqlprc();
extern sqlnul();
extern sqlclu();

/*************************************************************************
 * qdbb_aggr - Execution function for AGGREGATE qd building block
 *
 * Request RESET: If state is EMPTY, create IT, prepare IS, DS, DTS, and CQ;
 *  set state to PENDING.  Whether or not state is EMPTY, pass RESET
 *  request to child.  (RESET permits initialization at QD or open time,
 *  rather than at fetch time.)
 * Request NEXT: If state is EMPTY, create IT, prepare IS, DS, DTS, and CQ,
 *  set state to PENDING.  Whether or not state is EMPTY, request NEXT
 *  row from child, insert in IT until child returns EOG (which will probably
 *  be OR'd with READY).  Then execute CQ and return a row to parent.
 *  If child returns EOD, set state to EOD.
 * Request (NEXT | RESET): Behave identically to NEXT request, except pass
 *  (NEXT | RESET) request along to child.
 * Request NEXT, state EOD: return EOD.
 * Request CLEANUP: Execute DTS, close all cursors, pass CLEANUP request to
 *  child.
 * The flag QDBB_PSQ_INSERT_TO_IT means the parallel subqueries insert rows
 * directly to the intermediate table, filling it just once.  In this case,
 * CQ (combining query) is opened just once, and state is set to READY to
 * indicate this has been done, so on subsequent calls just fetch another
 * row from CQ.
 * The flag QDBB_CQ_INSERT_SELECT means the original query is an INSERT/
 * SELECT statement, and so the CQ is an INSERT/SELECT statement.  Opening
 * the CQ cursor executes this statement.
 *************************************************************************
*/
QDBB_REPLY qdbb_aggr(paggr, req, pbtt)
reg1 QDBB_AGGR *paggr;
reg2 word req;
reg3 text **pbtt;   /* Pointer to buffer translation table */
{
    reg4 QDSTATUS retval;
```

```
    reg5 word i;     /* Loop index */
    reg6 uword j;    /* Inner loop index */
    reg7 text **pvalptrs; /* Pointer to array of pointers to column values */
    reg8 short **pindptrs; /* Pointer to array of pointers to indicators */
    reg9 bool row_returned; /* True if CQ returned a row */
    reg10 ub2 *pbv_colnums; /* Pointer to array of column numbers from   */
                            /*   PSQ which are referred to as bind       */
                            /*   variables in CQ.  Index into this       */
                            /*   array corresponds to bind variable      */
                            /*   number in pcq_bind_desc; contents of    */
                            /*   array slot corresponds to input buffer  */
                            /*   column number.                          */
    text tempbuf[(QDCP_PSQ_MAX_HOSTVAR_NAME
                  - QDCP_PSQ_HOSTVAR_PREFIX_LEN)
                 + 1];      /* For converting numeric portion of auto-   */
                            /* generated hostvar name to a number        */
__private static ub4 cnx_seqno = 0; /* Connection sequence number */
    EXEC SQL BEGIN DECLARE SECTION;
    int dummy_outcol;       /* Output variable for CQ's with dummy output *
                            /*  column (literal 1) */
    SQLDA *pdesc;
    VARCHAR *psql_text;     /* Pointer to text of dynamic SQL statement */
    EXEC SQL END DECLARE SECTION;
#ifdef QDDEBUG
    extern bool QD_commit_it; /* If true, commit inserts into intermediate */
                              /* table, so they can be examined */
#endif /* QDDEBUG */

    /* Variables used in timing query processing stages  */
    /* Must use array name qdtime, so that the timing macros work */
#define TIME_CREATE_TABLE 0
#define TIME_DROP_TABLE 1
    __private static QDTIME qdtime[2];

    EXEC SQL INCLUDE SQLCA;

    QDBEGIN("qdbb_aggr");
    QD_CHECK_CNX_SEQNO;
#ifdef QDDEBUG
    if (req == QDBB_REQ_DISPLAY)
    {
        printf("AGGR at %08lx\n", paggr);
        printf("  in_bufnum: %d\n", paggr->in_bufnum);
        printf("  out_bufnum: %d\n", paggr->out_bufnum);
        printf("  nit_cols: %d\n  in_colnums:", paggr->nit_cols);
        for (i = 0; i < paggr->nit_cols; i++)
            printf(" %d ", paggr->pin_colnums[i]);
        printf("\n  ncq_cols: %d\n  out_colnums:", paggr->ncq_cols);
        for (i = 0; i < paggr->pout_desc->N; i++)
            printf(" %d ", paggr->pout_colnums[i]);
        printf("\n");
        printf("  ncq_groupcol_refs: %d\n", paggr->ncq_groupcol_refs);
        printf("  cts_text: %s\n", paggr->pcts_text->arr);
        printf("  cq_text: %s\n", paggr->pcq_text->arr);
        printf("  pchild: %08lx\n", paggr->pchild);
        retval = (*(paggr->pchild->hdr.pfunc))
            (paggr->pchild, QDBB_REQ_DISPLAY, pbtt);
        goto return_reply;
    }
#endif /* QDDEBUG */
    if (req == QDBB_REQ_NEXT && paggr->hdr.state == QDBB_STATE_EOD)
    {
        retval = QDBB_REPLY_EOD;
        goto return_reply;
    }

/* For CQ that is an INSERT/SELECT statement, all the work of OPEN and
 * NEXT happen in one call to this routine.  After completing the OPEN
 * phase, we loop back to here for the NEXT phase.
 */
insert_NEXT_phase:

    if (req & (QDBB_REQ_OPEN | QDBB_REQ_NEXT))
```

Sep 20 1993 13:37:52 qdbb_aggr.pc Page 3

```
{
    if (paggr->hdr.state == QDBB_STATE_EMPTY)
    {
        /* Perform initialization */

        /* Use EXECUTE IMMEDIATE for CTS (create table statement),
         * since we only need to execute it once for the whole run.
         * (This also applies to the DTS (drop table statement)).
         */

        /* Start timer for create table time */
        QDTIMESTART (TIME_CREATE_TABLE);

        *((QD_VARCHAR **)(&psql_text)) = paggr->pcts_text;
        EXEC SQL EXECUTE IMMEDIATE :psql_text;
        if (sqlca.sqlcode)
        {
            QDFAIL(sqlca.sqlcode);
            goto error_return;
        }

        /* Compute create table time */
        QDTIMEFINISH (TIME_CREATE_TABLE);

        /* Print create table time */
        QDTIMEPRINT (TIME_CREATE_TABLE, "Create Temp Table");

        /* Prepare ISTMT (insert statement), declare cursor for it,
         * desribe bind variables (unless PSQ inserts direct to IT)
         */
        if (!(paggr->hdr.flags & QDBB_PSQ_INSERT_TO_IT))
        {
            *((QD_VARCHAR **)(&psql_text)) = paggr->pis_text;
            EXEC SQL PREPARE istmt FROM :psql_text;
            if (sqlca.sqlcode < 0)
            {
                QDFAIL(sqlca.sqlcode);
                goto error_return;
            }

            EXEC SQL DECLARE is_cursor CURSOR FOR istmt;

            /* Now describe bind variables  */
            pdesc = sqlald(paggr->nit_cols, 0, 0);
            pdesc->N = paggr->nit_cols;
            paggr->pis_bind_desc = pdesc;

            EXEC SQL DESCRIBE BIND VARIABLES FOR istmt INTO pdesc;
            if (sqlca.sqlcode < 0)
            {
                QDFAIL(sqlca.sqlcode);
                goto error_return;
            }

            /* Set datatype and length of each bind descriptor element
             * to match the corresponding PSQ column.
             */
            for (i = 0; i < paggr->nit_cols; i++)
            {
                pdesc->T[i] =
                    paggr->pin_desc->T[paggr->pin_colnums[i]];
                pdesc->L[i] =
                    paggr->pin_desc->L[paggr->pin_colnums[i]];
            }
        } /* if (!(paggr->hdr.flags & QDBB_PSQ_INSERT_TO_IT)) */

        /* Prepare CQ (combining query), declare cursor for it,
         * describe select list,
         * desribe bind variables.  The datatype, length, and address
         * of each bind variable will be reset from corresponding
         * columns of pout_desc before each time the CQ is fetched
         * (using pout_colnums to figure out which output columns
         * correspond to which CQ columns).
```

Sep 20 1993 13:37:52 qdbb_aggr.pc Page 4

```
         */
        *((QD_VARCHAR **)(&psql_text)) = paggr->pcq_text;
        EXEC SQL PREPARE cq FROM :psql_text;
        if (sqlca.sqlcode < 0)
        {
            QDFAIL(sqlca.sqlcode);
            goto error_return;
        }

        EXEC SQL DECLARE cq_cursor CURSOR FOR cq;

        /* Describe select list. unless CQ is INSERT/SELECT statement */
        if (!(paggr->hdr.flags & QDBB_CQ_INSERT_SELECT))
        {
            pdesc = sqlald(paggr->ncq_cols, 0, 0);
            pdesc->N = paggr->ncq_cols;
            paggr->pcq_select_desc = pdesc;

            EXEC SQL DESCRIBE SELECT LIST FOR cq INTO pdesc;
            if (sqlca.sqlcode < 0)
            {
                QDFAIL(sqlca.sqlcode);
                goto error_return;
            }
        } /* If CQ is not INSERT/SELECT statement */

        /* Set state to PENDING */
        paggr->hdr.state = QDBB_STATE_PENDING;

        /* Now describe bind variables */
        if (paggr->ncq_groupcol_refs)
        {
            pdesc = sqlald(paggr->ncq_groupcol_refs,
                           QDCP_PSQ_MAX_HOSTVAR_NAME, 0);
            pdesc->N = paggr->ncq_groupcol_refs;
            paggr->pcq_bind_desc = pdesc;

            EXEC SQL DESCRIBE BIND VARIABLES FOR cq INTO pdesc;
            if (sqlca.sqlcode < 0)
            {
                QDFAIL(sqlca.sqlcode);
                goto error_return;
            }
            pdesc->N = pdesc->F;

            /* Fix up the bind descriptor with the types and lengths of
             * the bind variables, and fill an array, indexed by bind
             * variable number, with the input buffer column numbers of
             * the columns to which the bind variables refer.  We have
             * to analyze the names of the bind variables, which were
             * auto-generated in qdcp_qgen, to figure out which one
             * corresponds to which column.
             */
            pbv_colnums = paggr->pout_colnums + paggr->pout_desc->N;
            for (i = 0; i < pdesc->N; i++)
            {
                if (pdesc->C[i] < QDCP_PSQ_HOSTVAR_PREFIX_LEN ||
                    memcmp(pdesc->S[i], QDCP_PSQ_HOSTVAR_PREFIX,
                           QDCP_PSQ_HOSTVAR_PREFIX_LEN))
                    continue;
                memcpy(tempbuf, pdesc->S[i] + QDCP_PSQ_HOSTVAR_PREFIX_LEN,
                       pdesc->C[i] - QDCP_PSQ_HOSTVAR_PREFIX_LEN);
                tempbuf[pdesc->C[i] - QDCP_PSQ_HOSTVAR_PREFIX_LEN] = 0;
                pbv_colnums[i] = atoi(tempbuf);

                pdesc->T[i] = paggr->pin_desc->T[pbv_colnums[i]];
                pdesc->L[i] = paggr->pin_desc->L[pbv_colnums[i]];
            } /* loop through bind variables */
        } /* if (paggr->ncq_groupcol_refs) */
        else paggr->pcq_bind_desc = NULL;

        /* Set state to PENDING */
        paggr->hdr.state = QDBB_STATE_PENDING;
```

```
    } /* if (paggr->hdr.state == QDBB_STATE_EMPTY) */

    /* Loop fetching and aggregating groups until we find a group which
     *  satisfies the HAVING clause
     */
    for (;;)
    {
        /* Loop fetching rows from child until child returns EOG or EOD.
         * (State READY means PSQ inserted direct to IT, and we've already
         * opened combining query, so we're ready to fetch next row.)
         */
        for (retval = QDBB_REPLY_NULL, i = 0;
             paggr->hdr.state != QDBB_STATE_READY &&
             !(retval & (QDBB_REPLY_EOG | QDBB_REPLY_EOD));
             i++)
        {
            /* Pass request along to child */
            retval = (*(paggr->pchild->hdr.pfunc))
                (paggr->pchild, req, pbtt);

            /* If CQ is INSERT/SELECT, the whole job should get done
             * in response to an OPEN request, so upgrade req from
             * OPEN to NEXT to keep things going.
             */
            if (!retval && req == QDBB_REQ_OPEN
                && (paggr->hdr.flags & QDBB_CQ_INSERT_SELECT))
            {
                req = QDBB_REQ_NEXT;
                goto insert_NEXT_phase;
            }
            /* If we're only opening, not fetching rows, we're done.
             * If an ERROR has been encountered, abort.
             */
            if (req == QDBB_REQ_OPEN || retval == QDBB_REPLY_ERROR)
                goto return_reply;

            /* Otherwise, if request was (NEXT | RESET), we should now
             * turn off the RESET bit in request, since child has already
             * reset.
             */
            req &= ~QDBB_REQ_RESET;

            if (retval == QDBB_REPLY_EOD)
            {
                /* If PSQ inserts direct to IT, then EOD means PSQs
                 * are finished with inserts; set state to READY to mean
                 * AGGR can now satifsy NEXT requests by fetching from
                 * IT.
                 */
                if (paggr->hdr.flags & QDBB_PSQ_INSERT_TO_IT)
                    paggr->hdr.state = QDBB_STATE_PENDING;

                else
                {
                    paggr->hdr.state = QDBB_STATE_EOD;

                    /* If this is first time through loop, then we haven't
                     * collected any rows for current group, so just return
                     * EOD, unless CQ is INSERT/SELECT statement, in
                     * which case we still need to execute it, so it
                     * can insert NULL aggregate results.
                     */
                    if (i == 0 &&
                        !(paggr->hdr.flags & QDBB_CQ_INSERT_SELECT))
                        goto return_reply;

                    /* Otherwise, it must be the case that there was no
                     * GROUP-BY clause, and we're now ready to compute
                     * final aggregates.
                     * Setting state to EOD indicates
                     * at bottom of loop that even if combining query
                     * returns no rows, we still need to return.
                     */
```

```
                }
                break;
            } /* if (retval == QDBB_REPLY_EOD) */

            /* Insert the row just returned from the child into the
             * intermediate table.  First, fix up insert statement
             * bind descriptor to point to locations of column and
             * indicators in input buffer (which contains latest row
             * from a parallel subquery).
             */
            pvalptrs = (text **)(pbtt[paggr->in_bufnum]);
            pindptrs = (short **)(pvalptrs + paggr->pin_desc->N);

            pdesc = paggr->pis_bind_desc;
            for (j = 0; j < paggr->nit_cols; j++)
            {
                pdesc->V[j] = pvalptrs[paggr->pin_colnums[j]];
                pdesc->I[j] = pindptrs[paggr->pin_colnums[j]];
            }

            /* Since insert statement is not a query, the following
             * OPEN statement not only binds host variables, but
             * actually executes the insert.
             */
            EXEC SQL OPEN is_cursor USING DESCRIPTOR pdesc;
            if (sqlca.sqlcode < 0)
            {
                QDFAIL(sqlca.sqlcode);
                goto error_return;
            }
        } /* loop until EOG */

#ifdef QDDEBUG
        if (QD_commit_it)
        {
            EXEC SQL COMMIT WORK;
            printf("Inserts committed. Check table contents.\n");
            printf("\ncts_text: %s\n", paggr->pcts_text->arr);
            i = getchar();
        }
#endif /* QDDEBUG */

        /* Execute the combining query to fetch aggregate results */
        /* (State READY means we've already opened combining query */

        if (paggr->hdr.state != QDBB_STATE_READY)
        {
            /* If there are bind variables, fix up descriptor to point to
             * their addresses.
             */
            pdesc = paggr->pcq_bind_desc;
            if (pdesc && pdesc->N)
            {
                /* Array of column numbers in input buffer which correspond
                 * to CQ bind variables, follows the array of output column
                 * numbers.
                 */
                pbv_colnums = paggr->pout_colnums + paggr->pout_desc->N;
                for (i = 0; i < pdesc->N; i++)
                {
                    pdesc->V[i] = pvalptrs[pbv_colnums[i]];
                    pdesc->I[i] = pindptrs[pbv_colnums[i]];
                }
            } /* if (pdesc->N) */

            /* (Re)open the combining query cursor */
            if (pdesc)
                EXEC SQL OPEN cq_cursor USING DESCRIPTOR pdesc;
            else
                EXEC SQL OPEN cq_cursor;
            if (sqlca.sqlcode < 0)
            {
                QDFAIL(sqlca.sqlcode);
```

```
            goto error_return;
        }

        /* For queries where PSQ inserts direct to IT, we only
         * open the CQ once, and fetch multiple rows from it, so
         * set state to READY to indicate that we've already
         * opened the CQ.
         */
        if (paggr->hdr.flags & QDBB_PSQ_INSERT_TO_IT)
            paggr->hdr.state = QDBB_STATE_READY;

        /* For queries where CQ is an INSERT/SELECT statement,
         * OPENING the cursor has executed the statement, so
         * now COMMIT the insert, and set state to EOD, because
         * we're done.
         */
        if (paggr->hdr.flags & QDBB_CQ_INSERT_SELECT)
        {
            /* xxx Here's where we need to determine how many
             * rows were inserted, so we can pass that info back
             * up to the caller. xxx
             */
            EXEC SQL COMMIT;
            if (sqlca.sqlcode < 0)
            {
                QDFAIL(sqlca.sqlcode);
                goto error_return;
            }
            paggr->hdr.state = QDBB_STATE_EOD;
            goto return_reply;
        } /* If CQ is INSERT/SELECT statement */
    } /* if (paggr->hdr.state != QDBB_STATE_READY) */

    /* Set addresses, types, and lengths in CQ select descriptor
     * from corresponding columns in output buffer descriptor.
     */
    pdesc = paggr->pcq_select_desc;
    for (i = 0; i < paggr->pout_desc->N; i++)
    {
        j = paggr->pout_colnums[i];
        if (j & QDBB_GROUPCOL_FLAG)
            continue;
        pdesc->V[j] = paggr->pout_desc->V[i];
        pdesc->I[j] = paggr->pout_desc->I[i];
        pdesc->T[j] = paggr->pout_desc->T[i];
        pdesc->L[j] = paggr->pout_desc->L[i];
    }

    /* Attempt to fetch a row */
    EXEC SQL FETCH cq_cursor USING DESCRIPTOR pdesc;
    if (sqlca.sqlcode < 0)
    {
        QDFAIL(sqlca.sqlcode);
        goto error_return;
    }
    else if (sqlca.sqlcode == 0)
        row_returned = TRUE;
    else
    {
        row_returned = FALSE;

        /* If IT has been filled by PSQ directly, and now we've
         * retrieved all the rows from it, set state to EOD.
         */
        if (paggr->hdr.state == QDBB_STATE_READY)
            paggr->hdr.state = QDBB_STATE_EOD;
    }
    /* Project aggregates in order to set output lengths */   /*+%01*/
    /* Note that source and dest are equal */
    for (i = 0; i < paggr->pout_desc->N; i++)
    {
        qdbb_project(paggr->pout_desc->V[i],
                     paggr->pout_desc->I[i],
```

```
                     paggr->pout_desc->T[j],
                     paggr->pout_desc->L[j],
                     paggr->pout_desc->V[i],
                     paggr->pout_desc->I[i],
                     paggr->pout_desc->T[i],
                     paggr->pout_desc->L[i],
                     paggr->planptrs[i]);
        if (QDFAILED)
            goto error_return;                                   /*-%01*/
    }

    /* Delete this group's rows from intermediate table
     *  unless this is the last time through the table, either
     *  because we've reached EOD, or because it was filled all
     *  in one pass by PSQ,
     *  in which cases don't bother,
     *  because we're going to drop the table anyway.
     */
    if (paggr->hdr.state != QDBB_STATE_EOD &&
        paggr->hdr.state != QDBB_STATE_READY)
    {
        *((QD_VARCHAR **)(&psql_text)) = paggr->pde_text;
        EXEC SQL EXECUTE IMMEDIATE :psql_text;
        if (sqlca.sqlcode)
        {
            QDFAIL(sqlca.sqlcode);
            goto error_return;
        }
    } /* if (state != QDBB_STATE_EOD) */

#ifdef QDDEBUG
    if (QD_commit_it)
        EXEC SQL COMMIT WORK;
#endif /* QDDEBUG */

    /* If no row was returned, because HAVING clause was not
     * satisfied, process the next group (unless state is EOD,
     * which means there's no GROUP-BY clause, we have just
     * produced final aggregates for the entire query, but the
     * HAVING clause hasn't been satisfied.)
     */
    if (!row_returned)
    {
        if (paggr->hdr.state == QDBB_STATE_EOD)
        {
            retval = QDBB_REPLY_EOD;
            goto return_reply;
        }
        else
            continue;
    }

    /* If any group-by columns were in the IQ (input query) select
     * list, copy them from the buffer of the last row of this group
     * returned from the child, into the output buffer.
     */
    else
    {
        for (i = 0; i < paggr->pout_desc->N; i++)
        {
            j = paggr->pout_colnums[i];
            if (!(j & QDBB_GROUPCOL_FLAG))
                continue;

            /* Turn of flag so we can see actual column number */
            j &= ~QDBB_GROUPCOL_FLAG;

            qdbb_project(pvalptrs[j], pindptrs[j],
                         paggr->pin_desc->T[j],
                         paggr->pin_desc->L[j],
                         paggr->pout_desc->V[i],
                         paggr->pout_desc->I[i],
                         paggr->pout_desc->T[i],
```

4

88

Sep 20 1993 13:37:52 qdbb_aggr.pc Page 9

```
                                paggr->pout_desc->L[i],
                                paggr->plenptrs[i]);
                    if (QDFAILED)
                        goto error_return;
                } /* loop through output columns */
            } /* else copy group-by columns to output buffer */

            /* Return aggregate results to parent */
            retval = QDBB_REPLY_READY;
            goto return_reply;
        } /* loop until HAVING clause is satisfied */
    } /* if (req & (QDBB_REQ_RESET | QDBB_REQ_NEXT)) */

    else if (req == QDBB_REQ_CLOSE)
    {

        /* Pass cleanup request along to child. */
        retval = (*(paggr->pchild->hdr.pfunc))
            (paggr->pchild, req, pbtt);
        if (retval == QDBB_REPLY_ERROR)
            goto error_return;

        /* Close cursors, to remove parse locks so IT can be dropped. */
        if (!(paggr->hdr.flags & QDBB_PSQ_INSERT_TO_IT))
        {
            EXEC SQL CLOSE is_cursor;
            if (sqlca.sqlcode)
            {
                QDFAIL(sqlca.sqlcode);
                goto error_return;
            }
        }

        EXEC SQL CLOSE cq_cursor;
        if (sqlca.sqlcode)
        {
            QDFAIL(sqlca.sqlcode);
            goto error_return;
        }

        /* Start timer for drop table time */
        QDTIMESTART (TIME_DROP_TABLE);

        /* Drop IT */
        *((QD_VARCHAR **)(&psql_text)) = paggr->pdts_text;

        EXEC SQL EXECUTE IMMEDIATE :psql_text;
        if (sqlca.sqlcode)
        {
            QDFAIL(sqlca.sqlcode);
            goto error_return;
        }

        /* Compute drop table time */
        QDTIMEFINISH (TIME_DROP_TABLE);

        if (QD_display_time)
        {
            fprintf (QD_display_file, "\n");

            /* Print drop table time */
            fprintf (QD_display_file, "Closing Query\n");
            QDTIMEPRINT (TIME_DROP_TABLE, "Drop Temp Table");
        }

        goto return_reply;
    }
error_return:
    retval = QDBB_REPLY_ERROR;
return_reply:
    /* If an error has occurred, drop the IT */
    if (retval == QDBB_REPLY_ERROR)
    {
```

Sep 20 1993 13:37:52 qdbb_aggr.pc Page 10

```
        *((QD_VARCHAR **)(&psql_text)) = paggr->pdts_text;

        EXEC SQL EXECUTE IMMEDIATE :psql_text;
    }

    QDEND;
    return retval;
} /* qdbb_aggr */
```

90

Sep 8 1992 14:31:51 qdbb_desc_col.c Page 1

```
/***************************************************************************
 * qdbb_desc_col - Extract column information from select descriptor
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***************************************************************************
 * REV   DATE       AUTHOR    DESCRIPTION
 * ---   --------   ------    ---------------------------------------------
 * %00   08/31/92   EYT       Initial Version
 ***************************************************************************
*/

#include <qdstd.h>
#include <qdcpext.h>
#include <qderrs.h>
#include <dtydef.h>
#include <sqlda.h>

extern sqlprc();
extern sqlnul();
extern upigdl();

/***************************************************************************
 * qdbb_desc_col - Extract column information for a given select descriptor
 *
 ***************************************************************************
*/
void qdbb_desc_col(pdesc, position, pdatatype, plength, pcolnam,
                   pcnamlen, pprecision, pscale, pnull)
reg1 SQLDA* pdesc;          /* I Pointer to select descriptor */
reg2 word position;         /* I Position in column list */
reg3 ub1 *pdatatype;        /* O Pointer to data type */
reg4 ub2 *plength;          /* O Pointer to buffer length */
reg5 text *pcolnam;         /* O Column name */
reg6 ub2 *pcnamlen;         /* O Pointer to column name length */
reg7 ub1 *pprecision;       /* O Pointer to precision */
reg8 b1 *pscale;            /* O Pointer to scale */
reg9 ub1 *pnull;            /* O Pointer to NULL/NOT NULL flag */
{
    short dtype;
    word nullok;
    word prec;
    word scal;

    QDBEGIN("qdbb_desc_col");

    /* extract datatype and NULL/NOT NULL flag */
    sqlnul (pdesc->T + position, &dtype, &nullok);

    /* set Oracle datatype */
    if (pdatatype != NULL)
        *pdatatype = dtype;

    /* set buffer length */
    if (plength != NULL)
        *plength = upigdl (dtype, pdesc->L[position]);

    /* set precision and scale */
    if (dtype == DTYNUM)
    {
        /* extract precision and scale */
        sqlprc (pdesc->L+position, &prec, &scal);
        if (pprecision != NULL)
            *pprecision = prec;
        if (pscale != NULL)
            *pscale = scal;
    }

    /* set NULL flag */
    if (pnull != NULL)
```

Sep 8 1992 14:31:51 qdbb_desc_col.c Page 2

```
        *pnull = nullok;

    /* set column name and column name length */
    if (pcolnam == NULL)
        pcnamlen = NULL;

    if (pcnamlen != NULL && pdesc->S != NULL)
    {
        if (pdesc->C[position] < *pcnamlen)
            *pcnamlen = pdesc->C[position];
        memset(pcolnam, ' ', *pcnamlen);
        memcpy(pcolnam, pdesc->S[position], *pcnamlen);
    }

    QDEND;
}
```

1

Sep 20 1993 16:21:44 qdbb_freepcur.c Page 1

```
/***********************************************************************
 * qdbb_freepcur - Free memory used by p'llel cursor and associated structures
 *                 Drop the pcursor from list attached to cnx
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***********************************************************************
 * REV   DATE      AUTHOR   DESCRIPTION
 * ---   --------  ------   -----------------------------------------------
 * %01   08/16/93  EYT      Call to qdrt_free sets pointer=NULL, so
 *                          accept param pointer to pointer
 * %00   11/19/91  JM       Initial Version
 ***********************************************************************
 */

#include <qdstd.h>
#include <qdbbext.h>
#include <qdrtext.h>
#include <sqlda.h>
#include <qderrs.h>

/* qdbb_freetree - local routine to free combining tree */
static QDSTATUS qdbb_freetree(
#ifdef __STDC__
QDBB_UNION **
#endif /* __STDC__ */
); /* qdbb_freetree */

QDSTATUS qdbb_freepcur(pppcur, pcnx)
reg1 QDPCURSOR **pppcur;    /* Pointer to pointer to parallel cursor */
                            /* structure */
reg QDCNX *pcnx;            /* Connection to which this pcursor belongs */
{
    reg3 QDSTATUS retval = QD_OK;
    reg4 word i;
    reg5 QDPCURSOR *ppc; /* For traversing list of pcursors */
    QDPCURSOR *ppcur;

#ifdef QDDEBUG
    extern bool QD_nofree;
#endif /* QDDEBUG */

    QDBEGIN("qdbb_freepcur");

#ifdef QDDEBUG
    if (QD_nofree)
    {
        if (pcnx != NULL)
            pcnx->ppcursor = NULL;
        return retval;
    }
#endif /* QDDEBUG */

    if (pppcur == (QDPCURSOR **)NULL)
        goto return_retval;

    ppcur = *pppcur;
    if (ppcur == (QDPCURSOR *)NULL)
        goto return_retval;

    /* Free resources from combining tree */
    retval = qdbb_freetree(&(ppcur->pctree));
    if (retval)
        goto return_retval;
    for (i = 0; i < ppcur->num_btt_entries; i++)
        if (ppcur->pbtt[i] != NULL)
            qdrt_free(&(ppcur->pbtt[i]));
    if (ppcur->pbtt)
        qdrt_free(&(ppcur->pbtt));
    if (ppcur->pinput_qry)
```

Sep 20 1993 16:21:44 qdbb_freepcur.c Page 2

```
        qdrt_free(&(ppcur->pinput_qry));

    /* Unlink this pcursor from cnx's list */
    if (pcnx != NULL)
    {
        if (pcnx->ppcursor == ppcur)
            pcnx->ppcursor = ppcur->pnext;
        else
            for (ppc = pcnx->ppcursor; ppc != NULL; ppc = ppc->pnext)
                if (ppc->pnext == ppcur)
                {
                    ppc->pnext = ppcur->pnext;
                    break;
                }
    }

    qdrt_free(pppcur);

return_retval:
    QDEND;
    return retval;
} /* qdbb_freepcur */


/* qdbb_freetree - free entire combining building-blocks (bb) tree
 */
static QDSTATUS qdbb_freetree(pptree)
reg1 QDBB_UNION **pptree; /* Pointer to pointer to parse tree */
{
    reg2 word i; /* Loop index */
    reg3 QDBB_UNION *pbb;
    reg4 QDSTATUS retval = QD_OK;
    reg4 word j; /* Inner loop index */
    QDBB_UNION *ptree;

    QDBEGIN("qdbb_freetree");
    if (pptree == (QDBB_UNION **)NULL)
        goto return_retval;

    ptree = *pptree;
    if (ptree == (QDBB_UNION *)NULL)
        goto return_retval;

    /* First free everything the current structure is pointing at */
    if (ptree->check == QDCK_ROOT)
    {
        bool child_is_aggr;

        /* Check whether child is aggr bb, before freeing it. */
        child_is_aggr = (ptree->root.pchild->check == QDCK_AGGR);

        if (ptree->root.pchild != NULL)
            qdbb_freetree(&(ptree->root.pchild));

        /* If pin_desc does not match pout_desc, then it is a copy
         * of a subcursor descriptor, and is freed using qdrt_free.
         * For now, we free the output descriptor, but in "real life" this
         * may be passed in from the caller.
         */
        if (ptree->root.pout_desc != NULL)
        {
            /* If pout_desc == pin_desc, then V and I arrays
             * point into self-describing buffers (not allocated
             * by sqlald; qdbb_root sets the V and I pointers
             * to point into its input buffer), so set them to NULL
             * so sqlclu won't try to free them.
             */
            if (ptree->root.pout_desc == ptree->root.pin_desc)
            {
                ptree->root.pout_desc->V = NULL;
                ptree->root.pout_desc->I = NULL;
            }
            sqlclu(ptree->root.pout_desc);
```

92

Sep 20 1993 16:21:44 qdbb_freepcur.c Page 3

```
        }
        if (ptree->root.pin_desc != NULL && ptree->root.pin_desc !=
            ptree->root.pout_desc)
        {
            /* If root's child is aggr, then pin_desc is an independently-
             * allocated descriptor, but its V and I arrays point into
             * a self-describing buffer, and so should not be freed.
             */
            if (child_is_aggr)
            {
                ptree->root.pin_desc->V = NULL;
                ptree->root.pin_desc->I = NULL;
                sqlclu(ptree->root.pin_desc);
            }
            /* Otherwise, pin_desc is a copy of a psq descriptor,
             * and can just be freed with qdrt_free.
             */
            else
                qdrt_free(&(ptree->root.pin_desc));
        }
        if (ptree->root.plenptrs != NULL)
            qdrt_free(&(ptree->root.plenptrs));
    } /* QDCK_ROOT */
    else if (ptree->check == QDCK_AGGR)
    {
        if (ptree->aggr.pchild != NULL)
            qdbb_freetree(&(ptree->aggr.pchild));
        if (ptree->aggr.pcts_text != NULL)
            qdrt_free(&(ptree->aggr.pcts_text));
        if (ptree->aggr.pdts_text != NULL)
            qdrt_free(&(ptree->aggr.pdts_text));
        if (ptree->aggr.pis_text)
            qdrt_free(&(ptree->aggr.pis_text));
        if (ptree->aggr.pds_text)
            qdrt_free(&(ptree->aggr.pds_text));
        qdrt_free(&(ptree->aggr.pcq_text));
        if (ptree->aggr.pin_colnums)
            qdrt_free(&(ptree->aggr.pin_colnums));
        sqlclu(ptree->aggr.pcq_select_desc);
        sqlclu(ptree->aggr.pcq_bind_desc);
        if (ptree->aggr.pis_bind_desc)
            sqlclu(ptree->aggr.pis_bind_desc);
    }
    else if (ptree->check == QDCK_MERG ||
             ptree->check == QDCK_UALL)
    {
        for (i = 0; i < ptree->mplex.nchildren; i++)
            if (ptree->mplex.children[i].pchild != NULL)
            {
                /* Free psq text and descriptors from here, since
                 * the former should only be freed once, and the latter
                 * should be freed one less time than the number of
                 * children (because the master copy should be freed
                 * using sqlclu, to free substructures).
                 */
                pbb = ptree->mplex.children[i].pchild->exchange.pchild;
                if (i == 0 && pbb)
                {
                    qdrt_free(&(pbb->subcur.ppsq_text));

                    /* Set the select descriptor's V and I pointers to
                     * NULL, because they are pointing into self-
                     * describing buffers, which get freed separately;
                     * the original V and I arrays allocated by sqlald
                     * were freed in qdcp_desc_subcur_qry, right after
                     * we allocated the descriptor, because they were not
                     * needed.
                     */
                    if (pbb->subcur.ppsq_select_desc)
                    {
                        pbb->subcur.ppsq_select_desc->V = NULL;
                        pbb->subcur.ppsq_select_desc->I = NULL;
                        sqlclu(pbb->subcur.ppsq_select_desc);
```

Sep 20 1993 16:21:44 qdbb_freepcur.c Page 4

```
                        sqlclu(pbb->subcur.ppsq_bind_desc);
                    }
                }
                else if (i == 1 && pbb)
                {
                    /* Each copy of bind descriptor has its own
                     * V and I arrays, so free them.
                     */
                    qdrt_free(&(pbb->subcur.ppsq_bind_desc->V));
                    qdrt_free(&(pbb->subcur.ppsq_bind_desc->I));
                }
                else if (pbb)
                {
                    qdrt_free(&(pbb->subcur.ppsq_select_desc));
                    qdrt_free(&(pbb->subcur.ppsq_bind_desc));
                }
                qdbb_freetree(&(ptree->mplex.children[i].pchild));
            }
        if (ptree->mplex.pordcols != NULL)
            qdrt_free(&(ptree->mplex.pordcols));
    }
    else if (ptree->check == QDCK_EXCH)
    {
        if (ptree->exchange.pchild != NULL)
            qdbb_freetree(&(ptree->exchange.pchild));

        /* Free buffers */
        for (i = 0; i < ptree->exchange.nbuffers; i++)
            if (ptree->exchange.btt[i] != NULL)
            {
                /* If this buffer is also in pcursor's btt,
                 * set pointer to NULL there so we won't try to
                 * free it twice.
                 */
                for (j = 0;
                     j < ptree->exchange.ppcursor->num_btt_entries;
                     j++)
                    if (ptree->exchange.ppcursor->pbtt[j] ==
                        ptree->exchange.btt[i])
                        ptree->exchange.ppcursor->pbtt[j] = NULL;

                qdrt_free(&(ptree->exchange.btt[i]));
            }
    }
    else if (ptree->check == QDCK_SUBC)
    {
        /*qdrt_free(&(ptree->subcur.ppsq_text));*/
    }

    /* Now free the current structure */
    qdrt_free(pptree);

return_retval:
    QDEND;
    return retval;
} /* qdbb_freetree */

#if 0
    /* Deallocate descriptor */
    for (i = 0; i < da->F; i++)
    {
        if (da->V[i] != NULL)
            qdrt_free(&(da->V[i]));
        if (da->I[i] != NULL)
            qdrt_free(&(da->I[i]));
    }

#endif
```

93

Dec 13 1993 10:59:33 qdbb_mplex.c Page 1

```
/*********************************************************************
 * qdbb_mplex - Execution function for MPLEX qd building block
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *********************************************************************
 * REV   DATE      AUTHOR   DESCRIPTION
 * ---   --------  ------   -------------------------------------------
 * %02   10/27/93  EYT      Master thread sleeps after looping
 *                          QD_SLEEP_THRESHOLD times
 * %01   10/22/93  EYT      Accept datatype DTYAFC (ANSI fixed char)
 * %00   11/06/91  JM       Initial Version
 *********************************************************************
 */

#include <stdio.h>
#include <strings.h>
#include <ctype.h>
#include <dtydef.h>
#include <qdstd.h>
#include <qdspext.h>
#include <qdcpext.h>
#include <qdxpext.h>
#include <qdbbext.h>
#include <qderrs.h>
#ifdef QDDEBUG
#include <qdtstext.h>
#endif /* QDDEBUG */
#include <memory.h>
#include <stdlib.h>
#include <sqlda.h>

/* local routines */

static QDSTATUS insert_in_order(
#ifdef __STDC__
word, QDBB_MPLEX *, text **
#endif /* __STDC__ */
); /* insert_in_order */

QDBB_REPLY qdbb_mplex(pmplex, req, pbtt)
reg1 QDBB_MPLEX *pmplex;
reg2 word req;
reg3 text **pbtt;  /* Pointer to buffer translation table */
{
    reg4 QDSTATUS retval;
    reg5 word i;
    reg6 bool all_children_eod; /* Set to FALSE if some child has not */
                                /*  yet returned EOD */
    reg7 bool eog = FALSE;  /* Have we reached end of group for grouping */
                            /*  or duplicate elimination? */
    reg6 word j;    /* inner loop index */
    int loopcnt;    /* Number of times master thread has looped waiting */
                    /* for row from child threads */

    QDBEGIN("qdbb_mplex");
#ifdef QDDEBUG
    if (req == QDBB_REQ_DISPLAY)
    {
        printf("%4.4s at %08lx\n", (text *)(&pmplex->hdr.check), pmplex);
        printf("  out_bufnum: %d\n", pmplex->out_bufnum);
        if (pmplex->flags != 0)
            printf("  flags: %02x (%s)\n", pmplex->flags,
                   (pmplex->flags & QDBB_MPLEX_GROUP) ? "GROUP" :
                   ((pmplex->flags & QDBB_MPLEX_DISTINCT) ?
                    "DISTINCT" : "?"));
        if (pmplex->hdr.check == QDCK_MERG)
        {
            printf("  nordcols: %d\n", pmplex->nordcols);
            for (i = 0; i < pmplex->nordcols; i++)
```

Dec 13 1993 10:59:33 qdbb_mplex.c Page 2

```
                printf("    ordcol %d: colnum %d %s\n",
                       i, pmplex->pordcols[i].colnum,
                       (pmplex->pordcols[i].flags & QDBB_ORDCOL_DESC) ?
                       "DESC" : "");
        }
        printf("  nchildren: %d\n", pmplex->nchildren);
        for (i = 0; i < pmplex->nchildren; i++)
        {
            printf("  Child %d bufnum: %d  pchild: %08lx\n", i,
                   pmplex->children[i].bufnum, pmplex->children[i].pchild);
            retval = (*(pmplex->children[i].pchild->hdr.pfunc))
                (pmplex->children[i].pchild, QDBB_REQ_DISPLAY, pbtt);
        }

        retval = QDBB_REPLY_READY;
        goto return_reply;
    } /* if (req == QDBB_REQ_DISPLAY) */
#endif /* QDDEBUG */

    if (req == QDBB_REQ_OPEN)
    {
        for (i = 0; i < pmplex->nchildren; i++)
        {
            retval = (*(pmplex->children[i].pchild->hdr.pfunc))
                (pmplex->children[i].pchild, QDBB_REQ_OPEN, pbtt);
            if (retval == QDBB_REPLY_ERROR)
            {
#ifdef QDBB_REQ_CANCEL
                /* If previous children have already been OPENed,
                 * make CANCEL requests to previously opened children.
                 */
                if (i > 0)
                {
                    for (j = 0; j < i; j++)
                        retval = (*(pmplex->children[j].pchild->hdr.pfunc))
                            (pmplex->children[j].pchild,
                             QDBB_REQ_CANCEL, pbtt);
                }
#endif /* QDBB_REQ_CANCEL */
                goto error_return;
            } /* if error */
        } /* open each child */

        /*****************************************************************
         * If query is INSERT/SELECT without aggregation:
         * Loop through children, requesting NEXT until all have returned
         * EOD or until one returns ERROR.  If all returned EOD, set
         * broadcast request to COMMIT; if any returned ERROR, set
         * broadcast request to ROLLBACK.  Then loop through children
         * again request NEXT, expecting a reply of READY to mean children
         * have finished their COMMIT or ROLLBACK.  During this loop, if
         * there's been no error, tally up the counts of inserted rows.
         *****************************************************************/
        if ((pmplex->hdr.flags & QDBB_PSQ_INSERT_SELECT)
            && QD_2_phase_commit)
        {
            bool all_children_ready;
            extern __private ub4 KSR_qd_oercnt;
            KSR_qd_oercnt = 0;

            /* Loop through children, request NEXT from each child which
             *  isn't already at EOD, until all have returned EOD or
             *  one has returned ERROR.
             */
            retval = QDBB_REPLY_NULL;
            all_children_eod = TRUE;
            i = 0;
            do
            {
                if (!(pmplex->children[i].flags & QDBB_CHILD_EOD))
                {
                    retval = (*(pmplex->children[i].pchild->hdr.pfunc))
```

```
                (pmplex->children[i].pchild, QDBB_REQ_NEXT, pbtt);
            if (retval == QDBB_REPLY_ERROR)
            {
                pmplex->hdr.state = QDBB_STATE_ERROR;
                break;
            }
            if (retval == QDBB_REPLY_EOD)
                pmplex->children[i].flags |= QDBB_CHILD_EOD;
            else
                all_children_eod = FALSE;
        }
        i++;
        if (i >= pmplex->nchildren)
        {
            if (all_children_eod)
            {
                pmplex->hdr.state = QDBB_STATE_EOD;
                break;
            }
            else
            {
                i = 0;
                all_children_eod = TRUE;
            }
        }
    } while (pmplex->hdr.state != QDBB_REPLY_ERROR &&
             pmplex->hdr.state != QDBB_STATE_EOD);

    /* Set broadcast request to COMMIT if all inserts succeeded,
     * else to ROLLBACK.
     */
    if (pmplex->hdr.state == QDBB_STATE_EOD)
        pmplex->children[0].pchild->exchange.ppcursor->request =
            QDBB_REQ_COMMIT;
    else
        pmplex->children[0].pchild->exchange.ppcursor->request =
            QDBB_REQ_ROLLBACK;

    all_children_ready = TRUE;
    i = 0;

    do
    {
        /* This time through the loop, turn off CHILD_EOD
         * flag as sign that a child has replied.
         */
        if (pmplex->children[i].flags & QDBB_CHILD_EOD)
        {
            retval = (*(pmplex->children[i].pchild->hdr.pfunc))
                (pmplex->children[i].pchild, QDBB_REQ_NEXT, pbtt);
            if (retval == QDBB_REPLY_ERROR)
            {
                pmplex->hdr.state = QDBB_STATE_ERROR;
                goto error_return;
            }
            if (retval == QDBB_REPLY_READY)
            {
                pmplex->children[i].flags &= ~QDBB_CHILD_EOD;
                KSR_qd_oercnt +=
                    pmplex->children[i].pchild->exchange.pchild->
                        subcur.oercnt;
            }
            else
                all_children_ready = FALSE;
        }
        i++;
        if (i >= pmplex->nchildren)
        {
            if (all_children_ready)
                break;
            else
            {
                i = 0;
```

```
                    all_children_ready = TRUE;
                }
            }
        } while (TRUE);
        if (pmplex->hdr.state == QDBB_REPLY_EOD)
            retval = QDBB_REPLY_EOD;
        else
            retval = QDBB_REPLY_ERROR;
        goto return_reply;
    } /* if (pmplex->hdr.flags & QDBB_PSQ_INSERT_SELECT) */

#ifdef EXTRA_REQUEST_FOR_WAIT
    /* Each child will have returned PENDING, meaning a thread has
     * been started, and threads are now waiting on barrier until all
     * CONNECTs complete.  Now request OPEN from first child again, which
     * causes that child to wait on the master side of the barrier until
     * the barrier clears, and then returns READY.
     */
    if (pmplex->hdr.state == QDBB_STATE_EMPTY)
    {
        retval = (*(pmplex->children[0].pchild->hdr.pfunc))
            (pmplex->children[0].pchild, QDBB_REQ_OPEN, pbtt);
        if (retval == QDBB_REPLY_ERROR)
            goto error_return;
        pmplex->hdr.state = QDBB_STATE_PENDING;
    }
#endif /* EXTRA_REQUEST_FOR_WAIT */
    goto return_reply;
  }
  /* In future, NEXT request may be OR'd with OPEN, but for now
   * (11/14/91), assume OPEN is done separately.
   */
  if (req & QDBB_REQ_NEXT)
  {
    /* The forever group is for purposes of duplicate elimination:
     * keep looping until all of a set of identical rows are returned,
     * then return the final one.  When not performing duplicate
     * elimination, we will always break out of this loop before the
     * end of 1 pass.
     */
    for (;;)
    {
      if (pmplex->hdr.state == QDBB_STATE_EOD)
      {
        retval = QDBB_REPLY_EOD;
        goto return_reply;
      }

      /* From this point on, processing of NEXT request differs for
       * union-all vs. merge multiplexer.
       */
      if (pmplex->hdr.check == QDCK_UALL)
      {
        /* Loop through children, request NEXT from each child which */
        /*  isn't already at EOD, until a child returns READY, or it */
        /*  is determined that all children are EOD */
        retval = QDBB_REPLY_NULL;
        all_children_eod = TRUE;
        i = pmplex->curchild;
        loopcnt = 0;
        do
        {
          loopcnt++;
          if (loopcnt > QD_SLEEP_THRESHOLD)
          {
            usleep (1000);
            loopcnt = 0;
          }

          if (!(pmplex->children[i].flags & QDBB_CHILD_EOD))
          {
            retval = (*(pmplex->children[i].pchild->hdr.pfunc))
                (pmplex->children[i].pchild, QDBB_REQ_NEXT, pbtt);
```

```
            if (retval == QDBB_REPLY_ERROR)
                goto error_return;
            if (retval == QDBB_REPLY_READY)
                pbtt[pmplex->out_bufnum] =
                    pbtt[pmplex->children[i].bufnum];
            if (retval == QDBB_REPLY_EOD)
                pmplex->children[i].flags |= QDBB_CHILD_EOD;
            else
                all_children_eod = FALSE;
        }
        i++;
        if (i >= pmplex->nchildren)
            i = 0;

        /* If we've examined all children, and they are all EOD,
         * return EOD.
         */
        if (i == pmplex->curchild)
        {
            if (all_children_eod)
            {
                pmplex->hdr.state = QDBB_STATE_EOD;
                retval = QDBB_REPLY_EOD;
            }
            else /* reset all_children_eod for next round */
                all_children_eod = TRUE;
        }
    } while (retval != QDBB_REPLY_READY &&
             pmplex->hdr.state != QDBB_STATE_EOD);
    pmplex->curchild = i;
    goto return_reply;
} /* if this is a union-all multiplexer */

/* Merge multiplexer.
 * If state is PENDING, this means not all children have rows ready,
 * and there isn't a ready row with the same merge values as the
 * previously-returned row.  Pull rows from children until all are
 * ready, inserting each row in the sort order as it is returned,
 * until number of ready children plus the number of eod children
 * equals the number of children.
 * If state is READY, then first row can be returned, and its
 * successor becomes the new first row.  If the successor equals
 * the returned row on all merge columns, state remains READY,
 * else it reverts to PENDING.
 * As rows are returned, decrement number of ready rows, and
 * increment it as rows are pulled from children.
 * When a row from a child is returned, leave that child as the
 * current child (unlike the union-all algorithm).  That way,
 * when next called, we will try that child (which may be the only
 * non-ready one) immediately, notice that nready matches nchildren,
 * and avoid a long search.
 */
else
{
#ifdef QDDEBUG_MERGE
    printf(
    "State: %d  curchild: %d  firchild: %d  nready: %d  neod: %d\n",
        pmplex->hdr.state, pmplex->curchild,
        pmplex->firchild, pmplex->nready, pmplex->neod);
    printf("EOD: ");
    for (i = 0; i < pmplex->nchildren; i++)
        if (pmplex->children[i].flags & QDBB_CHILD_EOD)
            printf("%d ", i);
    printf("\nREADY: ");
    for (i = 0; i < pmplex->nchildren; i++)
        if (pmplex->children[i].flags & QDBB_CHILD_READY)
            printf("%d ", i);
    printf("\n");
#endif
    if (pmplex->hdr.state != QDBB_STATE_READY)
    {
        i = pmplex->curchild;
        loopcnt = 0;
```

```
        do
        {
            loopcnt++;
            if (loopcnt > QD_SLEEP_THRESHOLD)
            {
                usleep (1000);
                loopcnt = 0;
            }

            /* If current child is not already either READY or
             * EOD, then request NEXT row from it.
             */
            if (!(pmplex->children[i].flags &
                  (QDBB_CHILD_EOD | QDBB_CHILD_READY)))
            {
                retval = (*(pmplex->children[i].pchild->hdr.pfunc))
                    (pmplex->children[i].pchild, req, pbtt);
                if (retval == QDBB_REPLY_ERROR)
                    goto error_return;
                if (retval == QDBB_REPLY_READY)
                {
                    pmplex->children[i].flags |= QDBB_CHILD_READY;

                    /* First row retrieved after starting, or after
                     * returning all previous rows?
                     */
                    if (pmplex->nready == 0)
                    {
                        pmplex->hdr.state = QDBB_STATE_PENDING;
                        pmplex->firchild = i;
                        pmplex->children[i].succ = QDBB_CHILD_NOSUCC;
                        pmplex->children[i].flags &=
                            (~QDBB_CHILD_EQ_SUCC);
                    }
                    else /* Insert row in sort order */
                    {
                        insert_in_order(i, pmplex, pbtt);
                        if (QDFAILED)
                            goto error_return;
                    }
                    pmplex->nready++;
                }
                else if (retval == QDBB_REPLY_EOD)
                {
                    pmplex->children[i].flags |= QDBB_CHILD_EOD;
                    pmplex->neod++;
                }
            } /* if this child is neither READY nor EOD */

            i++;
            if (i >= pmplex->nchildren)
                i = 0;
        } while (pmplex->nready + pmplex->neod < pmplex->nchildren);

        if (pmplex->neod == pmplex->nchildren)
        {
            pmplex->hdr.state = QDBB_STATE_EOD;
            retval = QDBB_REPLY_EOD;
            goto return_reply;
        }
        else
            pmplex->hdr.state = QDBB_STATE_READY;
    } /* If state is not READY */

    /* Assert: if we get to this point, we have a row ready to
     * return.
     */
    /* Leave this child current, since we know we'll have to
     * replace this row soon.
     */
    pmplex->curchild = pmplex->firchild;

    /* If next row in sequence doesn't exactly match this one on
```

96

Dec 13 1993 10:59:33 qdbb_mplex.c Page 7

```
         * merge columns, then we must have a ready row from all
         * children before we know which row to return next.
         * Also, if we're grouping, we've reached EOG, and if we're
         * returning only distinct rows, we may now return a row.
         */
        if (!(pmplex->children[pmplex->curchild].flags &
              QDBB_CHILD_EQ_SUCC))
        {
            pmplex->hdr.state = QDBB_STATE_PENDING;
            eog = TRUE;
        }

        /* Make this row's successor the new first row. */
        pmplex->firchild = pmplex->children[pmplex->curchild].succ;

        /* Clear this child's flags; once returned, its not longer
         * ready, and we don't know yet whether it's EOD, or care any
         * longer whether it equals its successor.
         */
        pmplex->children[pmplex->curchild].flags = 0;

        /* Decrement number of ready rows */
        pmplex->nready--;

        /* If no rows remain ready, this is another indication of
         * EOG, because all rows of a given group must have been
         * visible at once, since each child would only have one
         * row from each group, at most.
         */
        if (pmplex->nready == 0)
            eog = TRUE;

        /* Return a row now, unless we're eliminating duplicates, and
         * haven't reached end-of-group.
         */
        if (!(eog == FALSE && (pmplex->flags & QDBB_MPLEX_DISTINCT)))
        {
            /* Set pointer to row to return */
            pbtt[pmplex->out_bufnum] =
                pbtt[pmplex->children[pmplex->curchild].bufnum];

            retval = QDBB_REPLY_READY;

            /* If we're performing grouping, flag end-of-group if
             * we've reached it.
             */
            if (eog && (pmplex->flags & QDBB_MPLEX_GROUP))
                retval |= QDBB_REPLY_EOG;
            goto return_reply;
        } /* if not (eliminating duplicates, not at end of group) */
    } /* else this is a merge multiplexer */
  } /* for (;;) */
} /* if (req & QDBB_REQ_NEXT) */

/* When parallel execution of subcursors is implemented, we
 * may want the mplex bb, or maybe even a bb higher up the tree,
 * to put the CLEANUP request in the broadcast command area, for
 * subcursors to see when they get around to it.  For now, though,
 * loop through children, passing CLEANUP request to each.
 */
else if (req == QDBB_REQ_CLOSE)
{
    for (i = 0; i < pmplex->nchildren; i++)
    {
        retval = (*(pmplex->children[i].pchild->hdr.pfunc))
            (pmplex->children[i].pchild, req, pbtt);
        if (retval == QDBB_REPLY_ERROR)
            goto error_return;
    }
    goto return_reply;
}
else
{
```

Dec 13 1993 10:59:33 qdbb_mplex.c Page 8

```
        retval = QDBB_REPLY_NULL;
        goto return_reply;
    }
error_return:
    retval = QDBB_REPLY_ERROR;
return_reply:
    QDEND;
    return retval;
} /* qdbb_mplex */


/*************************************************************************
 * insert_in_order - insert new row in sort order of previously collected
 * rows.  Set succ of child specified by cn to the number of the child with
 * the row that follows the new row, and set succ of predecessor row to cn.
 * (If this is first row, pmplex->firchild is set to cn; if this is last
 * row, child cn's succ is set to QDBB_CHILD_NOSUCC.)
 *************************************************************************
 */
static QDSTATUS insert_in_order(cn, pmplex, pbtt)
reg1 word cn;       /* Child number - insert this child's row in sort order */
reg2 QDBB_MPLEX *pmplex; /* Pointer to multiplexer bb */
text **pbtt;        /* Pointer to buffer translation table */
{
    reg3 word i;      /* Loop index */
    reg4 word j;      /* Inner loop index */
    reg5 word pred;   /* Predecessor child number */
    reg6 text **pnewvalptrs; /* Array of pointers to column values, for */
                             /*  new row to be inserted in sort order */
    reg7 text **poldvalptrs; /* Array of poitners to column values, for old */
                             /*  rows to which new row is being compared */
    reg8 short **pnewindptrs; /* Array of pointers to indicators, for */
                              /*  new row to be inserted in sort order */
    reg9 short **poldindptrs; /* Array of pointers to indicators, for */
                              /*  rows to which new row is being compared */
    reg10 word comp_result;  /* Comparison result */
#   define RES_EQ 0
#   define RES_NEW_FIRST 1
#   define RES_OLD_FIRST -1
    reg11 word colnum;       /* Column number currently being compared */

    /* Set pointers to the arrays of value and indicator pointers in the
     * buffer of the child whose row is to be inserted in sort order.
     */
    pnewvalptrs = (text **)(pbtt[pmplex->children[cn].bufnum]);
    pnewindptrs = (short **)(pnewvalptrs + pmplex->pdesc->N);

    /* Compare the new row to each row in the already-collected sequence,
     * starting from the first, until finding a row which the new row
     * either matches or preceeds, or until running out of rows.
     */
    for (i = pmplex->firchild;
         i != QDBB_CHILD_NOSUCC;
         pred = i, i = pmplex->children[i].succ)
    {
        /* Set pointers to arrays of value and indicator pointers for next
         * row to be compared.
         */
        poldvalptrs = (text **)(pbtt[pmplex->children[i].bufnum]);
        poldindptrs = (short **)(poldvalptrs + pmplex->pdesc->N);

        /* Loop through ordering columns, performing comparisons */
        for (j = 0; j < pmplex->nordcols; j++)
        {
            colnum = pmplex->pordcols[j].colnum;

            /* Is this column NULL in new row? */
            if (pnewindptrs[colnum] != NULL &&
                *(pnewindptrs[colnum]) == -1)
            {
                /* Is this column also NULL in old row? */
                if (poldindptrs[colnum] != NULL &&
                    *poldindptrs[colnum] == -1)
```

4

Dec 13 1993 10:59:33 qdbb_mplex.c Page 9

```
                comp_result = RES_EQ;
            else
                /* Non-NULL preceeds NULL */
                comp_result = RES_OLD_FIRST;
        }
        /* Is this column NULL only in old row? */
        else if (poldindptrs[colnum] != NULL &&
                 *poldindptrs[colnum] == -1)
            comp_result = RES_NEW_FIRST;

        else /* Neither is NULL, so let's perform comparison */
        {
            switch (pmplex->pdesc->T[colnum])
            {
              case DTYCHR:
              case DTYAFC:
                comp_result = memcmp((text *)poldvalptrs[colnum],
                                     (text *)pnewvalptrs[colnum],
                                     pmplex->pdesc->L[colnum]);
                break;
              case DTYSTR:
                comp_result = strcmp((text *)poldvalptrs[colnum],
                                     (text *)pnewvalptrs[colnum]);
                break;
              case DTYINT:
                comp_result = *((word *)(poldvalptrs[colnum])) -
                              *((word *)(pnewvalptrs[colnum]));
                break;
              case DTYFLT:
                if (*((float *)(poldvalptrs[colnum])) >
                    *((float *)(pnewvalptrs[colnum])))
                    comp_result = RES_NEW_FIRST;
                else if (*((float *)(poldvalptrs[colnum])) ==
                         *((float *)(pnewvalptrs[colnum])))
                    comp_result = RES_EQ;
                else comp_result = RES_OLD_FIRST;
                break;
              default:
                QDFAIL(QD_CP_UNRECOGNIZED_DATATYPE);
                goto error_return;
            }; /* switch */
        } /* else neither column is NULL */
        /* If descending sort is requested on this column, reverse
         * comparison result.
         */
        if (pmplex->pordcols[j].flags & QDBB_ORDCOL_DESC)
            comp_result = -comp_result;

        /* If there was no match on this column, we're done. */
        if (comp_result != RES_EQ)
            break;
    } /* for each ordering column */

    /* If new row matches or preceeds old row, we're done */
    if (comp_result >= 0)
        break;
} /* for each previously-collected row */

/* Counter i now indicates the successor of the new row (which may be
 * QDBB_CHILD_NOSUCC).
 */
pmplex->children[cn].succ = i;

if (i != QDBB_CHILD_NOSUCC && comp_result == RES_EQ)
    pmplex->children[cn].flags |= QDBB_CHILD_EQ_SUCC;

/* Was new row's successor previously first in list? */
if (pmplex->firchild == i)
    pmplex->firchild = cn;
else
    pmplex->children[pred].succ = cn;
error_return:
    return QD_STATUS;
```

Dec 13 1993 10:59:33 qdbb_mplex.c Page 10

```
} /* insert_in_order */
```

98

Sep 21 1993 16:00:40 qdbb_project.c Page 1

```
/*************************************************************************
 * qdbb_project - Project a data item to a new location, datatype, and length
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV  DATE      AUTHOR  DESCRIPTION
 * ---  --------  ------  ---------------------------------------------
 * %06  10/21/92  EYT     Test if pval_len is not null before setting
 * %05  10/14/92  EYT     If value is null, set length to zero
 * %04  10/09/92  EYT     If src = dest, just set output len and exit
 * %03  09/22/92  EYT     Set data value lengths. Define slen, dlen as size_t
 * %02  09/02/92  EYT     Add NUM, LBI, LNG conversions
 * %01  08/04/92  EYT     Add CHAR, BIN data type conversions
 * %00  11/22/91  JM      Initial Version
 *************************************************************************
*/
#include <qdstd.h>
#include <qderrs.h>
#include <dtydef.h>
#include <memory.h>
#include <aridef.h>
#ifdef QDDEBUG
#include <qdtstext.h>
#endif /* QDDEBUG */

/* Local routines */
static void adjust_par();
static void right_justify();
static short cnvd2f ();
static void init_buffer ();
static void format_string ();

QDSTATUS qdbb_project(psrc, psrc_ind, src_type, src_len,
                      pdest, pdest_ind, dest_type, dest_len, pval_len)
reg1 text *psrc;          /* Pointer to source location of data item */
reg2 short *psrc_ind;     /* Pointer to indicator for source data item */
reg3 word src_type;       /* Datatype of source data item */
reg4 word src_len;        /* Length of source data item */
reg5 text *pdest;         /* Pointer to destination location of data item */
reg6 short *pdest_ind;    /* Pointer to indicator for dest. data item */
reg7 word dest_type;      /* Datatype of destination data item */
reg8 word dest_len;       /* Buffer Length of destination data item */
reg9 short *pval_len;     /* Length of destination data item */
{
    reg9 QDSTATUS retval = QD_OK;  /* return value */
    reg10 short neg = 0;           /* FLT to CHR: space for neg sign */
    sb4 temp = 0;
    text *psbuf, *pdbuf;           /* source and dest buffers */
    short retlen;
    size_t slen, dlen;             /* buffer lengths */          /*%03*/
    text buffer [DBL_DIG+1];       /* temp buffer */

    QDBEGIN("qdbb_project");

    /* New in ORACLE 7.0.12: DTYACF is equivalent to DTYCHR */
    if (src_type == DTYAFC)
        src_type = DTYCHR;
    if (dest_type == DTYAFC)
        dest_type = DTYCHR;

    /* In most cases let value length equal buffer length */     /*%03*/
    if (pval_len != (short *)NULL)
        *pval_len = dest_len;
                                                                 /*%04*/
    if (psrc == pdest)
        goto return_retval;

    if (psrc_ind != (short *)NULL)
    {
```

Sep 21 1993 16:00:40 qdbb_project.c Page 2

```
        if (pdest_ind != (short *)NULL)
            *pdest_ind = *psrc_ind;

        /* If source data item is NULL, copying indicator value is
         * all we need to do.
         */
        if (*psrc_ind < 0)
        {
            /* if data is null, set output value length to 0 */      /*%06*/
            if (pval_len != (short *)NULL)                           /*%05*/
                *pval_len = 0;
            goto return_retval;
        }
    }

    /* If types and lengths are equal, we just need to copy value */.
    if (src_type == dest_type && src_len == dest_len)
    {
        memcpy(pdest, psrc, src_len);

        /* If type is DTYSTR (zero-terminated string), and an output
         * length is requested, set it to value's string length.
         */
        if (src_type == DTYSTR && pval_len != (short *)NULL)
            *pval_len = strlen(psrc);
        goto return_retval;
    }

    switch(src_type)
    {
    case DTYINT:
        switch(dest_type)
        {
        /* DTYINT to DTYINT */
        case DTYINT:
            if (src_len == 1)
                temp = *((char *)psrc);
            else
            if (src_len == 2)
                temp = *((sb2 *)psrc);
            else
            if (src_len == 4)
                temp = *((sb4 *)psrc);
            else
            {
                retval = QD_BB_UNSUPPORTED_CONVERSION;
                goto error_return;
            }

            if (dest_len == 1)
                *((char *)pdest) = temp;
            else
            if (dest_len == 2)
                *((sb2 *)pdest) = temp;
            else
            if (dest_len == 4)
                *((sb4 *)pdest) = temp;
            else
            {
                retval = QD_BB_UNSUPPORTED_CONVERSION;
                goto error_return;
            }
            break;
        /* DTYINT to DTYFLT */
        case DTYFLT:
            if (dest_len != sizeof(QD_WIDEST_FLOAT))
            {
                retval = QD_BB_UNSUPPORTED_CONVERSION;
                goto error_return;
            }
            if (src_len == 1)
                *((QD_WIDEST_FLOAT *)pdest) = *((char *)psrc);
            else
```

99

```
        if (src_len == 2)
            *((QD_WIDEST_FLOAT *)pdest) = *((sb2 *)psrc);
        else
        if (src_len == 4)
            *((QD_WIDEST_FLOAT *)pdest) = *((sb4 *)psrc);
        else
        {
            retval = QD_BB_UNSUPPORTED_CONVERSION;
            goto error_return;
        }
        break;
    /* DTYINT to (DTYCHR, DTYVCS, DTYSTR) */
    case DTYCHR:
    case DTYVCS:
    case DTYSTR:
        adjust_par (&pdbuf, pdest, &dlen, dest_len, dest_type);
        /* set VARCHAR length */
        if (dest_type == DTYVCS)
            *((short *)pdest) = dlen;

        if (src_len == 2)
            /* oracore: convert sb2 to text in buffer */
            /*          need to use intermediate buffer for case */
            /*          retlen > destlen */
            retlen = lmfw2b ((text *)buffer, *((sb2 *)psrc), 0);
        else
        if (src_len == 4)
            /* oracore: convert sb4 to text in buffer */
            retlen = lmf42b ((text *)buffer, *((sb4 *)psrc), 0);
        else
        {
            retval = QD_BB_UNSUPPORTED_CONVERSION;
            goto error_return;
        }

        if (dest_type == DTYSTR)
            /* Null terminate after last significant char */
            /* Ex: 123 to "123" */
            format_string (pdest, buffer, dlen, retlen);
        else
            /* Right justify and pad w/ spaces */
            /* Ex: 123 to "   123" */
            right_justify (pdbuf, buffer, dlen, retlen);
        break;
    /* DTYINT to DTYBIN */
    case DTYBIN:
    case DTYVBI:
        adjust_par (&pdbuf, pdest, &dlen, dest_len, dest_type);
        /* set VARCHAR length */
        if (dest_type == DTYVBI)
            *((short *)pdest) = dlen;
        init_buffer (pdbuf, dlen, dest_type);

        if (src_len == 2)
        {
            temp = *((sb2 *)psrc);
            /* oracore: convert ub4 to hexidecimal */
            lmf42h ((text *)pdbuf, temp, dlen);
        }
        else
        if (src_len == 4)
        {
            temp = *((sb4 *)psrc);
            /* oracore: convert ub4 to hexidecimal */
            lmf42h ((text *)pdbuf, temp, dlen);
        }
        else
        {
            retval = QD_BB_UNSUPPORTED_CONVERSION;
            goto error_return;
        }
        break;
    /* DTYINT to DTYNUM */                                  /*+%02*/
```

```
        case DTYNUM:
            if (src_len != 1 && src_len != 2 && src_len != 4)
            {
                retval = QD_BB_UNSUPPORTED_CONVERSION;
                goto error_return;
            }
            /* oracore: integer to Oracle number */
            if (carmin (psrc, src_len, OARTEB, (oarnum_t *)pdest,
                        &dlen) != OARSUCC)
            {
                retval = QD_BB_UNSUPPORTED_CONVERSION;
                goto error_return;
            }

            /* Set Oracle number data length */                /*%03*/
            if (pval_len != NULL)
                *pval_len = dlen;
            break;                                             /*+%02*/
        default:
            retval = QD_BB_UNSUPPORTED_CONVERSION;
            goto error_return;
            break;
        }
        break;
    case DTYFLT:
        switch(dest_type)
        {
        /* DTYFLT to DTYINT */
        case DTYINT:
            if (src_len != sizeof(QD_WIDEST_FLOAT))
            {
                retval = QD_BB_UNSUPPORTED_CONVERSION;
                goto error_return;
            }
            if (dest_len == 1)
                *((char *)pdest) = *((QD_WIDEST_FLOAT *)psrc);
            else
            if (dest_len == 2)
                *((sb2 *)pdest) = *((QD_WIDEST_FLOAT *)psrc);
            else
            if (dest_len == 4)
                *((sb4 *)pdest) = *((QD_WIDEST_FLOAT *)psrc);
            else
            {
                retval = QD_BB_UNSUPPORTED_CONVERSION;
                goto error_return;
            }
            break;
        /* DTYFLT to (DTYCHR, DTYVCS, DTYSTR) */
        case DTYCHR:
        case DTYVCS:
        case DTYSTR:
            adjust_par (&pdbuf, pdest, &dlen, dest_len, dest_type);
            /* set VARCHAR length */
            if (dest_type == DTYVCS)
                *((short *)pdest) = dlen;

            /* add space for minus sign */
            if (*((QD_WIDEST_FLOAT *)psrc) < 0)
                neg = 1;

            /* pseudo-oracore: convert double to float rep */
            /* Ex: 123.45 to "123.45" */
            retlen = cnvd2f ((text *)buffer, *((double *)psrc), dlen);

            if (dest_type == DTYSTR)
                format_string (pdest, buffer, dlen, retlen);
            else
                /* Right justify and pad w/ spaces */
                right_justify (pdbuf, buffer, dlen, retlen);
            break;
        /* DTYFLT to DTYNUM */                                 /*+%02*/
        case DTYNUM:
```

```
            if (src_len != sizeof(QD_WIDEST_FLOAT))
            {
                retval = QD_BB_UNSUPPORTED_CONVERSION;
                goto error_return;
            }
            /* oracore: convert real to Oracle number */
            carren (psrc, src_len, (oarnum_t *)pdest, &dlen);

            /* Set Oracle number data length */                  /*%03*/
            if (pval_len != NULL)
                *pval_len = dlen;
            break;                                                /*-%02*/
        default:
            retval = QD_BB_UNSUPPORTED_CONVERSION;
            goto error_return;
            break;
        }
        break;
    case DTYCHR:
    case DTYVCS:
    case DTYSTR:
        switch(dest_type)
        {
        /* (DTYCHR, DTYVCS, DTYSTR) to DTYINT */
        case DTYINT:
            adjust_par (&psbuf, psrc, &slen, src_len, src_type);

            if (dest_len == 2)
            {
                /* oracore: convert text in buffer to sb4 */
                retlen = lmfb24 ((text *)psbuf, slen, &temp, 0);
                *((sb2 *)pdest) = temp;
            }
            else
            if (dest_len == 4)
            {
                /* oracore: convert text in buffer to sb4 */
                retlen = lmfb24 ((text *)psbuf, slen, &temp, 0);
                *((sb4 *)pdest) = temp;
            }
            else
            {
                retval = QD_BB_UNSUPPORTED_CONVERSION;
                goto error_return;
            }
            break;
        /* (DTYCHR, DTYVCS) to
           (DTYCHR, DTYVCS, DTYBIN, DTYVBI, DTYSTR, DTYLBI, DYTLNG) */
        case DTYCHR:
        case DTYVCS:
        case DTYBIN:
        case DTYVBI:
        case DTYSTR:
        case DTYLBI:                                              /*%02*/
        case DTYLNG:                                              /*%02*/
            adjust_par (&psbuf, psrc, &slen, src_len, src_type);
            adjust_par (&pdbuf, pdest, &dlen, dest_len, dest_type);
            /* set VARCHAR length */
            if (dest_type == DTYVCS || dest_type == DTYVBI)
                *((short *)pdest) = dlen;

            init_buffer (pdbuf, dlen, dest_type);
            memcpy (pdbuf, psbuf, (slen<dlen) ? slen : dlen);

            /* set indicator if truncated */
            if (slen > dlen && pdest_ind != (short *)NULL)
                *pdest_ind = slen;

            /* adjust_par has already subtracted 1 from destination
             * length for data type DTYSTR, so use pdest[dlen] rather
             * than pdest[dlen-1] for setting the 0 terminator (this
             * fixes bug 6068)
             */
```

```
            if (dest_type == DTYSTR)
            {
                pdest [dlen] = '\0';

                /* Special case for DTYSTR to DTYSTR:
                 * Set value length to the actual string length,
                 * rather than the maximum possible length.  This is
                 * to prevent wrapping due to trailing blanks within
                 * sqlplus formatted columns, for the TO_CHAR function.
                 * In alloc_buffers (in qdcp_prep.c), we changed DTYCHR
                 * to DTYSTR in the descriptors of parallel subqueries and
                 * combining queries.  We still get the strings back
                 * with trailing blanks when that "the right thing", but
                 * when the trailing blanks should be truncated (e.g
                 * the TO_CHAR function), they are truncated.  So strlen
                 * gives us the actual length of the string, as it should
                 * be returned in *pval_len.
                 * (NOTE: if source and dest length are the same, then
                 * this gets handled near the top of this routine, for
                 * greater efficiency.)
                 */
                if (src_type == DTYSTR && pval_len != NULL)
                    *pval_len = strlen(pdest);
            }
            break;
        default:
            retval = QD_BB_UNSUPPORTED_CONVERSION;
            goto error_return;
            break;
        }
        break;
    case DTYBIN:
    case DTYVBI:
    case DTYLBI:                                                  /*%02*/
        switch(dest_type)
        {
        /* (DTYBIN, DTYVBI, DTYLBI)
           to (DTYCHR, DTYVCS, DTYBIN, DTYVBI, DTYSTR, DTYLBI, DTYLNG) */
        case DTYCHR:
        case DTYVCS:
        case DTYBIN:
        case DTYVBI:
        case DTYSTR:                                              /*%02*/
        case DTYLBI:                                              /*%02*/
        case DTYLNG:
            adjust_par (&psbuf, psrc, &slen, src_len, src_type);
            adjust_par (&pdbuf, pdest, &dlen, dest_len, dest_type);
            /* set VARCHAR length */
            if (dest_type == DTYVCS || dest_type == DTYVBI)
                *((short *)pdest) = dlen;

            init_buffer (pdbuf, dlen, dest_type);
            memcpy (pdbuf, psbuf, (slen<dlen) ? slen : dlen);

            /* set indicator if truncated */
            if (slen > dlen && pdest_ind != (short *)NULL)
                *pdest_ind = slen;

            /* adjust_par has already subtracted 1 from destination
             * length for data type DTYSTR, so use pdest[dlen] rather
             * than pdest[dlen-1] for setting the 0 terminator (this
             * fixes bug 6068)
             */
            if (dest_type == DTYSTR)
                pdest [dlen] = '\0';

            break;
        default:
            retval = QD_BB_UNSUPPORTED_CONVERSION;
            goto error_return;
            break;
        }
        break;
```

Sep 21 1993 16:00:40 qdbb_project.c Page 7

```
    default:
        retval = QD_BB_UNSUPPORTED_CONVERSION;
        goto error_return;
        break;
    }
    goto return_retval;

error_return:
#ifdef QDDEBUG
/*    if (QD_display_time)*/
/*      retval = QD_OK;*/
#endif
    QDFAIL(retval);
return_retval:
    QDEND;
    return retval;
} /* qdbb_project */

/*
 *   Adjust parameters, pointer to buf and length
 */
static void adjust_par (ppout, pin, poutlen, inlen, type)
reg1 text **ppout;        /* pointer to adjusted pointer to buffer */
reg2 text *pin;           /* pointer to buffer */
reg3 size_t *poutlen;     /* pointer adjusted length */             /*%03*/
reg4 size_t inlen;        /* length of buffer */                    /*%03*/
reg5 word type;           /* buffer data type */
{
    if (type == DTYVCS || type == DTYVBI)
    /* variable buffer */
    {
        *ppout = (text *)(pin + sizeof(short));
        *poutlen = inlen - sizeof(short);
    }
    else
    /* fixed buffer */
    {
        *ppout = pin;
        if (type == DTYSTR)
            /* leave room for null terminator */
            *poutlen = inlen - 1;
        else
            *poutlen = inlen;
    }
}

/*
 *   Right justify destination buffer
 */
static void right_justify(pout, pin, outlen, inlen)
reg1 text *pout;          /* pointer to buffer */
reg2 text *pin;           /* pointer to buffer */
reg3 size_t outlen;       /* output length of buffer */             /*%03*/
reg4 size_t inlen;        /* input length of buffer */              /*%03*/
{
    text buf[DBL_DIG+1];

    pin[inlen] = '\0';

    if (inlen == outlen)
        memcpy (pout, pin, outlen);
    else
    if (inlen < outlen)
    {
        /* oracore: right justify and pad with spaces */
        /*          Need to use temp buffer to allow */
        /*          room for null terminator */
        lstrrju (buf, pin, outlen, ' ');
        memcpy (pout, buf, outlen);
    }
    else
        /* if truncated return string of '#'s */
        memset (pout, '#', outlen);
```

Sep 21 1993 16:00:40 qdbb_project.c Page 8

```
}

/*
 *   Convert double to float format
 *   Follows oracore naming conventions.  In the future, there
 *   may be an oracore routine to do this conversion.
 *   This function is like lmfd2e
 */
static short cnvd2f (s, dbl, p)
text *s;
double dbl;
short p;
{
    reg0 int dig_in_fract = p-1;
    sprintf((char *)s, "%.*g", (int)min(dig_in_fract, DBL_DIG-1), dbl);
    return(strlen((char *)s));
}

/*
 *   Initialize buffer with 0's or spaces
 */
static void init_buffer (pbuf, len, type)
reg1 text *pbuf;
reg2 size_t len;                                                     /*%03*/
reg3 word type;
{
    if (type == DTYBIN || type == DTYVBI)
        memset (pbuf, '\0', len);
    else
        memset (pbuf, ' ', len);
}

/*
 *   Format string after numeric conversion
 */
static void format_string (pout, pin, outlen, inlen)
reg1 text *pout;          /* pointer to buffer */
reg2 text *pin;           /* pointer to buffer */
reg3 size_t outlen;       /* output length of buffer */             /*%03*/
reg4 size_t inlen;        /* input length of buffer */              /*%03*/
{
    if (inlen > outlen)
    {
        /* lost significant digits, return string of #'s */
        memset (pout, '#', outlen);
        pout[outlen] = '\0';
    }
    else
    {
        /* Ex: 123 to "123" */
        memcpy (pout, pin, inlen);
        pout[inlen] = '\0';
    }
}
```

Sep 20 1993 13:38:01 qdbb_root.c Page 1

```
/*************************************************************************
 * qdbb_root - Execution function for ROOT qd building block
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE      AUTHOR   DESCRIPTION
 * ---   --------  ------   ----------------------------------------------
 * %01   06/16/93  EYT      Display timing statistics
 * %00   11/06/91  JK       Initial Version
 *************************************************************************
 */

#include <stdio.h>
#include <strings.h>
#include <ctype.h>
#include <dtydef.h>
#include <qdstd.h>
#include <qdspext.h>
#include <qdcpext.h>
#include <qdxpext.h>
#include <qdbbext.h>
#include <qderrs.h>
#ifdef QDDEBUG
#include <qdtstext.h>
#endif /* QDDEBUG */
#include <memory.h>
#include <stdlib.h>
#include <sqlda.h>

#ifdef QDDEBUG
extern bool QD_display_exec;  /* Should results of execution be displayed? */
#endif /* QDDEBUG */

QDBB_REPLY qdbb_root(proot, req, pbtt)
QDBB_ROOT *proot;
word req;
text **pbtt;   /* Pointer to buffer translation table */
{
    QDSTATUS retval;
    word i;
    text outbuf[100];
    /* Variables used in timing query processing stages  */
    /* Must use array name qdtime, so that the timing macros work */
#define TIME_FULL_EXEC 0
#define TIME_OPEN_CLOSE 1
    __private static QDTIME qdtime[2];

    QDBEGIN("qdbb_root");

#ifdef QDDEBUG
    if (req == QDBB_REQ_DISPLAY)
    {
        printf("\nROOT at %08lx\n", proot);
        printf("  in_bufnum: %d\n", proot->in_bufnum);
        printf("  pchild: %08lx\n", proot->pchild);
        retval = (*(proot->pchild->hdr.pfunc))
            (proot->pchild, QDBB_REQ_DISPLAY, pbtt);
        retval = QDBB_REPLY_READY;
        goto return_reply;
    }
#endif /* QDDEBUG */

#ifdef OS_THREAD_FORK_BUG
    /* As workaround for OS bug preventing forking within threads,
     * save main thread's uga variables so we can "borrow" them to
     * make parallel connections.  Don't do this if child is an
     * aggr bb, since the aggr will do this itself.
     */
    if (req == QDBB_REQ_OPEN && proot->pchild->hdr.check != QDCK_AGGR)
```

Sep 20 1993 13:38:01 qdbb_root.c Page 2

```
        qdpu_save_uga(99);
#endif

    if (QD_display_time)
    {
        if (req & QDBB_REQ_OPEN)
        {
            fprintf (QD_display_file, "Opening Query\n");

            /* Start timer for open time */
            QDTIMESTART (TIME_OPEN_CLOSE);

            /* Start timer for full execution time */
            QDTIMESTART (TIME_FULL_EXEC);
        }

        if (req & QDBB_REQ_CLOSE)
        {
            /* Print subquery timing statistics */
            fprintf (QD_display_file,
                "\nExecuting Subqueries\nSubquery\tRows\tConnect\t\tFetch\t\tCl
ose\n");

            /* Start timer for close time */
            QDTIMESTART (TIME_OPEN_CLOSE);
        }
    }

    if (req == QDBB_REQ_NEXT && proot->hdr.state == QDBB_STATE_EOD)
    {
        retval = QDBB_REPLY_EOD;
        goto return_reply;
    }

    /* If child is aggr bb, it will project results into its output
     * buffer using value and indicator pointers in the root's
     * pin_desc (it has its own pointer to that descriptor), so set these
     * pointers up now.  (This way, it will be easy to get the aggr to
     * project directly into user output buffers when appropriate.)
     */

    if (proot->pin_desc)
    {
        proot->pin_desc->V = (text **)(pbtt[proot->in_bufnum]);
        proot->pin_desc->I = (short **)(proot->pin_desc->V +
                                proot->pin_desc->N);
    }
    /* Pass request along to child */
    retval = (*(proot->pchild->hdr.pfunc))
        (proot->pchild, req, pbtt);

#ifdef OS_THREAD_FORK_BUG
    /* As workaround for OS bug preventing forking within threads,
     * restore main thread's uga variables now that we're done making
     * parallel connections.  Don't do this if child is an
     * aggr bb, since the aggr will do this itself.
     */
    if (req == QDBB_REQ_OPEN && proot->pchild->hdr.check != QDCK_AGGR)
        qdpu_restore_uga(99);
#endif

    if (retval == QDBB_REPLY_ERROR)
        goto error_return;

    if (req & QDBB_REQ_NEXT)
    {
        /* Has a row been returned? */
        if (retval == QDBB_REPLY_READY)
        {
            /* Project result into caller buffers if aggr has not
             * already done so.
             */
            if (!QD_display_exec
```

103

```
            && proot->pin_desc != proot->pout_desc &&
            proot->pout_desc != NULL &&
            proot->pin_desc != NULL)
        {
            proot->pin_desc->V = (text **)(pbtt[proot->in_bufnum]);
            proot->pin_desc->I = (short **)(proot->pin_desc->V +
                                        proot->pin_desc->N);
            for (i = 0; i < proot->pout_desc->N; i++)
            {
                qdbb_project(proot->pin_desc->V[i],
                             proot->pin_desc->I[i],
                             proot->pin_desc->T[i],
                             proot->pin_desc->L[i],
                             proot->pout_desc->V[i],
                             proot->pout_desc->I[i],
                             proot->pout_desc->T[i],
                             proot->pout_desc->L[i],
                             proot->plenptrs[i]);

                if (QDFAILED)
                    goto error_return;
            } /* for each column */
        } /* if aggr hasn't already projected result */

        if (QD_display_exec)
        {
            printf("Buffer: %08lx\n",
                   pbtt[proot->in_bufnum]);
            proot->pin_desc->V = (text **)(pbtt[proot->in_bufnum]);
            proot->pin_desc->I = (short **)(proot->pin_desc->V +
                                        proot->pin_desc->N);
            for (i = 0; i < proot->pout_desc->N; i++)
            {
                if (proot->pin_desc->I[i] != NULL &&
                    *(proot->pin_desc->I[i]) == -1)
                    printf("  <NULL>\n");
                else
                {
                    switch (proot->pin_desc->T[i])
                    {
                      case DTYCHR:
                      case DTYSTR:
                        strncpy(outbuf, proot->pin_desc->V[i],
                                proot->pin_desc->L[i]);
                        outbuf[proot->pin_desc->L[i]] = 0;
                        printf("  %s\n", outbuf);
                        break;
                      case DTYINT:
                        printf("  %d\n", *((int *)
                                           (proot->pin_desc->V[i])));
                        break;
                      case DTYFLT:
                        printf("  %f\n", *((QD_WIDEST_FLOAT *)
                                           (proot->pin_desc->V[i])));
                        break;
                    } /* switch */
                }
            } /* for... */
        } /* if QD_display_debug */
    } /* if retval == QDBB_REPLY_READY */
    else if (retval == QDBB_REPLY_EOD)
        proot->hdr.state = QDBB_STATE_EOD;
    goto return_reply;
} /* if (req & QDBB_REQ_NEXT) */
else
{
    if (QD_display_time)
    {
        /* Compute open/close time */
        QDTIMEFINISH (TIME_OPEN_CLOSE);

        /* Print query processing statistics */
        if (req & QDBB_REQ_OPEN)
```

```
            {
                QDTIMEPRINT (TIME_OPEN_CLOSE, "Query Open");
                fflush (QD_display_file);
            }

            if (req & QDBB_REQ_CLOSE)
            {
                /* Compute full execution time */
                QDTIMEFINISH (TIME_FULL_EXEC);

                /* Print close and execution time statistics */
                if (proot->pchild->hdr.check != QDCK_AGGR)
                    fprintf (QD_display_file, "\nClosing Query\n");

                QDTIMEPRINT (TIME_OPEN_CLOSE, "Query Close");
                fprintf (QD_display_file, "\n");
                QDTIMEPRINT (TIME_FULL_EXEC, "Full Execution");

                fflush (QD_display_file);
            }
        }
        goto return_reply;
    }
error_return:
    retval = QDBB_REPLY_ERROR;
return_reply:
    QDEND;
    return retval;
} /* qdbb_root */
```

Sep 29 1992 17:21:48 qdbb_subcur.c Page 1

```
/****************************************************************************
 * qdbb_subcur - Execution function for SUBCUR qd building block
 *
 * Copyright (c) 1991 Kendall Square Research Corporation as an unpublished
 * work. All rights reserved. The information contained herein is the
 * confidential property of Kendall Square Research Corporation. Use,
 * copying, transfer or disclosure is prohibited without express written
 * agreement with Kendall Square Research Corporation.
 ****************************************************************************
 * REV   DATE      AUTHOR   DESCRIPTION
 * ---   --------  ------   ---------------------------------------------
 * %00   11/06/91  JM       Initial Version
 ****************************************************************************
*/

#include <stdio.h>
#include <strings.h>
#include <ctype.h>
#include <dtydef.h>
#include <qdstd.h>
#include <qdspext.h>
#include <qdcpext.h>
#include <qdxpext.h>
#include <qdbbext.h>
#include <qderrs.h>
#ifdef QDDEBUG
#include <qdtstext.h>
#endif /* QDDEBUG */
#include <memory.h>
#include <stdlib.h>
#include <sqlda.h>

/****************************************************************************
 * qdbb_subcur - Execute SQL statements against a parallel subcursor
 *
 * When request is next and state is empty, prepare and open the cursor,
 * set state to pending.  Then fetch a row.
 * When request is next and state is pending, fetch a row and return it,
 * or set state to EOD and return EOD if ORACLE returns EOD.
 * When request is next and state is already EOD, return EOD (shouldn't
 * happen, but the intent is to make each bb independently robust).
 ****************************************************************************
*/
QDBB_REPLY qdbb_subcur(psubcur, req, pbtt)
reg1 QDBB_SUBCUR *psubcur;
reg2 word req;
reg3 text **pbtt;  /* Pointer to buffer translation table */
              /* NOTE: pbtt passed to qdbb_subcur is the parent exchange */
              /*  bb's local btt, whose first entry is always used as */
              /*  the output buffer by the subcursor bb. */
{
    reg4 QDSTATUS retval;
    reg5 word i;

    QDBEGIN("qdbb_subcur");
#ifdef QDDEBUG
    if (req == QDBB_REQ_DISPLAY)
    {
        printf("    SUBCUR at %08lx\n", psubcur);
        printf("       low_parfid: %04x   high_parfid: %04x\n",
               psubcur->low_parfid, psubcur->high_parfid);
        printf("       ppsq_select_desc: %08lx\n", psubcur->ppsq_select_desc);
        if (psubcur->ppsq_select_desc != NULL &&
            psubcur->ppsq_select_desc->T != NULL &&
            psubcur->ppsq_select_desc->L != NULL)
        {
            for (i = 0; i < psubcur->ppsq_select_desc->N; i++)
                printf("          Column %d datatype: %d  length: %d\n", i,
                       psubcur->ppsq_select_desc->T[i],
                       psubcur->ppsq_select_desc->L[i]);
        }
        printf("       ppsq_bind_desc: %08lx\n", psubcur->ppsq_bind_desc);
        if (psubcur->ppsq_bind_desc != NULL &&
```

Sep 29 1992 17:21:48 qdbb_subcur.c Page 2

```
            psubcur->ppsq_bind_desc->T != NULL &&
            psubcur->ppsq_bind_desc->L != NULL)
        {
            for (i = 0; i < psubcur->ppsq_bind_desc->N; i++)
                printf("          Column %d datatype: %d  length: %d\n", i,
                       psubcur->ppsq_bind_desc->T[i],
                       psubcur->ppsq_bind_desc->L[i]);
        }
        retval =  QDBB_REPLY_READY;
        goto return_reply;
    }
#endif /* QDDEBUG */

#ifdef DUMMY_FETCH_VERSION
#define LIMIT 5
    if (req == QDBB_REQ_NEXT)
    {
        if (psubcur->hdr.state == QDBB_STATE_EMPTY)
        {
            psubcur->counter = 0;
            psubcur->hdr.state = QDBB_STATE_PENDING;
        }
        if (psubcur->counter >= LIMIT ||
            psubcur->hdr.state == QDBB_STATE_EOD)
        {
            psubcur->hdr.state = QDBB_STATE_EOD;
            retval = QDBB_REPLY_EOD;
            goto return_reply;
        }
        sprintf(pbtt[0], "Row %d from file %04x", psubcur->counter++,
                psubcur->low_parfid);
        retval = QDBB_REPLY_READY;
        goto return_reply;
    } /* if (req == QDBB_REQ_NEXT) */
#else
    retval = qdbb_subcur_qry(psubcur, req, pbtt);
    goto return_reply;

#endif /* DUMMY_FETCH_VERSION */
error_return:
    retval = QDBB_REPLY_ERROR;
return_reply:
    QDEND;
    return retval;
} /* qdbb_subcur */
```

104

1

105

```
/****************************************************************************
 * qdbb_subcur_qry - Execute SQL statements against a parallel subcursor
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE      AUTHOR  DESCRIPTION
 * ---   --------  ------  ------------------------------------------------
 * %06   10/01/93  EYT     Compute fetch time for array fetches also
 * %05   06/16/93  EYT     Collect subquery time statistics
 * %04   11/04/92  JM      Support array fetch in subcursors
 * %03   10/15/92  EYT     Changed order of rowid bind variables
 * %02   09/29/92  EYT     Allow user-defined bind variables
 * %01   11/22/91  DW      Added multi-connection hack
 * %00   11/06/91  JM      Initial Version
 ****************************************************************************
 */

#include <stdio.h>
#include <stringe.h>
#include <ctype.h>
#include <dtydef.h>
#include <qdstd.h>
#include <qdspext.h>
#include <qdcpext.h>
#include <qdxpext.h>
#include <qdbbext.h>
#include <qdrtext.h>
#include <qderrs.h>
#ifdef QDDEBUG
#include <qdtstext.h>
#endif /* QDDEBUG */
#include <memory.h>
#include <stdlib.h>
#ifdef QDDEBUG
#include <sys/time.h>
extern int gettimeofday();
#endif /* QDDEBUG */

EXEC SQL INCLUDE SQLDA;

extern SQLDA *sqlald();
extern sqlprc();
extern sqlnul();
extern sqlclu();
__private KSR_psq_num = 0;
/****************************************************************************
 * qdbb_subcur_qry - Execute SQL statements against a parallel subcursor
 *
 * When request is next and state is empty, prepare and open the cursor,
 * set state to pending.  Then fetch a row.
 * When request is next and state is pending, fetch a row and return it,
 * or set state to EOD and return EOD if ORACLE returns EOD.
 * When request is next and state is already EOD, return EOD (shouldn't
 * happen, but the intent is to make each bb independently robust).
 ****************************************************************************
 */
QDBB_REPLY qdbb_subcur_qry(psubcur, req, pbtt)
reg1 QDBB_SUBCUR *psubcur;
reg2 word req;
reg3 text **pbtt;   /* Pointer to buffer translation table */
              /* NOTE: pbtt passed to qdbb_subcur is the parent exchange */
              /*  bb's local btt, whose first entry is always used as */
              /*  the output buffer by the subcursor bb. */
{
    reg4 QDSTATUS retval;

#ifdef QDDEBUG
    extern bool QD_show_sqlerrs;
    word child;     /* For debugging diagnostics using TTRACE */
```

```
#endif /* QDDEBUG */

    reg5 ub4 i;
    reg6 char **pvalptrs; /* Pointers to column values in buffer */
    reg7 short **pindptrs;  /* Pointers to indicators in buffer */
    char **save_V;  /* Save V array from bind descriptor */
    short **save_I; /* Save I array from bind descriptor */

    extern __private KSR_qd_oercnt; /* Defined in pupiexf.c, records   */
                                    /* number of rows fetched/modified */

    /* Variables used in timing individual subqueries */

    /* Must use array name qdtime, so that the timing macros work */
#define TIME_CONNECT 0
#define TIME_FETCH   1
#define TIME_OPEN    2
#define TIME_CLOSE   3
    __private static QDTIME qdtime[4];
    __private static long counter;

    EXEC SQL BEGIN DECLARE SECTION;
    char low_rowid[18];
    char high_rowid[18];
    short dummy_ind;
    SQLDA *pdesc;
    VARCHAR *ppsq_text;
    VARCHAR uid[32];
    VARCHAR pwd[32];
    VARCHAR db_string[32];
    int array_size;
    EXEC SQL END DECLARE SECTION;

    /* We need to make sqlca __private static, rather than automatic,
     * since array fetch logic depends on remembering values across
     * calls.
     */
#   define SQLCA_STORAGE_CLASS __private static
#   define SQLCA_INIT
    EXEC SQL INCLUDE SQLCA;

    EXEC SQL DECLARE CONNECTION000 DATABASE;

    QDBEGIN("qdbb_subcur_qry");

#ifdef QDDEBUG
    child = psubcur->child_num;
    KSR_psq_num = child;
#if 0
    printf("subcur %d: req %d, state: %d\n", child, req, psubcur->hdr.state);
#endif
#endif /* QDDEBUG */

#ifdef USING_V6_PREPROCESSOR
    /* Do the following hack every time, because sq002 is passed to
     * sqllib calls for ALL of the SQL statements against the psq
     * statement.
     */
    sprintf(sq002, "CONNECTION%03.3d", psubcur->child_num);
#endif /* USING_V6_PREPROCESSOR */

    if (req & QDBB_REQ_OPEN)
    {
        if (psubcur->hdr.state == QDBB_STATE_EMPTY)
        {
            counter = 0;

            /* Start timer for subquery open time */
            QDTIMESTART (TIME_OPEN);

            /* Start timer for connect time */
            QDTIMESTART (TIME_CONNECT);
```

Dec 13 1993 10:59:35 qdbb_subcur_qry.pc Page 3

```
            strcpy(uid.arr, QDpcom->cnx.user);
            uid.len = strlen(uid.arr);
            strcpy(pwd.arr, QDpcom->cnx.pwd);
            pwd.len = strlen(pwd.arr);
            strcpy(db_string.arr, QDpcom->db_string);
            db_string.len = strlen(QDpcom->db_string);

#ifdef USING_V6_PREPROCESSOR
            /* Great hack to actually create different connections */
            /* for each subcursor. Preprocessor output behaves in  */
            /* subcursor-dependent manner.                          */

            sprintf(sq002, "CONNECTION%03.3d", psubcur->child_num);
#endif /* USING_V6_PREPROCESSOR */

            EXEC SQL CONNECT :uid IDENTIFIED BY :pwd
                        AT CONNECTION000 USING :db_string;
            if (sqlca.sqlcode)
            {
#ifdef QDDEBUG
                if (QD_show_sqlerrs)
                    printf(
                  "qdbb_subcur_qry: sqlcode %d after CONNECT, child %d\n",
                            sqlca.sqlcode, child);
#endif /* QDDEBUG */
                QDFAIL(sqlca.sqlcode);
                goto error_return;
            }

            /* Compute connect time */
            QDTIMEFINISH (TIME_CONNECT);

            /* Compute subquery open time */
            QDTIMEFINISH (TIME_OPEN);

#ifdef QDDEBUG
            if (QD_display_exec2)
                printf("subcur %d: sqlctx after connect: %08lx\n",
child, sqlctx);
#endif /* QDDEBUG */
        }
        retval = QDBB_REPLY_NULL;
        goto return_reply;
    } /* if (req & QDBB_REQ_OPEN) */

    /* COMMIT and ROLLBACK requests are for 2nd phase of
     * pseudo-2-phase-commit for INSERT/SELECT.
     */
    else if (req == QDBB_REQ_COMMIT)
    {
        EXEC SQL AT CONNECTION000 COMMIT;
        if (sqlca.sqlcode < 0)
        {
            QDFAIL(sqlca.sqlcode);
            goto error_return;
        }
        /* If query is INSERT/SELECT, collect number of rows
         * inserted by this thread, for tallying above in
         * mplex.
         */
        if (psubcur->hdr.flags & QDBB_PSQ_INSERT_SELECT)
            psubcur->oercnt = KSR_qd_oercnt;

        retval = QDBB_REPLY_READY;
        goto return_reply;
    }
    else if (req == QDBB_REQ_ROLLBACK)
    {
        EXEC SQL AT CONNECTION000 ROLLBACK;
        if (sqlca.sqlcode < 0)
        {
            QDFAIL(sqlca.sqlcode);
            goto error_return;
```

Dec 13 1993 10:59:35 qdbb_subcur_qry.pc Page 4

```
        }

        /* We rolled-back successfully, so indicated we inserted
         * 0 rows.
         */
        psubcur->oercnt = 0;
        retval = QDBB_REPLY_READY;
        goto return_reply;
    }

    if (req & QDBB_REQ_NEXT)
    {
        /* Get start time excluding connect time */
        if (counter == 0)
            QDTIMESTART (TIME_FETCH);

        if (psubcur->hdr.state == QDBB_STATE_EMPTY)
        {
            /* Prepare dynamic statement for psq
             * (NOTE: This statement is coded as it is to avoid a
             * compiler warning.)
             */
            *((QD_VARCHAR **)(&ppsq_text)) = psubcur->ppsq_text;

            EXEC SQL AT CONNECTION000 DECLARE psq STATEMENT;
            EXEC SQL PREPARE psq FROM :ppsq_text;
            if (sqlca.sqlcode < 0)
            {
#ifdef QDDEBUG
                if (QD_show_sqlerrs)
                    printf(
                  "qdbb_subcur_qry: sqlcode %d after PREPARE, child %d\n",
                            sqlca.sqlcode, child);
#endif /* QDDEBUG */
                QDFAIL(sqlca.sqlcode);
                goto error_return;
            }
#ifdef QDDEBUG
            if (QD_display_exec2)
                printf("subcur %d: sqlctx after prepare: %08lx\n",
child, sqlctx);
#endif /* QDDEBUG */

            /* Declare cursor for psq */
            EXEC SQL DECLARE psq_cur CURSOR FOR psq;
            if (sqlca.sqlcode < 0)
            {
#ifdef QDDEBUG
                if (QD_show_sqlerrs)
                    printf(
                  "qdbb_subcur_qry: sqlcode %d after DECLARE CURSOR, child %d\n",
                            sqlca.sqlcode, child);
#endif /* QDDEBUG */
                QDFAIL(sqlca.sqlcode);
                goto error_return;
            }

            /* Set up V and I pointer arrays in psq's bind descriptor */
            pdesc = psubcur->ppsq_bind_desc;

            /* Allocate V and I arrays for this copy of the bind
             * descriptor (necessary because if all psq's shared same
             * arrays, they may 'accidentally' get wrong rowid range
             * values). Prior this this point, V and I point to the
             * master copies in the pcursor bind descriptor. After
             * allocating private copies, copy contents of arrays
             * from the master copies, if their are bind variables
             * other than the rowid range values. Don't do any of this
             * for child 1, because it uses the master copy.
             */
            if (child > 1)
            {
```

Dec 13 1993 10:59:35 qdbb_subcur_qry.pc Page 5

```
                save_V = pdesc->V;
                save_I = pdesc->I;
                pdesc->V = (char **)qdrt_malloc(pdesc->F * sizeof(char *));
                if (QDFAILED)
                    goto error_return;
                pdesc->I = (short **)qdrt_malloc(pdesc->F * sizeof(short *));
                if (QDFAILED)
                    goto error_return;
                if (pdesc->F > 2)
                {
                    memcpy(pdesc->V, save_V, pdesc->F * sizeof(char *));
                    memcpy(pdesc->I, save_I, pdesc->F * sizeof(short *));
                }
            }

            /* Now set up rowid range values. */
            sprintf(low_rowid, "00000000.0000.%04x", psubcur->low_parfid);
            sprintf(high_rowid, "00000000.0000.%04x",
                    psubcur->high_parfid);
#ifdef QDDEBUG
            /* Display low and high rowid's */
            if (QD_display_exec3)
                printf("subcur %d: low_rowid %s high_rowid %s\n",
                        child, low_rowid, high_rowid);

            /* Display addresses of sqlstm and pdesc */
            if (QD_display_exec3)
                printf("subcur %d pre-open:  &sqlstm: %08lx  pdesc: %08lx\n",
                        child, &sqlstm, pdesc);


#endif /* QDDEBUG */
            dummy_ind = 0;

            /* Set rowid bind varables to rowid values */      /*+%02*//*+%03*/
            pdesc->V[psubcur->rowid_posit] = low_rowid;
            pdesc->V[psubcur->rowid_posit+1] = high_rowid;
            pdesc->I[psubcur->rowid_posit] =
                pdesc->I[psubcur->rowid_posit+1] =
                (text *)(&dummy_ind);                          /*-%02*//*-%03*/

            if (pdesc->N != pdesc->F)
                pdesc->N = pdesc->F;

            /* Open the cursor */
            EXEC SQL OPEN psq_cur USING DESCRIPTOR pdesc;
            if (sqlca.sqlcode < 0)
            {
#ifdef QDDEBUG
                if (QD_show_sqlerrs)
                    printf(
                    "qdbb_subcur_qry: sqlcode %d after OPEN CURSOR, child %d\n",
                            sqlca.sqlcode, child);
#endif /* QDDEBUG */
                if ((psubcur->hdr.flags & QDBB_PSQ_INSERT_SELECT)
                    && !QD_2_phase_commit)
                    printf(
"QD thread %d: insert failed, sqlcode: %d, low FID: %04x high FID: %04x\n",
 child, sqlca.sqlcode, psubcur->low_parfid, psubcur->high_parfid);
                QDFAIL(sqlca.sqlcode);
                goto error_return;
            }
#ifdef QDDEBUG
            if (QD_display_exec2)
                printf("subcur %d: sqlctx after open: %08lx\n", child, sqlctx);

            /* Display sqlstm's pointer to descriptor */
            if (QD_display_exec3)
                printf("subcur %d post-open: sqlstm.sqhstv[0]: %08lx\n",
                        child, sqlstm.sqhstv[0]);
            /* Display low and high rowid's */
            if (QD_display_exec3)
                printf("subcur %d: low_rowid %s high_rowid %s after open\n",
```

Dec 13 1993 10:59:35 qdbb_subcur_qry.pc Page 6

```
                        child, low_rowid, high_rowid);
#endif /* QDDEBUG */

            /* If PSQ is actually an INSERT statement, then it was executed
             * by the OPEN above.  If it was insert into IT, commmit
             * now, else wait for subsequent COMMIT or ROLLBACK
             * request.  Set state to EOD,
             * which will cause EOD to be returned below.
             */
            if ((psubcur->hdr.flags & QDBB_PSQ_INSERT_TO_IT) ||
                (psubcur->hdr.flags & QDBB_PSQ_INSERT_SELECT))
            {
                if (!(psubcur->hdr.flags & QDBB_PSQ_INSERT_SELECT)
                    || !QD_2_phase_commit)
                {
                    EXEC SQL AT CONNECTION000 COMMIT;

                    if (psubcur->hdr.flags & QDBB_PSQ_INSERT_SELECT)
                    {
                        if (sqlca.sqlcode < 0)
                            printf(
"QD thread %d: COMMIT failed, sqlcode: %d, low FID: %04x  high FID: %04x\n",
child, sqlca.sqlcode, psubcur->low_parfid, psubcur->high_parfid);
                        else
                            printf(
"QD thread %d: insert completed and committed, %d rows inserted.\n",
                                    child, KSR_qd_oercnt);
                    }
                    if (sqlca.sqlcode < 0)
                    {
                        QDFAIL(sqlca.sqlcode);
                        goto error_return;
                    }
                }
                psubcur->hdr.state = QDBB_STATE_EOD;
            } /* if (psubcur->hdr.flags & QDBB_PSQ_INSERT_TO_IT) */

            else
                psubcur->hdr.state = QDBB_STATE_PENDING;

            /* TEMPORARY (?) : Once cursor has been opened, return PENDING,
             * which will force all subcursors to be opened before any
             * rows are fetched.
             *
             *    retval = QDBB_REPLY_PENDING;
             *goto return_reply;
             */
        }
        if (psubcur->hdr.state == QDBB_STATE_EOD)
        {
            retval = QDBB_REPLY_EOD;
            goto return_reply;
        }
        /* If we got to here, state should be PENDING.  Either we just
         * opened the cursor, or we've returned rows previously and have
         * now been called to return another row.
         */
        pdesc = psubcur->ppsq_select_desc;

        /* If array_size is non-zero, and we're past the threshold for
         * starting to do array fetching, do an array fetch or return next
         * row from current array full; else do an ordinary fetch.
         */
        if (psubcur->array_size &&
            (psubcur->nprevrows >= psubcur->array_threshold))
        {
            /* Array fetch */

            /* Do we already have an array buffer allocated and set up? */
            if (psubcur->pafbuf == NULL)
            {
                psubcur->pafbuf = qdrt_malloc(psubcur->arraybuf_size);
                if (QDFAILED)
```

Dec 13 1993 10:59:35 qdbb_subcur_qry.pc Page 7

```
                {
                    retval = QDBB_REPLY_ERROR;
                    goto error_return;
                }
                pdesc->V = (char **)(psubcur->pafbuf);
                pdesc->I = (short **)(pdesc->V + pdesc->N);
                for (i = 0; i < pdesc->N; i++)
                {
                    pdesc->V[i] = (char *)( ((char *)psubcur->pafbuf) +
                                            psubcur->pafpattern[i]);
                    if (psubcur->pafpattern[i + pdesc->N])
                        pdesc->I[i] = (char *)( ((char *)psubcur->pafbuf) +
                                        psubcur->pafpattern[i + pdesc->N]);
                    else
                        pdesc->I[i] = NULL;
                } /* for (i... */
            } /* if (psubcur->pafbuf == NULL) */

            /* Do we already have a row ready to return in the array? */
            if (psubcur->arraypos >= psubcur->cur_array_size)
            {
                /* No row ready. */
                /* Have we already gotten back EOD on the last fetch? */
                if (sqlca.sqlcode > 0)
                {
#ifdef QDDEBUG_ARRAYFETCH
printf(
"SUBCUR %2.2d: Prior EOD, cur_array_size: %d  nprevrows: %d  counter: %d\n",
        child, psubcur->cur_array_size, psubcur->nprevrows, counter);
#endif /* QDDEBUG_ARRAYFETCH */
                    psubcur->hdr.state = QDBB_STATE_EOD;
                    retval = QDBB_REPLY_EOD;
                    goto return_reply;
                }

                /* No row ready, so perform next array fetch */
                array_size = psubcur->array_size;

                /* One-time setup before the first array fetch */
                if (psubcur->nprevrows == psubcur->array_threshold)
                {
                    pdesc->V = (char **)(psubcur->pafbuf);
                    pdesc->I = (short **)(pdesc->V + pdesc->N);
                }

                EXEC SQL FOR :array_size
                    FETCH psq_cur USING DESCRIPTOR pdesc;
                if (sqlca.sqlcode < 0)
                {
#ifdef QDDEBUG
                    if (QD_show_sqlerrs)
                        printf(
                "qdbb_subcur_qry: sqlcode %d after ARRAY FETCH, child %d\n",
                                sqlca.sqlcode, child);
#endif /* QDDEBUG */
                    QDFAIL(sqlca.sqlcode);
                    goto error_return;
                }
                else if (sqlca.sqlcode > 0 &&
                        sqlca.sqlerrd[2] == psubcur->nprevrows)
                /* End of data */
                {
#ifdef QDDEBUG_ARRAYFETCH
printf(
"SUBCUR %2.2d: Fetch returned EOD, sqlca.sqlerrd[2]: %d  nprevrows: %d\n",
        child, sqlca.sqlerrd[2], psubcur->nprevrows);
#endif /* QDDEBUG_ARRAYFETCH */

                    /* Compute fetch time */
                    QDTIMEFINISH (TIME_FETCH);

                    psubcur->hdr.state = QDBB_STATE_EOD;
                    retval = QDBB_REPLY_EOD;
```

Dec 13 1993 10:59:35 qdbb_subcur_qry.pc Page 8

```
                    goto return_reply;
                }
                else /* Got some rows back */
                {
                    /* See how many rows we got back */
                    psubcur->cur_array_size = sqlca.sqlerrd[2] -
                                            psubcur->nprevrows;

                    /* Reset total rows fetched so far */
                    psubcur->nprevrows = sqlca.sqlerrd[2];

                    /* Reset position in array to beginning */
                    psubcur->arraypos = 0;

                } /* else got some rows back */
            } /* if (psubcur->arraypos >= psubcur->cur_array_size) */

            if (req & QDBB_REQ_PREFETCH)
            /* We're done prefetching - don't return a row */
            {
                retval = QDBB_REPLY_READY;
                goto return_reply;
            }
            else
            /* Return the row at the current array position. */
            {
                pvalptrs = (char **)(pbtt[0]);
                pindptrs = (short **)(pvalptrs + pdesc->N);

                for (i = 0; i < pdesc->N; i++)
                {
                    memcpy(pvalptrs[i],
                           pdesc->V[i] + (psubcur->arraypos * pdesc->L[i]),
                           pdesc->L[i]);
                    if (pindptrs[i])
                        *(pindptrs[i]) = *(pdesc->I[i] + psubcur->arraypos);
                }
                retval = QDBB_REPLY_READY;
                if (++(psubcur->arraypos) >= psubcur->cur_array_size)
                    retval |= QDBB_REPLY_EOA;
                goto return_reply;
            }
        } /* Array fetch */
        else /* non-array fetch */
        {
            /* Set V and I pointer arrays in descriptor. */
            pdesc->V = (char **)(pbtt[0]);
            pdesc->I = (short **)(pdesc->V + pdesc->N);

            EXEC SQL FETCH psq_cur USING DESCRIPTOR pdesc;

            if (sqlca.sqlcode < 0)
            {
#ifdef QDDEBUG
                if (QD_show_sqlerrs)
                    printf(
                "qdbb_subcur_qry: sqlcode %d after FETCH, child %d\n",
                            sqlca.sqlcode, child);
#endif /* QDDEBUG */
                QDFAIL(sqlca.sqlcode);
                goto error_return;
            }
            else if (sqlca.sqlcode > 0) /* End of data */
            {
                if (QD_show_sqlerrs)
                    printf("qdbb_subcur_qry: EOD, child %d\n", child);

                /* Compute fetch time */
                QDTIMEFINISH (TIME_FETCH);

                psubcur->hdr.state = QDBB_STATE_EOD;
                retval = QDBB_REPLY_EOD;
            }
```

```
            else
            {
                psubcur->nprevrows++;
                retval = QDBB_REPLY_READY;
            }
            goto return_reply;
        } /* non-array fetch */
    } /* if (req & QDBB_REQ_NEXT) */
    else if (req == QDBB_REQ_CLOSE)
    {

        /* Start timer for subquery close time */
        QDTIMESTART (TIME_CLOSE);

        TTRACE(("subcur: closing cursor\n"))

#ifdef DONT_COMMIT_INSERTS
        /* Don't close insert statements. */
        if (!(psubcur->hdr.flags & QDBB_PSQ_INSERT_SELECT))
        {
#endif /* DONT_COMMIT_INSERTS */
            EXEC SQL CLOSE psq_cur;
            if (sqlca.sqlcode < 0)
            {
#ifdef QDDEBUG
                if (QD_show_sqlerrs)
                    printf(
                 "qdbb_subcur_qry: sqlcode %d after CLOSE CURSOR, child %d\n",
                           sqlca.sqlcode, child);
#endif /* QDDEBUG */
                QDFAIL(sqlca.sqlcode);
                goto error_return;
            }
#ifdef DONT_COMMIT_INSERTS
        } /* if (!(psubcur->hdr.flags & QDBB_PSQ_INSERT_SELECT)) */
#endif /* DONT_COMMIT_INSERTS */
        TTRACE(("subcur: cursor closed, disconnecting\n"))
KSR_psq_num = child;
        EXEC SQL AT CONNECTION000 ROLLBACK RELEASE;
        TTRACE(("subcur: disconnect complete\n"))

        if (sqlca.sqlcode < 0)
        {
#ifdef QDDEBUG
                if (QD_show_sqlerrs)
                    printf(
              "qdbb_subcur_qry: sqlcode %d after ROLLBACK RELEASE, child %d\n",
                           sqlca.sqlcode, child);
#endif /* QDDEBUG */

            TTRACE(("subcur: rollback returned error\n"))
            QDFAIL(sqlca.sqlcode);
            goto error_return;
        }
        else
        {
            if (QD_display_time)
            {
                /* Compute subquery close time */
                QDTIMEFINISH (TIME_CLOSE);

                /* Print subquery timing statistics */
                fprintf (QD_display_file, \
"%d\t\t%ld\t%ld.%06.6ld\t%ld.%06.6ld\t%ld.%06.6ld\n",
                        child, counter,
                        qdtime[TIME_CONNECT].elapsed.tv_sec,
                        qdtime[TIME_CONNECT].elapsed.tv_usec,
                        qdtime[TIME_FETCH].elapsed.tv_sec,
                        qdtime[TIME_FETCH].elapsed.tv_usec,
                        qdtime[TIME_CLOSE].elapsed.tv_sec,
                        qdtime[TIME_CLOSE].elapsed.tv_usec);

                fflush (QD_display_file);
```

```
            }

            retval = QDBB_REPLY_NULL;
            goto return_reply;
        }
    }

error_return:
    retval = QDBB_REPLY_ERROR;
return_reply:

    /* If we're returning a row, increment row counter */
    if (retval & QDBB_REPLY_READY)
        counter++;
    QDEND;
    return retval;
} /* qdbb_subcur */
```

Sep 20 1993 13:38:04 qdcp_desc_psq.c Page 1

```
/****************************************************************************
 * qdcp_desc_psq - Describe parallel subquery select list and bind vars
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE       AUTHOR   DESCRIPTION
 * ---   --------   ------   -----------------------------------------------
 * %03   08/25/93   EYT      Set pdesc->V and pdesc->I to NULL after freeing
 * %02   10/15/92   EYT      Find rowid bind variable positions
 * %01   09/25/92   EYT      Allow user-specified bind variables
 * %00   10/25/91   JM       Initial Version
 ****************************************************************************
 */

/* Display descriptor contents for queries */

#include <qdstd.h>
#include <qdspext.h>
#include <qdcpext.h>
#include <qdrtext.h>
#include <qderrs.h>
#include <dtydef.h>
#include <sqlda.h>
#include <memory.h>

extern sqlprc();
extern sqlnul();
extern sqlclu();

/****************************************************************************
 * qdcp_desc_psq - Describe parallel subquery select list and bind vars
 *
 * Set data type attributes in expr structures for select list expressions
 * of Parallel Subquery (PSQ).  This information is used to generate
 * Create Table Statement (CTS) for Intermediate Table (IT).
 *
 * The PSQ bind descriptor is not needed until somewhat later, but it is
 * convenient to create both descriptors at the same time, so both are
 * created here and attached to the qry for later use.
 *
 * NOTE: This routine does not modify the select descriptor produced by
 * describe, i.e. datatypes and lengths are still in internal format, and
 * null-allowed bits have not been cleared.
 ****************************************************************************
 */
QDSTATUS qdcp_desc_psq(pqry, pselect)
reg1 QDSP_QRY *pqry;        /* Pointer to query struct, which points to text */
                            /* for parallel subquery, and also points to */
                            /* column map */
text *pselect;              /* Pointer to SELECT keyword within PSQ. */
{
    reg2 b4 i;              /* Loop index */
    reg3 b4 j;              /* Inner loop index */
    reg4 struct SQLDA *pdesc; /* Pointer to descriptor */
    b2 type;
    b4 precision, scale, nullallowed;
    struct QD_VARCHAR *temp = (struct QD_VARCHAR *)NULL;

    QDBEGIN("qdcp_desc_psq");

#if 0
    /* If PSQ is actually an insert statement into intermediate table,
     * that table doesn't exist yet, so temporarily turn it into just
     * a select statement so ORACLE will be willing to describe it.
     */
    if (pqry->flags & QDSP_QRY_PSQ_INSERT_TO_IT)
        memset(pqry->ppsq_text->arr, ' ',
               12 /* strlen("INSERT INTO QDITxxxxxxxxx ") */
               + pqry->litname);
```

Sep 20 1993 13:38:04 qdcp_desc_psq.c Page 2

```
#else
    /* If PSQ is an insert statement into an intermediate
     * table that doesn't yet exits, we'll describe only the SELECT
     * portion of the statement.
     */
    if (pqry->flags & QDSP_QRY_PSQ_INSERT_TO_IT)
    {
        temp =
            (struct QD_VARCHAR *)qdrt_malloc(sizeof(long)
                                 + (pqry->ppsq_text->len
                    - (pselect - pqry->ppsq_text->arr)));
        if (QDFAILED)
            goto error_return;
        /* Compute length of SELECT portion of PSQ, substracting 1 for
         * the trailing right-parenthesis.
         */
        temp->len = (pqry->ppsq_text->len - (pselect - pqry->ppsq_text->arr))
            - 1;
        memcpy(temp->arr, pselect, temp->len);
    }
    else
        temp = pqry->ppsq_text;
#endif

    /* Create select descriptor */

    pdesc = qdcp_desc_qry(QDCP_DESC_SELECT,
                          temp, pqry->npsq_cols);
    if (QDFAILED)
        goto error_return;

    /* Since our 'self-describing' buffers contain their own
     * V and I arrays, we don't need the ones allocated here for
     * select descriptors.  We use free rather than qdrt_free to free
     * them, because they were allocated by sqlald, not by qdrt_malloc.
     * (Don't do this for queries where psq inserts direct to IT,
     * because in that case we'll be freeing the entire descriptor just
     * below.)
     */
    if (!(pqry->flags & QDSP_QRY_PSQ_INSERT_TO_IT))
    {
        free(pdesc->V);
        pdesc->V = NULL;
        free(pdesc->I);
        pdesc->I = NULL;
    }

    /* For each descriptor element (i.e. for each PSQ column), find
     * the PSQ column in the column map, and set its type attributes to
     * those returned by DESCRIBE.
     */
    for (i = 0; i < pdesc->F; i++)
    {
        for (j = 0; j < pqry->ncolmap_entries; j++)
            if ((pqry->pcolmap[j].flags & QDCP_COL_PSQ) &&
                pqry->pcolmap[j].psq_colnum == i &&
                pqry->pcolmap[j].pexpr != NULL)
                break;

        /* If we didn't find the column, it means it was hidden in a '*'
         * reference.  But since we only generate intermediate tables for
         * queries with aggregates, a '*' reference would only be legal if
         * all columns covered by '*' are group-by columns, in which event
         * we already know their datatypes.
         */
        if (j >= pqry->ncolmap_entries)
            continue;

        /* Get type attributes for current element */
        /* (See ORACLE Precompilers Pro*C Supplement Chapter 4) */
        sqlnul(pdesc->T + i, &type, &nullallowed);
        sqlprc(pdesc->L + i, &precision, &scale);
```

1

```
        pqry->pcolmap[j].pexpr->datatype = type;
        pqry->pcolmap[j].pexpr->length = pdesc->L[i];
        pqry->pcolmap[j].pexpr->precision = precision;
        pqry->pcolmap[j].pexpr->scale = scale;

    } /* For each descriptor element */

    /* If PSQ is really an insert statement, we're all done with the
     * select descriptor, so free it.
    */
    if (pqry->flags & QDSP_QRY_PSQ_INSERT_TO_IT)
        sqlclu(pdesc);

    /* Otherwise, attach descriptor to qry for later use */
    else
        pqry->ppsq_select_desc = pdesc;


    /* Now describe bind variables */

    pdesc = qdcp_desc_qry(QDCP_DESC_BIND, temp,
                          pqry->nbinds+2);                        /*+%01*/
    if (QDFAILED)
        goto error_return;

    /* If number of bind variables = 2, only rowid bind variables */
    /* exist */                                                   /*+%02*/
    if (pdesc->F == 2)
        pqry->rowid_posit = 0;
    else
    {
        /* Find position of rowid value variables */
        for (i=0; i < pdesc->F; i++)
            if (!memcmp(pdesc->S[i], QD_LOW_ROWID_HOSTVAR, pdesc->C[i]))
            {
                pqry->rowid_posit = i;
                break;
            }
    }

    /* Set rowid variable types and lengths */
    pdesc->T[pqry->rowid_posit] = pdesc->T[pqry->rowid_posit+1] = DTYCHR;
    pdesc->L[pqry->rowid_posit] = pdesc->L[pqry->rowid_posit+1] =
        QD_ROWID_STRING_LENGTH;                                   /*-%02*/

    /* Attach descriptor to qry for later use */
    pqry->ppsq_bind_desc = pdesc;                                 /*-%01*/

#if 0
    /* If we temporarily turned PSQ from insert statement to just a
     *  select statement above, restore it now.
     */
    if (pqry->flags & QDSP_QRY_PSQ_INSERT_TO_IT)
    {
        memcpy(pqry->ppsq_text->arr, 'INSERT INTO ', 12);
        memcpy(pqry->ppsq_text->arr + 12,
               QD_PQDEF->pstrings + pqry->oitname, pqry->litname);
    }
#endif

error_return:
    if (temp && temp != pqry->ppsq_text)
        qdrt_free(&temp);
    QDEND;
    return QD_STATUS;
} /* qdcp_desc_psq */
```

112

Sep 20 1993 13:38:05 qdcp_desc_qry.pc Page 1

```
/*****************************************************************************
 * qdcp_desc_qry - Produce select or bind descriptor for a query specified by
 *                 zero-terminated text string
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV  DATE      AUTHOR  DESCRIPTION
 * ---  --------  ------  ---------------------------------------------------
 * %01   9/01/92  EYT     Allocate space for column names
 * %00  11/15/91  JM      Initial Version
 *****************************************************************************
*/

#include <qdstd.h>
#include <qdcpext.h>
#include <qderrs.h>

EXEC SQL INCLUDE SQLDA;

extern SQLDA *sqlald();
extern sqlprc();
extern sqlnul();
extern sqlclu();

/*****************************************************************************
 * qdcp_desc_qry - Produce select or bind descriptor for a query specified by
 *                 VARCHAR string
 *
 * This routine requires that the number of columns is known in
 * advance.
 * NOTE: This routine allocates V and I arrays for select descriptors.
 * If the caller does not need these (because the caller is using 'self-
 * describing' buffers), the caller should call free (not qdrt_free, just
 * free) to free them.
 *****************************************************************************
*/
struct SQLDA *qdcp_desc_qry(desc_type, pqtext, ncols)
reg1 word desc_type;        /* Specify QDCP_DESC_SELECT for select descriptor */
                            /*   or QDCP_DESC_BIND for bind descriptor        */
reg2 QD_VARCHAR *pqtext;    /* Pointer to query text, preceeded by 2-byte len */
reg3 ub4 ncols;             /* Number of columns                              */
{
__private static ub4 cnx_seqno = 0; /* Connection sequence number */
    EXEC SQL BEGIN DECLARE SECTION;
        VARCHAR *pqt;
        SQLDA *pdesc;
    EXEC SQL END DECLARE SECTION;

    EXEC SQL INCLUDE SQLCA;

    QDBEGIN("qdcp_desc_qry");
    QD_CHECK_CNX_SEQNO;

    /* Create select descriptor */

    pdesc = sqlald(ncols, QD_MAX_COLNAME, 0);                     /*%01*/
    pdesc->N = ncols;

    /* (NOTE: The next statement is coded as it is to avoid a compiler
     * warning.)
    */
    *((QD_VARCHAR **)(&pqt)) = pqtext;

    EXEC SQL PREPARE q FROM :pqt;
    if (sqlca.sqlcode < 0)
    {
        QDFAIL(sqlca.sqlcode);
        goto error_return;
    }
```

Sep 20 1993 13:38:05 qdcp_desc_qry.pc Page 2

```
    if (desc_type == QDCP_DESC_SELECT)
    {
        EXEC SQL DESCRIBE SELECT LIST FOR q INTO pdesc;
    }
    else
    {
        EXEC SQL DESCRIBE BIND VARIABLES FOR q INTO pdesc;
    }
    if (sqlca.sqlcode < 0)
    {
        QDFAIL(sqlca.sqlcode);
        goto error_return;
    }

    goto return_pdesc;
error_return:
    pdesc = (SQLDA *)NULL;
return_pdesc:
    QDEND;
    return pdesc;
} /* qdcp_desc_qry */
```

1

Apr 7 1993 15:08:57 qdcp_disabled_qry.pc Page 1

```
/*****************************************************************************
 * qdcp_disabled_qry.pc - Check whether QD is disabled for current database
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   ---------------------------------------------------
 * %00   02/01/93  JM       Initial version
 *****************************************************************************
*/

#include <qdstd.h>
#include <qderrs.h>

EXEC SQL INCLUDE SQLCA;

/*****************************************************************************
 * qdcp_disabled_qry - Check whether QD is disabled for current database.
 * QD is considered to be disabled if there exists a public synonym
 * called "KSR_DISABLE_QD"; if disabled, return QD_CP_DISABLED; else return
 * QD_OK.
 * This routine is called once, the first time qdcp_prep is called for
 * a given connection (at that time, an ORACLE connection has already been
 * made, and qd_init has already been called).  If this routine returns
 * QD_CP_DISABLED, qdcp_prep will set KSR_qd_enabled to FALSE, and return
 * QD_CP_DISABLED, causing its calling PUPI routine, and all subsequent calls
 * to PUPI routines, to fall through to ordinary ORACLE code.
 *****************************************************************************
*/
QDSTATUS qdcp_disabled_qry()
{
    regl QDSTATUS retval;
__private static ub4 cnx_seqno = 0; /* Connection sequence number */
EXEC SQL BEGIN DECLARE SECTION;
        VARCHAR synonym_name[80];
        VARCHAR outbuf[80];
EXEC SQL END DECLARE SECTION;
    QDBEGIN("qdcp_disabled_qry.pc");
    QD_CHECK_CNX_SEQNO;

    /* Set the synonym name we are looking or */
    strcpy(synonym_name.arr, KSR_DISABLE_QD);
    synonym_name.len = strlen(KSR_DISABLE_QD);

    EXEC SQL SELECT SYNONYM_NAME INTO :outbuf FROM ALL_SYNONYMS
        WHERE SYNONYM_NAME = :synonym_name AND OWNER = 'PUBLIC';

    if (sqlca.sqlcode)
        retval = QD_OK;
    else
    {
        QDFAIL(QD_CP_DISABLED);
        retval = QD_CP_DISABLED;
    }

    QDEND;
    return retval;
} /* qdcp_disabled_qry */
```

114

Dec 13 1993 10:59:37 qdcp_fidqry.pc Page 1

```
/**************************************************************************
 * qdcp_fidqry - Retrieve number of files, array of file id's from DD
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 **************************************************************************
 * REV   DATE      AUTHOR   DESCRIPTION
 * ---   --------  ------   -----------------------------------------------
 * %02   11/04/93  EYT      If possible, use sqlca.sqlerrd[2] to get count of
 *                          file ids
 * %01   11/02/93  EYT      Bugfix: If numfiles > ARRAY_SIZE, memcpy dest
 *                          is pfids, not *ppfids
 * %00   10/11/91  JM       Initial Version
 **************************************************************************
 */

#include <qdstd.h>
#include <qdcpext.h>
#include <qdrtext.h>
#include <qderrs.h>
#include <memory.h>
#ifdef QDDEBUG
#include <qdtstext.h>
#endif /* QDDEBUG */


EXEC SQL INCLUDE SQLCA;

/**************************************************************************
 * qdcp_fidqry - query the KSR dd view KSR_ALL_TABLE_FILES to get the number
 * of files for a table.  If the number of files is greater than 1,
 * query the view again to get an array of file id's.  Return the
 * number of files, and an allocated array of the file id's.
 **************************************************************************
 */
QDSTATUS qdcp_fidqry(ptabname, ltabname, powner, lowner,
                     pnumfiles, ppfids)
reg1 text *ptabname;    /* Pointer to name of table */
reg2 ub2 ltabname;      /* Length of table name */
reg3 text *powner;      /* Pointer to name of table owner */
reg4 ub2 lowner;        /* Length of table owner name */
ub2 *pnumfiles;         /* Output: put number of files here */
int **ppfids;           /* Output: hang allocated array of file id's */
                        /*  off this pointer */
{
    reg5 QDSTATUS retval;
__private static ub4 cnx_seqno = 0; /* Connection sequence number */
    EXEC SQL BEGIN DECLARE SECTION;
        VARCHAR owner[32];              /* User name for owner of column */
        VARCHAR tabname[32];            /* Table name */
        int numfiles;                   /* Number of files for table */
#define ARRAY_SIZE 200
        /* Don't use ARRAY_SIZE in array def because PRO*C precompiler */
        /* doesn't recognize macro */
        int fids[200];          /* Array of files id's */
    EXEC SQL END DECLARE SECTION;

    int *pfids;  /* Pointer into array of fileids */

    QDBEGIN("qdcp_fidqry");
    QD_CHECK_CNX_SEQNO;   /* Check connection sequence number */

    if (ptabname == NULL || powner == NULL || pnumfiles == NULL
        || ppfids == NULL)
    {
        QDFAIL(QD_REQUIRED_ARG_MISSING);
        retval = QD_STATUS;
        goto error_return;
    }
    /* Put name and owner into SQL host variables */
```

Dec 13 1993 10:59:37 qdcp_fidqry.pc Page 2

```
    memcpy(tabname.arr, ptabname, ltabname);
    tabname.len = ltabname;
    memcpy(owner.arr, powner, lowner);
    owner.len = lowner;

    if (sqlca.sqlcode)
    {
        retval = sqlca.sqlcode;
        goto return_retval;
    }

    EXEC SQL WHENEVER SQLERROR GOTO unexpected_error;

    EXEC SQL DECLARE fidqry CURSOR FOR
                SELECT FILE_ID
                FROM SYS.KSR_ALL_TABLE_FILES
                WHERE TABLE_NAME = :tabname AND OWNER = :owner
                ORDER BY 1;

    EXEC SQL OPEN fidqry; /* USING :tabname, :owner;*/

    EXEC SQL FETCH fidqry INTO :fids;

    /* Get number of rows returned from query */
    /* Use sqlca to get this info in order to avoid COUNT(*) query */
    /* in the cases where only one fetch is needed to get all the file */
    /* ids */
    numfiles = *pnumfiles = sqlca.sqlerrd[2];

    /* Only one table file.  No point partitioning on this table. */
    if (numfiles <= 1)
    {
        *ppfids = (int *)NULL;
        retval = QD_OK;
    }
    else
    /* Number of files less than array size.  All rows returned in
       first fetch */
    if (numfiles < ARRAY_SIZE)
    {
        /* Allocate array for returning file id's */
        *ppfids = (int *)qdrt_malloc(sizeof(int) * numfiles);

        if (QDFAILED)
        {
            retval = QD_STATUS;
            goto error_return;
        }

        memcpy(*ppfids, fids, numfiles * sizeof(int));
    }
    else
    /* Need multiple fetches to get all file id's */
    {
        /* Get total count of file ids */
        /* It should be impossible to get "NOT FOUND" for this query, */
        /* because semantic analysis has already verified that the    */
        /* table exists. */

        EXEC SQL SELECT COUNT(*) INTO :numfiles FROM SYS.KSR_ALL_TABLE_FILES
            WHERE TABLE_NAME = :tabname AND OWNER = :owner;

        *pnumfiles = numfiles;

        /* Allocate array for returning file id's */
        pfids = *ppfids = (int *)qdrt_malloc(sizeof(int) * numfiles);

        if (QDFAILED)
        {
            retval = QD_STATUS;
            goto error_return;
        }
```

Dec 13 1993 10:59:37 qdcp_fidqry.pc Page 3

```
        /* Copy first batch of file ids */
        memcpy(pfids, fids, ARRAY_SIZE * sizeof(int));

        /* Fetch file id's in lots of up to ARRAY_SIZE at a time. */
        /* until done */
        for (numfiles -= ARRAY_SIZE, pfids += ARRAY_SIZE; numfiles > 0;
             numfiles -= ARRAY_SIZE, pfids += ARRAY_SIZE)
        {
            EXEC SQL FETCH fidqry INTO :fids;

            memcpy(pfids, fids, min(numfiles, ARRAY_SIZE) * sizeof(int));
        }
    }

    EXEC SQL CLOSE fidqry;

    retval = QD_OK;
    goto return_retval;

unexpected_error:
    EXEC SQL WHENEVER SQLERROR CONTINUE;
    retval = sqlca.sqlcode;
error_return:
return_retval:
    QDEND;
    return retval;
} /* qdcp_fidqry */
```

Sep 20 1993 13:38:10 qdcp_hashqry.pc Page 1

```
/*************************************************************************
 * qdcp_hashqry - check data dictionary to determine whether a hashed
 *                table has an index with the hash key columns as its
 *                leading columns
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE      AUTHOR   DESCRIPTION
 * ---   --------  ------   ---------------------------------------------
 * %00   08/03/92  JM       Initial Version
 *************************************************************************
*/

#include <qdstd.h>
#include <qdspext.h>
#include <qdrtext.h>
#include <qderrs.h>

EXEC SQL BEGIN DECLARE SECTION;
        VARCHAR table_owner[32];        /* User name for owner of table */
        VARCHAR table_name[32];         /* Table name */
        VARCHAR index_name[32];         /* Index name */
        int num_hash_cols;              /* Number of hash key columns */
EXEC SQL END DECLARE SECTION;

EXEC SQL INCLUDE SQLCA;

/*************************************************************************
 * qdcp_hashqry.pc - check data dictionary to determine whether a hashed
 *                table has an index with the hash key columns as its
 *                leading columns
 *
 * The purpose of this routine is to find, if possible, an index which
 * ORACLE can be coerced to use instead of hashed access (by generating
 * an INDEX optimizer hint), so that a query on a hashed table can be
 * effectively partitioned.  This is useful in cases where the table was
 * configured to intentionally have many overflow blocks chained for each
 * hash value, with the blocks in each chain distributed among table
 * partitions.  This effectively clusters rows with matching key values in
 * many fewer blocks, which, combined with QD partitioning, can yield much
 * greater retrieval speedup than either QD or hashing used alone, for certain
 * classes of queries.
 *
 * First determine the number of hash columns for hash cluster containing
 * this table.  Then find name of index, if any, which has all hash columns
 * as its leading columns.  If more than one index qualifies, pick one
 * arbitrarily.  If no index qualifies, return QD_CP_INEFFECTIVE_HASH.
 *************************************************************************
*/

/* Length needed for generated INDEX optimizer hint, not counting name lengths
*/
#define QD_MIN_INDEX_HINT_LEN 11  /* Length of "index(. ) " */

QDSTATUS qdcp_hashqry(pqdef, ptab)
reg1 QDSP_QDEF *pqdef;      /* Pointer to qdef (root of parse tree),      */
                            /*  needed for access to strings area         */
reg2 QDSP_TAB *ptab;        /* Pointer to table                           */
{
    reg3 QDSTATUS retval = QD_OK;
__private static ub4 cnx_seqno = 0; /* Connection sequence number */

    QDBEGIN("qdcp_hashqry");
    QD_CHECK_CNX_SEQNO;  /* Check connection sequence number */

    /* Copy table name and table owner name into host variables for
     * SQL queries.
     */
    memcpy(table_name.arr, pqdef->pstrings + ptab->oreal_name,
```

Sep 20 1993 13:38:10 qdcp_hashqry.pc Page 2

```
            ptab->lreal_name);
    table_name.len = ptab->lreal_name;
    if (ptab->lreal_schema == 0)
    {
        table_owner.len = strlen(QDpcom->cnx.user);
        memcpy(table_owner.arr, QDpcom->cnx.user, table_owner.len);
    }
    else
    {
        memcpy(table_owner.arr, pqdef->pstrings + ptab->oreal_schema,
               ptab->lreal_schema);
        table_owner.len = ptab->lreal_schema;
    }

    /* Execute query to determine the number of hash columns in the cluster
     * containing this table.  If this query returns 0, assume that cluster
     * was owned by a different user, which we don't currently support for
     * automatically generating an INDEX hint for a hashed table, so
     * return QD_CP_INEFFECTIVE_HASH.
     */
    if (QDpcom->cnx.flags & QDCNX_DBA)
    {
        EXEC SQL SELECT COUNT(*) INTO :num_hash_cols
            FROM SYS.DBA_CLU_COLUMNS
            WHERE OWNER = :table_owner
            AND TABLE_NAME = :table_name
            AND CLUSTER_NAME =
               (SELECT CLUSTER_NAME FROM SYS.DBA_TABLES WHERE
                OWNER = :table_owner AND TABLE_NAME = :table_name);
    }
    else
    {
        EXEC SQL SELECT COUNT(*) INTO :num_hash_cols
            FROM ALL_CLU_COLUMNS
            WHERE OWNER = :table_owner
            AND TABLE_NAME = :table_name
            AND CLUSTER_NAME =
               (SELECT CLUSTER_NAME FROM ALL_TABLES WHERE
                OWNER = :table_owner AND TABLE_NAME = :table_name);
    }
    if (num_hash_cols == 0)
    {
        retval = QD_CP_INEFFECTIVE_HASH;
        goto error_return;
    }

    /* Now execute query to find index name, if any, of index with all
     * hash columns as its leading columns.
     */
    if (QDpcom->cnx.flags & QDCNX_DBA)
    {
        EXEC SQL SELECT A.INDEX_NAME INTO :index_name
                 FROM SYS.DBA_IND_COLUMNS A
                 WHERE A.TABLE_NAME = :table_name
                 AND A.TABLE_OWNER = :table_owner
                 AND :num_hash_cols =
                 (SELECT COUNT(*) FROM SYS.DBA_IND_COLUMNS B,
                                       SYS.DBA_CLU_COLUMNS C
                  WHERE A.INDEX_OWNER = B.INDEX_OWNER
                  AND   A.INDEX_NAME  = B.INDEX_NAME
                  AND   B.TABLE_NAME  = :table_name
                  AND   B.TABLE_OWNER = :table_owner
                  AND   B.COLUMN_NAME = C.TAB_COLUMN_NAME
                  AND   B.COLUMN_POSITION <= :num_hash_cols);
    }
    else
    {
        EXEC SQL SELECT A.INDEX_NAME INTO :index_name
                 FROM ALL_IND_COLUMNS A
                 WHERE A.TABLE_NAME = :table_name
                 AND A.TABLE_OWNER = :table_owner
                 AND ROWNUM = 1
                 AND :num_hash_cols =
```

Sep 20 1993 13:36:10 qdcp_hashqry.pc Page 3

```
                  (SELECT COUNT(*) FROM ALL_IND_COLUMNS B,
                                        ALL_CLU_COLUMNS C
                   WHERE A.INDEX_OWNER = B.INDEX_OWNER
                   AND   A.INDEX_NAME  = B.INDEX_NAME
                   AND   B.TABLE_NAME  = :table_name
                   AND   B.TABLE_OWNER = :table_owner
                   AND   B.COLUMN_NAME = C.TAB_COLUMN_NAME
                   AND   B.COLUMN_POSITION <= :num_hash_cols);
    )

    if (sqlca.sqlcode)
    {
        retval = QD_CP_INEFFECTIVE_HASH;
        goto error_return;
    }

    /* Generate an ORACLE optimizer hint telling the optimizer to user
     * this index for this table.
     */
    pqdef->phints = (text *)qdrt_malloc(table_name.len + index_name.len +
                              table_owner.len + QD_MIN_INDEX_HINT_LEN);
    if (QDFAILED)
        goto error_return;
#ifdef QUALIFIED_TABLE_NAMES_WORK
    sprintf(pqdef->phints, "INDEX(%*.*s.%*.*s %*.*s) ",
            table_owner.len, table_owner.len, table_owner.arr, table_name.len,
            table_name.len, table_name.arr, index_name.len, index_name.len,
            index_name.arr);
#else
    /* If alias was specified for table in query, use that rather than
     * actual table name in hint.
     */
    if (ptab->lalias)
        sprintf(pqdef->phints, "INDEX(%s %*.*s) ",
                pqdef->pstrings + ptab->oalias, index_name.len,
                index_name.len, index_name.arr);
    else
        sprintf(pqdef->phints, "INDEX(%*.*s %*.*s) ",
                table_name.len, table_name.len, table_name.arr,
                index_name.len, index_name.len, index_name.arr);
#endif
    retval = QD_OK;
    goto return_retval;
error_return:
    QDFAIL(retval);
return_retval:
    QDEND;
    return retval;
} /* qdcp_hashqry */
```

2

115

Sep 20 1993 13:38:12 qdcp_ordcolqry.pc Page 1

```
/***********************************************************************
 * qdcp_ordcolqry - retrieve order-by column info from ORACLE data dictionary
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***********************************************************************
 * REV   DATE      AUTHOR    DESCRIPTION
 * ---   --------  ------    ------------------------------------------------
 * %00   10/24/91  JM        Initial Version
 ***********************************************************************
 */

#include <qdstd.h>
#include <qdspext.h>
#include <qdcpext.h>
#include <qderrs.h>
#include <dtydef.h>  /* ORACLE datatype codes */

EXEC SQL BEGIN DECLARE SECTION;
        VARCHAR owner[32];              /* User name for owner of column */
        VARCHAR tabname[32];            /* Table name */
        VARCHAR colname[32];            /* Column name */
        VARCHAR datatype[10];           /* ORACLE datatype name */
        int column_id;                  /* ORACLE column id */
        int length;                     /* Column length */
        int precision;                  /* Column precision */
        int scale;                      /* Column scale */
EXEC SQL END DECLARE SECTION;

EXEC SQL INCLUDE SQLCA;

/***********************************************************************
 * qdcp_ordcolqry - retrieve order-by column info from ORACLE data dictionary
 *
 * Given table name and schema and column id, retrieve column name, datatype,
 * length, precision, and scale.  This is used to translate ORDER-BY columns
 * which were specified by ordinal position in select list into explicit
 * references, both to avoid discrepencies in ordinal positions in Input
 * Query and Parallel SubQuery select lists, and to check whether the column
 * is of type DATE, and therefore requires normalization.
 *
 * Input and output information is passed via pexpr, pointer to the
 * expression structure for the column, with pqdef providing access to
 * the query definition strings area.  On input, pexpr will always be setup
 * to provide the actual table name rather than a synonym or alias, and
 * will later be fixed up by the caller if necessary to refer to a synonym or
 * alias.
 ***********************************************************************
 */
QDSTATUS qdcp_ordcolqry(pqdef, pexpr)
reg1 QDSP_QDEF *pqdef;  /* Pointer to query definition (root of parse tree */
reg2 QDSP_EXPR *pexpr;  /* Pointer to parse-tree structure representing    */
                        /*  column                                         */
{
    reg3 QDSTATUS retval;
__private static ub4 cnx_seqno = 0; /* Connection sequence number */

    QDBEGIN("qdcp_ordcolqry");
    QD_CHECK_CNX_SEQNO; /* Check connection sequence number */

    column_id = pexpr->u.col.colid;

    /* Copy table name into host variable for SQL query */
    memcpy(tabname.arr, pqdef->pstrings + pexpr->u.col.oqual,
           pexpr->u.col.lqual);
    tabname.len = pexpr->u.col.lqual;

    /* Copy owner (schema) name from expression if provided, else from
     * user name for this connection, into host variable for SQL query.
     */
```

Sep 20 1993 13:38:12 qdcp_ordcolqry.pc Page 2

```
    if (pexpr->u.col.lschema)
    {
        memcpy(owner.arr, pqdef->pstrings + pexpr->u.col.oschema,
               pexpr->u.col.lschema);
        owner.len = pexpr->u.col.lschema;
    }
    else
    {
        owner.len = strlen(QDpcom->cnx.user);
        memcpy(owner.arr, QDpcom->cnx.user, owner.len);
    }

    /* If user has dba privilege, query DBA_TAB_COLUMNS; else
     * query ALL_TAB_COLUMNS
     */
    if (QDpcom->cnx.flags & QDCNX_DBA)
        EXEC SQL SELECT COLUMN_NAME, DATA_TYPE, DATA_LENGTH, DATA_PRECISION,
                        DATA_SCALE
            INTO :colname, :datatype, :length, :precision, :scale
              FROM SYS.DBA_TAB_COLUMNS
                WHERE OWNER = :owner AND TABLE_NAME = :tabname
                    AND COLUMN_ID = :column_id ;
    else
        EXEC SQL SELECT COLUMN_NAME, DATA_TYPE, DATA_LENGTH, DATA_PRECISION,
                        DATA_SCALE
            INTO :colname, :datatype, :length, :precision, :scale
              FROM ALL_TAB_COLUMNS
                WHERE OWNER = :owner AND TABLE_NAME = :tabname
                    AND COLUMN_ID = :column_id ;

    if (sqlca.sqlcode)
    {
        if (sqlca.sqlcode > 0)
            retval = QD_CP_ORDCOL_NOT_FOUND;
        else
            retval = sqlca.sqlcode;
        goto error_return;
    }

    pexpr->u.col.oname = qdsp_addstr(pqdef, colname.arr, colname.len);
    pexpr->u.col.lname = colname.len;
    pexpr->length = length;
    pexpr->precision = precision;
    pexpr->scale = scale;

    /* Datatype code assignments */
    /* These should agree with those in qdsp_colqry.pc */

    if (!memcmp(datatype.arr, "CHAR", min(4, datatype.len)))
        pexpr->datatype = DTYCHR;
    else if (!memcmp(datatype.arr, "NUMBER", min(6, datatype.len)))
        pexpr->datatype = DTYNUM;
    else if (!memcmp(datatype.arr, "DATE", min(4, datatype.len)))
        pexpr->datatype = DTYDAT;
    else if (!memcmp(datatype.arr, "LONG", min(4, datatype.len)))
        pexpr->datatype = DTYLNG;
    else if (!memcmp(datatype.arr, "RAW", min(3, datatype.len)))
        pexpr->datatype = DTYBIN;
    else
        pexpr->datatype = 0;

    retval = QD_OK;
    goto return_retval;
error_return:
    QDFAIL(retval);
return_retval:
    QDEND;
    return retval;
} /* qdcp_ordcolqry */
```

1

119

Sep 20 1993 13:38:13 qdcp_prep.c Page 1

```
/*************************************************************************
 * qdcp_prep - Prepare decomposed query for parallel execution
 * This is the top-level "decompose" routine.
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE      AUTHOR  DESCRIPTION
 * ---   --------  ------  -----------------------------------------------
 * %11   08/16/93  EYT     Call to qdrt_free sets pointer=NULL
 * %10   06/16/93  EYT     Collect prep time statistics
 * %09   03/08/93  JM      Support GROUP-BY/ORDER-BY queries
 * %08   11/04/92  JM      Support array fetch in subcursors
 * %07   10/15/92  EYT     Set rowid position in cursor, subcursor
 * %06   10/13/92  EYT     Don't pass in plan_table parameter
 * %05   10/09/92  EYT     Set aggregate's length buffer
 * %04   10/07/92  EYT     Check and set plan table name
 * %03   09/25/92  EYT     Set cursor bind descriptor
 * %02   04/23/92  JM      Do quick parse before calling EXPLAIN
 * %01   12/10/91  JM      No longer reserve exchange.btt[0] for child buffer
 * %00   11/01/91  JM      Initial Version
 *************************************************************************
*/

#include <stdio.h>
#include <strings.h>
#include <string.h>
#include <ctype.h>
#include <dtydef.h>
#include <qdstd.h>
#include <qdspext.h>
#include <qdcpext.h>
#include <qdxpext.h>
#include <qdbbext.h>
#include <qderrs.h>
#include <qdpuext.h>
#include <qdrtext.h>
#ifdef QDDEBUG
#include <qdtstext.h>
#endif /* QDDEBUG */
#include <memory.h>
#include <stdlib.h>
#include <sqlda.h>
#include <octdef.h>  /* For defs of OCTXPL, OCTTYP */

/* Local routines */

static QDSTATUS getfids(
#ifdef __STDC__
QDSP_QDEF *, QDSP_UNION *
#endif /* __STDC__ */
); /* getfids */

static QDSTATUS qgen(
#ifdef __STDC__
QDSP_QDEF *, QDSP_UNION *
#endif /* __STDC__ */
); /* qgen */

static QDSTATUS pcurgen(
#ifdef __STDC__
QDSP_QDEF *, QD_VARCHAR *, word
#endif /* __STDC__ */
); /* pcurgen */

static QDSTATUS check_correct_1(
#ifdef __STDC__
QDSP_QDEF *, QDSP_UNION *
#endif /* __STDC__ */
); /* check_correct_1 */
```

Sep 20 1993 13:38:13 qdcp_prep.c Page 2

```
static QDSTATUS check_correct_2(
#ifdef __STDC__
QDSP_QDEF *, QDSP_UNION *
#endif /* __STDC__ */
); /* check_correct_2 */

static QDSTATUS check_effective(
#ifdef __STDC__
QDSP_QDEF *, QDSP_UNION *
#endif /* __STDC__ */
); /* check_effective */

static QDSTATUS alloc_buffers(
#ifdef __STDC__
text **, text *, word *, struct SQLDA *, word *, word **, word, int
#endif /* __STDC__ */
); /* alloc_buffers */


#if 0 /* find_select has been replaced by qdsp_find_select in qdsp_parse.c */
static text *find_select(
#ifdef __STDC__
text *
#endif /* __STDC__ */
); /* find_select */
#endif /* 0 */


/* The following boolean vars, based on values of the environment
 * variable QDDISPLAY, control what gets dumped to the screen .
 */
#ifdef QDDEBUG
extern bool QD_display_tree1;
extern bool QD_display_tree2;
extern bool QD_display_tree3;
extern bool QD_display_colmap;
extern bool QD_display_prompt_for_semantic;
extern bool QD_display_psq;
extern bool QD_display_explain;
extern bool QD_display_prompt_if_ineffective;
extern bool QD_display_ctree;
extern bool QD_display_mallocs;
extern bool QD_display_errors;
extern bool QD_quick_parse;
#endif /*QDDEBUG */

/*************************************************************************
 * qdcp_prep - Prepare decomposed query for parallel execution
 *
 * This is the top-level "decompose" routine.
 *
 * 1) Generate EXPLAIN plan for query (which runs it past ORACLE's parser, so
 *    if no error is returned we know the query is legal).
 * 2) Parse the query
 * 3) Check whether query is syntactically legal to decompose
 * 4) Do semantic binding - get datatype infor on columns, figure out which
 *    columns belong to which tables
 * 5) Check whether query is semantically legal to decompose
 * 6) Determine partitioning table, number of partitions, join order,
 *    types of joins, whether partitioning table is retrieved by index
 * 7) Check whether query can be effectively decomposed
 * 8) Generate column map, which is a concordance for the mapping of
 *    columns between the various transformations of the query
 * 9) Generate parallel subquery and (if appropriate) combining query,
 *    create (intermediate) table statement and insert (into intermediate
 *    table) statement.
 *************************************************************************
 */
QDSTATUS qdcp_prep(pqtext, cnumber)
reg1 text *pqtext;  /* Pointer to query text, assumed to be terminated */
                    /* with a semi-colon, followed by a zero byte      */
reg5 word cnumber;  /* Cursor number */
```

1

Sep 20 1993 13:38:13 qdcp_prep.c Page 3

```
{
#ifdef QDDEBUG
    QDSTATUS retval;
#else
    reg2 QDSTATUS retval;
#endif;
    reg3 QDSTATUS explain_retval; /* Return value from EXPLAIN */
    reg4 bool explain_plan_exists = FALSE;
                        /* Has an explain plan been generated, which needs */
                        /* to be deleted? */
    reg6 text *pselect; /* Pointer to the first occurrence of the key-word */
                        /* 'SELECT' within pqtext, for passing to */
                        /* qdxp_genplan; this is needed in case pqtext */
                        /* points to an EXPLAIN statement */
    text *pinsert;      /* Pointer to first occurrence of key-word */
                        /* 'INSERT' within pqtext, in case this is */
                        /* an INSERT...SELECT statement */
    QDSP_QDEF *pqdef = (QDSP_QDEF *)NULL; /* Pointer to parse tree */
    text stmt_id[14]; /* Statement_id for EXPLAIN plan */
    b4 c = 0;           /* Receive characters of terminal input (for */
                        /* debugging i/o) */
    QD_VARCHAR *pinput_qry = NULL;
                        /* Save copy of input query (pqtext) here */
    word qlen;          /* Length of query text */
    bool free_pqtext = FALSE;     /* True if we set pqtext to point to */
                                  /* a copy which needs to be freed */
    text *pqtext2;      /* Copy of query text */

    /* Variables used in timing various preparation stages */
    /* Must use array name qdtime, so that the timing macros work */
#define TIME_PREPARE  0
#define TIME_EXPLAIN  1
#define TIME_PARSE    2
#define TIME_SEMANTIC 3
#define TIME_CURSOR   4
#define TIME_EFFECT   5
#define TIME_SUBQRY   6
#define TIME_EXAMINE  7
    __private static QDTIME qdtime[8];
    time_t start_time;

    QDBEGIN("qdcp_prep");

    /* Start timer to measure QD preparation time */
    if (QD_display_time)
        start_time = time(NULL);

    QDTIMESTART (TIME_PREPARE)

    if (QDpcom == NULL)
    {
        retval = qd_init();
        if (retval)
            goto error_return;
    }
    else QDRESET;

    /* If this is the first time qdcp_prep has been called for this
     * user-level connection, find out whether QD is disabled for this
     * database.
     */
    if (QDpcom->cnx.checked_for_disabled == FALSE)
    {
        word qlen;

        /* Problem: if we've been called from upial7, the input query
         * can get trashed as a side-effect of additional upi calls we
         * make here.  Normally, we don't want to save a copy this early,
         * since we may decide not to decompose, but for first query in
         * connection, since we need to issue a query to check whether
         * QD is disabled, we'll make a safe copy at this point.
         */
```

Sep 20 1993 13:38:13 qdcp_prep.c Page 4

```
        qlen = strlen(pqtext);
        pqtext2 = qdrt_malloc(qlen+1);
        if (QDFAILED)
            goto error_return;
        memcpy(pqtext2, pqtext, qlen);
        pqtext2[qlen] = 0;
        pqtext = pqtext2;

        /* Set flag so we'll know to free copy later */
        free_pqtext = TRUE;

        QDpcom->cnx.checked_for_disabled = TRUE;
        retval = qdcp_disabled_qry();
        if (retval)
        {
            KSR_qd_enabled = FALSE;
            goto error_return;
        }
    }

    /* Generate EXPLAIN plan for the query */
    /* Start timer to measure explain plan generation */
    QDTIMESTART (TIME_EXPLAIN);

    /* In case this is an EXPLAIN statement, get a pointer to the first
     * instance of the keyword 'SELECT', and pass that to qdxp_genplan.
     * If 'SELECT' is not found, return a warning, because we know we can't
     * decompose this query.
     */
    pselect = qdsp_find_select(pqtext, &pinsert);
    if (pselect == NULL)
    {
        retval = QD_CP_INCORRECT_NOT_SELECT;
        goto error_return;
    }

    /* Perform quick parse to determine whether this is a SELECT statement,
     * and whether it contains a NOPARTITION directive.  If not a SELECT,
     * or it contains NOPARTITION, don't bother incurring the overhead
     * of EXPLAIN and a full parse.
     */
#ifdef QD_QUICK_PARSE_CONDITIONAL
    if (QD_quick_parse)
    {
#endif /* QD_QUICK_PARSE_CONDITIONAL */
    retval = qdsp_parse(pselect, (QDSP_QDEF *)NULL, QDSP_QUICK_PARSE);
    if (retval)
        goto error_return;
#ifdef QD_QUICK_PARSE_CONDITIONAL
    }
#endif /* QD_QUICK_PARSE_CONDITIONAL */
    explain_retval = qdxp_genplan(pselect, NULL, stmt_id);          /*%06*/

    if (explain_retval)
    {
        retval = explain_retval;
#ifdef QDDEBUG
        if (QD_display_errors)
        {
            printf("\nEXPLAIN error: %d.  Parse anyway? ", explain_retval);
            if ((c = getchar()) != 'y')
            {
                if (c != '\n')
                    getchar();
                goto error_return;
            }
            else
            {
                QDRESET;
                getchar();
            }
        }
        else
```

121

Sep 20 1993 13:38:13 qdcp_prep.c Page 5

```
            goto error_return;
#else
        goto error_return;
#endif /* QDDEBUG */
    } /* if (retval) */
    else
        explain_plan_exists = TRUE;

    /* Compute generate explain plan time */
    QDTIMEFINISH (TIME_EXPLAIN);

    /* Start timer to measure parse time */
    QDTIMESTART (TIME_PARSE);

    /* Parse the query */
    retval = qdsp_parse(pqtext,
                        &pqdef, QDSP_FULL_PARSE);
    if (retval)
    {
#ifdef QDDEBUG
        qdtst_dspmsg("Parser error: %d; ", &retval);
#endif /* QDDEBUG */
        goto error_return;
    }

    /* If this is an INSERT...SELECT statement, flag QDEF accordingly. */
    if (QDpcom->cnx.pspcom->oselect)
        QD_PQDEF->flags |= QDSP_QDEF_INSERT_SELECT;

    /* Now dump the parse tree which has been created */
#ifdef QDDEBUG
    if (QD_display_tree1)
        qdtst_dump_tree(pqdef, "");
#endif /* QDDEBUG */

    /* Check whether query can be correctly decomposed, phase 1:
     * Any syntactic constructs which prevent decomposition?
     * Did user specify NOPARTITION in directive?
     */
    if (retval = check_correct_1(pqdef, pqdef->ptree))
    {
#ifdef QDDEBUG
        if (QD_display_prompt_for_semantic)
        {
            printf("\ncheck_correct_1 error: %d.  Decompose anyway? ", retval);
            if ((c = getchar()) != 'y')
            {
                if (c != '\n')
                    getchar();
                goto error_return;
            }
            else getchar();
        }
        else
            goto error_return;
#else
        goto error_return;
#endif /* QDDEBUG */
    } /* if (check_correct_1(pqdef, pqdef->ptree)) */

    /* Compute parse time */
    QDTIMEFINISH (TIME_PARSE);

#ifdef QDDEBUG
    if (QD_display_prompt_for_semantic)
    {
        printf("\nPress return to start semantic analysis.\n");
        c = getchar();

        if (c == 'q')
            exit(0);
    }
    else c = 0;
```

Sep 20 1993 13:38:13 qdcp_prep.c Page 6

```
#endif /* QDDEBUG */

    /* Start timer to measure semantic analysis time */
    QDTIMESTART (TIME_SEMANTIC);

    /* Now, before semantic analysis, save a copy of the input query.
     * This is done here because if we were called from upial7, then
     * one of the upi calls during semantic analysis is going to trash
     * the original copy of the input query.  Save it as a QD_VARCHAR,
     * because we'll need it in this form later as a parameter to
     * DESCRIBE.
     */
    pinput_qry = (QD_VARCHAR *)qdrt_malloc(sizeof(unsigned short) +
                                           (qlen = strlen(pqtext)));
    if (QDFAILED)
        goto error_return;
    memcpy(pinput_qry->arr, pqtext, qlen);

    /* If query text is semicolon-terminated,
     * set length 1 less, so DESCRIBE won't see semicolon
     */
    if (pqtext[qlen - 1] == ';')
        qlen--;

    pinput_qry->len = qlen;
    QDpcom->cnx.pspcom->pqtext = pinput_qry->arr;


    if (c != 's')
    {
        retval = qdsp_sem(pqdef);

        if (retval)
        {
#ifdef QDDEBUG
            if (QD_display_errors)
            {
                qdtst_dspmsg("Semantic analysis error: %d; ", &retval);
                printf("Press return to continue.\n");
                c = getchar();
                if (c == 'q')
                    exit(0);
            }
            else
                goto error_return;
#else
            goto error_return;
#endif /* QDDEBUG */
        }

        /* Check whether query can be correctly decomposed, phase 2:
         * Does query reference any views?
         */
        if (retval = check_correct_2(pqdef, pqdef->ptree))
        {
#ifdef QDDEBUG
        if (QD_display_prompt_for_semantic)
        {
            printf("\ncheck_correct_2 error: %d.  Decompose anyway? ",
                retval);
            if ((c = getchar()) != 'y')
            {
                if (c != '\n')
                    getchar();
                goto error_return;
            }
            else getchar();
        }
        else goto error_return;
#else
            goto error_return;
#endif /* QDDEBUG */
        } /* if (check_correct_2(pqdef, pqdef->ptree)) */
```

122

Sep 20 1993 13:38:13 qdcp_prep.c Page 7

```
        /* Compute semantic analysis time */
        QDTIMEFINISH (TIME_SEMANTIC);

        if (c != 's')
        {
            /* Examine explain plan */
            if (!explain_retval)
            {
                /* Start timer for examine explain plan time */
                QDTIMESTART (TIME_EXAMINE);
#ifdef QDDEBUG
                if (QD_display_explain)
                /* Enable debugging output */
                    QD_TURN_DEBUG_ON;
#endif /* QDDEBUG */
                retval = qdxp_qry(pqdef, stmt_id);            /*%04*//*%06*/
                if (retval)
                {
#ifdef QDDEBUG
                    qdtst_dspmsg("Error querying EXPLAIN plan: %d; ", &retval);
#endif /* QDDEBUG */
                    goto error_return;
                } /* if (retval) */
                retval = qdxp_del(stmt_id);                   /*%04*//*%06*/
                if (retval)
                {
#ifdef QDDEBUG
                    qdtst_dspmsg("Error deleting EXPLAIN plan: %d; ", &retval);
#endif /* QDDEBUG */
                    goto error_return;
                }
                else
                {
                    explain_plan_exists = FALSE;

                    /* Get file id's for partitioning tables */
                    retval = getfids(pqdef, pqdef->ptree);
                    if (retval)
                        goto error_return;
                } /* else */
                /* Disable debugging output */
#ifdef QDDEBUG
                QD_TURN_DEBUG_OFF;
#endif /* QDDEBUG */

            /* Compute generate examine explain plan time */
            QDTIMEFINISH (TIME_EXAMINE);
            } /* if (!explain_retval) */

            /* Now display tree with both semantic and explain info */
#ifdef QDDEBUG
            if (QD_display_tree2)
                qdtst_dump_tree(pqdef, "");
#endif /* QDDEBUG */

            /* Start timer for check effective time */
            QDTIMESTART (TIME_EFFECT);

            /* Check whether query can be effectively decomposed:
             * Driving table has more than one partition?  Driving table
             * is not retrieved index-only?
             */
            if (retval = check_effective(pqdef, pqdef->ptree))
            {
#ifdef QDDEBUG
                if (QD_display_prompt_if_ineffective)
                {
                    printf("\ncheck_effective error: %d.  Decompose anyway? ",
                        retval);
                    if ((c = getchar()) != 'y')
                    {
                        if (c != '\n')
```

Sep 20 1993 13:38:13 qdcp_prep.c Page 8

```
                            getchar();
                        goto error_return;
                    }
                    else getchar();
                }
                else
#endif /* QDDEBUG */
                goto error_return;

            } /* if (check_effective(pqdef, pqdef->ptree)) */

            /* Compute check effective time */
            QDTIMEFINISH (TIME_EFFECT);

            if (QD_display_time)
                fprintf (QD_display_file,
                    "\nQuery Decomposition started %s\nPreparing Query\n", ctim
e(&start_time));

#ifdef QDDEBUG
            if (QD_display_mallocs)
            {
                /* Display memory management statistics for this run */
                printf("\nJust before qgen:\n");
                printf("  mallocs: %d   frees: %d   difference: %d\n",
                    QDpcom->nmallocs, QDpcom->nfrees,
                    QDpcom->nmallocs - QDpcom->nfrees);
            }
#endif /* QDDEBUG */

            /* Start timer to measure subquery generation time */
            QDTIMESTART (TIME_SUBQRY);

            /* Generate parallel subqueries */
            retval = qgen(pqdef, pqdef->ptree);

            if (retval)
                goto error_return;

            /* Compute generate parallel subquery time */
            QDTIMEFINISH (TIME_SUBQRY);

            /* Now display tree after transformations */
#ifdef QDDEBUG
            if (QD_display_tree3)
                qdtst_dump_tree(pqdef, "");
#endif /* QDDEBUG */

            /* Now, if input statement was an EXPLAIN statement, we've
             * verified that query is decomposable, and we've created
             * the parallel subquery, so it's time to generate the requested
             * explain plan. Otherwise, it's time to generate the
             * parallel cursor structure and query execution
             * tree (pnode tree).
             */
            if (pqdef->flags & QDSP_EXPLAIN_QD)
            {
                QDPCURSOR *ppcur;

                /* Flag this as an EXPLAIN statement so pupi routine
                 * will return correct statement type in hst->hstoer.oertyp.
                 */
                QDpcom->oertyp = OCTXPL;

                retval = qdxp_explain(pqdef, pinsert ? pinsert : pselect);
                if (retval)
                    goto error_return;

                /* We need to create a 'DUMMY' pcursor structure, because
                 * although we've now completed the job of explaining the
                 * query, still within a top-level call from pupiosq,
                 * we are still going to get pupiexn and pupicls calls for
                 * this cursor.  If there were no 'DUMMY' pcursor, those
```

123

```
             * routines would assume that the cursor number corresponded
             * to a non-decomposed query, and would fall through to
             * the corresponding upi routines, which would complain that
             * there was no parsed statement corresponding to the cursor
             * number.
             */
            ppcur = (QDPCURSOR *)qdrt_malloc(sizeof(QDPCURSOR));
            ppcur->root_cnumber = cnumber;

            /* Use special checkstring to stamp this as a dummy */
            ppcur->check = QDCK_DUMMY;

            /* Insert in list */
            ppcur->pnext = QDpcom->cnx.ppcursor;
            QDpcom->cnx.ppcursor = ppcur;
        }
        else
        {
            /* Flag this as an INSERT or SELECT statement, whichever
             * is appropriate, so pupi routine
             * will return correct statement type in hst->hstoer.oertyp.
             */
            if (pqdef->flags & QDSP_QDEF_INSERT_SELECT)
                QDpcom->oertyp = OCTINS;
            else
                QDpcom->oertyp = OCTSEL;

            /* Start timer to measure generate parallel cursor time */
            QDTIMESTART (TIME_CURSOR);

            retval = pcurgen(pqdef, pinput_qry, cnumber);
            if (retval)
                goto error_return;

            /* Compute generate parallel cursor time */
            QDTIMEFINISH (TIME_CURSOR);
        }
#ifdef QDDEBUG
        if (QD_display_ctree)
            (*(QDpcom->cnx.ppcursor->pctree->hdr.pfunc))
                (QDpcom->cnx.ppcursor->pctree, QDBB_REQ_DISPLAY,
                 QDpcom->cnx.ppcursor->pbtt);
#endif /* QDDEBUG */
        } /* (second) if (c != 's') */
    } /* if (c != 's') */

    /* Compute full preparation time */
    QDTIMEFINISH (TIME_PREPARE);

    if (QD_display_time)
    {
        /* Print timing statistics */
#if 0
        QDTIMEPRINT (TIME_EXPLAIN, "Generate Explain Plan");
        QDTIMEPRINT (TIME_PARSE, "Parse");
        QDTIMEPRINT (TIME_SEMANTIC, "Semantic Analysis");
        QDTIMEPRINT (TIME_SUBQRY, "Generate Parallel Subquery")
        QDTIMEPRINT (TIME_CURSOR, "Generate Parallel Cursor");
        QDTIMEPRINT (TIME_EXAMINE, "Examine Explain Plan");
        QDTIMEPRINT (TIME_EFFECT, "Check Effective");
#endif
        QDTIMEPRINT (TIME_PREPARE, "Full Preparation");
        fprintf (QD_display_file, "\n");
        fflush (QD_display_file);
    }

    goto success_return;

error_return:

    /* Free copy of input query, if already made */
    if (pinput_qry)
        qdrt_free(&pinput_qry);
```

```
    if (QD_display_why_no_qd)
        fprintf(stderr, "qdcp_prep: %d.  Query not decomposed.\n",
                retval);
success_return:

    /* If pqtext itself is a copy, free it (we do this for either success
     * or failure, because we don't need to save this copy any longer)
     */
    if (free_pqtext)
        qdrt_free(&pqtext2);

    /* Free parse tree if there's one
     * NOTE: We may not really want to delete the parse tree
     * this early.
     */
    if (pqdef != NULL)
    {
#ifdef QDDEBUG
        if (QD_display_mallocs)
        {
            /* Display memory management statistics for this run */
            printf("\nBefore qdsp_freetree:\n");
            printf("  mallocs: %d   frees: %d   difference: %d\n",
                   QDpcom->nmallocs, QDpcom->nfrees,
                   QDpcom->nmallocs - QDpcom->nfrees);
        }
#endif /* QDDEBUG */

        qdsp_freetree(&pqdef);
        pqdef = (QDSP_QDEF *)NULL;
        QD_PQDEF = (QDSP_QDEF *)NULL; /*%02*/

#ifdef QDDEBUG
        if (QD_display_mallocs)
        {
            /* Display memory management statistics for this run */
            printf("\nAfter qdsp_freetree:\n");
            printf("  mallocs: %d   frees: %d   difference: %d\n",
                   QDpcom->nmallocs, QDpcom->nfrees,
                   QDpcom->nmallocs - QDpcom->nfrees);
        }
#endif /* QDDEBUG */

    }
    if (explain_plan_exists) /* Delete the explain plan */
    {
        explain_retval = qdxp_del(stmt_id);                    /*%04*//*%06*/
        if (explain_retval && !retval)
            retval = explain_retval;
    }

    QDEND;
    return retval;
} /* qdcp_prep */

#if 0 /* find_select has been replaced by qdsp_find_select, in qdsp_parse.c */
/* find_select - return pointer to first non-commented instance of keyword
 * 'SELECT' within pqtext.  If not found, return NULL.
 * NOTE: The current version of this routine doesn't check whether 'SELECT'
 * is within a comment, and doesn't work for case combinations other than
 * 'SELECT', 'select', or 'Select'.  It is assumed that a comment prior
 * to the actual 'SELECT' keyword, that contains the word 'SELECT', is
 * unlikely, as are case combinations such as 'sElEcT'.  However, technically
 * these are legal, so this really ought to be fixed.
 */
static text *find_select(pqtext)
regi text *pqtext;  /* Pointer to query text */
{
    text *pret;
```

Sep 20 1993 13:38:13 qdcp_prep.c Page 11

```
    pret = strstr(pqtext, "SELECT");
    if (pret == NULL)
        pret = strstr(pqtext, "select");
    if (pret == NULL)
        pret = strstr(pqtext, "Select");
    return pret;
} /* find_select */
#endif /* 0 */


/* getfids - get file id's for partitioning table of each query in
 * parse tree.
 */
static QDSTATUS getfids(pqdef, ptree)
QDSP_QDEF *pqdef;
QDSP_UNION *ptree;
{
    reg1 text *powner;
    reg2 ub2 owner_len;
    reg3 b4 i;
#ifdef QDDEBUG
    QDSTATUS retval;
#else
    reg4 QDSTATUS retval;
#endif

    QDBEGIN("getfids");
    if (ptree->check == QDCK_QRY)
    {
        for (i = 0; i < ptree->qry.ntabs; i++)
            if (ptree->qry.ptabs[i].join_pos == 1)
                break;
        ptree->qry.partab = i;
        if (ptree->qry.ptabs[i].lreal_schema == 0)
        {
            powner = QDpcom->cnx.user;
            owner_len = strlen(powner);
        }
        else
        {
            powner = pqdef->pstrings + ptree->qry.ptabs[i].oreal_schema;
            owner_len = ptree->qry.ptabs[i].lreal_schema;
        }

        /* If query contains a view reference, and the partitioning
         * table is within the view, use the name of the actual
         * partitioning table to look up the fids.
         */
        if ( (ptree->qry.ptabs[i].flags & QDSP_TAB_VIEW) &&
            ptree->qry.lpartabname != 0)
            retval = qdcp_fidqry(pqdef->pstrings +
                                 ptree->qry.opartabname,
                                 ptree->qry.lpartabname,
                                 pqdef->pstrings +
                                 ptree->qry.opartabowner,
                                 ptree->qry.lpartabowner,
                                 &(ptree->qry.nparfids),
                                 &(ptree->qry.pparfids));
        else
            retval = qdcp_fidqry(pqdef->pstrings +
                                 ptree->qry.ptabs[i].oreal_name,
                                 ptree->qry.ptabs[i].lreal_name,
                                 powner, owner_len,
                                 &(ptree->qry.nparfids),
                                 &(ptree->qry.pparfids));
#ifdef QDDEBUG
        if (retval)
            qdtst_dspmsg("Error from qdcp_fidqry: %d; ", &retval);
#endif /* QDDEBUG */
    }
    else /* set operation */
    {
        retval = getfids(pqdef, ptree->setop.prand1);
```

Sep 20 1993 13:38:13 qdcp_prep.c Page 12

```
        if (!retval)
            retval = getfids(pqdef, ptree->setop.prand2);
    }
    QDEND;
    return retval;
} /* getfids */


/* qgen -
 * Traverse parse tree, generating parallel subquery for each top-level
 * query (that is, queries which are children of root or set operations,
 * but not subqueries).
 */
static QDSTATUS qgen(pqdef, ptree)
QDSP_QDEF *pqdef;
QDSP_UNION *ptree;
{
#ifdef QDDEBUG
    QDSTATUS retval;
#else
    reg1 QDSTATUS retval;
#endif
    /* Variables used in timing various preparation stages */
    /* Must use array name qdtime, so that the timing macros work */
#define TIME_CMBQRY 0
    __private static QDTIME qdtime[1];

    QDBEGIN("qgen");
    if (ptree->check == QDCK_QRY)
    {

#ifdef QDDEBUG
        if (QD_display_colmap)
            QD_TURN_DEBUG_ON;
#endif /* QDDEBUG */

        retval = qdcp_seltran(pqdef, &(ptree->qry));

#ifdef QDDEBUG
        QD_TURN_DEBUG_OFF;
#endif /* QDDEBUG */

        if (retval)
        {
#ifdef QDDEBUG
            if (QD_display_prompt_for_semantic)
            {
                if (retval == QD_CP_INCORRECT_NESTED_AGGR)
                {
                    b4 c;

                    printf(
                    "\nQuery contains nested aggregate.  Decompose anyway? ",
                           retval);
                    if ((c = getchar()) != 'y')
                    {
                        if (c != '\n')
                            getchar();
                        goto error_return;
                    }
                    else getchar();
                }
                else
                    qdtst_dspmsg(
                     "Error transforming select list.  qdcp_seltran: %d; ",
                           &retval);
            } /* if (QD_display_prompt_for_semantic) */
            else
                goto error_return;
#else
            goto error_return;
#endif /* QDDEBUG */
        }
```

125

```
#ifdef QDDEBUG
        else if (QD_display_colmap)
            qdtst_dump_colmap(ptree->qry.pcolmap,
                              ptree->qry.ncolmap_entries);
#endif /* QDDEBUG */

        retval = qdcp_qgen(QDCP_GEN_PSQ, pqdef, &(ptree->qry),(text **)NULL);

        if (retval)
        {
#ifdef QDDEBUG
            qdtst_dspmsg("Error generating query.  qdcp_qgen: %d; ", &retval);
#endif /* QDDEBUG */

            goto error_return;
        }

#ifdef QDDEBUG
        if (QD_display_psq && ptree->qry.ppsq_text != (QD_VARCHAR *)NULL)
            printf("\nParallel SubQuery:\n\n%s\n",
                   ptree->qry.ppsq_text->arr);
#endif /* QDDEBUG */

        if (ptree->qry.flags & QDSP_QRY_GEN_CQ)
        {
            /* Start timer to measure combining query generation time */
            QDTIMESTART (TIME_CMBQRY)

            retval = qdcp_qgen(QDCP_GEN_CQ, pqdef, &(ptree->qry),
                               (text **)NULL);

            /* Compute generate combining query time */
            QDTIMEFINISH (TIME_CMBQRY);
        }

#ifdef QDDEBUG
        if (retval && QD_display_errors)
            qdtst_dspmsg("Error generating query.  qdcp_qgen: %d; ", &retval);

        if (QD_display_psq && ptree->qry.pcq_text != (QD_VARCHAR *)NULL)
            printf("\nCombining Query:\n\n%s\n",
                   ptree->qry.pcq_text->arr);

        if (QD_display_psq && ptree->qry.pcts_text != (QD_VARCHAR *)NULL)
            printf("\nCreate Table Statement:\n\n%s\n",
                   ptree->qry.pcts_text->arr);

        if (QD_display_psq && ptree->qry.pis_text != (QD_VARCHAR *)NULL)
            printf("\nInsert Statement:\n\n%s\n",
                   ptree->qry.pis_text->arr);

        if (QD_display_psq && ptree->qry.pds_text != (QD_VARCHAR *)NULL)
            printf("\nDelete Statement:\n\n%s\n",
                   ptree->qry.pds_text->arr);

        if (QD_display_psq && ptree->qry.pdts_text != (QD_VARCHAR *)NULL)
            printf("\nDrop Table Statement:\n\n%s\n",
                   ptree->qry.pdts_text->arr);
#endif /* QDDEBUG */
    }
    else /* set operation */
    {
        retval = qgen(pqdef, ptree->setop.prand1);
        if (!retval)
            retval =qgen(pqdef, ptree->setop.prand2);
    }

#if 0
    /* Print generate combining query time statistics */
    if (ptree->qry.flags & QDSP_QRY_GEN_CQ)
```

```
        QDTIMEPRINT (TIME_CMBQRY, "Generate Combining Query");
#endif

error_return:
    QDEND;
    return retval;
} /* qgen */


/* check_correct_1 - Phase 1 of checking whether query can be decomposed
 * correctly.
 * Did user specify NOPARITION in directive?
 * Does query contain FOR UPDATE OF clause?
 * Does query reference set operation (UNION, INTERSECT, MINUS)?
 * Does query contain both GROUP BY and ORDER BY? (OBSOLETE; no longer an
 *  error)
 * Does query contain CONNECT BY or START WITH clauses?
 * Does query refer to NEXTVAL or ROWNUM pseudo-columns?
 * Does query contain any host variable references?
 * Does query contain any distinct aggregates (excepting MAX and MIN)?
 * Does query contain any aggregates of ROWID?
 * Is query INSERT...SELECT DISTINCT statement?
 */
static QDSTATUS check_correct_1(pqdef, ptree)
reg1 QDSP_QDEF *pqdef;   /* Pointer to root of parse tree */
reg2 QDSP_UNION *ptree;  /* Pointer to set operation or query */
{
    reg3 QDSTATUS retval = QD_OK;
    reg4 QDSP_EXPR *pexpr; /* Pointer to expressions */

    QDBEGIN("check_correct_1");
    /* Did user specify NOPARTITION in directive comment? */
    if (pqdef->flags & QDSP_QDEF_NOPARTITION)
        retval = QD_CP_INCORRECT_NOPARTITION;

    /* Does query contain FOR UPDATE OF clause? */
    else if (pqdef->nupdcols)
        retval = QD_CP_INCORRECT_UPDATE;

    /* Temporary for P1, queries with set operations can't be
     * decomposed.
     */
    else if (ptree->check == QDCK_SETOP_UNION ||
             ptree->check == QDCK_SETOP_INTER ||
             ptree->check == QDCK_SETOP_MINUS)
        retval = QD_CP_INCORRECT_SETOP;

    /* Otherwise ptree must point to a query */

#ifdef DONT_ALLOW_BOTH_ORDERBY_AND_GROUPBY
    /* Does query contain both GROUP BY and ORDER BY clauses? */
    else if (pqdef->nordcols && ptree->qry.ngroupcols)
        retval = QD_CP_INCORRECT_ORDER_AND_GROUP;
#endif

    /* Does query contain CONNECT BY or START WITH clauses? */
    else if (ptree->qry.pconnectby || ptree->qry.pstartwith)
        retval = QD_CP_INCORRECT_CONNECT_BY;

    /* Is query an INSERT...SELECT DISTINCT statement? */
    else if ((pqdef->flags & QDSP_QDEF_INSERT_SELECT) &&
             (ptree->qry.flags & QDSP_QRY_DISTINCT))
        retval = QD_CP_INCORRECT_INSERT_SELECT_DISTINCT;

    /* Does query contain any expressions which prevent decomposing?
     * NOTE: No check is made here for PRIOR or LEVEL because ORACLE won't
     * permit these expressions if there is no CONNECT BY clause, and we
     * already checked for that above.
     */
    else for (pexpr = ptree->qry.pfirexpr; pexpr != (QDSP_EXPR *)NULL;
              pexpr = pexpr->pnext)
    {
        if (pexpr->opcode == QDSP_OP_NEXTVAL)
```

126

```
        {
            retval = QD_CP_INCORRECT_NEXTVAL;
            break;
        }
        /* Any distinct aggregates? (MAX and MIN are ok ) */
        else if (QD_SQLOP_IS_AGGR(pexpr->opcode) &&
                 (pexpr->u.op.flags & QDSP_EXPR_DISTINCT) &&
                 !(pexpr->opcode == QDSP_OP_MAX ||
                   pexpr->opcode == QDSP_OP_MIN))
        {
            retval = QD_CP_INCORRECT_DISTINCT_AGGR;
            break;
        }

        else if (QD_SQLOP_IS_AGGR(pexpr->opcode) &&
                 pexpr->u.op.prand1 &&
                 pexpr->u.op.prand1->opcode == QDSP_OP_ROWID)
        {
            retval = QD_CP_INCORRECT_ROWID_AGGR;
            break;
        }

        /* Temporary for P1, queries referencing the ROWNUM pseudo
         * column cannot be decomposed.
         */
        else if (pexpr->opcode == QDSP_OP_ROWNUM)
        {
            retval = QD_CP_INCORRECT_ROWNUM;
            break;
        }

    } /* else for (pexpr...) */
    QDEND;
    return retval;
} /* check_correct_1 */


/* check_correct_2 - Phase 2 of checking whether query can be decomposed
 * correctly.
 * Does query contain any view references?
 */
static QDSTATUS check_correct_2(pqdef, ptree)
reg1 QDSP_QDEF *pqdef;    /* Pointer to root of parse tree */
reg2 QDSP_UNION *ptree;   /* Pointer to set operation or query */
{
    reg3 QDSTATUS retval = QD_OK;
    reg4 b4 i;

    QDBEGIN("check_correct_2");
    if (ptree->check == QDCK_SETOP_UNION ||
        ptree->check == QDCK_SETOP_INTER ||
        ptree->check == QDCK_SETOP_MINUS)
    {
        retval = check_correct_2(pqdef, ptree->setop.prand1);
        if (!retval)
            retval = check_correct_2(pqdef, ptree->setop.prand2);
    }
    else for (i = 0; i < ptree->qry.ntabs; i++)
        if (ptree->qry.ptabs[i].flags & QDSP_TAB_VIEW)
        {
#ifdef NO_VIEW_SUPPORT
            retval = QD_CP_INCORRECT_VIEW;
            break;
#else
            /* 7/21/92 JM: Support queries with one view reference.
             * Flag query when first view reference is encountered,
             * and return error if a second is encountered.
             */
            if (ptree->qry.flags & QDSP_QRY_VIEW)
            {
                retval = QD_CP_INCORRECT_MULTI_VIEWS;
                break;
            }
```

```
            else
                ptree->qry.flags |= QDSP_QRY_VIEW;

#endif /* NO_VIEW_SUPPORT */
        }
    QDEND;
    return retval;
} /* check_correct_2 */


/* check_effective - Check whether query can be effectively decomposed.
 * If user specified PARTITION in directive, return QD_OK regardless.
 * Else, does driving table have more than one partition?
 * Is index only retrieved for driving table?
 * Is the driving table retrieved by hash key?  If so, is there also an
 * index on the same column(s) as the hash key, so that we can generate
 * an optimizer hint to use that index instead of the hash key?  If not,
 * it's ineffective to decompose.
 */
static QDSTATUS check_effective(pqdef, ptree)
reg1 QDSP_QDEF *pqdef;    /* Pointer to root of parse tree */
reg2 QDSP_UNION *ptree;   /* Pointer to set operation or query */
{
    reg3 QDSTATUS retval = QD_OK;
    reg4 b4 i;

    QDBEGIN("check_effective");
    if (pqdef->flags & QDSP_QDEF_PARTITION)
        return QD_OK;

    if (ptree->check == QDCK_SETOP_UNION ||
        ptree->check == QDCK_SETOP_INTER ||
        ptree->check == QDCK_SETOP_MINUS)
    {
        retval = check_effective(pqdef, ptree->setop.prand1);
        if (!retval)
            retval = check_effective(pqdef, ptree->setop.prand2);
    }

    /* Is there more than one partition for the driving table? */
    else if (ptree->qry.nparfids < pqdef->min_partitions)
        retval = QD_CP_INEFFECTIVE_NOT_PARTITIONED;

    /* Is only the index retrieved for the driving table, or is the
     * driving table retrieved by hash key?
     */
    else
    {
        for (i = 0;
             i < ptree->qry.ntabs && ptree->qry.ptabs[i].join_pos != 1;
             i++)
            ;
        if (i >= ptree->qry.ntabs)
        {
            QDFAIL(QD_CP_NO_PAR_TAB);
            retval = QD_STATUS;
            goto error_return;
        }
        if (ptree->qry.ptabs[i].flags & QDSP_TAB_NOTAC)
            retval = QD_CP_INEFFECTIVE_INDEX_ONLY;

        /* If driving table is retrieved by hash key, check whether
         * there's a regular index with the same column(s) as the hash
         * key, in which case generate an optimizer hint telling ORACLE
         * to use that index rather than the hash key.  (This is used as
         * a performance trick: hash the table, but configure it to have
         * many overflow blocks per key value, distributed across multiple
         * disks.  This causes rows with like key values to be clustered
         * in a few blocks, but since the blocks are on several disks,
         * retrieving via a regular index permits effective query
         * decomposition.  If there's no regular index on the hash key
         * fields, it's ineffective to decompose.
         */
```

127

```
        else if (ptree->qry.ptabs[i].flags & QDSP_TAB_HASH)
        {
            retval = qdcp_hashqry(pqdef, ptree->qry.ptabs + i);
        }
    }
error_return:
    QDEND;
    return retval;
} /* check_effective */


/* pcurgen - generate parallel cursor structure and combining tree
 * NOTE: Since set operations are not yet supported, this routine assumes
 * that pqdef->ptree points directly to the (single) query to be executed.
 */
static QDSTATUS pcurgen(pqdef, pinput_qry, cnumber)
reg1 QDSP_QDEF *pqdef;      /* Pointer to root structure of parse tree */
reg3 QD_VARCHAR *pinput_qry; /* Pointer to text of input query */
reg13 word cnumber;         /* Cursor number */
{
    reg2 QDPCURSOR *ppcur;  /* Pointer to paralle cursor structure */
    reg5 QDBB_UNION *pbb;   /* Pointer to building blocks of combining tree */
    reg6 QDBB_UNION *pparent; /* Pointer to parent of current building */
                              /*  block */
    reg7 QDSP_QRY *pqry;    /* Pointer to parse tree query structure */
    reg8 word i;            /* Loop index */
    reg9 word next_bufnum = 0; /* Next buffer number to assign, from */
                               /*  pcursor's btt */
    reg10 word j;           /* Inner loop index */
    reg11 text *ppattern = NULL; /* Pointer to pattern buffer */
    reg12 word k;           /* Still-more-inner loop index */
    word bufsize;           /* Size of subcursor fetch-ahead buffers */
    reg14 fids_per_q;       /* File ids per query */
    reg15 extra_fids;       /* Extra fids to be apportioned among subqueries; */
                            /*  this is the remainder when max partitions   */
                            /*  is divided into number of physical          */
                            /*  partitions                                  */
    int next_fid = 0;       /* Index of next fileid to use, in array of     */
                            /*  fileids                                     */
    word arraybufsize = 0; /* Size needed for array-fetch buffers */
    word *pafpattern = NULL; /* Pointer to array-fetch buffer pattern */

    QDBEGIN("pcurgen");
    ppcur = (QDPCURSOR *)qdrt_malloc(sizeof(QDPCURSOR));
    if (QDFAILED)
        goto error_return;
    ppcur->check = QDCK_PCUR;
    ppcur->root_cnumber = cnumber;

    /* Insert in list of open cursors */
    ppcur->pnext = QDpcom->cnx.ppcursor;
    QDpcom->cnx.ppcursor = ppcur;

    /* Save copy of input query text, attached to pcursor */
    ppcur->pinput_qry = pinput_qry;

    /* Set number of parallel subqueries, determine number of btt
     * entries, and allocate btt.  Number of btt entries = number of
     * subcursors, + 1 for returning row from multiplexer, plus 1 extra
     * if there's grouping, plus one extra if there's aggregation.
     */
    pqry = &(pqdef->ptree->qry); /* For now, we're assuming no UNIONs */

    /* The number of parallel subqueries is set to the minimum of
     * the max partitions specified via KSR_MAX_PARTITIONS environment
     * variable or query directive, and the number of file partitions
     * of the driving table.
     */
    if (pqdef->max_partitions)
        ppcur->num_psqs = min(pqdef->max_partitions, pqry->nparfids);
    else
        ppcur->num_psqs = pqry->nparfids;
```

```
    if (QD_display_time)
        fprintf (QD_display_file, "Number of Subqueries: %d\n",
                 ppcur->num_psqs);

    /* Determine how many fids (i.e. how many partitions) will be retrieved
     * by each parallel subquery.
     */
    fids_per_q = pqry->nparfids / ppcur->num_psqs;
    extra_fids = pqry->nparfids % ppcur->num_psqs;

    ppcur->num_btt_entries = ppcur->num_psqs + 1;
    if (pqry->ngroupcols)
        ppcur->num_btt_entries++;
    if (pqry->pcq_text)
        ppcur->num_btt_entries++;

    ppcur->rowid_posit = pqry->rowid_posit;                          /*%07*/
    ppcur->pbtt = (text **)qdrt_malloc(sizeof(text *)
                                       * ppcur->num_btt_entries);

    if (QDFAILED)
        goto error_return;

    /* Create the combining tree */

    /* Create the root building block */
    pbb = (QDBB_UNION *)qdrt_malloc(sizeof(QDBB_ROOT));
    if (QDFAILED)
        goto error_return;
    pbb->check = QDCK_ROOT;
    pbb->hdr.pfunc = qdbb_root;
    pbb->root.in_bufnum = next_bufnum;
    ppcur->pctree = pparent = pbb;

    /* If appropriate, flag root indicating query is INSERT SELECT
     * with no aggregation, so pupiexe/pupiexn can check this flag
     * to determine whether to set hst->hstoer.oercnt from KSR_qd_oercnt.
     */
    if ((pqdef->flags & QDSP_QDEF_INSERT_SELECT)
        && !pqry->pcq_text)
        pbb->hdr.flags |= QDBB_PSQ_INSERT_SELECT;

    /* Generate output descriptor for root (this will later be fixed up
     * with data types and addresses of actual host variables, in
     * pupidfc and/or pupidfn.) Not done for INSERT...SELECT statements.
     */
    if (!(pqdef->flags & QDSP_QDEF_INSERT_SELECT))
        pbb->root.pout_desc = qdcp_desc_qry(QDCP_DESC_SELECT,
                                            ppcur->pinput_qry,
                                            pqry->niq_cols);
    if (QDFAILED)
        goto error_return;
    ppcur->pselect_desc = pbb->root.pout_desc;

    /* Set cursor bind descriptor.  Set it here because bind
     * descriptor is the same for all the subqueries.
     */
    ppcur->pbind_desc = pqry->ppsq_bind_desc;                        /*%03*/

    /* Allocate array of pointers to caller's variables for returning
     * lengths of actual column values.  These will be set in pupidfc or
     * pupidfn. Not done for INSERT...SELECT statements.
     */
    if (!(pqdef->flags & QDSP_QDEF_INSERT_SELECT))
    {
        pbb->root.plenptrs =
            (ub2 **)qdrt_malloc(sizeof(ub2 *) * ppcur->pselect_desc->N);
    }
    ppcur->plenptrs = pbb->root.plenptrs;

    if (QDFAILED)
        goto error_return;
```

128

Sep 20 1993 13:38:13 qdcp_prep.c Page 19

```
    /* If aggregation (or a having clause) is required, create an aggregate
     * building block.
     */
    if (pqry->pcq_text != NULL) /* There is a combining query */
    {
#ifdef CQ_PROJECTS_DIRECT_TO_CALLER_BUFFERS
        /* The root bb will use the descriptor of the original input
         * query as its input buffer descriptor (because rows coming out
         * of the aggr bb are a combination of CQ and PSQ columns, so
         * they might as well be formatted like the final output buffer).
         * The aggr bb will use this same descriptor as its output
         * descriptor.  The V and I arrays of this descriptor will be
         * set to point into the root's input buffer by qdbb_root, so
         * at this point, free the original V and I arrays allocated
         * by sqlald().
         */
        if (!(pqdef->flags & QDSP_QDEF_INSERT_SELECT))
        {
            pparent->root.pin_desc = pparent->root.pout_desc;
            free(pparent->root.pout_desc->V);
            pparent->root.pout_desc->V = NULL;
            free(pparent->root.pout_desc->I);
            pparent->root.pout_desc->I = NULL;
        }
#else /* CQ_PROJECTS_DIRECT_TO_CALLER_BUFFERS */

        /* Create input descriptor for root.  This starts out identical
         * to the root's output descriptor, but the input descriptor
         * will be fixed up so its V and I arrays are in a self-describing
         * buffer, which will be used to receive rows from the aggregate
         * BB, whereas the output descriptor will get fixed up at the pupi
         * level to point to actual user buffers.
         */
        if (!(pqdef->flags & QDSP_QDEF_INSERT_SELECT))
        {
            pbb->root.pin_desc = qdcp_desc_qry(QDCP_DESC_SELECT,
                                               ppcur->pinput_qry,
                                               pqry->niq_cols);
            if (QDFAILED)
                goto error_return;

            /* We won't need to V and I arrays allocated for this
             * descriptor, so free them now.
             */
            free(pparent->root.pin_desc->V);
            pparent->root.pin_desc->V = NULL;
            free(pparent->root.pin_desc->I);
            pparent->root.pin_desc->I = NULL;
        }
#endif /* CQ_PROJECTS_DIRECT_TO_CALLER_BUFFERS */

        /* Fix up the descriptor, and allocate buffer with this format,
         * to serve as root input buffer / aggr output buffer.
         * (This might become obsolete if the aggr can project direct
         * to user buffers, which remains tbd.)
         * Pass TRUE value for chr_to_str parameter, causing DTYCHR to
         * be changed to DTYSTR (see discussion inside alloc_buffers comments).
         */
        if (!(pqdef->flags & QDSP_QDEF_INSERT_SELECT))
            alloc_buffers(ppcur->pbtt + pparent->root.in_bufnum, NULL,
                &bufsize, pparent->root.pin_desc, NULL, NULL, 0, TRUE);

        pbb = (QDBB_UNION *)qdrt_malloc(sizeof(QDBB_AGGR));
        if (QDFAILED)
            goto error_return;
        pbb->check = QDCK_AGGR;
        pbb->hdr.pfunc = qdbb_aggr;
        if (pqry->flags & QDSP_QRY_PSQ_INSERT_TO_IT)
            pbb->hdr.flags |= QDBB_PSQ_INSERT_TO_IT;      /*%09*/
        if (pqdef->flags & QDSP_QDEF_INSERT_SELECT)
            pbb->hdr.flags |= QDBB_CQ_INSERT_SELECT;
        pparent->root.pchild = pbb;
        pbb->aggr.pcq_text = pqry->pcq_text;
```

Sep 20 1993 13:38:13 qdcp_prep.c Page 20

```
        pbb->aggr.pcts_text = pqry->pcts_text;
        pbb->aggr.pdts_text = pqry->pdts_text;
        pbb->aggr.pis_text = pqry->pis_text;
        pbb->aggr.pds_text = pqry->pds_text;
        pbb->aggr.out_bufnum = next_bufnum++;
        pbb->aggr.in_bufnum = next_bufnum;
        pbb->aggr.ncq_cols = pqry->ncq_cols;
        pbb->aggr.ncq_groupcol_refs = pqry->ncq_groupcol_refs;

        /* Set number of columns in intermediate table, and fill
         * array of column numbers of psq columns which will be inserted
         * into intermediate table.  (Allocate long enough array so that
         * trailing portion can serve as pout_colnums array and
         * pbv_colnums array, to avoid unecessary memory fragmentation)
         */
        pbb->aggr.nit_cols = pqry->nit_cols;
        pbb->aggr.pin_colnums =
            (ub2 *)qdrt_malloc(sizeof(ub2) * (pqry->nit_cols +
                                              pqry->niq_cols +
                                              pqry->ncq_groupcol_refs));
        for (i = 0, j = 0; i < pqry->ncolmap_entries; i++)
        {
            if (pqry->pcolmap[i].flags & QDCP_COL_IT)
                pbb->aggr.pin_colnums[j++] = pqry->pcolmap[i].psq_colnum;
        } /* for each column */

        /* Set pointer to psq select descriptor, which describes incoming
         * rows, and iq select descriptor, which describes outgoing rows.
         */
        pbb->aggr.pin_desc = pqry->ppsq_select_desc;
        pbb->aggr.pout_desc = pparent->root.pin_desc;

        /* If CQ is not an INSERT statement... */
        if (!(pbb->hdr.flags & QDBB_CQ_INSERT_SELECT))
        {
            /* Set pointer to output lengths array */
            pbb->aggr.plenptrs = pparent->root.plenptrs;            /*%04*/

            /* Set pointer to array of output column numbers.  Index into
             * this array by output buffer column number, to find cq column
             * number or inbuf column number which gets transferred to that
             * output buffer column.  The bit QDBB_GROUPCOL_FLAG is set in
             * column numbers that refer to the input buffer rather than
             * to CQ columns.
             * (NOTE that this code is made more complex to handle a legal
             * but not very useful special case: select <table>.*, <aggregate>
             * group by <all columns of table>.
             * In this case, the group-by columns don't have the COL_PSQ or
             * COL_IQ flags set in their colmap entries, since they weren't
             * explicitly specified in the IQ select list and are expanded as
             * part of '*' in the PSQ select list.  Instead, they have the
             * flag COL_IQ_IN_STAR set, to indicate that they ARE in the IQ
             * select list, hidden in a '*' reference.)
             */
            pbb->aggr.pout_colnums =
                pbb->aggr.pin_colnums + pbb->aggr.nit_cols;
            for (i = 0; i < pbb->aggr.pout_desc->N; i++)
            {
                /* If query has both GROUP-BY and ORDER-BY clauses, the
                 * CQ columns map directly to the IQ columns.  %09
                 */
                if (pqry->flags & QDSP_QRY_GROUP_AND_ORDER)
                    pbb->aggr.pout_colnums[i] = i;
                else for (j = 0; j < pqry->ncolmap_entries; j++)
                {
                    if ((pqry->pcolmap[j].flags &
                         (QDCP_COL_IQ | QDCP_COL_IQ_IN_STAR)) &&
                        !(pqry->pcolmap[j].flags & QDCP_COL_STAR) &&
                        pqry->pcolmap[j].iq_colnum == i)
                    {
                        if (pqry->pcolmap[j].flags & QDCP_COL_CQ)
                            pbb->aggr.pout_colnums[i] =
                                pqry->pcolmap[j].cq_colnum;
```

129

```
                    else if (pqry->pcolmap[j].flags &
                            (QDCP_COL_PSQ | QDCP_COL_IQ_IN_STAR))
                        pbb->aggr.pout_colnums[i] =
                            (pqry->pcolmap[j].psq_colnum |
                             QDBB_GROUPCOL_FLAG);
                    break;
                }
            } /* for each colmap entry */
        } /* for each output buffer column */
    } /* If CQ is not an INSERT statement */

    pparent = pbb;
} /* if there is a combining query */

#ifdef USE_GROUP_BB
    /* If there is grouping, create a group pnode */
    if (pqry->ngroupcols) /* There is grouping */
    {
        pbb = (QDBB_UNION *)qdrt_malloc(sizeof(QDBB_GROUP));
        if (QDFAILED)
            goto error_return;
        pbb->check = QDCK_GRUP;
        pbb->hdr.pfunc = qdbb_group;
        pbb->group.io_bufnum = next_bufnum++;
        pbb->group.prev_bufnum = next_bufnum;
        if (pparent->check == QDCK_ROOT)
            pparent->root.pchild = pbb;
        else
            pparent->aggr.pchild = pbb;
        pparent = pbb;
    } /* if there is grouping */
#endif /* USE_GROUP_BB */

    /* Create multiplexer node */

    pbb = (QDBB_UNION *)qdrt_malloc(sizeof(QDBB_MPLEX) +
                                    ((ppcur->num_psqs *
                                      sizeof(QDBB_MPLEX_CHILD)) -
                                     sizeof(pbb->mplex.children)));
    if (QDFAILED)
        goto error_return;
    pbb->mplex.nchildren = ppcur->num_psqs;

    /* If appropriate, flag mplex indicating query is INSERT/SELECT
     * with no aggregation, so mplex knows to tally up the oercnt's
     * of the subcursors.
     */
    if ((pqdef->flags & QDSP_QDEF_INSERT_SELECT)
        && !pqry->pcq_text)
        pbb->hdr.flags |= QDBB_PSQ_INSERT_SELECT;

    /* If there is grouping, ordering, or SELECT DISTINCT,
     * this will be a merge-type multiplexer, else a union-all type.
     */
    if (pqry->ngroupcols || pqdef->nordcols ||
        (pqry->flags & QDSP_QRY_DISTINCT))
    {
        pbb->check = QDCK_MERG;

        /* If there is aggregation, then the mplex must perform the
         * grouping function.
         */
        if (pqry->pcq_text != NULL) /* There is a combining query */
            pbb->mplex.flags |= QDBB_MPLEX_GROUP;

        /* If there's grouping without aggregation, or SELECT DISTINCT,
         * perform the 'distincting' function.
         */
        else if (pqry->ngroupcols || (pqry->flags & QDSP_QRY_DISTINCT))
            pbb->mplex.flags |= QDBB_MPLEX_DISTINCT;

        /* Create array of order column definitions.  If there is grouping,
         * these will actually be the grouping columns; else they will be
```

```
         * the order-by columns.
         */
        pbb->mplex.nordcols = ((pqry->flags & QDSP_QRY_DISTINCT) ?
                               pqry->npsq_cols :
                              (pqry->ngroupcols ? pqry->ngroupcols :
                               pqdef->nordcols));

        pbb->mplex.pordcols =
            (QDBB_MPLEX_ORDCOL *)qdrt_malloc(sizeof(QDBB_MPLEX_ORDCOL)
                                             * pbb->mplex.nordcols);
        if (QDFAILED)
            goto error_return;
        for (i = 0; i < pbb->mplex.nordcols; i++)
        {
            if (pqry->ngroupcols)
            {
                pbb->mplex.pordcols[i].colnum =
                    pqry->pcolmap[pqry->pgroupby[i].colmap_index]
                        .psq_colnum;
            }
            /* If there's no group-by, we're either collecting ORDER BY
             * columns, or all columns for DISTINCT, or both.  If we're
             * still within the number of ORDER BY columns, we're collecting
             * ORDER-BY columns.
             */
            else if (i < pqdef->nordcols)
            {
                pbb->mplex.pordcols[i].colnum =
                    pqry->pcolmap[pqdef->pordcols[i].colmap_index]
                        .psq_colnum;
                if (pqdef->pordcols[i].direction == QDCK_DESC)
                    pbb->mplex.pordcols[i].flags |= QDBB_ORDCOL_DESC;
            }
            /* If there's no order-by, we must be collecting all columns
             * in order, for distinct.
             */
            else if (pqdef->nordcols == 0)
            {
                pbb->mplex.pordcols[i].colnum = i;
            }
            /* Otherwise, there's both DISTINCT and ORDER-BY, and we've
             * already collected all the ORDER-BY columns, so now we have
             * to collect all the remaining columns which weren't ORDER-BY
             * columns.
             */
            else
            {
                /* Find lowest column number which isn't already in
                 * pordcols.
                 */
                for (j = 0; j < pbb->mplex.nordcols; j++)
                {
                    for (k = 0; k < i; k++)
                        if (pbb->mplex.pordcols[k].colnum == j)
                            break;
                    if (k >= i) /* j hasn't been used yet */
                    {
                        pbb->mplex.pordcols[i].colnum = j;
                        break;
                    }
                }
            } /* else */
        } /* for each ordering column */

        pbb->mplex.firchild = QDBB_CHILD_NOSUCC;
        pbb->mplex.pdesc = pqry->ppsq_select_desc;

    } /* if this is a merge multiplexer */
    else
        pbb->check = QDCK_UALL;

    pbb->hdr.pfunc = qdbb_mplex;

    if (pparent->check == QDCK_ROOT)
```

```
    {
        pbb->mplex.out_bufnum = next_bufnum++;
        pparent->root.pchild = pbb;
    }
    else if (pparent->check == QDCK_AGGR)
    {
        pbb->mplex.out_bufnum = next_bufnum++;
        pparent->aggr.pchild = pbb;
    }
#ifdef USE_GROUP_BB
    else
    {
        pbb->mplex.out_bufnum = next_bufnum - 1;
        next_bufnum++;
        pparent->group.pchild = pbb;
    }
#endif /* USE_GROUP_BB */

    pparent = pbb;

    /* For each parallel subquery, create exchange bb and subcursor bb.
    */
    for (i = 0; i < ppcur->num_psqs;
         i++, next_bufnum ++)
    {
        pbb = (QDBB_UNION *)qdrt_malloc(sizeof(QDBB_EXCHANGE) +
                    (sizeof(text *) * (QDpcom->num_fa_bufs - 1))); /*%01*/
        if (QDFAILED)
            goto error_return;
        pbb->check = QDCK_EXCH;
        pbb->hdr.pfunc = qdbb_exchange;
        pbb->exchange.child_num = i + 1;
        pbb->exchange.ppcursor = ppcur;

        /* If appropriate, flag exchange indicating query is INSERT/SELECT
         * with no aggregation, so after this exchange pulls its child
         * for OPEN, it will wait until requested to pull child for COMMIT.
         */
        if ((pqdef->flags & QDSP_QDEF_INSERT_SELECT)
            && !pqry->pcq_text)
            pbb->hdr.flags |= QDBB_PSQ_INSERT_SELECT;

        /* If this is the first child of mplex, set flags for it to
         * initialize barriers.
         */
        if (i == 0)
            pbb->hdr.flags |= (QDBB_MASTER_INIT_OPEN |
                               QDBB_MASTER_INIT_CLOSE);

        /* If this is the last child of mplex, set flags for it to
         * wait on barrier on master side.
         */
        if (i + 1 == ppcur->num_psqs)
            pbb->hdr.flags |= (QDBB_MASTER_WAIT_OPEN |
                               QDBB_MASTER_WAIT_CLOSE);

        /* All children of mplex should wait on the slave side of the
         * barrier.
         */
        pbb->hdr.flags |= (QDBB_SLAVE_WAIT_OPEN | QDBB_SLAVE_WAIT_CLOSE);

        pparent->mplex.children[i].pchild = pbb;

        /* Set the buffer number of this child's return buffer, both in
         *  parent and child.
         */
        pparent->mplex.children[i].bufnum = next_bufnum;
        pbb->exchange.out_bufnum = next_bufnum;

        /* Allocate fetch-ahead buffers for this exchange bb,
         * unless PSQ inserts directly into combining table, %09
         * or unless this is an INSERT...SELECT statement for which
```

```
         * PSQ does the insert.
         */
        if (!( (pqry->flags & QDSP_QRY_PSQ_INSERT_TO_IT) ||  /* %09 */
               ((pqdef->flags & QDSP_QDEF_INSERT_SELECT) &&
                !pqry->pcq_text)))
                                                      /* %09 */
        {
            pbb->exchange.nbuffers = QDpcom->num_fa_bufs;
            for (j = 0; j < QDpcom->num_fa_bufs; j++)
            {
                alloc_buffers(pbb->exchange.btt + j, ppattern,   /*%01*/
                              &bufsize, pqry->ppsq_select_desc,
                              &arraybufsize, &pafpattern, pqdef->array_size,

                              /* If there's no combining query, we want
                               * to change DTYCHR to DTYSTR, so pass TRUE
                               * value for chr_to_str.  Else, leave DTYCHR
                               * alone, or HAVING clause in combining
                               * query won't work right on character columns
                               * due to blank-padding.
                               */
                              (pqry->pcq_text == NULL) );

                if (ppattern == NULL)
                    ppattern = pbb->exchange.btt[0];              /*%01*/
            }
            if (QDFAILED)
                goto error_return;
        } /* %09 */

        pbb = (QDBB_UNION *)qdrt_malloc(sizeof(QDBB_SUBCUR));
        if (QDFAILED)
            goto error_return;
        pbb->check = QDCK_SUBC;
        pbb->hdr.pfunc = qdbb_subcur;
        if (pqry->flags & QDSP_QRY_PSQ_INSERT_TO_IT)
            pbb->hdr.flags |= QDBB_PSQ_INSERT_TO_IT;      /*%09*/
        else if ((pqdef->flags & QDSP_QDEF_INSERT_SELECT)
                 && !pqry->pcq_text)
            pbb->hdr.flags |= QDBB_PSQ_INSERT_SELECT;
        pbb->subcur.child_num = i + 1;
        pbb->subcur.pcnx = &(QDpcom->cnx);
        pbb->subcur.ppsq_text = pqry->ppsq_text;
        pbb->subcur.rowid_posit = pqry->rowid_posit;                  /*%07*/
        pbb->subcur.arraybuf_size = arraybufsize;
        pbb->subcur.pafpattern = pafpattern;
        pbb->subcur.array_size = pqdef->array_size;
        pbb->subcur.array_threshold = pqdef->array_threshold;
        pparent->mplex.children[i].pchild->exchange.pchild = pbb;

        /* Assign low and high partition file id's for this subcursor
         * If the number of subqueries does not divide evenly into the
         * number of files, leaving remainder N, assign 1 extra file to
         * the first N subqueries.
         */
        if (pqry->pparfids == NULL)
        {
            /* File is not partitioned.  We wouldn't really decompose
             * this query, but for testing purposes, let's not crash.
             */
            pbb->subcur.low_parfid = 0;
            pbb->subcur.high_parfid = 0xffff;
        }
        else
        {
            pbb->subcur.low_parfid = pqry->pparfids[next_fid];
            next_fid += fids_per_q;
            if (extra_fids)
            {
                next_fid++;
                extra_fids--;
            }

            if (next_fid >= pqry->nparfids)
```

131

```
            pbb->subcur.high_parfid =
                pqry->pparfids[pqry->nparfids - 1] + 1;
        else
            pbb->subcur.high_parfid =
                pqry->pparfids[next_fid];
    }

    /* Attach PSQ select and bind descriptors to subcur bb.
     * Each subcursor needs a separate copy of each main descriptor
     * structure, so it can replace the array of pointer to buffers
     * with an array of pointers into the appropriate fetch-ahead
     * buffer for each fetch, without effecting other subcursors.
     * The other arrays (of types, lengths, etc.) can be shared.
     * If this is the first subcursor bb, use the copies of the
     * main descriptors which already exists; else, allocate a new
     * copy.
     * Also attach a copy of the select descriptor to the root bb.
     * (NOTE: For aggregated queries, this descriptor goes on
     * aggregate bb, and a descriptor of the combining queries goes
     * on the root.)
     */
    if (i == 0)
    {
        pbb->subcur.ppsq_bind_desc = pqry->ppsq_bind_desc;
        pbb->subcur.ppsq_select_desc = pqry->ppsq_select_desc;

        if (pqry->pcq_text == NULL) /* No aggregation */
        {
            ppcur->pctree->root.pin_desc = (SQLDA *)
                qdrt_malloc(sizeof(SQLDA));
            if (QDFAILED)
                goto error_return;
            memcpy(ppcur->pctree->root.pin_desc,
                   pqry->ppsq_select_desc, sizeof(SQLDA));
        }
    }
    else
    {
        /* There won't be a psq select descriptor if the psq
         * inserts directly into the intermediate table.
         */
        if (!(pqry->flags & QDSP_QRY_PSQ_INSERT_TO_IT) &&      /*%09*/
            !(pbb->hdr.flags & QDBB_PSQ_INSERT_SELECT))
        {
            pbb->subcur.ppsq_select_desc = (SQLDA *)
                qdrt_malloc(sizeof(SQLDA));
            if (QDFAILED)
                goto error_return;
            memcpy(pbb->subcur.ppsq_select_desc,
                   pqry->ppsq_select_desc, sizeof(SQLDA));
        }                                                      /*%09*/
        pbb->subcur.ppsq_bind_desc = (SQLDA *)
            qdrt_malloc(sizeof(SQLDA));
        if (QDFAILED)
            goto error_return;
        memcpy(pbb->subcur.ppsq_bind_desc,
               pqry->ppsq_bind_desc, sizeof(SQLDA));
    }

  } /* for each parallel subquery */

error_return:
    QDEND;
    return QD_STATUS;
} /* pcurgen */


/* alloc_buffers - allocate a "self-describing"
 * buffer suitable for receiving rows from a cursor.  The buffer
 * contains an array of pointers to data values, followed by an array
 * of pointers to indicator values, followed by space for the actual
 * data values and indicators.
 * This routine also modified the types and lengths of descriptor items,
```

```
 * when necessary, from internal to external types (see p. 4-14 in Pro*C
 * Supplement).
 * Note: this design, in which the descriptor is fixed up, and buffers
 * set up, at decompose time rather than first-fetch time, does not allow
 * the user to specify different datatypes and lengths at fetch time, unless
 * we perform further conversions farther up the tree.  But in general we'll
 * need to do that anyway, since the user can specify different types and
 * sizes for each fetch, if the user is sufficiently perverse.
 *
 * If multiple identical buffers are needed, pass the first buffer created
 * as 'ppattern' to subsequent calls, and set pbufsize to point to the
 * size of that buffer.  The descriptor is only "fixed up" on the first call,
 * i.e. when ppattern is null.
 *
 * NOTE: We may need an oerdef structure (containing various status info)
 * in each buffer, so that particular status info associated with a given
 * row can stay with that row as it passes up the tree.  If so, this could
 * either go at the beginning, or it could follow the two arrays of pointers,
 * or it could follow the data.  The first way makes it easiest to find, but
 * would require changing all the current code that assume that the V pointer
 * array comes first.
 * ARRAY FETCH SUPPORT: If array_size is non-zero, it specifies the number of
 * array elements used for array fetch.  Allocate a pattern for later
 * creation of self-describing array fetch buffer, set ppafpattern to point
 * to it.  Pattern consists of array of offsets of each columns data arrays,
 * follows by array of offsets of each column's indicator arrays.  Set
 * *pafbufsize to the size needed for the actual array fetch buffers when
 * they are allocated later.
 *
 * NOTE about DTYCHR and DTYSTR: Where the type of a column is DTYCHR,
 * if the boolean parameter chr_to_str is set to true, then the type
 * is changed here to DTYSTR, and length is increased by 1 to allow for
 * the zero terminator.  This is done to facilitate emulating ORACLE's
 * behavior regarding trailing blanks.  In general ORACLE leaves trailing
 * blanks, but for certain expressions (e.g. TO_CHAR) they are truncated.
 * For a complex example, the expression "to_char(datecol, 'YY') || ' '"
 * ends up with 1 trailing blank, because the trailing blanks of the
 * TO_CHAR function are truncated, but the blank appended by the concatenate
 * operator is not.  If we retrieve character expressions as DTYCHR, we
 * can't tell the difference.  By using DTYSTR, we get ORACLE to zero-
 * terminate the string at the length it considers correct.  When
 * returning the value to a program which cares about the actual length
 * (like sqlplus), we can set the output length based on strlen of the
 * returned value (this is done in qdbb_project, as a special case when
 * projecting from DTYSTR to DTYSTR).
 */
static QDSTATUS alloc_buffers(ppbuf, ppattern, pbufsize, pdesc,
                              pafbufsize, ppafpattern, array_size, chr_to_str)
reg1 text **ppbuf;              /* Return buffer to this pointer */
reg2 text *ppattern;            /* If non-null, pattern the buffer after this */
                                /*  buffer; else, use descriptor */
reg3 word *pbufsize;            /* Pointer to variable for recording buffer */
                                /*  size (output parm if ppattern is null, else */
                                /*  input parm) */
reg4 struct SQLDA *pdesc;       /* Select descriptor for a cursor - */
                                /*  create buffers to receive rows from this */
                                /*  cursor. */
reg15 word *pafbufsize;         /* O: pointer to size of array fetch buffer */
word **ppafpattern;             /* O: pointer to a pointer which should be set */
                                /*  to point to the array fetch buffer pattern */
                                /*  allocated by this routine */
word array_size;
int chr_to_str;                 /* If TRUE, change type DTYCHR to DTRYSTR. */
{
    reg5 text **pvalptrs;       /* Pointer into array of value pointers at */
                                /*  start of each buffer */
    reg6 text **pindptrs;       /* Pointer into array of indicator pointers, */
                                /*  which follows values pointers aray in each */
                                /*  buffer */
    reg7 text *pvals;           /* Pointer into values (and indicators) portion */
                                /*  of buffer, used to keep track of where the */
                                /*  next item will be stored */
    reg8 word i;                /* Loop index */
```

132

```
reg13 word bufdif;          /* Difference in address of two buffers */
reg14 word len;             /* Length of a value */
b2 type;                    /* Datatype extracted from a descriptor element */
word precision;             /* Precision extracted from descriptor element */
word scale;                 /* Scale extracted from descriptor element */
word nullallowed;           /* Null-allowed boolean extracted from */
                            /*  a descriptor element */
word *pafvaloffs;           /* Pointer to array of array-fetch value offsets */
word *pafindoffs;           /* Pointer to array of array-fetch indicator */
                            /*  offsets */
word af_size;               /* Size of a column element, for computing array */
                            /*  fetch buffer size */
word af_align;              /* Alignment requirement of a column element, */
                            /*  for computing array fetch buffer size */
word indsize = 0;           /* Size needed to hold indicators (2 bytes each) */

extern SQLDA *sqlald();
extern sqlprc();
extern sqlnul();
extern sqlclu();

QDBEGIN("alloc_buffers");
/* If ppattern is NULL, we are creating the first buffer for any
 * subquery of this query, so we need to process the select descriptor.
 */
if (ppattern == NULL)
{
    /* Initialize bufsize to allow for the two arrays of pointers, each
     * containing one pointer per select list item.
     */
    *pbufsize = pdesc->N * 2 * sizeof(text *);

    if (array_size)
    {
        /* Initialize size of array-fetch buffer to size needed for
         * V and I arrays.
         */
        *pafbufsize = *pbufsize;

        /* Allocated array-fetch pattern, set pointers to arrays of
         * array-fetch value offsets and indicator offsets within the
         * pattern.
         */
        *ppafpattern = (word *)qdrt_malloc(pdesc->N * 2 * sizeof(word));
        if (QDFAILED)
            goto error_return;
        pafvaloffs = (*ppafpattern);
        pafindoffs = pafvaloffs + pdesc->N;
    }

    /* Make a first pass through the descriptor, to compute buffer size,
     * and fix up data lengths from internal to external where necessary.
     * Don't fix up datatype yet, or we'll lose the null-allowed bit which
     * we still need on the second pass to know whether to set an indicator
     * pointer.
     */
    for (i = 0; i < pdesc->N; i++)
    {
        /* Get type attributes for current element */
        /* (See ORACLE Precompilers Pro*C Supplement Chapter 4) */
        sqlnul(pdesc->T + i, &type, &nullallowed);
        sqlprc(pdesc->L + i, &precision, &scale);
        switch (type)
        {
          case DTYNUM:
            /* Convert numbers with non-zero scale or
             *  unspecified precision to float
             */
            if (scale || !precision)
            {
                *pbufsize += sizeof(QD_WIDEST_FLOAT);

                /* If necessary, align to 8 byte boundary */
```

```
                if (*pbufsize % sizeof(QD_WIDEST_FLOAT))
                    *pbufsize += (sizeof(QD_WIDEST_FLOAT) -
                                 (*pbufsize % sizeof(QD_WIDEST_FLOAT)));

                af_size = sizeof(QD_WIDEST_FLOAT);
                af_align = sizeof(QD_WIDEST_FLOAT);
            }
            else        /* Convert number with zero scale to integer */
            {
                *pbufsize += sizeof(word);

                /* If necessary, align to 4 byte boundary */
                /* NOTE: This should really be done more generically */
                if (*pbufsize % 4)
                    *pbufsize += (4 - (*pbufsize % 4));

                af_size = sizeof(word);
                af_align = sizeof(word);
            }
            break;
          case DTYDAT: /* Convert dates to default char format */
            *pbufsize += 9;
            break;
            af_size = 9;
            af_align = 0;
          case DTYLNG:  /* Set an (arbitrary) maximum length for LONGs */
          case DTYLBI:  /*  and LONG RAW */
            *pbufsize += QD_MAX_ORA_LONG;
            af_size = QD_MAX_ORA_LONG;
            af_align = 0;
            break;
          case DTYRID: /* Convert rowid to char, add 2 to length */
                       /*  for dots */
            *pbufsize += QD_ROWID_STRING_LENGTH;
            af_size = QD_ROWID_STRING_LENGTH;
            af_align = 0;
            break;
          case DTYBIN: /* Convert raw to char, with same length */
            *pbufsize += pdesc->L[i];
            af_size = pdesc->L[i];
            af_align = 0;
            break;
          case DTYCHR: /* If chr_to_str is true, then add 1 to length, */
                       /* for zero terminator */
          case DTYAFC: /* ORACLE 7.0.12: char columns look like DTYAFC */
            if (chr_to_str)
            {
                *pbufsize += pdesc->L[i] + 1;
                af_size = pdesc->L[i] + 1;
            }
            else
            {
                *pbufsize += pdesc->L[i];
                af_size = pdesc->L[i];
            }
            af_align = 0;
            break;
          default:
            QDFAIL(QD_CP_UNRECOGNIZED_DATATYPE);
            goto error_return;
            break;
        };

        if (array_size)
        {
            if (af_align && (*pafbufsize % af_align))
                *pafbufsize += (af_align - (*pafbufsize % af_align));
            pafvaloffs[i] = *pafbufsize;
            *pafbufsize += (af_size * array_size);
            if (nullallowed)
                *pafbufsize += (sizeof(ub2) * array_size);
        }
        /* If an indicator is needed, add its length to length of buffer.
```

133

Sep 20 1993 13:38:13 qdcp_prep.c Page 29

```
        * Tally these lengths separately, since indicators will follow
        * data values; otherwise we screw up the alignment
        * computations above for numeric types.
        */
       if (nullallowed)
           indsize += sizeof(ub2);
   } /* first loop through descriptor */

   /* If bufsize is odd, add 1, so indicators will start at an even
    * boundary.
    */
   if (*pbufsize % 2)
       *pbufsize += 1;

   /* Add size of indicators to required buffer size. */
   *pbufsize += indsize;

   /* Now that we know the necessary size,
    * allocate the first buffer.
    */
   *ppbuf = (text *)qdrt_malloc(*pbufsize);
   if (QDFAILED)
       goto error_return;

   /* Make a second pass through the descriptor.  Set pointers to value
    * buffers.
    */

   pvalptrs = (text **)(*ppbuf);
   pindptrs = pvalptrs + pdesc->N;
   pvals = (text *)(pindptrs + pdesc->N);

   for (i = 0; i < pdesc->N; i++)
   {
       /* Get type attributes for current element */
       /* (See ORACLE Precompilers Pro*C Supplement Chapter 4) */
       sqlnul(pdesc->T + i, &type, &nullallowed);
       sqlprc(pdesc->L + i, &precision, &scale);
       len = pdesc->L[i];

       switch (type)
       {
         case DTYNUM:
           /* Convert numbers with non-zero scale or
            *  unspecified precision to float
            */
           if (scale || !precision)
           {
               len = sizeof(QD_WIDEST_FLOAT);

               /* Align value pointer if necessary */
               if ((ptrdiff_t)pvals % sizeof(QD_WIDEST_FLOAT))
                   pvals += (sizeof(QD_WIDEST_FLOAT)
                            - ((ptrdiff_t)pvals %
                               sizeof(QD_WIDEST_FLOAT)));
           }
           else        /* Convert number with zero scale to integer */
           {
               len = sizeof(word);

               /* Align value pointer if necessary */
               /* NOTE: This should really be done more generically */
               if ((ptrdiff_t)pvals % 4)
                   pvals += (4 - ((ptrdiff_t)pvals % 4));
           }
           break;
         case DTYDAT: /* Convert dates to default char format */
           len = 9;
           break;
         case DTYLNG:  /* Set an (arbitrary) maximum length for LONGs */
         case DTYLBI:  /*  and LONG RAW */
           len = QD_MAX_ORA_LONG;
           break;
```

Sep 20 1993 13:38:13 qdcp_prep.c Page 30

```
         case DTYRID: /* Convert rowid to char, add 2 to length */
                      /*  for dots */
           len = QD_ROWID_STRING_LENGTH;
           break;
         case DTYBIN: /* Convert raw to char, with same length */
           break;
         case DTYCHR: /* If chr_to_str is true, then add 1 to length */
                      /* for zero terminator */
         case DTYAFC: /* ORACLE 7.0.12: char columns look like DTYAFC */
           if (chr_to_str)
               len++;
           break;
         default:
           break;
       };
       /* Set pointers to value and indicator for this column */

       *pvalptrs++ = pvals;
       pvals += len;

   } /* second loop through descriptor */

   /* Make a third pass through buffer to set indicator pointers,
    * and fixup datatype and length in descriptor (this couldn't be
    * done in a previous pass, or we'd lose nullallowed flag and
    * scale.)
    * Indicator values are placed all at the end, instead of
    * being interspersed with data items, so at most one byte is
    * wasted to make them properly aligned)
    */
   if ( ((ptrdiff_t)pvals) % 2)
       pvals++;

   /* This applies to array-fetch indicators as well. */
   if (array_size)
       if (*pafbufsize % 2)
           (*pafbufsize)++;

   for (i = 0; i < pdesc->N; i++)
   {
       /* Extract null-allowed flag for this column */
       sqlnul(pdesc->T + i, &type, &nullallowed);
       sqlprc(pdesc->L + i, &precision, &scale);
       switch (type)
       {
         case DTYNUM:
           /* Convert numbers with non-zero scale or
            *  unspecified precision to float
            */
           if (scale || !precision)
           {
               pdesc->L[i] = sizeof(QD_WIDEST_FLOAT);
               type = DTYFLT;
           }
           else        /* Convert number with zero scale to integer */
           {
               pdesc->L[i] = sizeof(word);
               type = DTYINT;
           }
           break;
         case DTYDAT: /* Convert dates to default char format */
           pdesc->L[i] = 9;
           type = DTYCHR;
           break;
         case DTYLNG:  /* Set an (arbitrary) maximum length for LONGs */
         case DTYLBI:  /*  and LONG RAW */
           pdesc->L[i] = QD_MAX_ORA_LONG;
           type = DTYCHR;
           break;
         case DTYRID: /* Convert rowid to char, add 2 to length */
                      /*  for dots */
           pdesc->L[i] = QD_ROWID_STRING_LENGTH;
           type = DTYCHR;
```

134

```
            break;
          case DTYBIN: /* Convert raw to char, with same length */
            type = DTYCHR;
            break;
          case DTYCHR: /* If chr_to_str is true, then
                       /* convert char to str, so qdbb_project can use */
                       /* strlen to determine actual value length.     */
                       /* add 1 to length for zero terminator.         */
          case DTYAFC: /* ORACLE 7.0.12: char columns look like DTYAFC */
            if (chr_to_str)
            {
                (pdesc->L[i])++;
                type = DTYSTR;
            }
            break;
          default:
            break;
        };
        /* Reset type attribute for column */
        pdesc->T[i] = type;

        if (nullallowed)
        {
            *pindptrs++ = pvals;
            pvals += sizeof(ub2);
        }
        else
            *pindptrs++ = (text *)NULL;

        if (array_size)
        {
            if (nullallowed)
            {
                pafindoffs[i] = *pafbufsize;
                *pafbufsize += (sizeof(ub2) * array_size);
            }
            else
                pafindoffs[i] = 0;
        }

    } /* third loop through descriptor */
  } /* if ppattern is null */

  /* Once we've created the first buffer, the additional buffers can
   * simply be copies of the first, in which we fix up the pointers
   * by subtracting off the address of the original buffer and adding
   * on the address of the new buffer (except for NULL indicator pointers,
   * which should be left NULL).
  */
  else
  {
      *ppbuf = (text *)qdrt_malloc(*pbufsize);
      if (QDFAILED)
          goto error_return;
      memcpy(*ppbuf, ppattern, pdesc->N * sizeof(text *) * 2);

      pvalptrs = (text **)(*ppbuf);
      pindptrs = pvalptrs + pdesc->N;
      pvals = (text *)(pindptrs + pdesc->N);

      bufdif = *ppbuf - ppattern;

      for (; pvalptrs < pindptrs; pvalptrs++)
          *pvalptrs += bufdif;

      for (; pindptrs < (text **)pvals; pindptrs++)
          if (*pindptrs != (text *)NULL)
              *pindptrs += bufdif;
  } /* loop to create additional buffers */

error_return:
    QDEND;
    return QD_STATUS;
```

```
} /* alloc_buffers */
```

Dec 13 1993 10:59:39 qdcp_qgen.c Page 1

```
/****************************************************************************
 * qdcp_qgen - Generate parallel subquery or combining query
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV  DATE      AUTHOR  DESCRIPTION
 * ---  --------  ------  -----------------------------------------------
 * %07  11/08/93  AS      Support correlated subquery aggregates
 * %06  10/04/93  AS      Call QDRESET after call to qdsp_colqry
 * %05  08/16/93  EYT     Call to qdrt_free sets pointer=NULL
 * %04  07/30/93  EYT     Don't free pcorrelref if already freed
 * %03  03/08/92  JM      Support GROUP-BY/ORDER-BY queries
 * %02  10/15/92  EYT     Define rowid host var names in qdstd.h
 * %01  09/25/92  EYT     Compute number of bind variables
 * %00  10/11/91  JM      Initial Version
 ****************************************************************************
 */

#include <qdstd.h>
#include <qdspext.h>
#include <qdcpext.h>
#include <qdrtext.h>
#include <qderrs.h>
#include <qdtstext.h>
#include <dtydef.h>

/* local routines */
static text *print_expr(
#ifdef __STDC__
ub4, QDSP_QDEF *, QDSP_QRY *, QDSP_EXPR *, text *
#endif /* __STDC__ */
); /* print_expr */

static text *print_expr_list(
#ifdef __STDC__
ub4, QDSP_QDEF *, QDSP_QRY *, QDSP_EXPR *, text *
#endif /* __STDC__ */
); /* print_expr_list */

static text *growbuf(
#ifdef __STDC__
text *
#endif /* __STDC__ */
); /* growbuf */

static QDSP_EXPR * search_for_common_aggr_expr(
#ifdef __STDC__
QDSP_QDEF *, QDSP_QRY *, QDSP_EXPR *
#endif /* __STDC__ */
); /* search_for_common_aggr_expr */

static bool is_same_aggr_expr(
#ifdef __STDC__
QDSP_QDEF *, QDSP_QRY *, QDSP_EXPR *, QDSP_EXPR *, bool *
#endif /* __STDC__ */
); /* is_same_aggr_expr */

static bool is_same_simple_expr(
#ifdef __STDC__
QDSP_QDEF *, QDSP_EXPR *, QDSP_EXPR *
#endif /* __STDC__ */
);

static QDSP_EXPR *resolve_col_ref(
#ifdef __STDC__
QDSP_QDEF *, QDSP_QRY *, QDSP_EXPR *
#endif /* __STDC__ */
);
```

Dec 13 1993 10:59:39 qdcp_qgen.c Page 2

```
static bool are_cols_outer_correlref(
#ifdef __STDC__
QDSP_QDEF *, QDSP_QRY *, QDSP_EXPR *
#endif /* __STDC__ */
);


/****************************************************************************
 * QDsqlops - Global read-only table of operator strings and attributes.
 * The qdsqlop structure type, and the operator attribute flags, are defined
 * in qdspext.h.  Entries with string "?" represent unused operator codes.
 ****************************************************************************
 */
QDSQLOP QDsqlops[QD_NUM_SQL_OPS + 5] =
{
    {"?", 0},
    {"COL", (QD_SQLOP_ATOM | QD_SQLOP_VAL)},
    {"LIT", (QD_SQLOP_ATOM | QD_SQLOP_VAL)},
    {"HOSTVAR", (QD_SQLOP_ATOM | QD_SQLOP_VAL)},
    {"SUBQRY", 0}, {"LINK", 0}, {"(+)" /* OUTER */, QD_SQLOP_POSTFIX},
    {"PRIOR", 0}, {"?", 0}, {"?", 0}, {"?", 0},
    {"AND", (QD_SQLOP_INFIX | QD_SQLOP_BOOL)},
    {"OR", (QD_SQLOP_INFIX | QD_SQLOP_BOOL)},
    {"NOT", (QD_SQLOP_PREFIX | QD_SQLOP_BOOL)},
    {"?", 0}, {"?", 0}, {"?", 0}, {"?", 0}, {"?", 0}, {"?", 0}, {"?", 0},
    {"=", (QD_SQLOP_INFIX | QD_SQLOP_BOOL)},
    {"<>", (QD_SQLOP_INFIX | QD_SQLOP_BOOL)},
    {"<", (QD_SQLOP_INFIX | QD_SQLOP_BOOL)},
    {"<=", (QD_SQLOP_INFIX | QD_SQLOP_BOOL)},
    {">", (QD_SQLOP_INFIX | QD_SQLOP_BOOL)},
    {">=", (QD_SQLOP_INFIX | QD_SQLOP_BOOL)},
    {"IN", (QD_SQLOP_INFIX | QD_SQLOP_BOOL)},
    {"BETWEEN", (QD_SQLOP_INFIX | QD_SQLOP_BOOL)},
    {"IS NULL", (QD_SQLOP_POSTFIX | QD_SQLOP_BOOL)},
    {"EXISTS", (QD_SQLOP_PREFIX | QD_SQLOP_BOOL)},
    {"LIKE", (QD_SQLOP_INFIX | QD_SQLOP_BOOL)},
    {"?", 0}, {"?", 0}, {"?", 0}, {"?", 0}, {"?", 0}, {"?", 0}, {"?", 0},
    {"?", 0}, {"?", 0},
    {"+", (QD_SQLOP_INFIX | QD_SQLOP_VAL)},
    {"-" /* Subtraction */, (QD_SQLOP_INFIX | QD_SQLOP_VAL)},
    {"-" /* Unary NEGATE */, (QD_SQLOP_PREFIX | QD_SQLOP_VAL)},
    {"*", (QD_SQLOP_INFIX | QD_SQLOP_VAL)},
    {"/", (QD_SQLOP_INFIX | QD_SQLOP_VAL)},
    {"||", (QD_SQLOP_INFIX | QD_SQLOP_VAL)},
    {"?", 0}, {"?", 0}, {"?", 0}, {"?", 0},

    {"AVG", (QD_SQLOP_FUNC | QD_SQLOP_AGGR | QD_SQLOP_VAL)},
    {"MAX", (QD_SQLOP_FUNC | QD_SQLOP_AGGR | QD_SQLOP_VAL)},
    {"MIN", (QD_SQLOP_FUNC | QD_SQLOP_AGGR | QD_SQLOP_VAL)},
    {"SUM", (QD_SQLOP_FUNC | QD_SQLOP_AGGR | QD_SQLOP_VAL)},
    {"COUNT", (QD_SQLOP_FUNC | QD_SQLOP_AGGR | QD_SQLOP_VAL)},
    {"STDDEV", (QD_SQLOP_FUNC | QD_SQLOP_AGGR | QD_SQLOP_VAL)},
    {"VARIANCE", (QD_SQLOP_FUNC | QD_SQLOP_AGGR | QD_SQLOP_VAL)},
    {"?", 0}, {"?", 0}, {"?", 0},

    {"USER", (QD_SQLOP_ATOM | QD_SQLOP_VAL)},
    {"CURRVAL", (QD_SQLOP_ATOM | QD_SQLOP_VAL)},
    {"NEXTVAL", (QD_SQLOP_ATOM | QD_SQLOP_VAL)},
    {"ROWID", (QD_SQLOP_ATOM | QD_SQLOP_VAL)},
    {"ROWNUM", (QD_SQLOP_ATOM | QD_SQLOP_VAL)},
    {"LEVEL", (QD_SQLOP_ATOM | QD_SQLOP_VAL)},
    {"SYSDATE", (QD_SQLOP_ATOM | QD_SQLOP_VAL)},
    {"UID", (QD_SQLOP_ATOM | QD_SQLOP_VAL)},
    {"NULL", (QD_SQLOP_ATOM | QD_SQLOP_VAL)}, {"?", 0},

    {"ABS", (QD_SQLOP_FUNC | QD_SQLOP_VAL)},
    {"CEIL", (QD_SQLOP_FUNC | QD_SQLOP_VAL)},
    {"FLOOR", (QD_SQLOP_FUNC | QD_SQLOP_VAL)},
    {"MOD", (QD_SQLOP_FUNC | QD_SQLOP_VAL)},
    {"POWER", (QD_SQLOP_FUNC | QD_SQLOP_VAL)},
    {"ROUND", (QD_SQLOP_FUNC | QD_SQLOP_VAL)},
    {"SIGN", (QD_SQLOP_FUNC | QD_SQLOP_VAL)},
    {"SQRT", (QD_SQLOP_FUNC | QD_SQLOP_VAL)},
```

1

Dec 13 1993 10:59:39 qdcp_qgen.c Page 3

```
    {"TRUNC", (QD_SQLOP_FUNC | QD_SQLOP_VAL)}, {"?", 0},

    {"CHR", (QD_SQLOP_FUNC | QD_SQLOP_VAL)},
    {"INITCAP", (QD_SQLOP_FUNC | QD_SQLOP_VAL)},
    {"LOWER", (QD_SQLOP_FUNC | QD_SQLOP_VAL)},
    {"LPAD", (QD_SQLOP_FUNC | QD_SQLOP_VAL)},
    {"LTRIM", (QD_SQLOP_FUNC | QD_SQLOP_VAL)},
    {"REPLACE", (QD_SQLOP_FUNC | QD_SQLOP_VAL)},
    {"RPAD", (QD_SQLOP_FUNC | QD_SQLOP_VAL)},
    {"RTRIM", (QD_SQLOP_FUNC | QD_SQLOP_VAL)},
    {"SOUNDEX", (QD_SQLOP_FUNC | QD_SQLOP_VAL)},
    {"SUBSTR", (QD_SQLOP_FUNC | QD_SQLOP_VAL)},
    {"TRANSLATE", (QD_SQLOP_FUNC | QD_SQLOP_VAL)},
    {"UPPER", (QD_SQLOP_FUNC | QD_SQLOP_VAL)},
    {"ASCII", (QD_SQLOP_FUNC | QD_SQLOP_VAL)},
    {"INSTR", (QD_SQLOP_FUNC | QD_SQLOP_VAL)},
    {"LENGTH", (QD_SQLOP_FUNC | QD_SQLOP_VAL)},
    {"NLSSORT", (QD_SQLOP_FUNC | QD_SQLOP_VAL)},
    {"?", 0}, {"?", 0}, {"?", 0}, {"?", 0},
    {"CHARTOROWID", (QD_SQLOP_FUNC | QD_SQLOP_VAL)},
    {"CONVERT", (QD_SQLOP_FUNC | QD_SQLOP_VAL)},
    {"HEXTORAW", (QD_SQLOP_FUNC | QD_SQLOP_VAL)},
    {"RAWTOHEX", (QD_SQLOP_FUNC | QD_SQLOP_VAL)},
    {"ROWIDTOCHAR", (QD_SQLOP_FUNC | QD_SQLOP_VAL)},
    {"TO_CHAR", (QD_SQLOP_FUNC | QD_SQLOP_VAL)},
    {"TO_DATE", (QD_SQLOP_FUNC | QD_SQLOP_VAL)},
    {"TO_NUMBER", (QD_SQLOP_FUNC | QD_SQLOP_VAL)},
    {"TO_MULTI_BYTE", (QD_SQLOP_FUNC | QD_SQLOP_VAL)},
    {"TO_SINGLE_BYTE", (QD_SQLOP_FUNC | QD_SQLOP_VAL)},
    {"ADD_MONTHS", (QD_SQLOP_FUNC | QD_SQLOP_VAL)},
    {"LAST_DAY", (QD_SQLOP_FUNC | QD_SQLOP_VAL)},
    {"MONTHS_BETWEEN", (QD_SQLOP_FUNC | QD_SQLOP_VAL)},
    {"NEW_TIME", (QD_SQLOP_FUNC | QD_SQLOP_VAL)},
    {"NEXT_DAY", (QD_SQLOP_FUNC | QD_SQLOP_VAL)},
    {"?", 0}, {"?", 0}, {"?", 0}, {"?", 0}, {"?", 0},
    {"DECODE", (QD_SQLOP_FUNC | QD_SQLOP_VAL)},
    {"DUMP", (QD_SQLOP_FUNC | QD_SQLOP_VAL)},
    {"GREATEST", (QD_SQLOP_FUNC | QD_SQLOP_VAL)},
    {"LEAST", (QD_SQLOP_FUNC | QD_SQLOP_VAL)},
    {"NVL", (QD_SQLOP_FUNC | QD_SQLOP_VAL)},
    {"USERENV", (QD_SQLOP_FUNC | QD_SQLOP_VAL)},
    {"VSIZE", (QD_SQLOP_FUNC | QD_SQLOP_VAL)},
    {"?", 0}, {"?", 0}, {"?", 0},
    {"COS", (QD_SQLOP_FUNC | QD_SQLOP_VAL)},
    {"COSH", (QD_SQLOP_FUNC | QD_SQLOP_VAL)},
    {"EXP", (QD_SQLOP_FUNC | QD_SQLOP_VAL)},
    {"LN", (QD_SQLOP_FUNC | QD_SQLOP_VAL)},
    {"LOG", (QD_SQLOP_FUNC | QD_SQLOP_VAL)},
    {"SIN", (QD_SQLOP_FUNC | QD_SQLOP_VAL)},
    {"SINH", (QD_SQLOP_FUNC | QD_SQLOP_VAL)},
    {"TAN", (QD_SQLOP_FUNC | QD_SQLOP_VAL)},
    {"TANH", (QD_SQLOP_FUNC | QD_SQLOP_VAL)},
    {"?", 0},
    {"NLS_INITCAP", (QD_SQLOP_FUNC | QD_SQLOP_VAL)},
    {"NLS_LOWER", (QD_SQLOP_FUNC | QD_SQLOP_VAL)},
    {"NLS_UPPER", (QD_SQLOP_FUNC | QD_SQLOP_VAL)},
    {"SUBSTRB", (QD_SQLOP_FUNC | QD_SQLOP_VAL)},
    {"INSTRB", (QD_SQLOP_FUNC | QD_SQLOP_VAL)},
    {"LENGTHB", (QD_SQLOP_FUNC | QD_SQLOP_VAL)},
    {"?", 0}, {"?", 0}, {"?", 0}, {"?", 0}
};

/****************************************************************************
 * BUFCHECK - Advance pointer in query text buffer by specified number of
 * bytes, and if we've gotten within the safety margin at the end of the
 * buffer, replace current buffer with a larger buffer.  This macro assumes
 * local variable pbuf (pointer into query text buffer) is defined, and it
 * assumes a local label error_return to jump to in case of error.
 ****************************************************************************
*/
#define BUFCHECK(_nbytes)\
{ pbuf += (_nbytes);\
```

Dec 13 1993 10:59:39 qdcp_qgen.c Page 4

```
  if (pbuf > QD_PQBUF + (QD_QBUF_CURRENT_SIZE - QD_QBUF_SAFETY_MARGIN))\
  { pbuf = growbuf(pbuf); if (QDFAILED) goto error_return; } }


/****************************************************************************
 * qdcp_qgen - Generate parallel subquery for a given query
 *
 * By convention, each fragment of SQL text is generated with a leading
 * blank, where blank separation may be needed, but with no trailing blank.
 *
 * Modify *ppbuf to point just past last byte of generated text (useful
 * when this routine is called recursively for subqueries).
 ****************************************************************************
*/
QDSTATUS qdcp_qgen(command, pqdef, pqry, ppbuf)
reg14 ub4 command;          /* What kind of query to generate. Possible values */
                            /*  are QDCP_GEN_PSQ and QDCP_GEN_CQ, either of */
                            /*  which may be or'd with QDCP_GEN_SUBQ if we */
                            /*  are within a subquery */
reg1 QDSP_QDEF *pqdef;      /* Pointer to root struct of overall parse tree */
reg2 QDSP_QRY *pqry;        /* Pointer to particular query to transform     */
text **ppbuf;               /* Address of pointer to buffer for generated query */
                            /*  text */
{
    reg3 text *pbuf;            /* Pointer to buffer for generated query text */
    reg4 int i;
    reg5 int j;
    reg6 int k;
    reg7 int ntransforms;       /* Number of select list transformations */
    reg8 text *pstrings = pqdef->pstrings;
    reg9 text *ptable;          /* Table name in partitioning predicate */
    text *pschema;              /* Schema name in partitioning predicate */
    reg11 text *pdot;           /* Dot between table and schema name */
    reg12 QDCP_COLMAP *pcolmap; /* Pointer to column map */
    reg13 text *pquote;         /* Set to point to string containing double */
                                /* quote, or to empty string, depending on */
                                /* whether an identifier needs to be quoted */
    reg15 bool comma;           /* Print a comma if true */
    QD_VARCHAR *pvarbuf;        /* Pointer to buffer allocated for storing */
                                /* query text */
    QDSP_EXPR *pexpr;           /* Pointer to expressions */
    text *pselect;              /* Pointer to SELECT keyword within PSQ */

    QDBEGIN("qdcp_qgen");

    /* Has query text buffer been initialized? */
    if (QD_PQBUF == NULL)
    {
        QD_PQBUF = qdrt_malloc(QD_QBUF_INITIAL_SIZE);
        if (QDFAILED)
            goto error_return;
        QD_QBUF_CURRENT_SIZE = QD_QBUF_INITIAL_SIZE;
    }

    pcolmap = pqry->pcolmap;
    if (ppbuf == (text **)NULL || *ppbuf == (text *)NULL)
    {
        pbuf = QD_PQBUF;
    }
    else pbuf = *ppbuf;

    /* If PSQ is to be an insert directly into the IT, prefix it with
     * "INSERT INTO <itname> (".          %03
     */
    if (command == QDCP_GEN_PSQ &&
        (pqry->flags & QDSP_QRY_PSQ_INSERT_TO_IT))
    {
        /* If this is a PSQ, and we're not within a subquery, copy directive
         * comment from input query, if there is one, and/or generated
         * optimizer hints, if any.
         */
        if (command == QDCP_GEN_PSQ &&
            (pqdef->ldirective || pqdef->phints || QD_default_directive))
```

```
    {
        sprintf(pbuf, "INSERT");
        BUFCHECK(strlen(pbuf));
        if (pqdef->phints)
            i = strlen(pqdef->phints);
        /* Since directive may be of arbitrary length, check 'by hand'
         * for space, rather than relying on BUFCHECK macro.
         */
        if (pbuf + pqdef->ldirective + i + 6 >
            QD_PQBUF + (QD_QBUF_CURRENT_SIZE - QD_QBUF_SAFETY_MARGIN))
        {
            pbuf = growbuf(pbuf);
            if (QDFAILED)
                goto error_return;
        }
        if (pqdef->ldirective)
        {
            /* Was a default directive specified for inclusion
             * in all PSQs, via env var KSR_QD_DEFAULT_DIRECTIVE?
             */
            if (QD_default_directive)
            {
                if (pqdef->phints)
                    sprintf(pbuf, " /*+%s %s%*.*s*/",
                            QD_default_directive, pqdef->phints,
                            pqdef->ldirective, pqdef->ldirective,
                         QDpcom->cnx.pspcom->pqtext + pqdef->odirective);
                else
                    sprintf(pbuf, " /*+%s %*.*s*/",
                            QD_default_directive, pqdef->ldirective,
                            pqdef->ldirective,
                         QDpcom->cnx.pspcom->pqtext + pqdef->odirective);
            }
            else
            {
                if (pqdef->phints)
                    sprintf(pbuf, " /*+%s%*.*s*/", pqdef->phints,
                            pqdef->ldirective, pqdef->ldirective,
                         QDpcom->cnx.pspcom->pqtext + pqdef->odirective);
                else
                    sprintf(pbuf, " /*+%*.*s*/", pqdef->ldirective,
                            pqdef->ldirective,
                         QDpcom->cnx.pspcom->pqtext + pqdef->odirective);
            }
        }
        else if (QD_default_directive)
        {
            if (pqdef->phints)
                sprintf(pbuf,
                     " /*+%s %s*/", QD_default_directive, pqdef->phints);
            else
                sprintf(pbuf, " /*+%s*/", QD_default_directive);
        }
        else
            sprintf(pbuf, " /*+%s*/", pqdef->phints);
        BUFCHECK(strlen(pbuf));
        sprintf(pbuf, " INTO %s (", pstrings + pqry->oitname);
        BUFCHECK(strlen(pbuf));
    } /* If we need to generate directives */

    else
    {
        sprintf(pbuf, "INSERT INTO %s (", pstrings + pqry->oitname);
        BUFCHECK(strlen(pbuf));
    }
}

/* If input query is an INSERT...SELECT statement, copy the portion
 * of the original statement that preceded the SELECT keyword into
 * the statement we're generating, if this is the statement that
 * will perform the insert (i.e. the CQ if there is one, else the
 * PSQ).
 */
```

```
if ((pqdef->flags & QDSP_QDEF_INSERT_SELECT) &&
    ( (command == QDCP_GEN_PSQ && !(pqry->flags & QDSP_QRY_GEN_CQ))
     || command == QDCP_GEN_CQ))
{
    sprintf(pbuf, "%*.*s", QDpcom->cnx.pspcom->oselect,
            QDpcom->cnx.pspcom->oselect,
            QDpcom->cnx.pspcom->pqtext);
    BUFCHECK(strlen(pbuf));
}

sprintf(pbuf, "SELECT");
pselect = pbuf;
BUFCHECK(strlen(pbuf));

/* If this is a PSQ, and we're not within a subquery, copy directive
 * comment from input query, if there is one, and/or generated
 * optimizer hints, if any.
 */
if (command == QDCP_GEN_PSQ &&
    (pqdef->ldirective || pqdef->phints || QD_default_directive))
{
    if (pqdef->phints)
        i = strlen(pqdef->phints);
    /* Since directive may be of arbitrary length, check 'by hand'
     * for space, rather than relying on BUFCHECK macro.
     */
    if (pbuf + pqdef->ldirective + i + 6 >
        QD_PQBUF + (QD_QBUF_CURRENT_SIZE - QD_QBUF_SAFETY_MARGIN))
    {
        pbuf = growbuf(pbuf);
        if (QDFAILED)
            goto error_return;
    }
    if (pqdef->ldirective)
    {
        /* Was a default directive specified for inclusion
         * in all PSQs, via env var KSR_QD_DEFAULT_DIRECTIVE?
         */
        if (QD_default_directive)
        {
            if (pqdef->phints)
                sprintf(pbuf, " /*+%s %s%*.*s*/",
                        QD_default_directive, pqdef->phints,
                        pqdef->ldirective, pqdef->ldirective,
                        QDpcom->cnx.pspcom->pqtext + pqdef->odirective);
            else
                sprintf(pbuf, " /*+%s %*.*s*/",
                        QD_default_directive, pqdef->ldirective,
                        pqdef->ldirective,
                        QDpcom->cnx.pspcom->pqtext + pqdef->odirective);
        }
        else
        {
            if (pqdef->phints)
                sprintf(pbuf, " /*+%s%*.*s*/", pqdef->phints,
                        pqdef->ldirective, pqdef->ldirective,
                        QDpcom->cnx.pspcom->pqtext + pqdef->odirective);
            else
                sprintf(pbuf, " /*+%*.*s*/", pqdef->ldirective,
                        pqdef->ldirective,
                        QDpcom->cnx.pspcom->pqtext + pqdef->odirective);
        }
    }
    else if (QD_default_directive)
    {
        if (pqdef->phints)
            sprintf(pbuf,
                 " /*+%s %s*/", QD_default_directive, pqdef->phints);
        else
            sprintf(pbuf, " /*+%s*/", QD_default_directive);
    }
    else
        sprintf(pbuf, " /*+%s*/", pqdef->phints);
```

138

Dec 13 1993 10:59:39 qdcp_qgen.c Page 7

```
        BUFCHECK(strlen(pbuf));
    }
    /* Perform select list transformations (see DBN #39 for details) */
    ntransforms = 0; /* transform(pqdef, pqry, pbuf); */

    /* Print keyword DISTINCT if select list has not been transformed,
     * and it is called for.
     */
    if (ntransforms == 0 && (pqry->flags & QDSP_QRY_DISTINCT))
    {
        strcpy(pbuf, " DISTINCT");
        BUFCHECK(strlen(pbuf));
    }

    /* Generate SELECT LIST
     * If we're inside a subquery, generate select list directly off
     * qry's pselist.
     */
    if (command & QDCP_GEN_SUBQ)
    {
        for (i = 0; i < pqry->nselitems; i++)
        {
            if (pqry->pselist[i].pexpr == NULL) /* '*' */
            {
                if (pqry->pselist[i].lname == 0) /* just '*' */
                {
                    sprintf(pbuf, " *");
                    BUFCHECK(strlen(pbuf));
                } /* if (pqry->pselist[i].lname == 0) */

                else  /* <tablename>.* */
                {
                    if (pqry->ptabs[pqry->pselist[i].tabnum].lalias)
                        pquote = "\"";
                    else
                        pquote = "";
                    sprintf(pbuf, "%s%s%s%s%s%s.*", (i ? ", " : " "),
                            (pqry->pselist[i].lschema ?
                             pstrings + pqry->pselist[i].oschema : ""),
                            (pqry->pselist[i].lschema ? "." : ""),
                            pquote,
                            pstrings + pqry->pselist[i].oname, pquote);
                    BUFCHECK(strlen(pbuf));
                }
            }
            else
            {
                if (i)
                {
                    *pbuf++ = ',';
                }
                pbuf = print_expr(command, pqdef, pqry,
                                  pqry->pselist[i].pexpr, pbuf);
                if (pqry->pselist[i].lname)
                {
                    sprintf(pbuf, " \"%s\"",
                            pstrings + pqry->pselist[i].oname);
                    BUFCHECK(strlen(pbuf));
                }
            }
        } /* for (i = 0; i < pqry->nselitems...) */
    } /* if inside subquery */

    else if (command == QDCP_GEN_PSQ &&
             (pqry->flags & QDSP_QRY_COLLAPSE_STAR))
    {
        /* qdcp_seltran always replaces unqualified '*' with expanded list
         * of <table>.*, but if no other columns are added to the
         * PSQ select list, then we can just generate an unqualified
         * '*' here.
         */
        strcpy(pbuf, " *");
        BUFCHECK(strlen(pbuf));
```

Dec 13 1993 10:59:39 qdcp_qgen.c Page 8

```
    }
    else for (i = 0, comma = FALSE; i < pqry->ncolmap_entries; i++)
    {
        if ((command == QDCP_GEN_PSQ && !(pcolmap[i].flags & QDCP_COL_PSQ))
            || (command == QDCP_GEN_CQ && !(pcolmap[i].flags & QDCP_COL_CQ)))
            continue;
        if (pcolmap[i].flags & QDCP_COL_STAR) /* '<table>.*' reference */
        {
            /* Note we're assuming that index into select list is
             * same as index into colmap for any star references.
             */
            if (pqry->ptabs[pqry->pselist[i].tabnum].lalias)
                pquote = "\"";
            else
                pquote = "";

            sprintf(pbuf, "%s%s%s%s%s%s.*", (comma ? ", " : " "),
                    (pqry->pselist[i].lschema ?
                     pstrings + pqry->pselist[i].oschema : ""),
                    (pqry->pselist[i].lschema ? "." : ""), pquote,
                    pstrings + pqry->pselist[i].oname, pquote);
            BUFCHECK(strlen(pbuf));
        }
        else
        {
            if (comma)
            {
                *pbuf++ = ',';
            }
            pbuf = print_expr(command, pqdef, pqry, pcolmap[i].pexpr, pbuf);
        }
        comma = TRUE;
    } /* for (i = 0; i < pqry->nselitems...) */

#ifdef CQ_SELECT_INTO
    /* Combining query is a SELECT INTO statement, so it needs an
     *  INTO clause
     */
    if (command == QDCP_GEN_CQ)
    {
        sprintf(pbuf, " INTO");
        BUFCHECK(strlen(pbuf));
        for (i = 0; i < pqry->ncq_cols; i++)
        {
            sprintf(pbuf, "%s :%s%d", i > 0 ? "," : "",
                    QDCP_CQ_HOSTVAR_PREFIX, i);
            BUFCHECK(strlen(pbuf));
        }
    } /* INTO clause for CQ */
#endif /* CQ_SELECT_INTO */

    /* Generate FROM clause */

    sprintf(pbuf, " FROM");
    BUFCHECK(strlen(pbuf));

    /* For combining query, FROM clause consists of the single name
     * of the intermediate table, which was generated in qdcp_seltran.
     */
    if (command == QDCP_GEN_CQ)
    {
        sprintf(pbuf, " %s", pstrings + pqry->oitname);
        BUFCHECK(strlen(pbuf));
    }
    else for (i = 0; i < pqry->ntabs; i++)
    {
        sprintf(pbuf, "%s%s%s%s%s%s%s", (i ? ", " : " "),
                (pqry->ptabs[i].lschema ?
                 pstrings + pqry->ptabs[i].oschema : ""),
                (pqry->ptabs[i].lschema ? "." : ""),
                pstrings + pqry->ptabs[i].oname,
                (pqry->ptabs[i].lalias ? " \"" : ""),
                (pqry->ptabs[i].lalias ?
```

```
            pstrings + pqry->ptabs[i].oalias : ""),
            (pqry->ptabs[i].lalias ? "\"" : ""));
        BUFCHECK(strlen(pbuf));
    }

    /* Generate WHERE clause, unless this is a subquery which has none,
     * or this is a combining query.
     */

    /* Place partitioning predicates before the rest of the WHERE clause
     * because ORACLE evaluates predicates in reverse order.  So this way,
     * the partitioning predicates will only get redundantly evaluated
     * if all other predicates are true.
     */
    if (command != QDCP_GEN_CQ && (pqry->pwhere != (QDSP_EXPR *)NULL
                                   || command == QDCP_GEN_PSQ))
    {
        strcpy(pbuf, " WHERE");
        BUFCHECK(strlen(pbuf));

        /* Find partitioning table, generate partitioning predicate */
        if (command == QDCP_GEN_PSQ)
        {
            for (i = 0;
                 i < pqry->ntabs && pqry->ptabs[i].join_pos != 1;
                 i++)
                ;
            if (i >= pqry->ntabs)
            {
                QDFAIL(QD_CP_NO_PAR_TAB);
                goto error_return;
            }
            if (pqry->ptabs[i].lalias) /* use alias to qualify rowid */
            {
                pschema = pdot = "";
                ptable = pstrings + pqry->ptabs[i].oalias;
            }
            else
            {
                ptable = pstrings + pqry->ptabs[i].oname;
                if (pqry->ptabs[i].lschema) /* qualify by schema */
                {
                    pschema = pstrings + pqry->ptabs[i].oschema;
                    pdot = ".";
                }
                else
                    pschema = pdot = "";
            } /* else */

            /* If partitioning "table" is a view, we assume it contains
             * a column called xxxxROWID, where xxxx is the table name
             * of the underlying table, defined over the rowid of the actual
             * underlying partitioning table.
             * 07/21/93 JM: NOTE that we don't verify there's a column called
             * VIEWROWID in the view, we just assume it.  If there isn't one,
             * we'll get an error when we attempt to describe the psq.
             */
            if (pqry->ptabs[i].flags & QDSP_TAB_VIEW)
                sprintf(pbuf,
                " %s%s\"%s\".%sROWID >= :%s AND %s%s\"%s\".%sROWID < :%s",
                    pschema, pdot, ptable,
                    pqdef->pstrings + pqry->opartabname,
                    QD_LOW_ROWID_HOSTVAR,
                    pschema, pdot, ptable,
                    pqdef->pstrings + pqry->opartabname,
                    QD_HIGH_ROWID_HOSTVAR);     /*%02*/
            else
                sprintf(pbuf,
                    " %s%s\"%s\".ROWID >= :%s AND %s%s\"%s\".ROWID < :%s",
                    pschema, pdot, ptable, QD_LOW_ROWID_HOSTVAR,
                    pschema, pdot, ptable, QD_HIGH_ROWID_HOSTVAR);    /*%02*/
            BUFCHECK(strlen(pbuf));
        } /* if (command == QDCP_GEN_PSQ) */
```

```
        if (pqry->pwhere != (QDSP_EXPR *)NULL)
        {
            if (command == QDCP_GEN_PSQ)
            {
                strcpy(pbuf, " AND (");
                BUFCHECK(strlen(pbuf));
            }
            pbuf = print_expr(command, pqdef, pqry, pqry->pwhere, pbuf);
            if (command == QDCP_GEN_PSQ)
            {
                strcpy(pbuf, ")");
                BUFCHECK(strlen(pbuf));
            }
        }

    }   /* End of generating WHERE clause and partitioning predicate */

    /* Generate HAVING clause.  If this is PSQ, pass the command
     * QDCP_GEN_PSQ_HAVING, which lets print_expr know to skip expressions
     * which are flagged QDSP_OMIT_IN_PSQ_HAVING because they contain
     * references to aggregates (these can't be correctly evaluated until
     * the combining query, because the PSQ only retrieves partial groups.)
     */
    if (pqry->phaving != (QDSP_EXPR *)NULL &&
        !(command == QDCP_GEN_PSQ &&
          (pqry->phaving->u.op.flags & QDSP_OMIT_IN_PSQ_HAVING)))
    {
        strcpy(pbuf, " HAVING");
        BUFCHECK(strlen(pbuf));
        pbuf = print_expr((command == QDCP_GEN_PSQ ? QDCP_GEN_PSQ_HAVING
                          : command), pqdef, pqry, pqry->phaving, pbuf);
    } /* having clause */

    /* Generate GROUP BY clause (only do this for CQ if input query
     * has both ORDER-BY and GROUP-BY clauses.
     */
    if ((command != QDCP_GEN_CQ ||
         (pqry->flags & QDSP_QRY_GROUP_AND_ORDER))
        && pqry->ngroupcols > 0)
    {
        strcpy(pbuf, " GROUP BY");
        BUFCHECK(strlen(pbuf));
        for (i = 0; i < pqry->ngroupcols; i++)
        {
            if (i) /* comma-separate elements of group-by clause */
                *pbuf++ = ',';
            pbuf = print_expr(command, pqdef, pqry,
                              pqry->pgroupby[i].pexpr, pbuf);
        }
    } /* group-by clause */

    /* If this is top-level query (no set operations),
     * Generate ORDER-BY clause (only do this for CQ if this is
     * a query with both ORDER-BY and GROUP-BY clauses   %03
     */
    if ((command != QDCP_GEN_CQ ||
         (pqry->flags & QDSP_QRY_GROUP_AND_ORDER))
        && pqry == &(pqdef->ptree->qry)
        && pqdef->nordcols &&
        (pqry->ngroupcols == 0 || command == QDCP_GEN_CQ))
    {
        strcpy(pbuf, " ORDER BY");
        BUFCHECK(strlen(pbuf));

        for (i = 0; i < pqdef->nordcols; i++)
        {
            if (i) /* comma-separate elements of order-by clause */
                *pbuf++ = ',';

            if (pqdef->pordcols[i].pexpr->opcode == QDSP_OP_LIT)
            /* Don't use print_expr because it puts quotes around literals */
            {
```

```
            sprintf(pbuf, " %s",
                    pstrings + pqdef->pordcols[i].pexpr->u.lit.oval);
            BUFCHECK(strlen(pbuf));
        }
        else pbuf = print_expr(command, pqdef, pqry,
                               pqdef->pordcols[i].pexpr, pbuf);
        if (pqdef->pordcols[i].direction == QDCK_DESC)
        {
            strcpy(pbuf, " DESC");
            BUFCHECK(strlen(pbuf));
        }
    }
} /* order-by clause */

/* If PSQ is to be an insert directly into the IT, terminate it
 * with a closing parenthesis.          %03
 */
if (command == QDCP_GEN_PSQ &&
    (pqry->flags & QDSP_QRY_PSQ_INSERT_TO_IT))
    *pbuf++ = ')';

/* Zero-terminate our buffer */
*pbuf = 0;

/* If we just generated a parallel subquery or combining query,
 * allocate space to save it, and attach it to qry structure.
 * Save query in QD_VARCHAR form, so it can be passed as host variable
 * to ORACLE SQL without further copying.
 */
if (command == QDCP_GEN_PSQ || command == QDCP_GEN_CQ)
{
    pvarbuf = (QD_VARCHAR *)qdrt_malloc(sizeof(QD_VARCHAR) +
                                        (pbuf - QD_PQBUF));
    if (QDFAILED)
        goto error_return;
    pvarbuf->len = pbuf - QD_PQBUF;
    memcpy(pvarbuf->arr, QD_PQBUF, pvarbuf->len);

    /* Set pointer to SELECT keyword within pvarbuf->arr */
    pselect = pvarbuf->arr + (pselect - QD_PQBUF);
    if (command == QDCP_GEN_PSQ)
    {                                                         /*%01*/
        /* Compute number of bind variables */
        pqry->nbinds = pqdef->nhostvars - pqry->ntargets;
        pqry->ppsq_text = pvarbuf;

        /* Have ORACLE describe the PSQ. */
        qdcp_desc_psq(pqry, pselect);
    }
    else
        pqry->pcq_text = pvarbuf;
} /* if (command is GEN_PSQ or GEN_CQ) */

/* If we need a combining query, we also need a create table statement
 * (CTS), an insert statement (IS), a delete statement (DS), and
 * a drop table statement (DT), so create those now.
 */
if (command == QDCP_GEN_CQ)
{
    /* If this is the first time we're generating a combining query,
     * get the name of the user's temporary tablespace, in which to
     * create the temporary table.  %03
     * Note that qdcp_ttsqry will return an error if the user
     * lacks sufficient privilege to create a table in the
     * temporary tablespace.
     */
    if (!QDpcom->cnx.temporary_tablespace[0])
    {
        if (qdcp_ttsqry(&(QDpcom->cnx)))
            goto error_return;
    }

    pbuf = QD_PQBUF;
```

```
    sprintf(pbuf, "CREATE TABLE %s (", pstrings + pqry->oitname);
    BUFCHECK(strlen(pbuf));
    for (i = 0, j = 0; i < pqry->ncolmap_entries; i++)
    {
        if (pcolmap[i].flags & QDCP_COL_IT)
        {
            pexpr = pcolmap[i].pexpr;
            sprintf(pbuf, "%s%s_%s%d", (j ? ", " : ""),
                    (QD_SQLOP_IS_AGGR(pexpr->opcode) ?
                     ((pexpr->opcode == QDSP_OP_SUM &&
                      pexpr->u.op.prand1->opcode == QDSP_OP_POWER) ?
                      "SUMSQR" : QD_SQLOP_STRING(pexpr->opcode))
                     : "GRP"),                                  /*%03*/
                    QDCP_IT_COL_PREFIX,
                    pqry->pcolmap[pexpr->colmap_index].it_colnum);
            j++;

            BUFCHECK(strlen(pbuf));
            if (pexpr->datatype == DTYCHR ||
                pexpr->datatype == DTYAFC)
            {
                if (pexpr->length == 0)
                    strcpy(pbuf, " CHAR");
                else
                    sprintf(pbuf, " CHAR(%d)", pexpr->length);
            }
            else if (pexpr->datatype == DTYNUM)
            {
                if (pexpr->precision == 0)
                    strcpy(pbuf, " NUMBER");
                else
                {
                    if (pexpr->scale == 0)
                        sprintf(pbuf, " NUMBER(%d)", pexpr->precision);
                    else
                        sprintf(pbuf, " NUMBER(%d, %d)",
                                pexpr->precision, pexpr->scale);
                }
            } /* else if datatype is NUMBER */
            else if (pexpr->datatype == DTYDAT)
                strcpy(pbuf, " DATE");
            else if (pexpr->datatype == DTYLNG)
                strcpy(pbuf, " LONG");
            else if (pexpr->datatype == DTYBIN)
                strcpy(pbuf, " RAW");
            else if (pexpr->datatype == DTYRID) /* Rowid */
                strcpy(pbuf, " CHAR(18)");
            else strcpy(pbuf, " ???");

            BUFCHECK(strlen(pbuf));
        } /* if this column is in Intermediate Table */
    } /* for each column */
    /* Terminate create tablespace statement, specifying that table
     * is to be created in user's temporary tablespace.   %03
     * If the environment variable KSR_TEMP_TABLE_FREELISTS was set,
     * also specify a number of freelists equal to the degree of
     * partitioning.
     */
    if (QD_temp_table_freelists)
    {
        sprintf(pbuf, ") TABLESPACE %s STORAGE (FREELISTS %d)",
                QDpcom->cnx.temporary_tablespace,
                pqdef->max_partitions ?
                min(pqdef->max_partitions, pqry->nparfids) :
                pqry->nparfids);
    }
    else
        sprintf(pbuf, ") TABLESPACE %s", QDpcom->cnx.temporary_tablespace);
    BUFCHECK(strlen(pbuf));

    /* Allocate a buffer to save create table statement */
    pvarbuf = (QD_VARCHAR *)qdrt_malloc(sizeof(QD_VARCHAR) +
```

141

```
                                    (pbuf - QD_PQBUF));
        if (QDFAILED)
            goto error_return;
        pvarbuf->len = pbuf - QD_PQBUF;
        memcpy(pvarbuf->arr, QD_PQBUF, pvarbuf->len);
        pqry->pcts_text = pvarbuf;

        /* Now generate insert and delete statements, unless
         * PSQ will directly insert to intermediate table.
         */
        if (!(pqry->flags & QDSP_QRY_PSQ_INSERT_TO_IT))
        {
            /* Now generate insert statement */

            pbuf = QD_PQBUF;
            sprintf(pbuf, "INSERT INTO %s VALUES (", pstrings + pqry->oitname);
            BUFCHECK(strlen(pbuf));

            /* Generate names for host variables based on column position in
             * PSQ select list, but only add them to insert statement if they
             * are in IT column list.
             */
            for (i = 0, comma = FALSE; i < pqry->ncolmap_entries; i++)
            {
                if (pcolmap[i].flags & QDCP_COL_IT)
                {
                    sprintf(pbuf, "%s:%s%d", (comma ? ", " : ""),
                        QDCP_PSQ_HOSTVAR_PREFIX, pcolmap[i].psq_colnum);
                    BUFCHECK(strlen(pbuf));
                    comma = TRUE;
                }
            } /* for each column */
            *pbuf++ = ')';
            *pbuf = 0;

            /* Allocate a buffer to save insert statement */
            pvarbuf = (QD_VARCHAR *)qdrt_malloc(sizeof(QD_VARCHAR) +
                                    (pbuf - QD_PQBUF));
            if (QDFAILED)
                goto error_return;
            pvarbuf->len = pbuf - QD_PQBUF;
            memcpy(pvarbuf->arr, QD_PQBUF, pvarbuf->len);
            pqry->pis_text = pvarbuf;

            /* Now generate delete statement */

            pbuf = QD_PQBUF;
            sprintf(pbuf, "DELETE FROM %s", pstrings + pqry->oitname);
            BUFCHECK(strlen(pbuf));

            /* Allocate a buffer to save delete statement */
            pvarbuf = (QD_VARCHAR *)qdrt_malloc(sizeof(QD_VARCHAR) +
                                    (pbuf - QD_PQBUF));
            if (QDFAILED)
                goto error_return;
            pvarbuf->len = pbuf - QD_PQBUF;
            memcpy(pvarbuf->arr, QD_PQBUF, pvarbuf->len);
            pqry->pds_text = pvarbuf;
        } /* if (!(pqry->flags & QDSP_QRY_PSQ_INSERT_TO_IT)) */

        /* Now generate drop table statement */

        pbuf = QD_PQBUF;
        sprintf(pbuf, "DROP TABLE %s", pstrings + pqry->oitname);
        BUFCHECK(strlen(pbuf));

        /* Allocate a buffer to save drop table statement */
        pvarbuf = (QD_VARCHAR *)qdrt_malloc(sizeof(QD_VARCHAR) +
                                (pbuf - QD_PQBUF));
        if (QDFAILED)
            goto error_return;
        pvarbuf->len = pbuf - QD_PQBUF;
        memcpy(pvarbuf->arr, QD_PQBUF, pvarbuf->len);
```

```
            pqry->pdts_text = pvarbuf;

        } /* if (command is GEN_CQ) also gen CTS and IS */
error_return:
    if (ppbuf != (text **)NULL)
        *ppbuf = pbuf;
    QDEND;
    return QD_STATUS;
} /* qdcp_qgen */


/* print_expr - print SQL text for an expression into specified buffer,
 * return pointer to next place to write in buffer.  Recurse on
 * operands
 */
static text *print_expr(command, pqdef, pqry, pexpr, pbuf)
reg6 ub4 command;          /* What kind of query to generate. Possible values */
                           /*  are QDCP_GEN_PSQ and QDCP_GEN_CQ. */
reg1 QDSP_QDEF *pqdef;     /* Pointer to query definition (parse tree root) */
reg6 QDSP_QRY  *pqry;      /* Pointer to query structure for select block */
reg2 QDSP_EXPR *pexpr;     /* Generate SQL text for this expression */
reg3 text *pbuf;           /* Generate text into this buffer */
{
    reg4 text *pstrings = pqdef->pstrings;
    reg5 int need_parens;  /* Non-zero means surround subexpr */
                           /*  with parentheses */
    reg7 b4 i;             /* loop index */
    reg8 QDSP_QRY *pouter_qry; /* Pointer to query containing this subquery */
    reg9 QDSTATUS retval;   /* Return value of function calls */
    QDSP_EXPR *pcorrelref; /* Create new expression for correlated */
                           /* reference within subquery */
    ub1 save_qry_flags;    /* Save value of pqry->flags */


    /* Print a leading blank */
    *pbuf++ = ' ';

    /* If we're generating CQ, and the original query has both ORDER-BY
     * and GROUP-BY clauses, then if pexpr corresponds to an expression
     * for which there is a column in the IT (intermediate table), then
     * print the name of that column, rather the the expression.  %03
     * (Don't do this here for AGGRs, they're handled separately below.)
     */
    if (!QD_SQLOP_IS_AGGR(pexpr->opcode) &&
        command == QDCP_GEN_CQ &&
        (pqry->flags & QDSP_QRY_GROUP_AND_ORDER))
    {
        if (pqry->pcolmap[pexpr->colmap_index].pexpr == pexpr &&
            (pqry->pcolmap[pexpr->colmap_index].flags & QDCP_COL_IT))
        {
            sprintf(pbuf, "GRP_%s%d",
                    QDCP_IT_COL_PREFIX,
                    pqry->pcolmap[pexpr->colmap_index].it_colnum);
            BUFCHECK(strlen(pbuf));
            return pbuf;
        }
    } /* if gen'ing CQ for ORDER-BY/GROUP-BY query */

#if QDCP_USE_GROUPBY_NUM_FOR_VARNAME
    /* If we're generating CQ and this is a group-by column which
     * isn't included in intermediate table (which group-by
     * columns never are, except for the case of ORDER-BY/GROUP-BY queries,
     * handled above  %03) find it in group-by clause, and use group-by
     * column number to generate a host variable name for it.
     */
    if (command == QDCP_GEN_CQ && QD_SQLOP_IS_VAL(pexpr->opcode) &&
        !(pqry->pcolmap[pexpr->colmap_index].flags & QDCP_COL_IT))
    {
        for (i = 0; i < pqry->ngroupcols; i++)
            if (pqry->pgroupby[i].pexpr == pexpr)
                break;
        if (i < pqry->ngroupcols)
        {
```

```
            sprintf(pbuf, ":%s%d", QDCP_GROUPCOL_HOSTVAR_PREFIX, i);
            BUFCHECK(strlen(pbuf));
            return pbuf;
        }
    }
#else
    /* If we're generating CQ and this is a group-by column which
     * isn't included in intermediate table (which group-by
     * columns never are) find it in column map, and use PSQ
     * column number to generate a host variable name for it.
     */
    if (command == QDCP_GEN_CQ && QD_SQLOP_IS_VAL(pexpr->opcode) &&
        !QD_SQLOP_IS_AGGR(pexpr->opcode) &&
        !(pqry->pcolmap[pexpr->colmap_index].flags & QDCP_COL_IT))
    {
        for (i = 0; i < pqry->ngroupcols; i++)
            if (pqry->pgroupby[i].pexpr == pexpr)
                break;
        if (i < pqry->ngroupcols)
        {
            sprintf(pbuf, ":%s%d", QDCP_PSQ_HOSTVAR_PREFIX,
                    pqry->pcolmap[pexpr->colmap_index].psq_colnum);
            BUFCHECK(strlen(pbuf));

            /* Increment query's number of CQ references to group-by
             * columns, so we'll know later how many columns are needed
             * in the CQ bind descriptor.
             */
            pqry->ncq_groupcol_refs++;

            return pbuf;
        }
    }
#endif /* QDCP_USE_GROUPBY_NUM_FOR_VARNAME */
    if (QD_SQLOP_IS_ATOM(pexpr->opcode)) /* No operands */
    {
        if (pexpr->opcode == QDSP_OP_COL) /* Column of table or view */
        {
            /* Is this a correlating reference, within a subquery of a
             * HAVING clause, to a column from the containing query?
             * If we're generating a subquery for the combining query,
             * we must be in the HAVING clause because the combining query
             * has no WHERE clause.  If the expression's datatype is 0,
             * this means it failed semantic analysis, probably because of
             * being a correlated reference. If there are intermediate
             * levels of subquery between the current subquery and the
             * outermost query, call qdsp_colqry to find out whether this
             * correlated reference resolves to one of their columns.  If
             * it does, no special handling is needed, because the column
             * doesn't belong to the outermost query. Else, try creating an
             * expr fo it, using the outermost query's expressions list for
             * common subexpression elimination.  If this is a correlated ref
             * to an expression in that list, it will be returned.  Otherwise,
             * a new expression will be returned, which we can discard once
             * we're done with it here.  (We can tell it's new if its
             * datatype is still 0.  If this happens, it probably means
             * we're in a deeply nested subquery, and the correlated
             * reference wasn't to a column of the outermost query.)
             */
            if (pexpr->datatype == 0 &&
                command == (QDCP_GEN_CQ | QDCP_GEN_SUBQ) &&
                pqdef->ptree->check == QDCK_QRY)
            {
                /* The code here is essentially replicated in
                 * resolve_col_ref() below.  Any changes here
                 * should also be applied there.  Perhaps in
                 * the future, this code should become a
                 * function call to resolve_col_ref().
                 */
                for (pouter_qry = pqry->pparent;
                     pouter_qry != NULL &&
                     (pouter_qry->flags & QDSP_QRY_SUBQ) &&
```

```
                     pexpr->datatype == 0;
                     pouter_qry = pouter_qry->pparent)
                {
                    retval = qdsp_colqry(pexpr, pouter_qry->ptabs,
                                         pouter_qry->ntabs, pstrings);

                    /* If the column is not found, then QDpcomm -> status
                     * has been set to QD_SP_TABCOL_NOT_FOUND.  We need
                     * to clear the status and the return value because
                     * the column should be found in tables for the outermost
                     * query, hence there is no reason to reject the query
                     * for decomposition here.
                     * (If not found, then the Oracle parser has made the error.)
                     * It should be sufficient to check here.  However, it
                     * may be safer to wait until after qdsp_createxpr
                     * resolves the tables in the unlikely chance that it
                     * cannot.  For now, this is a reasonable place for
                     * the reset.
                     */

                    if (retval == QD_SP_TABCOL_NOT_FOUND)
                    {
                        QDRESET;
                        retval = QD_OK;
                    }


                    if (QDFAILED)
                        goto error_return;
                }
                if (pexpr->datatype /* still */ == 0)
                {
                    pcorrelref =
                        qdsp_createxpr(pexpr->opcode, 0, 0,
                                       pexpr->u.col.oname, pexpr->u.col.lname,
                                       pexpr->u.col.oqual, pexpr->u.col.lqual,
                                       pexpr->u.col.oschema,
                                       pexpr->u.col.lschema,
                                       (QDSP_EXPR *)NULL,
                                       (QDSP_EXPR *)NULL,
                                       &(pqdef->ptree->qry.pfirexpr));

                    if (pcorrelref != NULL)
                    {
                        if (pcorrelref->datatype == 0)
                            qdrt_free(&pcorrelref);
                        else
                        {
                            /* This may be a false match, if
                             * expression in outer query was not
                             * qualified by table name.
                             * Check for this.
                             */
                            if (pexpr->u.col.lqual &&
                                !pcorrelref->u.col.lqual)
                                qdrt_free(&pcorrelref);
                            else
                                return print_expr(QDCP_GEN_CQ, pqdef,
                                                  &(pqdef->ptree->qry),
                                                  pcorrelref, pbuf);
                        } /* else */
                    }
                } /* if expr's datatype still == 0 */
            } /* if this might be a correlated reference in subq of HAVING */

            if (pexpr->u.col.lqual) /* qualified column name */
            {
                /* Always print double quotes around the qualifier,
                 * in case it was a delimiter identifier.  ORACLE considers
                 * this legal, even if quotes weren't used in the original
                 * query, and even if the qualifier is an actual table name,
                 * rather than an alias.  E.g. jeff."emp".lname is a legal
```

143

```
             * reference.
             */
            if (pexpr->u.col.lschema)
                sprintf(pbuf, "%s.\"%s\".%s",
                        pstrings + pexpr->u.col.oschema,
                        pstrings + pexpr->u.col.oqual,
                        pstrings + pexpr->u.col.oname);
            else
                sprintf(pbuf, "\"%s\".%s", pstrings + pexpr->u.col.oqual,
                                           pstrings + pexpr->u.col.oname);
        }
        else /* unqualified column name */
        {
            strcpy(pbuf, pstrings + pexpr->u.col.oname);
        }

    } /* column */
    else if (pexpr->opcode == QDSP_OP_LIT) /* Literal */
    {
        if (pexpr->datatype == DTYCHR ||
            pexpr->datatype == DTYDAT)
            sprintf(pbuf, "\'%s\'", pstrings + pexpr->u.lit.oval);
        else
            strcpy(pbuf, pstrings + pexpr->u.lit.oval);
    } /* literal */
    else if (pexpr->opcode == QDSP_OP_HOSTVAR) /* Host variable */
    {
        if (pexpr->u.hostvar.lind) /* Indicator specified */
            sprintf(pbuf, ":%s :%s", pstrings + pexpr->u.hostvar.oname,
                    pstrings + pexpr->u.hostvar.oind);
        else
            sprintf(pbuf, ":%s", pstrings + pexpr->u.hostvar.oname);
    } /* host variable */
    else if (pexpr->opcode == QDSP_OP_NEXTVAL ||
             pexpr->opcode == QDSP_OP_CURRVAL) /* sequence reference */
    {
        if (pexpr->u.seqref.lschema) /* qualified by schema */
            sprintf(pbuf, "%s.%s.%s", pstrings + pexpr->u.seqref.oschema,
                    pstrings + pexpr->u.seqref.oseqname,
                    QD_SQLOP_STRING(pexpr->opcode));
        else
            sprintf(pbuf, "%s.%s", pstrings + pexpr->u.seqref.oseqname,
                    QD_SQLOP_STRING(pexpr->opcode));
    } /* sequence reference */
    else /* system field - just print its name */
    {
        strcpy(pbuf, QD_SQLOP_STRING(pexpr->opcode));
    } /* system field */

    BUFCHECK(strlen(pbuf));
} /* atomic operator */

else if (QD_SQLOP_IS_INFIX(pexpr->opcode)) /* Infix operator */
{
    /* If operator is AND, and we're processing the HAVING clause for
     * the PSQ, if one operand is flagged QDSP_OMIT_IN_PSQ_HAVING,
     * omit that operand and the AND itself, and process the other
     * operand.
    */
    if (command == QDCP_GEN_PSQ_HAVING && pexpr->opcode == QDSP_OP_AND)
    {
        if (pexpr->u.op.prand1->u.op.flags & QDSP_OMIT_IN_PSQ_HAVING)
            return print_expr(command, pqdef, pqry, pexpr->u.op.prand2,
                              pbuf);
        else if (pexpr->u.op.prand2->u.op.flags & QDSP_OMIT_IN_PSQ_HAVING)
            return print_expr(command, pqdef, pqry, pexpr->u.op.prand1,
                              pbuf);
    }

    /* Process first operand */
    if (pexpr->u.op.prand1 != NULL)
    {
        /* If it might be necessary, surround first operand */
```

```
        /* with parentheses */
        need_parens = (!(QD_SQLOP_IS_ATOM(pexpr->u.op.prand1->opcode) ||
                         QD_SQLOP_IS_POSTFIX(pexpr->u.op.prand1->opcode) ||
                         QD_SQLOP_IS_PREFIX(pexpr->u.op.prand1->opcode) ||
                         QD_SQLOP_IS_FUNC(pexpr->u.op.prand1->opcode)));
        if (need_parens)
            *pbuf++ = '(';

        pbuf = print_expr(command, pqdef, pqry, pexpr->u.op.prand1, pbuf);

        if (need_parens)
            *pbuf++ = ')';
    }

    /* Print the infix operator, possibly preceded by "NOT", and
     * possible followed by "ANY" or "ALL".
    */
    sprintf(pbuf, " %s%s%s",
            (pexpr->u.op.flags & QDSP_EXPR_NOT ? "NOT " : ""),
            QD_SQLOP_STRING(pexpr->opcode),
            (pexpr->u.op.flags & QDSP_EXPR_ALL ? " ALL" :
             (pexpr->u.op.flags & QDSP_EXPR_ANY ? " ANY" : "")));
    BUFCHECK(strlen(pbuf));

    /* Process second operand */
    if (pexpr->u.op.prand2 != NULL)
    {
        /* If it might be necessary, surround second operand */
        /* with parentheses */
        need_parens =
            (pexpr->opcode != QDSP_OP_BETWEEN &&
             (!(QD_SQLOP_IS_ATOM(pexpr->u.op.prand2->opcode) ||
                QD_SQLOP_IS_POSTFIX(pexpr->u.op.prand2->opcode) ||
                QD_SQLOP_IS_PREFIX(pexpr->u.op.prand2->opcode) ||
                QD_SQLOP_IS_FUNC(pexpr->u.op.prand2->opcode))
              || pexpr->opcode == QDSP_OP_IN));
        if (need_parens)
        {
            strcpy(pbuf, " (");
            BUFCHECK(strlen(pbuf));
        }

        /* Handle IN as special case: second operand may be
         * comma-separated list (but this code works ok for
         * subquery as well).
         */
        if (pexpr->opcode == QDSP_OP_IN)
            pbuf = print_expr_list(command, pqdef, pqry,
                                   pexpr->u.op.prand2, pbuf);
        else
            pbuf = print_expr(command, pqdef, pqry,
                              pexpr->u.op.prand2, pbuf);

        if (need_parens)
            *pbuf++ = ')';
    } /* if second operand isn't null */
} /* infix operator */
else if (QD_SQLOP_IS_PREFIX(pexpr->opcode)) /* prefix operators */
{
    /* Prefix operators have only one argument */
    sprintf(pbuf, " %s", QD_SQLOP_STRING(pexpr->opcode));
    BUFCHECK(strlen(pbuf));

    /* If it might be necessary, surround first operand */
    /* with parentheses */
    need_parens = (!(QD_SQLOP_IS_ATOM(pexpr->u.op.prand1->opcode) ||
                     QD_SQLOP_IS_POSTFIX(pexpr->u.op.prand1->opcode) ||
                     QD_SQLOP_IS_PREFIX(pexpr->u.op.prand1->opcode) ||
                     QD_SQLOP_IS_FUNC(pexpr->u.op.prand1->opcode)));
    if (need_parens)
    {
        strcpy(pbuf, " (");
        BUFCHECK(strlen(pbuf));
```

```
        }
        pbuf = print_expr(command, pqdef, pqry, pexpr->u.op.prand1, pbuf);

        if (need_parens)
            *pbuf++ = ')';
    } /* prefix operator */
    else if (QD_SQLOP_IS_POSTFIX(pexpr->opcode)) /* postfix operators */
    {
        /* Postfix operators have only one argument.
         * Print it first, then print the operator.
        */
        pbuf = print_expr(command, pqdef, pqry, pexpr->u.op.prand1, pbuf);

        /* If it might be necessary, surround first operand */
        /* with parentheses */
        need_parens = (!(QD_SQLOP_IS_ATOM(pexpr->u.op.prand1->opcode) ||
                         QD_SQLOP_IS_POSTFIX(pexpr->u.op.prand1->opcode) ||
                         QD_SQLOP_IS_PREFIX(pexpr->u.op.prand1->opcode) ||
                         QD_SQLOP_IS_FUNC(pexpr->u.op.prand1->opcode)));
        if (need_parens)
            *pbuf++ = '(';

        /* Now print operator.  IS NULL is a special case, because it
         * might be negated.
        */
        if (pexpr->opcode == QDSP_OP_ISNULL &&
            (pexpr->u.op.flags & QDSP_EXPR_NOT))
            strcpy(pbuf, " IS NOT NULL");
        else
            sprintf(pbuf, " %s", QD_SQLOP_STRING(pexpr->opcode));
        BUFCHECK(strlen(pbuf));

        if (need_parens)
            *pbuf++ = ')';
    } /* postfix operators */
    else if (QD_SQLOP_IS_FUNC(pexpr->opcode))
    {
        /* Aggregate functions require special transformations in
         * the Combining Query, unless they are outer nested aggregates.
        */

        if ((command & QDCP_GEN_CQ) && QD_SQLOP_IS_AGGR(pexpr->opcode)
            && !(pexpr->u.op.flags & QDSP_EXPR_OUTER_NESTED_AGGR))

        {
          if (command & QDCP_GEN_SUBQ)    /* look for common aggregate in subquery */
          {
            pcorrelref = search_for_common_aggr_expr(pqdef, pqry, pexpr);
            if (pcorrelref != pexpr) /* correlated ref to outermost query */
            {
                /* Use the expression struct from the referenced outermost
                 * instead of the subquery expression struct.  So, process
                 * the function again, but use a different expression list.
                 * We call print_expr instead of print_expr_list because
                 * we send a function struct, not an operand struct.
                */
                pbuf = print_expr(QDCP_GEN_CQ, pqdef, &(pqdef->ptree->qry), pcorre
lref, pbuf);

            }   /* if pcorrelref != pexpr */
            else  /* not a common subexpression with outermost */
            {

                sprintf(pbuf, "%s(%s", QD_SQLOP_STRING(pexpr->opcode),
                        (pexpr->u.op.flags & QDSP_EXPR_DISTINCT) ?
                        "DISTINCT" : "");
                BUFCHECK(strlen(pbuf));

                /* COUNT(*) is special case: first operand is NULL */
                if (pexpr->opcode == QDSP_OP_COUNT && pexpr->u.op.prand1 == NULL)
                  *pbuf++ = '*';
                else
                {
```

```
                    /* Here we process the operands, so we use the
                     * list case of print_expr (i.e., print_expr_list).
                     */
                    pbuf = print_expr_list(command, pqdef, pqry,
                                           pexpr->u.op.prand1, pbuf);

                    /* If function has more than one operand, print a comma and
                     * print the subsequent operands
                     */
                    if (pexpr->u.op.prand2 != (QDSP_EXPR *)NULL)
                    {
                        *pbuf++ = ',';
                        pbuf = print_expr_list(command, pqdef, pqry,
                                               pexpr->u.op.prand2, pbuf);
                    }
                } /* else (not COUNT(*)) */
                *pbuf++ = ')';

            } /* not a common subexpression */
        } /* subquery */

        else  /* not a subquery */

        {
          if (pexpr->opcode == QDSP_OP_AVG ||
              pexpr->opcode == QDSP_OP_STDDEV ||
              pexpr->opcode == QDSP_OP_VARIANCE)
          {
           /* For STDDEV and VARIANCE, we must protect against
            * attempted divide-by-0 in the case where there turns out
            * to be only one value.  To do this, we generate a DECODE
            * expression of the form:
            *
            *  DECODE(SUM(COUNTCOL), 1, 0, <expr for STDDEV or VARIANCE>)
            *
            * This means: if there's only 1 value, return the value 0
            * (the correct answer for STDDEV or VARIANCE of a single
            * value), else go ahead and compute STDDEV or VARIANCE.
            */
           if (pexpr->opcode == QDSP_OP_STDDEV ||
               pexpr->opcode == QDSP_OP_VARIANCE)
           {
               strcpy(pbuf, "DECODE(");
               BUFCHECK(strlen(pbuf));

               /* In case query has nested aggregates, turn off the
                * nested-aggregates flag while we recurse on the
                * SUM and COUNT expressions, to they'll be treated
                * as inner-nested-aggregate columns rather than like
                * aggregates over group columns.
                */
               save_qry_flags = pqry->flags;

               pqry->flags &= ~QDSP_QRY_NESTED_AGGR;

               pbuf = print_expr(command, pqdef, pqry,
                                 pqry->pcolmap[pqry->pcolmap
                                               [pexpr->colmap_index].
                                               countcol].pexpr,
                                 pbuf);

               /* Restore previous value of query flags */
               pqry->flags = save_qry_flags;

               strcpy(pbuf, ",1,0,");
               BUFCHECK(strlen(pbuf));
           }

           if (pexpr->opcode == QDSP_OP_STDDEV)
           {
               strcpy(pbuf, "SQRT");
               BUFCHECK(strlen(pbuf));
           }
```

145

Dec 13 1993 10:59:39 qdcp_qgen.c Page 21

```
            *pbuf++ = '(';

            if (pexpr->opcode == QDSP_OP_AVG)
            {
                /* SUM(SUMCOL) / SUM(COUNTCOL) */

                /* In case query has nested aggregates, turn off the
                 * nested-aggregates flag while we recurse on the
                 * SUM and COUNT expressions, to they'll be treated
                 * as inner-nested-aggregate columns rather than like
                 * aggregates over group columns.
                 */
                save_qry_flags = pqry->flags;
                pqry->flags &= ~QDSP_QRY_NESTED_AGGR;


                  pbuf = print_expr(command, pqdef, pqry,
                                    pqry->pcolmap[pqry->pcolmap
                                                  [pexpr->colmap_index].
                                                  sumcol].pexpr,
                                    pbuf);
                  *pbuf++ = '/';
                  pbuf = print_expr(command, pqdef, pqry,
                                    pqry->pcolmap[pqry->pcolmap
                                                  [pexpr->colmap_index].
                                                  countcol].pexpr,
                                    pbuf);

                /* Restore previous value of query flags */
                pqry->flags = save_qry_flags;

            } /* AVG */
            else /* VARIANCE or STDDEV */
            {
                /*
                 *   (1/(SUM(COUNTCOL) - 1)) *
                 *   (SUM(SUMSQRCOL) - POWER(SUM(SUMCOL),2)
                 *   / SUM(COUNTCOL))
                 */

                /* In case query has nested aggregates, turn off the
                 * nested-aggregates flag while we recurse on the
                 * SUM and COUNT expressions, to they'll be treated
                 * as inner-nested-aggregate columns rather than like
                 * aggregates over group columns.
                 */
                save_qry_flags = pqry->flags;
                pqry->flags &= ~QDSP_QRY_NESTED_AGGR;

                strcpy(pbuf, "(1/(");
                BUFCHECK(strlen(pbuf));
                pbuf = print_expr(command, pqdef, pqry,
                                  pqry->pcolmap[pqry->pcolmap
                                                [pexpr->colmap_index].
                                                countcol].pexpr,
                                  pbuf);
                strcpy(pbuf, " - 1)) * (");
                BUFCHECK(strlen(pbuf));
                pbuf = print_expr(command, pqdef, pqry,
                                  pqry->pcolmap[pqry->pcolmap
                                                [pexpr->colmap_index].
                                                sumsqrcol].pexpr,
                                  pbuf);
                strcpy(pbuf, " - POWER(");
                BUFCHECK(strlen(pbuf));
                pbuf = print_expr(command, pqdef, pqry,
                                  pqry->pcolmap[pqry->pcolmap
                                                [pexpr->colmap_index].
                                                sumcol].pexpr,
                                  pbuf);
                strcpy(pbuf, ", 2) /");
                BUFCHECK(strlen(pbuf));
                pbuf = print_expr(command, pqdef, pqry,
```

Dec 13 1993 10:59:39 qdcp_qgen.c Page 22

```
                                  pqry->pcolmap[pqry->pcolmap
                                                [pexpr->colmap_index].
                                                countcol].pexpr,
                                  pbuf);
                *pbuf++ = ')';

                /* And an extra close paren to close the DECODE expr. */
                *pbuf++ = ')';

                /* Restore previous value of query flags */
                pqry->flags = save_qry_flags;

            } /* else VARIANCE or STDDEV */
            *pbuf++ = ')';
        }
        /* If this is an aggregate expression, and the query
         * has nested aggregates, and this is not the inner
         * aggregate of a nested aggregate, then recurse to print
         * the operand of the aggregate.
         */
        else if ((pqry->flags & QDSP_QRY_NESTED_AGGR)
                 && QD_SQLOP_IS_AGGR(pexpr->opcode) &&
                 !(pexpr->u.op.flags & QDSP_EXPR_INNER_NESTED_AGGR))
        {
            sprintf(pbuf, "%s(", QD_SQLOP_STRING(pexpr->opcode));
            BUFCHECK(strlen(pbuf));
            pbuf = print_expr(command, pqdef, pqry,
                              pexpr->u.op.prand1, pbuf);
            *pbuf++ = ')';
        }
        else /* not AVG, STDDEV, or VARIANCE */
        {
            /* In CQ, COUNT transforms to SUM */
            sprintf(pbuf, "%s(", pexpr->opcode == QDSP_OP_COUNT ?
                    "SUM" : QD_SQLOP_STRING(pexpr->opcode));
            BUFCHECK(strlen(pbuf));

            /* In CQ, aggregates are always over the IT column which
             * gathered their intermediate results.
             */
            sprintf(pbuf, "%s_%s%d)",
                    (QD_SQLOP_IS_AGGR(pexpr->opcode) ?
                     ((pexpr->opcode == QDSP_OP_SUM &&
                     pexpr->u.op.prand1->opcode == QDSP_OP_POWER) ?
                     "SUMSQR" : QD_SQLOP_STRING(pexpr->opcode))
                    : "GRP"),                                    /*%03*/
                    QDCP_IT_COL_PREFIX,
                    pqry->pcolmap[pexpr->colmap_index].it_colnum);
            BUFCHECK(strlen(pbuf));

        } /* else not AVG, STDDEV, or VARIANCE */

      } /* not a subquery */
    } /* if we're generating CQ */
    else
    {
        sprintf(pbuf, "%s(%s", QD_SQLOP_STRING(pexpr->opcode),
                (pexpr->u.op.flags & QDSP_EXPR_DISTINCT) ?
                "DISTINCT" : "");
        BUFCHECK(strlen(pbuf));

        /* COUNT(*) is special case: first operand is NULL */
        if (pexpr->opcode == QDSP_OP_COUNT && pexpr->u.op.prand1 == NULL)
            *pbuf++ = '*';
        else
        {
            pbuf = print_expr_list(command, pqdef, pqry,
                                   pexpr->u.op.prand1, pbuf);

            /* If function has more than one operand, print a comma and
             * print the subsequent operands
             */
            if (pexpr->u.op.prand2 != (QDSP_EXPR *)NULL)
```

146

Dec 13 1993 10:59:39 qdcp_qgen.c Page 23

```
                {
                    *pbuf++ = ',';
                    pbuf = print_expr_list(command, pqdef, pqry,
                                           pexpr->u.op.prand2, pbuf);
                }
            } /* else (not COUNT(*)) */
            *pbuf++ = ')';
        } /* else we're not generating CQ */
    } /* function-style operator */

    else if (pexpr->opcode == QDSP_OP_SUBQRY)
    {
        text *pbuf_parm; /* Non-register pbuf to pass by reference */

        pbuf_parm = pbuf;

        /* Set the subquery's parent pointer to the current query, and set
         * flag indicating this is a subquery.  (NOTE: This doesn't get
         * done until now because it isn't needed any earlier, and this
         * is the first time we're traversing the tree of queries and their
         * expression trees in a convenient order to do this.  It's needed
         * once we get inside the subquery, in case a correlated reference
         * to a column of an outer query is encountered, so we can trace
         * back up the chain of containing queries, from inner to outer. The
         * correlated reference gets resolved by the innermost query with
         * a matching column in any of its FROM clause tables.
         */
        pexpr->u.subqry.psubqry->pparent = pqry;
        pexpr->u.subqry.psubqry->flags |= QDSP_QRY_SUBQ;

        qdcp_qgen((command | QDCP_GEN_SUBQ), pqdef,
                  pexpr->u.subqry.psubqry, &pbuf_parm);
        pbuf = pbuf_parm;
    } /* subqry */

    else /* Probably an unrecognized opcode */
    {
        strcpy(pbuf, QD_SQLOP_STRING(pexpr->opcode));
        BUFCHECK(strlen(pbuf));
    }
error_return:
    return pbuf;
} /* print_expr */


/* print_expr_list - print SQL text for a comma-separated list of
 * expressions.  The expressions are passed as a tree of 'link' operators
 * and other expression types; a 'link' operator's left operand is the list
 * which preceeds the 'link' operator's right operands.
 */
static text *print_expr_list(command, pqdef, pqry, pexpr, pbuf)
reg5 ub4 command;          /* What kind of query to generate. Possible values */
                           /*  are QDCP_GEN_PSQ and QDCP_GEN_CQ, either of */
                           /*  which may be or'd with QDCP_GEN_SUBQ if we */
                           /*  are within a subquery */
reg1 QDSP_QDEF *pqdef;     /* Pointer to query definition (parse tree root) */
reg6 QDSP_QRY *pqry;       /* Pointer to query structure for select block */
reg2 QDSP_EXPR *pexpr;     /* Generate SQL text for this expression */
reg3 text *pbuf;           /* Generate text into this buffer */
{
    reg4 text *pstrings = pqdef->pstrings;

    if (pexpr == (QDSP_EXPR *)NULL)
        return pbuf;

    if (pexpr->opcode == QDSP_OP_LINK)
    {
        pbuf = print_expr_list(command, pqdef, pqry,
                               pexpr->u.op.prand1, pbuf);
        if (pexpr->u.op.prand2 != NULL)
        {
            *pbuf++ = ',';
            pbuf = print_expr_list(command, pqdef, pqry,
```

Dec 13 1993 10:59:39 qdcp_qgen.c Page 24

```
                                   pexpr->u.op.prand2, pbuf);
        }
    }
    else
        pbuf = print_expr(command, pqdef, pqry, pexpr, pbuf);

    return pbuf;
} /* print_expr_list */


/* growbuf - Replace current query text buffer with a larger one, return
 * pointer to same offset in new buffer, as pcurrent pointed to in old
 * buffer.
 */
static text *growbuf(pcurrent)
reg1 text *pcurrent; /* Pointer to current location in old buffer */
{
    reg2 ub4 oldsize;
    text *poldbuf;

    QDBEGIN("growbuf");

    poldbuf = QD_PQBUF;
    oldsize = QD_QBUF_CURRENT_SIZE;
    QD_QBUF_CURRENT_SIZE *= QD_QBUF_GROWTH_FACTOR;
    QD_PQBUF = qdrt_malloc(QD_QBUF_CURRENT_SIZE);
    if (!QDFAILED)
    {
        memcpy(QD_PQBUF, poldbuf, oldsize);
        pcurrent = QD_PQBUF + (pcurrent - poldbuf);
        qdrt_free(&poldbuf);
    }
    QDEND;
    return pcurrent;
} /* growbuf */

/* qdcp_growbuf: external entrypoint to growbuf, for calling from
 * qdxp_genplan.
 */
text *qdcp_growbuf(pcurrent)
reg1 text *pcurrent;
{
    return growbuf(pcurrent);
} /* qdcp_growbuf */



/* search_for_common_aggr_expr:  look for same aggregate function,
 * with same operands in expr list of outer query.
 * Returns a pointer to the beginning of the common expression, if found.
 * Else returns a pointer to the origin expression (pexpr).
 */
static QDSP_EXPR * search_for_common_aggr_expr(pqdef, pqry, pexpr)
reg1 QDSP_QDEF *pqdef;  /* Pointer to query definition */
reg3 QDSP_QRY *pqry;    /* Pointer to query structure */
reg2 QDSP_EXPR *pexpr;  /* Pointer to expr structure for aggr we are searching for *
/
{
    QDSP_EXPR *poldexpr;            /* Pointer to expr struct on outer query list */
    bool outer_col_flag = FALSE;    /* Keep track of use of outer cols in aggr expr */
    bool retval = TRUE;             /* Hold return value of is_same_aggr_expr(). */

    /* loop thru outer expr list */
    for (poldexpr = pqdef->ptree->qry.pfirexpr;
         poldexpr != (QDSP_EXPR *) NULL;
         poldexpr = poldexpr->pnext)

    {
        /* same opcode, so maybe same function */
        if (pexpr->opcode == poldexpr->opcode)
        {

            retval = is_same_aggr_expr(pqdef, pqry, pexpr,
```

147

```
                              poldexpr, &outer_col_flag);


            /* If retval is TRUE, we have the same exact aggregate
             * so return pointer to expression in outer query list */
            if (retval)
              return poldexpr;

        }
    }

    /* If we get here, then exact match was not found.
     * Now we need to ensure that no column in the aggregate expression
     * scopes to the outer query.  If one does, then the query is not
     * decomposable by current means.  The check of outer_col_flag will
     * speed this up, if it's set to TRUE, because it indicates immediately
     * that a correlated reference is in the aggregate.  Else,
     * check the entire expression in case it was never looked at in entirety.
     */

    if (outer_col_flag == TRUE)
      QDFAIL(QD_CP_NON_MATCHING_AGGR_REFERENCE);

    else if (are_cols_outer_correlref(pqdef, pqry, pexpr))
        QDFAIL(QD_CP_NON_MATCHING_AGGR_REFERENCE);

    return pexpr;    /* no exact match found */
} /* search_for_common_aggr_expr */


/* is_same_aggr_expr:  Determine if two expressions are equivalent
 * Returns bool: TRUE is equiv, FALSE if not.
 */
static bool is_same_aggr_expr(pqdef, pqry, pexpr, poldexpr, pouter_col_flag)
reg1 QDSP_QDEF *pqdef;          /* Pointer to query definition */
reg3 QDSP_QRY *pqry;            /* Pointer to query structure */
reg2 QDSP_EXPR *pexpr;          /* Pointer to expr structure for aggr we are searching
for */
reg5 QDSP_EXPR *poldexpr;       /* Pointer to expr in outer list we are comparing *pexp
r to */
reg4 bool *pouter_col_flag;     /* Keep track of use of outer cols in aggr expr */

{
    QDSP_EXPR *pcorrelref;      /* Hold ptr to common column expression */

    bool retval = FALSE;        /* Return FALSE if not same, TRUE if they are the same
*/
                                /* Use &= for recursive calls. If anything doesn't */
                                /* match, the entire expression doesn't match */

    /* At the very least, the opcodes have to match */
    if (pexpr->opcode == poldexpr->opcode)
    {
        /* Handle more than two operands */
        if (pexpr->opcode == QDSP_OP_LINK)
        {
            /* Don't use & here because retval is init to FALSE.
             * Probably can just call simple_expr()
             */
            retval = is_same_aggr_expr(pqdef, pqry, pexpr->u.op.prand1,
                                 poldexpr->u.op.prand1, pouter_col_flag);

            /* If retval is FALSE, we can get out early, since we have no match */
            if (retval)
              if (pexpr->u.op.prand2 != NULL)
                retval &= is_same_aggr_expr(pqdef, pqry, pexpr->u.op.prand2,
                                 poldexpr->u.op.prand2, pouter_col_flag);
        } /* LINK */

        /* We handle columns differently because we need to check scope */
```

```
        else if(pexpr->opcode == QDSP_OP_COL) /* COL */
        {
          if (pexpr->datatype == 0) /* column is not local */
          {
            /* Figure out where column scopes */
            pcorrelref = resolve_col_ref(pqdef, pqry, pexpr);

            /* If pcorrelref != pexpr, column is in outer - keep
             * track of this in case entire expression not in outer
             */
            if (pcorrelref != pexpr)
            {
              *pouter_col_flag = TRUE;

              /* If the correlated ref is the outer column,
               * then match
               * else no match
               */

              if (pcorrelref == poldexpr)
                retval = TRUE;
              else retval = FALSE;
            }
            /* column not in outer, must be in middle somewhere, no match */
            else retval = FALSE;

          } /* datatype of 0 */

          /* column is local, hence not in outer, no match */
          else retval = FALSE;

        } /* COL */


        /* OPs, LITs, HOSTVARs, pseudo-cols, sys functions
         * The order is important here.  This case should be last because COLs are a
lso
         * VAL and ATOM.
         */

        else if ((QD_SQLOP_IS_OP(pexpr->opcode))
              || (pexpr->opcode == QDSP_OP_LIT)
              || (pexpr->opcode == QDSP_OP_HOSTVAR)
              || ((QD_SQLOP_IS_VAL(pexpr->opcode)) && (QD_SQLOP_IS_ATOM(pexpr->opcode)
)))
        {
          retval = is_same_simple_expr(pqdef, pexpr, poldexpr);

          if (retval)    /* get out early if we can */
          {
            /* For OPs also need to check operands */
            if(QD_SQLOP_IS_OP(pexpr->opcode))
            {
              if (pexpr->u.op.prand1 != NULL)
                retval &= is_same_aggr_expr(pqdef, pqry, pexpr->u.op.prand1,
                                   poldexpr->u.op.prand1, pouter_col_
flag);

              /* If retval is FALSE, we can just get out because there is no m
atch */

              if (retval)
                if (pexpr->u.op.prand2 != NULL)
                  retval &= is_same_aggr_expr(pqdef, pqry, pexpr->u.op.prand2,

                                   poldexpr->u.op.prand2, pouter_co
l_flag);
            } /* OP */
          } /* retval */
        } /* OP or LIT or HOSTVAR or (VAL and ATOM) */


    } /* opcodes match */
```

Dec 13 1993 10:59:39 qdcp_qgen.c Page 27

```
    return retval;

} /* is_same_aggr_expr */


/* Like create_expr() in qdsql.y.  Determines if two simple expression structs
 * are semantically equivalent, where one of the expressions is in the
 * outer query.  Returns a bool value: TRUE if equiv, FALSE if not.
 * NOTE: Changes made here might need to be mirrored in create_expr().
 */
static bool is_same_simple_expr(pqdef, pexpr, poldexpr)
QDSP_QDEF *pqdef;  /* Pointer to root struct of overall parse tree */
QDSP_EXPR *pexpr;  /* Pointer to expr to find dup of in outermost expr list */
QDSP_EXPR *poldexpr; /* Pointer to expression in outermost expression list */
{

    text *pstrings = pqdef->pstrings;
    bool retval = FALSE;

    /* the minimum requirement */
    if (pexpr->opcode != poldexpr->opcode)
      return FALSE;

    if (pexpr->opcode == QDSP_OP_LIT)    /* Literals */
    {
      if ((pexpr->datatype == poldexpr->datatype)
          && ((pexpr->u.lit.lval == 0 && poldexpr->u.lit.lval == 0)
              || ((pexpr->u.lit.lval == poldexpr->u.lit.lval)
                  && (!memcmp(pstrings + pexpr->u.lit.oval,
                              pstrings + poldexpr->u.lit.oval,
                              pexpr->u.lit.lval)))))

        retval = TRUE;    /* the same expression */
    }

    else if (pexpr->opcode == QDSP_OP_HOSTVAR)
    {
        if (((pexpr->u.hostvar.lname == 0
              && poldexpr->u.hostvar.lname == 0)
             || ((pexpr->u.hostvar.lname == poldexpr->u.hostvar.lname)
                 && (!memcmp(pstrings + pexpr->u.hostvar.oname,
                             pstrings + poldexpr->u.hostvar.oname,
                             pexpr->u.hostvar.lname))))

            && ( (pexpr->u.hostvar.lind == 0
                  && poldexpr->u.hostvar.lind == 0)
                || ( (pexpr->u.hostvar.lind == poldexpr->u.hostvar.lind)
                    && (!memcmp(pstrings + pexpr->u.hostvar.oind,
                                pstrings + poldexpr->u.hostvar.oind,
                                pexpr->u.hostvar.lind)))))

          retval = TRUE;
    }

    else if (QD_SQLOP_IS_OP(pexpr->opcode))
    {

        /* Most fields are irrelevant for comparison.  The only iffy
         * one is datatype.  But it seems that datatype is only set for a
         * function if it translates directly into columns in the PSQ.
         * Hence, this is filled in only for outermost query, so we won't
         * get a match for the inner.   We just ignore datatype.   Even if
         * we don't pick it up here by mistake, we get it when we look at
         * the operands.
         */

        if (pexpr->u.op.nrands == poldexpr->u.op.nrands)

          retval = TRUE;

    }
```

Dec 13 1993 10:59:39 qdcp_qgen.c Page 28

```
        /* Now handle pseudo-columns and system fields.
         * The order is important here.  This case should be last
         * because COL and LIT also are VAL and ATOM.
         */

      else if (QD_SQLOP_IS_VAL(pexpr->opcode)
               && QD_SQLOP_IS_ATOM(pexpr->opcode))
      {

          /* Only the opcode matters in this case */

          retval = TRUE;
      }

    return retval;
} /* is_same_simple_expr */


/* Return pointer to column expression *pexpr refers to, if it is a correlated
 * reference.  Else, return pexpr.  Assumes column is not local.  The code in
 * this function is essentially the same as a code segment in print_expr().
 * Any changes here should be done there also.
 */
static QDSP_EXPR *resolve_col_ref(pqdef, pqry, pexpr)
QDSP_QDEF *pqdef;      /* Pointer to query definition */
QDSP_QRY *pqry;        /* Pointer to the query we are qgen-ing */
QDSP_EXPR *pexpr;      /* Pointer to the expression we want to find */
{

    QDSP_QRY *pouter_qry;    /* Holder for query we are checking for scope */
    QDSTATUS retval;         /* Return val of qdsp_colqry */
    QDSP_EXPR *pcorrelref;   /* Pointer to common column in outer query, if found */
    QDSP_EXPR *pholdexpr;    /* Need to hold the original pexpr, to restore it */
    QDSP_EXPR *preturnexpr = pexpr;    /* Pointer to expression to return */
                                       /* Assume we won't find a matching
                                        * column in outer list.
                                        */

    pholdexpr = (QDSP_EXPR *)qdrt_malloc(sizeof(QDSP_EXPR));

    /* Better than just copying the relevant fields ? */
    memcpy(pholdexpr, pexpr, sizeof(QDSP_EXPR));

     /* loop thru 'middle' expression lists */
    for (pouter_qry = pqry->pparent;
         pouter_qry != (QDSP_QRY *) NULL &&
         (pouter_qry->flags & QDSP_QRY_SUBQ) &&
         pexpr->datatype == 0;
         pouter_qry = pouter_qry->pparent)

    {
        /* Look for common column */
        retval = qdsp_colqry(pexpr, pouter_qry->ptabs,
                             pouter_qry->ntabs, pqdef->pstrings);

        /* False error from qdsp_colqry.
         * Safe to ignore since column will be found
         * in outer.  See earlier comment on QDRESET
         * following a call to qdsp_colqry in print_expr().
         */
        if (retval == QD_SP_TABCOL_NOT_FOUND)
          QDRESET;


    }  /* loop thru middle lists */

    /* If datatype is still 0, not found in middle or there is no middle */
    if (pexpr->datatype == 0)
    {
        /* Try to create an expression for it.  If we get a new expression,
         * then not found in outer.
         * Else, it's a column in common with outer query
```

149

```
        * We know an expression was created if the datatype comes back as 0.
        */

       pcorrelref = qdsp_createxpr(pexpr->opcode, 0, 0,
                                   pexpr->u.col.oname, pexpr->u.col.lname,
                                   pexpr->u.col.oqual, pexpr->u.col.lqual,
                                   pexpr->u.col.oschema, pexpr->u.col.lschema,
                                   (QDSP_EXPR *) NULL,
                                   (QDSP_EXPR *) NULL,
                                   &(pqdef->ptree->qry.pfirexpr));

       if (pcorrelref != NULL)    /* for safety */
       {
           /* If datatype not 0, found a common column - should be the case */
           if (pcorrelref -> datatype != 0)

             /* This may be a false match, if expression in outer
              * query was not qualified by table name.  Check for this.
              * Not sure this is entirely necessary, but is done above in print_exp
r.
              */

             if (pexpr->u.col.lqual && !pcorrelref->u.col.lqual)
               qdrt_free(&pcorrelref);

             else preturnexpr = pcorrelref;

           else qdrt_free(&pcorrelref);  /* we don't need it */
       } /* pcorrelref != NULL */

    } /* datatype is 0 */

    memcpy(pexpr, pholdexpr, sizeof(QDSP_EXPR));  /* restore */

    qdrt_free(&pholdexpr);
    return preturnexpr;    /* no match */
} /* resolve_col_ref */


/* Check if any columns in aggregate function are references to columns
 * in the outer query.
 * Return TRUE if any column resolves to outer query, FALSE otherwise
 */
static bool are_cols_outer_correlref(pqdef, pqry, pexpr)
QDSP_QDEF *pqdef;          /* Pointer to query definition */
QDSP_QRY *pqry;            /* Pointer to query structure */
QDSP_EXPR *pexpr;          /* Pointer to expression we are checking scope of */
{
    QDSP_EXPR *pcorrelref;    /* Holder for return of resolve_col_ref */

    bool retval = FALSE;          /* Assume not correlated with outer */


    /* Only three cases to consider :  column, of course
     *                                 op, to pursue operands
     *                                 link, to pursue operands
     */
    if (pexpr->opcode == QDSP_OP_COL)        /* COL */
    {
      if (pexpr->datatype == 0)                          /* not a local reference */
      {
        pcorrelref = resolve_col_ref(pqdef, pqry, pexpr);
        if (pcorrelref != pexpr)                         /* found it in outer */
          retval = TRUE;
      }
    } /* COL */

    else if (QD_SQLOP_IS_OP(pexpr->opcode))     /* OP */
    {
        /* Need to use |= here because ANY correlated ref to outer query makes
         * the query non-decomposable by our current means */
```

```
        if (pexpr->u.op.prand1 != NULL)
          retval |= are_cols_outer_correlref(pqdef, pqry, pexpr->u.op.prand1);

        if (pexpr->u.op.prand2 != NULL)
          retval |= are_cols_outer_correlref(pqdef, pqry, pexpr->u.op.prand2);
    } /* OP */

    else if (pexpr->opcode == QDSP_OP_LINK)    /* Handle more than two operands */
    {
        retval |= are_cols_outer_correlref(pqdef, pqry, pexpr);

        if (pexpr->u.op.prand2 != NULL)
          retval |= are_cols_outer_correlref(pqdef, pqry, pexpr);

    } /* LINK */


    return retval;
} /* are_cols_outer_correlref */
```

130

Dec 13 1993 10:59:40 qdcp_seltran.c Page 1

```
/***************************************************************************
 * qdcp_seltran - Perform select list transformations for query decomposition
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***************************************************************************
 * REV   DATE      AUTHOR  DESCRIPTION
 * ---   --------  ------  -----------------------------------------------
 * %04   11/08/93  AS      is_expr_over_aggrs checks subqueries
 * %03   08/16/93  EYT     Call to qdrt_free sets pointer=NULL
 * %02   04/30/93  JM      Support GROUP-BY date
 * %01   03/08/93  JM      Support ORDER-BY/GROUP-BY queries
 * %00   10/17/91  JM      Initial Version
 ***************************************************************************
*/

#include <qdstd.h>
#include <qdrtext.h>
#include <qdcpext.h>
#include <qdspext.h>
#include <qderrs.h>
#include <memory.h>
#include <dtydef.h>

/* declare local routines */
static b4 is_expr_over_aggrs(
#ifdef __STDC__
QDSP_EXPR *
#endif /* __STDC__ */
); /* is_expr_over_aggrs */

static bool flag_having(
#ifdef __STDC__
QDSP_EXPR *
#endif /* __STDC__ */
); /* flag_having */

/* Possible return values of is_expr_over_aggrs */
#define YES_AGGRS 1          /* Aggregates were found in expression tree */
#define YES_NESTED_AGGRS (YES_AGGRS | 2)
                             /* Nested aggregates were found in expression */
#define NO_AGGRS 0           /* No aggregates were found */

extern bool QD_multi_group_it; /* If TRUE, use multi-group IT algorithm  */
                             /* for all grouped queries, not just those   */
                             /* with an ORDER BY clause (defined in       */
                             /* qdtst_getenv.c, TRUE unless env var       */
                             /* KSR_SINGLE_GROUP_TEMP_TABLE is set)       */

/***************************************************************************
 * qdcp_seltran - Perform select list transformations for query decomposition
 *
 ***************************************************************************
*/

QDSTATUS qdcp_seltran(pqdef, pqry)
reg1 QDSP_QDEF *pqdef;    /* Pointer to query def (root of parse tree) */
reg2 QDSP_QRY *pqry;      /* Transform select list of this query */
{
    reg3 int maxcols;           /* Maximum columns in expanded select list */
    reg4 QDSP_EXPR *pexpr;      /* Pointer into list of expressions */
    reg5 b4 i;                  /* Loop index */
    reg6 b4 it_colnum = 0;      /* Next intermediate table column number to */
                                /*  assign. */
    reg7 b4 psq_colnum = 0;     /* Next parallel subquery column number to */
                                /*  assign */
    reg8 b4 cq_colnum = 0;  /* Next combining query column number to assign */
    reg9 b4 iq_colnum = 0;      /* Next column number in IQ select list */
    reg10 QDCP_COLMAP *pcolmap; /* Pointer to column map */
    reg11 b4 cmi;               /* Column map index */
```

Dec 13 1993 10:59:40 qdcp_seltran.c Page 2

```
    reg12 bool select_star = FALSE; /* Set to TRUE is IQ select list is */
                                    /*  simply '*' */
    reg13 b4 retval;            /* Function return value */
    reg14 QDSP_EXPR *psum;      /* Replacement SUM function */
    QDSP_EXPR *pcount;          /* Replacement COUNT function */
    b4 date_format_offset = 0;  /* Offset of date format string in qdef */
                                /*  strings area */
    text itname[QDCP_IT_NAME_LEN]; /* Buffer for generating unique */
                                   /* intermediate table name. */
    /* Variables for resolving order-by columns specified by number */
    b4 column_id;               /* Column id of order by column */
    QDSP_TAB *ptab;             /* Table to which order-by column belongs */
    reg15 ub4 j;                /* Inner loop counter */

    QDBEGIN("qdcp_seltran");

    /* If query has both ORDER BY and GROUP BY clauses, set flag to     %01
     * indicate this below when special-case handling is required.
     * Also set this flag if QD_multi_group_it is TRUE, and there is
     * a GROUP BY clause - this will cause QD to use the multi-group
     * intermediate table algorithm, with PSQ's inserting direct to the
     * IT, which performs better for queries returning many groups, but
     * which risks producing an arbitrarily large intermediate table.
     * Do not set this flag if there is a table.* reference in the
     * select list, because we have not solved the problem of ensuring
     * that the order of columns in the CTS match those in the PSQ in this
     * case; nor if there are no aggregate expressions, because no combining
     * table is needed in that case.
     * Note: grouped INSERT/SELECT also requires using the multi-group IT
     * algorithm, as this ensures that the SELECT list of the CQ matches
     * column-for-column that of the IQ, so that SELECT list columns map
     * properly to target columns.
    */
    if (pqry->ngroupcols && (pqdef->nordcols || QD_multi_group_it
                             || (pqdef->flags & QDSP_QDEF_INSERT_SELECT)))
    {
        for (i = 0; i < pqry->nselitems; i++)
            if (pqry->pselist[i].pexpr == NULL) /* table.* reference */
                break;
        if (i >= pqry->nselitems) /* No table.* references */
        {
            /* Now check whether query contains any aggregate expressions;
             * if not, don't set the GROUP_AND_ORDER flag.
            */
            for (pexpr = pqry->pfirexpr; pexpr != NULL; pexpr = pexpr->pnext)
                if (QD_SQLOP_IS_AGGR(pexpr->opcode))
                    break;
            if (pexpr != NULL)
                pqry->flags |= QDSP_QRY_GROUP_AND_ORDER;
            else if (pqdef->nordcols)
            {
                /* We can't decompose a query that has GROUP BY, ORDER
                 * BY, and no aggregates.  Fortunately, this is a rarely-
                 * used construct, and the equivalent result can be
                 * accomplished by SELECT DISTINCT with order by, which
                 * we can decompose.
                */
                QDFAIL(QD_CP_INCORRECT_ORDER_AND_GROUP);
                goto error_return;
            }
        }
        else if (pqdef->nordcols)
        {
            /* We can't decompose a query that has GROUP BY, ORDER BY,
             * and a table.* reference in the select list.  Fortunately,
             * this is a fairly meaningless query construct which is
             * very unlikely to be used.
            */
            QDFAIL(QD_CP_INCORRECT_ORDER_AND_GROUP);
            goto error_return;
        }
    }
    /* If input query (IQ) select list consists simply of '*', replace this
```

Dec 13 1993 10:59:40 qdcp_seltran.c Page 3

```
 * with list of <table>.* for each table in FROM list.  This is
 * really only necessary if transformations below add any new select
 * list columns, but it turns out to save a lot of trouble if we do
 * this BEFORE finding out whether it's really necessary, and it never
 * hurts.  (Among other things, this means just ONE algorithm for
 * figuring out which table column corresponds to an ORDER-BY column
 * which was specified by column number rather than by name.)
 * (NOTE: If any columns not in the IQ select list get added to the
 * PSQ select list, the flag QDSP_QRY_EXPAND_STAR will be set for the
 * query.  After transformation, if this flag has not been set, then
 * '*' can be used in place of the expanded select list when
 * generating the PSQ, to save space.  This is optional, because
 * '*' and a <table>.* list are equivalent.)
 */
if (pqry->nselitems == 1 && pqry->pselist[0].pexpr == (QDSP_EXPR *)NULL
    && pqry->pselist[0].lname == 0)
{
    select_star = TRUE;
    qdrt_free(&(pqry->pselist));
    pqry->nselitems = pqry->ntabs;
    pqry->pselist =
        (QDSP_SELITEM *)qdrt_malloc(sizeof(QDSP_SELITEM) * pqry->ntabs);
    if (QDFAILED)
        goto error_return;

    for (i = 0; i < pqry->ntabs; i++)
    {
        pqry->pselist[i].tabnum = i;
        if (pqry->ptabs[i].lalias)
        {
            pqry->pselist[i].lname = pqry->ptabs[i].lalias;
            pqry->pselist[i].oname = pqry->ptabs[i].calias;
        }
        else
        {
            pqry->pselist[i].lname = pqry->ptabs[i].lname;
            pqry->pselist[i].oname = pqry->ptabs[i].oname;
            pqry->pselist[i].lschema = pqry->ptabs[i].lschema;
            pqry->pselist[i].oschema = pqry->ptabs[i].oschema;
        }
        pqry->ptabs[i].flags |= QDSP_TAB_STAR;
    } /* for each table */
} /* if select '*' */

/* Determine the maximum number of columns needed in the COLMAP
 * translation table, including all select list columns in original input
 * query as well as any additional columns added during transformation.
 * This equals: number of original select list items, plus number of
 * aggregate functions referenced in query, plus 1 more for each AVG
 * function, plus 2 more for each STDDEV or VARIANCE function,
 * plus number of group columns if there
 * is a group-by clause, plus number of order-by columns, plus 1 more
 * in case no columns end up in CQ select list, so that an extra entry
 * is needed for a dummy.
 * (For the present purpose, references to <tablename>.* count as one
 * column.)
 */

maxcols = pqry->nselitems;

/* Add in group-by or order-by columns     %01 */
if (pqry->ngroupcols)
    maxcols += pqry->ngroupcols;

if (&(pqdef->ptree->qry) == pqry) /* no set operations */
    maxcols += pqdef->nordcols;

for (pexpr = pqry->pfirexpr; pexpr != NULL; pexpr = pexpr->pnext)
{
    /* Don't add 1 for outer nested aggregate functions, if they can
     * be easily spotted.
     */
    if (QD_SQLOP_IS_AGGR(pexpr->opcode) &&
```

Dec 13 1993 10:59:40 qdcp_seltran.c Page 4

```
            (pexpr->u.op.prandl == NULL /* count(*) */ ||
            !QD_SQLOP_IS_AGGR(pexpr->u.op.prandl->opcode)))
        {
            /* Aggregation requires a combining query (at least for now) */
            pqry->flags |= QDSP_QRY_GEN_CQ;

            maxcols++;
            if (pexpr->opcode == QDSP_OP_AVG)
                maxcols++;
            if (pexpr->opcode == QDSP_OP_STDDEV || pexpr->opcode ==
                QDSP_OP_VARIANCE)
                maxcols += 2;
        }
}
maxcols++;

/* Now allocate a column map with room for maxcols columns */

pcolmap = (QDCP_COLMAP *)qdrt_malloc(sizeof(QDCP_COLMAP) *
                                      maxcols);
pqry->pcolmap = pcolmap;

if (QDFAILED)
    goto error_return;

/* Make a first pass through the select list to determine if there
 * are any nested aggregate expressions.  This must be done up front
 * because if there are any nested aggregates, this changes the
 * transformation rules for non-nested aggregates which might be
 * encountered earlier in the select list.  This is so because if there
 * are any nested aggregates, then the only legal non-nested aggregates
 * are aggregates over group columns, and these are considered to
 * aggregate across, rather than within, groups.
 */
for (cmi = 0; cmi < pqry->nselitems; cmi++)
{
    if (pqry->pselist[cmi].pexpr != NULL
        && (retval = is_expr_over_aggrs(pqry->pselist[cmi].pexpr))
           == YES_NESTED_AGGRS)
    {
        pqry->flags |= QDSP_QRY_NESTED_AGGR;
        break;
    }
}
/* Make column map entries for IQ (input query) select items
 * NOTE: The algorithm later in this routine for finding order-by
 * columns assumes that the first nselitems entries of the colmap
 * correspond 1-to-1 with the select list.
 */
for (cmi = 0; cmi < pqry->nselitems; cmi++)
{
    pcolmap[cmi].pexpr = pqry->pselist[cmi].pexpr;

    /* Provide cross-reference from select list item to column
     * map entry.
     */
    pqry->pselist[cmi].colmap_index = cmi;

    /* Flag this entry as corresponding to an IQ select list
     * item.
     */

    pcolmap[cmi].flags |= QDCP_COL_IQ;
    if (pcolmap[cmi].pexpr == NULL) /* '*' reference */
    {
        pcolmap[cmi].flags |= QDCP_COL_STAR;

        /* If this is a <table>.* reference, it will appear in
         * PSQ select list, so assign it a column number, reserving
         * as many PSQ column numbers as there are columns in the
         * table.  (NOTE: Unqualified '*' won't be encountered at this
         * point, because we already transformred it to a list of
         * '<table>.*', above.)
```

152

Dec 13 1993 10:59:40 qdcp_seltran.c Page 5

```
     * (NOTE2: '*' references never appear as such in IT or CQ.)
     * Also, flag table in FROM list as having all of its columns
     * selected, and stamp this selitem with the table number.
     */
    for (i = 0; i < pqry->ntabs; i++)
    {
        /* Table matches select list item if it has alias which
         * matches name of select list item, or it has name which
         * matches name of select list item, and either table and
         * select list item both lack schema qualifiers, or
         * both have same schema qualifier (ORACLE won't allow
         * one to be qualified and not the other).
         */

        if ((pqry->ptabs[i].lalias != 0 &&
             pqry->ptabs[i].lalias ==
             pqry->pselist[cmi].lname &&
             !memcmp(pqdef->pstrings + pqry->ptabs[i].oalias,
                     pqdef->pstrings + pqry->pselist[cmi].oname,
                     pqry->ptabs[i].lalias)) ||
            (pqry->ptabs[i].lname ==
             pqry->pselist[cmi].lname &&
             !memcmp(pqdef->pstrings + pqry->ptabs[i].oname,
                     pqdef->pstrings + pqry->pselist[cmi].oname,
                     pqry->ptabs[i].lname) &&
             ((pqry->ptabs[i].lschema == 0 &&
               pqry->pselist[cmi].lschema == 0) ||
              (pqry->ptabs[i].lschema ==
               pqry->pselist[cmi].lschema &&
               !memcmp(pqdef->pstrings + pqry->ptabs[i].oschema,
                       pqdef->pstrings +
                       pqry->pselist[cmi].oschema,
                       pqry->ptabs[i].lschema)))))
        {
            pqry->ptabs[i].flags |= QDSP_TAB_STAR;
            pqry->pselist[cmi].tabnum = i;
            break;
        } /* if select list item matches table */
    } /* for each table in IQ from clause */

    pcolmap[cmi].psq_colnum = psq_colnum;
    psq_colnum += pqry->ptabs[i].ncols;
    pcolmap[cmi].iq_colnum = iq_colnum;
    iq_colnum += pqry->ptabs[i].ncols;
    pcolmap[cmi].flags |= QDCP_COL_PSQ;
} /* if this is a <table>.* reference */
else
{
    /* Assign IQ column number */
    pcolmap[cmi].iq_colnum = iq_colnum++;

    /* Provide cross-reference from expression to column-map
     * entry.  (But if same expression appears twice in SELECT
     * list, just stamp it with first column number.)
     */
    if (pcolmap[cmi].pexpr->colmap_index < 0)
        pcolmap[cmi].pexpr->colmap_index = cmi;

#ifdef NO_NESTED_AGGR_SUPPORT
    /* Check whether this column is an expression over aggregates,
     * in which case it will not appear as a PSQ column, but will
     * be computed in CQ (combining query) select list.  However,
     * if it is the outer aggregate in a nested aggregate expression,
     * it will not appear in the CQ select list, but will have to
     * be computed by a combining function.
     */
    if (retval = is_expr_over_aggrs(pcolmap[cmi].pexpr))
    {
        pcolmap[cmi].flags |= QDCP_COL_EOA;
        if (retval == YES_NESTED_AGGRS)
            /* Expression contains a nested aggregate somewhere */
            pqry->flags |= QDSP_QRY_NESTED_AGGR;
        else
```

Dec 13 1993 10:59:40 qdcp_seltran.c Page 6

```
        {
            pcolmap[cmi].cq_colnum = cq_colnum++;
            pcolmap[cmi].flags |= QDCP_COL_CQ;
        }
    } /* if (is_expr_over_aggrs) */
#else /* NO_NESTED_AGGR_SUPPORT */
    /* Check whether this column is an expression over aggregates,
     * in which case it will not appear as a PSQ column, but will
     * be computed in CQ (combining query) select list.
     */
    if (retval = is_expr_over_aggrs(pcolmap[cmi].pexpr))
    {
        pcolmap[cmi].flags |= QDCP_COL_EOA;
        if (retval == YES_NESTED_AGGRS)
            /* Expression contains a nested aggregate somewhere */
            pqry->flags |= QDSP_QRY_NESTED_AGGR;
        pcolmap[cmi].cq_colnum = cq_colnum++;
        pcolmap[cmi].flags |= QDCP_COL_CQ;
    } /* if (is_expr_over_aggrs) */
#endif /* NO_NESTED_AGGR_SUPPORT */
    else
    {
        /* If we're generating PSQ's which insert direct to the
         * intermediate table, then if there are any select list
         * items which are neither aggregates nor direct group-by
         * column references, these must be omitted from the PSQ
         * select list, but added to the CQ select list (these would
         * be expressions over aggregates, group-by columns, or both,
         * but we've already taken care of expressions over
         * aggregates above.)  The qry flag QDSP_QRY_GROUP_AND_ORDER
         * tells us we're generating this kind of PSQ.  If our
         * expr isn't an aggregate, check through the group-by
         * clause to see if it's a group-by column.
         */
        bool cq_not_psq; /* If true, add expr to CQ but not PSQ */

        cq_not_psq = FALSE;

        if (pqry->flags & QDSP_QRY_GROUP_AND_ORDER)
        {
            cq_not_psq = TRUE;

            if (QD_SQLOP_IS_AGGR(pcolmap[cmi].pexpr->opcode))
                cq_not_psq = FALSE;
            else
            {
                for (i = 0; i < pqry->ngroupcols; i++)
                {
                    if (pqry->pgroupby[i].pexpr ==
                        pcolmap[cmi].pexpr)
                    {
                        cq_not_psq = FALSE;
                        break;
                    }
                }
            }
        }
        /* Assign PSQ column number if appropriate.  This column will
         * appear in the PSQ unless: it is AVG, STDDEV, VARIANCE,
         * or an expression over aggregates (including outer nested
         * aggregates), or unless the query contains nested
         * aggregates and this is not the inner aggregate of
         * a nested aggregate.
         */
        if (!cq_not_psq &&
            !(pcolmap[cmi].pexpr->opcode == QDSP_OP_AVG ||
              pcolmap[cmi].pexpr->opcode == QDSP_OP_STDDEV ||
              pcolmap[cmi].pexpr->opcode == QDSP_OP_VARIANCE)
            && !((pqry->flags & QDSP_QRY_NESTED_AGGR)
                 && QD_SQLOP_IS_AGGR(pcolmap[cmi].pexpr->opcode)
                 && !(pcolmap[cmi].pexpr->u.op.flags &
                      QDSP_EXPR_INNER_NESTED_AGGR)))
        {
```

3

Dec 13 1993 10:59:40 qdcp_seltran.c Page 7

```
                pcolmap[cmi].flags |= QDCP_COL_PSQ;
                pcolmap[cmi].psq_colnum = psq_colnum++;

                /* If this is an aggregate function other than AVG,
                 * STDDEV, or VARIANCE, so that substitution is not
                 * required, assign an IT column number.
                 * (But if this aggregate function appeared twice in
                 * the IQ select list, only assign it an IT column
                 * number the first time.)
                 */
                if (QD_SQLOP_IS_AGGR(pcolmap[cmi].pexpr->opcode)
                    && pcolmap[cmi].pexpr->colmap_index == cmi)
                {
                    pcolmap[cmi].it_colnum = it_colnum++;
                    pcolmap[cmi].flags |= QDCP_COL_IT;
                }
            } /* if (not AVG, STDDEV, or VARIANCE) */

            /* Assign CQ column number if this is an aggregate function.
             * or if otherwise appropriate.
             */
            if (cq_not_psq || QD_SQLOP_IS_AGGR(pcolmap[cmi].pexpr->opcode))
            {
                pcolmap[cmi].cq_colnum = cq_colnum++;
                pcolmap[cmi].flags |= QDCP_COL_CQ;
            }

        } /* else (not an expression over aggregates) */
    } /* else (not a '*' reference) */
} /* for each select list item */

/* Note about nested aggregate functions:
 * nested aggrs can only appear in the select list, so if the
 * query contains any, we've encountered them by now, and flagged
 * the query with the QDSP_QRY_NESTED_AGGR flag.  If so, then from
 * this point on, we should not add any additional columns to the
 * select list of the combining query.
 */

/* Process GROUP-BY clause:
 * Assign colmap_index values to GROUP-BY columns.  These point to
 * the colmap entry which describes the value to be used in merging
 * group values for that group column.
 * If there are any GROUP-BY expressions which were not in the
 * IQ (input query) select list, add them to the PSQ (parallel
 * subquery) select list.
 * If GROUP-BY column is of type DTYDAT (date), then rather than adding
 * the column itself to the PSQ,
 * add an expression which normalizes the column to a string which
 * will collate properly.  %02
 * If query has both ORDER-BY and GROUP-BY clauses, assign IT and
 * CQ column numbers to GROUP-BY columns.  %01
 */
for (i = 0; i < pqry->ngroupcols; i++)
{
    /* Is this GROUP-BY expression in IQ select list?  If it's not
     * a direct column reference, then if its colmap index is
     * negative, it's not in the IQ select list, or we would have
     * found it above.  If it's a column reference, then if all
     * columns of its table are selected by '*' or <table>.*, then
     * it's implicitly in the IQ select list; in that case, reserve
     * a colmap entry, but set the PSQ column number to where the
     * column falls within '*', and don't set the
     * QDCP_COL_PSQ flag, so the PSQ won't mention this column
     * redundantly - instead, set the QDCP_COL_IQ_IN_STAR flag, and
     * set the IQ column number to where the column falls within '*'.
     * Otherwise, if the column's
     * colmap_index is negative, it's not in the select list, by the
     * same reasoning as for non-columns.
     */
    if (pqry->pgroupby[i].pexpr->colmap_index < 0)
    {
        if (pqry->pgroupby[i].pexpr->opcode == QDSP_OP_COL &&
```

Dec 13 1993 10:59:40 qdcp_seltran.c Page 8

```
            (pqry->ptabs[pqry->pgroupby[i].pexpr->u.col.tabnum].flags &
             QDSP_TAB_STAR))
        {
            /* Find colmap entry for <table>.* */
            for (j = 0; j < pqry->nselitems; j++)
            {
                if (pqry->pselist[j].pexpr == (QDSP_EXPR *)NULL &&
                    pqry->pselist[j].tabnum ==
                    pqry->pgroupby[i].pexpr->u.col.tabnum)
                {
                    pcolmap[cmi].psq_colnum =
                        pcolmap[j].psq_colnum +
                            (pqry->pgroupby[i].pexpr->u.col.colid - 1);
                    pcolmap[cmi].iq_colnum =
                        pcolmap[j].iq_colnum +
                            (pqry->pgroupby[i].pexpr->u.col.colid - 1);
                    pcolmap[cmi].flags |= QDCP_COL_IQ_IN_STAR;
                    break;
                }
            }
        }
        else
        {
            pcolmap[cmi].flags |= QDCP_COL_PSQ;
            pcolmap[cmi].psq_colnum = psq_colnum++;
        }

        /* Determine whether GROUP-BY expression is of type DTYDAT, %02
         * in which case we need a column in the IQ select list which
         * normalizes this expression for merging.
         */
        pexpr = pqry->pgroupby[i].pexpr;   /*%02+*/
        if (pexpr->datatype == DTYDAT
            && !(pqry->flags & QDSP_QRY_GROUP_AND_ORDER))    /*%01*/
        {
            if (date_format_offset == 0)
            {
                date_format_offset =
                    qdsp_addstr(pqdef, QDCP_DATE_FORMAT_STRING,
                                QDCP_DATE_FORMAT_LEN);
                if (QDFAILED)
                    goto error_return;
            }
            pexpr = qdsp_createxpr(QDSP_OP_TO_CHAR, DTYCHR,
                                   0, 0, 0, 0, 0, 0, 0,
                                   pexpr,
                      qdsp_createxpr(QDSP_OP_LIT, DTYCHR, 0,
                                     date_format_offset,
                                     QDCP_DATE_FORMAT_LEN, 0, 0, 0, 0,
                                     (QDSP_EXPR *)NULL,
                                     (QDSP_EXPR *)NULL,
                                     &pqry->pfirexpr), &pqry->pfirexpr);
            if (QDFAILED)
                goto error_return;
        } /* if expr is of type DTYDAT */ /*%02-*/

/*      pcolmap[cmi].pexpr = pqry->pgroupby[i].pexpr; */
        pcolmap[cmi].pexpr = pexpr;  /*%02*/
        pcolmap[cmi].pexpr->colmap_index = cmi;
        pqry->pgroupby[i].colmap_index = cmi;
        cmi++;

        /* Since we've added a column, we can't use unqualified '*'
         * in the select list for the PSQ.
         */
        if (select_star)
            pqry->flags |= QDSP_QRY_EXPAND_STAR;
    } /* if group-by column isn't in IQ select list */
    else
    { /*%02*/
        /* Determine whether GROUP-BY expression is of type DTYDAT, %02
         * in which case we need a column in the IQ select list which
         * normalizes this expression for merging.
```

154

Dec 13 1993 10:59:40 qdcp_seltran.c Page 9

```
        */
        pexpr = pqry->pgroupby[i].pexpr;  /*%02+*/
        if (pexpr->datatype == DTYDAT
            && !(pqry->flags & QDSP_QRY_GROUP_AND_ORDER))   /*%01*/
        {
            if (date_format_offset == 0)
            {
                date_format_offset =
                    qdsp_addstr(pqdef, QDCP_DATE_FORMAT_STRING,
                                QDCP_DATE_FORMAT_LEN);
                if (QDFAILED)
                    goto error_return;
            }
            pexpr = qdsp_createxpr(QDSP_OP_TO_CHAR, DTYCHR,
                                   0, 0, 0, 0, 0, 0, 0,
                                   pexpr,
                         qdsp_createxpr(QDSP_OP_LIT, DTYCHR, 0,
                                        date_format_offset,
                                        QDCP_DATE_FORMAT_LEN, 0, 0, 0, 0,
                                        (QDSP_EXPR *)NULL,
                                        (QDSP_EXPR *)NULL,
                                        &pqry->pfirexpr), &pqry->pfirexpr);
            if (QDFAILED)
                goto error_return;

            pcolmap[cmi].pexpr = pexpr;
            pcolmap[cmi].flags |= QDCP_COL_PSQ;
            pcolmap[cmi].psq_colnum = psq_colnum++;
            pqry->pgroupby[i].colmap_index = cmi;
            pexpr->colmap_index = cmi++;

        } /* if expr is of type DTYDAT */ /*%02-*/
        else /* %02 */
            pqry->pgroupby[i].colmap_index =
                pqry->pgroupby[i].pexpr->colmap_index;
    } /*%02*/
    /* If query has both ORDER-BY and GROUP-BY clauses, assign this
     * GROUP-BY column an IT column number and a CQ column number.   %01
     * (Only assign GROUP-BY column a CQ column number if it is
     * in the IQ select list.)
     */
    if ((pqry->flags & QDSP_QRY_GROUP_AND_ORDER) &&
        !(pcolmap[pqry->pgroupby[i].colmap_index].flags & QDCP_COL_IT))
    {
        pcolmap[pqry->pgroupby[i].colmap_index].it_colnum = it_colnum++;
        pcolmap[pqry->pgroupby[i].colmap_index].flags |= QDCP_COL_IT;

        /* Don't add column to CQ select list if query has nested
         * aggregates.
         */
        if (!(pqry->flags & QDSP_QRY_NESTED_AGGR) &&
            (pcolmap[pqry->pgroupby[i].colmap_index].flags & QDCP_COL_IQ))
        {
            pcolmap[pqry->pgroupby[i].colmap_index].cq_colnum =
                cq_colnum++;
            pcolmap[pqry->pgroupby[i].colmap_index].flags |= QDCP_COL_CQ;
        }
    }
} /* for each group column */

/* Process aggregates:
 * For each aggregate function (excluding outer nested aggregates):
 * 1) If it is AVG, STDDEV, or VARIANCE, we need a SUM and COUNT over
 *    same argument.  See if we already have one; if not, create one.
 * 2) For STDDEV and VARIANCE, we also need SUM(SQUARE) of the original
 *    argument.  Again, check if we already have one, else create one.
 * 3) Now, was the aggregate we started with already in the IQ select
 *    list?  If so, its colmap_index gets us to the colmap entry for it;
 *    else, start a new colmap entry for it.
 * 4) Now, if it's AVG, STDDEV, or VARIANCE, we need to set its sumcol,
 *    countcol, and (except for AVG), sumsqlcol attributes to point
 *    to colmap entries for those functions. For each of them, check
 *    whether they already had a colmap entry, else start a new one.
```

Dec 13 1993 10:59:40 qdcp_seltran.c Page 10

```
 * 5) For the original aggregate if not AVG, STDDEV, or VARIANCE, or for
 *    each of the replacement aggregates, if the aggregate wasn't
 *    previously in colmap, it needs to become a PSQ column and an IT
 *    column.  The original aggregate does NOT get a CQ column unless
 *    it is an inner nested aggregate function (in which case it is
 *    needed for separate evaluation of the outer nested aggregate).
 *    Otherwise, it will be processed as part of the CQ having clause or
 *    whatever CQ select expression referenced it.
 * 6) Now wasn't that easy?
 *
 * NOTE: No new outer nested aggregates will be encountered at this stage,
 * because they can only appear in the select list, so they can now
 * be spotted by looking for the QDSP_EXPR_OUTER_NESTED_AGGR flag.
 */
for (pexpr = pqry->pfirexpr; pexpr != (QDSP_EXPR *)NULL;
     pexpr = pexpr->pnext)
{
    if (!QD_SQLOP_IS_AGGR(pexpr->opcode) ||
        (pexpr->u.op.flags & QDSP_EXPR_OUTER_NESTED_AGGR))
        continue;

    if (pexpr->colmap_index < 0)
    {
        pcolmap[cmi].pexpr = pexpr;
#if 0 /* The follow is obsolete: it assumes that a single-group temp
       * table is used for nested aggregate queries, so the the inner
       * aggregates must be in the CQ select list.
      */
          if (pexpr->u.op.flags & QDSP_EXPR_INNER_NESTED_AGGR)
          {
              pcolmap[cmi].cq_colnum = cq_colnum++;
              pcolmap[cmi].flags |= QDCP_COL_CQ;
          }
#endif /* 0 */
          /* Don't put this aggregate function in the PSQ select list
           * if the query contains nested aggregates, and this is not
           * the inner aggregate of a nested aggregate.
           */
          if (!(pexpr->opcode == QDSP_OP_AVG ||
                pexpr->opcode == QDSP_OP_STDDEV ||
                pexpr->opcode == QDSP_OP_VARIANCE)
              && !((pqry->flags & QDSP_QRY_NESTED_AGGR)
                   && !(pexpr->u.op.flags &
                        QDSP_EXPR_INNER_NESTED_AGGR)))
          {
              pcolmap[cmi].psq_colnum = psq_colnum++;
              pcolmap[cmi].it_colnum = it_colnum++;
              pcolmap[cmi].flags |= (QDCP_COL_IT | QDCP_COL_PSQ);

              /* We've added a PSQ column, so unqualified '*' must be
               * expanded to list of '<table>.*'.
               */
              if (select_star)
                  pqry->flags |= QDSP_QRY_EXPAND_STAR;
          }
          pexpr->colmap_index = cmi++;
    }
    /* Don't generate replacement functions for AVG, STDDEV, or VARIANCE
     * if the query contains nested aggregates, and this is not
     * the inner aggregate of a nested aggregate.
     */
    if ((pexpr->opcode == QDSP_OP_AVG ||
         pexpr->opcode == QDSP_OP_STDDEV ||
         pexpr->opcode == QDSP_OP_VARIANCE)
        && !((pqry->flags & QDSP_QRY_NESTED_AGGR)
             && !(pexpr->u.op.flags & QDSP_EXPR_INNER_NESTED_AGGR)))
    {
        /* Create SUM and COUNT replacement functions.
         * Qdsp_createxpr will automatically return an existing matching
         * expression if there is one.
         */
        psum = qdsp_createxpr(QDSP_OP_SUM, 0, 0, 0, 0, 0, 0, 0, 0,
                              pexpr->u.op.prand1, (QDSP_EXPR *)NULL,
```

```
                        &pqry->pfirexpr);
    if (QDFAILED)
        goto error_return;
    if (psum->colmap_index < 0)
    {
        pcolmap[cmi].it_colnum = it_colnum++;
        pcolmap[cmi].psq_colnum = psq_colnum++;
        pcolmap[cmi].pexpr = psum;
        pcolmap[cmi].flags |= (QDCP_COL_IT | QDCP_COL_PSQ);
        psum->colmap_index = cmi++;

        /* We've added a PSQ column, so unqualified '*' must be
         * expanded to list of '<table>.*'.
         */
        if (select_star)
            pqry->flags |= QDSP_QRY_EXPAND_STAR;
    }
    pcount = qdsp_createxpr(QDSP_OP_COUNT, 0, 0, 0, 0, 0, 0, 0, 0,
                        pexpr->u.op.prand1, (QDSP_EXPR *)NULL,
                        &pqry->pfirexpr);
    if (QDFAILED)
        goto error_return;
    if (pcount->colmap_index < 0)
    {

        pcolmap[cmi].it_colnum = it_colnum++;
        pcolmap[cmi].psq_colnum = psq_colnum++;
        pcolmap[cmi].pexpr = pcount;
        pcolmap[cmi].flags |= (QDCP_COL_IT | QDCP_COL_PSQ);
        pcount->colmap_index = cmi++;

        /* We've added a PSQ column, so unqualified '*' must be
         * expanded to list of '<table>.*'.
         */
        if (select_star)
            pqry->flags |= QDSP_QRY_EXPAND_STAR;
    }
    /* Stamp location of replacement functions in colmap entry
     * for original aggregate.
     */
    pcolmap[pexpr->colmap_index].sumcol = psum->colmap_index;
    pcolmap[pexpr->colmap_index].countcol = pcount->colmap_index;

    if (pexpr->opcode != QDSP_OP_AVG)
    /* For STDDEV, VARIANCE, create SUM(SQUARE) expression */
    {
        psum = qdsp_createxpr(QDSP_OP_SUM, 0, 0, 0, 0, 0, 0, 0, 0,
                    qdsp_createxpr(QDSP_OP_POWER,
                                0, 0, 0, 0, 0, 0, 0, 0,
                                pexpr->u.op.prand1,
                                qdsp_createxpr(QDSP_OP_LIT,
                                        DTYNUM, 0,
                                  qdsp_addstr(pqdef, "2", 1), 1,
                                        0, 0, 0, 0,
                                    (QDSP_EXPR *)NULL,
                                    (QDSP_EXPR *)NULL,
                                        &pqry->pfirexpr),
                                &pqry->pfirexpr),
                        (QDSP_EXPR *)NULL,
                        &pqry->pfirexpr);
        if (QDFAILED)
            goto error_return;
        if (psum->colmap_index < 0)
        {
            pcolmap[cmi].it_colnum = it_colnum++;
            pcolmap[cmi].psq_colnum = psq_colnum++;
            pcolmap[cmi].pexpr = psum;
            pcolmap[cmi].flags |= (QDCP_COL_IT | QDCP_COL_PSQ);
            psum->colmap_index = cmi++;

            /* We've added a PSQ column, so unqualified '*' must be
             * expanded to list of '<table>.*'.
             */
```

```
                if (select_star)
                    pqry->flags |= QDSP_QRY_EXPAND_STAR;
            }

            /* Stamp location of replacement sum(sqr) function in
             * colmap entry for original aggregate.
             */
            pcolmap[pexpr->colmap_index].sumsqrcol =
                                    psum->colmap_index;
        } /* else (not AVG) */
    } /* if (AVG, STDDEV, or VARIANCE) */
} /* for each expression, is it an aggregate? */

/* Process ORDER-BY clause:
 *
 * If ORDER-BY column doesn't appear directly in IQ select list,
 * add it to PSQ select list.  (If query has both GROUP-BY and
 * ORDER-BY clauses, then only do this for aggregate functions that
 * didn't get expanded above.  Any other ORDER-BY column in such a query
 * must be either a GROUP-BY column, which gets added to the select list
 * elsewhere, or an expression over GROUP-BY columns or AGGR functions,
 * which can be computed in the combining query, or its an AGGR that
 * got expanded above, and its sub-AGGRs got added to the select
 * list.    %01 )
 *
 * (This next step is now disabled: %01)
 * If query also has GROUP-BY clause, and this ORDER-BY column wasn't
 * already added to the CQ select list, add it to the CQ select list.  (In
 * this event, it can be assumed to be an expression over a group
 * column or aggregate, so it isn't necessary to add a column to the
 * IT). (END OF DISABLED PORTION %01)
 *
 * If ORDER-BY column is of type DTYDAT (date), then rather than adding
 * the column itself to the PSQ and (if necessary) CQ select lists,
 * add an expression which normalizes the column to a string which
 * will collate properly.  (Omit this step if query has both GROUP-BY
 * and ORDER-BY clauses.  %01)
 *
 * If ORDER-BY column was specified by number, it obviously corresponds
 * to a column in the IQ select list.  However, if it falls within a
 * '*' reference, it is necessary to query the data dictionary to find
 * out whether it is, in fact, a DTYDAT column which requires
 * normalization.  Create an expr for the column, and if the column
 * numbers don't match in the PSQ and IQ select lists, use this in the
 * order by clause in place of column number; else, use it as the
 * expression on which to merge (i.e. create a colmap entry for it
 * and stamp the order-by item with the colmap_index of that colmap
 * entry).
 *
 * Set the colmap index of the order-by item to the colmap entry for
 * the expression which will be used to merge this column, if different
 * for the colmap entry for the actual order-by expression as it
 * appears in the IQ and PSQ select lists.
 */

if (pqry == &(pqdef->ptree->qry)) /* No set operations */
{
    for (i = 0; i < pqdef->nordcols; i++)
    {
        pexpr = pqdef->pordcols[i].pexpr;

        /* If order-by column is specified by an integer literal,
         * figure out which select list column it corresponds to.
         * If it's buried in a '*' reference, look the column up in
         * the data dictionary, to find out whether it's of type
         * DATE and therefore requires normalization.
         */
        if (pexpr->opcode == QDSP_OP_LIT &&
            pexpr->datatype == DTYINT)
        {
            column_id = atoi(pqdef->pstrings + pexpr->u.lit.oval);

            /* Find expr for this column if it was explicitly
```

```
 * specified, else figure out which table, and what
 * column id within that table.
 * NOTE: This loop assumes that the first nselitems entries
 * of colmap correspond to the items in selist.  If this
 * were not the case, the colmap_index of each select list
 * item would have to be used to locate the appropriate
 * colmap entry.
 */
for (j = 0; j < pqry->nselitems; j++)
{
    /* Explicit expression reference? If so, then our
     * order-by column is already in the select list,
     * but we'll still have to check whether column number
     * is correct for PSQ order-by clause, and whether
     * expression is of type DATE.
     */
    if (pcolmap[j].iq_colnum == (column_id - 1) &&
        pcolmap[j].pexpr != NULL)
    {
        /* Set ptab to NULL to indicate below that
         * an expression has been found
         */
        ptab = (QDSP_TAB *)NULL;

        /* If expression doesn't require normalization,
         * stamp order by column with colmap index to
         * use for merging.
         */
        if (pcolmap[j].pexpr->datatype != DTYDAT)
            pqdef->pordcols[i].colmap_index = j;
        pexpr = pcolmap[j].pexpr;
        break;
    } /* Explicit expression reference */

    /* Column is within a table.star reference? */
    else if (pcolmap[j].pexpr == NULL /* '<table>.*' */ &&
             && pcolmap[j].iq_colnum <= (column_id - 1) &&
             (ptab = pqry->ptabs + pqry->pselist[j].tabnum)
             ->ncols + pcolmap[j].iq_colnum > (column_id - 1))
    {
        /* Adjust column id so it refers to column within
         * table rather than in overall select list.
         */
        column_id -= pcolmap[j].iq_colnum;

        /* Do we already have an expr for this column? */
        for (pexpr = pqry->pfirexpr;
             pexpr != (QDSP_EXPR *)NULL;
             pexpr = pexpr->pnext)
            if (pexpr->opcode == QDSP_OP_COL &&
                pexpr->u.col.tabnum ==
                    pqry->pselist[j].tabnum
                && pexpr->u.col.colid == column_id)
                break;

        /* If not, create one, and query data dictionary */
        /* to get name, attributes */
        if (pexpr == NULL)
        {
            /* Initialize expr using table's real name and
             * schema.  If table was actually specified by
             * alias or synonym, fix up expr after call to
             * qdcp_ordcolqry.
             */
            pexpr = qdsp_createxpr(QDSP_OP_COL, 0, 0, 0, 0,
                                    ptab->oreal_name,
                                    ptab->lreal_name,
                                    ptab->oreal_schema,
                                    ptab->lreal_schema,
                                    (QDSP_EXPR *)NULL,
                                    (QDSP_EXPR *)NULL,
                                   &pqry->pfirexpr);
            if (QDFAILED)
```

```
                goto error_return;
            pexpr->u.col.colid = column_id;
            qdcp_ordcolqry(pqdef, pexpr);
            if (QDFAILED)
                goto error_return;

            /* Fix up table name and schema if necessary */
            if (ptab->lalias)
            {
                pexpr->u.col.oqual = ptab->oalias;
                pexpr->u.col.lqual = ptab->lalias;
                pexpr->u.col.oschema = 0;
                pexpr->u.col.lschema = 0;
            }
            else
            {
                pexpr->u.col.oqual = ptab->oname;
                pexpr->u.col.lqual = ptab->lname;
                pexpr->u.col.oschema = ptab->oschema;
                pexpr->u.col.lschema = ptab->lschema;
            }
        } /* if (pexpr == NULL) */
        break;
    } /* else if table.star */
} /* for each select list item */
if (j >= pqry->nselitems)
{
    QDFAIL(QD_CP_ORDCOL_NOT_FOUND);
    goto error_return;
}

/* At this point, pexpr points to the expression for this
 * order-by column, which may or may not require
 * normalization; and if ptab is NULL, this expression was
 * explicit in select list, else it was within table.star.
 * Now we have to determine whether it's ok to order by
 * the specified column number (do the IQ and PSQ select
 * lists match up to this point?), or whether to replace the
 * integer literal by pexpr in the order-by clause.
 */
if (pcolmap[j].iq_colnum != pcolmap[j].psq_colnum)
    pqdef->pordcols[i].pexpr = pexpr;

/* If specification by number is ok, and expression was
 * explicit in select list and doesn't require normalization,
 * we're done with this order by column.
 */
else if (ptab == NULL && pexpr->datatype != DTYDAT)
    continue;

} /* if (order-by column specified by integer literal) */
if (pexpr->datatype == DTYDAT
    && !(pqry->flags & QDSP_QRY_GROUP_AND_ORDER))   /*%01*/
{
    if (date_format_offset == 0)
    {
        date_format_offset =
            qdsp_addstr(pqdef, QDCP_DATE_FORMAT_STRING,
                              QDCP_DATE_FORMAT_LEN);
        if (QDFAILED)
            goto error_return;
    }
    pexpr = qdsp_createxpr(QDSP_OP_TO_CHAR, DTYCHR,
                           0, 0, 0, 0, 0, 0, 0,
                           pexpr,
             qdsp_createxpr(QDSP_OP_LIT, DTYCHR, 0,
                            date_format_offset,
                            QDCP_DATE_FORMAT_LEN, 0, 0, 0, 0,
                            (QDSP_EXPR *)NULL,
                            (QDSP_EXPR *)NULL,
                            &pqry->pfirexpr), &pqry->pfirexpr);
    if (QDFAILED)
        goto error_return;
```

```
        } /* if expr is of type DTYDAT */
        /* Add expression to column map not already there */
        if (pexpr->colmap_index < 0)
        {
            pcolmap[cmi].pexpr = pexpr;
            pexpr->colmap_index = cmi++;
        }
        /* Add expression to PSQ select list if not already there,
         * unless query has both GROUP-BY and ORDER-BY clauses,
         * and this expression is not an AGGR which wasn't expanded
         * above.
         */
        if (!(pcolmap[pexpr->colmap_index].flags &
              QDCP_COL_PSQ)
            && ( !(pqry->flags & QDSP_QRY_GROUP_AND_ORDER)    /*%01*/
                 ||
                 (QD_SQLOP_IS_AGGR(pexpr->opcode) &&
                  pexpr->opcode != QDSP_OP_AVG &&
                  pexpr->opcode != QDSP_OP_STDDEV &&
                  pexpr->opcode != QDSP_OP_VARIANCE)))        /*%01*/
        {
            /* If this is a column, from a table for which '*'
             * is selected, don't use a new psq_colnum, but rather
             * figure out where this column falls in the select list,
             * and don't flag this colmap entry with
             * QDCP_COL_PSQ.
             */
            if (pexpr->opcode == QDSP_OP_COL &&
                (pqry->ptabs[pexpr->u.col.tabnum).flags &
                 QDSP_TAB_STAR))
            {
                for (j = 0; j < pqry->nselitems; j++)
                    if (pqry->pselist[j].pexpr == (QDSP_EXPR *)NULL
                        && pqry->pselist[j].tabnum ==
                        pexpr->u.col.tabnum)
                        break;
                pcolmap[pexpr->colmap_index].psq_colnum =
                    pcolmap[j].psq_colnum + (pexpr->u.col.colid - 1);
            } /* if column of table.* */
            else
            {
                pcolmap[pexpr->colmap_index].psq_colnum = psq_colnum++;
                pcolmap[pexpr->colmap_index].flags |=
                    QDCP_COL_PSQ;

                /* We've added a PSQ column, so unqualified '*' must be
                 * expanded to list of '<table>.*'.
                 */
                if (select_star)
                    pqry->flags |= QDSP_QRY_EXPAND_STAR;
            }
        }
        /* If there's also a group-by clause, add expression
         * to CQ select list if it's not already there, unless it's
         * a direct column reference, which means it must be a
         * group-by column, which is invariant per group and therefore
         * has no IT column.
         * (%01 NOTE: The above comment and the code below was here
         * from the original implementation, but seems to have anticipated
         * support for combined GROUP-BY and ORDER-BY clauses. However,
         * it is not consistent with the current design which uses
         * just one intermediate table for both grouping and ordering.)
         */
#if 0
        if (pqry->ngroupcols > 0 &&
            !(pcolmap[pexpr->colmap_index].flags & QDCP_COL_CQ)
            && pexpr->opcode != QDSP_OP_COL)
        {
            pcolmap[pexpr->colmap_index].cq_colnum = cq_colnum++;
            pcolmap[pexpr->colmap_index].flags |=
                QDCP_COL_CQ;
        }
#endif /* 0 */
```

```
            /* Stamp order-by column with colmap_index to use for
             * merging.
             */
            pqdef->pordcols[i].colmap_index = pexpr->colmap_index;

        } /* for each order-by column */
    } /* if there are no set operations */

    /* Process HAVING clause:
     * Expressions referencing aggregates cannot appear in the HAVING
     * clause of the PSQ, because the PSQ collects partial groups, so it
     * would be incorrect to reject a group at that stage based on
     * HAVING clause predicates against partial aggregates. However,
     * it is legal to reference group-by columns in HAVING clause
     * predicates, and since these references have the same effect they
     * would have in the WHERE clause, it is OK to leave them in the
     * PSQ HAVING clause. So perform a pre-order traversal of the
     * HAVING clause tree. Flag any comparison operator which references
     * an aggregate with QDSP_OMIT_IN_PSQ_HAVING. Flag any OR operator
     * with this flag if EITHER of its operands is flagged; and flag
     * NOT if its operand is flagged.
     */
    if (pqry->phaving != NULL)
        flag_having(pqry->phaving);

    /* It is possible at this point that there will be a combining query,
     * but that there are no CQ columns (probably because all IQ columns
     * were group-by columns). In that event, use the literal '1' as a
     * dummy CQ select list column. (
     */
    if (it_colnum > 0 && cq_colnum == 0)
    {
        pexpr = qdsp_createxpr(QDSP_OP_LIT, DTYNUM, 0,
                               qdsp_addstr(pqdef, "1", 1), 1,
                               0, 0, 0, 0, (QDSP_EXPR *)NULL,
                               (QDSP_EXPR *)NULL, &pqry->pfirexpr);
        if (QDFAILED)
            goto error_return;
        if (pexpr->colmap_index < 0)
            pexpr->colmap_index = cmi++;
        pcolmap[pexpr->colmap_index].pexpr = pexpr;
        pcolmap[pexpr->colmap_index].cq_colnum = cq_colnum++;
        pcolmap[pexpr->colmap_index].flags |= QDCP_COL_CQ;
    } /* if there's an intermediate table, but no CQ columns */

    /* Stamp qry with total numbers of different column types */
    pqry->ncolmap_entries = cmi;
    pqry->nit_cols = it_colnum;
    pqry->npsq_cols = psq_colnum;
    pqry->ncq_cols = cq_colnum;
    pqry->niq_cols = iq_colnum;

    /* If the original select list was simply '*', and we haven't added
     * any additional columns to the PSQ select list, then flag the
     * query to indicate that when the PSQ is generated, its select list
     * can consist of '*' instead of the expanded list of '<table>.*'
     * that was created above.
     */
    if (select_star && !(pqry->flags & QDSP_QRY_EXPAND_STAR))
        pqry->flags |= QDSP_QRY_COLLAPSE_STAR;

    /* If query requires a combining query, generate a unique intermediate
     * table name.
     */
    if (pqry->flags & QDSP_QRY_GEN_CQ)
    {
        sprintf(itname, "%sXXXXXXXXX", QDCP_IT_NAME_PREFIX);
        qdrt_mktemp(itname);
        pqry->litname = strlen(itname);
        pqry->oitname = qdsp_addstr(pqdef, itname, pqry->litname);
    } /* if we need intermediate table */

#ifdef QDDEBUG
```

158

Dec 13 1993 10:59:40 qdcp_seltran.c Page 17

```
    if (QD_DISPLAY_DEBUG)
        printf("\nMaxcols: %d\n", maxcols);
#endif /* QDDEBUG */

error_return:
    QDEND;
#ifdef NO_NESTED_AGGR_SUPPORT
    /* Currently (P1) queries containing nested aggregates can't be
     * correctly decomposed.
     */
    if (!QDFAILED && (pqry->flags & QDSP_QRY_NESTED_AGGR))
#else /* NO_NESTED_AGGR_SUPPORT */
    /* Nested aggregate queries are supported in QD, but require a multi-
     * group temp table combining algorithm.  Therefore, if there are
     * any nested aggregates, but the GROUP_AND_ORDER flag isn't set,
     * indicating that the user has set an environment variable requesting
     * a single group temp table, then return an error.
     */
    if (!QDFAILED && (pqry->flags & QDSP_QRY_NESTED_AGGR)
            && !(pqry->flags & QDSP_QRY_GROUP_AND_ORDER))
#endif /* NO_NESTED_AGGR_SUPPORT */
        return QD_CP_INCORRECT_NESTED_AGGR;
    else
        return QD_STATUS;
} /* qdcp_seltran */


/* is_expr_over_aggrs - return NO_AGGRS if no subexpression of this expression
 * is an aggregate function; else return YES_NESTED_AGGRS if any subexpression
 * of this expression is a nested aggregate function, or YES_AGGRS if any
 * subexpression is an aggregate function, but not nested.
 * If any outer nested aggregates are found, stamp them with the flag
 * QDSP_EXPR_OUTER_NESTED_AGGR, to make them easy to spot later.  Also
 * flag the inner nested aggregates with QDSP_EXPR_INNER_NESTED_AGGR, so
 * we know to preserved them in the CQ select list even if they don't
 * appear directly in the IQ select list.
 */
static b4 find_aggrs(pexpr, outer_aggr)
QDSP_EXPR *pexpr; /* Pointer to expression */
bool outer_aggr; /* If TRUE, we've already passed an outer nested  */
                 /*  aggregate function, so if we hit an aggregate now it's */
                 /*  an inner nested aggregate and should be flagged. */

{
    reg1 ub4 retval = NO_AGGRS;


    if (!QD_SQLOP_IS_OP(pexpr->opcode))
      if (pexpr -> opcode == QDSP_OP_SUBQRY)
      {
        if(pexpr -> u.subqry.psubqry -> pwhere != (QDSP_EXPR *) NULL)
          retval |= find_aggrs(pexpr -> u.subqry.psubqry -> pwhere);

        if(pexpr -> u.subqry.psubqry -> phaving != (QDSP_EXPR *) NULL)
          retval |= find_aggrs(pexpr -> u.subqry.psubqry -> phaving);
      }
      else
        return NO_AGGRS;


    if (QD_SQLOP_IS_AGGR(pexpr->opcode))
    {
        if (outer_aggr)
        {
            retval = YES_NESTED_AGGRS;
            pexpr->u.op.flags |= QDSP_EXPR_INNER_NESTED_AGGR;
        }
        else
        {
            retval = YES_AGGRS;
            outer_aggr = TRUE;
        }
    }
```

Dec 13 1993 10:59:40 qdcp_seltran.c Page 18

```
    /* There can only be one level of nested of aggregates */
    if (retval != YES_NESTED_AGGRS)
    {
        if (pexpr->u.op.prand1 != (QDSP_EXPR *)NULL)
            retval |= find_aggrs(pexpr->u.op.prand1, outer_aggr);
        if (pexpr->u.op.prand2 != (QDSP_EXPR *)NULL)
            retval |= find_aggrs(pexpr->u.op.prand2, outer_aggr);
        if (retval == YES_NESTED_AGGRS && QD_SQLOP_IS_AGGR(pexpr->opcode))
            pexpr->u.op.flags |= QDSP_EXPR_OUTER_NESTED_AGGR;
    }
    return retval;
} /* find_aggrs */

static b4 is_expr_over_aggrs(pexpr)
QDSP_EXPR *pexpr; /* Pointer to expression */
{
    reg1 ub4 retval;
    retval = find_aggrs(pexpr, FALSE);
    if (retval == YES_AGGRS && QD_SQLOP_IS_AGGR(pexpr->opcode))
        retval = NO_AGGRS;
    return retval;
} /* is_expr_over_aggrs */


/* flag_having: Flag exprs in HAVING clause for exclusion from PSQ
 * HAVING clause.  If expr is comparison and references an aggregate,
 * flag for omission, return TRUE.  If expr is NOT, AND, or OR, call
 * flag_having for operands.  If returns TRUE for operand of NOT, either
 * operand of OR, or both operands of AND, flag expression for omission and
 * return TRUE.  Else return FALSE.
 */
static bool flag_having(pexpr)
reg1 QDSP_EXPR *pexpr;
{
    reg2 retval = FALSE;

    if (pexpr->opcode == QDSP_OP_NOT || pexpr->opcode == QDSP_OP_AND
        || pexpr->opcode == QDSP_OP_OR)
    {
        if (flag_having(pexpr->u.op.prand1) && pexpr->opcode !=
            QDSP_OP_AND)
            retval = TRUE;
        else if (pexpr->u.op.prand2 != NULL &&
                 flag_having(pexpr->u.op.prand2) &&
                 (pexpr->opcode == QDSP_OP_OR ||
                  (pexpr->u.op.prand1->u.op.flags & QDSP_OMIT_IN_PSQ_HAVING)))
            retval = TRUE;
    }
    else if (is_expr_over_aggrs(pexpr))
        retval = TRUE;

    if (retval)
        pexpr->u.op.flags |= QDSP_OMIT_IN_PSQ_HAVING;
    return retval;
} /* flag_having */
```

159

Apr 7 1993 15:09:36 qdcp_ttsqry.pc Page 1

```
/*****************************************************************************
 * qdcp_ttsqry - SELECT TEMPORARY_TABLESPACE FROM USER_USERS
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR   DESCRIPTION
 * ---   --------   ------   -----------------------------------------------
 * %00   03/05/93   JM       Initial Version
 *****************************************************************************
*/

#include <qdstd.h>
#include <qderrs.h>
#include <memory.h>

EXEC SQL INCLUDE SQLCA;

/*****************************************************************************
 * qdcp_ttsqry - SELECT TEMPORARY_TABLESPACE FROM USER_USERS
 * Determines tablespace in which temporary tables for aggregate queries
 * are created.  Verifies that user has sufficient privilege to create
 * tables in that tablespace, returns error otherwise.
 *****************************************************************************
*/
QDSTATUS qdcp_ttsqry(pcnx)
QDCNX *pcnx;        /* Connection structure in which to store tablespace name */
{
    regl QDSTATUS retval;
__private static ub4 cnx_seqno = 0; /* Connection sequence number */
    EXEC SQL BEGIN DECLARE SECTION;
        VARCHAR ttsname[32];            /* Temporary Tablespace name */
        int blocks;                     /* Used blocks in tablespace */
        int max_blocks;                 /* Max quota blocks in tablespace */
    EXEC SQL END DECLARE SECTION;

    QDBEGIN("qdcp_ttsqry");
    QD_CHECK_CNX_SEQNO; /* Check connection sequence number */

    /* If we've already previously determined that user lacks sufficient
     * privilege to create an intermediate table, just return error.
    */
    if (pcnx->flags & QDCNX_CANT_CREATE_TABLE)
    {
        retval = QD_CP_INSUF_PRIV_TO_CREATE_TABLE;
        goto error_return;
    }

    EXEC SQL SELECT TEMPORARY_TABLESPACE INTO :ttsname FROM USER_USERS;

    retval = sqlca.sqlcode;
    if (retval < 0)
        goto error_return;

    /* Now verify whether user can create tables in this tablespace. */
    /* Does user have a quota in this tablespace? */
    EXEC SQL SELECT BLOCKS, MAX_BLOCKS INTO :blocks, :max_blocks
    FROM USER_TS_QUOTAS WHERE TABLESPACE_NAME = :ttsname;

    retval = sqlca.sqlcode;
    if (retval < 0)
        goto error_return;

    /* If user has no quota on temporary tablespace, or quota is
     * obviously insufficient to create a table, check whether user
     * has unlimited tablespace resource privilege.
     * (If max_blocks equals -1, that means user has unlimited quota
     * on the tablespace.)
    */
    if (retval > 0
```

Apr 7 1993 15:09:36 qdcp_ttsqry.pc Page 2

```
        || (max_blocks - blocks < QD_MIN_TTS_QUOTA
            && !(max_blocks == -1)))
    {
        EXEC SQL SELECT PRIVILEGE FROM USER_SYS_PRIVS
        WHERE PRIVILEGE = 'UNLIMITED TABLESPACE';

        retval = sqlca.sqlcode;
        if (retval > 0) /* User doesn't have the privilege */
        {
            retval = QD_CP_INSUF_PRIV_TO_CREATE_TABLE;
            pcnx->flags |= QDCNX_CANT_CREATE_TABLE;
        }
    }
    /* If user has necessary privilege, record temp tablespace name
     * in cnx for later reference.
    */
    if (!retval)
    {
        memcpy(pcnx->temporary_tablespace, ttsname.arr, ttsname.len);
        pcnx->temporary_tablespace[ttsname.len] = 0;
    }

error_return:
    if (retval)
        QDFAIL(retval);
    QDEND;
    return retval;
} /* qdcp_ttsqry */
```

1

160

Dec 13 1993 10:59:41 qdsp_addstr.c Page 1

```
/*****************************************************************************
 * qdsp_addstr - Add a new string to qdef's strings area
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR   DESCRIPTION
 * ---   --------   ------   -----------------------------------------------
 * %04   10/28/93   AS       Same as 03 with this header included
 * %03   10/28/93   AS       Change alg for strings area alloc
 * %02   08/16/93   EYT      Call to qdrt_free sets pointer=NULL
 * %01   04/23/92   JM       Don't do anything if pqdef is NULL
 * %00   10/04/91   JM       Initial Version
 *****************************************************************************
*/

#include <memory.h>
#include <qdstd.h>
#include <qdspext.h>
#include <qdrtext.h>

/* qdsp_addstr - Add a new string to qdef's strings area, returning
 * its offset in strings area.  If there's no room in current
 * strings area, allocate a bigger one, deallocate the old one.
 * Strings in strings area are terminated by a 0 byte.
*/
ub4 qdsp_addstr(pqdef, paddstr, len)
reg1 QDSP_QDEF *pqdef; /* Query definition (root of parse tree) */
reg2 text *paddstr;    /* String to add */
reg3 ub4 len;          /* Length of string to add, not counting  */
                       /*  zero terminator */
{
    reg4 text *pstrings; /* Pointer to strings area */
    reg5 ub4 retval;     /* Value to return */
    reg6 ub4 len_needed; /* Space required in strings area to include new string */
    reg7 ub4 multiplier; /* How much to expand strings area */

    QDBEGIN("qdsp_addstr");

    /* If we're doing a quick parse looking for SELECT and NOPARTITION,
     * pqdef might be NULL, in which case, do nothing.
     */
    if (pqdef)
    {

        len_needed = pqdef->onextstr + len + 1;
        multiplier = 1;

        /* Determine how much to expand strings area */
        while (len_needed > pqdef->lstrings * multiplier)
          multiplier *= 2;

        /* Allocate bigger strings area if we've overflowed the current one */
        if (multiplier > 1)
        {
            pstrings = (text *)qdrt_malloc(pqdef->lstrings * multiplier);
            memcpy(pstrings, pqdef->pstrings, pqdef->lstrings);
            qdrt_free(&(pqdef->pstrings));
            pqdef->pstrings = pstrings;
            pqdef->lstrings *= multiplier;
        }
        retval = pqdef->onextstr;

        /* Now that it's safe, copy string to strings area */
        memcpy(pqdef->pstrings + retval, paddstr, len);
        pqdef->onextstr += len;

        /* Zero-terminate the string */
        pqdef->pstrings[pqdef->onextstr++] = '\0';
    }
```

Dec 13 1993 10:59:41 qdsp_addstr.c Page 2

```
    QDEND;
    return retval;
} /* qdsp_addstr */
```

Sep 20 1993 13:38:21 qdsp_colqry.pc Page 1

```
/******************************************************************************
 * qdsp_colqry - retrieve column information from ORACLE data dictionary
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ******************************************************************************
 * REV  DATE      AUTHOR  DESCRIPTION
 * ---  --------  ------  ---------------------------------------------------
 * $01  08/19/93  EYT     Zero terminate VARCHAR strings and allow
 *                        SQLCODE=-1405 (query returned) NULL value
 * $00  09/27/91  JM      Initial Version
 ******************************************************************************
*/

#include <qdstd.h>
#include <qdspext.h>
#include <qderrs.h>
#include <dtydef.h>  /* ORACLE datatype codes */

EXEC SQL BEGIN DECLARE SECTION;
        VARCHAR owner[32];              /* User name for owner of column */
        VARCHAR tabname[32];            /* Table name */
        VARCHAR colname[32];            /* Column name */
        VARCHAR datatype[10];           /* ORACLE datatype name */
        int column_id;                  /* ORACLE column id */
        int length;                     /* Column length */
        int precision;                  /* Column precision */
        int scale;                      /* Column scale */
EXEC SQL END DECLARE SECTION;

EXEC SQL INCLUDE SQLCA;

/******************************************************************************
 * qdsp_colqry - retrieve column information from ORACLE data dictionary
 *
 * Determine which table in the FROM clause the column belongs to, and
 * retrieve its datatype, length, precision, and scale.  If no column
 * with this name belonging to any table in the FROM clause can be found,
 * return warning "QD_SP_TABCOL_NOT_FOUND".  (In future, caller may
 * retry with same column, and FROM clause of a containing query, because
 * column may be a correlated reference to an outer query.  But currently,
 * we have no need to get semantic info for subqueries, so
 * QD_SP_TABCOL_NOT_FOUND will always signal an error.  However, it
 * shouldn't be able to occur for a query which satisfied ORACLE's parser.)
 *
 * This routine must be called after qdsp_tabqry, which sets oreal_name,
 * lreal_name, oreal_schema, and lreal_schema for each table in the
 * FROM clause.  These names must be used when looking up the column,
 * rather than the names specified for the table and schema in the query,
 * because if a synonym was used in the query, it won't match the table
 * name and schema stored for the column in ALL_TAB_COLUMNS.
 *
 * This routine currently uses embedded SQL to do the dictionary lookup,
 * but may be rewritten to use direct UPI calls, for efficiency.
 ******************************************************************************
*/
QDSTATUS qdsp_colqry(pcol, ptab, ntabs, pstrings)
reg1 QDSP_EXPR *pcol;       /* Pointer to parse-tree structure representing */
                            /*  a column of a table or view                 */
reg2 QDSP_TAB *ptab;        /* Pointer to tables in FROM clause of query;   */
                            /*  if column has no table name specified, try  */
                            /*  each of these.  If no match, return warning */
                            /*  "QD_SP_TABCOL_NOT_FOUND".                   */
reg3 ub4 ntabs;             /* Number of tables in FROM clause              */
reg4 text *pstrings;        /* Pointer to qdef strings area                 */
{
    reg5 int i;
    reg6 ub1 user_len;      /* Length of user name for this connection */
    reg7 text *puser;       /* Pointer to user name for this connection */
    reg8 QDSTATUS retval;
```

Sep 20 1993 13:38:21 qdsp_colqry.pc Page 2

```
__private static ub4 cnx_seqno = 0; /* Connection sequence number */

    QDBEGIN("qdsp_colqry");
    QD_CHECK_CNX_SEQNO; /* Check connection sequence number */
    puser = QDpcom->cnx.user;
    user_len = strlen(puser);

    memcpy(colname.arr, pstrings + pcol->u.col.oname, pcol->u.col.lname);
    colname.len = pcol->u.col.lname;
    colname.arr[colname.len] = 0;
    if (pcol->u.col.lqual)
    {
        memcpy(tabname.arr, pstrings + pcol->u.col.oqual, pcol->u.col.lqual);
        tabname.len = pcol->u.col.lqual;
        tabname.arr[tabname.len] = 0;
    }
    if (pcol->u.col.lschema)
    {
        memcpy(owner.arr, pstrings + pcol->u.col.oschema,
               pcol->u.col.lschema);
        owner.len = pcol->u.col.lschema;
        owner.arr[owner.len] = 0;
    } .

    for (i = 0; i < ntabs; i++, ptab++)
    {
        /* If table or schema was specified for column, skip this table */
        /* if it doesn't match */

        if (pcol->u.col.lqual) /* Column is qualified by table name or alias */
        {
            /* If table has alias specified, then any qualified column refs */
            /* from that table must be qualified by that alias */

            if (ptab->lalias)
            {
                if (pcol->u.col.lqual != ptab->lalias ||
                    memcmp(pstrings + pcol->u.col.oqual,
                           pstrings + ptab->oalias,
                           pcol->u.col.lqual))
                    continue;
            }
            else if (pcol->u.col.lqual != ptab->lreal_name ||
                     memcmp(pstrings + pcol->u.col.oqual,
                            pstrings + ptab->oreal_name,
                            pcol->u.col.lqual))
                continue;

            /* Now check whether column is qualified by schema name as */
            /* well, and if so, whether it matches table's schema name */
            /* (which must be same as user name used for connection,   */
            /* if it's not specified in the query)                     */

            if (pcol->u.col.lschema)
            {
                if (ptab->lreal_schema)
                {
                    if (ptab->lreal_schema != pcol->u.col.lschema
                        || memcmp(pstrings + pcol->u.col.oschema,
                                  pstrings + ptab->oreal_schema,
                                  pcol->u.col.lschema))
                        continue;
                }
                else if (user_len != pcol->u.col.lschema
                         || memcmp(pstrings + pcol->u.col.oschema,
                                   puser, pcol->u.col.lschema))
                        continue;
            } /* if (pcol->u.col.lschema) */
        } /* if (pcol->u.col.lqual) */

        /* If we got to here, either column isn't qualified, or it is */
        /* qualified to match the current table */
```

Sep 20 1993 13:38:21 qdsp_colqry.pc Page 3

```
        memcpy(tabname.arr, pstrings + ptab->oreal_name, ptab->lreal_name);
        tabname.len = ptab->lreal_name;
        tabname.arr[tabname.len] = 0;
        if (ptab->lreal_schema)
        {
            memcpy(owner.arr, pstrings + ptab->oreal_schema,
                   ptab->lreal_schema);
            owner.len = ptab->lreal_schema;
            owner.arr[owner.len] = 0;
        }
        else
        {
            memcpy(owner.arr, puser, user_len);
            owner.len = user_len;
            owner.arr[owner.len] = 0;
        }

        EXEC SQL SELECT COLUMN_ID, DATA_TYPE, DATA_LENGTH, DATA_PRECISION,
                 DATA_SCALE
                 INTO :column_id, :datatype, :length, :precision, :scale
                 FROM ALL_TAB_COLUMNS
                 WHERE OWNER = :owner AND TABLE_NAME = :tabname
                 AND COLUMN_NAME = :colname ;

#ifdef QDDEBUG
        if (QD_DISPLAY_DEBUG)
        {
            printf("sqlcode: %d\n", sqlca.sqlcode);
            owner.arr[owner.len] = 0;
            tabname.arr[tabname.len] = 0;
            colname.arr[colname.len] = 0;
            printf("owner: %s  tabname: %s  colname: %s\n", owner.arr,
                    tabname.arr, colname.arr);
        }
#endif /* QDDEBUG */

        /* sqlcode -1405 means a returned column has a NULL value */
        if (sqlca.sqlcode == 0 ||
            sqlca.sqlcode == -1405) /* Column was found */
        {
            pcol->u.col.colid = column_id;
            pcol->u.col.tabnum = i;
            pcol->length = length;
            pcol->precision = precision;
            pcol->scale = scale;

            /* temporary (?) datatype code assignments */
            if (!memcmp(datatype.arr, "CHAR", min(4, datatype.len)))
                pcol->datatype = DTYCHR;
            else if (!memcmp(datatype.arr, "NUMBER", min(6, datatype.len)))
                pcol->datatype = DTYNUM;
            else if (!memcmp(datatype.arr, "DATE", min(4, datatype.len)))
                pcol->datatype = DTYDAT;
            else if (!memcmp(datatype.arr, "LONG", min(4, datatype.len)))
                pcol->datatype = DTYLNG;
            else if (!memcmp(datatype.arr, "RAW", min(3, datatype.len)))
                pcol->datatype = DTYBIN;
            else
                pcol->datatype = 0;
            break;
        }
    } /* for (i = 0; ...) */

    if (i == ntabs) /* column wasn't found belonging to any of these tables */
    {
        retval = QD_SP_TABCOL_NOT_FOUND;
        goto error_return;
    }
    else
    {
        retval = QD_OK;
        goto return_retval;
    }
```

Sep 20 1993 13:38:21 qdsp_colqry.pc Page 4

```
error_return:
    QDFAIL(retval);
return_retval:
    QDEND;
    return retval;
} /* qdsp_colqry */
```

163

Sep 20 1993 13:38:23 qdsp_freetree.c Page 1

```
/************************************************************************
 * qdsp_freetree - Free memory used SQL parse tree structures
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ************************************************************************
 * REV   DATE      AUTHOR  DESCRIPTION
 * ---   --------  ------  -----------------------------------------------
 * %02   08/18/93  EYT     If check string doesn't match expected
 *                         values, don't free pointer
 * %01   08/16/93  EYT     Call to qdrt_free sets pointer=NULL, so
 *                         accept param pointer to pointer.
 * %00   10/02/91  JM      Initial Version
 ************************************************************************
 */

#include <qdstd.h>
#include <qdspext.h>
#include <qdrtext.h>
#include <qderrs.h>


/* qdsp_freetree - free entire parse tree
 * Strategy: free expressions via link lists starting at pfirexpr in
 * each qry.  Free qry's via link lists starting at pfirqry in qdef.
 * Free set operations via ptree from qdef.  Everything else gets
 * freed directly (using qdrt_free) from one of the above structures.
 */
QDSTATUS qdsp_freetree(pptree)
reg1 QDSP_UNION **pptree; /* Pointer to pointer to parse tree */
{
    reg2 QDSTATUS retval = QD_OK;
    QDSP_UNION *ptree;

    QDBEGIN("qdsp_freetree");

    if (pptree == (QDSP_UNION **)NULL)
        goto return_retval;

    ptree = *pptree;
    if (ptree == (QDSP_UNION *)NULL)
        goto return_retval;

    /* First free everything the current structure is pointing at */
    if (ptree->check == QDCK_QDEF)
    {
        /* Only free qdef's ptree if it's a set operation; */
        /* we'll get all the qry's by going throught the   */
        /* linked list starting at pfirqry.                */

        if (ptree->qdef.ptree != (QDSP_UNION *)NULL &&
             ptree->qdef.ptree->check != QDCK_QRY)
            qdsp_freetree(&(ptree->qdef.ptree));

        qdsp_freetree(&((QDSP_UNION *)(ptree->qdef.pfirqry)));

        if (ptree->qdef.pordcols != NULL)
            qdrt_free(&(ptree->qdef.pordcols));
        if (ptree->qdef.ppupdcols != NULL)
            qdrt_free(&(ptree->qdef.ppupdcols));
        if (ptree->qdef.pstrings != NULL)
            qdrt_free(&(ptree->qdef.pstrings));
        if (ptree->qdef.pstmt_id != NULL)
            qdrt_free(&(ptree->qdef.pstmt_id));
        if (ptree->qdef.pplan_table != NULL)
            qdrt_free(&(ptree->qdef.pplan_table));
    } /* QDCK_QDEF */
    else if (ptree->check == QDCK_QRY)
    {
        qdsp_freetree(&(ptree->qry.pnext));
```

Sep 20 1993 13:38:23 qdsp_freetree.c Page 2

```
        qdsp_freetree(&(ptree->qry.pfirexpr));
        if (ptree->qry.pparfids != NULL)
            qdrt_free(&(ptree->qry.pparfids));
        if (ptree->qry.pselist != NULL)
            qdrt_free(&(ptree->qry.pselist));
        if (ptree->qry.ptarglist != NULL)
            qdrt_free(&(ptree->qry.ptarglist));
        if (ptree->qry.ptabs != NULL)
            qdrt_free(&(ptree->qry.ptabs));
        if (ptree->qry.pgroupby != NULL)
            qdrt_free(&(ptree->qry.pgroupby));
        if (ptree->qry.pcolmap != NULL)
            qdrt_free(&(ptree->qry.pcolmap));

        /* NOTE: We may need to free query text here, if we have aborted
         * before creating a bb tree and transferring these to there.
         */
        if (QDpcom->cnx.ppcursor == NULL)
        {
            if (ptree->qry.ppsq_text != NULL)
                qdrt_free(&(ptree->qry.ppsq_text));
            if (ptree->qry.pcq_text != NULL)
                qdrt_free(&(ptree->qry.pcq_text));
            if (ptree->qry.pcts_text != NULL)
                qdrt_free(&(ptree->qry.pcts_text));
            if (ptree->qry.pis_text != NULL)
                qdrt_free(&(ptree->qry.pis_text));
            if (ptree->qry.pds_text != NULL)
                qdrt_free(&(ptree->qry.pds_text));
            if (ptree->qry.pdts_text != NULL)
                qdrt_free(&(ptree->qry.pdts_text));
        }

    }
    else if (ptree->check == QDCK_SETOP_UNION ||
             ptree->check == QDCK_SETOP_INTER ||
             ptree->check == QDCK_SETOP_MINUS)
    {
        if (ptree->setop.prand1 != (QDSP_UNION *)NULL &&
             ptree->setop.prand1->check != QDCK_QRY)
            qdsp_freetree(&(ptree->setop.prand1));
        if (ptree->setop.prand2 != (QDSP_UNION *)NULL &&
             ptree->setop.prand2->check != QDCK_QRY)
            qdsp_freetree(&(ptree->setop.prand2));
    }
    else if (ptree->check == QDCK_EXPR)
    {
        qdsp_freetree(&(ptree->expr.pnext));
    }
    else
    {
        /* Check String doesn't match the expected values */
        /* Again sort of klugy.  I should set the return code to an */
        /* error and determine why bogus ptr is getting passed in */
        /* It has something to do with QDSP_PXLIST containing wrong */
        /* first expression value */
        goto return_retval;
    }

    /* Now free the current structure */
    qdrt_free(pptree);

return_retval:
    QDEND;
    return retval;
} /* qdsp_freetree */
```

```
/*****************************************************************************
 * qdcp_hashqry - check data dictionary to determine whether a hashed
 *                table has an index with the hash key columns as its
 *                leading columns
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV    DATE       AUTHOR    DESCRIPTION
 * ---    --------   ------    ----------------------------------------------
 * %00    08/03/92   JM        Initial Version
 *****************************************************************************
 */

#include <qdstd.h>
#include <qdspext.h>
#include <qdrtext.h>
#include <qderrs.h>

EXEC SQL BEGIN DECLARE SECTION;
        VARCHAR table_owner[32];           /* User name for owner of table */
        VARCHAR table_name[32];            /* Table name */
        VARCHAR index_name[32];            /* Index name */
        int count_result;                  /* Result of count(*) */
EXEC SQL END DECLARE SECTION;

EXEC SQL INCLUDE SQLCA;

/*****************************************************************************
 * qdcp_hashqry - check data dictionary to determine whether a hashed
 *                table has an index with the hash key columns as its
 *                leading columns
 *
 * Given the name and owner of a table, and the assumption that the table
 * is hashed, first determine how many hash key columns the hashed cluster
 * has.  Then determine whether there exists an index of this table which
 * has all of the hash columns as leading columns of the index.  If there
 * exists more than one such index, the choice among them is arbitrary.
 *****************************************************************************
 */
QDSTATUS qdcp_hashqry(
reg3 QDSP_QDEF *pqdef;        /* Pointer to qdef (root of parse tree),        */
                              /*  needed for access to strings area           */
                              /*  (might have to replace pqdef->pstrings with */
                              /*  a larger buffer; hence, pqdef is passed,    */
                              /*  rather than just pstrings.)                 */
reg1 QDSP_TAB *ptab;          /* Pointer to tables in FROM clause of query    */
reg2 ub4 ntabs;               /* Number of tables in FROM clause              */
{
    reg4 int i;
    reg5 ub1 user_len;        /* Length of user name for this connection */
    reg6 text *puser;         /* Pointer to user name for this connection */
    reg7 QDSTATUS retval;

    QDBEGIN("qdsp_tabqry");
    puser = QDpcom->cnx.user;
    user_len = strlen(puser);

    /* If this is the first time we're executing dictionary queries on
     * behalf of this user, determine whether user has dba privilege, and
     * if so, set flag indicating we should use DBA_ views rather than
     * ALL_ views.
     */
    if (!(QDpcom->cnx.flags & QDCNX_DBA_CHECKED))
    {
        QDpcom->cnx.flags |= QDCNX_DBA_CHECKED;
        EXEC SQL SELECT COUNT(*) INTO :count_result
                 FROM SYS.USER$ U1, SYS.SYSAUTH$ S1
                 WHERE U1.NAME = USER AND
                 U1.USER# = S1.GRANTEE# AND
```

```
                 S1.PRIVILEGE# = 4;

        /* If the above query succeeded, and yielded non-zero count,
         * current user has DBA privilege.
         */
        if (sqlca.sqlcode == 0 && count_result > 0)
            QDpcom->cnx.flags |= QDCNX_DBA;
    }

    /* Process each table in FROM clause */

    for (i = 0; i < ntabs; i++, ptab++)
    {
        /* Find out what kind of object the specified table name is:     */
        /* SYNONYM, TABLE, or VIEW.  If SYNONYM, get underlying object,  */
        /* and repeat until underlying object is not a SYNONYM.          */

        if (ptab->lschema == 0) /* No schema specified for object */
        {
            /* Use user name of this connection as object's schema name */
            memcpy(owner.arr, puser, user_len);
            owner.len = user_len;
        }
        else
        {
            memcpy(owner.arr, pqdef->pstrings + ptab->oschema,
                   ptab->lschema);
            owner.len = ptab->lschema;
        }
        memcpy(tabname.arr, pqdef->pstrings + ptab->oname,
               ptab->lname);
        tabname.len = ptab->lname;

        do /* until we find underlying table or view */
        {
            /* Query DBA_OBJECTS if user has dba privilege,
             * else query ALL_OBJECTS
             */
            if (QDpcom->cnx.flags & QDCNX_DBA)
            {
                EXEC SQL SELECT DECODE(OBJECT_TYPE,
                                       'TABLE', 1,
                                       'VIEW',  2,
                                       'SYNONYM', 3,
                                       0)
                         INTO :object_type FROM SYS.DBA_OBJECTS
                         WHERE OWNER = :owner AND OBJECT_NAME = :tabname;
            } /* if dba */
            else
            {
                EXEC SQL SELECT DECODE(OBJECT_TYPE,
                                       'TABLE', 1,
                                       'VIEW',  2,
                                       'SYNONYM', 3,
                                       0)
                         INTO :object_type FROM ALL_OBJECTS
                         WHERE OWNER = :owner AND OBJECT_NAME = :tabname;
            } /* else not dba  */
            /* If query failed */
            if (sqlca.sqlcode)
            {
                if (sqlca.sqlcode > 0)
                    retval = QD_SP_TABLE_NOT_FOUND;
                else /* ORACLE error */
                    retval = sqlca.sqlcode;
                goto error_return;
            } /* if (sqlca.sqlcode) */

            /* If it's a synonym, find underlying object */

            if (object_type == SYNONYM)
            {
                /* Query DBA_SYNONYMS if user has dba privilege, else
```

165

```
     * query ALL_SYNONYMS.
     */
    if (QDpcom->cnx.flags & QDCNX_DBA)
        EXEC SQL SELECT TABLE_OWNER, TABLE_NAME
                 INTO :real_owner, :real_tabname
                 FROM SYS.DBA_SYNONYMS
                 WHERE OWNER = :owner AND
                 SYNONYM_NAME = :tabname;
    else
        EXEC SQL SELECT TABLE_OWNER, TABLE_NAME
                 INTO :real_owner, :real_tabname
                 FROM ALL_SYNONYMS
                 WHERE OWNER = :owner AND
                 SYNONYM_NAME = :tabname;

    if (sqlca.sqlcode)
    {
        if (sqlca.sqlcode > 0) /* object not found */
            retval = QD_SP_TABLE_NOT_FOUND;
        else /* ORACLE error */
            retval = sqlca.sqlcode;
        goto error_return;
    } /* if (sqlca.sqlcode) */

    memcpy(tabname.arr, real_tabname.arr, real_tabname.len);
    tabname.len = real_tabname.len;
    memcpy(owner.arr, real_owner.arr, real_owner.len);
    owner.len = real_owner.len;

} /* if (object_type == SYNONYM) */

else /* Underlying table or view has been found */
{
    if (object_type == VIEW)
    {
        /* Underlying view has been found */
        ptab->flags |= QDSP_TAB_VIEW;
    }
    else if (!(object_type == TABLE))
    {
        retval = QD_SP_OBJECT_NOT_TABLE;
        goto error_return;
    }

    /* Set the table's real name and schema */

    ptab->lreal_name = tabname.len;

    /* Was table specified by its real name? */

    if (tabname.len == ptab->lname &&
        !memcmp(tabname.arr, pqdef->pstrings +
                             ptab->oname, ptab->lname))
        ptab->oreal_name = ptab->oname;
    else
        ptab->oreal_name = qdsp_addstr(pqdef, tabname.arr,
                                       tabname.len);

    /* Was a schema specified for table? */

    if (ptab->lschema == 0)
    {
        /* Is underlying table owned by current user? */

        if (owner.len == user_len &&
            !memcmp(owner.arr, puser, user_len))
            ptab->lreal_schema = 0;
        else
        {
            ptab->lreal_schema = owner.len;
            ptab->oreal_schema = qdsp_addstr(pqdef,
                                             owner.arr,
                                             owner.len);
```

```
            }
        } /* if (ptab->lschema == 0) */
        else /* schema was specified */
        {
            ptab->lreal_schema = owner.len;

            /* Is underlying table owner by specified schema? */

            if (owner.len == ptab->lschema &&
                !memcmp(owner.arr, pqdef->pstrings +
                                   ptab->oschema, ptab->lschema))
                ptab->oreal_schema = ptab->oschema;
            else
                ptab->oreal_schema = qdsp_addstr(pqdef,
                                                 owner.arr,
                                                 owner.len);
        } /* else (schema was specified) */

        /* Determine the table's number of columns */
        /* Query DBA_TAB_COLUMNS if user has dba privilege,
         * else query ALL_TAB_COLUMNS
        */
        if (QDpcom->cnx.flags & QDCNX_DBA)
            EXEC SQL SELECT COUNT(*) INTO :ncols
            FROM SYS.DBA_TAB_COLUMNS
            WHERE OWNER = :owner AND TABLE_NAME = :tabname;
        else
            EXEC SQL SELECT COUNT(*) INTO :ncols
            FROM ALL_TAB_COLUMNS
            WHERE OWNER = :owner AND TABLE_NAME = :tabname;

        if (sqlca.sqlcode)
        {
            if (sqlca.sqlcode > 0) /* no columns found */
                retval = QD_SP_COLUMNS_NOT_FOUND;
            else /* ORACLE error */
                retval = sqlca.sqlcode;
            goto error_return;
        } /* if (sqlca.sqlcode) */
        else
            ptab->ncols = ncols;

      } /* else (underlying table or view has been found) */
    } while (object_type == SYNONYM);
  } /* for (i = 0; i < ntabs; i++, ptab++) */
  retval = QD_OK;
  goto return_retval;
error_return:
  QDFAIL(retval);
return_retval:
  QDEND;
  return retval;
} /* qdsp_xtabqry */
```

```
/*************************************************************************
 * qdsp_parse - main routine for SQL parser for Query Decomposition
 *
 * qdsp_find_select - return pointer to SELECT keyword within query text
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE      AUTHOR   DESCRIPTION
 * ---   --------  ------   ----------------------------------------------
 * %00   09/26/91  JM       Initial Version
 * %01   04/23/92  JM       Add mode parameter to qdsp_parse - support quick
 *                           check for SELECT, NOPARTITION
 *************************************************************************
 */

#include <qdstd.h>
#include <qdspext.h>
#include <qderrs.h>
#include <y.qdsql.h> /* %01 */
#include <qdtstext.h>

static QDSTATUS sparinit();
static QDSTATUS create_qdef();

QDSTATUS qdsp_parse(pqtext, ppqdef, mode)
reg2 text *pqtext; /* text of query to parse */
reg3 QDSP_QDEF **ppqdef; /* If non-null, set this pointer to qdef (root */
                         /* struct of parse tree) */
reg5 b4 mode;       /* QDSP_QUICK_PARSE or QDSP_FULL_PARSE - controls whether */
                    /*  to perform a quick check looking for SELECT keyword    */
                    /*  and NOPARTITION directive, or whether to do full       */
                    /*  parse.  */
{
    reg1 QDSTATUS retval;
    reg4 word qlen;

    QDBEGIN("qdsp_parse");

    /* Create and initialize SQL parser common area */
    retval = sparinit();
    if (QDFAILED)
        goto error_return;

    /* Put query text where lex's input() routine will find it */
    QDpcom->cnx.pspcom->pqtext = pqtext;

    if (mode == QDSP_QUICK_PARSE)
    /* Parser has been called prior to EXPLAIN, for a quick check to ensure
     * that this is a SELECT statement, and doesn't contain a NOPARTITION
     * directive; if not, no point incurring overhead of EXPLAIN.
    */
    {
        if (yylex() != RW_SELECT)
            retval = QD_CP_INCORRECT_NOT_SELECT;
        else if (yylex() == L_DIRECTIVE_COMMENT &&
                 yylex() == RW_NOPARTITION)
            retval = QD_CP_INCORRECT_NOPARTITION;
        else retval = QD_OK;

#if 0
        /* The following two lines are a kludge way of resetting the
         * lexical analyzer.  Without them, queries with no space between
         * the second and third tokens (e.g. "select max(salary) from emp")
         * won't parse properly because when the FULL_PARSE happens, the
         * third token (in this example the open paren) gets returned before
         * the SELECT token.  There should be a better fix.
         */
        QDpcom->cnx.pspcom->pqtext = "; ";
        QDpcom->cnx.pspcom->oqtext = 0;
```

```
        yylex();
#endif /* 0 */
    }
    else /* perform full parse, assume that EXPLAIN has already been called */
    {
        /* Parser wants a semicolon-terminated string */
        qlen = strlen(pqtext);
        if (pqtext[qlen - 1] != ';')
            pqtext[qlen] = ';';

        /* Initialize return qdef pointer */
        if (ppqdef != (QDSP_QDEF **)NULL)
            *ppqdef = (QDSP_QDEF *)NULL;

        retval = create_qdef(ppqdef);
        if (retval)
            if (QDFAILED)
                goto error_return;

        retval = yyparse();

        /* Restore terminating zero in query text string, in case we
         * clobbered it with a semicolon.
         */
        pqtext[qlen] = 0;
    }
error_return:
    QDEND;
    return retval;
} /* qdsp_parse */


/* qdsp_find_select - return pointer to first non-commented instance
 *  of keyword 'SELECT' within pqtext.  If not found, return NULL.
 *  (This is a different task than determining whether statement IS a
 *  select statement, which is performed by the QUICK_PARSE mode of
 *  qdsp_parse.  The current routine finds the beginning of a select
 *  statement, which may be embedded within an EXPLAIN statement.)
*/
#define SELECT_OFFSET_ADJUST 7 /* Subtract this value from oqtext after */
                               /*  yylex finds SELECT keyword, to get    */
                               /*  starting offset of SELECT within      */
                               /*  query text                            */
#define INSERT_OFFSET_ADJUST 7
text *qdsp_find_select(pqtext, ppinsert)
text *pqtext;         /* Pointer to query text */
text **ppinsert;      /* Pointer to a pointer which is set to point at     */
                      /*  first occurrence of keyword INSERT within qtext, */
                      /*  or set to NULL if that keyword doesn't appear.   */
{
    text *pselect = NULL;
    int tok;
    bool insert_select = FALSE; /* Set to true for INSERT...SELECT stmt */

    QDBEGIN("qdsp_find_select");

    /* Create and initialize SQL parser common area */
    sparinit();
    if (QDFAILED)
        goto error_return;

    /* Put query text where lex's input() routine will find it */
    QDpcom->cnx.pspcom->pqtext = pqtext;

    if (ppinsert != (text **)NULL)
        *ppinsert = (text *)NULL;

    while ((tok = yylex()) != RW_SELECT && tok != SEMICOLON && tok != 0)
    {
        if (tok == RW_INSERT)
        {
            insert_select = TRUE;
            if (ppinsert != (text **)NULL)
```

1

```
                *ppinsert = pqtext +
                    (QDpcom->cnx.pspcom->oqtext - INSERT_OFFSET_ADJUST);
        }
    }

    if (tok == RW_SELECT)
    {
        pselect = pqtext +
                (QDpcom->cnx.pspcom->oqtext - SELECT_OFFSET_ADJUST);

        /* If INSERT keyword was found, assume this is INSERT...SELECT
         * statement, indicate this by setting the offset of the SELECT
         * keyword to non-zero value giving its offset within statement.
        */
        if (insert_select)
            QDpcom->cnx.pspcom->oselect = pselect - pqtext;
        else
            QDpcom->cnx.pspcom->oselect = 0;
    }
error_return:
    QDEND;
    return pselect;
}

static QDSTATUS sparinit()
{
    reg1 QDSP_COM *pspcom;

    /* Create parser common area if not already done */
    if (QDpcom->cnx.pspcom == NULL)
    {
        pspcom = (QDSP_COM *)qdrt_malloc(sizeof(QDSP_COM));
        if (QDFAILED)
            return(QD_STATUS);
        QDpcom->cnx.pspcom = pspcom;
        pspcom->check = QDCK_PARS;
    }
    else pspcom = QDpcom->cnx.pspcom;

    /* (Re)initialize expression list stack */
    pspcom->xlsc = 0;
    pspcom->xlstack[0] = (QDSP_EXPR *)NULL;

    /* (Re)initialize current offset in query string */
    pspcom->oqtext = 0;


    /* Flush the tokenizer, since we may have stopped in the middle
     * of a comment during the last parse.
     */
    yyflush();

    return QD_OK;

} /* sparinit */


/* create_qdef */
/* create Query Definition structure, which is root of parse tree */
/* This is called before parsing begins, in order to initialize the */
/* strings area. */

static QDSTATUS create_qdef(ppqdef)
reg2 QDSP_QDEF **ppqdef; /* Place to return address of created struct */
{
    reg1 QDSP_QDEF *pqdef;

    /* Note - there's no check of whether QD_PQDEF is already non-null. */
    /* It is assumed that any previous callers to qdsparse have         */
    /* safely stashed their qdef pointers */

    pqdef = (QDSP_QDEF *)qdrt_malloc(sizeof(QDSP_QDEF));
```

```
    pqdef->check = QDCK_QDEF;

    /* We'll actually want to base strings size on size of query text */
    /* but for now, use default size                                  */
    pqdef->pstrings = (text *)qdrt_malloc(QDSP_DFLT_LSTRINGS);
    pqdef->lstrings = QDSP_DFLT_LSTRINGS;

    /* Set global pointer to qdef (this is only used during parsing, and */
    /* is not guaranteed to remain good once qdsp_parse has returned.    */
    /* Caller should stash value returned in ppqdef.                     */

    QD_PQDEF = pqdef;

    /* Return address of qdef to caller */

    if (ppqdef != (QDSP_QDEF **)NULL)
        *ppqdef = pqdef;

    /* Set default values from QDcom for array_size, array_threshold,
     * min_partitions, and max_partitions; these derive from environment
     * variable settings for KSR_ARRAY_SIZE, KSR_ARRAY_THRESHOLD,
     * KSR_MINPARTITIONS, and KSR_MAXPARTITIONS, respectively.
     * If any of the same-named directives are specified in this query,
     * they will override (and over-write) these settings (see qdsql.y).
    */
    pqdef->array_size = QDpcom->array_size;
    pqdef->array_threshold = QDpcom->array_threshold;
    pqdef->min_partitions = QDpcom->min_partitions;
    pqdef->max_partitions = QDpcom->max_partitions;

    return QD_STATUS;
} /* create_qdef */
```

168

Jul 7 1992 16:58:12 qdsp_sem.c Page 1

```
/****************************************************************************
 * qdsp_sem - Perform semantic analysis of SQL query parse tree
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE       AUTHOR   DESCRIPTION
 * ---   --------   ------   -----------------------------------------------
 * %00   09/27/91   JM       Initial Version
 ****************************************************************************
*/

#include <qdstd.h>
#include <qdspext.h>
#include <qderrs.h>

static QDSTATUS qrysem(
#ifdef __STDC__
    QDSP_QDEF *,
    QDSP_UNION *
#endif /* __STDC__ */
); /* qrysem */
/****************************************************************************
 * qdsp_sem - Perform semantic analysis of SQL query parse tree
 *
 * Semantic analysis includes:
 *  Resolve synonyms to underlying table names
 *  Identify tables which are views rather than base tables
 *  Determine datatype, length, precision and scale of columns ref'd in
 *    the query, which requires determining which table they belong to
 *
 * Call qrysem for root of qdef's query/set-operation tree.  This will
 * recurse on subtree to find queries (as opposed to set operations), and will
 * semantically analyze those queries.  Note that this method of traversal
 * will not visit subqueries, only queries which are direct children of
 * set operations or of the qdef itself.  This is intentional, as we do not
 * need semantic information about subqueries for query decomposition.
 ****************************************************************************
 */
QDSTATUS qdsp_sem(pqdef)
reg1 QDSP_QDEF *pqdef;
{
    reg2 QDSP_QRY *pqry;
    reg3 QDSTATUS retval;

    QDBEGIN("qdsp_sem");

    /* Traverse list of queries, which includes subqueries */
    for (pqry = pqdef->pfirqry; pqry != NULL; pqry = pqry->pnext)
    {
        retval = qrysem(pqdef, pqry);
        if (retval)
            goto return_retval;
    }
return_retval:
    QDEND;
    return retval;
/* Traverse through tree of setops, skip subqueries
    return (qrysem(pqdef, pqdef->ptree));
*/
}


static QDSTATUS qrysem(pqdef, ptree)
reg5 QDSP_QDEF *pqdef;      /* Pointer to overall parse tree */
reg4 QDSP_UNION *ptree;     /* Pointer to tree of qry's and setop's */
{
    reg1 QDSP_EXPR *pcol;
    reg2 QDSP_QRY *pqry;
```

Jul 7 1992 16:58:12 qdsp_sem.c Page 2

```
    reg3 QDSTATUS retval = QD_OK;

    if (ptree == (QDSP_UNION *)NULL) /* Shouldn't happen */
    {
        QDFAIL(QD_BAD_CHECKSTRING);
        return QD_STATUS;
    }
    else if (ptree->check == QDCK_SETOP_UNION ||
             ptree->check == QDCK_SETOP_INTER ||
             ptree->check == QDCK_SETOP_MINUS)
    {
        retval = qrysem(pqdef, ptree->setop.prand1);
        if (retval)
            return retval;
        return qrysem(pqdef, ptree->setop.prand2);
    }
    else if (ptree->check != QDCK_QRY) /* Shouldn't happen */
    {
        QDFAIL(QD_BAD_CHECKSTRING);
        return QD_STATUS;
    }

    /* If we got here, we have a query */

    pqry = &(ptree->qry);

    /* Get semantic information on tables in FROM clause: is it a     */
    /* view?  Is name by which table is referenced in query actually */
    /* a synonym?  If so, what are the underlying table name and     */
    /* schema name? */

    retval = qdsp_tabqry(pqdef, pqry->ptabs, pqry->ntabs);

    /* Now get semantic information on columns (data type, length,      */
    /* precision, scale, which table in FROM clause column belongs to) */

    if (!retval)
    {
        for (pcol = pqry->pfirexpr;
             pcol != (QDSP_EXPR *)NULL;
             pcol = pcol->pnext)
        {
            if (pcol->opcode != QDSP_OP_COL)
                continue;
            retval = qdsp_colqry(pcol, pqry->ptabs, pqry->ntabs,
                                 pqdef->pstrings);

            /* Return value of TABCOL_NOT_FOUND generally means we found
             * a correlated reference in a subquery.  Current functionality
             * permits ignoring this warning.
             */
            if (retval == QD_SP_TABCOL_NOT_FOUND)
            {
                QDRESET;
                retval = QD_OK;
            }
#ifdef DEBUG
            printf("Retval from qdsp_colqry: %d\n", retval);
            printf("  pqry: %08lx  pnext: %08lx pcol:%08lx\n",
                   pqry, pqry->pnext, pcol);
#endif /* DEBUG */
        } /* for (pcol ...) */
    } /* if (!retval) */
    return retval;
} /* qdsp_sem */
```

1

164

Sep 20 1993 13:38:26 qdsp_tabqry.pc Page 1

```
/*************************************************************************
 * qdsp_tabqry - retrieve table information from ORACLE data dictionary
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV  DATE      AUTHOR   DESCRIPTION
 * ---  --------  ------   ------------------------------------------------
 * %00  09/27/91  JM       Initial Version
 *************************************************************************
*/

#include <qdstd.h>
#include <qdspext.h>
#include <qdrtext.h>
#include <qderrs.h>
#include <dtydef.h>  /* ORACLE datatype codes */

EXEC SQL BEGIN DECLARE SECTION;
        VARCHAR owner[32];              /* User name for owner of column */
        VARCHAR tabname[32];            /* Table name */
        VARCHAR real_owner[32];         /* Owner of underlying table */
        VARCHAR real_tabname[32];       /* Name of underlying table */
        int object_type;                /* Type of object: TABLE, VIEW, */
                                        /* or SYNONYM */
        int ncols;                      /* Number of columns in table */
        int count_result;               /* Result of count(*) */
EXEC SQL END DECLARE SECTION;

/* Decoded object types */
#define TABLE 1
#define VIEW 2
#define SYNONYM 3

EXEC SQL INCLUDE SQLCA;

/*************************************************************************
 * qdsp_tabqry - retrieve table information from ORACLE data dictionary
 *
 * Determine whether table name specified in query is actual table name
 * or a synonym.  If a synonym, resolve to underlying table name (may take
 * multiple tries, as a synonym may resolve to another synonym.)  Set
 * table's oreal_name, lreal_name, oreal_schema, and lreal_schema fields
 * to indicate the underlying table name and schema (if these are the same
 * as the ones specified in the query, then set these fields to match
 * oname, lname, oschema, and lschema).
 *
 * Determine whether table is a view rather than a base table; if so,
 * set appropriate flag.
 *
 * This routine currently uses embedded SQL to do the dictionary lookup,
 * but may be rewritten to use direct UPI calls, for efficiency.
 *************************************************************************
*/
QDSTATUS qdsp_tabqry(pqdef, ptab, ntabs)
reg3 QDSP_QDEF *pqdef;    /* Pointer to qdef (root of parse tree),        */
                          /*  needed for access to strings area           */
                          /*  (might have to replace pqdef->pstrings with */
                          /*  a larger buffer; hence, pqdef is passed,    */
                          /*  rather than just pstrings.)                 */
reg1 QDSP_TAB *ptab;      /* Pointer to tables in FROM clause of query    */
reg2 ub4 ntabs;           /* Number of tables in FROM clause              */
{
    reg4 int i;
    reg5 ub1 user_len;    /* Length of user name for this connection */
    reg6 text *puser;     /* Pointer to user name for this connection */
    reg7 QDSTATUS retval;
__private static ub4 cnx_seqno = 0; /* Connection sequence number */

    QDBEGIN("qdsp_tabqry");
```

Sep 20 1993 13:38:26 qdsp_tabqry.pc Page 2

```
    QD_CHECK_CNX_SEQNO;

    puser = QDpcom->cnx.user;
    user_len = strlen(puser);

    /* If this is the first time we're executing dictionary queries on
     * behalf of this user, determine whether user has dba privilege, and
     * if so, set flag indicating we should use DBA_ views rather than
     * ALL_ views.
     */
    if (!(QDpcom->cnx.flags & QDCNX_DBA_CHECKED))
    {
        QDpcom->cnx.flags |= QDCNX_DBA_CHECKED;
        EXEC SQL SELECT COUNT(*) INTO :count_result
                 FROM SYS.USER$ U1, SYS.SYSAUTH$ S1
                 WHERE U1.NAME = USER AND
                 U1.USER# = S1.GRANTEE# AND
                 S1.PRIVILEGE# = 4;

        /* If the above query succeeded, and yielded non-zero count,
         * current user has DBA privilege.
         */
        if (sqlca.sqlcode == 0 && count_result > 0)
            QDpcom->cnx.flags |= QDCNX_DBA;
    }

    /* Process each table in FROM clause */

    for (i = 0; i < ntabs; i++, ptab++)
    {
        /* Find out what kind of object the specified table name is:    */
        /* SYNONYM, TABLE, or VIEW.  If SYNONYM, get underlying object, */
        /* and repeat until underlying object is not a SYNONYM.         */

        if (ptab->lschema == 0) /* No schema specified for object */
        {
            /* Use user name of this connection as object's schema name */
            memcpy(owner.arr, puser, user_len);
            owner.len = user_len;
        }
        else
        {
            memcpy(owner.arr, pqdef->pstrings + ptab->oschema,
                   ptab->lschema);
            owner.len = ptab->lschema;
        }
        memcpy(tabname.arr, pqdef->pstrings + ptab->oname,
               ptab->lname);
        tabname.len = ptab->lname;

        do /* until we find underlying table or view */
        {
            /* Query DBA_OBJECTS if user has dba privilege,
             * else query ALL_OBJECTS
             */
            if (QDpcom->cnx.flags & QDCNX_DBA)
            {
                EXEC SQL SELECT DECODE(OBJECT_TYPE,
                                       'TABLE', 1,
                                       'VIEW',  2,
                                       'SYNONYM', 3,
                                       0)
                         INTO :object_type FROM SYS.DBA_OBJECTS
                         WHERE OWNER = :owner AND OBJECT_NAME = :tabname;
            } /* if dba */
            else
            {
                EXEC SQL SELECT DECODE(OBJECT_TYPE,
                                       'TABLE', 1,
                                       'VIEW',  2,
                                       'SYNONYM', 3,
                                       0)
                         INTO :object_type FROM ALL_OBJECTS
```

1

170

Sep 20 1993 13:38:26 qdsp_tabqry.pc Page 3

```
                    WHERE OWNER = :owner AND OBJECT_NAME = :tabname;
    } /* else not dba */
    /* If query failed */
    if (sqlca.sqlcode)
    {
        if (sqlca.sqlcode > 0)
            retval = QD_SP_TABLE_NOT_FOUND;
        else /* ORACLE error */
            retval = sqlca.sqlcode;
        goto error_return;
    } /* if (sqlca.sqlcode) */

    /* If it's a synonym, find underlying object */

    if (object_type == SYNONYM)
    {
        /* Query DBA_SYNONYMS if user has dba privilege, else
         * query ALL_SYNONYMS.
         */
        if (QDpcom->cnx.flags & QDCNX_DBA)
            EXEC SQL SELECT TABLE_OWNER, TABLE_NAME
                     INTO :real_owner, :real_tabname
                     FROM SYS.DBA_SYNONYMS
                     WHERE OWNER = :owner AND
                     SYNONYM_NAME = :tabname;
        else
            EXEC SQL SELECT TABLE_OWNER, TABLE_NAME
                     INTO :real_owner, :real_tabname
                     FROM ALL_SYNONYMS
                     WHERE OWNER = :owner AND
                     SYNONYM_NAME = :tabname;

        if (sqlca.sqlcode)
        {
            if (sqlca.sqlcode > 0) /* object not found */
                retval = QD_SP_TABLE_NOT_FOUND;
            else /* ORACLE error */
                retval = sqlca.sqlcode;
            goto error_return;
        } /* if (sqlca.sqlcode) */

        memcpy(tabname.arr, real_tabname.arr, real_tabname.len);
        tabname.len = real_tabname.len;
        memcpy(owner.arr, real_owner.arr, real_owner.len);
        owner.len = real_owner.len;

    } /* if (object_type == SYNONYM) */

    else /* Underlying table or view has been found */
    {
        if (object_type == VIEW)
        {
            /* Underlying view has been found */
            ptab->flags |= QDSP_TAB_VIEW;
        }
        else if (!(object_type == TABLE))
        {
            retval = QD_SP_OBJECT_NOT_TABLE;
            goto error_return;
        }

        /* Set the table's real name and schema */

        ptab->lreal_name = tabname.len;

        /* Was table specified by its real name? */

        if (tabname.len == ptab->lname &&
            !memcmp(tabname.arr, pqdef->pstrings +
                                 ptab->oname, ptab->lname))
            ptab->oreal_name = ptab->oname;
        else
            ptab->oreal_name = qdsp_addstr(pqdef, tabname.arr,
```

Sep 20 1993 13:38:26 qdsp_tabqry.pc Page 4

```
                                           tabname.len);

        /* Was a schema specified for table? */

        if (ptab->lschema == 0)
        {
            /* Is underlying table owned by current user? */

            if (owner.len == user_len &&
                !memcmp(owner.arr, puser, user_len))
                ptab->lreal_schema = 0;
            else
            {
                ptab->lreal_schema = owner.len;
                ptab->oreal_schema = qdsp_addstr(pqdef,
                                                 owner.arr,
                                                 owner.len);
            }
        } /* if (ptab->lschema == 0) */
        else /* schema was specified */
        {
            ptab->lreal_schema = owner.len;

            /* Is underlying table owner by specified schema? */

            if (owner.len == ptab->lschema &&
                !memcmp(owner.arr, pqdef->pstrings +
                                   ptab->oschema, ptab->lschema))
                ptab->oreal_schema = ptab->oschema;
            else
                ptab->oreal_schema = qdsp_addstr(pqdef,
                                                 owner.arr,
                                                 owner.len);
        } /* else (schema was specified) */

        /* Determine the table's number of columns */
        /* Query DBA_TAB_COLUMNS if user has dba privilege,
         * else query ALL_TAB_COLUMNS
         */
        if (QDpcom->cnx.flags & QDCNX_DBA)
            EXEC SQL SELECT COUNT(*) INTO :ncols
            FROM SYS.DBA_TAB_COLUMNS
            WHERE OWNER = :owner AND TABLE_NAME = :tabname;
        else
            EXEC SQL SELECT COUNT(*) INTO :ncols
            FROM ALL_TAB_COLUMNS
            WHERE OWNER = :owner AND TABLE_NAME = :tabname;

        if (sqlca.sqlcode)
        {
            if (sqlca.sqlcode > 0) /* no columns found */
                retval = QD_SP_COLUMNS_NOT_FOUND;
            else /* ORACLE error */
                retval = sqlca.sqlcode;
            goto error_return;
        } /* if (sqlca.sqlcode) */
        else
            ptab->ncols = ncols;

      } /* else (underlying table or view has been found) */
    } while (object_type == SYNONYM);
  } /* for (i = 0; i < ntabs; i++, ptab++) */
  retval = QD_OK;
  goto return_retval;
error_return:
  QDFAIL(retval);
return_retval:
  QDEND;
  return retval;
} /* qdsp_xtabqry */
```

Sep 20 1993 13:38:33 qdtst_dspmsg.c Page 1

```
/*****************************************************************************
 * qdtst_dspmsg - Display posted error code and routine which detected error
 * (May also display error message in a future version)
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR    DESCRIPTION
 * ---   --------   ------    ----------------------------------------------
 * %00   11/21/91   JM        Initial Version
 *****************************************************************************
*/

#include <stdio.h>
#include <qdstd.h>
#include <qderrs.h>

extern bool QD_enable_dspmsg;

QDSTATUS qdtst_dspmsg(pcustmsg, pcustcode)
text *pcustmsg;    /* Optional custom message to display in addition to */
                   /*  standard message */
QDSTATUS *pcustcode; /* Optional pointer to additional error code for */
                     /*  use as 'printf' argument when printing */
                     /*  pcustmsg (use %ld as placeholder in pcustmsg) */

{
    if (QD_enable_dspmsg)
    {
        if (pcustmsg != NULL)
        {
            if (pcustcode == NULL)
                printf(pcustmsg);
            else
                printf(pcustmsg, *pcustcode);
        }
        printf("Error %d detected by %s.\n", QD_STATUS,
               QDpcom->pdetector ? QDpcom->pdetector : "unknown routine");

    }
    return QD_OK;

} /* qdtst_dspmsg */
```

```
/******************************************************************************
 * qdtst_dump.c - Routines to dump various internal structures
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ******************************************************************************
 * REV  DATE      AUTHOR   DESCRIPTION
 * ---  --------  ------   ----------------------------------------------------
 * %00  03/31/92  JM       Split off from qdtst_main.c
 ******************************************************************************
*/

#include <stdio.h>
#include <strings.h>
#include <ctype.h>
#include <dtydef.h>
#include <qdstd.h>
#include <qdspext.h>
#include <qdcpext.h>
#include <qdbbext.h>
#include <qdtstext.h>
#include <stdlib.h>
#include <sys/time.h>

static text *dtyname();

b4 qdtst_dump_colmap(pcolmap, ncols) /* dump column map to stdout */
QDCP_COLMAP *pcolmap; /* Pointer to column map */
b4 ncols; /* Number of columns */
{
    static int dump_tree();
    static text *cmflag2str();
    regl b4 i;

    printf("\nColumn Map (%d entries)\n", ncols);
    for (i = 0; i < ncols; i++)
    {
        printf(" pcolmap[%d]:\n", i);
        printf(
            "   iq_colnum: %d  cq_colnum: %d  it_colnum: %d  psq_colnum: %d\n",
               pcolmap[i].iq_colnum, pcolmap[i].cq_colnum,
               pcolmap[i].it_colnum, pcolmap[i].psq_colnum);
        printf(
            "   sumcol: %d  countcol: %d  sumsqrcol: %d\n",
               pcolmap[i].sumcol, pcolmap[i].countcol, pcolmap[i].sumsqrcol);
        printf("   flags: %02x %s\n", pcolmap[i].flags,
               cmflag2str(pcolmap[i].flags));
        printf("   expr:\n");
        dump_tree(pcolmap[i].pexpr, "     ");
    } /* for ... */
} /* dump_tree */

/* qdtst_dump_tree - external entrypoint for dump_tree */
b4 qdtst_dump_tree(ptree, pad)
QDSP_UNION *ptree; /* Pointer to parse tree */
text *pad;      /* String for padding output */
{
    return dump_tree(ptree, pad);
} /* qdtst_dump_tree */

static int dump_tree(ptree, pad) /* recursively dump parse tree to stdout */
QDSP_UNION *ptree; /* Pointer to parse tree */
text *pad;       /* String for padding output */
{
    /* translation routines */
    static text *opcode2str(), *tabflag2str(), *exprflag2str(),
                *qdefflag2str(), *qryflag2str(), *cmflag2str();
    text nextpad[80];
    int i;
    QDSP_QDEF *pqdef = QD_PQDEF;
```

```
    if (ptree == (QDSP_UNION *)NULL)
        return 0;
    strcpy(nextpad, "    ");
    strcat(nextpad, pad);
    if (ptree->check == QDCK_QDEF)
    {
        printf("\n%sQDEF: (%081x)\n", pad, ptree);
#ifdef DISPLAY_CHECKSTRINGS
        printf("%s check:     %4.4s\n", pad, (text *)&(ptree->qdef.check));
#endif /* DISPLAY_CHECKSTRINGS */
        printf("%s lstrings: %d\n", pad, ptree->qdef.lstrings);
        if (ptree->qdef.flags)
            printf("%s flags: %d %s\n", pad, ptree->qdef.flags,
                   qdefflag2str(ptree->qdef.flags));
        if (ptree->qdef.lpar_tab_name)
        {
            if (ptree->qdef.lpar_tab_schema)
                printf("%s partition table: %s.%s\n", pad,
                       ptree->qdef.pstrings + ptree->qdef.opar_tab_schema,
                       ptree->qdef.pstrings + ptree->qdef.opar_tab_name);
            else
                printf("%s partition table: %s\n", pad,
                       ptree->qdef.pstrings + ptree->qdef.opar_tab_name);
        }
        if (ptree->qdef.max_partitions)
            printf("%s max partitions: %d\n", pad, ptree->qdef.max_partitions);
        if (ptree->qdef.min_partitions)
            printf("%s min partitions: %d\n", pad, ptree->qdef.min_partitions);
        if (ptree->qdef.array_size)
            printf("%s array size: %d\n", pad, ptree->qdef.array_size);
        if (ptree->qdef.array_threshold)
            printf("%s array theshold: %d\n", pad,
                   ptree->qdef.array_threshold);
        printf("%s nordcols: %d\n", pad, ptree->qdef.nordcols);
        printf("%s pordcols: %081x\n", pad, ptree->qdef.pordcols);
        for (i = 0; i < ptree->qdef.nordcols; i++)
        {
            printf("%s   ORDCOL:\n", pad);
            printf("%sdirection: %4.4s\n", nextpad,
                   (text *)&(ptree->qdef.pordcols[i].direction));
            if (ptree->qdef.pordcols[i].colmap_index >= 0)
                printf("%scolmap_index: %d\n", nextpad,
                       ptree->qdef.pordcols[i].colmap_index);
            dump_tree(ptree->qdef.pordcols[i].pexpr, nextpad);
        }
        if (ptree->qdef.nupdcols > 0)
        {
            printf("%s nupdcols: %d\n", pad, ptree->qdef.nupdcols);
            printf("%s ppupdcols: %081x\n", pad, ptree->qdef.ppupdcols);
            for (i = 0; i < ptree->qdef.nupdcols; i++)
            {
                printf("%s    ppupdcols[%d]: %081x\n", pad,
                       i, ptree->qdef.ppupdcols[i]);
                dump_tree(ptree->qdef.ppupdcols[i], nextpad);
            }
        }
        if (ptree->qdef.pplan_table != NULL)
        {
            printf("%s pplan_table: ", pad);
            if (ptree->qdef.pplan_table->lschema)
                printf("%s.", pqdef->pstrings +
                       ptree->qdef.pplan_table->oschema);
            printf("%s\n", pqdef->pstrings +
                   ptree->qdef.pplan_table->oname);
        }
        if (ptree->qdef.pstmt_id != NULL)
        {
            printf("%s pstmt_id: %081x\n", pad, ptree->qdef.pstmt_id);
            dump_tree(ptree->qdef.pstmt_id, nextpad);
        }
        printf("%s ptree:    %081x\n", pad, ptree->qdef.ptree);
        dump_tree(ptree->qdef.ptree, nextpad);
```

173

Sep 20 1993 13:38:35 qdtst_dump.c Page 3

```
    } /* ptree->check == QDCK_QDEF */
    else if (ptree->check == QDCK_SETOP_UNION ||
             ptree->check == QDCK_SETOP_INTER ||
             ptree->check == QDCK_SETOP_MINUS)
    {
        printf("%sSETOP: (%08lx)\n", pad, ptree);
#ifdef DISPLAY_CHECKSTRINGS
        printf("%s check:  %4.4s\n", pad, (text *)&(ptree->setop.check));
#endif /* DISPLAY_CHECKSTRINGS */
        printf("%s flags:  %02x %s\n", pad, ptree->setop.flags,
               (ptree->setop.flags & QDSP_SETOP_ALL) ? "(ALL)" : "");
        printf("%s prand1: %08lx\n", pad, ptree->setop.prand1);
        dump_tree(ptree->setop.prand1, nextpad);
        printf("%s prand2: %08lx\n", pad, ptree->setop.prand2);
        dump_tree(ptree->setop.prand2, nextpad);
    } /* ptree->check == QDCK_UNION ... */
    else if (ptree->check == QDCK_QRY)
    {
        printf("%sQRY: (%08lx)\n", pad, ptree);
#ifdef DISPLAY_CHECKSTRINGS
        printf("%s check: %4.4s\n", pad, (text *)&(ptree->qry.check));
#endif /* DISPLAY_CHECKSTRINGS */
        if (ptree->qry.nparfids)
        {
            printf("%s partab: %d\n", pad, ptree->qry.partab);
            printf("%s nparfids: %d\n", pad, ptree->qry.nparfids);
            if (ptree->qry.pparfids != (int *) NULL)
            {
                printf("%s parfids: ", pad);
                for (i = 0; i < ptree->qry.nparfids; i++)
                    printf("%04x ", ptree->qry.pparfids[i]);
                printf("\n");
            }
        } /* if (ptree->qry.nparfids) */
        if (ptree->qry.ncolmap_entries)
        {
            printf("%s ncolmap_entries: %d\n", pad,
                   ptree->qry.ncolmap_entries);
            printf(
              "%s niq_cols: %d  ncq_cols: %d  nit_cols: %d  npsq_cols: %d\n",
                   pad,
                   ptree->qry.niq_cols, ptree->qry.ncq_cols,
                   ptree->qry.nit_cols, ptree->qry.npsq_cols);
        }
        printf("%s flags:  %02x %s\n", pad, ptree->qry.flags,
               qryflag2str(ptree->qry.flags));
        printf("%s pfirexpr: %08lx\n", pad, ptree->qry.pfirexpr);
        printf("%s pnext: %08lx\n", pad, ptree->qry.pnext);

        /* Display SELECT list */
        printf("%s nselitems: %d\n", pad, ptree->qry.nselitems);
        printf("%s pselist: %08lx\n", pad, ptree->qry.pselist);
        for (i = 0; i < ptree->qry.nselitems; i++)
        {
            printf("%s  SELITEM:\n", pad);
            if (ptree->qry.pselist[i].colmap_index >= 0)
                printf("%s    colmap_index: %d\n", pad,
                       ptree->qry.pselist[i].colmap_index);
            if (ptree->qry.pselist[i].pexpr == NULL) /* '*' */
            {
                if (ptree->qry.pselist[i].lname == 0) /* just '*' */
                    printf("%s    name: \'*\'\n", pad);
                else  /* <tablename>.* */
                {
                    printf("%s    name: %s%s%s.*\n", pad,
                           (ptree->qry.pselist[i].lschema ?
                            pqdef->pstrings + ptree->qry.pselist[i].oschema
                            : ""),
                           (ptree->qry.pselist[i].lschema ? "." : ""),
                           pqdef->pstrings + ptree->qry.pselist[i].oname);
                    printf("%s    tabnum: %d\n", pad,
                           ptree->qry.pselist[i].tabnum);
                } /* else tablename.* */
```

Sep 20 1993 13:38:35 qdtst_dump.c Page 4

```
            }
            else
            {
                printf("%s    name: %s\n", pad, ptree->qry.pselist[i].lname ?
                       pqdef->pstrings + ptree->qry.pselist[i].oname :
                       "(none specified)");
                dump_tree(ptree->qry.pselist[i].pexpr, nextpad);
            }
        }

        /* Display SELECT INTO target list, if any */
        if (ptree->qry.ntargets)
        {
            printf("%s ntargets: %d\n", pad, ptree->qry.ntargets);
            printf("%s ptarglist: %08lx\n", pad, ptree->qry.ptarglist);
            for (i = 0; i < ptree->qry.ntargets; i++)
            {
                printf("%s   ptarglist[%d]: %08lx\n", pad,
                       i, ptree->qry.ptarglist[i]);
                dump_tree(ptree->qry.ptarglist[i], nextpad);
            }
        }

        /* Display FROM clause */
        printf("%s ntabs: %d\n", pad, ptree->qry.ntabs);
        printf("%s ptabs: %08lx\n", pad, ptree->qry.ptabs);
        for (i = 0; i < ptree->qry.ntabs; i++)
        {
            printf("%s   TAB:\n", pad);
            printf("%s    name: %s\n", pad, pqdef->pstrings +
                   ptree->qry.ptabs[i].oname);
            if (ptree->qry.ptabs[i].lalias)
                printf("%s    alias: %s\n", pad, pqdef->pstrings +
                       ptree->qry.ptabs[i].oalias);
            if (ptree->qry.ptabs[i].lschema)
                printf("%s    schema: %s\n", pad, pqdef->pstrings +
                       ptree->qry.ptabs[i].oschema);
            if (ptree->qry.ptabs[i].lreal_name)
                printf("%s    real name: %s\n", pad, pqdef->pstrings +
                       ptree->qry.ptabs[i].oreal_name);
            if (ptree->qry.ptabs[i].lreal_schema)
                printf("%s    real schema: %s\n", pad, pqdef->pstrings +
                       ptree->qry.ptabs[i].oreal_schema);
            if (ptree->qry.ptabs[i].flags)
                printf("%s    flags: %02x %s\n", pad,
                       ptree->qry.ptabs[i].flags,
                       tabflag2str(ptree->qry.ptabs[i].flags));
            if (ptree->qry.ptabs[i].join_pos)
                printf("%s    join_pos: %d\n", pad,
                       ptree->qry.ptabs[i].join_pos);
            if (ptree->qry.ptabs[i].ncols)
                printf("%s    ncols: %d\n", pad,
                       ptree->qry.ptabs[i].ncols);
        }

        /* Display WHERE clause */
        printf("%s pwhere: %08lx\n", pad, ptree->qry.pwhere);
        dump_tree(ptree->qry.pwhere, nextpad);

        /* Display GROUP BY columns */
        printf("%s ngroupcols: %d\n", pad, ptree->qry.ngroupcols);
        printf("%s pgroupby: %08lx\n", pad, ptree->qry.pgroupby);
        for (i = 0; i < ptree->qry.ngroupcols; i++)
        {
            printf("%s   pgroupby[%d]: %08lx\n", pad,
                   i, ptree->qry.pgroupby[i].pexpr);
            if (ptree->qry.pgroupby[i].colmap_index >= 0)
                printf("%s    colmap_index: %d\n", pad,
                       ptree->qry.pgroupby[i].colmap_index);
            dump_tree(ptree->qry.pgroupby[i].pexpr, nextpad);
        }

        /* Display HAVING clause */
```

174

Sep 20 1993 13:38:35 qdtst_dump.c Page 5

```
        printf("%s phaving: %08lx\n", pad, ptree->qry.phaving);
        dump_tree(ptree->qry.phaving, nextpad);

        /* Display CONNECT BY clause if present */
        if (ptree->qry.pconnectby != (QDSP_EXPR *)NULL)
        {
            printf("%s pconnectby: %08lx\n", pad, ptree->qry.pconnectby);
            dump_tree(ptree->qry.pconnectby, nextpad);
        }

        /* Display START WITH clause if present */
        if (ptree->qry.pstartwith != (QDSP_EXPR *)NULL)
        {
            printf("%s pstartingwith: %08lx\n", pad, ptree->qry.pstartwith);
            dump_tree(ptree->qry.pstartwith, nextpad);
        }

        if (ptree->qry.ncq_groupcol_refs)
            printf("%s ncq_groupcol_refs: %d\n",
                   pad, ptree->qry.ncq_groupcol_refs);

        if (ptree->qry.lpartabname)
            printf("%s partitioning table: %s.%s\n",
                   pad, pqdef->pstrings + ptree->qry.opartabowner,
                   pqdef->pstrings + ptree->qry.opartabname);

    } /* ptree->check == QDCK_QRY */
    else if (ptree->check == QDCK_EXPR)
    {
        printf("%sEXPR: (%08lx)\n", pad, ptree);
#ifdef DISPLAY_CHECKSTRINGS
        printf("%s check: %4.4s\n", pad, (text *)&(ptree->expr.check));
#endif /* DISPLAY_CHECKSTRINGS */
        printf("%s opcode: %d (%s)\n", pad, ptree->expr.opcode,
               opcode2str(ptree->expr.opcode));
        if (ptree->expr.colmap_index >= 0)
            printf("%s colmap_index: %d\n", pad,
                   ptree->expr.colmap_index);
        printf("%s pnext: %08lx\n", pad, ptree->expr.pnext);
        if (ptree->expr.datatype != 0)
        {
            printf("%s datatype: %d (%s)\n", pad, ptree->expr.datatype,
                   dtyname((int)(ptree->expr.datatype)));
            printf("%s length: %d  precision: %d  scale: %d\n",
                   pad, ptree->expr.length, ptree->expr.precision,
                   ptree->expr.scale);
        }
        if (ptree->expr.opcode == QDSP_OP_COL)
        {
            printf("%s name: ", pad);
            if (ptree->expr.u.col.lqual)
            {
                if (ptree->expr.u.col.lschema)
                    printf("%s.%s.%s\n", pqdef->pstrings +
                           ptree->expr.u.col.oschema,
                           pqdef->pstrings + ptree->expr.u.col.oqual,
                           pqdef->pstrings + ptree->expr.u.col.oname);
                else
                    printf("%s.%s\n", pqdef->pstrings +
                           ptree->expr.u.col.oqual,
                           pqdef->pstrings + ptree->expr.u.col.oname);
            }
            else
                printf("%s\n", pqdef->pstrings +
                       ptree->expr.u.col.oname);
            printf("%s tabnum: %d\n", pad, ptree->expr.u.col.tabnum);
            printf("%s colid: %d\n", pad, ptree->expr.u.col.colid);
        }
        else if (ptree->expr.opcode == QDSP_OP_NEXTVAL ||
                 ptree->expr.opcode == QDSP_OP_CURRVAL)
        {
            printf("%s sequence name: ", pad);
            if (ptree->expr.u.seqref.lschema)
```

Sep 20 1993 13:38:35 qdtst_dump.c Page 6

```
                printf("%s.%s\n", pqdef->pstrings +
                       ptree->expr.u.seqref.oschema,
                       pqdef->pstrings + ptree->expr.u.seqref.oseqname);
            else
                printf("%s\n", pqdef->pstrings +
                       ptree->expr.u.seqref.oseqname);
        }
        else if (ptree->expr.opcode == QDSP_OP_HOSTVAR)
        {
            printf("%s name: %s\n", pad, pqdef->pstrings +
                   ptree->expr.u.hostvar.oname);
            if (ptree->expr.u.hostvar.lind)
                printf("%s ind: %s\n", pad, pqdef->pstrings +
                       ptree->expr.u.hostvar.oind);
        }
        else if (ptree->expr.opcode == QDSP_OP_LIT)
        {
            printf("%s val: %s\n", pad, pqdef->pstrings +
                   ptree->expr.u.lit.oval);
        }
        else if (ptree->expr.opcode == QDSP_OP_SUBQRY)
        {
            printf("%s SUBQRY: (%08lx)\n", pad, ptree->expr.u.subqry.psubqry);
            dump_tree(ptree->expr.u.subqry.psubqry, nextpad);
        }
        else if (ptree->expr.opcode != QDSP_OP_USER) /* assume an operator */
        {
/*xxx       printf("%s nrands: %d\n", pad, ptree->expr.u.op.nrands); xxx*/
            printf("%s flags: %02x %s\n", pad, ptree->expr.u.op.flags,
                   exprflag2str(ptree->expr.u.op.flags));
            printf("%s prand1: %08lx  prand2: %08lx\n",
                   pad, ptree->expr.u.op.prand1,
                   ptree->expr.u.op.prand2);
            dump_tree(ptree->expr.u.op.prand1, nextpad);
            dump_tree(ptree->expr.u.op.prand2, nextpad);
        }
    } /* ptree->check == QDCK_EXPR */
} /* dump_tree */

static text opstrs[135][15] =
{
    "?", "COL", "LIT", "HOSTVAR", "SUBQRY", "LINK", "OUTER", "PRIOR", "?",
      "?", "?",
    "AND", "OR", "NOT", "?", "?", "?", "?", "?", "?", "?",
    "EQ", "NE", "LT", "LE", "GT", "GE", "IN", "BETWEEN", "ISNULL", "EXISTS",
    "LIKE", "?", "?", "?", "?", "?", "?", "?", "?", "?",
    "PLUS", "MINUS", "NEG", "TIMES", "DIV", "CONCAT", "?", "?", "?", "?",
    "AVG", "MAX", "MIN", "SUM", "COUNT", "STDDEV", "VARIANCE", "?", "?", "?",
    "USER", "CURRVAL", "NEXTVAL", "ROWID", "ROWNUM", "LEVEL", "SYSDATE",
      "UID", "NULL", "?",
    "ABS", "CEIL", "FLOOR", "MOD", "POWER", "ROUND", "SIGN", "SQRT", "TRUNC",
      "?",
    "CHR", "INITCAP", "LOWER", "LPAD", "LTRIM", "REPLACE", "RPAD", "RTRIM",
      "SOUNDEX", "SUBSTR",
    "TRANSLATE", "UPPER", "ASCII", "INSTR", "LENGTH", "NLSSORT", "?", "?",
      "?", "?",
    "CHARTOROWID", "CONVERT", "HEXTORAW", "RAWTOHEX", "ROWIDTOCHAR",
      "TO_CHAR", "TO_DATE", "TO_NUMBER", "?", "?",
    "ADD_MONTHS", "LAST_DAY", "MONTHS_BETWEEN", "NEW_TIME", "NEXT_DAY",
      "?", "?", "?", "?", "?",
    "DECODE", "DUMP", "GREATEST", "LEAST", "NVL", "USERENV", "VSIZE", "?",
      "?", "?"
};
#if 0 /* These are copied from qdspext.h */
#define QDSP_OP_COL     1   /* Column of table or view                      */
#define QDSP_OP_LIT     2   /* Literal                                      */
#define QDSP_OP_HOSTVAR 3   /* Host variable                                */
#define QDSP_OP_SUBQRY  4   /* Subquery reference (within a predicate)      */
#define QDSP_OP_LINK    5   /* Link operands in tree, for expr's with > 2   */
                            /* operands                                     */
#define QDSP_OP_OUTER   6   /* ORACLE extension: Outer join column reference */
#define QDSP_OP_PRIOR   7   /* Prior expression in CONNECT BY clause        */
```

```
#define QDSP_OP_AND   11   /* Boolean AND                                   */
#define QDSP_OP_OR    12   /* Boolean OR                                    */
#define QDSP_OP_NOT   13   /* Boolean NOT                                   */

#define QDSP_OP_EQ    21   /* =                                             */
#define QDSP_OP_NE    22   /* <> (ORACLE also supports != and ^=)           */
#define QDSP_OP_LT    23   /* <                                             */
#define QDSP_OP_LE    24   /* <=                                            */
#define QDSP_OP_GT    25   /* >                                             */
#define QDSP_OP_GE    26   /* >=                                            */
#define QDSP_OP_IN    27   /* The SQL IN operator                           */
#define QDSP_OP_BETWEEN 28 /* The SQL BETWEEN operator                      */
#define QDSP_OP_ISNULL 29 /* The SQL IS NULL operator                       */
#define QDSP_OP_EXISTS 30 /* The SQL EXISTS operator                        */
#define QDSP_OP_LIKE   31 /* The SQL LIKE operator                          */

#define QDSP_OP_PLUS   41 /* +                                              */
#define QDSP_OP_MINUS  42 /* -                                              */
#define QDSP_OP_NEG    43 /* Unary -                                        */
#define QDSP_OP_TIMES  44 /* *                                              */
#define QDSP_OP_DIV    45 /* /                                              */
#define QDSP_OP_CONCAT 46 /* || - ORACLE extension                          */

#define QDSP_OP_AVG    51 /* AVG set function                               */
#define QDSP_OP_MAX    52 /* MAX set function                               */
#define QDSP_OP_MIN    53 /* MIN set function                               */
#define QDSP_OP_SUM    54 /* SUM set function                               */
#define QDSP_OP_COUNT  55 /* COUNT set function                             */
#define QDSP_OP_STDDEV 56 /* ORACLE extension: STDDEV                       */
#define QDSP_OP_VARIANCE 57 /* ORACLE extension: VARIANCE                   */

#define QDSP_OP_USER   61 /* USER system field                              */

/* ORACLE extensions: pseudo-columns and system fields */
#define QDSP_OP_CURRVAL 62 /* ORACLE extension: CURRVAL pseudo-column       */
#define QDSP_OP_NEXTVAL 63 /* ORACLE extension: NEXTVAL pseudo-column       */
#define QDSP_OP_ROWID   64 /* ORACLE extension: ROWID pseudo-column         */
#define QDSP_OP_ROWNUM  65 /* ORACLE extension: ROWNUM pseudo-column        */
#define QDSP_OP_LEVEL   66 /* ORACLE extension: LEVEL pseudo-column         */
#define QDSP_OP_SYSDATE 67 /* ORACLE extension: SYSDATE system field        */
#define QDSP_OP_UID     68 /* ORACLE extension: UID system field            */
#define QDSP_OP_NULL    69 /* ORACLE extension: NULL, as a system field     */

/* ORACLE extensions: numeric functions */
#define QDSP_OP_ABS     71 /* ORACLE extension: ABS function                */
#define QDSP_OP_CEIL    72 /* ORACLE extension: CEIL function               */
#define QDSP_OP_FLOOR   73 /* ORACLE extension: FLOOR function              */
#define QDSP_OP_MOD     74 /* ORACLE extension: MOD function                */
#define QDSP_OP_POWER   75 /* ORACLE extension: POWER function              */
#define QDSP_OP_ROUND   76 /* ORACLE extension: ROUND function              */
#define QDSP_OP_SIGN    77 /* ORACLE extension: SIGN function               */
#define QDSP_OP_SQRT    78 /* ORACLE extension: SQRT function               */
#define QDSP_OP_TRUNC   79 /* ORACLE extension: TRUNC function              */

/* ORACLE extensions: character functions */
#define QDSP_OP_CHR     81 /* ORACLE extension: CHR function                */
#define QDSP_OP_INITCAP 82 /* ORACLE extension: INITCAP function            */
#define QDSP_OP_LOWER   83 /* ORACLE extension: LOWER function              */
#define QDSP_OP_LPAD    84 /* ORACLE extension: LPAD function               */
#define QDSP_OP_LTRIM   85 /* ORACLE extension: LTRIM function              */
#define QDSP_OP_REPLACE 86 /* ORACLE extension: REPLACE function            */
#define QDSP_OP_RPAD    87 /* ORACLE extension: RPAD function               */
#define QDSP_OP_RTRIM   88 /* ORACLE extension: RTRIM function              */
#define QDSP_OP_SOUNDEX 89 /* ORACLE extension: SOUNDEX function            */
#define QDSP_OP_SUBSTR  90 /* ORACLE extension: SUBSTR function             */
#define QDSP_OP_TRANSLATE 91 /* ORACLE extension: TRANSLATE function        */
#define QDSP_OP_UPPER   92 /* ORACLE extension: UPPER function              */

/* ORACLE extensions: character functions returning numeric value */
#define QDSP_OP_ASCII   93 /* ORACLE extension: ASCII function              */
#define QDSP_OP_INSTR   94 /* ORACLE extension: INSTR function              */
#define QDSP_OP_LENGTH  95 /* ORACLE extension: LENGTH function             */
#define QDSP_OP_NLSSORT 96 /* ORACLE extension: NLSSORT function            */
```

```
/* ORACLE extensions: conversion functions */
#define QDSP_OP_CHARTOROWID 101 /* ORACLE extension: CHARTOROWID function   */
#define QDSP_OP_CONVERT     102 /* ORACLE extension: CONVERT function       */
#define QDSP_OP_HEXTORAW    103 /* ORACLE extension: HEXTORAW function      */
#define QDSP_OP_RAWTOHEX    104 /* ORACLE extension: RAWTOHEX function      */
#define QDSP_OP_ROWIDTOCHAR 105 /* ORACLE extension: ROWIDTOCHAR function   */
#define QDSP_OP_TO_CHAR     106 /* ORACLE extension: TO_CHAR function       */
#define QDSP_OP_TO_DATE     107 /* ORACLE extension: TO_DATE function       */
#define QDSP_OP_TO_NUMBER   108 /* ORACLE extension: TO_NUMBER function     */

/* ORACLE extensions: date functions */
#define QDSP_OP_ADD_MONTHS  111 /* ORACLE extension: ADD_MONTHS function    */
#define QDSP_OP_LAST_DAY    112 /* ORACLE extension: LAST_DAY function      */
#define QDSP_OP_MONTHS_BETWEEN 113 /* ORACLE extension: MONTHS_BETWEEN func */
#define QDSP_OP_NEW_TIME    114 /* ORACLE extension: NEW_TIME function      */
#define QDSP_OP_NEXT_DAY    115 /* ORACLE extension: NEW_DAY function       */

/* ORACLE extensions: other functions */
#define QDSP_OP_DECODE      121 /* ORACLE extension: DECODE function        */
#define QDSP_OP_DUMP        122 /* ORACLE extension: DUMP function          */
#define QDSP_OP_GREATEST    123 /* ORACLE extension: GREATEST function      */
#define QDSP_OP_LEAST       124 /* ORACLE extension: LEAST function         */
#define QDSP_OP_NVL         125 /* ORACLE extension: NVL function           */
#define QDSP_OP_USERENV     126 /* ORACLE extension: USERENV function       */
#define QDSP_OP_VSIZE       127 /* ORACLE extension: VSIZE function         */

#endif /* 0 */

static text *opcode2str(opcode) /* translate opcode to string */
int opcode;  /* QDSP operation code to translate */
{
    return opstrs[opcode];
}

static text *tabflag2str(flags) /* translate table flags to strings */
int flags;
{
    static text buf[40];

    strcpy(buf, "(");
    if (flags & QDSP_TAB_VIEW)
        strcat(buf, "VIEW");
    if (flags & QDSP_TAB_INDX)
    {
        if (strlen(buf) > 1)
            strcat(buf, ", ");
        strcat(buf, "INDX");
    }
    if (flags & QDSP_TAB_NOTAC)
    {
        if (strlen(buf) > 1)
            strcat(buf, ", ");
        strcat(buf, "NOTAC");
    }
    if (flags & QDSP_TAB_HASH)
    {
        if (strlen(buf) > 1)
            strcat(buf, ", ");
        strcat(buf, "HASH");
    }
    if (flags & QDSP_TAB_NESTL)
    {
        if (strlen(buf) > 1)
            strcat(buf, ", ");
        strcat(buf, "NESTL");
    }
    if (flags & QDSP_TAB_MERGE)
    {
        if (strlen(buf) > 1)
            strcat(buf, ", ");
        strcat(buf, "MERGE");
    }
```

```
    if (flags & QDSP_TAB_OUTER)
    {
        if (strlen(buf) > 1)
            strcat(buf, ", ");
        strcat(buf, "OUTER");
    }
    if (flags & QDSP_TAB_STAR)
    {
        if (strlen(buf) > 1)
            strcat(buf, ", ");
        strcat(buf, "STAR");
    }
    if (strlen(buf) == 1)
        return("");
    else
    {
        strcat(buf, ")");
        return buf;
    }
} /* tabflag2str */

static text *exprflag2str(flags) /* translate expression flags to strings */
int flags;
{
    static text buf[40];

    strcpy(buf, "(");
    if (flags & QDSP_EXPR_ALL)
        strcat(buf, "ALL");
    if (flags & QDSP_EXPR_ANY)
    {
        if (strlen(buf) > 1)
            strcat(buf, ", ");
        strcat(buf, "ANY");
    }
    if (flags & QDSP_EXPR_NOT)
    {
        if (strlen(buf) > 1)
            strcat(buf, ", ");
        strcat(buf, "NOT");
    }
    if (flags & QDSP_EXPR_DISTINCT)
    {
        if (strlen(buf) > 1)
            strcat(buf, ", ");
        strcat(buf, "DISTINCT");
    }
    if (flags & QDSP_EXPR_OUTER_NESTED_AGGR)
    {
        if (strlen(buf) > 1)
            strcat(buf, ", ");
        strcat(buf, "OUTER_NESTED_AGGR");
    }
    if (flags & QDSP_EXPR_INNER_NESTED_AGGR)
    {
        if (strlen(buf) > 1)
            strcat(buf, ", ");
        strcat(buf, "INNER_NESTED_AGGR");
    }
    if (flags & QDSP_OMIT_IN_PSQ_HAVING)
    {
        if (strlen(buf) > 1)
            strcat(buf, ", ");
        strcat(buf, "OMIT_IN_PSQ_HAVING");
    }
    if (strlen(buf) == 1)
        return("");
    else
    {
        strcat(buf, ")");
        return buf;
    }
} /* exprflag2str */
```

```
static text *qdefflag2str(flags) /* translate qdef flags to strings */
int flags;
{
    static text buf[40];

    strcpy(buf, "(");
    if (flags & QDSP_QDEF_NOWAIT)
        strcat(buf, "NOWAIT");
    if (flags & QDSP_QDEF_PARTITION)
    {
        if (strlen(buf) > 1)
            strcat(buf, ", ");
        strcat(buf, "PARTITION");
    }
    if (flags & QDSP_QDEF_NOPARTITION)
    {
        if (strlen(buf) > 1)
            strcat(buf, ", ");
        strcat(buf, "NOPARTITION");
    }
    if (flags & QDSP_QDEF_MAXPARTITIONS)
    {
        if (strlen(buf) > 1)
            strcat(buf, ", ");
        strcat(buf, "MAXPARTITIONS");
    }
    if (flags & QDSP_QDEF_MINPARTITIONS)
    {
        if (strlen(buf) > 1)
            strcat(buf, ", ");
        strcat(buf, "MINPARTITIONS");
    }
    if (flags & QDSP_QDEF_ARRAY_SIZE)
    {
        if (strlen(buf) > 1)
            strcat(buf, ", ");
        strcat(buf, "ARRAY_SIZE");
    }
    if (flags & QDSP_QDEF_ARRAY_THRESHOLD)
    {
        if (strlen(buf) > 1)
            strcat(buf, ", ");
        strcat(buf, "ARRAY_THRESHOLD");
    }
    if (flags & QDSP_EXPLAIN_QD)
    {
        if (strlen(buf) > 1)
            strcat(buf, ", ");
        strcat(buf, "EXPLAIN_QD");
    }
    if (flags & QDSP_QDEF_INSERT_SELECT)
    {
        if (strlen(buf) > 1)
            strcat(buf, ", ");
        strcat(buf, "INSERT_SELECT");
    }
    if (strlen(buf) == 1)
        return("");
    else
    {
        strcat(buf, ")");
        return buf;
    }
} /* qdefflag2str */

static text *qryflag2str(flags) /* translate qry flags to strings */
int flags;
{
    static text buf[40];

    strcpy(buf, "(");
```

Sep 20 1993 13:38:35 qdtst_dump.c Page 11

```
    if (flags & QDSP_QRY_DISTINCT)
        strcat(buf, "DISTINCT");
    if (flags & QDSP_QRY_GEN_CQ)
    {
        if (strlen(buf) > 1)
            strcat(buf, ", ");
        strcat(buf, "GEN_CQ");
    }
    if (flags & QDSP_QRY_EXPAND_STAR)
    {
        if (strlen(buf) > 1)
            strcat(buf, ", ");
        strcat(buf, "EXPAND_STAR");
    }
    if (flags & QDSP_QRY_COLLAPSE_STAR)
    {
        if (strlen(buf) > 1)
            strcat(buf, ", ");
        strcat(buf, "COLLAPSE_STAR");
    }
    if (flags & QDSP_QRY_NESTED_AGGR)
    {
        if (strlen(buf) > 1)
            strcat(buf, ", ");
        strcat(buf, "NESTED_AGGR");
    }
    if (flags & QDSP_QRY_SUBQ)
    {
        if (strlen(buf) > 1)
            strcat(buf, ", ");
        strcat(buf, "SUBQ");
    }
    if (flags & QDSP_QRY_VIEW)
    {
        if (strlen(buf) > 1)
            strcat(buf, ", ");
        strcat(buf, "VIEW");
    }
    if (strlen(buf) == 1)
        return("");
    else
    {
        strcat(buf, ")");
        return buf;
    }
} /* qryflag2str */

static text *cmflag2str(flags) /* translate colmap flags to strings */
int flags;
{
    static text buf[40];

    strcpy(buf, "(");
    if (flags & QDCP_COL_IT)
        strcat(buf, "IT");
    if (flags & QDCP_COL_CQ)
    {
        if (strlen(buf) > 1)
            strcat(buf, ", ");
        strcat(buf, "CQ");
    }
    if (flags & QDCP_COL_PSQ)
    {
        if (strlen(buf) > 1)
            strcat(buf, ", ");
        strcat(buf, "PSQ");
    }
    if (flags & QDCP_COL_IQ)
    {
        if (strlen(buf) > 1)
            strcat(buf, ", ");
        strcat(buf, "IQ");
    }
```

Sep 20 1993 13:38:35 qdtst_dump.c Page 12

```
    if (flags & QDCP_COL_EOA)
    {
        if (strlen(buf) > 1)
            strcat(buf, ", ");
        strcat(buf, "EOA");
    }
    if (flags & QDCP_COL_STAR)
    {
        if (strlen(buf) > 1)
            strcat(buf, ", ");
        strcat(buf, "STAR");
    }
    if (flags & QDCP_COL_IQ_IN_STAR)
    {
        if (strlen(buf) > 1)
            strcat(buf, ", ");
        strcat(buf, "IQ_IN_STAR");
    }

    if (strlen(buf) == 1)
        return("");
    else
    {
        strcat(buf, ")");
        return buf;
    }
} /* cmflag2str */


static text *dtyname(datatype)
reg1 int datatype;
{
    switch (datatype)
    {
      case DTYCHR:
        return "CHAR";
      case DTYNUM:
        return "NUMBER";
      case DTYINT:
        return "INTEGER";
      case DTYDAT:
        return "DATE";
      case DTYLNG:
        return "LONG";
      case DTYBIN:
        return "RAW";
      default:
        return "unrecognized";
    };
} /* dtyname */
```

178

```
/*****************************************************************************
 * qdtst_exeqry - Execute single-threaded query as performance control
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE       AUTHOR   DESCRIPTION
 * ---   --------   ------   ---------------------------------------------------
 * %00   04/20/92   JM       Initial Version
 *****************************************************************************
 */
#include <qdstd.h>
#include <qderrs.h>
#include <qdtstext.h>
#include <qdcpext.h>
#define MAX_SELECT_COLS 100

EXEC SQL INCLUDE SQLDA;
EXEC SQL BEGIN DECLARE SECTION;

VARCHAR stmt[2028];              /* Buffer for dynamic EXPLAIN stmt */
SQLDA *pdesc;

EXEC SQL END DECLARE SECTION;

QDSTATUS qdtst_exeqry(pqtext, command)
text *pqtext; /* Pointer to query text */
b4 command;   /* Command to execute: OPEN, FETCH, or CLOSE */
{
    long bitbucket[20];
    int i;
__private static ub4 cnx_seqno = 0; /* Connection sequence number */

    EXEC SQL INCLUDE SQLCA;
    QDBEGIN("qdtst_exeqry");
    QD_CHECK_CNX_SEQNO; /* Check connection sequence number */

    /* Prepare, declare, and open cursor for prepared query */

    if (command == QDTST_OPEN)
    {
        strcpy(stmt.arr, pqtext);
        stmt.len = strlen(stmt.arr);
        if (stmt.arr[stmt.len - 1] == ';')
        {
            stmt.arr[stmt.len - 1] = 0;
            stmt.len--;
        }

        EXEC SQL PREPARE Query_Statement from :stmt;

        EXEC SQL DECLARE St_Query CURSOR FOR Query_Statement;

        pdesc = qdcp_desc_qry(QDCP_DESC_SELECT, (QD_VARCHAR *)(&stmt),
                              MAX_SELECT_COLS);
        pdesc->N = pdesc->F;
        for (i = 0; i < pdesc->N; i++)
        {
            pdesc->V[i] = (char *)(&bitbucket[0]);
            pdesc->I[i] = (short *)(&bitbucket[0]);
        }

        EXEC SQL OPEN St_Query;

    }
    else if (command == QDTST_FETCH)
    {
        /* Fetch a row from cursor */

        EXEC SQL FETCH St_Query USING DESCRIPTOR pdesc;
```

```
    }
    else if (command == QDTST_CLOSE)
    {
        free(pdesc->V);
        free(pdesc->I);
        pdesc->V = NULL;
        pdesc->I = NULL;
        sqlclu(pdesc);
        EXEC SQL CLOSE St_Query;
    }
    QDEND;
    return sqlca.sqlcode;
} /* qdtst_exeqry */
```

179

Sep 20 1993 13:38:37 qdtst_getenv.c Page 1

```
/***************************************************************************
 * qdtst_getenv - Get environment variables used to control QD testing
 * (May also display error message in a future version)
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***************************************************************************
 * REV   DATE      AUTHOR   DESCRIPTION
 * ---   --------  ------   ------------------------------------------------
 * %02   06/22/93  EYT      QD_display_time depends on KSR_DISPLAY_TIME
 *                          environment var
 * %01   04/30/92  JM       Merge DW changes (QD_display_parallel,
 *                           QD_display_cp)
 * %00   12/11/91  JM       Initial Version
 ***************************************************************************
*/

#include <stdio.h>
#include <qdstd.h>
#include <qdtstext.h> .

/* The following boolean vars, based on values of the environment
 * variable QDDISPLAY, control what gets dumped to the screen .
 */
bool QD_show_server_pids = FALSE; /* If true, display correspondence */
        /* between QD thread numbers and ORACLE server pids */
bool QD_2_phase_commit = FALSE; /* Use 2-phase-commit for INSERT/SELECT */
char *QD_default_directive = NULL; /* Default directive (hint) for PSQ's */
bool QD_display_tree1 = FALSE; /* Display parse tree before semantic */
                               /* analysis */
bool QD_display_tree2 = FALSE; /* Display parse tree after semantic analysis */
bool QD_display_tree3 = FALSE; /* Display parse tree after query generation */
bool QD_display_colmap = FALSE; /* Display column map */
bool QD_display_prompt_for_semantic = FALSE; /* Prompt before semantic */
                                             /*  analysis */
bool QD_display_psq = FALSE; /* Display generated query text */
bool QD_display_explain = FALSE; /* Display debugging diagnostics when */
                                 /* querying the internal explain plan */
bool QD_display_prompt_if_ineffective = FALSE; /* Prompt whether to */
                            /* decompose, if decomp judged ineffective */
bool QD_display_ctree = FALSE; /* Display combining tree */
bool QD_display_exec = FALSE; /* Display fetched values in qdsql */
bool QD_display_exec2 = FALSE; /* Display additional execution stuff */
bool QD_display_exec3 = FALSE; /* Display still more additional stuff */
bool QD_display_progress = FALSE; /* When timing execution in qdsql, */
                          /* periodically display how many rows fetched */
bool QD_display_mallocs = FALSE; /* Display calls to qdrt_malloc */
bool QD_display_cp = FALSE; /* Enable display of checkpoints using QDcp */
                            /* macro (defined in qdstd.h) */
bool QD_quit_while_ahead = FALSE; /* Quit after first query (in qdsql only) */
bool QD_display_errors = FALSE;  /* Displays errors during decomposition */
bool QD_display_why_no_qd = FALSE; /* Display error which prevented QD */
bool QD_quick_parse = FALSE; /* Do quick parse? (Currently ignored, quick */
                             /*  parse always done. */
bool QD_enable_dspmsg = FALSE; /* Enables qdtst_dspmsg, to emit various */
                               /* debugging and diagnostic messages */
bool QD_nofree = FALSE;  /* Disable freeing of pcursor structures */
bool QD_show_sqlerrs = FALSE; /* PSQs show sql errors during execution */
bool QD_show_parse_errs = FALSE; /* QD parser shows errors during parsing */
bool QD_bind_threads = FALSE; /* Bind threads to cells */
word QD_num_bind_cells = 0;  /* Number of cells to bind threads to */
bool QD_commit_it = FALSE;  /* Commit intermediate table, for examination */
                           /*  of intermediate results during debugging  */
bool QD_ora_describe = TRUE; /* Let ORACLE do describe */
bool QD_multi_group_it = TRUE; /* Use a multi-group intermediate table   */
                               /*  for grouped queries (this is a faster */
                               /*  algorithm for queries which return    */
                               /*  many groups, but risks producing an   */
                               /*  arbitrarily large intermediate table) */
int QD_pause = 0;      /* If KSR_PAUSE is set, set this variable to the    */
```

Sep 20 1993 13:38:37 qdtst_getenv.c Page 2

```
                                  /*  integer representation of its value.  If non-   */
                                  /*  zero, this specifies a number of microseconds   */
                                  /*  to pause between thread creations.              */
bool QD_no_early_fetch = FALSE;  /* If KSR_NO_EARLY_FETCH is set, set     */
                                 /* this to TRUE, so psq's will wait      */
                                 /* until all are connected before        */
                                 /* fetching.                             */
bool QD_no_early_fetch_verbose = FALSE;
          /* If KSR_NO_EARLY_FETCH is set to "verbose", set this to TRUE, */
          /* so each psq will print a message when ready to start fetches */
bool QD_temp_table_freelists = FALSE;
          /* Set to TRUE if KSR_TEMP_TABLE_FREELISTS is set; if TRUE,     */
          /* CREATE TABLE statement for QD temp table will specify        */
          /* as many freelists as the degree of partitioning.             */
bool QD_display_time = FALSE; /* Set to TRUE if KSR_DISPLAY_TIME is */
                              /* set; if TRUE, measure and display  */
                              /* QD timing statistics               */
FILE *QD_display_file = stdout; /* Set to stdout if KSR_DISPLAY_FILE */
                                /* is not set; if TRUE set to value  */
                                /* of KSR_DISPLAY_FILE               */

__private int KSR_enable_printf = FALSE; /* Must be private so one thread */
                                         /* doesn't enable another's      */
                                         /* tracing at arbitrary times.   */

__private extern bool KSR_qd_enabled;
FILE *pfile;
extern char *getenv();

void qdtst_getenv(deflt, pqddisplay)
bool deflt;  /* Setting for global bools if QDDISPLAY is not set */
text *pqddisplay; /* Pointer to value of QDDISPLAY env var */
{
    text *penv;

    /* If QD is not enabled, no point proceeding, so check this first */
    penv = getenv(KSR_NOPARTITION);
    if (penv)
    {
        KSR_qd_enabled = FALSE;
        return;
    }
    else KSR_qd_enabled = TRUE;

    if (pqddisplay == (text *)NULL)
        pqddisplay = getenv("QDDISPLAY");
    if (pqddisplay == (text *)NULL)
    {
        /* Assume we want to see everything */
        QD_display_tree1 = deflt;
        QD_display_tree2 = deflt;
        QD_display_tree3 = deflt;
        QD_display_colmap = deflt;
        QD_display_prompt_for_semantic = deflt;
        QD_display_psq = deflt;
        QD_display_explain = deflt;
        QD_display_prompt_if_ineffective = deflt;
        QD_display_ctree = deflt;
        QD_display_exec = deflt;
        QD_display_exec2 = deflt;
        QD_display_exec3 = deflt;
        QD_display_progress = deflt;
        QD_display_cp = deflt;
        QD_display_mallocs = deflt;
        QD_quit_while_ahead = deflt;
        QD_display_errors = deflt;
        QD_display_why_no_qd = deflt;
        QD_quick_parse = deflt;
        QD_enable_dspmsg = deflt;
        QD_nofree = deflt;
        QD_show_sqlerrs = deflt;
        QD_show_parse_errs = deflt;
        QD_bind_threads = deflt;
        QD_commit_it = deflt;
```

1

Sep 20 1993 13:38:37 qdtst_getenv.c Page 3

```
        KSR_enable_printf = deflt;
    }
    else
    {
        if (strstr(pqddisplay, "tree1") != (text *)NULL)
            QD_display_tree1 = TRUE;
        else QD_display_tree1 = FALSE;
        if (strstr(pqddisplay, "tree2") != (text *)NULL)
            QD_display_tree2 = TRUE;
        else QD_display_tree2 = FALSE;
        if (strstr(pqddisplay, "tree3") != (text *)NULL)
            QD_display_tree3 = TRUE;
        else QD_display_tree3 = FALSE;
        if (strstr(pqddisplay, "colmap") != (text *)NULL)
            QD_display_colmap = TRUE;
        else QD_display_colmap = FALSE;
        if (strstr(pqddisplay, "prompt") != (text *)NULL)
            QD_display_prompt_for_semantic = TRUE;
        else QD_display_prompt_for_semantic = FALSE;
        if (strstr(pqddisplay, "psq") != (text *)NULL)
            QD_display_psq = TRUE;
        else QD_display_psq = FALSE;
        if (strstr(pqddisplay, "explain") != (text *)NULL)
            QD_display_explain = TRUE;
        else QD_display_explain = FALSE;
        if (strstr(pqddisplay, "ineffective") != (text *)NULL)
            QD_display_prompt_if_ineffective = TRUE;
        else QD_display_prompt_if_ineffective = FALSE;
        if (strstr(pqddisplay, "ctree") != (text *)NULL)
            QD_display_ctree = TRUE;
        else QD_display_ctree = FALSE;
        if (strstr(pqddisplay, "exec") != (text *)NULL)
            QD_display_exec = TRUE;
        else QD_display_exec = FALSE;
        if (strstr(pqddisplay, "exec2") != (text *)NULL)
            QD_display_exec2 = TRUE;
        else QD_display_exec2 = FALSE;
        if (strstr(pqddisplay, "exec3") != (text *)NULL)
            QD_display_exec3 = TRUE;
        else QD_display_exec3 = FALSE;
        if (strstr(pqddisplay, "mallocs") != (text *)NULL)
            QD_display_mallocs = TRUE;
        else QD_display_mallocs = FALSE;
        if (strstr(pqddisplay, "cp") != (text *)NULL)
            QD_display_cp = TRUE;
        else QD_display_cp = FALSE;
        if (strstr(pqddisplay, "quit") != (text *)NULL)
            QD_quit_while_ahead = TRUE;
        else QD_quit_while_ahead = FALSE;
        if (strstr(pqddisplay, "display_error_prompts") != (text *)NULL)
            QD_display_errors = TRUE;
        else QD_display_errors = FALSE;
        if (strstr(pqddisplay, "why_no_qd") != (text *)NULL)
            QD_display_why_no_qd = TRUE;
        else QD_display_why_no_qd = FALSE;
        if (strstr(pqddisplay, "oratrace") != (text *)NULL)
            KSR_enable_printf = TRUE;
        else KSR_enable_printf = FALSE;
        if (strstr(pqddisplay, "quick_parse") != (text *)NULL)
            QD_quick_parse = TRUE;
        else QD_quick_parse = FALSE;
        if (strstr(pqddisplay, "dspmsg") != (text *)NULL)
            QD_enable_dspmsg = TRUE;
        else QD_enable_dspmsg = FALSE;
        if (strstr(pqddisplay, "nofree") != (text *)NULL)
            QD_nofree = TRUE;
        else QD_nofree = FALSE;
        if (strstr(pqddisplay, "show_sqlerrs") != (text *)NULL)
            QD_show_sqlerrs = TRUE;
        else QD_show_sqlerrs = FALSE;
        if (strstr(pqddisplay, "show_parse_errs") != (text *)NULL
            || strstr(pqddisplay, "show_parse_errors") != NULL)
            QD_show_parse_errs = TRUE;
```

Sep 20 1993 13:38:37 qdtst_getenv.c Page 4

```
        else QD_show_parse_errs = FALSE;
        if (strstr(pqddisplay, "bind") != (text *)NULL)
            QD_bind_threads = TRUE;
        else QD_bind_threads = FALSE;
        if (strstr(pqddisplay, "commit_it") != (text *)NULL)
            QD_commit_it = TRUE;
        else QD_commit_it = FALSE;
        if (strstr(pqddisplay, "no_ora_describe") != (text *)NULL)
            QD_ora_describe = FALSE;
        else QD_ora_describe = TRUE;
    } /* else selectively display stuff */

    qd_init();

    if (pqddisplay != NULL)
    {
        if (strstr(pqddisplay, "qdtrace") != (text *)NULL)
            QD_TURN_TRACE_ON;
        else QD_TURN_TRACE_OFF;
    }
    penv = getenv(KSR_MAXPARTITIONS);
    if (penv)
        QDpcom->max_partitions = atoi(penv);
    penv = getenv(KSR_MINPARTITIONS);
    if (penv)
        QDpcom->min_partitions = atoi(penv);
    else
        QDpcom->min_partitions = QD_MIN_PARTITIONS_DFLT;
    penv = getenv(KSR_ARRAY_SIZE);
    if (penv)
        QDpcom->array_size = min(QD_MAX_ARRAY_SIZE, atoi(penv));
    penv = getenv(KSR_ARRAY_THRESHOLD);
    if (penv)
        QDpcom->array_threshold = min(QD_MAX_ARRAY_THRESHOLD, atoi(penv));
    penv = getenv("QD_NUM_BIND_CELLS");
    if (penv)
        QD_num_bind_cells = atoi(penv);
    penv = getenv("KSR_SINGLE_GROUP_TEMP_TABLE");
    if (penv)
        QD_multi_group_it = FALSE;
    penv = getenv("KSR_QD_TWO_PHASE_COMMIT");
    if (penv)
        QD_2_phase_commit = TRUE;
    else QD_2_phase_commit = FALSE;
    penv = getenv("KSR_PAUSE");
    if (penv)
        QD_pause = atoi(penv);
    penv = getenv("KSR_QD_DEFAULT_DIRECTIVE");
    if (penv)
        QD_default_directive = penv;
    else QD_default_directive = NULL;
    penv = getenv("KSR_NO_EARLY_FETCH");
    if (penv)
    {
        QD_no_early_fetch = TRUE;
        if (!strcmp(penv, "verbose"))
            QD_no_early_fetch_verbose = TRUE;
    }
    penv = getenv("KSR_TEMP_TABLE_FREELISTS");
    if (penv)
        QD_temp_table_freelists = TRUE;
    penv = getenv("KSR_DISPLAY_TIME");
    if (penv)
    {
        QD_display_time = TRUE;
        penv = getenv("KSR_DISPLAY_FILE");
        if (penv)
        {
            if (pfile = fopen(penv, "a"))
                QD_display_file = pfile;
        }
    }
    penv = getenv("KSR_SHOW_SERVER_PIDS");
```

151

Sep 20 1993 13:38:37 qdtst_getenv.c Page 5

```
    if (penv)
        QD_show_server_pids = TRUE;
    else
        QD_show_server_pids = FALSE;
} /* qdtst_getenv */
```

Sep 20 1993 13:38:38 qdtst_getqry.pc Page 1

```
/*****************************************************************************
 * qdtst_getqry - Get query text specified by id from test_queries table
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   ---------------------------------------------------
 * %00   10/28/91  JN       Initial Version
 *****************************************************************************
*/

#include <qdstd.h>
#include <qdtstext.h>
#include <qderrs.h>
#include <memory.h>

EXEC SQL BEGIN DECLARE SECTION;
        VARCHAR line1[80];
        VARCHAR line2[80];
        VARCHAR line3[80];
        VARCHAR line4[80];
        VARCHAR line5[80];
        VARCHAR line6[80];
        VARCHAR line7[80];
        VARCHAR line8[80];
        int query_id;
EXEC SQL END DECLARE SECTION;

EXEC SQL INCLUDE SQLCA;

/*****************************************************************************
 * qdtst_getqry - Get query text specified by id from test_queries table
 *****************************************************************************
*/
QDSTATUS qdtst_getqry(qid, pqbuf)
reg1 b4 qid;             /* Id of query to fetch */
reg2 text *pqbuf;        /* Copy query text to this buffer */

{
    reg3 text *pbuf = pqbuf;
    reg4 QDSTATUS retval;
__private static ub4 cnx_seqno = 0; /* Connection sequence number */

    QDBEGIN("qdtst_getqry");
    QD_CHECK_CNX_SEQNO; /* Check connection sequence number */

    query_id = qid;

    EXEC SQL SELECT QUERY_TEXT1, QUERY_TEXT2, QUERY_TEXT3, QUERY_TEXT4,
                    QUERY_TEXT5, QUERY_TEXT6, QUERY_TEXT7, QUERY_TEXT8
        INTO line1, line2, line3, line4, line5, line6, line7, line8
            FROM JEFF.TEST_QUERIES
                WHERE QUERY_ID = :query_id;

    if (sqlca.sqlcode)
    {
        retval = sqlca.sqlcode;
        goto error_return;
    }

    if (line1.len)
    {
        memcpy(pbuf, line1.arr, line1.len);
        pbuf += line1.len;
    }
    if (line2.len)
    {
        *pbuf++ = '\n';
        memcpy(pbuf, line2.arr, line2.len);
```

Sep 20 1993 13:38:38 qdtst_getqry.pc Page 2

```
        pbuf += line2.len;
    }
    if (line3.len)
    {
        *pbuf++ = '\n';
        memcpy(pbuf, line3.arr, line3.len);
        pbuf += line3.len;
    }
    if (line4.len)
    {
        *pbuf++ = '\n';
        memcpy(pbuf, line4.arr, line4.len);
        pbuf += line4.len;
    }
    if (line5.len)
    {
        *pbuf++ = '\n';
        memcpy(pbuf, line5.arr, line5.len);
        pbuf += line5.len;
    }
    if (line6.len)
    {
        *pbuf++ = '\n';
        memcpy(pbuf, line6.arr, line6.len);
        pbuf += line6.len;
    }
    if (line7.len)
    {
        *pbuf++ = '\n';
        memcpy(pbuf, line7.arr, line7.len);
        pbuf += line7.len;
    }
    if (line8.len)
    {
        *pbuf++ = '\n';
        memcpy(pbuf, line8.arr, line8.len);
        pbuf += line8.len;
    }
    *pbuf = 0;

    retval = QD_OK;
    goto return_retval;
error_return:
    QDFAIL(retval);
return_retval:
    QDEND;
    return retval;
} /* qdtst_getqry */
```

1

Sep 20 1993 13:38:40 qdtst_main.c Page 1

```
/*************************************************************************
 * qdtst_main.c - Test driver for query decomposition
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE      AUTHOR   DESCRIPTION
 * ---   --------  ------   -------------------------------------------
 * %02   08/16/93  EYT      Call to qdrt_free sets pointer=NULL
 * %01   06/22/93  EYT      Collect timing stats elsewhere
 * %00   09/20/91  JM       Initial Version
 *************************************************************************
 */

#include <stdio.h>
#include <strings.h>
#include <ctype.h>
#include <dtydef.h>
#include <qdstd.h>
#include <qdspext.h>
#include <qdcpext.h>
#include <qdbbext.h>
#include <qdtstext.h>
#include <qderrs.h>
#include <qdpuext.h>
#include <sys/mman.h>
#include <malloc.h>
#include <stdlib.h>
#include <sys/time.h>
#include <signal.h>
extern int gettimeofday();
extern bool QD_quit_while_ahead; /* Defined in qdtst_getenv.c */
extern bool QD_display_progress;
extern bool QD_bind_threads;
extern bool QD_enable_dspmsg;

#define KSRNODEBUG 1 /* Disable KSRcp */

/* Query input buffer - in real life, this will be passed to us */
#define QSIZE 2048
static text qbuf[QSIZE + 1];

void catch_not_atomic()
{
  /*  flockfile(stdout); */
    printf("catch_not_atomic called\n");
/*    funlockfile(stdout); */
/*    KSRtcs("catch_not_atomic", 41); */
/*    signal(41, SIG_DFL); */
    signal(11, SIG_DFL);
}

main(argc, argv)
int argc;
char *argv[];
{
    QDSTATUS retval;
    int c;
    int i;
    int connected = 0; /* Are we connected yet? */
    text *pqddisplay; /* Pointer to value of QDDISPLAY env var */
    struct timeval start, finish, preopen, postopen, postclose;
    long secs, usecs;
    int counter;
    QDBB_UNION *pbb;
    text **pbtt;
    int exec_mode; /* Execute single threaded or in parallel ? */

#if 0
/* Back-door malloc control structure */
```

Sep 20 1993 13:38:40 qdtst_main.c Page 2

```
typedef struct pool {
        caddr_t         poolp;
        caddr_t         pool_endp;
        unsigned long   size;           /* in units remaining */
        unsigned char   log2_unit_size;
} pool_t;
#define MAX_POOLS               20
#if !defined(LOG2_MIN_SIZE)
#  define LOG2_MIN_SIZE 7               /* minimum block size */
#endif
#define LOG2_MIN_SEG    22                      /* hw minimum segment size */
#define LOG2_MAX_SEG    32                      /* OS maximum segment size */
#define NBUCKETS        (LOG2_MAX_SEG+1 - LOG2_MIN_SIZE)
typedef struct header {
        struct header *next;
} *header_t;


typedef struct free_list {
        header_t        head;           /* head of free list for this size */
#ifdef  DEBUG
        long            in_use;         /* # mallocs - # frees */
#endif  /* DEBUG */
} *free_list_t;

/* Malloc/free global variables:
 * The defaults can be changed before calling malloc for the first time. */
extern struct {
    __align128
    /* Selects minimum size block allocated.  The default is 128 bytes; it may
     * be set as small as 2^LOG2_MIN_SIZE.  This default may change. */
    unsigned long       min_block;

    /* Controls the way pools are mapped.  The default is MAP_PRIVATE;
     * MAP_SHARE is the alternative */
    int                 mmap_flags;

    /* Selects the size of the next pool to mmap.  The default is LOG2_MIN_SEG;
     * each pool allocation adds one to this number (which doubles the pool
     * size) until we reach LOG2_MAX_SEG. */
    unsigned short      log2_next_pool_size;

    /* Zeroed private variables, not to be reset externally: */
    unsigned char       active_pool;
    unsigned char       free_pool;
    struct free_list    free_list[NBUCKETS];
    pool_t              pool[MAX_POOLS];

#ifdef  OCHECK
    caddr_t             o_fp;
    char                *o_end;
#endif
} malloc_var;

    malloc_var.mmap_flags = MAP_SHARED;
#endif /* 0 */

#   define SINGLE_THREAD 1
#   define MULTI_THREAD 2

#if 0
    printf("_gspnwt(QDpcom): %d\n", _gspnwt(QDpcom));
    printf("_gspnwt(QDpcom): %d\n", _gspnwt(QDpcom));
    printf("_gspnwt(QDpcom): %d\n", _gspnwt(QDpcom));
    printf("_rsp(QDpcom): %d\n", _rsp(QDpcom));
#endif

    /* Default to FALSE on all display-control environment variables,
     * if QDDISPLAY is not set.
     */
    qdtst_getenv(FALSE, (text *)NULL);

    /* Bind master thread to cell if "bind" specified in QDDISPLAY */
```

183

184

Sep 20 1993 13:38:40 qdtst_main.c Page 3

```
if (QD_bind_threads)
{
    psm_init();
    retval = psm_bindself(1);
    if (retval)
        printf("main: bind to cell 1 failed, errno %d\n", errno);

    else printf("main: bound to cell 1\n");
}

/* Get username and password if supplied */
if (argv[1] != NULL)
{
    for (i = 0; i < strlen(argv[1]); i++)
        if (isalpha(argv[1][i]))
            QDpcom->cnx.user[i] = toupper(argv[1][i]);
        else
            QDpcom->cnx.user[i] = argv[1][i];
    if (argv[2] != NULL)
        strcpy(QDpcom->cnx.pwd, argv[2]);
    else
        strcpy(QDpcom->cnx.pwd, "MILLER");
}
else
{
    strcpy(QDpcom->cnx.user, "JEFF");
    strcpy(QDpcom->cnx.pwd, "miller");
}

/* Process queries forever */
for (;;)
{
    if (!connected)
    {
        /* Connect to ORACLE */

        retval = qd_connect(QDpcom->cnx.user, QDpcom->cnx.pwd);

        if (retval)
        {
            QD_enable_dspmsg = TRUE;
            qdtst_dspmsg("qd_connect returned %d; ", &retval);
            exit(0);
        }
        else connected = 1;

        printf("\nEnter SQL query:\n\n");
    }
    else
    {
        printf("\nEnter SQL query:\n\n");
    }
    getqry();

    /* Was the 'query' actually a new env var setting? */
    if (qbuf[0] == '#' || qbuf[0] == '@' || qbuf[0] == '!' ||
        qbuf[0] == '$')
    {
        qdtst_getenv(FALSE, qbuf);
        continue;
    }

    retval = qdcp_prep(qbuf, 0);

    if (QD_display_mallocs)
    {
        /* Display memory management statistics for this run */
        printf("\nAfter qdcp_prep:\n");
        printf("  mallocs: %d   frees: %d   difference: %d\n",
               QDpcom->nmallocs, QDpcom->nfrees,
               QDpcom->nmallocs - QDpcom->nfrees);
    }
```

Sep 20 1993 13:38:40 qdtst_main.c Page 4

```
    if (retval && retval != QD_CP_INCORRECT_NOPARTITION)
        printf("qdcp_prep: %d\n", retval);
    else if (QD_display_exec)
    {
        if (retval == QD_CP_INCORRECT_NOPARTITION)
            exec_mode = SINGLE_THREAD;
        else
            exec_mode = MULTI_THREAD;
        counter = 0;

        /* If we also displayed generated queries, print an extra
         * carriage return to separate them from the servers' startup
         * messages.
         */
        if (QD_display_psq)
            printf("\n");
        if (exec_mode == MULTI_THREAD)
        {
            /* Start connections, open parallel subqueries */
            retval = (*(QDpcom->cnx.ppcursor->pctree->hdr.pfunc))
                (QDpcom->cnx.ppcursor->pctree, QDBB_REQ_OPEN,
                 QDpcom->cnx.ppcursor->pbtt);
            if (retval == QDBB_REPLY_ERROR)
                qdtst_dspmsg("Open error: ", NULL);
            else retval = 0;
        }
        else
        {
            /* Prepare and open query for single-threaded execution */
            retval = qdtst_exeqry(qbuf, QDTST_OPEN);
        }
        if (retval)
            printf("Error opening query: %d\n", retval);
        else
        {
            if (exec_mode == MULTI_THREAD)
            {
                /* Retrieve rows from parallel subqueries */
                while((retval = (*(QDpcom->cnx.ppcursor->pctree->hdr.pfunc))
                        (QDpcom->cnx.ppcursor->pctree, QDBB_REQ_NEXT,
                         QDpcom->cnx.ppcursor->pbtt))
                      != QDBB_REPLY_EOD && retval != QDBB_REPLY_ERROR)
                {
                    counter++;
                    if (QD_display_progress && (counter % 100) == 0)
                        printf("%d rows...\n", counter);
                }
                if (retval == QDBB_REPLY_ERROR)
                    qdtst_dspmsg("Retrieval error: ", NULL);
                else retval = 0;
            }
            else
            {
                /* Retrieve rows from single-threaded query */
                while (!( retval =
                        qdtst_exeqry((text *)NULL, QDTST_FETCH)))
                {
                    counter++;
                    if (QD_display_progress && (counter % 100) == 0)
                        printf("%d rows...\n", counter);
                }

                if (retval == 1403)
                    retval = 0;
            }
            if (retval)
                printf("Retrieval error: %d\n", retval);
            printf("\n%d rows retrieved.\n", counter);
        }

    /* Exit "gracefully" to avoid hanging when threads
     * try to terminate.
     */
```

Sep 20 1993 13:38:40 qdtst_main.c Page 5

```
        if (QD_quit_while_ahead && !retval)
            exit(0);

        /* Close cursors */
        QDRESET;
        if (exec_mode == MULTI_THREAD)
        {
            /* Close parallel subqueries */
            retval = (*(QDpcom->cnx.ppcursor->pctree->hdr.pfunc))
                (QDpcom->cnx.ppcursor->pctree, QDBB_REQ_CLEANUP,
                 QDpcom->cnx.ppcursor->pbtt);

            if (retval == QDBB_REPLY_ERROR)
                qdtst_dspmsg("Cleanup error: ", NULL);
            else retval = 0;
        }
        else
        {
            /* Close single-threaded query */
            retval = qdtst_exeqry((text *)NULL, QDTST_CLOSE);
        }
        if (retval)
            printf("Close error: %d\n", retval);

#ifdef NEVER
        if (QD_display_time)
        {
            /* Now do control run: reset first subcursor node,
             * execute it directly.
            */
            pbb = QDpcom->cnx.ppcursor->pctree->root.pchild;
            if (pbb->hdr.check == QDCK_AGGR)
                pbb = pbb->aggr.pchild;
            pbb = pbb->mplex.children[pbb->mplex.nchildren - 1]
                .pchild;
            pbtt = pbb->exchange.btt;
            pbb = pbb->exchange.pchild;
            pbb->hdr.state = QDBB_STATE_EMPTY;
            gettimeofday(&start, NULL);
            counter = 0;
            while((retval = (*(pbb->hdr.pfunc))
                    (pbb, QDBB_REQ_NEXT,
                     pbtt))
                   != QDBB_REPLY_EOD && retval != QDBB_REPLY_ERROR)
                counter++;
            printf(" \nControl:\n");
            printf("%d rows retrieved.\n", counter);
            gettimeofday(&finish, NULL);
            secs = finish.tv_sec - start.tv_sec;
            if (finish.tv_usec < start.tv_usec)
            {
                --secs;
                usecs = finish.tv_usec + (1000000 - start.tv_usec);
            }
            else
                usecs = finish.tv_usec - start.tv_usec;

            printf("Ellapsed time: %ld.%06.6ld\n", secs, usecs);

            /* Close cursors */
            retval = (*(pbb->hdr.pfunc))
                (pbb, QDBB_REQ_CLEANUP, QDpcom->cnx.ppcursor->pbtt);
            if (retval == QDBB_REPLY_ERROR)
                qdtst_dspmsg("Control cleanup error: ", NULL);
        }   /* if (QD_display_time) */
#endif /* NEVER */
    } /* if display-exec or display-time */

    /* Free resources from combining tree */
    retval = qdbb_freepcur(&(QDpcom->cnx.ppcursor), &(QDpcom->cnx));

    if (retval)
        qdtst_dspmsg("qdbb_freepcur error: %d; ", &retval);
```

Sep 20 1993 13:38:40 qdtst_main.c Page 6

```
        if (QD_display_mallocs)
        {
            /* Display memory management statistics for this run */
            printf("\nAfter qdbb_freepcur:\n");
            printf("  mallocs: %d   frees: %d   difference: %d\n",
                   QDpcom->nmallocs, QDpcom->nfrees,
                   QDpcom->nmallocs - QDpcom->nfrees);
            /* Reset for next run */
            QDpcom->nmallocs = 0;
            QDpcom->nfrees = 0;
        }
    } /* for (;;) */
} /* main */

static getqry() /* Input a query from terminal */
{
    int c;
    text *pbuf;
    int query_id;
#define IS_QID 1
#define IS_NOT_QID -1
    int mode; /* Inputting query text or query id? */
    QDSTATUS retval;

try_again:
    mode = 0;
    pbuf = qbuf;
    while ((c = getchar()) != EOF &&
           ((mode == IS_QID && isdigit(c)) ||
            (mode != IS_QID && c != ';')))
    {
        if (mode == 0) /* First character read */
        {
            if (isdigit(c)) /* This is a query_id, not a query */
                mode = IS_QID;
            else mode = IS_NOT_QID;
        }
        if (qbuf[0] == 'q')
            exit(0);
        if (pbuf == qbuf + QSIZE)
        {
            printf("Query is too long.\n");
            exit(-1);
        }
        else
            *pbuf++ = c;
    } /* while */
    if (mode == IS_QID)
    {
        *pbuf = 0;
        query_id = atoi(qbuf);
        QDRESET;
        retval = qdtst_getqry(query_id, qbuf);
        if (retval)
        {
            if (retval > 0)
                printf("Query %d not found in TEST_QUERIES table.\n"
                       , query_id);
            else
                qdtst_dspmsg("Error retrieving stored query: %d; ", &retval);
            QDRESET;

            goto try_again;
        }
        else
        {
            printf("%s\n", qbuf);
            pbuf = qbuf + strlen(qbuf);
        }
    }
    else
        c = getchar(); /* flush cr */
```

Sep 20 1993 13:38:40 qdtst_main.c Page 7

```
        *pbuf++ = ';';
        *pbuf++ = 0;
} /* getqry */
```

4

187

Jul 22 1993 14:21:30 qdtst_time.c Page 1

```
/***************************************************************************
 * qdtst_time - Get timing statistics for QD
 *
 * Copyright (c) 1993 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ***************************************************************************
 * REV   DATE      AUTHOR   DESCRIPTION
 * ---   --------  ------   ---------------------------------------------------
 * %00   06/16/93  BYT      Initial Version
 ***************************************************************************
 */

#include <stdio.h>
#include <qdstd.h>
#include <qdtstext.h>

void qdtst_finish (ptime)
QDTIME *ptime;
{
    struct timeval finish;

    /* Compute elapsed time */
    gettimeofday(&finish, NULL);
    ptime->elapsed.tv_sec = finish.tv_sec - ptime->start.tv_sec;
    if (finish.tv_usec < ptime->start.tv_usec)
    {
        --(ptime->elapsed.tv_sec);
        ptime->elapsed.tv_usec = finish.tv_usec +
            (1000000 - ptime->start.tv_usec);
    }
    else
        ptime->elapsed.tv_usec = finish.tv_usec - ptime->start.tv_usec;
}
```

1

188

Oct 13 1992 19:09:12 qdxp_del.pc Page 1

```
/*************************************************************************
 * qdxp_del - Delete a specified EXPLAIN plan from a specified plan table
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *************************************************************************
 * REV   DATE      AUTHOR   DESCRIPTION
 * ---   --------  ------   -----------------------------------------------
 * %01   10/13/92  EYT      Use QDpcom->cnx.plan_table for plan table
 * %00   10/07/91  JM       Initial Version
 *************************************************************************
*/

#include <qdstd.h>
#include <qdrtext.h>
#include <qdxpext.h>
#include <qderrs.h>

EXEC SQL INCLUDE SQLCA;

/*************************************************************************
 * qdxp_del - Delete a specified EXPLAIN plan from a specified plan table
 *************************************************************************
*/
QDSTATUS qdxp_del(pstmtid)
reg2 text *pstmtid;  /* Statement id of EXPLAIN plan to delete */
{
    reg3 QDSTATUS retval = QD_OK;
    EXEC SQL BEGIN DECLARE SECTION;
                                  /* Buffer for dynamic DELETE stmt */
    VARCHAR stmt[134];            /* 36 + 1 + 1 + (3 * QD_MAX_ORA_IDENT) */
                                  /* length allows 36 for fixed portion  */
                                  /* of query, plus room for three       */
                                  /* identifiers - statement_id, plan    */
                                  /* table name, and possible plan table */
                                  /* schema - plus 1 for dot btw name    */
                                  /* and schema, and 1 for 0 terminator. */
    EXEC SQL END DECLARE SECTION;

    QDBEGIN("qdxp_del");
    /* Check for required argument */
    if (pstmtid == NULL)
    {
        retval = QD_REQUIRED_ARG_MISSING;
        goto return_retval;
    }

    /* Generate dynamic DELETE statement (necessary since table name */
    /* may vary, and can't be specified as a host variable) */
    sprintf(stmt.arr,
            "DELETE FROM %s WHERE STATEMENT_ID = \'%s\'",
            QDpcom->cnx.plan_table, pstmtid);                  /*%01*/
    stmt.len = strlen(stmt.arr);

    /* Delete the plan */
    EXEC SQL EXECUTE IMMEDIATE :stmt;

    if (sqlca.sqlcode)
    {
        retval = sqlca.sqlcode;
        goto error_return;
    }

#ifdef QDXP_COMMIT_EXPLAIN
    EXEC SQL COMMIT WORK;
#endif /* QDXP_COMMIT_EXPLAIN */

    retval = sqlca.sqlcode;
    if (!retval)
        goto return_retval;
```

Oct 13 1992 19:09:12 qdxp_del.pc Page 2

```
error_return:
    QDFAIL(retval);
return_retval:
    QDEND;

    return retval;
} /* qdxp_del */
```

1

189

Sep 20 1993 16:32:10 qdxp_explain.pc Page 1

```
/****************************************************************************
 * qdxp_explain - Satisfy user EXPLAIN request: explain execution of
 *                decomposed query
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 ****************************************************************************
 * REV   DATE       AUTHOR   DESCRIPTION
 * ---   --------   ------   -----------------------------------------------
 * %00   12/12/91   JM       Initial Version
 ****************************************************************************
 */
#define QDNODEBUG
#include <qdstd.h>
#include <qdspext.h>
#include <qdxpext.h>
#include <memory.h>

EXEC SQL INCLUDE SQLCA;

/****************************************************************************
 * qdxp_explain - Satisfy user EXPLAIN request: explain execution of
 *                decomposed query
 ****************************************************************************
 */
QDSTATUS qdxp_explain(pqdef, pqtext)
reg1 QDSP_QDEF *pqdef;      /* Query definition (root of parse tree) */
reg2 text *pqtext;          /* Text of query to explain */
{
    reg3 QDSTATUS retval;
    text plan_table_name[2 * QD_MAX_ORA_IDENT + 2];
    reg4 text *pplan_table_name = plan_table_name;
    text temp_stmt_id[QDXP_AUTO_GEN_STMT_ID_LEN];
                              /* Temporary, auto-generated statement id */
    reg5 text *pstmt_id; /* Pointer to user-specified statement id */
    reg6 text *ppar_tab_name; /* Pointer to partition-table name */
    reg7 text *ppar_tab_schema; /* Pointer to partition-table schema name */
    reg8 QDSP_TAB *ppar_tab;  /* Pointer to partitioning table */
    reg9 int degree_of_partitioning; /* of this query */
__private static ub4 cnx_seqno = 0; /* Connection sequence number */

    EXEC SQL BEGIN DECLARE SECTION;

    VARCHAR stmt[1024];  /* Buffer for gen'ing sql statements */

    EXEC SQL END DECLARE SECTION;

    QDBEGIN("qdxp_explain");
    QD_CHECK_CNX_SEQNO; /* Check connection sequence number */

    /* Set up parameters for calling qdxp_genplan to create a 'raw'
     * EXPLAIN plan for the parallel subquery.
     */
    /* If a plan table name was specified, assembly its pieces for
     * passing to qdxp_genplan.
     */
    if (pqdef->pplan_table != NULL)
    {
        if (pqdef->pplan_table->lschema != 0)
        {
            memcpy(plan_table_name,
                   pqdef->pstrings + pqdef->pplan_table->oschema,
                   pqdef->pplan_table->lschema);
            pplan_table_name += pqdef->pplan_table->lschema;
            *pplan_table_name++ = '.';
        }
        memcpy(pplan_table_name,
               pqdef->pstrings + pqdef->pplan_table->oname,
               pqdef->pplan_table->lname);
        *(pplan_table_name + pqdef->pplan_table->lname) = 0;
```

Sep 20 1993 16:32:10 qdxp_explain.pc Page 2

```
        pplan_table_name = plan_table_name;
    } /* if plan table name was specified */
    else
        /* Explain statement which doesn't specify "into <plan-table>"
         * implies current user's "plan table".
         */
        pplan_table_name = "plan_table";

    /* Call qdxp_genplan to generate 'raw' EXPLAIN plan.  Qdxp_genplan
     * will create a statement_id and return it in temp_stmt_id.
     * (Even if user specified a statement id, it might not have been
     * unique within the specified plan table.  We want to be sure we
     * only fix up rows of the newly generated plan.  As we are fixing them
     * up, we will set the statement id to the user-specified value,
     * or to null if the user didn't specify a statement id.)
     */
    /* NOTE: For now (12/12/91), we can safely assume that pqdef->ptree
     * points to a query, because otherwise qdcp_prep would have returned
     * before now.
     */
    /* NOTE: First parameter "really" should be
     *   pqdef->ptree->qry.ppsq_text.arr, i.e. the text of the parallel
     *   subquery.  Unfortunately, EXPLAIN won't accept a query with host
     *   parameters, which the psq has, so we use the input query instead.
     */
    retval = qdxp_genplan(pqtext,
                          pplan_table_name, temp_stmt_id);

    if (retval)
        goto error_return;

    temp_stmt_id[QDXP_AUTO_GEN_STMT_ID_LEN] = 0;

    /* If a statement id was specified, get a pointer to it */
    if (pqdef->pstmt_id != NULL)
        pstmt_id = pqdef->pstrings + pqdef->pstmt_id->u.lit.oval;
    else pstmt_id = NULL;

    /* Now we construct a SQL statement to fix up all rows of the plan we
     * just generated.  For each row, we update it to increment its id and
     * parent_id fields by 1, and if no statement id was specified by caller,
     * we set the row's statement id to null.
     * Note: unlike 6.2, in Oracle 7.0 the first row of every EXPLAIN plan
     * is a "SELECT STATEMENT" operation, which should preceed our
     * "KSR Parallel Execution" row.  This row will have a null parent
     * id, and should not get modified.
     */
#ifdef NEVER /* The following is the correct update statement for 6.0 */
    sprintf(stmt.arr,
            "UPDATE %s SET STATEMENT_ID = %s%s%s, ID = ID + 1, \
             PARENT_ID = DECODE(PARENT_ID, null, 0, PARENT_ID) + 1 \
             WHERE STATEMENT_ID = \'%s\'",
             (pplan_table_name ? pplan_table_name : "plan_table"),
             (pstmt_id ? "\'" : ""),
             (pstmt_id ? pstmt_id : "null"),
             (pstmt_id ? "\'" : ""),
             temp_stmt_id);
#endif /* NEVER */
    sprintf(stmt.arr,
            "UPDATE %s SET STATEMENT_ID = %s%s%s, \
             ID = DECODE(PARENT_ID, null, ID, ID + 1), \
             PARENT_ID = DECODE(PARENT_ID, null, null, PARENT_ID + 1) \
             WHERE STATEMENT_ID = \'%s\'",
             (pplan_table_name ? pplan_table_name : "plan_table"),
             (pstmt_id ? "\'" : ""),
             (pstmt_id ? pstmt_id : "null"),
             (pstmt_id ? "\'" : ""),
             temp_stmt_id);
    stmt.len = strlen(stmt.arr);
    QDDprintf(("qdxp_explain update stmt: %s\n", stmt.arr));
    EXEC SQL WHENEVER SQLERROR GOTO sql_error;
```

Sep 20 1993 16:32:10 qdxp_explain.pc Page 3

```
    /* Execute the update statement */
    EXEC SQL EXECUTE IMMEDIATE :stmt;

    /* Now construct a SQL statement to insert a row into the plan to
     * describe the query decomposition operation.
     */
#ifdef NEVER /* Oracle 6.0 version */
    sprintf(stmt.arr,
            "INSERT INTO %s (STATEMENT_ID, TIMESTAMP, OPERATION, \
            OPTIONS, OBJECT_OWNER, OBJECT_NAME, ID, PARENT_ID, \
            SEARCH_COLUMNS) VALUES (%s%s%s, SYSDATE, \
            \'KSR PARALLEL EXECUTION\', \'%s\', \'%s\', \'%s\', \
            1, null, %d)",
            (pplan_table_name ? pplan_table_name : "plan_table"),
            (pstmt_id ? "\'" : ""),
            (pstmt_id ? pstmt_id : "null"),
            (pstmt_id ? "\'" : ""),
            ((pqdef->ptree->qry.flags & QDSP_QRY_GEN_CQ)
             ? "AGGREGATION" :
             ((pqdef->nordcols || pqdef->ptree->qry.ngroupcols ||
              (pqdef->ptree->qry.flags & QDSP_QRY_DISTINCT))
              ? "MERGE" : "UNION ALL")),
            (pqdef->lpar_tab_schema
             ? pqdef->pstrings + pqdef->opar_tab_schema
             : QDpcom->cnx.user),
            pqdef->pstrings + pqdef->opar_tab_name,
            pqdef->ptree->qry.nparfids);
#endif /* NEVER */

    /* Get name and schema of partitioning table */

    ppar_tab = pqdef->ptree->qry.ptabs + pqdef->ptree->qry.partab;
    ppar_tab_name = pqdef->pstrings + ppar_tab->oname;
    if (ppar_tab->lschema)
        ppar_tab_schema = pqdef->pstrings + ppar_tab->oschema;
    else
        ppar_tab_schema = QDpcom->cnx.user;

    /* Determine degree of partitioning */
    /* NOTE: Unfortunately, this must mimic the logic used in qdcp_prep
     * when actually decomposing the query.
     */
    if (QDpcom->max_partitions)
    {
        if (pqdef->max_partitions)
            degree_of_partitioning = min(min(QDpcom->max_partitions,
                  pqdef->max_partitions), pqdef->ptree->qry.nparfids);
        else
            degree_of_partitioning = min(QDpcom->max_partitions,
                                 pqdef->ptree->qry.nparfids);
    }
    else if (pqdef->max_partitions)
        degree_of_partitioning = min(pqdef->max_partitions,
                               pqdef->ptree->qry.nparfids);
    else
        degree_of_partitioning = pqdef->ptree->qry.nparfids;

    sprintf(stmt.arr,
            "INSERT INTO %s (STATEMENT_ID, TIMESTAMP, OPERATION, \
            OPTIONS, OBJECT_OWNER, OBJECT_NAME, ID, PARENT_ID, \
            SEARCH_COLUMNS) VALUES (%s%s%s, SYSDATE, \
            \'KSR PARALLEL EXECUTION\', \'%s\', \'%s\', \'%s\', \
            1, 0, %d)",
            (pplan_table_name ? pplan_table_name : "plan_table"),
            (pstmt_id ? "\'" : ""),
            (pstmt_id ? pstmt_id : "null"),
            (pstmt_id ? "\'" : ""),
            ((pqdef->ptree->qry.flags & QDSP_QRY_GEN_CQ)
             ? "AGGREGATION" :
             ((pqdef->nordcols || pqdef->ptree->qry.ngroupcols ||
              (pqdef->ptree->qry.flags & QDSP_QRY_DISTINCT))
              ? "MERGE" : "UNION ALL")),
            ppar_tab_schema,
```

Sep 20 1993 16:32:10 qdxp_explain.pc Page 4

```
                  ppar_tab_name,
                  degree_of_partitioning);
    stmt.len = strlen(stmt.arr);
    QDDprintf(("qdxp_explain insert statement: %s\n", stmt.arr));

    /* Execute the insert statement */
    EXEC SQL EXECUTE IMMEDIATE :stmt;

    goto return_retval;

sql_error:  /* In case any of the above SQL statements failed */
    EXEC SQL WHENEVER SQLERROR CONTINUE;
    retval = sqlca.sqlcode;
error_return:
    QDFAIL(retval);
return_retval:
    QDEND;
    return retval;
} /* qdxp_explain */
```

Sep 20 1993 13:38:46 qdxp_genplan.pc Page 1

```
/*****************************************************************************
 * qdxp_genplan - Generate ORACLE EXPLAIN plan for a query
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV  DATE      AUTHOR  DESCRIPTION
 * ---  --------  ------  ---------------------------------------------------
 * %02  10/13/92  EYT     Use QDpcom->cnx.plan_table for default plan table
 * %01  10/07/92  EYT     Check if user plan table exists, and if so
 *                        set pplan_tab_name to NULL
 * %00  10/02/91  JM      Initial Version
 *****************************************************************************
 */

#include <qdstd.h>
#include <qdrtext.h>
#include <qdxpext.h>
#include <qdcpext.h>
#include <qdtstext.h>
#include <qderrs.h>

EXEC SQL INCLUDE SQLCA;

/*****************************************************************************
 * qdxp_genplan - Generate ORACLE EXPLAIN plan for a query
 *
 * Uses dynamic SQL, because SQL statement to generate EXPLAIN plan must
 * contain query to be explained as part of the statement, and must also
 * contain the statement id as a string literal.  Used qdrt_mktemp to get
 * a pseudo-unique statement id (should be unique enough for current needs,
 * because will be unique for at least 24 hours, and plan gets deleted once
 * we're done decomposing the query).
 *
 * This routine is used both for generating invisible, temporary plans of
 * the input query as part of the QD process, and for generating a plan of
 * parallel query execution when the user has called upon us to EXPLAIN
 * a query.
 *
 * NOTE: Current version assumes existence of a table called plan_table,
 * with current user name, and does not check for excessive length of
 * SQL string.
 *****************************************************************************
 */
#define QDXP_FIXED_PORTION 60 /* length of fixed portion of explain stmt */

QDSTATUS qdxp_genplan(pqtext, pplan_tab_name, pstmtid)
reg1 text *pqtext;    /* Pointer to 0-terminated query text */
reg2 text *pplan_tab_name; /* Name of plan table to use, including */
                           /* schema qualifier. */
reg3 text *pstmtid;   /* If non-null, copy statement id to this address */
                      /* (requires 14 bytes) */
{
    reg4 int offset;
    reg5 QDSTATUS retval;
    reg6 xplen;  /* Length of generated explain statement */
    reg7 int i;
    reg8 int max_tries = 1;
    reg9 text *pplan_tab;                                          /*%02*/
__private static ub4 cnx_seqno = 0; /* Connection sequence number */

    EXEC SQL BEGIN DECLARE SECTION;
    char *stmt;       /* Pointer to buffer for dynamic EXPLAIN stmt */
    EXEC SQL END DECLARE SECTION;

    QDBEGIN("qdxp_genplan");
    QD_CHECK_CNX_SEQNO;

    /* Make sure a query was passed, and it's not too long to fit in */
    /* our buffer. */
```

Sep 20 1993 13:38:46 qdxp_genplan.pc Page 2

```
    if (pqtext == NULL)
    {
        retval = QD_REQUIRED_ARG_MISSING;
        goto error_return;
    }
    else
    {
        xplen = strlen(pqtext) + (2 * QD_MAX_ORA_IDENT) + QDXP_FIXED_PORTION;

        /* Has query text buffer been initialized? */
        if (QD_PQBUF == NULL)
        {
            QD_PQBUF = qdrt_malloc(QD_QBUF_INITIAL_SIZE);
            if (QDFAILED)
                goto error_return;
            QD_QBUF_CURRENT_SIZE = QD_QBUF_INITIAL_SIZE;
        }

        while (xplen > QD_QBUF_CURRENT_SIZE)
        {
            qdcp_growbuf(QD_PQBUF);
            if (QDFAILED)
                goto error_return;
        }
        stmt = QD_PQBUF;
    }

    /* If no plan_table given, try global plan_table first and   */
    /* then the default plan_table given by QDXP_PLAN_TABLE_NAME */
    if (pplan_tab_name == NULL)                                     /*%02*/
        max_tries = 2;
    pplan_tab = QDpcom->cnx.plan_table;                             /*%02*/

    for (i=0; i < max_tries; i++)
    {
        sprintf(stmt,
                "EXPLAIN PLAN SET STATEMENT_ID = \'StmtXXXXXXXXX");

        qdrt_mktemp(stmt);
        if (pstmtid != NULL)
            strcpy(pstmtid, stmt + 33);

        sprintf(stmt + strlen(stmt), "\' INTO %s FOR %s",
                (pplan_tab_name ? pplan_tab_name : pplan_tab),
                pqtext);                                            /*%02*/

        /* Get rid of trailing semicolon, if present */
        if (stmt[(offset = strlen(stmt) - 1)] == ';')
            stmt[offset] = '\0';

        /* Generate the EXPLAIN plan */
        EXEC SQL EXECUTE IMMEDIATE :stmt;

        /* If 1st try and get PLAN_TABLE not found error, try */    /*+%02*/
        /* again with default plan table name                 */
        if (pplan_tab_name == NULL && i == 0 &&
            (sqlca.sqlcode == -2402 || /* plan table not found */
             sqlca.sqlcode == -2403 || /* plan table has wrong format */
             sqlca.sqlcode == -2404))  /* specified plan table not found */
        {
            pplan_tab = QDXP_PLAN_TABLE_NAME;
            continue;
        }

        if (sqlca.sqlcode)
        {
            retval = sqlca.sqlcode;
            goto error_return;
        }                                                           /*-%02*/

#ifdef QDXP_COMMIT_EXPLAIN
        EXEC SQL COMMIT WORK;
#endif /* QDSP_COMMIT_EXPLAIN */
```

142

Sep 20 1993 13:38:25 qdxp_genplan.pc Page 3

```
        /* Reset global plan table */
        if (pplan_tab != QDpcom->cnx.plan_table)
            strcpy (QDpcom->cnx.plan_table, pplan_tab);

        retval = sqlca.sqlcode;
        if (!retval)
            goto return_retval;
    }

error_return:
    QDFAIL(retval);
return_retval:
    QDEND;
    return retval;
} /* qdxp_genplan */
```

2

193

Sep 20 1993 13:38:48 qdxp_qry.pc Page 1

```
/*****************************************************************************
 * qdxp_qry - Query EXPLAIN plan table for info on query retrieval strategy
 *
 * Copyright (c) 1991 Kendall Square Research Corporation as an unpublished
 * work.  All rights reserved.  The information contained herein is the
 * confidential property of Kendall Square Research Corporation.  Use,
 * copying, transfer or disclosure is prohibited without express written
 * agreement with Kendall Square Research Corporation.
 *****************************************************************************
 * REV   DATE      AUTHOR   DESCRIPTION
 * ---   --------  ------   --------------------------------------------------
 * %02   07/21/93  JM       Limited view support
 * %01   10/13/92  EYT      Use QDpcom->cnx.plan_table for plan table
 * %00   10/07/91  JM       Initial Version
 *****************************************************************************
*/
#define x(y)
#include <qdstd.h>
#include <qdrtext.h>
#include <qdspext.h>
#include <qdxpext.h>
#include <qderrs.h>
#include <memory.h>

/* Local definitions of operations and options in EXPLAIN plans */
#define INDEX         1
#define TABLE_ACCESS  2
#define MERGE_JOIN    3
#define NESTED_LOOPS  4
#define UNION         5
#define INTERSECTION  6
#define MINUS         7
#define OUTER         8
#define FULL          9
#define BY_ROWID     10
#define RANGE_SCAN   11
#define UNIQUE_SCAN  12
#define HASH         13
#define OTHER         0

/* Local routines */
static QDSP_UNION *next_tree( /* return next subtree of parse tree to */
#ifdef __STDC__                /* be processed */
QDSP_UNION *,
QDSP_QDEF *
#endif /* __STDC__ */
); /* next_tree */

static QDSP_UNION *parent( /* return parent tree of a subtree */
#ifdef __STDC__
QDSP_UNION *,
QDSP_UNION *
#endif /* __STDC__ */
); /* parent */

EXEC SQL INCLUDE SQLCA;

/*****************************************************************************
 * qdxp_qry - Query EXPLAIN plan table for info on query retrieval strategy
 *
 * Based on info retrieved, fill in the join-order-position (join pos)
 * for each table in the query parse tree, as well as flags indicating the
 * type of join (merge or nested loops, outer vs. non-outer), and whether
 * an index is used for that table.
 *
 * The query used to retrieve the EXPLAIN plan uses CONNECT BY to perform
 * post-order traversal of the EXPLAIN tree (where parent id links a node
 * to a parent with matching id).  The set-operations portion of the tree,
 * if any, (UNION, INTERSECT, MINUS), has the same structure as the
 * corresponding portion of the parse tree.  For a given select block,
 * if there is more than one join, they are structured in the form:
 *
 *              join1
```

Sep 20 1993 13:38:48 qdxp_qry.pc Page 2

```
 *           /    \
 *         join2  table4
 *         /   \
 *      join3   table3
 *      /   \
 *   table1  table2
 *
 * and are encountered in the order: join1, join2, join3, table1, table2,
 * table3, table4 (possibly with intervening operations of not-immediately-
 * relevant types, FILTER, SORT, etc.).
 *
 * The strategy here is to traverse the parse tree and the EXPLAIN plan
 * in sync (as it were, with one finger on each).  Possible points in this
 * traversal are described by states, and actions taken after each fetch
 * in the fetch loop below depend on a combination of the current state
 * and the contents of the row fetched.
 *****************************************************************************
*/
QDSTATUS qdxp_qry(pqdef, pstmtid)
reg1 QDSP_QDEF *pqdef;     /* Query definition (root of parse tree) */
reg2 text *pstmtid;  /* Statement id of EXPLAIN plan for this query */
                     /* (requires 14 bytes) */
{
#    define MAX_JOINS 64              /* Maximum number of joins per query */
     ub1 joins[MAX_JOINS];            /* Array to hold info about the joins */
                                      /*  in a query, as they are traversed */
     reg3 QDSP_UNION *ptree;          /* Place holder in parse tree */
     reg8 int inst_adjust = 0;        /* Adjust instance numbers for current */
                                      /*  select block by subtracting this   */
                                      /*  value, which represents objects    */
                                      /*  encountered in previous select     */
                                      /*  blocks                             */
     reg7 int last_table_access_id;   /* Id in EXPLAIN plan of most */
                                      /*  recently seen table access entry */
#define RESET_TABLE_ACCESS_ID 1000000 /* An impossibly high id */

     reg5 int setop;                  /* Current set operator in parse tree */
     reg6 int state;                  /* Current state of parse tree and */
                                      /*  EXPLAIN plan traversal */
#define STATE_INITIAL 1
#define STATE_LOOKING_FOR_SETOP 2
#define STATE_SETOP_FOUND 3
#define STATE_LOOKING_FOR_JOIN 4
#define STATE_LOOKING_FOR_TABLE 5
#define STATE_LOOKING_FOR_INDEX 6
#define STATE_RESET 7
#define STATE_FINISHED 8
#define STATE_UNEXPECTED_PLAN_ENTRY 9

     reg9 ub1 user_len;     /* Length of user name for this connection */
     reg10 text *puser;     /* Pointer to user name for this connection */
     reg11 int inst;        /* Current table instance (index into FROM */
                            /*  clause of current query) */
     reg12 int ntabs;       /* Number of tables in current FROM clause */
     reg13 int skip_fetch = 0; /* If non-zero, skip fetch, needed row */
                               /*  is already available */
     reg14 QDSTATUS retval;
__private static ub4 cnx_seqno = 0; /* Connection sequence number */

     EXEC SQL BEGIN DECLARE SECTION;

     VARCHAR stmt[2048];              /* Buffer for dynamic EXPLAIN stmt */
     int operation;
     int options;
     VARCHAR object_owner[32];
     VARCHAR object_name[32];
     int id;
     int parent_id;
     int object_instance;
     int position;
     VARCHAR table_owner[32];   /* Return table owner associated with index */
     VARCHAR table_name[32];    /* Return table name associated with index */
```

1

Sep 20 1993 13:38:48 qdxp_qry.pc Page 3

```
    EXEC SQL END DECLARE SECTION;

    QDBEGIN("qdxp_qry");
    QD_CHECK_CNX_SEQNO; /* Check connection sequence number */

    /* Check for required argument */
    if (pstmtid == NULL)
    {
        retval = QD_REQUIRED_ARG_MISSING;
        goto error_return;
    }

    /* Get local pointer to user id for this connection */
    puser = QDpcom->cnx.user;
    user_len = strlen(puser);

    /* Construct query to retrieve EXPLAIN info */
    /* Due to a bug in the Oracle 7.0 DECODE function, the string */
    /* literals must be padded to the full length of the respective */
    /* columns, which happens to be 30. */
x(0)
    sprintf(stmt.arr,
            "SELECT DECODE(OPERATION, 'INDEX', %d,\
                                      'TABLE ACCESS', %d,\
                                      'MERGE JOIN', %d,\
                                      'NESTED LOOPS', %d,\
                                      'UNION', %d,\
                                      'INTERSECTION', %d,\
                                      'MINUS', %d,\
                                      %d),\
                    DECODE(OPTIONS, 'OUTER', %d,\
                                    'FULL', %d,\
                                    'BY ROWID', %d,\
                                    'RANGE SCAN', %d,\
                                    'UNIQUE SCAN', %d,\
                                    'HASH', %d, \
                                    %d),\
                    DECODE(OBJECT_OWNER, NULL, ' ', OBJECT_OWNER),\
                    DECODE(OBJECT_NAME, NULL, ' ', OBJECT_NAME),\
                    ID, DECODE(PARENT_ID, NULL, 0, PARENT_ID),\
                    DECODE(OBJECT_INSTANCE, NULL, 0, OBJECT_INSTANCE),\
                    DECODE(POSITION, NULL, 0, POSITION)\
             FROM %s WHERE STATEMENT_ID = \'%s\'\
             CONNECT BY PRIOR ID = PARENT_ID AND STATEMENT_ID = \'%s\'\
             START WITH ID = 1 AND STATEMENT_ID = \'%s\'",

             INDEX, TABLE_ACCESS, MERGE_JOIN, NESTED_LOOPS,
             UNION, INTERSECTION, MINUS, OTHER,
             OUTER, FULL, BY_ROWID, RANGE_SCAN, UNIQUE_SCAN, HASH, OTHER,
             QDpcom->cnx.plan_table, pstmtid, pstmtid, pstmtid);      /*%01*/

    stmt.len = strlen(stmt.arr);
x(0)
#ifdef QDDEBUG
    if (QD_DISPLAY_DEBUG)
        printf("qdxp_qry: %s\n\n", stmt.arr);
#endif /* QDDEBUG */
/* QD_TURN_DEBUG_ON; */

    /* Prepare, declare, and open cursor for prepared query */

    EXEC SQL WHENEVER SQLERROR GOTO sql_error;

    EXEC SQL PREPARE Query_Statement from :stmt;

    EXEC SQL DECLARE Xp_Query CURSOR FOR Query_Statement;

    EXEC SQL OPEN Xp_Query;

    /* Fetch information from cursor */

    EXEC SQL WHENEVER NOT FOUND GOTO not_found;
```

Sep 20 1993 13:38:48 qdxp_qry.pc Page 4

```
#ifdef QDDEBUG_XPQRY
    if (QD_DISPLAY_DEBUG)
        printf("Explain plan:\n");
#endif
    ptree = pqdef->ptree;
    state = STATE_INITIAL;
    for (; state != STATE_FINISHED;)
    {
x(1)    switch (state)
        {
          case STATE_RESET:
            /* We're ready to start a new select block or set operation,
             * other than the first in the tree, so we have to get a
             * pointer to it.  Then we can fall through to
             * STATE_INITIAL.
             * Since we don't expect the tree to be too big, it's simplest
             * to find our place starting from the top.
             */
x(2)        ptree = next_tree(ptree, pqdef);
            if (ptree == (QDSP_UNION *)NULL)
            {
x(3)            state = STATE_FINISHED;
                break;
            }
            else
                state = STATE_INITIAL;
            /* No break ! */
          case STATE_INITIAL:
            /* Are we looking at a set operator in the parse tree,
             * and if so, which one?
             */
x(4)        if (ptree->check == QDCK_SETOP_UNION)
                setop = UNION;
            else if (ptree->check == QDCK_SETOP_INTER)
                setop = INTERSECTION;
            else if (ptree->check == QDCK_SETOP_MINUS)
                setop = MINUS;
            else setop = 0;
            if (setop)
                state = STATE_LOOKING_FOR_SETOP;
            else /* select block */
            {
x(5)            ntabs = ptree->qry.ntabs;

                /* Clear joins flags */
                memset(joins + 1, 0, ntabs);

                last_table_access_id = RESET_TABLE_ACCESS_ID;
                if (ntabs == 1)
{
x(6)                state = STATE_LOOKING_FOR_TABLE;
}
                else state = STATE_LOOKING_FOR_JOIN;
            }
            break;
          case STATE_SETOP_FOUND:
x(7)        ptree = ptree->setop.prand1;
            state = STATE_INITIAL;
            break;
          case STATE_LOOKING_FOR_SETOP:
          case STATE_LOOKING_FOR_JOIN:
          case STATE_LOOKING_FOR_TABLE:
          case STATE_LOOKING_FOR_INDEX:
x(8)        break;
        }; /* switch */

        if (state == STATE_INITIAL)
            continue;
x(9)
        if (skip_fetch)
{ x(10)     skip_fetch = 0;
}
        else /******** Fetch next row from EXPLAIN plan ********/
        {
```

2

Sep 20 1993 13:38:46 qdxp_qry.pc Page 5

```
x(11)      EXEC SQL FETCH Xp_Query
                INTO :operation, :options, :object_owner,
                     :object_name, :id, :parent_id,
                     :object_instance, :position;

           object_name.arr[object_name.len] = 0;
#ifdef QDDEBUG_XPQRY
           if (QD_DISPLAY_DEBUG)
           {
               printf("Oper: %d  Opt: %d  Name: %s  Id: %d  Parid: %d\n",
                   operation, options, object_name.arr, id, parent_id);
               printf("    Inst: %d  Pos: %d\n", object_instance, position);
           }
#endif /* QDDEBUG */
       } /* else (skip_fetch == 0) */
x(12)
       switch (state)
       {
         case STATE_LOOKING_FOR_SETOP:
x(13)      if (operation == setop)
               state = STATE_SETOP_FOUND;
           else if (operation != OTHER)
{ x(14)        state = STATE_UNEXPECTED_PLAN_ENTRY;
}          break;
         case STATE_LOOKING_FOR_JOIN:
x(15)      if (operation == MERGE_JOIN || operation == NESTED_LOOPS)
           {
               if (operation == MERGE_JOIN)
                   joins[ntabs] |= QDSP_TAB_MERGE;
               else
                   joins[ntabs] |= QDSP_TAB_NESTL;
               if (options == OUTER)
                   joins[ntabs] |= QDSP_TAB_OUTER;
               ntabs--;
               if (ntabs == 1)
                   state = STATE_LOOKING_FOR_TABLE;
           }
           else if (operation != OTHER)
               state = STATE_UNEXPECTED_PLAN_ENTRY;
           break;
         case STATE_LOOKING_FOR_TABLE:
           /* %02+ If the query contains a view reference, there may
            * be more tables than we thought.  In that case, we may now
            * encounter a join operation when we expected the last table.
            * If this happens, increment the number of tables, and process
            * the join operation.  %02-
            */
           if (( ptree->qry.flags & QDSP_QRY_VIEW) &&                /*%02+*/
               (operation == MERGE_JOIN || operation == NESTED_LOOPS))
           {
               state = STATE_LOOKING_FOR_JOIN;
               ntabs++;
               skip_fetch = 1;
               break;
           }                                                          /*%02-*/

x(16)      if (operation == TABLE_ACCESS)
           {
x(17)          /* Set last table access id, so if we next encounter
                * an index, we can tell whether it belongs to this
                * table scan (because its parent id is >= this id)
                * or is an independent operation (its parent id is
                * < this id) which is a peer of this operation.
                */
               last_table_access_id = id;

               /* Find this table in FROM clause */
               inst = (object_instance - inst_adjust) - 1;

               if (inst < ptree->qry.ntabs &&                         /*%02*/
                   object_name.len == ptree->qry.ptabs[inst].lname &&
                   !memcmp(object_name.arr,
                           pqdef->pstrings + ptree->qry.ptabs[inst].oname,
```

Sep 20 1993 13:38:48 qdxp_qry.pc Page 6

```
                           object_name.len) &&
                  ((ptree->qry.ptabs[inst].lschema == 0 &&
                   object_owner.len == user_len &&
                   !memcmp(object_owner.arr, puser, user_len)) ||
                  (ptree->qry.ptabs[inst].lschema != 0 &&
                   object_owner.len == ptree->qry.ptabs[inst].lschema &&
                   !memcmp(object_owner.arr,
                        pqdef->pstrings + ptree->qry.ptabs[inst].oschema,
                        object_owner.len))))
               {
x(18)              /* Did we already mistakenly associated this table with
                    * an index-only scan for another instance of the same
                    * table?
                    */
                   if (ptree->qry.ptabs[inst].flags &
                       QDSP_TAB_VISITED)
                   {
x(19)                  retval = QD_XP_AMBIGUOUS_PLAN;
                       goto error_return;
                   }
x(20)              ptree->qry.ptabs[inst].flags |= QDSP_TAB_VISITED;
                   ptree->qry.ptabs[inst].flags |= joins[ntabs];
                   ptree->qry.ptabs[inst].join_pos = ntabs++;
                   if (options == HASH)
                       ptree->qry.ptabs[inst].flags |= QDSP_TAB_HASH;
                   if (ntabs > ptree->qry.ntabs)
{ x(21)                state = STATE_LOOKING_FOR_INDEX;
}              }
               /* %02+ If the query contains a view reference, and we're
                * looking at a table that doesn't match the corresponding
                * FROM clause table, then assume we're looking at a table
                * inside the view definition.  If this table has join
                * position 1, then the view is the driving table of our
                * query, and we must record the name of the underlying
                * driving table, for use later in looking up file id's.
                * (Note that this is only a safe assumption because we only
                * allow 1 view reference in the query, so any tables not
                * directly referenced in the query must be inside this view.)
                * %02-
                */
               else if ((ptree->qry.flags & QDSP_QRY_VIEW)          /*%02+*/
                        && ntabs == 1)
               {
                   /* Find the view in the FROM clause (ASSERT:
                    * one of the tables must have its QDSP_TAB_VIEW
                    * flag set, or the QDSP_QRY_VIEW flag wouldn't be set.)
                    */
                   for (inst = 0; inst < ptree->qry.ntabs; inst++)
                       if (ptree->qry.ptabs[inst].flags & QDSP_TAB_VIEW)
                           break;
                   ptree->qry.ptabs[inst].flags |= QDSP_TAB_VISITED;
                   ptree->qry.ptabs[inst].flags |= joins[ntabs];
                   ptree->qry.ptabs[inst].join_pos = ntabs++;
                   if (options == HASH)
                       ptree->qry.ptabs[inst].flags |= QDSP_TAB_HASH;

                   ptree->qry.opartabname =
                       qdsp_addstr(pqdef, object_name.arr, object_name.len);
                   ptree->qry.lpartabname = object_name.len;
                   ptree->qry.opartabowner =
                       qdsp_addstr(pqdef, object_owner.arr, object_owner.len);
                   ptree->qry.lpartabowner = object_owner.len;

                   /* We're found our driving table; don't bother
                    * examining the rest of the explain plan, since the
                    * presence of a view reference throws everything out
                    * of whack.  (There's generally no reason to keep
                    * going after finding the driving table, anyway; the
                    * algorithm was designed to do so more for extensibility
                    * than specific need.)
                    */
                   state = STATE_FINISHED;
               }                                                     /*%02-*/
```

196

Sep 20 1993 13:38:48 qdxp_qry.pc Page 7

```
            } /* if (operation == TABLE_ACCESS) */
            else if (operation == INDEX)
            {
x(22)           /* Is this index a child of the most-recently-read */
                /* table access, or an independent operation?      */

                if (parent_id < last_table_access_id)
                {
x(23)               /* Index is independent operation (i.e. all needed */
                    /* columns from some table can be retrieved from   */
                    /* index without a table access).  We must query   */
                    /* the data dictionary to determine which table    */
                    /* this index belongs to.                          */

                    EXEC SQL WHENEVER NOT FOUND CONTINUE;

                    /* If user has dba privilege, query DBA_INDEXES,
                     * else query ALL_INDEXES
                    */
                    if (QDpcom->cnx.flags & QDCNX_DBA)
                        EXEC SQL SELECT TABLE_OWNER, TABLE_NAME
                                 INTO :table_owner, :table_name
                                 FROM SYS.DBA_INDEXES
                                 WHERE OWNER = :object_owner AND
                                       INDEX_NAME = :object_name;
                    else
                        EXEC SQL SELECT TABLE_OWNER, TABLE_NAME
                                 INTO :table_owner, :table_name
                                 FROM ALL_INDEXES
                                 WHERE OWNER = :object_owner AND
                                       INDEX_NAME = :object_name;
x(24)               if (sqlca.sqlcode)
                    {
x(25)                   retval = QD_XP_INDEX_NOT_FOUND;
                        goto error_return;
                    }
                    for (inst = 0; inst < ptree->qry.ntabs; inst++)
                    {
x(26)                   if (table_name.len ==
                            ptree->qry.ptabs[inst].lreal_name &&
                            !memcmp(table_name.arr,
                                    pqdef->pstrings +
                                    ptree->qry.ptabs[inst].oreal_name,
                                    table_name.len) &&
                            ((ptree->qry.ptabs[inst].lreal_schema == 0 &&
                              table_owner.len == user_len &&
                              !memcmp(table_owner.arr, puser, user_len)) ||
                             (ptree->qry.ptabs[inst].lreal_schema != 0 &&
                              table_owner.len ==
                              ptree->qry.ptabs[inst].lreal_schema &&
                              !memcmp(table_owner.arr,
                                      pqdef->pstrings +
                                      ptree->qry.ptabs[inst].oreal_schema,
                                      table_owner.len))))
                        {
x(27)                       /* Have we already processed this table? */
                            if (ptree->qry.ptabs[inst].flags &
                                QDSP_TAB_VISITED)
{ x(28)                         continue;
}
                            ptree->qry.ptabs[inst].flags |=
                                (QDSP_TAB_VISITED |
                                 QDSP_TAB_INDX | QDSP_TAB_NOTAC);
                            ptree->qry.ptabs[inst].flags |= joins[ntabs];
                            ptree->qry.ptabs[inst].join_pos = ntabs++;
                            if (ntabs > ptree->qry.ntabs)
{ x(29)                         state = STATE_LOOKING_FOR_INDEX;
}                           break;
                        }
                        retval = QD_XP_INDEX_NOT_FOUND;
                        goto error_return;
                    } /* for (inst = 0;...) */
                    EXEC SQL WHENEVER NOT FOUND GOTO not_found;
```

Sep 20 1993 13:38:48 qdxp_qry.pc Page 8

```
x(30)
                } /* if (parent_id < last_table_access_id) */
                else
                {
x(31)               /* Index belongs to most recently read table access. */
                    /* We must flag that table as using an index.        */

                    ptree->qry.ptabs[inst].flags |= QDSP_TAB_INDX;
                } /* else */
            } /* else if (operation == INDEX) */
x(32)
            break;
        case STATE_LOOKING_FOR_INDEX:
            /* This is the same as STATE_LOOKING_FOR_TABLE where we've */
            /* already encountered the table access operation for a    */
            /* given table, and now we encounter an index operation    */
            /* which "belongs" to that table access, except that here  */
            /* the table in question is the last table in the FROM     */
            /* clause, so we know that either we're looking for an     */
            /* index, or we're done with this select block.            */

x(33)       if (operation == INDEX)
            {
x(34)           ptree->qry.ptabs[inst].flags |= QDSP_TAB_INDX;
            }
            else if (operation != OTHER)
            {
x(35)           /* We've encountered a table access, join, or set   */
                /* operation, meaning we're done with the previous  */
                /* select block and ready to start another.  Set    */
                /* skip_fetch to a non-zero value, since we've      */
                /* already fetched the row we'll need the next      */
                /* time through the loop.  Add previous select      */
                /* block's number of tables to inst_adjust, which   */
                /* is the amount that must be subtracted off        */
                /* object_instance values to yield a correct value  */
                /* for the current select block.                    */

                state = STATE_RESET;
                skip_fetch = 1;
                inst_adjust += ptree->qry.ntabs;
            }
            break;
          default:
x(36)       break;
        }; /* switch */
x(37)
        if (state == STATE_UNEXPECTED_PLAN_ENTRY)
        {
x(38)       QDFAIL(QD_XP_UNEXPECTED_PLAN_ENTRY);
            break;
        }
    } /* for (;;) */
not_found:
x(39)  EXEC SQL CLOSE Xp_Query;

    /* Typically, when we run out of rows, we're in a state where we've
     * seen all of the tables of the current FROM clause, but we're
     * still not sure whether there might be an index access for the
     * last table.
    */
    if (! (state == STATE_FINISHED || state == STATE_LOOKING_FOR_INDEX))
    {
#ifdef QDDEBUG
        if (QD_DISPLAY_DEBUG)
            printf("state: %d ntabs: %d ptree->qry.ntabs: %d\n",
                   state, ntabs, ptree->qry.ntabs);
#endif /* QDDEBUG */
QD_TURN_DEBUG_OFF;
        QDFAIL(QD_XP_UNEXPECTED_PLAN_ENTRY);
    }
x(40)
sql_error:  /* In case any of the above SQL statements failed */
```

4

```
Sep 20 1993 18:36:48        qdxp_qry.pc        Page 9

    EXEC SQL WHENEVER SQLERROR CONTINUE;
x(41)  retval = sqlca.sqlcode;
error_return:
x(42)  QDFAIL(retval);
return_retval:
x(43)  QDEND;
    return retval;
} /* qdxp_qry */


/* next_tree - return pointer to next subtree of parse tree to process.
 * If previous tree was left operand of a set operation, we now want the
 * right operand.  Else, if some ancestor of previous tree was left
 * operand of a set operation, we want the right operand of that set
 * operation.  Else, we're done, so return NULL.
 */
QD_STATIC QDSP_UNION *next_tree(ptree, pqdef)
reg1 QDSP_UNION *ptree; /* Subtree of parse tree which was just processed */
reg2 QDSP_QDEF *pqdef;  /* Query definition (root of parse tree) */
{
    reg3 QDSP_UNION *pparent;  /* Pointer to parent of ptree */

    if (ptree == (QDSP_UNION *)NULL || pqdef->ptree == ptree)
        return NULL;

    pparent = parent(ptree, pqdef->ptree);

    if (pparent != (QDSP_UNION *)NULL && ptree == pparent->setop.prand1)
        return pparent->setop.prand2;
    else return next_tree(pparent, pqdef);
} /* next_tree */

/* parent - return pointer to parent of ptree */
QD_STATIC QDSP_UNION *parent(pchild, ptree)
reg1 QDSP_UNION *pchild; /* Find this tree's parent */
reg2 QDSP_UNION *ptree;  /* Search for parent in this tree */
{
    reg3 QDSP_UNION *pretval;

    if (ptree->check == QDCK_SETOP_UNION ||
         ptree->check == QDCK_SETOP_INTER ||
         ptree->check == QDCK_SETOP_MINUS)
    {
        if (ptree->setop.prand1 == pchild ||
             ptree->setop.prand2 == pchild)
            return ptree;
        else if ((pretval = parent(pchild, ptree->setop.prand1))
                  != (QDSP_UNION *)NULL)
            return pretval;
        else return parent(pchild, ptree->setop.prand2);
    }
    else return (QDSP_UNION *)NULL;
} /* parent */
```

198

Aug 5 1993 14:33:51 qdcleanup.pc Page 1

```
/* drop QD temp tables which are still lying around */

#include <stdio.h>
#include <s.h>
#include <sl.h>
#include <afidef.h>

EXEC SQL BEGIN DECLARE SECTION;
        VARCHAR status[65];
        VARCHAR uid[40];
        VARCHAR pwd[40];
        VARCHAR buffer[200];
        VARCHAR table_name[32];
EXEC SQL END DECLARE SECTION;

EXEC SQL INCLUDE SQLCA;
EXEC SQL INCLUDE SQLDA;

main(argc, argv)
int argc;
char *argv[];
{
        int c, i;
        char *p = NULL;
        serc se;
        int attempts = 0;
#define MAX_ATTEMPTS 4

        if (argc > 2)
        {
            fprintf(stderr, "Usage: %s [<user>[/<password>]]\n",
                    argv[0]);
            exit(-1);
        }
try_again:
        if (argc == 2) /* User name (and possibly password) supplied */
        {
            uid.len = strlen(argv[1]);
            p = strchr(argv[1], '/');
            if (p)
            {
                pwd.len = uid.len;
                uid.len = p - argv[1];
                p++;
                pwd.len -= (uid.len + 1);
            }
            strncpy(uid.arr, argv[1], uid.len);
        }

        else /* Neither user name nor password supplied */
        {
            /* Prompt for and get user name */
            do
            {
#if 0
                c = afinli("Enter user-name: ", uid.arr, 32);
                if (c > 0)
                    fprintf(stderr, "User-name too long, please try again.\n");
#endif
                printf("Enter user-name: ");
                i = 0;
                while (i < 32)
                {
                    c = getchar();
                    if (c == '\n')
                    {
                        uid.arr[i] = 0;
                        break;
                    }
                    else if (c != ' ' && c != '\t')
                        uid.arr[i++] = c;
                }
                if (i >= 32)
```

Aug 5 1993 14:33:51 qdcleanup.pc Page 2

```
                    fprintf(stderr, "User-name too long, please try again.\n");
            } while (i >= 32);
            if (c < 0)
            {
                fprintf(stderr, "Error encountered reading input.\n");
                exit(-1);
            }
            uid.len = strlen(uid.arr);
            p = strchr(uid.arr, '/');
            if (p) /* Was password included in response to prompt? */
            {
                pwd.len = uid.len;
                uid.len = p - uid.arr;
                uid.arr[uid.len] = 0;
                p++;
                pwd.len -= (uid.len + 1);
            }
        }
        if (!p) /* Password was not supplied */
        {
            /* Prompt for and get password */
            c = slsprom(&se, "Enter password: ", pwd.arr, 32);
            if (SERC_ERROR(se))
            {
                fprintf(stderr, "Error encountered reading input.\n");
                exit(-1);
            }
            pwd.len = strlen(pwd.arr);
        }
        else /* Password was supplied */
            strncpy(pwd.arr, p, pwd.len);

#if 0
        for (i = 0; i < ul; i++)
            if (isalpha(u[i]))
                QDpcom->cnx.user[i] = toupper(u[i]);
            else
                QDpcom->cnx.user[i] = u[i];
        QDpcom->cnx.user[ul] = 0;
        if (p)
        {
            strncpy(QDpcom->cnx.pwd, p, pl);
            QDpcom->cnx.pwd[pl] = 0;
        }
#endif

        EXEC SQL CONNECT :uid IDENTIFIED BY :pwd;

        if (sqlca.sqlcode)
        {
            if (sqlca.sqlcode == -1017)
            {
                fprintf(stderr,
            "ERROR: ORA-01017: invalid username/password; logon denied\n");
                if (++attempts < MAX_ATTEMPTS)
                {
                    argc = 1;
                    p = NULL;
                    goto try_again;
                }
            }
            else
            {
                if (sqlca.sqlcode == -1034)
                    printf("ERROR: ORA-1034: ORACLE not available\n");
                else
                    printf("ORACLE error %d encountered while connecting\n",
                        sqlca.sqlcode > 0 ? sqlca.sqlcode : -sqlca.sqlcode);
                exit(-1);
            }
        }

        EXEC SQL DECLARE c1 CURSOR FOR
```

Aug 5 1993 14:33:51 qdcleanup.pc Page 3

```
        SELECT TABLE_NAME FROM USER_TABLES WHERE TABLE_NAME LIKE
        'QDIT%';

    EXEC SQL OPEN c1;
    i = 0;
    do
    {
        EXEC SQL FETCH c1 INTO :table_name;
        if (sqlca.sqlcode < 0)
        {
            printf(
"ORACLE error %d encountered while fetching from USER_TABLES\n",
                    sqlca.sqlcode > 0 ? sqlca.sqlcode : -sqlca.sqlcode);

            exit(-1);
        }
        else if (sqlca.sqlcode > 0)
        {
            if (i == 0)
                printf("There are no QD temporary tables owned by %s\n",
                        uid.arr);
            break;
        }
        else if (i++ == 0)
        {
            printf(
"\nWarning: QD temporary tables owned by %s will be dropped.\n", uid.arr);
            printf(
"Make sure user %s is not currently executing a query using QD.\n", uid.arr);
            c = 0;
            printf("\nContinue? (y/n) ");
            do
            {
                if (c == '\n')
                    printf("Continue? (y/n) ");
                c = getchar();
            } while (c != 'y' && c != 'Y' && c != 'n' && c != 'N');
            if (c != 'y' && c != 'Y')
            {
                printf("Aborting.\n");
                exit(0);
            }
        }
        table_name.arr[table_name.len] = 0;
        sprintf(buffer.arr, "DROP TABLE %s", table_name.arr);
        printf("Dropping table %s...   ", table_name.arr);
        buffer.len = strlen(buffer.arr);
        EXEC SQL EXECUTE IMMEDIATE :buffer;
        if (sqlca.sqlcode)
        {
            printf(
                "\nORACLE error %d encountered while deleting table%s\n",
                    sqlca.sqlcode > 0 ? sqlca.sqlcode : -sqlca.sqlcode,
                    table_name.arr);
            break;
        }
        else
            printf("Table dropped.\n");
    } while (sqlca.sqlcode == 0);

    EXEC SQL CLOSE c1;

}
```

In view of the foregoing; what we claim is:

1. A digital data processing system comprising:

A. a database table for storing data records in a plurality of independently accessible partitions, and a database management system (DBMS) coupled to said database table for accessing data records stored therein by any of a direct reference to said database table and to views thereof, said DBMS including a standard interface for receiving a query signal representative of a request for access to one or more selected data records and for applying that request to said stored data records to generate a result signal representative of the result thereof, B. a parallel interface for intercepting, from an application, a selected query signal representative of a request for access to selected data records in said database table, said parallel interface including i. a query decomposer for generating, from said intercepted query signal, a plurality of subquery signals, each representative of a request for access to data records stored in one or more respective partitions of said database table, ii. a subquery processor coupled to said query decomposer for applying in parallel to said standard interface said plural subquery signals, and iii. a result assembler, coupled to said standard interface, for responding to result signals generated thereby in response to application of said subquery signals for generating an assembled result signal representative of a response to said query signal.

2. A digital data processing system according to claim 1, said DBMS including a result signal generator for generating said result signal as a function of a predicate list component of an applied query signal, said predicate list including zero, one or more predicates that evaluate true for data records requested by that query signal, said query decomposer being responsive to at least selected intercepted query signals for generating a plurality of subquery signals to be substantially identical to that query signal, which subquery signals additionally include in said predicate list an intersecting predicate that evaluates true for all data records in the respective partitions of said database table and evaluates false otherwise.

3. A digital data processing system according to claim 2, in which

A. said standard interface is responsive to a query signal representative of an insert/select request for placing selected data from said database table in a designated database table, and B. said query decomposer is responsive to an intercepted signal representative of an insert/select request for generating said plural subquery signals based on said intercepted query signal and representative of requests for said selected data in said one or more respective partitions of said database table, said subquery signals for causing said standard interface to place data accessed in response thereto in said designated database table.

4. A digital data processing system according to claim 2, comprising

A. a plurality of database tables, each for storing a respective plurality of data records in a plurality of independently accessible partitions, B. said database management system (DBMS) being coupled to said plural database tables, for accessing data records stored therein by any of a direct reference to said database table and to views thereof, said DBMS further determining an optimal order for applying the corresponding request to said plural database tables and for generating a strategy signal representative thereof and generating the result signal as a function of a predicate list component of an applied query signal, said predicate list including zero, one or more predicates that evaluate true for data records requested by that query signal, C. said query decomposer including i. a driving database table identifier responsive to said strategy signal for identifying a driving database table, and ii. a subquery signal generator responsive to an intercepted query signal representative of a request for access to data records joined from said plural database table for generating said plural subquery signals to additionally include in said predicate list an intersecting predicate that evaluates true for all data records in the respective partitions of the driving database table and evaluates false otherwise.

5. A digital data processing system according to claim 2, wherein said result assembler responds to at least a selected intercepted query signal, for generating said assembled result signal by variably interleaving the result signals generated by said DBMS in response to application of said plural subquery signals in an order, if any, specified by said intercepted query signal.

6. A digital data processing system according to claim 2, wherein said result assembly includes responds to at least a selected intercepted query signal representative of a request for access based on an aggregate function of said data records stored in said database table, by generating said assembled result signal as an aggregate function applied to the result signals generated by said DBMS in response to application of said plural subquery signals.

7. A digital data processing system according to claim 2, wherein

A. said subquery processor comprises a plurality of subcursor buffer sets, each associated with each of said subquery signals, each said subcursor buffer set comprising a plurality of subcursor buffers each storing a result signal generated by the standard interface in response to application of the associated subquery signal, B. said result assembler comprises:

i. a root buffer for storing a current assembled result signal, and ii. a root fetch element for generating and storing in said root buffer an assembled result signal based on a result signal stored in one or more of selected subcursor buffer for, thereby, emptying those selected subcursor buffer, and C. said query processor applying to said standard interface a subquery signal associated with an emptied one of said subcursor buffers, said subquery signal being applied to said standard interface asynchronously with respect to demand for a current assembled result signal.

8. A digital data processing system according to claim 2, wherein

A. said database table comprises a second data store for storing and retrieving signals representative of said data records, B. said database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

9. A digital data processing system according to claim 2 further comprising A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

10. A digital data processing system according to claim 2, further comprising A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

11. A digital data processing system according to claim 10, wherein said query processor comprises a plurality of threads, each for applying a respective one of said subquery signal to said DBMS.

12. A digital data processing system according to claim 11, further comprising parallel thread control element for controlling execution in parallel said plurality of threads on a plurality of central processing units.

13. A digital data processing system according to claim 10, wherein

A. said standard interface comprises an object code library,

B. said query signal comprises at least a portion of a sequence of computer programming instructions capable of linking with such an object code library, and C. said parallel interface comprises an object code library for linking with said sequence of computer programming instructions.

14. A digital data processing system according to claim 1, wherein:

A. said standard interface responds to a query signal representative of an insert/select request for placing selected data from said database table in a designated database table, B. said query decomposer responds to an intercepted signal representative of an insert/select request for generating said plural subquery signals based on said intercepted query signal and representative of requests for said selected data in said one or more respective partitions of said database table, said subquery signals for causing said standard interface to place data accessed in response thereto in said designated database table.

15. A digital data processing system according to claim 14, further comprising A. a plurality of database tables, each for storing a respective plurality of data records in a plurality of independently accessible partitions, B. said database management system (DBMS) being coupled to said plural database tables, for accessing data records stored therein by any of a direct reference to said database table and to views thereof, said DBMS further determining an optimal order for applying the corresponding request to said plural database and for generating a strategy signal representative thereof and generating the result signal as a function of a predicate list component of an applied query signal, said predicate list including zero, one or more predicates that evaluate true for data records requested by that query signal, C. said query decomposer including i. a driving database table identifier responsive to said strategy signal for identifying a driving database table, and ii. a subquery signal generator responsive to an intercepted query signal representative of a request for access to data records joined from said plural database table for generating said plural subquery signals to additionally include in said predicate list an intersecting predicate that evaluates true for all data records in the respective partitions of the driving database table and evaluates false otherwise.

16. A digital data processing system according to claim 14, wherein said result assembler responds to at least a selected intercepted query signal, for generating said assembled result signal by variably interleaving the result signals generated by said DBMS in response to application of said plural subquery signals in an order, if any, specified by said intercepted query signal.

17. A digital data processing system according to claim 14, wherein said result assembler responds to at least a selected intercepted query signal representative of a request for access based on an aggregate function of said data records stored in said database table, for generating said assembled result signal as an aggregate function applied to the result signals generated by said DBMS in response to application of said plural subquery signals.

18. A digital data processing system according to claim 14, wherein

A. said subquery processor comprises a plurality of subcursor buffer sets, each associated with each of said subquery signals, each said subcursor buffer set comprising a plurality of subcursor buffers each storing a result signal generated by the standard interface in response to application of the associated subquery signal, B. said result assembler comprises:

i. a root buffer for storing a current assembled result signal, and ii. a root fetch element for generating and storing in said root buffer an assembled result signal based on a result signal stored in one or more of selected subcursor buffers for, thereby, emptying those selected subcursor buffer, and C. said query processor applying to said standard interface a subquery signal associated with an emptied one of said subcursor buffers, said subquery signal being applied to said standard interface asynchronously with respect to demand for a current assembled result signal.

19. A digital data processing system according to claim 14, wherein

A. said database table comprises a secondary data store for storing and retrieving signals representative of said data records, B. said database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

20. A digital data processing system according to claim 14, further comprising

A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

21. In a digital data processing system according to claim 1, wherein

A. said database table comprises a secondary data store for storing and retrieving signals representative of said data records, B. said database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

22. A digital data processing system according to claim 21, wherein said result assembler responds to at least a selected intercepted query signal, for generating said assembled result signal by variably interleaving the result signals generated by said DBMS in response to application of said plural subquery signals in an order, if any, specified by said intercepted query signal.

23. A digital data processing system according to claim 21, wherein said result assembler responds to at least a selected intercepted query signal representative of a request for access based on an aggregate function of said data records stored in said database table, for generating said assembled result signal as an aggregate function applied to the result signals generated by said DBMS in response to application of said plural subquery signals.

24. A digital data processing system according to claim 21, wherein

A. said subquery processor comprises a plurality of subcursor buffer sets, each associated with each of said subquery signals, each said subcursor buffer set comprising a plurality of subcursor buffers each storing a result signal generated by the standard interface in response to application of the associated subquery signal, B. said result assembler comprises:

i. a root buffer for storing a current assembled result signal, and ii. a root fetch element for generating and storing in said root buffer an assembled result signal based on a result signal stored in one or more of selected subcursor buffers for, thereby, emptying those selected subcursor buffers, and C. said query processor applying to said standard interface a subquery signal associated with an emptied one of said subcursor buffers, said subquery signal being applied to said standard interface asynchronously with respect to demand for a current assembled result signal.

25. A digital data processing system according to claim 21, wherein

A. said database table comprises a secondary data store for storing and retrieving signals representative of said data records, B. said database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

26. A digital data processing system according to claim 21, further comprising A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

27. A digital data processing system according to claim 1, wherein said result assembler in response to at least a selected intercepted query signal, generates said assembled result signal by variably interleaving the result signals generated by said DBMS in response to application of said plural subquery signals in an order, if any, specified by said intercepted query signal.

28. A digital data processing system according to claim 27, wherein said result assembler in response to at least a selected intercepted query signal representative of a request for access based on an aggregate function of said data records stored in said database table, generates said assembled result signal as an aggregate function applied to the result signals generated by said DBMS in response to application of said plural subquery signals.

29. A digital data processing system according to claim 27, wherein

A. said subquery processor comprises a plurality of subcursor buffer sets, each associated with each of said subquery signals, each said subcursor buffer set comprising a plurality of subcursor buffers each storing a result signal generated by the standard interface in response to application of the associated subquery signal, B. said result assembler comprises:

i. a root buffer for storing a current assembled result signal, and ii. a root fetch element for generating and storing in said root buffer an assembled result signal based on a result signal stored in one or more of selected subcursor buffers for, thereby, emptying those selected subcursor buffers, and C. said query processor applying to said standard interface a subquery signal associated with an emptied one of said subcursor buffers, said subquery signal being applied to said standard interface asynchronously with respect to demand for a current assembled result signal.

30. A digital data processing system according to claim 27, wherein

A. said database table comprises a secondary data store for storing and retrieving signals representative of said data records, B. said database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

31. A digital data processing system according to claim 27, further comprising A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

32. A digital data processing system according to claim 1, wherein said result assembler in response to at least a selected intercepted query signal representative of a request for access based on an aggregate function of said data records stored in said database table, generates said assembled result signal by applying the same aggregate function, or an aggregate function based thereon, to the result signals generated by said DBMS in response to application of said plural subquery signals.

33. A digital data processing system according to claim 32, wherein

A. said subquery processor comprises a plurality of subcursor buffer sets, each associated with each of said subquery signals, each said subcursor buffer set comprising a plurality of subcursor buffers each storing a result signal generated by the standard interface in response to application of the associated subquery signal, B. said result assembler comprises:

i. a root buffer for storing a current assembled result signal, and ii. a root fetch element for generating and storing in said root buffer an assembled result signal based on a result signal stored in one or more of selected subcursor buffers for, thereby, emptying those selected subcursor buffer, and C. said query processor applying to said standard interface a subquery signal associated with an emptied one of said subcursor buffers, said subquery signal being applied to said standard interface asynchronously with respect to demand for a current assembled result signal.

34. A digital data processing system according to claim 32, further comprising A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

35. A digital data processing system according to claim 32, wherein

A. said query decomposer is responsive to an intercepted query signal representative of a request for an average value of a selected datum from data records stored in a database table for generating said plural subquery signals to be representative of requests for a sum and count of said selected datum in respective partitions of that database table, B. said result assembler is responsive to such an intercepted query signal for generating said assembled result signal as a function of the sum values and count values of said result signals generated by said DBMS in response to application of said subquery signals.

36. A digital data processing system according to claim 32, wherein

A. said query decomposer is responsive to an intercepted query signal representative of a request for any of a standard deviation and variance of selected data from data records stored in a database table for generating said plural subquery signals to be representative of requests for related functions of said selected data in said one or more respective partitions of that database table, B. said result assembler is responsive to such an intercepted query signal for generating said assembled result signal as a function of said data represented by said result signals generated by said DBMS in response to application of said subquery signals.

37. A digital data processing system according to claim 32, wherein

A. said query decomposer is responsive to an intercepted query signal representative of a request for any of the following aggregate functions i) a minimum of selected data from data records stored in a database table, ii) a maximum of selected data from data records stored in a database table, iii) a sum of selected data from data records stored in a database table, iv) a count of data records in a database table, v) a count of data records containing non-null values of selected data in a database table, for generating said plural subquery signals to be representative of requests for said same aggregate function, or an aggregate function based thereon, on selected data in said one or more respective partitions of that database table, B. said result assembler is responsive to such an intercepted query signal for generating said assembled result signal as a function of said result signals generated by said DBMS in response to said subquery signals.

38. A digital data processing system according to claim 32, wherein

A. said query decomposer is responsive to an intercepted query signal including a clause representative of a request for grouping of selected data from data records stored in a database table, for generating said plural subquery signals based on said intercepted query signal absent a having clause, if any, therein, B. said result assembler is responsive to such an intercepted query signal for storing, in a further database table, data represented by said result signals, and applying to said standard interface a further query signal for application to said further database table, said further query signal being based on said intercepted query signal, including a having clause, if any, in said intercepted query signal and further including a group-by clause, C. said result assembler further generates said assembled result signal as a function of said result signals generated by said DBMS in response to said further query signal.

39. A digital data processing system according to claim 1, wherein

A. said subquery processor comprises a plurality of subcursor buffer sets, each associated with each of said subquery signals, each said subcursor buffer set comprising a plurality of subcursor buffers each storing a result signal generated by the standard interface in response to application of the associated subquery signal, B. said result assembler comprises:

i. a root buffer for storing a current assembled result signal, and ii. a root fetch element for generating and storing in said root buffer an assembled result signal based on a result signal stored in one or more of selected subcursor buffers for, thereby, emptying those selected subcursor buffer, and C. said query processor applying to said standard interface a subquery signal associated with an emptied one of said subcursor buffers, said subquery signal being applied to said standard interface asynchronously with respect to demand for a current assembled result signal.

40. A digital data processing system according to claim 39, wherein

A. said database table comprises a secondary data store for storing and retrieving signals representative of said data records, B. said database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

41. A digital data processing system according to claim 39, further comprising

A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

42. A digital data processing system according to claim 1, wherein

A. said database table comprises a secondary data store for storing and retrieving signals representative of said data records, B. said database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

43. A digital data processing system according to claim 42, further comprising A. a procedure/function call response element responsive to query signal in the form of a procedure/function call for invoking said parallel interface in lieu of said standard interface, and B. said query decomposer selectively responds to such a query signal for generating a plurality of subquery signals in the form of further procedure/function calls for invoking said standard interface.

44. In a digital data processing system according to claim 42, wherein said hashing element stores said data record-representative signals in hash bucket regions of a selected size, the improvement wherein said hash bucket region is sized to cause said DBMS to generate at least one overflow hash bucket region per root bucket region.

45. A digital data processing system according to claim 1, wherein

A. said query decomposer is responsive to an intercepted query signal representative of a request for distinct combinations of selected columns from data records stored in database table, for generating said plural subquery signals to be representative of requests for application of said function to said one or more respective partitions of that database table, and B. said result assembler is responsive to such an intercepted query signal for generating said assembled result signal as said function of any data represented in said result signals generated by said DBMS in response to said subquery signals.

46. A digital data processing system according to claim 1, wherein

A. said query decomposer is responsive to an intercepted query signal representative of a request for application of any of the following functions to said database table:

i) a nested selection of data from data records stored in said database table, and ii) a correlated nested selection of data from data records stored in said database table, for generating said plural subquery signals to be representative of requests for application of said function to said one or more respective partitions of that database table, B. said result assembler is responsive to such an intercepted query signal for generating said assembled result signal by interleaving the data represented by said result signals generated by said DBMS in response to application of said subquery signals.

47. A digital data processing system according to claim 1, wherein

A. said query decomposer is responsive to an intercepted query signal representative of a request for a sorted ordering of selected data from data records stored in said database table for generating said plural subquery signals to be representative of requests for a sorted ordering of said same selected datum in said one or more respective partitions of that database table, B. said result assembler is responsive to such an intercepted query signal for generating said assembled result signal by interleaving, in an order specified by said query signal, the data represented by said result signals generated by said DBMS in response to application of said subquery signals.

48. A digital data processing system comprising

A. a database table comprising a secondary data store for storing and retrieving signals representative of said data records, B. a database management system (DBMS) comprising i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, C. said query decomposer includes:

i) a hash bucket identifier for detecting whether said data record-representative signals are stored in said hash bucket regions based on a hash function of a value upon which those same data record-representative signals are indexed, and ii) a record selection specifier for selectively specifying, in connection with applying said plural subquery signals to said standard interface, that said data record-representative signals are to be retrieved from said database table based on such indexing.

49. A digital data processing system according to claim 48, wherein said hash bucket identifier includes stores said data record-representative signals in hash bucket regions of a selected size, said hash bucket region being sized to cause said DBMS to generate at least one overflow hash bucket region per root bucket region.

50. A method of operating a digital data processing system of the type having a database table for storing data records in a plurality of independently accessible partitions, a database management system (DBMS) coupled to said database table, for accessing data records stored therein by any of a direct reference to said database table and to views thereof, said DBMS including a standard interface for receiving a query signal representative of a request for access to one or more selected data records and applying that request to said stored data records to generate a result signal representative of the result thereof, the method comprising the steps of A. receiving a selected query signal representative of a request for access to selected data records in said database table, B. decomposing said query to generate, from said intercepted query signal, a plurality of subquery signals, each representative of a request for access to data records stored in one or more respective partitions of said database table, C. concurrently applying in a parallel processing step said plural subquery signals to said standard interface, and D. responding in an assembly step to result signals generated in response to application of said subquery signals to generate an assembled result signal representative of a response to said query signal.

51. A method according to claim 50, said DBMS including said result signal as a function of a predicate list component of an applied query signal, said predicate list including zero, one or more predicates that evaluate true for data records requested by that query signal, wherein said decomposition step includes the step of responding to at least selected intercepted query signals for generating a plurality of subquery signals to be substantially identical to that query signal, which subquery signals additionally include in said predicate list an intersecting predicate that evaluates true for all data records in the respective partitions of said database table and evaluates false otherwise.

52. A method according to claim 50, wherein said standard interface is responsive to a query signal representative of an insert/select request for placing selected data from said database table in a further database table, the improvement wherein said decomposition step includes the step of responding to an intercepted signal representative of an insert/select request for generating said plural subquery signals to cause said standard interface to place said selected data in said further database table, said subquery signals being representative of requests for said selected data in said one or more respective partitions of that database table.

53. A method according to claim 50, wherein said system is of the type has plural database tables each for storing a respective plurality of data records in a plurality of independently accessible partitions, a database management system (DBMS) coupled to said plural database tables, for accessing data records stored therein by any of a direct reference to said database table and to views thereof, said DBMS including standard interface for receiving a query signal representative of a request for access to data records joined from one or more of said plural database table for applying corresponding requests to said plural database table to generate a result signal representative of the results thereof, said DBMS being responsive a query signal for determining an optimal order for applying the corresponding request to said plural database tables and for generating a strategy signal representative thereof, said DBMS generating said result signal as a function of a predicate list component of an applied query signal, said predicate list including zero, one or more predicates that evaluate true for data records requested by that query signal, wherein the decomposition step includes the steps of A. responding to said strategy signal for identifying a driving database table, and B. responding to an intercepted query signal representative of a request for access to data records joined from said plural database table for generating said plural subquery signals to additionally include in said predicate list an intersecting predicate that evaluates true for all data records in the respective partitions of the driving database table and evaluates false otherwise.

54. A method according to claim 50, wherein said assembly step includes the step of responding to at least a selected intercepted query signal, for generating said assembled result signal by variably interleaving the result signals generated by said DBMS in response to application of said plural subquery signals in an order, if any, specified by said intercepted query signal.

55. A method according to claim 50, wherein said assembly step includes the step of responding to at least a selected intercepted query signal representative of a request for access based on an aggregate function of said data records stored in said database table, for generating said assembled result signal as an aggregate function applied to the result signals generated by said DBMS in response to application of said plural subquery signals.

56. A method according to claim 55, wherein

A. said decomposition step includes the step of responding to an intercepted query signal representative of a request for an average value of a selected datum from data records stored in a database table for generating said plural subquery signals to be representative of requests for a sum and count of said selected datum in respective partitions of that database table, and B. said assembly step includes the step of responding to such an intercepted query signal for generating said assembled result signal as a function of the sum values and count values of said result signals generated by said DBMS in response to application of said subquery signals.

57. A method according to claim 55, wherein

A. said decomposition step includes the step of responding to an intercepted query signal representative of a request for any of a standard deviation and variance of selected data from data records stored in a database table for generating said plural subquery signals to be representative of requests for related functions of said selected data in said one or more respective partitions of that database table, and B. said assembly step includes the step of responding to such an intercepted query signal for generating said assembled result signal as a function of said data represented by said result signals generated by said DBMS in response to application of said subquery signals.

58. A method according to claim 55, wherein

A. said decomposition step includes the step of, in response to an intercepted query signal representative of a request for any of the following aggregate functions i) a minimum of selected data from data records stored in a database table, ii) a maximum of selected data from data records stored in a database table, iii) a sum of selected data from data records stored in a database table, iv) a count of data records in a database table, or v) a count of data records containing non-null values of selected data in a database table, generating said plural subquery signals to be representative of requests for said same aggregate function, or an aggregate function based thereon, on selected data in said one or more respective partitions of that database table, B. said assembly step including the step of, responsive to such an intercepted query signal, generating said assembled result signal as a function of said result signals generated by said DBMS in response to said subquery signals.

59. A method according to claim 55, wherein

A. said decomposition step includes the step of responding to an intercepted query signal including a clause representative of a request for grouping of selected data from data records stored in a database table, for generating said plural subquery signals based on said intercepted query signal absent a having clause, if any, therein, B. said assembly step includes the steps of i. responding to such an intercepted query signal for storing, in a further database table, data represented by said result signals, and applying to said standard interface a further query signal for application to said temporary database table, said further query signal being based on said intercepted query signal, including a having clause, if any, in said intercepted query signal and further including a group-by clause, and ii. generating said assembled result signal as a function of said result signals generated by said DBMS in response to said further query signal.

60. A method according to claim 55, wherein

A. said parallel process step includes the step of providing a plurality of subcursor buffer sets, one associated with each of said subquery signals, each said subcursor buffer set comprising a plurality of subcursor buffers, each for storing a result signal generated by the standard interface in response to application of the associated subquery signal, B. said assembly step includes the steps of i. providing a root buffer for storing a current assembled result signal, and ii. generating and storing in said root buffer an assembled result signal based on a result signal stored in one or more of selected subcursor buffers and for, thereby, emptying those selected subcursor buffers, and C. said parallel process step includes the step of applying to said standard interface a subquery signal associated with an emptied one of said subcursor buffers, said subquery signal being applied to said standard interface asynchronously with respect to demand for a current assembled result signal.

61. A method according to claim 50, said digital data processing system further comprising a secondary data store for storing and retrieving signals representative of said data records, and database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, said query decomposition step including the steps of:

A) detecting whether said data record-representative signals are stored in said hash bucket regions based on a hash function of a value upon which those same data record-representative signals are indexed, and B) selectively specifying, in connection with applying said plural subquery signals to said standard interface, that said data record-representative signals are to be retrieved from said database table based on such indexing.

62. A method according to claim 61, said system responding to query signal in the form of a procedure/function call for invoking said standard interface, A. the method further comprising the step of responding to a query signal in the form of a procedure/function call for invoking said parallel interface in lieu of said standard interface, B. said decomposition step includes the step of selectively responding to such a query signal for generating a plurality of subquery signals in the form of further procedure/function calls for invoking said standard interface.

63. A method according to claim 62, wherein said parallel process step includes the step of providing a plurality of threads, each for applying a respective one of said subquery signal to said DBMS.

64. A method according to claim 63, further comprising the step of executing in parallel said plurality of threads on a plurality of central processing units.

65. A method according to claim 61, wherein said hashing step includes the step of storing said data record-representative signals in hash bucket regions of a selected size, the improvement wherein the hash bucket region is sized to cause said DBMS to generate at least one overflow hash bucket region per root bucket region.

66. A method according to claim 62, wherein said standard interface comprises an object code library, and said query signal comprises at least a portion of a sequence of computer programming instructions capable of linking with such an object code library, wherein said parallel interface step comprises the step of providing an object code library for linking with said sequence of computer programming instructions.

67. A method according to claim 50, wherein

A. said query decomposition step includes the step of, responsive to an intercepted query signal representative of a request for distinct combinations of selected columns from data records stored in database table, generating said plural subquery signals to be representative of requests for application of said function to said one or more respective partitions of that database table, and B. said result assembler step include the step of, responsive to such an intercepted query signal, generating said assembled result signal as said function of any data represented in said result signals generated by said DBMS in response to said subquery signals.

68. A method according to claim 50, wherein

A. said query decomposition step includes the step of, responsive to an intercepted query signal representative of a request for application of any of the following functions to said database table i) a nested selection of data from data records stored in said database table, and ii) a correlated nested selection of data from data records stored in said database table, generating said plural subquery signals to be representative of requests for application of said function to said one or more respective partitions of that database table, and B. said result assembler step includes the step of, responsive to such an intercepted query signal, generating said assembled result signal by the data represented by said result signals generated by said DBMS in response to application of said subquery signals.

69. A method according to claim 50, wherein

A. said query decomposition step includes the step of, responsive to an intercepted query signal representative of a request for a sorted ordering of selected data from data records stored in said database table, generating said plural subquery signals to be representative of requests for a sorted ordering of said same selected datum in said one or more respective partitions of that database table, and B. said result assembler step includes the step of, responsive to such an intercepted query signal, generating said assembled result signal by interleaving, in an order specified by said query signal, the data represented by said result signals generated by said DBMS in response to application of said subquery signals.

70. A method of operating a digital data processing system comprising a secondary data store for storing and retrieving signals representative of said data records, and database management system (DBMS) includes i. a selectively invocable hashing element for storing said data record-representative signals in hash bucket regions in said secondary data store, each such data record-representative signal being stored in a root hash bucket region corresponding to a hash function of a value of the corresponding data record, or an overflow hash bucket region associated with that root hash bucket region, ii) a selectively invocable indexer for selectively indexing each data record-representative signal so stored for access in accord with a respective value of the corresponding data record, said method decomposing a query, including the steps of:

A) detecting whether said data record-representative signals are stored in said hash bucket regions based on a hash function of a value upon which those same data record-representative signals are indexed, and B) selectively specifying, in connection with applying said plural subquery signals to said standard interface, that said data record-representative signals are to be retrieved from said database table based on such indexing.

71. A method according to claim 70, wherein said hashing step stores said data record-representative signals in hash bucket regions sized to cause said DBMS to generate at least one overflow hash bucket region per root bucket region.

* * * * *